(12) United States Patent
Kamada et al.

(10) Patent No.: US 7,402,119 B2
(45) Date of Patent: Jul. 22, 2008

(54) MULTI-SPEED TRANSMISSION FOR VEHICLE

(75) Inventors: Atsushi Kamada, Toyota (JP); Atsushi Honda, Seto (JP); Akiharu Abe, Toyota (JP); Atsushi Tabata, Okazaki (JP); Kazutoshi Nozaki, Aichi-gun (JP); Yuji Inoue, Nisshin (JP); Hirofumi Ota, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 179 days.

(21) Appl. No.: 11/282,098

(22) Filed: Nov. 18, 2005

(65) Prior Publication Data

US 2006/0142112 A1    Jun. 29, 2006

(30) Foreign Application Priority Data

Dec. 28, 2004 (JP) ............................. 2004-381497
Apr. 25, 2005 (JP) ............................. 2005-127209
Jun. 16, 2005 (JP) ............................. 2005-177052
Aug. 25, 2005 (JP) ............................. 2005-244282

(51) Int. Cl.
*F16H 3/62* (2006.01)

(52) U.S. Cl. ..................... 475/282; 475/284; 475/286; 475/288; 475/290

(58) Field of Classification Search ............... None
See application file for complete search history.

(56) References Cited

U.S. PATENT DOCUMENTS 5,203,234 A * 4/1993 Asada et al. ............ 477/143

6,634,980 B1   10/2003 Ziemer
7,220,210 B2 *  5/2007 Soh ........................ 475/275

FOREIGN PATENT DOCUMENTS

| JP | 2002-206601 | 7/2002 |
|---|---|---|
| JP | 2002-213545 | 7/2002 |
| JP | 2002-227940 | 8/2002 |
| JP | 2002-266956 | 9/2002 |
| JP | 2002-295609 | 10/2002 |
| JP | 2003-514195 | 4/2003 |
| JP | 2004-522096 | 7/2004 |
| JP | 2004-524485 | 8/2004 |
| JP | 2004-529297 | 9/2004 |
| WO | WO 02/079665 A2 | 10/2002 |
| WO | WO 02/079669 A1 | 10/2002 |
| WO | WO 02/079670 A2 | 10/2002 |

* cited by examiner

*Primary Examiner*—Sherry Estremsky
(74) *Attorney, Agent, or Firm*—Oblon, Spivak, McClelland, Maier & Neustadt, P.C.

(57) ABSTRACT

A transmission can be provided which achieves multiple speeds while maintaining good balance of gear ratio steps between gears by having a first clutch which selectively connects a first intermediate output member and a fourth rotating element RE4 together, a second clutch which selectively connects an input shaft and a second rotating element RE2 together, a third clutch which selectively connects the first intermediate output member and a first rotating element RE1 together, a fourth clutch which selectively connects the input shaft and the first rotating element RE1 together, a fifth clutch which selectively connects a second intermediate output member and the first rotating element RE1 together, a first brake which selectively holds the first rotating element RE1 to a transmission case, and a second brake which selectively holds the second rotating element RE2 to the transmission case.

32 Claims, 163 Drawing Sheets

FIG.2

| | C1 | C2 | C3 | C4 | C5 | B1 | B2 | GEAR RATIO | STEP |
|---|---|---|---|---|---|---|---|---|---|
| 1st | O | | | | O | | | 4.648 | |
| | | | | | | | | | 1.133 |
| 2nd | O | | | | | | O | 4.100 | |
| | | | | | | | | | 1.591 |
| 3rd | O | | | | | O | | 2.578 | |
| | | | | | | | | | 1.443 |
| 4th | O | | O | | | | | 1.786 | |
| | | | | | | | | | 1.241 |
| 5th | O | | | O | | | | 1.438 | |
| | | | | | | | | | 1.163 |
| 6th | O | O | | | | | | 1.237 | |
| | | | | | | | | | 1.237 |
| 7th | | O | | O | | | | 1.000 | |
| | | | | | | | | | 1.229 |
| 8th | | O | O | | | | | 0.814 | |
| | | | | | | | | | 1.237 |
| 9th | | O | | | | O | | 0.658 | |
| | | | | | | | | | 1.192 |
| 10th | | O | | | O | | | 0.552 | |
| R1 | | | O | | | | O | 3.434 | TOTAL GEAR RATIO RANGE 8.420 |
| R2 | | | | O | | | O | 1.923 | |

O ENGAGED

FIG.6

| | C1 | C2 | C3 | C4 | C5 | B1 | B2 | GEAR RATIO | STEP |
|---|---|---|---|---|---|---|---|---|---|
| 1st | O | | | | O | | | 4.648 | |
| | | | | | | | | | 1.133 |
| 2nd | O | | | | | | O | 4.100 | |
| | | | | | | | | | 1.591 |
| 3rd | O | | | | | O | | 2.578 | |
| | | | | | | | | | 1.443 |
| 4th | O | | O | | | | | 1.786 | |
| | | | | | | | | | 1.241 |
| 5th | O | | | O | | | | 1.438 | |
| | | | | | | | | | 1.163 |
| 6th | O | O | | | | | | 1.237 | |
| | | | | | | | | | 1.237 |
| 7th | | O | | O | | | | 1.000 | |
| | | | | | | | | | 1.229 |
| 8th | | O | O | | | | | 0.814 | |
| | | | | | | | | | 1.237 |
| 9th | | O | | | | O | | 0.658 | |
| | | | | | | | | | 1.192 |
| 10th | | O | | | O | | | 0.552 | |
| R1 | | | O | | | | O | 3.434 | TOTAL GEAR RATIO RANGE 8.420 |
| R2 | | | | O | | | O | 1.923 | |

O ENGAGED

FIG.8

| | C1 | C2 | C3 | C4 | C5 | B1 | B2 | GEAR RATIO | STEP |
|---|---|---|---|---|---|---|---|---|---|
| 1st | O | | | | | | O | 4.776 | |
| | | | | | | | | | 1.633 |
| 2nd | O | | | | | O | | 2.925 | |
| | | | | | | | | | 1.463 |
| 3rd | O | | O | | | | | 2.000 | |
| | | | | | | | | | 1.316 |
| 4th | O | | | O | | | | 1.519 | |
| | | | | | | | | | 1.201 |
| 5th | O | O | | | | | | 1.265 | |
| | | | | | | | | | 1.265 |
| 6th | | O | | O | | | | 1.000 | |
| | | | | | | | | | 1.250 |
| 7th | | O | O | | | | | 0.800 | |
| | | | | | | | | | 1.200 |
| 8th | | O | | | | O | | 0.667 | |
| | | | | | | | | | 1.133 |
| 9th | | O | | | O | | | 0.588 | |
| R1 | | | O | | | | O | 4.000 | TOTAL GEAR RATIO RANGE 8.119 |
| R2 | | | | O | | | O | 2.000 | |

O ENGAGED

FIG. 10

|     | C1 | C2 | C3 | C4 | C5 | B1 | B2 | GEAR RATIO | STEP |
|-----|----|----|----|----|----|----|----|------------|------|
| 1st |    |    |    |    | ○  |    | ○  | 4.971      | 1.511 |
| 2nd | ○  |    |    |    |    |    | ○  | 3.290      | 1.481 |
| 3rd | ○  |    |    |    |    | ○  |    | 2.222      | 1.351 |
| 4th | ○  |    | ○  |    |    |    |    | 1.645      | 1.167 |
| 5th | ○  |    |    | ○  |    |    |    | 1.409      | 1.133 |
| 6th | ○  | ○  |    |    |    |    |    | 1.244      | 1.244 |
| 7th |    | ○  |    | ○  |    |    |    | 1.000      | 1.212 |
| 8th |    | ○  | ○  |    |    |    |    | 0.825      | 1.271 |
| 9th |    | ○  |    |    |    | ○  |    | 0.649      | TOTAL GEAR RATIO RANGE 7.655 |
| R1  |    |    | ○  |    |    |    | ○  | 3.047      |      |
| R2  |    |    |    | ○  |    |    | ○  | 1.852      |      |

○ ENGAGED

FIG. 13

| | C1 | C2 | C3 | C4 | C5 | B1 | B2 | GEAR RATIO | STEP |
|---|---|---|---|---|---|---|---|---|---|
| 1st | | | | | ○ | | ○ | 4.762 | 1.159 |
| 2nd | ○ | | | | | | ○ | 4.110 | 1.579 |
| 3rd | ○ | | | | | ○ | | 2.603 | 1.301 |
| 4th | ○ | | ○ | | | | | 2.000 | 1.232 |
| 5th | ○ | | | ○ | | | | 1.624 | 1.229 |
| 6th | ○ | ○ | | | | | | 1.322 | 1.322 |
| 7th | | ○ | | ○ | | | | 1.000 | 1.200 |
| 8th | | ○ | ○ | | | | | 0.833 | 1.167 |
| 9th | | ○ | | | | ○ | | 0.714 | 1.150 |
| 10th | | ○ | | | ○ | | | 0.621 | TOTAL GEAR RATIO RANGE 7.667 |
| R1 | | | ○ | | | | ○ | 5.000 | |
| R2 | | | | ○ | | | ○ | 2.500 | |

○ENGAGED

FIG. 15

| | C1 | C2 | C3 | C4 | C5 | B1 | B2 | GEAR RATIO | STEP |
|---|---|---|---|---|---|---|---|---|---|
| 1st | O | | | | O | | | 5.971 | |
| | | | | | | | | | 1.578 |
| 2nd | O | | | | | | O | 3.783 | |
| | | | | | | | | | 1.508 |
| 3rd | O | | | | | O | | 2.509 | |
| | | | | | | | | | 1.408 |
| 4th | O | | O | | | | | 1.782 | |
| | | | | | | | | | 1.227 |
| 5th | O | | | O | | | | 1.452 | |
| | | | | | | | | | 1.152 |
| 6th | O | O | | | | | | 1.260 | |
| | | | | | | | | | 1.260 |
| 7th | | O | | O | | | | 1.000 | |
| | | | | | | | | | 1.251 |
| 8th | | O | O | | | | | 0.800 | |
| | | | | | | | | | 1.256 |
| 9th | | O | | | | O | | 0.636 | |
| | | | | | | | | | 1.290 |
| 10th | | O | | | O | | | 0.493 | |
| R1 | | | O | | | | O | 3.118 | TOTAL GEAR RATIO RANGE 12.101 |
| R2 | | | | O | | | O | 1.750 | |

O ENGAGED

FIG. 17

|     | C1 | C2 | C3 | C4 | C5 | B1 | B2 | GEAR RATIO | STEP |
|-----|----|----|----|----|----|----|----|------------|------|
| 1st |    |    |    |    | O  |    | O  | 4.549      |      |
|     |    |    |    |    |    |    |    |            | 1.556 |
| 2nd | O  |    |    |    | O  |    |    | 2.924      |      |
|     |    |    |    |    |    |    |    |            | 1.309 |
| 3rd | O  |    |    |    |    | O  |    | 2.233      |      |
|     |    |    |    |    |    |    |    |            | 1.351 |
| 4th | O  |    | O  |    |    |    |    | 1.645      |      |
|     |    |    |    |    |    |    |    |            | 1.170 |
| 5th | O  |    |    | O  |    |    |    | 1.414      |      |
|     |    |    |    |    |    |    |    |            | 1.134 |
| 6th | O  | O  |    |    |    |    |    | 1.246      |      |
|     |    |    |    |    |    |    |    |            | 1.246 |
| 7th |    | O  |    | O  |    |    |    | 1.000      |      |
|     |    |    |    |    |    |    |    |            | 1.213 |
| 8th |    | O  | O  |    |    |    |    | 0.824      |      |
|     |    |    |    |    |    |    |    |            | 1.246 |
| 9th |    | O  |    |    |    | O  |    | 0.649      |      |
|     |    |    |    |    |    |    |    |            | 1.143 |
| 10th|    | O  |    |    | O  |    |    | 0.568      |      |
| R1  |    |    | O  |    |    |    | O  | 3.062      | TOTAL GEAR RATIO RANGE 8.005 |
| R2  |    |    |    | O  |    |    | O  | 1.852      |      |

O ENGAGED

FIG. 19

| | C1 | C2 | C3 | C4 | C5 | B1 | B2 | GEAR RATIO | STEP |
|---|---|---|---|---|---|---|---|---|---|
| 1st | ○ | | | | | | ○ | 4.776 | 1.633 |
| 2nd | ○ | | | | | ○ | | 2.925 | 1.463 |
| 3rd | ○ | | ○ | | | | | 2.000 | 1.316 |
| 4th | ○ | | | ○ | | | | 1.519 | 1.201 |
| 5th | ○ | ○ | | | | | | 1.265 | 1.265 |
| 6th | | ○ | | ○ | | | | 1.000 | 1.250 |
| 7th | | ○ | ○ | | | | | 0.800 | 1.200 |
| 8th | | ○ | | | ○ | | | 0.667 | 1.133 |
| 9th | | ○ | | | ○ | | | 0.588 | TOTAL GEAR RATIO RANGE 8.119 |
| R1 | | | ○ | | | | ○ | 4.000 | |
| R2 | | | | ○ | | | ○ | 2.000 | |

○ ENGAGED

F I G. 20
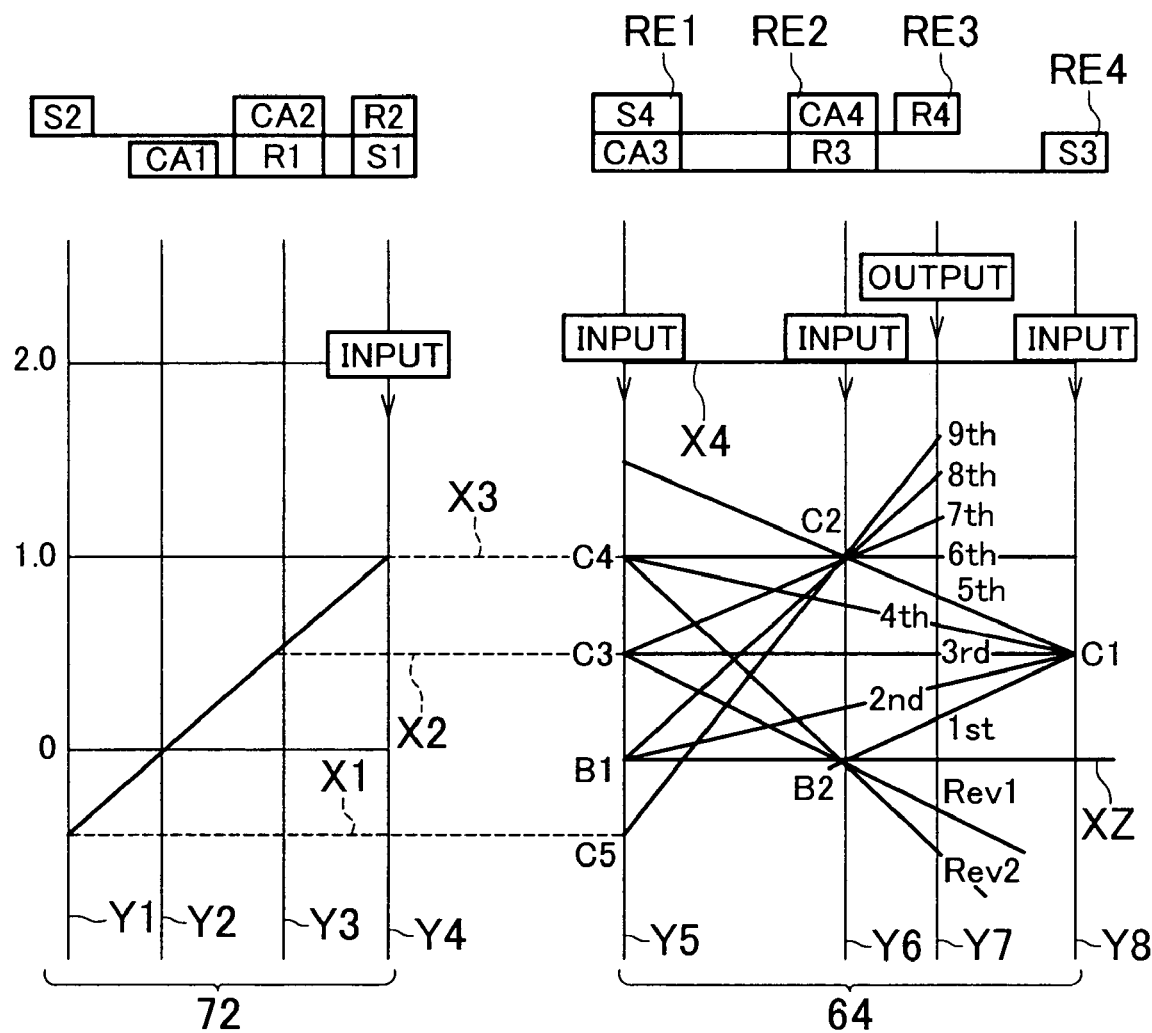

FIG. 21

| | C1 | C2 | C3 | C4 | C5 | B1 | B2 | GEAR RATIO | STEP |
|---|---|---|---|---|---|---|---|---|---|
| 1st | | | | | ○ | | ○ | 4.971 | 1.511 |
| 2nd | ○ | | | | | | ○ | 3.290 | 1.481 |
| 3rd | ○ | | | | | ○ | | 2.222 | 1.351 |
| 4th | ○ | | ○ | | | | | 1.645 | 1.167 |
| 5th | ○ | | | ○ | | | | 1.409 | 1.133 |
| 6th | ○ | ○ | | | | | | 1.244 | 1.244 |
| 7th | | ○ | | ○ | | | | 1.000 | 1.212 |
| 8th | | ○ | ○ | | | | | 0.825 | 1.271 |
| 9th | | ○ | | | | ○ | | 0.649 | TOTAL GEAR RATIO RANGE 7.655 |
| R1 | | | ○ | | | | ○ | 3.047 | |
| R2 | | | | ○ | | | ○ | 1.852 | |

○ ENGAGED

FIG. 23

| | C1 | C2 | C3 | C4 | C5 | B1 | B2 | GEAR RATIO | STEP |
|---|---|---|---|---|---|---|---|---|---|
| 1st | | | | | ○ | | ○ | 4.549 | |
| | | | | | | | | | 1.556 |
| 2nd | ○ | | | | ○ | | | 2.924 | |
| | | | | | | | | | 1.309 |
| 3rd | ○ | | | | | ○ | | 2.233 | |
| | | | | | | | | | 1.351 |
| 4th | ○ | | ○ | | | | | 1.645 | |
| | | | | | | | | | 1.170 |
| 5th | ○ | | | ○ | | | | 1.414 | |
| | | | | | | | | | 1.134 |
| 6th | ○ | ○ | | | | | | 1.246 | |
| | | | | | | | | | 1.246 |
| 7th | | ○ | | ○ | | | | 1.000 | |
| | | | | | | | | | 1.213 |
| 8th | | ○ | ○ | | | | | 0.824 | |
| | | | | | | | | | 1.246 |
| 9th | | ○ | | | | ○ | | 0.649 | |
| R1 | | | ○ | | | | ○ | 3.062 | TOTAL GEAR RATIO RANGE 7.005 |
| R2 | | | | ○ | | | ○ | 1.852 | |

○ ENGAGED

FIG. 25

|  | C1 | C2 | C3 | C4 | C5 | B1 | B2 | GEAR RATIO | STEP |
|---|---|---|---|---|---|---|---|---|---|
| 1st | O |  |  |  | O |  |  | 4.503 | 1.656 |
| 2nd | O |  |  |  |  | O |  | 2.720 | 1.360 |
| 3rd | O |  | O |  |  |  |  | 2.000 | 1.265 |
| 4th | O |  |  | O |  |  |  | 1.581 | 1.201 |
| 5th | O | O |  |  |  |  |  | 1.316 | 1.316 |
| 6th |  | O |  | O |  |  |  | 1.000 | 1.250 |
| 7th |  | O | O |  |  |  |  | 0.800 | 1.200 |
| 8th |  | O |  |  | O |  |  | 0.667 | 1.183 |
| 9th |  | O |  |  |  | O |  | 0.563 | TOTAL GEAR RATIO RANGE 7.993 |
| R1 |  |  | O |  |  |  | O | 4.000 |  |
| R2 |  |  |  | O |  |  | O | 2.000 |  |

O ENGAGED

FIG. 28

| | C1 | C2 | C3 | C4 | C5 | B1 | B2 | GEAR RATIO | STEP |
|---|---|---|---|---|---|---|---|---|---|
| 1st | | | | | ○ | | ○ | 4.762 | |
| 2nd | ○ | | | | | | ○ | 4.110 | 1.159 |
| 3rd | ○ | | | | | ○ | | 2.603 | 1.579 |
| 4th | ○ | | ○ | | | | | 2.000 | 1.301 |
| 5th | ○ | | | ○ | | | | 1.624 | 1.232 |
| 6th | ○ | ○ | | | | | | 1.322 | 1.229 |
| 7th | | ○ | | ○ | | | | 1.000 | 1.322 |
| 8th | | ○ | ○ | | | | | 0.833 | 1.200 |
| 9th | | ○ | | | | ○ | | 0.714 | 1.167 |
| 10th | | ○ | | ○ | | | | 0.621 | 1.150 |
| R1 | | | ○ | | | | ○ | 5.000 | TOTAL GEAR RATIO RANGE 7.667 |
| R2 | | | | ○ | | | ○ | 2.500 | |

○ ENGAGED

FIG. 29

|  | C1 | C2 | C3 | C4 | C5 | B1 | B2 | GEAR RATIO | STEP |
|---|---|---|---|---|---|---|---|---|---|
| 1st |  |  |  |  | O |  | O | 4.971 | 1.511 |
| 2nd | O |  |  |  |  |  | O | 3.290 | 1.481 |
| 3rd | O |  |  |  |  | O |  | 2.222 | 1.351 |
| 4th | O |  | O |  |  |  |  | 1.645 | 1.167 |
| 5th | O |  |  | O |  |  |  | 1.409 | 1.133 |
| 6th | O | O |  |  |  |  |  | 1.244 | 1.244 |
| 7th |  | O |  | O |  |  |  | 1.000 | 1.212 |
| 8th |  | O | O |  |  |  |  | 0.825 | 1.271 |
| 9th |  | O |  |  |  | O |  | 0.649 | 1.131 |
| 10th |  | O |  |  | O |  |  | 0.574 | TOTAL GEAR RATIO RANGE 8.655 |
| R1 |  |  | O |  |  |  | O | 3.047 | |
| R2 |  |  |  | O |  |  | O | 1.852 | |

O ENGAGED

FIG. 31

|  | C1 | C2 | C3 | C4 | C5 | B1 | B2 | GEAR RATIO | STEP |
|---|---|---|---|---|---|---|---|---|---|
| 1st | O |  |  |  | O |  |  | 5.971 | |
| 2nd | O |  |  |  |  |  | O | 3.783 | 1.578 |
| 3rd | O |  |  |  |  | O |  | 2.509 | 1.508 |
| 4th | O |  |  | O |  |  |  | 1.782 | 1.408 |
| 5th | O |  |  | O |  |  |  | 1.452 | 1.227 |
| 6th | O | O |  |  |  |  |  | 1.260 | 1.152 |
| 7th |  | O |  | O |  |  |  | 1.000 | 1.260 |
| 8th |  | O | O |  |  |  |  | 0.800 | 1.251 |
| 9th |  | O |  |  |  | O |  | 0.636 | 1.256 |
| 10th |  | O |  |  | O |  |  | 0.493 | 1.290 |
| R1 |  |  | O |  |  |  | O | 3.118 | TOTAL GEAR RATIO RANGE 12.101 |
| R2 |  |  |  | O |  |  | O | 1.750 | |

O ENGAGED

FIG. 33

|     | C1 | C2 | C3 | C4 | C5 | B1 | B2 | GEAR RATIO | STEP |
| --- | --- | --- | --- | --- | --- | --- | --- | --- | --- |
| 1st |    |    |    |    | O  |    | O  | 4.549 |       |
|     |    |    |    |    |    |    |    |       | 1.556 |
| 2nd | O  |    |    |    | O  |    |    | 2.924 |       |
|     |    |    |    |    |    |    |    |       | 1.309 |
| 3rd | O  |    |    |    |    | O  |    | 2.233 |       |
|     |    |    |    |    |    |    |    |       | 1.351 |
| 4th | O  |    | O  |    |    |    |    | 1.645 |       |
|     |    |    |    |    |    |    |    |       | 1.170 |
| 5th | O  |    |    | O  |    |    |    | 1.414 |       |
|     |    |    |    |    |    |    |    |       | 1.134 |
| 6th | O  | O  |    |    |    |    |    | 1.246 |       |
|     |    |    |    |    |    |    |    |       | 1.246 |
| 7th |    | O  |    | O  |    |    |    | 1.000 |       |
|     |    |    |    |    |    |    |    |       | 1.213 |
| 8th |    | O  | O  |    |    |    |    | 0.824 |       |
|     |    |    |    |    |    |    |    |       | 1.246 |
| 9th |    | O  |    |    |    | O  |    | 0.649 |       |
|     |    |    |    |    |    |    |    |       | 1.143 |
| 10th|    | O  |    |    | O  |    |    | 0.568 |       |
| R1  |    |    | O  |    |    |    | O  | 3.062 | TOTAL GEAR RATIO RANGE 8.005 |
| R2  |    |    |    | O  |    |    | O  | 1.852 |       |

O ENGAGED

FIG. 35

| | C1 | C2 | C3 | C4 | C5 | B1 | B2 | GEAR RATIO | STEP |
|---|---|---|---|---|---|---|---|---|---|
| 1st | O | | | | | | O | 4.776 | 1.633 |
| 2nd | O | | | | | O | | 2.925 | 1.463 |
| 3rd | O | | O | | | | | 2.000 | 1.316 |
| 4th | O | | | O | | | | 1.519 | 1.201 |
| 5th | O | O | | | | | | 1.265 | 1.265 |
| 6th | | O | | O | | | | 1.000 | 1.250 |
| 7th | | O | O | | | | | 0.800 | 1.200 |
| 8th | | O | | | | O | | 0.667 | 1.133 |
| 9th | | O | | | O | | | 0.588 | |
| R1 | | | O | | | | O | 4.000 | TOTAL GEAR RATIO RANGE 8.119 |
| R2 | | | | O | | | O | 2.000 | |

O ENGAGED

FIG. 37

| | C1 | C2 | C3 | C4 | C5 | B1 | B2 | GEAR RATIO | STEP |
|---|---|---|---|---|---|---|---|---|---|
| 1st | | | | | O | | O | 4.971 | 1.511 |
| 2nd | O | | | | | | O | 3.290 | 1.481 |
| 3rd | O | | | | | O | | 2.222 | 1.351 |
| 4th | O | | O | | | | | 1.645 | 1.167 |
| 5th | O | | | O | | | | 1.409 | 1.133 |
| 6th | O | O | | | | | | 1.244 | 1.244 |
| 7th | | O | | O | | | | 1.000 | 1.212 |
| 8th | | O | O | | | | | 0.825 | 1.271 |
| 9th | | O | | | | O | | 0.649 | TOTAL GEAR RATIO RANGE 7.655 |
| R1 | | | O | | | | O | 3.047 | |
| R2 | | | | O | | | O | 1.852 | |

O ENGAGED

FIG. 39

| | C1 | C2 | C3 | C4 | C5 | B1 | B2 | GEAR RATIO | STEP |
|---|---|---|---|---|---|---|---|---|---|
| 1st | | | | | ○ | | ○ | 4.549 | 1.556 |
| 2nd | ○ | | | | ○ | | | 2.924 | 1.309 |
| 3rd | ○ | | | | | ○ | | 2.233 | 1.351 |
| 4th | ○ | | ○ | | | | | 1.645 | 1.170 |
| 5th | ○ | | | ○ | | | | 1.414 | 1.134 |
| 6th | ○ | ○ | | | | | | 1.246 | 1.246 |
| 7th | | ○ | | ○ | | | | 1.000 | 1.213 |
| 8th | | ○ | ○ | | | | | 0.824 | 1.246 |
| 9th | | ○ | | | ○ | | | 0.649 | TOTAL GEAR RATIO RANGE 7.005 |
| R1 | | | ○ | | | | ○ | 3.062 | |
| R2 | | | | ○ | | | ○ | 1.852 | |

○ ENGAGED

FIG. 41

| | C1 | C2 | C3 | C4 | C5 | B1 | B2 | GEAR RATIO | STEP |
|---|---|---|---|---|---|---|---|---|---|
| 1st | O | | | | O | | | 4.503 | |
| | | | | | | | | | 1.656 |
| 2nd | O | | | | | O | | 2.720 | |
| | | | | | | | | | 1.360 |
| 3rd | O | | O | | | | | 2.000 | |
| | | | | | | | | | 1.265 |
| 4th | O | | | O | | | | 1.581 | |
| | | | | | | | | | 1.201 |
| 5th | O | O | | | | | | 1.316 | |
| | | | | | | | | | 1.316 |
| 6th | | O | | O | | | | 1.000 | |
| | | | | | | | | | 1.250 |
| 7th | | O | O | | | | | 0.800 | |
| | | | | | | | | | 1.200 |
| 8th | | O | | | O | | | 0.667 | |
| | | | | | | | | | 1.183 |
| 9th | | O | | | | O | | 0.563 | |
| R1 | | | O | | | | O | 4.000 | TOTAL GEAR RATIO RANGE 7.993 |
| R2 | | | | O | | | O | 2.000 | |

O ENGAGED

FIG. 44

| | C1 | C2 | C3 | C4 | C5 | B1 | B2 | GEAR RATIO | STEP |
|---|---|---|---|---|---|---|---|---|---|
| 1st | | | | | O | | O | 4.762 | |
| | | | | | | | | | 1.159 |
| 2nd | O | | | | | | O | 4.110 | |
| | | | | | | | | | 1.579 |
| 3rd | O | | | | | O | | 2.603 | |
| | | | | | | | | | 1.301 |
| 4th | O | | O | | | | | 2.000 | |
| | | | | | | | | | 1.232 |
| 5th | O | | | O | | | | 1.624 | |
| | | | | | | | | | 1.229 |
| 6th | O | O | | | | | | 1.322 | |
| | | | | | | | | | 1.322 |
| 7th | | O | | O | | | | 1.000 | |
| | | | | | | | | | 1.200 |
| 8th | | O | O | | | | | 0.833 | |
| | | | | | | | | | 1.167 |
| 9th | | O | | | | O | | 0.714 | |
| | | | | | | | | | 1.150 |
| 10th | | O | | | O | | | 0.621 | |
| R1 | | | O | | | | O | 5.000 | TOTAL GEAR RATIO RANGE 7.667 |
| R2 | | | | O | | | O | 2.500 | |

O ENGAGED

FIG. 45

| | C1 | C2 | C3 | C4 | C5 | B1 | B2 | GEAR RATIO | STEP |
|---|---|---|---|---|---|---|---|---|---|
| 1st | | | | | ○ | | ○ | 4.971 | |
| | | | | | | | | | 1.511 |
| 2nd | ○ | | | | | | ○ | 3.290 | |
| | | | | | | | | | 1.481 |
| 3rd | ○ | | | | | ○ | | 2.222 | |
| | | | | | | | | | 1.351 |
| 4th | ○ | | ○ | | | | | 1.645 | |
| | | | | | | | | | 1.167 |
| 5th | ○ | | | ○ | | | | 1.409 | |
| | | | | | | | | | 1.133 |
| 6th | ○ | ○ | | | | | | 1.244 | |
| | | | | | | | | | 1.244 |
| 7th | | ○ | | ○ | | | | 1.000 | |
| | | | | | | | | | 1.212 |
| 8th | | ○ | ○ | | | | | 0.825 | |
| | | | | | | | | | 1.271 |
| 9th | | ○ | | | | ○ | | 0.649 | |
| | | | | | | | | | 1.131 |
| 10th | | ○ | | | ○ | | | 0.574 | |
| R1 | | | ○ | | | | ○ | 3.047 | TOTAL GEAR RATIO RANGE 8.655 |
| R2 | | | | ○ | | | ○ | 1.852 | |

○ ENGAGED

FIG. 47

| | C1 | C2 | C3 | C4 | C5 | B1 | B2 | GEAR RATIO | STEP |
|---|---|---|---|---|---|---|---|---|---|
| 1st | O | | | | O | | | 5.971 | 1.578 |
| 2nd | O | | | | | | O | 3.783 | 1.508 |
| 3rd | O | | | | | O | | 2.509 | 1.408 |
| 4th | O | | | O | | | | 1.782 | 1.227 |
| 5th | O | | | | O | | | 1.452 | 1.152 |
| 6th | O | O | | | | | | 1.260 | 1.260 |
| 7th | | O | | O | | | | 1.000 | 1.251 |
| 8th | | O | O | | | | | 0.800 | 1.256 |
| 9th | | O | | | | O | | 0.636 | 1.290 |
| 10th | | O | | | O | | | 0.493 | TOTAL GEAR RATIO RANGE 12.101 |
| R1 | | | O | | | | O | 3.118 | |
| R2 | | | | O | | | O | 1.750 | |

O ENGAGED

FIG. 49

|      | C1 | C2 | C3 | C4 | C5 | B1 | B2 | GEAR RATIO | STEP |
|------|----|----|----|----|----|----|----|------------|------|
| 1st  |    |    |    |    | ○  |    | ○  | 4.549      | 1.556 |
| 2nd  | ○  |    |    |    | ○  |    |    | 2.924      | 1.309 |
| 3rd  | ○  |    |    |    |    | ○  |    | 2.233      | 1.351 |
| 4th  | ○  |    | ○  |    |    |    |    | 1.645      | 1.170 |
| 5th  | ○  |    |    | ○  |    |    |    | 1.414      | 1.134 |
| 6th  | ○  | ○  |    |    |    |    |    | 1.246      | 1.246 |
| 7th  |    | ○  |    | ○  |    |    |    | 1.000      | 1.213 |
| 8th  |    | ○  | ○  |    |    |    |    | 0.824      | 1.246 |
| 9th  |    | ○  |    |    |    | ○  |    | 0.649      | 1.143 |
| 10th |    | ○  |    |    | ○  |    |    | 0.568      | TOTAL GEAR RATIO RANGE 8.005 |
| R1   |    |    | ○  |    |    |    | ○  | 3.062      |      |
| R2   |    |    |    | ○  |    |    | ○  | 1.852      |      |

○ ENGAGED

FIG. 51

|     | C1 | C2 | C3 | C4 | C5 | B1 | B2 | GEAR RATIO | STEP |
|-----|----|----|----|----|----|----|----|------------|------|
| 1st | O  |    |    |    |    |    | O  | 4.776      | 1.633 |
| 2nd | O  |    |    |    |    | O  |    | 2.925      | 1.463 |
| 3rd | O  |    | O  |    |    |    |    | 2.000      | 1.316 |
| 4th | O  |    |    | O  |    |    |    | 1.519      | 1.201 |
| 5th | O  | O  |    |    |    |    |    | 1.265      | 1.265 |
| 6th |    | O  |    | O  |    |    |    | 1.000      | 1.250 |
| 7th |    | O  | O  |    |    |    |    | 0.800      | 1.200 |
| 8th |    | O  |    |    | O  |    |    | 0.667      | 1.133 |
| 9th |    | O  |    |    |    | O  |    | 0.588      | TOTAL GEAR RATIO RANGE 8.119 |
| R1  |    |    | O  |    |    |    | O  | 4.000      | |
| R2  |    |    |    | O  |    |    | O  | 2.000      | |

O ENGAGED

FIG. 53

| | C1 | C2 | C3 | C4 | C5 | B1 | B2 | GEAR RATIO | STEP |
|---|---|---|---|---|---|---|---|---|---|
| 1st | | | | | ○ | | ○ | 4.971 | 1.511 |
| 2nd | ○ | | | | | | ○ | 3.290 | 1.481 |
| 3rd | ○ | | | | | ○ | | 2.222 | 1.351 |
| 4th | ○ | | ○ | | | | | 1.645 | 1.167 |
| 5th | ○ | | | ○ | | | | 1.409 | 1.133 |
| 6th | ○ | ○ | | | | | | 1.244 | 1.244 |
| 7th | | ○ | | ○ | | | | 1.000 | 1.212 |
| 8th | | ○ | ○ | | | | | 0.825 | 1.271 |
| 9th | | ○ | | | | ○ | | 0.649 | TOTAL GEAR RATIO RANGE 7.655 |
| R1 | | | ○ | | | | ○ | 3.047 | |
| R2 | | | | ○ | | | ○ | 1.852 | |

○ ENGAGED

FIG. 55

| | C1 | C2 | C3 | C4 | C5 | B1 | B2 | GEAR RATIO | STEP |
|---|---|---|---|---|---|---|---|---|---|
| 1st | | | | | O | | O | 4.549 | |
| | | | | | | | | | 1.556 |
| 2nd | O | | | | O | | | 2.924 | |
| | | | | | | | | | 1.309 |
| 3rd | O | | | | | O | | 2.233 | |
| | | | | | | | | | 1.351 |
| 4th | O | | O | | | | | 1.645 | |
| | | | | | | | | | 1.170 |
| 5th | O | | | O | | | | 1.414 | |
| | | | | | | | | | 1.134 |
| 6th | O | O | | | | | | 1.246 | |
| | | | | | | | | | 1.246 |
| 7th | | O | | O | | | | 1.000 | |
| | | | | | | | | | 1.213 |
| 8th | | O | O | | | | | 0.824 | |
| | | | | | | | | | 1.246 |
| 9th | | O | | | | O | | 0.649 | |
| R1 | | | O | | | | O | 3.062 | TOTAL GEAR RATIO RANGE 7.005 |
| R2 | | | | O | | | O | 1.852 | |

O ENGAGED

FIG. 57

|     | C1 | C2 | C3 | C4 | C5 | B1 | B2 | GEAR RATIO | STEP |
|-----|----|----|----|----|----|----|----|------------|------|
| 1st | O  |    |    |    | O  |    |    | 4.503      | 1.656 |
| 2nd | O  |    |    |    |    | O  |    | 2.720      | 1.360 |
| 3rd | O  |    | O  |    |    |    |    | 2.000      | 1.265 |
| 4th | O  |    |    | O  |    |    |    | 1.581      | 1.201 |
| 5th | O  | O  |    |    |    |    |    | 1.316      | 1.316 |
| 6th |    | O  |    | O  |    |    |    | 1.000      | 1.250 |
| 7th |    | O  | O  |    |    |    |    | 0.800      | 1.200 |
| 8th |    | O  |    |    | O  |    |    | 0.667      | 1.183 |
| 9th |    | O  |    |    |    | O  |    | 0.563      | TOTAL GEAR RATIO RANGE 7.993 |
| R1  |    |    | O  |    |    |    | O  | 4.000      |      |
| R2  |    |    |    | O  |    |    | O  | 2.000      |      |

O ENGAGED

FIG.60

| | C1 | C2 | C3 | C4 | C5 | B1 | B2 | GEAR RATIO | STEP |
|---|---|---|---|---|---|---|---|---|---|
| 1st | | | | | ○ | | ○ | 4.762 | 1.159 |
| 2nd | ○ | | | | | | ○ | 4.110 | 1.579 |
| 3rd | ○ | | | | | ○ | | 2.603 | 1.301 |
| 4th | ○ | | ○ | | | | | 2.000 | 1.232 |
| 5th | ○ | | | ○ | | | | 1.624 | 1.229 |
| 6th | ○ | ○ | | | | | | 1.322 | 1.322 |
| 7th | | ○ | | ○ | | | | 1.000 | 1.200 |
| 8th | | ○ | ○ | | | | | 0.833 | 1.167 |
| 9th | | ○ | | | | ○ | | 0.714 | 1.150 |
| 10th | | ○ | | | ○ | | | 0.621 | TOTAL GEAR RATIO RANGE 7.667 |
| R1 | | | ○ | | | | ○ | 5.000 | |
| R2 | | | | ○ | | | ○ | 2.500 | |

○ ENGAGED

FIG. 62

| | C1 | C2 | C3 | C4 | C5 | B1 | B2 | GEAR RATIO | STEP |
|---|---|---|---|---|---|---|---|---|---|
| 1st | | | | | O | | O | 6.667 | 1.515 |
| 2nd | O | | | | | | O | 4.400 | 1.571 |
| 3rd | O | | | | | O | | 2.800 | 1.400 |
| 4th | O | | | O | | | | 2.000 | 1.286 |
| 5th | O | | | | O | | | 1.556 | 1.202 |
| 6th | O | O | | | | | | 1.294 | 1.294 |
| 7th | | O | | O | | | | 1.000 | 1.250 |
| 8th | | O | O | | | | | 0.800 | 1.200 |
| 9th | | O | | | | O | | 0.667 | 1.100 |
| 10th | | O | | | O | | | 0.606 | TOTAL GEAR RATIO RANGE 11.00 |
| R1 | | | O | | | | O | 4.000 | |
| R2 | | | | O | | | O | 2.000 | |

O ENGAGED

FIG. 64

| | C1 | C2 | C3 | C4 | C5 | B1 | B2 | GEAR RATIO | STEP |
|---|---|---|---|---|---|---|---|---|---|
| 1st | | | | | O | | O | 4.549 | 1.556 |
| 2nd | O | | | | O | | | 2.924 | 1.309 |
| 3rd | O | | | | | O | | 2.233 | 1.351 |
| 4th | O | | O | | | | | 1.645 | 1.170 |
| 5th | O | | | O | | | | 1.414 | 1.134 |
| 6th | O | O | | | | | | 1.246 | 1.246 |
| 7th | | O | | O | | | | 1.000 | 1.213 |
| 8th | | O | O | | | | | 0.824 | 1.246 |
| 9th | | O | | | | O | | 0.649 | 1.143 |
| 10th | | O | | | O | | | 0.568 | TOTAL GEAR RATIO RANGE 8.005 |
| R1 | | | O | | | | O | 3.062 | |
| R2 | | | | O | | | O | 1.852 | |

O ENGAGED

FIG. 66

| | C1 | C2 | C3 | C4 | C5 | B1 | B2 | GEAR RATIO | STEP |
|---|---|---|---|---|---|---|---|---|---|
| 1st | O | | | | | | O | 4.776 | 1.633 |
| 2nd | O | | | | | O | | 2.925 | 1.463 |
| 3rd | O | | O | | | | | 2.000 | 1.316 |
| 4th | O | | | O | | | | 1.519 | 1.201 |
| 5th | O | O | | | | | | 1.265 | 1.265 |
| 6th | | O | | O | | | | 1.000 | 1.250 |
| 7th | | O | O | | | | | 0.800 | 1.200 |
| 8th | | O | | | | O | | 0.667 | 1.133 |
| 9th | | O | | | O | | | 0.588 | TOTAL GEAR RATIO RANGE 8.119 |
| R1 | | | O | | | | O | 4.000 | |
| R2 | | | | O | | | O | 2.000 | |

O ENGAGED

FIG. 68

| | C1 | C2 | C3 | C4 | C5 | B1 | B2 | GEAR RATIO | STEP |
|---|---|---|---|---|---|---|---|---|---|
| 1st | | | | | ○ | | ○ | 4.971 | 1.511 |
| 2nd | ○ | | | | | | ○ | 3.290 | 1.481 |
| 3rd | ○ | | | | | ○ | | 2.222 | 1.351 |
| 4th | ○ | | ○ | | | | | 1.645 | 1.167 |
| 5th | ○ | | | ○ | | | | 1.409 | 1.133 |
| 6th | ○ | ○ | | | | | | 1.244 | 1.244 |
| 7th | | ○ | | ○ | | | | 1.000 | 1.212 |
| 8th | | ○ | ○ | | | | | 0.825 | 1.271 |
| 9th | | ○ | | | | ○ | | 0.649 | TOTAL GEAR RATIO RANGE 7.655 |
| R1 | | | ○ | | | | ○ | 3.047 | |
| R2 | | | | ○ | | | ○ | 1.852 | |

○ ENGAGED

FIG. 70

| | C1 | C2 | C3 | C4 | C5 | B1 | B2 | GEAR RATIO | STEP |
|---|---|---|---|---|---|---|---|---|---|
| 1st | | | | | ○ | | ○ | 4.549 | 1.556 |
| 2nd | ○ | | | | ○ | | | 2.924 | 1.309 |
| 3rd | ○ | | | | | ○ | | 2.233 | 1.351 |
| 4th | ○ | | ○ | | | | | 1.645 | 1.170 |
| 5th | ○ | | | ○ | | | | 1.414 | 1.134 |
| 6th | ○ | ○ | | | | | | 1.246 | 1.246 |
| 7th | | ○ | | ○ | | | | 1.000 | 1.213 |
| 8th | | ○ | ○ | | | | | 0.824 | 1.246 |
| 9th | | ○ | | | | ○ | | 0.649 | TOTAL GEAR RATIO RANGE 7.005 |
| R1 | | | ○ | | | | ○ | 3.062 | |
| R2 | | | | ○ | | | ○ | 1.852 | |

○ ENGAGED

FIG.72

|   | C1 | C2 | C3 | C4 | C5 | B1 | B2 | GEAR RATIO | STEP |
|---|---|---|---|---|---|---|---|---|---|
| 1st | O |  |  |  | O |  |  | 4.503 | 1.656 |
| 2nd | O |  |  |  |  | O |  | 2.720 | 1.360 |
| 3rd | O |  | O |  |  |  |  | 2.000 | 1.265 |
| 4th | O |  |  | O |  |  |  | 1.581 | 1.201 |
| 5th | O | O |  |  |  |  |  | 1.316 | 1.316 |
| 6th |  | O | O |  |  |  |  | 1.000 | 1.250 |
| 7th |  | O |  | O |  |  |  | 0.800 | 1.200 |
| 8th |  | O |  |  |  | O |  | 0.667 | 1.183 |
| 9th |  | O |  |  | O |  |  | 0.563 | TOTAL GEAR RATIO RANGE 7.993 |
| R1 |  |  | O |  |  |  | O | 4.000 | |
| R2 |  |  |  | O |  |  | O | 2.000 | |

O ENGAGED

FIG. 75

|      | C1 | C2 | C3 | C4 | C5 | B1 | B2 | GEAR RATIO | STEP |
|------|----|----|----|----|----|----|----|------------|------|
| 1st  |    |    |    |    | O  |    | O  | 4.762 | 1.159 |
| 2nd  | O  |    |    |    |    |    | O  | 4.110 | 1.579 |
| 3rd  | O  |    |    |    |    | O  |    | 2.603 | 1.301 |
| 4th  | O  |    | O  |    |    |    |    | 2.000 | 1.232 |
| 5th  | O  |    |    | O  |    |    |    | 1.624 | 1.229 |
| 6th  | O  | O  |    |    |    |    |    | 1.322 | 1.322 |
| 7th  |    | O  |    | O  |    |    |    | 1.000 | 1.200 |
| 8th  |    | O  | O  |    |    |    |    | 0.833 | 1.167 |
| 9th  |    | O  |    |    |    | O  |    | 0.714 | 1.150 |
| 10th |    | O  |    |    | O  |    |    | 0.621 | TOTAL GEAR RATIO RANGE 7.667 |
| R1   |    |    | O  |    |    |    | O  | 5.000 | |
| R2   |    |    |    | O  |    |    | O  | 2.500 | |

O ENGAGED

FIG. 76

| | C1 | C2 | C3 | C4 | C5 | B1 | B2 | GEAR RATIO | STEP |
|---|---|---|---|---|---|---|---|---|---|
| 1st | | | | | ○ | | ○ | 4.971 | 1.511 |
| 2nd | ○ | | | | | | ○ | 3.290 | 1.481 |
| 3rd | ○ | | | | | ○ | | 2.222 | 1.351 |
| 4th | ○ | | ○ | | | | | 1.645 | 1.167 |
| 5th | ○ | | | ○ | | | | 1.409 | 1.133 |
| 6th | ○ | ○ | | | | | | 1.244 | 1.244 |
| 7th | | ○ | | ○ | | | | 1.000 | 1.212 |
| 8th | | ○ | ○ | | | | | 0.825 | 1.271 |
| 9th | | ○ | | | | ○ | | 0.649 | 1.131 |
| 10th | | ○ | | | ○ | | | 0.574 | TOTAL GEAR RATIO RANGE 8.655 |
| R1 | | | ○ | | | | ○ | 3.047 | |
| R2 | | | | ○ | | | ○ | 1.852 | |

○ENGAGED

FIG. 77

| | C1 | C2 | C3 | C4 | C5 | B1 | B2 | GEAR RATIO | STEP |
|---|---|---|---|---|---|---|---|---|---|
| 1st | | | | | ○ | | ○ | 6.667 | |
| 2nd | ○ | | | | | | ○ | 4.400 | 1.515 |
| 3rd | ○ | | | | | ○ | | 2.800 | 1.571 |
| 4th | ○ | | ○ | | | | | 2.000 | 1.400 |
| 5th | ○ | | | ○ | | | | 1.556 | 1.286 |
| 6th | ○ | ○ | | | | | | 1.294 | 1.202 |
| 7th | | ○ | | ○ | | | | 1.000 | 1.294 |
| 8th | | ○ | ○ | | | | | 0.800 | 1.250 |
| 9th | | ○ | | | | ○ | | 0.667 | 1.200 |
| 10th | | ○ | | ○ | | | | 0.606 | 1.100 |
| R1 | | | ○ | | | | ○ | 4.000 | TOTAL GEAR RATIO RANGE 11.00 |
| R2 | | | | ○ | | | ○ | 2.000 | |

○ ENGAGED

FIG. 79

|  | C1 | C2 | C3 | C4 | C5 | B1 | B2 | GEAR RATIO | STEP |
|---|---|---|---|---|---|---|---|---|---|
| 1st |  |  |  |  | O |  | O | 4.549 | |
| | | | | | | | | | 1.556 |
| 2nd | O |  |  |  | O |  |  | 2.924 | |
| | | | | | | | | | 1.309 |
| 3rd | O |  |  |  |  | O |  | 2.233 | |
| | | | | | | | | | 1.351 |
| 4th | O |  | O |  |  |  |  | 1.645 | |
| | | | | | | | | | 1.170 |
| 5th | O |  |  | O |  |  |  | 1.414 | |
| | | | | | | | | | 1.134 |
| 6th | O | O |  |  |  |  |  | 1.246 | |
| | | | | | | | | | 1.246 |
| 7th |  | O |  | O |  |  |  | 1.000 | |
| | | | | | | | | | 1.213 |
| 8th |  | O | O |  |  |  |  | 0.824 | |
| | | | | | | | | | 1.246 |
| 9th |  | O |  |  |  | O |  | 0.649 | |
| | | | | | | | | | 1.143 |
| 10th |  | O |  |  | O |  |  | 0.568 | |
| R1 |  |  | O |  |  |  | O | 3.062 | TOTAL GEAR RATIO RANGE 8.005 |
| R2 |  |  |  | O |  |  | O | 1.852 | |

O ENGAGED

FIG. 81

| | C1 | C2 | C3 | C4 | C5 | B1 | B2 | GEAR RATIO | STEP |
|---|---|---|---|---|---|---|---|---|---|
| 1st | O | | | | | | O | 4.596 | 1.688 |
| 2nd | O | | | | O | | | 4.088 | 1.501 |
| 3rd | O | | | | | O | | 2.724 | 1.462 |
| 4th | O | | O | | | | | 1.863 | 1.273 |
| 5th | O | | | O | | | | 1.464 | 1.189 |
| 6th | O | O | | | | | | 1.231 | 1.231 |
| 7th | | O | | O | | | | 1.000 | 1.213 |
| 8th | | O | O | | | | | 0.824 | 1.203 |
| 9th | | O | | | O | | | 0.685 | 1.122 |
| 10th | | O | | | O | | | 0.611 | TOTAL GEAR RATIO RANGE 7.522 |
| R1 | | | O | | | | O | 4.056 | |
| R2 | | | | O | | | O | 2.176 | |

O ENGAGED

FIG. 83

| | C1 | C2 | C3 | C4 | C5 | B1 | B2 | GEAR RATIO | STEP |
|---|---|---|---|---|---|---|---|---|---|
| 1st | | | | | ○ | | ○ | 4.549 | 1.556 |
| 2nd | ○ | | | | ○ | | | 2.924 | 1.309 |
| 3rd | ○ | | | | | ○ | | 2.233 | 1.351 |
| 4th | ○ | | ○ | | | | | 1.645 | 1.170 |
| 5th | ○ | | | ○ | | | | 1.414 | 1.134 |
| 6th | ○ | ○ | | | | | | 1.246 | 1.246 |
| 7th | | ○ | | ○ | | | | 1.000 | 1.213 |
| 8th | | ○ | ○ | | | | | 0.824 | 1.246 |
| 9th | | ○ | | | | ○ | | 0.649 | TOTAL GEAR RATIO RANGE 7.005 |
| R1 | | | ○ | | | | ○ | 3.062 | |
| R2 | | | | ○ | | | ○ | 1.852 | |

○ENGAGED

FIG. 85

| | C1 | C2 | C3 | C4 | C5 | B1 | B2 | GEAR RATIO | STEP |
|---|---|---|---|---|---|---|---|---|---|
| 1st | ○ | | | | ○ | | | 4.503 | 1.656 |
| 2nd | ○ | | | | | ○ | | 2.720 | 1.360 |
| 3rd | ○ | | ○ | | | | | 2.000 | 1.265 |
| 4th | ○ | | | ○ | | | | 1.581 | 1.201 |
| 5th | ○ | ○ | | | | | | 1.316 | 1.316 |
| 6th | | ○ | | ○ | | | | 1.000 | 1.250 |
| 7th | | ○ | ○ | | | | | 0.800 | 1.200 |
| 8th | | ○ | | | | ○ | | 0.667 | 1.183 |
| 9th | | ○ | | ○ | | | | 0.563 | TOTAL GEAR RATIO RANGE 7.993 |
| R1 | | | ○ | | | | ○ | 4.000 | |
| R2 | | | | ○ | | | ○ | 2.000 | |

○ ENGAGED

FIG. 87

|  | C1 | C2 | C3 | C4 | C5 | B1 | B2 | GEAR RATIO | STEP |
|---|---|---|---|---|---|---|---|---|---|
| 1st | O |  |  |  |  |  | O | 4.596 | 1.688 |
| 2nd | O |  |  |  |  | O |  | 2.724 | 1.462 |
| 3rd | O |  | O |  |  |  |  | 1.863 | 1.273 |
| 4th | O |  |  | O |  |  |  | 1.464 | 1.189 |
| 5th | O | O |  |  |  |  |  | 1.231 | 1.231 |
| 6th |  | O |  | O |  |  |  | 1.000 | 1.213 |
| 7th |  | O | O |  |  |  |  | 0.824 | 1.203 |
| 8th |  | O |  |  |  | O |  | 0.685 | 1.146 |
| 9th |  | O |  |  | O |  |  | 0.598 | TOTAL GEAR RATIO RANGE 7.686 |
| R1 |  |  | O |  |  |  | O | 4.056 | |
| R2 |  |  |  | O |  |  | O | 2.176 | |

O ENGAGED

FIG. 89

| | C1 | C2 | C3 | C4 | C5 | B1 | B2 | GEAR RATIO | STEP |
|---|---|---|---|---|---|---|---|---|---|
| 1st | | | | | O | | O | 5.298 | 1.639 |
| 2nd | O | | | | | | O | 3.841 | 1.685 |
| 3rd | O | | | | O | | | 3.233 | 1.418 |
| 4th | O | | | | | O | | 2.280 | 1.330 |
| 5th | O | | O | | | | | 1.714 | 1.177 |
| 6th | O | | | O | | | | 1.456 | 1.185 |
| 7th | O | O | | | | | | 1.228 | 1.228 |
| 8th | | O | | O | | | | 1.000 | 1.151 |
| 9th | | O | O | | | | | 0.869 | 1.184 |
| 10th | | O | | | | O | | 0.734 | 1.139 |
| 11th | | O | | O | | | | 0.645 | TOTAL GEAR RATIO RANGE 8.214 |
| R1 | | | O | | | | O | 10.194 | |
| R2 | | | | O | | | O | 5.375 | |

O ENGAGED

FIG. 92

| | C1 | C2 | C3 | C4 | C5 | B1 | B2 | GEAR RATIO | STEP |
|---|---|---|---|---|---|---|---|---|---|
| 1st | | | | | ○ | | ○ | 4.762 | |
| | | | | | | | | | 1.159 |
| 2nd | ○ | | | | | | ○ | 4.110 | |
| | | | | | | | | | 1.579 |
| 3rd | ○ | | | | | ○ | | 2.603 | |
| | | | | | | | | | 1.301 |
| 4th | ○ | | ○ | | | | | 2.000 | |
| | | | | | | | | | 1.232 |
| 5th | ○ | | | ○ | | | | 1.624 | |
| | | | | | | | | | 1.229 |
| 6th | ○ | ○ | | | | | | 1.322 | |
| | | | | | | | | | 1.322 |
| 7th | | ○ | | ○ | | | | 1.000 | |
| | | | | | | | | | 1.200 |
| 8th | | ○ | ○ | | | | | 0.833 | |
| | | | | | | | | | 1.167 |
| 9th | | ○ | | | | ○ | | 0.714 | |
| | | | | | | | | | 1.150 |
| 10th | | ○ | | | ○ | | | 0.621 | |
| R1 | | | ○ | | | | ○ | 5.000 | TOTAL GEAR RATIO RANGE 7.667 |
| R2 | | | | ○ | | | ○ | 2.500 | |

○ ENGAGED

FIG. 93

| | C1 | C2 | C3 | C4 | C5 | B1 | B2 | GEAR RATIO | STEP |
|---|---|---|---|---|---|---|---|---|---|
| 1st | | | | | O | | O | 4.971 | |
| | | | | | | | | | 1.511 |
| 2nd | O | | | | | | O | 3.290 | |
| | | | | | | | | | 1.481 |
| 3rd | O | | | | | O | | 2.222 | |
| | | | | | | | | | 1.351 |
| 4th | O | | O | | | | | 1.645 | |
| | | | | | | | | | 1.167 |
| 5th | O | | | O | | | | 1.409 | |
| | | | | | | | | | 1.133 |
| 6th | O | O | | | | | | 1.244 | |
| | | | | | | | | | 1.244 |
| 7th | | O | | O | | | | 1.000 | |
| | | | | | | | | | 1.212 |
| 8th | | O | O | | | | | 0.825 | |
| | | | | | | | | | 1.271 |
| 9th | | O | | | O | | | 0.649 | |
| | | | | | | | | | 1.131 |
| 10th | | O | | | O | | | 0.574 | |
| R1 | | | O | | | | O | 3.047 | TOTAL GEAR RATIO RANGE 8.655 |
| R2 | | | | O | | | O | 1.852 | |

O ENGAGED

FIG. 95

|  | C1 | C2 | C3 | C4 | C5 | B1 | B2 | GEAR RATIO | STEP |
|---|---|---|---|---|---|---|---|---|---|
| 1st |  |  |  |  | O |  | O | 4.549 | |
| | | | | | | | | | 1.556 |
| 2nd | O |  |  |  | O |  |  | 2.924 | |
| | | | | | | | | | 1.309 |
| 3rd | O |  |  |  |  | O |  | 2.233 | |
| | | | | | | | | | 1.351 |
| 4th | O |  | O |  |  |  |  | 1.645 | |
| | | | | | | | | | 1.170 |
| 5th | O |  |  | O |  |  |  | 1.414 | |
| | | | | | | | | | 1.134 |
| 6th | O | O |  |  |  |  |  | 1.246 | |
| | | | | | | | | | 1.246 |
| 7th |  | O |  | O |  |  |  | 1.000 | |
| | | | | | | | | | 1.213 |
| 8th |  | O | O |  |  |  |  | 0.824 | |
| | | | | | | | | | 1.246 |
| 9th |  | O |  |  |  | O |  | 0.649 | |
| | | | | | | | | | 1.143 |
| 10th |  | O |  |  | O |  |  | 0.568 | |
| R1 |  |  | O |  |  |  | O | 3.062 | TOTAL GEAR RATIO RANGE 8.005 |
| R2 |  |  |  | O |  |  | O | 1.852 | |

O ENGAGED

FIG.97

| | C1 | C2 | C3 | C4 | C5 | B1 | B2 | GEAR RATIO | STEP |
|---|---|---|---|---|---|---|---|---|---|
| 1st | O | | | | | | O | 4.776 | 1.633 |
| 2nd | O | | | | | O | | 2.925 | 1.463 |
| 3rd | O | | O | | | | | 2.000 | 1.316 |
| 4th | O | | | O | | | | 1.519 | 1.201 |
| 5th | O | O | | | | | | 1.265 | 1.265 |
| 6th | | O | | O | | | | 1.000 | 1.250 |
| 7th | | O | O | | | | | 0.800 | 1.200 |
| 8th | | O | | | O | | | 0.667 | 1.133 |
| 9th | | O | | | O | | | 0.588 | TOTAL GEAR RATIO RANGE 8.119 |
| R1 | | | O | | | | O | 4.000 | |
| R2 | | | | O | | | O | 2.000 | |

O ENGAGED

FIG. 99

| | C1 | C2 | C3 | C4 | C5 | B1 | B2 | GEAR RATIO | STEP |
|---|---|---|---|---|---|---|---|---|---|
| 1st | | | | | ○ | | ○ | 4.971 | 1.511 |
| 2nd | ○ | | | | | | ○ | 3.290 | 1.481 |
| 3rd | ○ | | | | | ○ | | 2.222 | 1.351 |
| 4th | ○ | | ○ | | | | | 1.645 | 1.167 |
| 5th | ○ | | | ○ | | | | 1.409 | 1.133 |
| 6th | ○ | ○ | | | | | | 1.244 | 1.244 |
| 7th | | ○ | | ○ | | | | 1.000 | 1.212 |
| 8th | | ○ | ○ | | | | | 0.825 | 1.271 |
| 9th | | ○ | | | | ○ | | 0.649 | TOTAL GEAR RATIO RANGE 7.655 |
| R1 | | | ○ | | | | ○ | 3.047 | |
| R2 | | | | ○ | | | ○ | 1.852 | |

○ ENGAGED

FIG. 101

| | C1 | C2 | C3 | C4 | C5 | B1 | B2 | GEAR RATIO | STEP |
|---|---|---|---|---|---|---|---|---|---|
| 1st | | | | | O | | O | 4.549 | |
| 2nd | O | | | | O | | | 2.924 | 1.556 |
| 3rd | O | | | | | O | | 2.233 | 1.309 |
| 4th | O | | O | | | | | 1.645 | 1.351 |
| 5th | O | | | O | | | | 1.414 | 1.170 |
| 6th | O | O | | | | | | 1.246 | 1.134 |
| 7th | | O | | O | | | | 1.000 | 1.246 |
| 8th | | O | O | | | | | 0.824 | 1.213 |
| 9th | | O | | | | O | | 0.649 | 1.246 |
| R1 | | | O | | | | O | 3.062 | TOTAL GEAR RATIO RANGE 7.005 |
| R2 | | | | O | | | O | 1.852 | |

O ENGAGED

F I G . 102
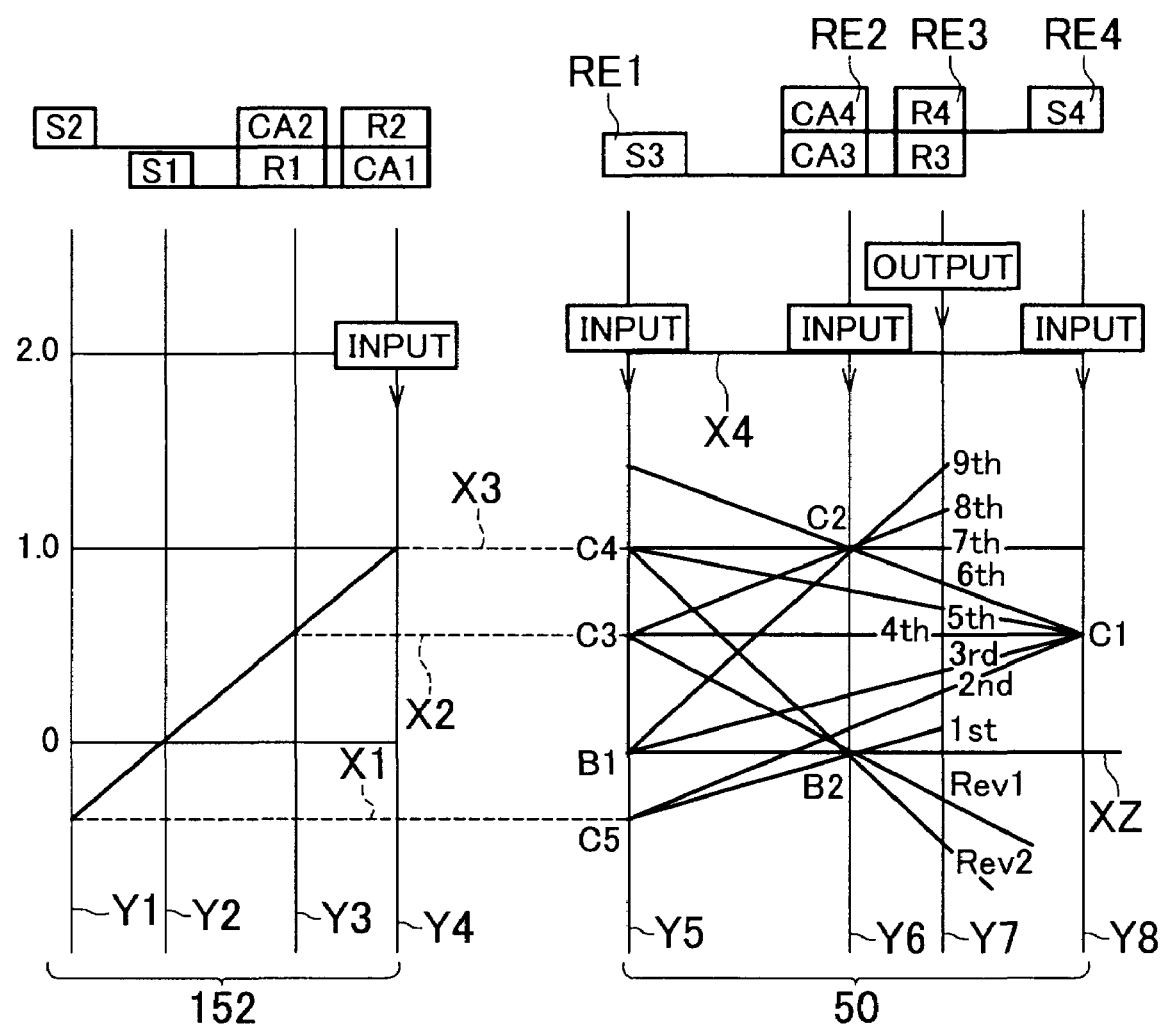

FIG. 103

| | C1 | C2 | C3 | C4 | C5 | B1 | B2 | GEAR RATIO | STEP |
|---|---|---|---|---|---|---|---|---|---|
| 1st | O | | | | O | | | 4.503 | |
| | | | | | | | | | 1.656 |
| 2nd | O | | | | | O | | 2.720 | |
| | | | | | | | | | 1.360 |
| 3rd | O | | O | | | | | 2.000 | |
| | | | | | | | | | 1.265 |
| 4th | O | | | O | | | | 1.581 | |
| | | | | | | | | | 1.201 |
| 5th | O | O | | | | | | 1.316 | |
| | | | | | | | | | 1.316 |
| 6th | | O | | O | | | | 1.000 | |
| | | | | | | | | | 1.250 |
| 7th | | O | O | | | | | 0.800 | |
| | | | | | | | | | 1.200 |
| 8th | | O | | | | O | | 0.667 | |
| | | | | | | | | | 1.183 |
| 9th | | O | | | O | | | 0.563 | |
| R1 | | | O | | | | O | 4.000 | TOTAL GEAR RATIO RANGE 7.993 |
| R2 | | | | O | | | O | 2.000 | |

O ENGAGED

FIG. 106

| | C1 | C2 | C3 | C4 | C5 | B1 | B2 | GEAR RATIO | STEP |
|---|---|---|---|---|---|---|---|---|---|
| 1st | O | | | | | | O | 5.283 | 1.466 |
| 2nd | O | | | | O | | | 3.605 | 1.458 |
| 3rd | O | | | | | O | | 2.472 | 1.304 |
| 4th | O | | O | | | | | 1.897 | 1.209 |
| 5th | O | | | O | | | | 1.569 | 1.303 |
| 6th | O | O | | | | | | 1.204 | 1.204 |
| 7th | | O | | O | | | | 1.000 | 1.097 |
| 8th | | O | O | | | | | 0.912 | 1.098 |
| 9th | | O | | | | O | | 0.830 | 1.093 |
| 10th | | O | | | O | | | 0.760 | TOTAL GEAR RATIO RANGE 6.956 |
| R1 | | | O | | | | O | 9.257 | |
| R2 | | | | O | | | O | 4.881 | |

O ENGAGED

FIG. 107

|     | C1 | C2 | C3 | C4 | C5 | B1 | B2 | GEAR RATIO | STEP |
|-----|----|----|----|----|----|----|----|------------|------|
| 1st | O  |    |    |    |    |    | O  | 5.690      | 1.542 |
| 2nd | O  |    |    |    | O  |    |    | 3.689      | 1.480 |
| 3rd | O  |    |    |    |    | O  |    | 2.492      | 1.314 |
| 4th | O  |    | O  |    |    |    |    | 1.897      | 1.214 |
| 5th | O  |    |    | O  |    |    |    | 1.562      | 1.316 |
| 6th | O  | O  |    |    |    |    |    | 1.187      | 1.187 |
| 7th |    | O  |    | O  |    |    |    | 1.000      | 1.088 |
| 8th |    | O  | O  |    |    |    |    | 0.919      | 1.090 |
| 9th |    | O  |    |    |    | O  |    | 0.843      | 1.086 |
| 10th|    | O  |    |    | O  |    |    | 0.777      | TOTAL GEAR RATIO RANGE 7.326 |
| R1  |    |    | O  |    |    |    | O  | 10.194     | |
| R2  |    |    |    | O  |    |    | O  | 5.375      | |

O ENGAGED

F I G . 109

|  | C1 | C2 | C3 | C4 | C5 | B1 | B2 | GEAR RATIO | STEP |
|---|---|---|---|---|---|---|---|---|---|
| 1st | ○ |  |  |  |  |  | ○ | 5.690 | 1.542 |
| 2nd | ○ |  |  |  | ○ |  |  | 3.689 | 1.480 |
| 3rd | ○ |  |  |  |  | ○ |  | 2.492 | 1.314 |
| 4th | ○ | ○ |  |  |  |  |  | 1.897 | 1.214 |
| 5th | ○ |  |  | ○ |  |  |  | 1.562 | 1.316 |
| 6th | ○ | ○ |  |  |  |  |  | 1.187 | 1.187 |
| 7th |  | ○ |  | ○ |  |  |  | 1.000 | 1.088 |
| 8th |  | ○ | ○ |  |  |  |  | 0.919 | 1.090 |
| 9th |  | ○ |  |  |  | ○ |  | 0.843 | TOTAL GEAR RATIO RANGE 6.748 |
| R1 |  |  | ○ |  |  |  | ○ | 10.194 | |
| R2 |  |  |  | ○ |  |  | ○ | 5.375 | |

○ ENGAGED

FIG. 111

| | C1 | C2 | C3 | C4 | C5 | B1 | B2 | GEAR RATIO | STEP |
|---|---|---|---|---|---|---|---|---|---|
| 1st | | | | | ○ | | ○ | 9.854 | |
| | | | | | | | | | 1.732 |
| 2nd | ○ | | | | | | ○ | 5.690 | |
| | | | | | | | | | 1.542 |
| 3rd | ○ | | | ○ | | | | 3.689 | |
| | | | | | | | | | 1.480 |
| 4th | ○ | | | | ○ | | | 2.492 | |
| | | | | | | | | | 1.314 |
| 5th | ○ | | ○ | | | | | 1.897 | |
| | | | | | | | | | 1.214 |
| 6th | ○ | | | ○ | | | | 1.562 | |
| | | | | | | | | | 1.316 |
| 7th | ○ | ○ | | | | | | 1.187 | |
| | | | | | | | | | 1.187 |
| 8th | | ○ | | ○ | | | | 1.000 | |
| | | | | | | | | | 1.088 |
| 9th | | ○ | ○ | | | | | 0.919 | |
| | | | | | | | | | 1.090 |
| 10th | | ○ | | | ○ | | | 0.843 | |
| | | | | | | | | | 1.086 |
| 11th | | ○ | | ○ | | | | 0.777 | |
| R1 | | | ○ | | | | ○ | 10.194 | TOTAL GEAR RATIO RANGE 12.688 |
| R2 | | | | ○ | | | ○ | 5.375 | |

○ ENGAGED

FIG. 114

| | C1 | C2 | C3 | C4 | C5 | B1 | B2 | GEAR RATIO | STEP |
|---|---|---|---|---|---|---|---|---|---|
| 1st | O | | | | | | O | 5.283 | |
| | | | | | | | | | 1.466 |
| 2nd | O | | | | O | | | 3.605 | |
| | | | | | | | | | 1.458 |
| 3rd | O | | | | | O | | 2.472 | |
| | | | | | | | | | 1.304 |
| 4th | O | | O | | | | | 1.897 | |
| | | | | | | | | | 1.209 |
| 5th | O | | | O | | | | 1.569 | |
| | | | | | | | | | 1.303 |
| 6th | O | O | | | | | | 1.024 | |
| | | | | | | | | | 1.204 |
| 7th | | O | | O | | | | 1.000 | |
| | | | | | | | | | 1.097 |
| 8th | | O | O | | | | | 0.912 | |
| | | | | | | | | | 1.098 |
| 9th | | O | | | | O | | 0.830 | |
| | | | | | | | | | 1.093 |
| 10th | | O | | | O | | | 0.760 | |
| R1 | | | O | | | | O | 9.257 | TOTAL GEAR RATIO RANGE 6.956 |
| R2 | | | | O | | | O | 4.881 | |

O ENGAGED

FIG. 115

| | C1 | C2 | C3 | C4 | C5 | B1 | B2 | GEAR RATIO | STEP |
|---|---|---|---|---|---|---|---|---|---|
| 1st | O | | | | | | O | 5.690 | 1.542 |
| 2nd | O | | | O | | | | 3.689 | 1.480 |
| 3rd | O | | | | | O | | 2.492 | 1.314 |
| 4th | O | | O | | | | | 1.897 | 1.214 |
| 5th | O | | | | O | | | 1.562 | 1.316 |
| 6th | O | O | | | | | | 1.187 | 1.187 |
| 7th | | O | | | O | | | 1.000 | 1.088 |
| 8th | | O | O | | | | | 0.919 | 1.090 |
| 9th | | O | | | | O | | 0.843 | 1.086 |
| 10th | | O | | | O | | | 0.777 | TOTAL GEAR RATIO RANGE 7.326 |
| R1 | | | O | | | | O | 10.194 | |
| R2 | | | | O | | | O | 5.375 | |

O ENGAGED

FIG. 117

| | C1 | C2 | C3 | C4 | C5 | B1 | B2 | GEAR RATIO | STEP |
|---|---|---|---|---|---|---|---|---|---|
| 1st | O | | | | | | O | 5.690 | |
| | | | | | | | | | 1.542 |
| 2nd | O | | | | O | | | 3.689 | |
| | | | | | | | | | 1.480 |
| 3rd | O | | | | | O | | 2.492 | |
| | | | | | | | | | 1.314 |
| 4th | O | | O | | | | | 1.897 | |
| | | | | | | | | | 1.214 |
| 5th | O | | | O | | | | 1.562 | |
| | | | | | | | | | 1.316 |
| 6th | O | O | | | | | | 1.187 | |
| | | | | | | | | | 1.187 |
| 7th | | O | | O | | | | 1.000 | |
| | | | | | | | | | 1.088 |
| 8th | | O | O | | | | | 0.919 | |
| | | | | | | | | | 1.090 |
| 9th | | O | | | | O | | 0.843 | |
| R1 | | | O | | | | O | 10.194 | TOTAL GEAR RATIO RANGE 6.748 |
| R2 | | | | O | | | O | 5.375 | |

O ENGAGED

FIG. 120

| | C1 | C2 | C3 | C4 | C5 | B1 | B2 | GEAR RATIO | STEP |
|---|---|---|---|---|---|---|---|---|---|
| 1st | | | | | ○ | | ○ | 9.854 | 1.732 |
| 2nd | ○ | | | | | | ○ | 5.690 | 1.542 |
| 3rd | ○ | | | | ○ | | | 3.689 | 1.480 |
| 4th | ○ | | | | | ○ | | 2.492 | 1.314 |
| 5th | ○ | | ○ | | | | | 1.897 | 1.214 |
| 6th | ○ | | | ○ | | | | 1.562 | 1.316 |
| 7th | ○ | ○ | | | | | | 1.187 | 1.187 |
| 8th | | ○ | | ○ | | | | 1.000 | 1.088 |
| 9th | | ○ | ○ | | | | | 0.919 | 1.090 |
| 10th | | ○ | | | | ○ | | 0.843 | 1.086 |
| 11th | | ○ | | | ○ | | | 0.777 | TOTAL GEAR RATIO RANGE 12.688 |
| R1 | | | ○ | | | | ○ | 10.194 | |
| R2 | | | | ○ | | | ○ | 5.375 | |

○ ENGAGED

FIG. 123

|     | C1 | C2 | C3 | C4 | C5 | B1 | B2 | GEAR RATIO | STEP |
|-----|----|----|----|----|----|----|----|------------|------|
| 1st |    |    |    |    | O  |    | O  | 4.971 | |
|     |    |    |    |    |    |    |    |       | 1.511 |
| 2nd | O  |    |    |    |    |    | O  | 3.290 | |
|     |    |    |    |    |    |    |    |       | 1.481 |
| 3rd | O  |    |    |    |    | O  |    | 2.222 | |
|     |    |    |    |    |    |    |    |       | 1.351 |
| 4th | O  |    | O  |    |    |    |    | 1.645 | |
|     |    |    |    |    |    |    |    |       | 1.167 |
| 5th | O  |    |    |    | O  |    |    | 1.409 | |
|     |    |    |    |    |    |    |    |       | 1.133 |
| 6th | O  | O  |    |    |    |    |    | 1.244 | |
|     |    |    |    |    |    |    |    |       | 1.244 |
| 7th |    | O  |    |    | O  |    |    | 1.000 | |
|     |    |    |    |    |    |    |    |       | 1.212 |
| 8th |    | O  | O  |    |    |    |    | 0.825 | |
|     |    |    |    |    |    |    |    |       | 1.271 |
| 9th |    | O  |    |    |    | O  |    | 0.649 | |
|     |    |    |    |    |    |    |    |       | 1.131 |
| 10th |   | O  |    | O  |    |    |    | 0.574 | |
|     |    |    |    |    |    |    |    |       | TOTAL GEAR RATIO RANGE 8.655 |
| R1  |    |    | O  |    |    |    | O  | 3.047 | |
| R2  |    |    |    | O  |    |    | O  | 1.852 | |

O ENGAGED

FIG. 126

| | C1 | C2 | C3 | C4 | C5 | B1 | B2 | GEAR RATIO | STEP |
|---|---|---|---|---|---|---|---|---|---|
| 1st | | | | | ○ | | ○ | 4.971 | 1.511 |
| 2nd | ○ | | | | | | ○ | 3.290 | 1.481 |
| 3rd | ○ | | | | | ○ | | 2.222 | 1.351 |
| 4th | ○ | | | ○ | | | | 1.645 | 1.167 |
| 5th | ○ | | | | ○ | | | 1.409 | 1.133 |
| 6th | ○ | ○ | | | | | | 1.244 | 1.244 |
| 7th | | ○ | | ○ | | | | 1.000 | 1.212 |
| 8th | | ○ | ○ | | | | | 0.825 | 1.271 |
| 9th | | ○ | | | | ○ | | 0.649 | 1.131 |
| 10th | | ○ | | | ○ | | | 0.574 | TOTAL GEAR RATIO RANGE 8.655 |
| R1 | | | ○ | | | | ○ | 3.047 | |
| R2 | | | | ○ | | | ○ | 1.852 | |

○ENGAGED

FIG.129

| | C1 | C2 | C3 | C4 | C5 | B1 | B2 | GEAR RATIO | STEP |
|---|---|---|---|---|---|---|---|---|---|
| 1st | | | | | ○ | | ○ | 4.971 | 1.511 |
| 2nd | ○ | | | | | | ○ | 3.290 | 1.481 |
| 3rd | ○ | | | | | ○ | | 2.222 | 1.351 |
| 4th | ○ | | ○ | | | | | 1.645 | 1.167 |
| 5th | ○ | | | ○ | | | | 1.409 | 1.133 |
| 6th | ○ | ○ | | | | | | 1.244 | 1.244 |
| 7th | | ○ | | ○ | | | | 1.000 | 1.212 |
| 8th | | ○ | ○ | | | | | 0.825 | 1.271 |
| 9th | | ○ | | | | ○ | | 0.649 | 1.131 |
| 10th | | ○ | | | ○ | | | 0.574 | TOTAL GEAR RATIO RANGE 8.655 |
| R1 | | | ○ | | | | ○ | 3.047 | |
| R2 | | | | ○ | | | ○ | 1.852 | |

○ ENGAGED

FIG. 132

|  | C1 | C2 | C3 | C4 | C5 | B1 | B2 | GEAR RATIO | STEP |
|---|---|---|---|---|---|---|---|---|---|
| 1st |  |  |  |  | O |  | O | 4.971 | 1.511 |
| 2nd | O |  |  |  |  |  | O | 3.290 | 1.481 |
| 3rd | O |  |  |  |  | O |  | 2.222 | 1.351 |
| 4th | O |  | O |  |  |  |  | 1.645 | 1.167 |
| 5th | O |  |  | O |  |  |  | 1.409 | 1.133 |
| 6th | O | O |  |  |  |  |  | 1.244 | 1.244 |
| 7th |  | O |  | O |  |  |  | 1.000 | 1.212 |
| 8th |  | O | O |  |  |  |  | 0.825 | 1.271 |
| 9th |  | O |  |  | O |  |  | 0.649 | 1.131 |
| 10th |  | O |  |  | O |  |  | 0.574 | TOTAL GEAR RATIO RANGE 8.655 |
| R1 |  |  | O |  |  |  | O | 3.047 |  |
| R2 |  |  |  | O |  |  | O | 1.852 |  |

O ENGAGED

FIG. 135

|  | C1 | C2 | C3 | C4 | C5 | B1 | B2 | GEAR RATIO | STEP |
|---|---|---|---|---|---|---|---|---|---|
| 1st | ○ |  |  |  | ○ |  |  | 5.971 | |
| | | | | | | | | | 1.578 |
| 2nd | ○ |  |  |  |  |  | ○ | 3.783 | |
| | | | | | | | | | 1.508 |
| 3rd | ○ |  |  |  |  | ○ |  | 2.509 | |
| | | | | | | | | | 1.408 |
| 4th | ○ |  | ○ |  |  |  |  | 1.782 | |
| | | | | | | | | | 1.227 |
| 5th | ○ |  |  | ○ |  |  |  | 1.452 | |
| | | | | | | | | | 1.152 |
| 6th | ○ | ○ |  |  |  |  |  | 1.260 | |
| | | | | | | | | | 1.260 |
| 7th |  | ○ |  | ○ |  |  |  | 1.000 | |
| | | | | | | | | | 1.251 |
| 8th |  | ○ | ○ |  |  |  |  | 0.800 | |
| | | | | | | | | | 1.256 |
| 9th |  | ○ |  |  |  | ○ |  | 0.636 | |
| | | | | | | | | | 1.290 |
| 10th |  | ○ |  |  | ○ |  |  | 0.493 | |
| R1 |  |  | ○ |  |  |  | ○ | 3.118 | TOTAL GEAR RATIO RANGE 12.101 |
| R2 |  |  |  | ○ |  |  | ○ | 1.750 | |

○ ENGAGED

FIG. 138

| | C1 | C2 | C3 | C4 | C5 | B1 | B2 | GEAR RATIO | STEP |
|---|---|---|---|---|---|---|---|---|---|
| 1st | O | | | | O | | | 5.971 | 1.578 |
| 2nd | O | | | | | | O | 3.783 | 1.508 |
| 3rd | O | | | | | O | | 2.509 | 1.408 |
| 4th | O | | O | | | | | 1.782 | 1.227 |
| 5th | O | | | O | | | | 1.452 | 1.152 |
| 6th | O | O | | | | | | 1.260 | 1.260 |
| 7th | | O | | O | | | | 1.000 | 1.251 |
| 8th | | O | O | | | | | 0.800 | 1.256 |
| 9th | | O | | | O | | | 0.636 | 1.290 |
| 10th | | O | | | O | | | 0.493 | TOTAL GEAR RATIO RANGE 12.101 |
| R1 | | | O | | | | O | 3.118 | |
| R2 | | | | O | | | O | 1.750 | |

O ENGAGED

FIG. 141

| | C1 | C2 | C3 | C4 | C5 | B1 | B2 | GEAR RATIO | STEP |
|---|---|---|---|---|---|---|---|---|---|
| 1st | | | | | ○ | | ○ | 4.549 | |
| 2nd | ○ | | | | ○ | | | 2.924 | 1.556 |
| 3rd | ○ | | | | | ○ | | 2.233 | 1.309 |
| 4th | ○ | | ○ | | | | | 1.645 | 1.351 |
| 5th | ○ | | | ○ | | | | 1.414 | 1.170 |
| 6th | ○ | ○ | | | | | | 1.246 | 1.134 |
| 7th | | ○ | | ○ | | | | 1.000 | 1.246 |
| 8th | | ○ | ○ | | | | | 0.824 | 1.213 |
| 9th | | ○ | | | | ○ | | 0.649 | 1.246 |
| R1 | | | ○ | | | | ○ | 3.062 | TOTAL GEAR RATIO RANGE 7.005 |
| R2 | | | | ○ | | | ○ | 1.852 | |

○ ENGAGED

FIG. 143

| | C1 | C2 | C3 | C4 | C5 | B1 | B2 | GEAR RATIO | STEP |
|---|---|---|---|---|---|---|---|---|---|
| 1st | | | | | ○ | | ○ | 4.549 | |
| | | | | | | | | | 1.556 |
| 2nd | ○ | | | | ○ | | | 2.924 | |
| | | | | | | | | | 1.309 |
| 3rd | ○ | | | | | ○ | | 2.233 | |
| | | | | | | | | | 1.351 |
| 4th | ○ | | ○ | | | | | 1.645 | |
| | | | | | | | | | 1.170 |
| 5th | ○ | | | ○ | | | | 1.414 | |
| | | | | | | | | | 1.134 |
| 6th | ○ | ○ | | | | | | 1.246 | |
| | | | | | | | | | 1.246 |
| 7th | | ○ | | ○ | | | | 1.000 | |
| | | | | | | | | | 1.213 |
| 8th | | ○ | ○ | | | | | 0.824 | |
| | | | | | | | | | 1.246 |
| 9th | | ○ | | | | ○ | | 0.649 | |
| | | | | | | | | | 1.143 |
| 10th | | ○ | | | ○ | | | 0.568 | |
| R1 | | | ○ | | | | ○ | 3.062 | TOTAL GEAR RATIO RANGE 8.005 |
| R2 | | | | ○ | | | ○ | 1.852 | |

○ENGAGED

FIG. 146

|  | C1 | C2 | C3 | C4 | C5 | B1 | B2 | GEAR RATIO | STEP |
|---|---|---|---|---|---|---|---|---|---|
| 1st | ◯ |  |  |  | ◯ |  |  | 4.503 | |
| | | | | | | | | | 1.656 |
| 2nd | ◯ |  |  |  |  | ◯ |  | 2.720 | |
| | | | | | | | | | 1.360 |
| 3rd | ◯ |  | ◯ |  |  |  |  | 2.000 | |
| | | | | | | | | | 1.265 |
| 4th | ◯ |  |  | ◯ |  |  |  | 1.581 | |
| | | | | | | | | | 1.201 |
| 5th | ◯ | ◯ |  |  |  |  |  | 1.316 | |
| | | | | | | | | | 1.316 |
| 6th |  | ◯ |  | ◯ |  |  |  | 1.000 | |
| | | | | | | | | | 1.250 |
| 7th |  | ◯ | ◯ |  |  |  |  | 0.800 | |
| | | | | | | | | | 1.200 |
| 8th |  | ◯ |  |  | ◯ |  |  | 0.667 | |
| | | | | | | | | | 1.183 |
| 9th |  | ◯ |  | ◯ |  |  |  | 0.563 | |
| R1 |  |  | ◯ |  |  |  | ◯ | 4.000 | TOTAL GEAR RATIO RANGE 7.993 |
| R2 |  |  |  | ◯ |  |  | ◯ | 2.000 | |

◯ ENGAGED

FIG. 149

| | C1 | C2 | C3 | C4 | C5 | B1 | B2 | GEAR RATIO | STEP |
|---|---|---|---|---|---|---|---|---|---|
| 1st | | | | | ○ | | ○ | 5.128 | 1.676 |
| 2nd | ○ | | | | | | ○ | 3.601 | 1.594 |
| 3rd | ○ | | | | ○ | | | 3.060 | 1.354 |
| 4th | ○ | | | | | ○ | | 2.259 | 1.333 |
| 5th | ○ | | ○ | | | | | 1.694 | 1.174 |
| 6th | ○ | | | ○ | | | | 1.444 | 1.165 |
| 7th | ○ | ○ | | | | | | 1.239 | 1.239 |
| 8th | | ○ | | ○ | | | | 1.000 | 1.173 |
| 9th | | ○ | ○ | | | | | 0.853 | 1.212 |
| 10th | | ○ | | | ○ | | | 0.704 | 1.137 |
| 11th | | ○ | | ○ | | | | 0.619 | TOTAL GEAR RATIO RANGE 8.288 |
| R1 | | | ○ | | | | ○ | 4.024 | |
| R2 | | | | ○ | | | ○ | 2.375 | |

○ ENGAGED

FIG. 152

| | C1 | C2 | C3 | C4 | C5 | B1 | B2 | GEAR RATIO | STEP |
|---|---|---|---|---|---|---|---|---|---|
| 1st | | | | | ◯ | | ◯ | 5.128 | 1.676 |
| 2nd | ◯ | | | | | | ◯ | 3.601 | 1.594 |
| 3rd | ◯ | | | ◯ | | | | 3.060 | 1.354 |
| 4th | ◯ | | | | | ◯ | | 2.259 | 1.333 |
| 5th | ◯ | | ◯ | | | | | 1.694 | 1.174 |
| 6th | ◯ | | | ◯ | | | | 1.444 | 1.165 |
| 7th | ◯ | ◯ | | | | | | 1.239 | 1.239 |
| 8th | | ◯ | | ◯ | | | | 1.000 | 1.173 |
| 9th | | ◯ | ◯ | | | | | 0.853 | 1.212 |
| 10th | | ◯ | | | ◯ | | | 0.704 | 1.137 |
| 11th | | ◯ | | | ◯ | | | 0.619 | TOTAL GEAR RATIO RANGE 8.288 |
| R1 | | | ◯ | | | | ◯ | 4.024 | |
| R2 | | | | ◯ | | | ◯ | 2.375 | |

◯ ENGAGED

FIG. 154

| | C1 | C2 | C3 | C4 | C5 | B1 | B2 | GEAR RATIO | STEP |
|---|---|---|---|---|---|---|---|---|---|
| 1st | O | | | | O | | | 4.298 | |
| | | | | | | | | | 1.087 |
| 2nd | O | | | | | | O | 3.954 | |
| | | | | | | | | | 1.545 |
| 3rd | O | | | | | O | | 2.559 | |
| | | | | | | | | | 1.374 |
| 4th | O | | O | | | | | 1.862 | |
| | | | | | | | | | 1.235 |
| 5th | O | | | O | | | | 1.508 | |
| | | | | | | | | | 1.179 |
| 6th | O | O | | | | | | 1.279 | |
| | | | | | | | | | 1.279 |
| 7th | | O | | O | | | | 1.000 | |
| | | | | | | | | | 1.232 |
| 8th | | O | O | | | | | 0.812 | |
| | | | | | | | | | 1.218 |
| 9th | | O | | | | O | | 0.667 | |
| | | | | | | | | | 1.193 |
| 10th | | O | | | O | | | 0.559 | |
| R1 | | | O | | | | O | 3.724 | TOTAL GEAR RATIO RANGE 7.693 |
| R2 | | | | O | | | O | 2.000 | |

O ENGAGED

FIG. 157

| | C1 | C2 | C3 | C4 | C5 | B1 | B2 | GEAR RATIO | STEP |
|---|---|---|---|---|---|---|---|---|---|
| 1st | | | | | ○ | | ○ | 5.128 | 1.676 |
| 2nd | ○ | | | | | | ○ | 3.601 | 1.594 |
| 3rd | ○ | | | | ○ | | | 3.060 | 1.354 |
| 4th | ○ | | | | | ○ | | 2.259 | 1.333 |
| 5th | ○ | | ○ | | | | | 1.694 | 1.174 |
| 6th | ○ | | | ○ | | | | 1.444 | 1.165 |
| 7th | ○ | ○ | | | | | | 1.239 | 1.239 |
| 8th | | ○ | | ○ | | | | 1.000 | 1.173 |
| 9th | | ○ | ○ | | | | | 0.853 | 1.212 |
| 10th | | ○ | | | | ○ | | 0.704 | 1.137 |
| 11th | | ○ | | | ○ | | | 0.619 | TOTAL GEAR RATIO RANGE 8.288 |
| R1 | | | ○ | | | | ○ | 4.024 | |
| R2 | | | | ○ | | | ○ | 2.375 | |

○ENGAGED

F I G . 159

| | C1 | C2 | C3 | C4 | C5 | B1 | B2 | GEAR RATIO | STEP |
|---|---|---|---|---|---|---|---|---|---|
| 1st | O | | | | O | | | 4.298 | |
| | | | | | | | | | 1.087 |
| 2nd | O | | | | | | O | 3.954 | |
| | | | | | | | | | 1.545 |
| 3rd | O | | | | | O | | 2.559 | |
| | | | | | | | | | 1.374 |
| 4th | O | | O | | | | | 1.862 | |
| | | | | | | | | | 1.235 |
| 5th | O | | | O | | | | 1.508 | |
| | | | | | | | | | 1.179 |
| 6th | O | O | | | | | | 1.279 | |
| | | | | | | | | | 1.279 |
| 7th | | O | | O | | | | 1.000 | |
| | | | | | | | | | 1.232 |
| 8th | | O | O | | | | | 0.812 | |
| | | | | | | | | | 1.218 |
| 9th | | O | | | O | | | 0.667 | |
| | | | | | | | | | 1.193 |
| 10th | | O | | | O | | | 0.559 | |
| R1 | | | O | | | | O | 3.724 | TOTAL GEAR RATIO RANGE 7.693 |
| R2 | | | | O | | | O | 2.000 | |

O ENGAGED

FIG. 162

| | C1 | C2 | C3 | C4 | C5 | B1 | B2 | GEAR RATIO | STEP |
|---|---|---|---|---|---|---|---|---|---|
| 1st | | | | | ○ | | ○ | 5.128 | 1.676 |
| 2nd | ○ | | | | | | ○ | 3.601 | 1.594 |
| 3rd | ○ | | | ○ | | | | 3.060 | 1.354 |
| 4th | ○ | | | | | ○ | | 2.259 | 1.333 |
| 5th | ○ | | ○ | | | | | 1.694 | 1.174 |
| 6th | ○ | | | ○ | | | | 1.444 | 1.165 |
| 7th | ○ | ○ | | | | | | 1.239 | 1.239 |
| 8th | | ○ | | ○ | | | | 1.000 | 1.173 |
| 9th | | ○ | ○ | | | | | 0.853 | 1.212 |
| 10th | | ○ | | | | ○ | | 0.704 | 1.137 |
| 11th | | ○ | | ○ | | | | 0.619 | TOTAL GEAR RATIO RANGE 8.288 |
| R1 | | | ○ | | | | ○ | 4.024 | |
| R2 | | | | ○ | | | ○ | 2.375 | |

○ ENGAGED

MULTI-SPEED TRANSMISSION FOR VEHICLE

INCORPORATION BY REFERENCE

The disclosure of Japanese Patent Applications No. 2004-381497 filed on Dec. 28, 2004, No. 2005-127209 filed on Apr. 25, 2005, No. 2005-177052 filed on Jun. 16, 2005, and No. 2005-244282 filed on Aug. 25, 2005, including the specifications, drawings and abstracts is incorporated herein by reference in its entirety.

BACKGROUND OF THE INVENTION

1. Field of the Invention

This invention relates to a multi-speed transmission for a vehicle, which is provided between a prime mover and a driven wheel in a vehicle such as an automobile.

2. Description of the Related Art

A vehicle is normally provided with a transmission between a primer mover and driven wheels. One such known transmission is a multi-speed transmission that is used to achieve a plurality of predetermined gear ratios or gears. Planetary gear type multi-speed transmissions which use a plurality of planetary gear sets and engagement elements such as clutches and brakes to engage the elements that form those planetary gear sets together are widely used. For example, Published Japanese National Phase Application No. 2003-514195, JP(A) 2002-206601, JP(A) 2002-213545, JP(A) 2002-227940, JP(A) 2002-266956, and JP(A) 2002-295609 propose a multi-speed transmission which has a first transmitting portion which includes two front planetary gear sets and a second transmitting portion which includes two rear planetary gear sets and can achieve multiple speeds of seven or more forward gears. In particular, the multi-speed transmission disclosed in Published Japanese National Phase Application No. 2003-514195 has two non-switchable front planetary gear sets and a plurality of engagement elements, and is able to achieve at least seven forward speeds (i.e., gears) by selectively engaging those engagement elements.

When further increasing the number of speeds (i.e., gears) of the multi-speed transmission for a vehicle, it is desirable that the gear ratio steps (i.e., the change ratio of the gear ratios of consecutive gears) be equal or near thereto. With this kind of conventional multi-speed transmission, however, the gear ratio steps of the gears are not always good. For example, as illustrated in FIG. 1(B) of Published Japanese National Phase Application No. 2003-514195, the gear ratio step between first gear and second gear is 1.86, which is a large step. There is also a fair amount of variation in the sizes of the gear ratio steps, which is undesirable. There has therefore been a need for the development of a multi-speed transmission for a vehicle that can achieve multiple speeds (i.e., gears) while maintaining good balance among the gear ratio steps between gears.

SUMMARY OF THE INVENTION

In view of the foregoing circumstances, this invention thus provides a multi-speed transmission for a vehicle, which can achieve multiple speeds (hereinafter also referred to as "gears") while maintaining good balance among the gear ratio steps between gears.

Thus, one aspect of this invention relates to providing a multi-speed transmission for a vehicle, which includes an input rotating member; an output rotating member; a first transmitting portion which has a first intermediate output member which slows and transmits rotation from the input rotating member, and a second intermediate output member which reverses and transmits rotation from the input rotating member; a second transmitting portion which includes four rotating elements formed by some sun gears, carriers, and ring gears of two planetary gear sets being connected together, and which transmits rotation to the output rotating member; a first clutch element which selectively connects the first intermediate output member and the fourth rotating element together; a second clutch element which selectively connects the input rotating member and the second rotating element together; a third clutch element which selectively connects the first intermediate output member and the first rotating element together; a fourth clutch element which selectively connects the input rotating member and the first rotating element together; a fifth clutch element which selectively connects the second intermediate output member and the first rotating element together; a first brake element which selectively holds the first rotating element to a non-rotating member; and a second brake element which selectively holds the second rotating element to the non-rotating member when the four rotating elements are the first rotating element, the second rotating element, the third rotating element, and the fourth rotating element in order from one end to the other end on an alignment graph in which the rotation speeds of the four rotating elements can be expressed with straight lines.

Accordingly, providing the first transmitting portion and the second transmitting portion makes it possible to provide a multi-speed transmission for a vehicle, which can realize multiple speeds (i.e., gears) while maintaining good balance among gear ratio steps between gears.

Here, it is also preferable that a first gear be established by engaging the first clutch element and the second brake element; a second gear be established by engaging the first clutch element and the first brake element; a third gear be established by engaging the first clutch element and the third clutch element; a fourth gear be established by engaging the first clutch element and the fourth clutch element; a fifth gear be established by engaging the first clutch element and the second clutch element; a sixth gear be established by engaging the second clutch element and the fourth clutch element; a seventh gear be established by engaging the second clutch element and the third clutch element; an eighth gear be established by engaging the second clutch element and the first brake element; and a ninth gear be established by engaging the second clutch element and the fifth clutch element. Accordingly, in addition to being able to achieve nine forward gears, the step between eighth gear and ninth gear is able to be preferably set relatively small with a close ratio.

Further, it is also preferable that a first gear be established by engaging the first clutch element and the fifth clutch element; a second gear be established by engaging the first clutch element and the first brake element; a third gear be established by engaging the first clutch element and the third clutch element; a fourth gear be established by engaging the first clutch element and the fourth clutch element; a fifth gear be established by engaging the first clutch element and the second clutch element; a sixth gear be established by engaging the second clutch element and the fourth clutch element; a seventh gear be established by engaging the second clutch element and the third clutch element; an eighth gear be established by engaging the second clutch element and the first brake element; and a ninth gear be established by engaging the second clutch element and the fifth clutch element. Accordingly, in addition to being able to achieve nine forward gears, the step between eighth gear and ninth gear is able to be preferably set relatively small with a close ratio.

It is also preferable that a first gear be established by engaging the fifth clutch element and the second brake element; a second gear be established by engaging the first clutch element and the first brake element; a third gear be established by engaging the first clutch element and the third clutch element; a fourth gear be established by engaging the first clutch element and the fourth clutch element; a fifth gear be established by engaging the first clutch element and the second clutch element; a sixth gear be established by engaging the second clutch element and the fourth clutch element; a seventh gear be established by engaging the second clutch element and the third clutch element; an eighth gear be established by engaging the second clutch element and the first brake element; and a ninth gear be established by engaging the second clutch element and the fifth clutch element. Accordingly, in addition to being able to achieve nine forward gears, the step between eighth gear and ninth gear is able to be preferably set relatively small with a close ratio.

It is also preferable that a first gear be established by engaging the fifth clutch element and the second brake element; a second gear be established by engaging the first clutch element and the second brake element; a third gear be established by engaging the first clutch element and the first brake element; a fourth gear be established by engaging the first clutch element and the third clutch element; a fifth gear be established by engaging the first clutch element and the fourth clutch element; a sixth gear be established by engaging the first clutch element and the second clutch element; a seventh gear be established by engaging the second clutch element and the fourth clutch element; an eighth gear be established by engaging the second clutch element and the third clutch element; and a ninth gear be established by engaging the second clutch element and the first brake element. Accordingly, in addition to being able to achieve nine forward gears, the step between eighth gear and ninth gear is able to be preferably set relatively small with a close ratio.

It is also preferable that a first gear be established by engaging the first clutch element and the second brake element; a second gear be established by engaging the first clutch element and the fifth clutch element; a third gear be established by engaging the first clutch element and the first brake element; a fourth gear be established by engaging the first clutch element and the third clutch element; a fifth gear be established by engaging the first clutch element and the fourth clutch element; a sixth gear be established by engaging the first clutch element and the second clutch element; a seventh gear be established by engaging the second clutch element and the fourth clutch element; an eighth gear be established by engaging the second clutch element and the third clutch element; and a ninth gear be established by engaging the second clutch element and the first brake element. Accordingly, in addition to being able to achieve nine forward gears, the step between eighth gear and ninth gear is able to be preferably set relatively small with a close ratio.

It is also preferable that a first gear be established by engaging the fifth clutch element and the second brake element; a second gear be established by engaging the first clutch element and the fifth clutch element; a third gear be established by engaging the first clutch element and the first brake element; a fourth gear be established by engaging the first clutch element and the third clutch element; a fifth gear be established by engaging the first clutch element and the fourth clutch element; a sixth gear be established by engaging the first clutch element and the second clutch element; a seventh gear be established by engaging the second clutch element and the fourth clutch element; an eighth gear be established by engaging the second clutch element and the third clutch element; and a ninth gear be established by engaging the second clutch element and the first brake element. Accordingly, in addition to being able to achieve nine forward gears, the step between eighth gear and ninth gear is able to be preferably set relatively small with a close ratio.

It is also preferable that a first gear be established by engaging the first clutch element and the fifth clutch element; a second gear be established by engaging the first clutch element and the second brake element; a third gear be established by engaging the first clutch element and the first brake element; a fourth gear be established by engaging the first clutch element and the third clutch element; a fifth gear be established by engaging the first clutch element and the fourth clutch element; a sixth gear be established by engaging the first clutch element and the second clutch element; a seventh gear be established by engaging the second clutch element and the fourth clutch element; an eighth gear be established by engaging the second clutch element and the third clutch element; a ninth gear be established by engaging the second clutch element and the first brake element; and a tenth gear be established by engaging the second clutch element and the fifth clutch element. Accordingly, in addition to being able to achieve ten forward gears, the step between ninth gear and tenth gear is able to be preferably set relatively small with a close ratio.

It is also preferable that a first gear be established by engaging the fifth clutch element and the second brake element; a second gear be established by engaging the first clutch element and the second brake element; a third gear be established by engaging the first clutch element and the first brake element; a fourth gear be established by engaging the first clutch element and the third clutch element; a fifth gear be established by engaging the first clutch element and the fourth clutch element; a sixth gear be established by engaging the first clutch element and the second clutch element; a seventh gear be established by engaging the second clutch element and the fourth clutch element; an eighth gear be established by engaging the second clutch element and the third clutch element; a ninth gear be established by engaging the second clutch element and the first brake element; and a tenth gear be established by engaging the second clutch element and the fifth clutch element. Accordingly, in addition to being able to achieve ten forward gears, the step between ninth gear and tenth gear is able to be preferably set relatively small with a close ratio.

It is also preferable that a first gear be established by engaging the first clutch element and the second brake element; a second gear be established by engaging the first clutch element and the fifth clutch element; a third gear be established by engaging the first clutch element and the first brake element; a fourth gear be established by engaging the first clutch element and the third clutch element; a fifth gear be established by engaging the first clutch element and the fourth clutch element; a sixth gear be established by engaging the first clutch element and the second clutch element; a seventh gear be established by engaging the second clutch element and the fourth clutch element; an eighth gear be established by engaging the second clutch element and the third clutch element; a ninth gear be established by engaging the second clutch element and the first brake element; and a tenth gear be established by engaging the second clutch element and the fifth clutch element. Accordingly, in addition to being able to achieve ten forward gears, the step between ninth gear and tenth gear is able to be preferably set relatively small with a close ratio.

It is also preferable that a first gear be established by engaging the fifth clutch element and the second brake element; a second gear be established by engaging the first clutch element and the fifth clutch element; a third gear be established by engaging the first clutch element and the first brake element; a fourth gear be established by engaging the first clutch element and the third clutch element; a fifth gear be established by engaging the first clutch element and the fourth clutch element; a sixth gear be established by engaging the first clutch element and the second clutch element; a seventh gear be established by engaging the second clutch element and the fourth clutch element; an eighth gear be established by engaging the second clutch element and the third clutch element; a ninth gear be established by engaging the second clutch element and the first brake element; and a tenth gear be established by engaging the second clutch element and the fifth clutch element. Accordingly, in addition to being able to achieve ten forward gears, the step between ninth gear and tenth gear is able to be preferably set relatively small with a close ratio.

It is also preferable that a first gear be established by engaging the fifth clutch element and the second brake element; a second gear be established by engaging the first clutch element and the second brake element; a third gear be established by engaging the first clutch element and the fifth clutch element; a fourth gear be established by engaging the first clutch element and the first brake element; a fifth gear be established by engaging the first clutch element and the third clutch element; a sixth gear be established by engaging the first clutch element and the fourth clutch element; a seventh gear be established by engaging the first clutch element and the second clutch element; an eighth gear be established by engaging the second clutch element and the fourth clutch element; a ninth gear be established by engaging the second clutch element and the third clutch element; a tenth gear be established by engaging the second clutch element and the first brake element; and an eleventh gear be established by engaging the second clutch element and the fifth clutch element. Accordingly, in addition to being able to achieve eleven forward gears, the steps between eighth gear and eleventh gear are able to be set relatively small with a close ratio. Further, first gear can be set extremely low.

It is also preferable that the first transmitting portion include a single pinion type first front planetary gear set and a double pinion type second front planetary gear set, in which a carrier of the first front planetary gear set and a sun gear of the second front planetary gear set are always connected to the non-rotating member, and a sun gear of the first front planetary gear set and a carrier of the second front planetary gear set are connected to the input rotating member, such that a ring gear of the second front planetary gear set functions as the first intermediate output member while a ring gear of the first front planetary gear set functions as the second intermediate output member. As a result, a practical multi-speed transmission for a vehicle is able to be provided.

It is also preferable that the first transmitting portion include a double pinion type first front planetary gear set and a single pinion type second front planetary gear set, in which a carrier of the first front planetary gear set is always connected to the non-rotating member, a ring gear of the first front planetary gear set and a carrier of the second front planetary gear set are connected together, and a sun gear of the first front planetary gear set and a ring gear of the second front planetary gear set are connected to the input rotating member, such that the ring gear of the first front planetary gear set or the carrier of the second front planetary gear set functions as the first intermediate output member while a sun gear of the second front planetary gear set functions as the second intermediate output member. As a result, a practical multi-speed transmission for a vehicle is able to be provided.

It is also preferable that the first transmitting portion include a double pinion type first front planetary gear set and a single pinion type second front planetary gear set, in which a sun gear of the first front planetary gear set is always connected to the non-rotating member, a ring gear of the first front planetary gear set and a carrier of the second front planetary gear set are connected together, and a carrier of the first front planetary gear set and a ring gear of the second front planetary gear set are connected to the input rotating member, such that the ring gear of the first front planetary gear set or the carrier of the second front planetary gear set functions as the first intermediate output member while a sun gear of the second front planetary gear set functions as the second intermediate output member. As a result, a practical multi-speed transmission for a vehicle is able to be provided.

It is also preferable that the first transmitting portion include a single pinion type first front planetary gear set and a double pinion type second front planetary gear set, in which a ring gear of the second front planetary gear set is always connected to the non-rotating member, a sun gear of the first front planetary gear set and a sun gear of the second front planetary gear set are connected together, a carrier of the first front planetary gear set and a carrier of the second front planetary gear set are connected together, and a ring gear of the first front planetary gear set is connected to the input rotating member, such that the carrier of the first front planetary gear set or the carrier of the second front planetary gear set functions as the first intermediate output member while the sun gear of the first front planetary gear set or the sun gear of the second front planetary gear set functions as the second intermediate output member. As a result, a practical multi-speed transmission for a vehicle is able to be provided.

It is also preferable that the first transmitting portion include a single pinion type first front planetary gear set and a double pinion type second front planetary gear set, in which a carrier of the first front planetary gear set and a ring gear of the second front planetary gear set are always connected to the non-rotating member, a ring gear of the first front planetary gear set and a carrier of the second front planetary gear set are connected together, and a sun gear of the first front planetary gear set is connected to the input rotating member, such that a sun gear of the second front planetary gear set functions as the first intermediate output member while the ring gear of the first front planetary gear set or the carrier of the second front planetary gear set functions as the second intermediate output member. As a result, a practical multi-speed transmission for a vehicle is able to be provided.

It is also preferable that the first transmitting portion include a single pinion type first front planetary gear set and a single pinion type second front planetary gear set, in which a carrier of the first front planetary gear set and a carrier of the second front planetary gear set are always connected to the non-rotating member, and a sun gear of the first front planetary gear set is connected to the input rotating member, such that a sun gear of the second front planetary gear set functions as the first intermediate output member while a ring gear of the first front planetary gear set functions as the second intermediate output member. As a result, a practical multi-speed transmission for a vehicle is able to be provided.

It is also preferable that the first transmitting portion include a single pinion type first front planetary gear set and a single pinion type second front planetary gear set, in which a carrier of the first front planetary gear set and a carrier of the second front planetary gear set are always connected to the non-rotating member, and a sun gear of the first front planetary gear set is connected to the input rotating member, such that a sun gear of the second front planetary gear set functions as the first intermediate output member while a ring gear of the second front planetary gear set functions as the second intermediate output member. As a result, a practical multi-speed transmission for a vehicle is able to be provided.

It is also preferable that the first transmitting portion include a single pinion type first front planetary gear set and a single pinion type second front planetary gear set, in which a sun gear of the second front planetary gear set is always connected to the non-rotating member, a carrier of the first front planetary gear set and a carrier of the second front planetary gear set are connected together to form a single rotating element, and a ring gear of the second front planetary gear set is connected to the input rotating member, such that the single rotating element functions as the first intermediate output member while a sun gear of the first front planetary gear set functions as the second intermediate output member. As a result, a practical multi-speed transmission for a vehicle is able to be provided.

It is also preferable that the first transmitting portion include a single pinion type first front planetary gear set and a single pinion type second front planetary gear set, in which a sun gear of the second front planetary gear set is always connected to the non-rotating member, a carrier of the first front planetary gear set and a carrier of the second front planetary gear set are connected together to form a single rotating element, and a ring gear of the first front planetary gear set is connected to the input rotating member, such that the single rotating element functions as the first intermediate output member while a sun gear of the first front planetary gear set functions as the second intermediate output member. As a result, a practical multi-speed transmission for a vehicle is able to be provided.

It is also preferable that the first transmitting portion include a single pinion type first front planetary gear set and a double pinion type second front planetary gear set, in which a ring gear of the second front planetary gear set is always connected to the non-rotating member, a carrier of the first front planetary gear set and a sun gear of the second front planetary gear set are connected together, a sun gear of the first front planetary gear set and a carrier of the second front planetary gear set are connected together, and a ring gear of the first front planetary gear set is connected to the input rotating member, such that the carrier of the first front planetary gear set and the sun gear of the second front planetary gear set, which are connected together, function as the first intermediate output member while the sun gear of the first front planetary gear set and the carrier of the second front planetary gear set, which are connected together, function as the second intermediate output member. As a result, a practical multi-speed transmission for a vehicle is able to be provided.

It is also preferable that the first transmitting portion include a single pinion type first front planetary gear set and a double pinion type second front planetary gear set, in which a ring gear of the second front planetary gear set is always connected to the non-rotating member, a sun gear of the first front planetary gear set and a sun gear of the second front planetary gear set are connected together, and a ring gear of the first front planetary gear set and a carrier of the second front planetary gear set are connected together as well as connected to the input rotating member, such that a carrier of the first front planetary gear set functions as the first intermediate output member while the sun gear of the first front planetary gear set and the sun gear of the second front planetary gear set, which are connected together, function as the second intermediate output member. As a result, a practical multi-speed transmission for a vehicle is able to be provided.

It is also preferable that the first transmitting portion include a single pinion type first front planetary gear set and a double pinion type second front planetary gear set, in which a carrier of the first front planetary gear set and a ring gear of the second front planetary gear set are always connected to the non-rotating member, a ring gear of the first front planetary gear set and a sun gear of the second front planetary gear set are connected together, and a sun gear of the first front planetary gear set is connected to the input rotating member, such that a carrier of the second front planetary gear set functions as the first intermediate output member while the ring gear of the first front planetary gear set and the sun gear of the second front planetary gear set, which are connected together, function as the second intermediate output member. As a result, a practical multi-speed transmission for a vehicle is able to be provided.

It is also preferable that the first transmitting portion include a double pinion type first front planetary gear set and a single pinion type second front planetary gear set, in which a ring gear of the first front planetary gear set is always connected to the non-rotating member, a carrier of the first front planetary gear set and a sun gear of the second front planetary gear set are connected together, and a sun gear of the first front planetary gear set and a ring gear of the second front planetary gear set are connected to the input rotating member, such that a carrier of the second front planetary gear set functions as the first intermediate output member while the carrier of the first front planetary gear set and the sun gear of the second front planetary gear set, which are connected together, function as the second intermediate output member. As a result, a practical multi-speed transmission for a vehicle is able to be provided.

It is also preferable that the first transmitting portion include a single pinion type first front planetary gear set and a single pinion type second front planetary gear set, in which a carrier of the first front planetary gear set is always connected to the non-rotating member, a ring gear of the first front planetary gear set and a sun gear of the second front planetary gear set are connected together, and a sun gear of the first front planetary gear set and a ring gear of the second front planetary gear set are connected to the input rotating member, such that a carrier of the second front planetary gear set functions as the first intermediate output member while the ring gear of the first front planetary gear set and the sun gear of the second front planetary gear set, which are connected together, function as the second intermediate output member. As a result, a practical multi-speed transmission for a vehicle is able to be provided.

It is also preferable that the second transmitting portion include a single pinion type first rear planetary gear set and a double pinion type second rear planetary gear set, in which the first rotating element is formed by a sun gear of the first rear planetary gear set, the second rotating element is formed by a carrier of the first rear planetary gear set and a carrier of the second rear planetary gear set which are connected together, the third rotating element is formed by a ring gear of the first rear planetary gear set and a ring gear of the second rear planetary gear set which are connected together, and the fourth rotating element is formed by a sun gear of the second rear planetary gear set. As a result, a practical multi-speed transmission for a vehicle is able to be provided.

It is also preferable that the second transmitting portion include a single pinion type first rear planetary gear set and a double pinion type second rear planetary gear set, in which the first rotating element is formed by a sun gear of the first rear planetary gear set and a carrier of the second rear planetary gear set which are connected together, the second rotating element is formed by a carrier of the first rear planetary gear set and a ring gear of the second rear planetary gear set which are connected together, the third rotating element is formed by a ring gear of the first rear planetary gear set, and the fourth rotating element is formed by a sun gear of the second rear planetary gear set. As a result, a practical multi-speed transmission for a vehicle is able to be provided.

It is also preferable that the second transmitting portion include a single pinion type first rear planetary gear set and a double pinion type second rear planetary gear set, in which the first rotating element is formed by a sun gear of the first rear planetary gear set, the second rotating element is formed by a carrier of the first rear planetary gear set and a carrier of the second rear planetary gear set which are connected together, the third rotating element is formed by a ring gear of the second rear planetary gear set, and the fourth rotating element is formed by a ring gear of the first rear planetary gear set and a sun gear of the second rear planetary gear set which are connected together. As a result, a practical multi-speed transmission for a vehicle is able to be provided.

It is also preferable that the second transmitting portion include a double pinion type first rear planetary gear set and a double pinion type second rear planetary gear set, in which the first rotating element is formed by a sun gear of the first rear planetary gear set, the second rotating element is formed by a ring gear of the first rear planetary gear set and a carrier of the second rear planetary gear set which are connected together, the third rotating element is formed by a ring gear of the second rear planetary gear set, and the fourth rotating element is formed by a carrier of the first rear planetary gear set and a sun gear of the second rear planetary gear set which are connected together. As a result, a practical multi-speed transmission for a vehicle is able to be provided.

It is also preferable that the second transmitting portion include a double pinion type first rear planetary gear set and a double pinion type second rear planetary gear set, in which the first rotating element is formed by a carrier of the first rear planetary gear set, the second rotating element is formed by a ring gear of the first rear planetary gear set and a carrier of the second rear planetary gear set which are connected together, the third rotating element is formed by a ring gear of the second rear planetary gear set, and the fourth rotating element is formed by a sun gear of the first rear planetary gear set and a sun gear of the second rear planetary gear set which are connected together. As a result, a practical multi-speed transmission for a vehicle is able to be provided.

BRIEF DESCRIPTION OF THE DRAWINGS

The features, advantages thereof, and technical and industrial significance of embodiments of the present invention will be better understood by reading the following detailed description of preferred embodiments when considered in connection with the accompanying drawings, in which:

FIG. 2 is a clutch and brake engagement chart showing the relationship between preset gears and operations of hydraulic friction engagement devices to achieve those gears in the transmission shown in FIG. 1;

FIG. 6 is a clutch and brake engagement chart showing the relationship between preset gears and operations of hydraulic friction engagement devices to achieve those gears in the transmission shown in FIG. 5;

FIG. 8 is a clutch and brake engagement chart showing the relationship between preset gears and operations of hydraulic friction engagement devices to achieve those gears in a transmission according to a first modified example of the second exemplary embodiment of the invention;

FIG. 10 is a clutch and brake engagement chart showing the relationship between preset gears and operations of hydraulic friction engagement devices to achieve those gears in a transmission according to a second modified example of the second exemplary embodiment of the invention;

FIG. 13 is a clutch and brake engagement chart showing the relationship between preset gears and operations of hydraulic friction engagement devices to achieve those gears in the transmission shown in FIG. 12;

FIG. 15 is a clutch and brake engagement chart showing the relationship between preset gears and operations of hydraulic friction engagement devices to achieve those gears in a transmission according to a first modified example of the third exemplary embodiment of the invention;

FIG. 17 is a clutch and brake engagement chart showing the relationship between preset gears and operations of hydraulic friction engagement devices to achieve those gears in a transmission according to a second modified example of the third exemplary embodiment of the invention;

FIG. 19 is a clutch and brake engagement chart showing the relationship between preset gears and operations of hydraulic friction engagement devices to achieve those gears in a transmission according to a third modified example of the third exemplary embodiment of the invention;

FIG. 20 is an alignment graph corresponding to FIG. 19, which is able to express, with straight lines, the relative relationships between the rotation speeds of various rotating elements which are connected differently in each gear in the transmission according to the third modified example of the third exemplary embodiment of the invention;

FIG. 21 is a clutch and brake engagement chart showing the relationship between preset gears and operations of hydraulic friction engagement devices to achieve those gears in a transmission according to a fourth modified example of the third exemplary embodiment of the invention;

FIG. 23 is a clutch and brake engagement chart showing the relationship between preset gears and operations of hydraulic friction engagement devices to achieve those gears in a transmission according to a fifth modified example of the third exemplary embodiment of the invention;

FIG. 25 is a clutch and brake engagement chart showing the relationship between preset gears and operations of hydraulic friction engagement devices to achieve those gears in a transmission according to a sixth modified example of the third exemplary embodiment of the invention;

FIG. 28 is a clutch and brake engagement chart showing the relationship between preset gears and operations of hydraulic friction engagement devices to achieve those gears in the transmission shown in FIG. 27;

FIG. 29 is a clutch and brake engagement chart showing the relationship between preset gears and operations of hydraulic friction engagement devices to achieve those gears in a transmission according to a first modified example of the fourth exemplary embodiment of the invention;

FIG. 31 is a clutch and brake engagement chart showing the relationship between preset gears and operations of hydraulic friction engagement devices to achieve those gears in a transmission according to a second modified example of the fourth exemplary embodiment of the invention;

FIG. 33 is a clutch and brake engagement chart showing the relationship between preset gears and operations of hydraulic friction engagement devices to achieve those gears in a transmission according to a third modified example of the fourth exemplary embodiment of the invention;

FIG. 35 is a clutch and brake engagement chart showing the relationship between preset gears and operations of hydraulic friction engagement devices to achieve those gears in a transmission according to a fourth modified example of the fourth exemplary embodiment of the invention;

FIG. 37 is a clutch and brake engagement chart showing the relationship between preset gears and operations of hydraulic friction engagement devices to achieve those gears in a transmission according to a fifth modified example of the fourth exemplary embodiment of the invention;

FIG. 39 is a clutch and brake engagement chart showing the relationship between preset gears and operations of hydraulic friction engagement devices to achieve those gears in a transmission according to a sixth modified example of the fourth exemplary embodiment of the invention;

FIG. 41 is a clutch and brake engagement chart showing the relationship between preset gears and operations of hydraulic friction engagement devices to achieve those gears in a transmission according to a seventh modified example of the fourth exemplary embodiment of the invention;

FIG. 44 is a clutch and brake engagement chart showing the relationship between preset gears and operations of hydraulic friction engagement devices to achieve those gears in the transmission shown in FIG. 43;

FIG. 45 is a clutch and brake engagement chart showing the relationship between preset gears and operations of hydraulic friction engagement devices to achieve those gears in a transmission according to a first modified example of the fifth exemplary embodiment of the invention;

FIG. 47 is a clutch and brake engagement chart showing the relationship between preset gears and operations of hydraulic friction engagement devices to achieve those gears in a transmission according to a second modified example of the fifth exemplary embodiment of the invention;

FIG. 49 is a clutch and brake engagement chart showing the relationship between preset gears and operations of hydraulic friction engagement devices to achieve those gears in a transmission according to a third modified example of the fifth exemplary embodiment of the invention;

FIG. 51 is a clutch and brake engagement chart showing the relationship between preset gears and operations of hydraulic friction engagement devices to achieve those gears in a transmission according to a fourth modified example of the fifth exemplary embodiment of the invention;

FIG. 53 is a clutch and brake engagement chart showing the relationship between preset gears and operations of hydraulic friction engagement devices to achieve those gears in a transmission according to a fifth modified example of the fifth exemplary embodiment of the invention;

FIG. 55 is a clutch and brake engagement chart showing the relationship between preset gears and operations of hydraulic friction engagement devices to achieve those gears in a transmission according to a sixth modified example of the fifth exemplary embodiment of the invention;

FIG. 57 is a clutch and brake engagement chart showing the relationship between preset gears and operations of hydraulic friction engagement devices to achieve those gears in a transmission according to a seventh modified example of the fifth exemplary embodiment of the invention;

FIG. 60 is a clutch and brake engagement chart showing the relationship between preset gears and operations of hydraulic friction engagement devices to achieve those gears in the transmission shown in FIG. 59;

FIG. 62 is a clutch and brake engagement chart showing the relationship between preset gears and operations of hydraulic friction engagement devices to achieve those gears in a transmission according to a first modified example of the sixth exemplary embodiment of the invention;

FIG. 64 is a clutch and brake engagement chart showing the relationship between preset gears and operations of hydraulic friction engagement devices to achieve those gears in a transmission according to a second modified example of the sixth exemplary embodiment of the invention;

FIG. 66 is a clutch and brake engagement chart showing the relationship between preset gears and operations of hydraulic friction engagement devices to achieve those gears in a transmission according to a third modified example of the sixth exemplary embodiment of the invention;

FIG. 68 is a clutch and brake engagement chart showing the relationship between preset gears and operations of hydraulic friction engagement devices to achieve those gears in a transmission according to a fourth modified example of the sixth exemplary embodiment of the invention;

FIG. 70 is a clutch and brake engagement chart showing the relationship between preset gears and operations of hydraulic friction engagement devices to achieve those gears in a transmission according to a fifth modified example of the sixth exemplary embodiment of the invention;

FIG. 72 is a clutch and brake engagement chart showing the relationship between preset gears and operations of hydraulic friction engagement devices to achieve those gears in a transmission according to a sixth modified example of the sixth exemplary embodiment of the invention;

FIG. 75 is a clutch and brake engagement chart showing the relationship between preset gears and operations of hydraulic friction engagement devices to achieve those gears in the transmission shown in FIG. 74;

FIG. 76 is a clutch and brake engagement chart showing the relationship between preset gears and operations of hydraulic friction engagement devices to achieve those gears in a transmission according to a first modified example of the seventh exemplary embodiment of the invention;

FIG. 77 is a clutch and brake engagement chart showing the relationship between preset gears and operations of hydraulic friction engagement devices to achieve those gears in a transmission according to a second modified example of the seventh exemplary embodiment of the invention;

FIG. 79 is a clutch and brake engagement chart showing the relationship between preset gears and operations of hydraulic friction engagement devices to achieve those gears in a transmission according to a third modified example of the seventh exemplary embodiment of the invention;

FIG. 81 is a clutch and brake engagement chart showing the relationship between preset gears and operations of hydraulic friction engagement devices to achieve those gears in a transmission according to a fourth modified example of the seventh exemplary embodiment of the invention;

FIG. 83 is a clutch and brake engagement chart showing the relationship between preset gears and operations of hydraulic friction engagement devices to achieve those gears in a transmission according to a fifth modified example of the seventh exemplary embodiment of the invention;

FIG. 85 is a clutch and brake engagement chart showing the relationship between preset gears and operations of hydraulic friction engagement devices to achieve those gears in a transmission according to a sixth modified example of the seventh exemplary embodiment of the invention;

FIG. 87 is a clutch and brake engagement chart showing the relationship between preset gears and operations of hydraulic friction engagement devices to achieve those gears in a transmission according to a seventh modified example of the seventh exemplary embodiment of the invention;

FIG. 89 is a clutch and brake engagement chart showing the relationship between preset gears and operations of hydraulic friction engagement devices to achieve those gears in a transmission according to an eighth modified example of the seventh exemplary embodiment of the invention;

FIG. 92 is a clutch and brake engagement chart showing the relationship between preset gears and operations of hydraulic friction engagement devices to achieve those gears in the transmission according to the eighth exemplary embodiment of the invention;

FIG. 93 is a clutch and brake engagement chart showing the relationship between preset gears and operations of hydraulic friction engagement devices to achieve those gears in the transmission according to a first modified example of the eighth exemplary embodiment of the invention;

FIG. 95 is a clutch and brake engagement chart showing the relationship between preset gears and operations of hydraulic friction engagement devices to achieve those gears in a transmission according to a second modified example of the eighth exemplary embodiment of the invention;

FIG. 97 is a clutch and brake engagement chart showing the relationship between preset gears and operations of hydraulic friction engagement devices to achieve those gears in a transmission according to a third modified example of the eighth exemplary embodiment of the invention;

FIG. 99 is a clutch and brake engagement chart showing the relationship between preset gears and operations of hydraulic friction engagement devices to achieve those gears in a transmission according to a fourth modified example of the eighth exemplary embodiment of the invention;

FIG. 101 is a clutch and brake engagement chart showing the relationship between preset gears and operations of hydraulic friction engagement devices to achieve those gears in a transmission according to a fifth modified example of the eighth exemplary embodiment of the invention;

FIG. 102 is an alignment graph corresponding to FIG. 101, which is able to express, with straight lines, the relative relationships between the rotation speeds of various rotating elements which are connected differently in each gear in the transmission according to the fifth modified example of the eighth exemplary embodiment of the invention;

FIG. 103 is a clutch and brake engagement chart showing the relationship between preset gears and operations of hydraulic friction engagement devices to achieve those gears in a transmission according to a sixth modified example of the eighth exemplary embodiment of the invention;

FIG. 106 is a clutch and brake engagement chart showing the relationship between preset gears and operations of hydraulic friction engagement devices to achieve those gears in the transmission according to the ninth exemplary embodiment of the invention;

FIG. 107 is a clutch and brake engagement chart showing the relationship between preset gears and operations of hydraulic friction engagement devices to achieve those gears in a transmission according to a first modified example of the ninth exemplary embodiment of the invention;

FIG. 109 is a clutch and brake engagement chart showing the relationship between preset gears and operations of hydraulic friction engagement devices to achieve those gears in a transmission according to a second modified example of the ninth exemplary embodiment of the invention;

FIG. 111 is a clutch and brake engagement chart showing the relationship between preset gears and operations of hydraulic friction engagement devices to achieve those gears in a transmission according to a third modified example of the ninth exemplary embodiment of the invention;

FIG. 114 is a clutch and brake engagement chart showing the relationship between preset gears and operations of hydraulic friction engagement devices to achieve those gears in the transmission according to the tenth exemplary embodiment of the invention;

FIG. 115 is a clutch and brake engagement chart showing the relationship between preset gears and operations of hydraulic friction engagement devices to achieve those gears in a transmission according to a first modified example of the tenth exemplary embodiment of the invention;

FIG. 117 is a clutch and brake engagement chart showing the relationship between preset gears and operations of hydraulic friction engagement devices to achieve those gears in a transmission according to a second modified example of the tenth exemplary embodiment of the invention;

FIG. 119 is a skeleton view of the structure of a multi-speed transmission for a vehicle according to an eleventh exemplary embodiment of the invention;

FIG. 120 is a clutch and brake engagement chart showing the relationship between preset gears and operations of hydraulic friction engagement devices to achieve those gears in the transmission according to the eleventh exemplary embodiment of the invention;

FIG. 121 is an alignment graph which is able to express, with straight lines, the relative relationships between the rotation speeds of various rotating elements which are connected differently in each gear in the transmission according to the eleventh exemplary embodiment of the invention;

FIG. 122 is a skeleton view of the structure of a multi-speed transmission for a vehicle according to a twelfth exemplary embodiment of the invention;

FIG. 123 is a clutch and brake engagement chart showing the relationship between preset gears and operations of hydraulic friction engagement devices to achieve those gears in the transmission according to the twelfth exemplary embodiment of the invention;

FIG. 124 is an alignment graph which is able to express, with straight lines, the relative relationships between the rotation speeds of various rotating elements which are connected differently in each gear in the transmission according to the twelfth exemplary embodiment of the invention;

FIG. 125 is a skeleton view of the structure of a multi-speed transmission for a vehicle according to a thirteenth exemplary embodiment of the invention;

FIG. 126 is a clutch and brake engagement chart showing the relationship between preset gears and operations of hydraulic friction engagement devices to achieve those gears in the transmission according to the thirteenth exemplary embodiment of the invention;

FIG. 127 is an alignment graph which is able to express, with straight lines, the relative relationships between the rotation speeds of various rotating elements which are connected differently in each gear in the transmission according to the thirteenth exemplary embodiment of the invention;

FIG. 128 is a skeleton view of the structure of a multi-speed transmission for a vehicle according to a fourteenth exemplary embodiment of the invention;

FIG. 129 is a clutch and brake engagement chart showing the relationship between preset gears and operations of hydraulic friction engagement devices to achieve those gears in the transmission according to the fourteenth exemplary embodiment of the invention;

FIG. 130 is an alignment graph which is able to express, with straight lines, the relative relationships between the rotation speeds of various rotating elements which are connected differently in each gear in the transmission according to the fourteenth exemplary embodiment of the invention;

Figure 131:
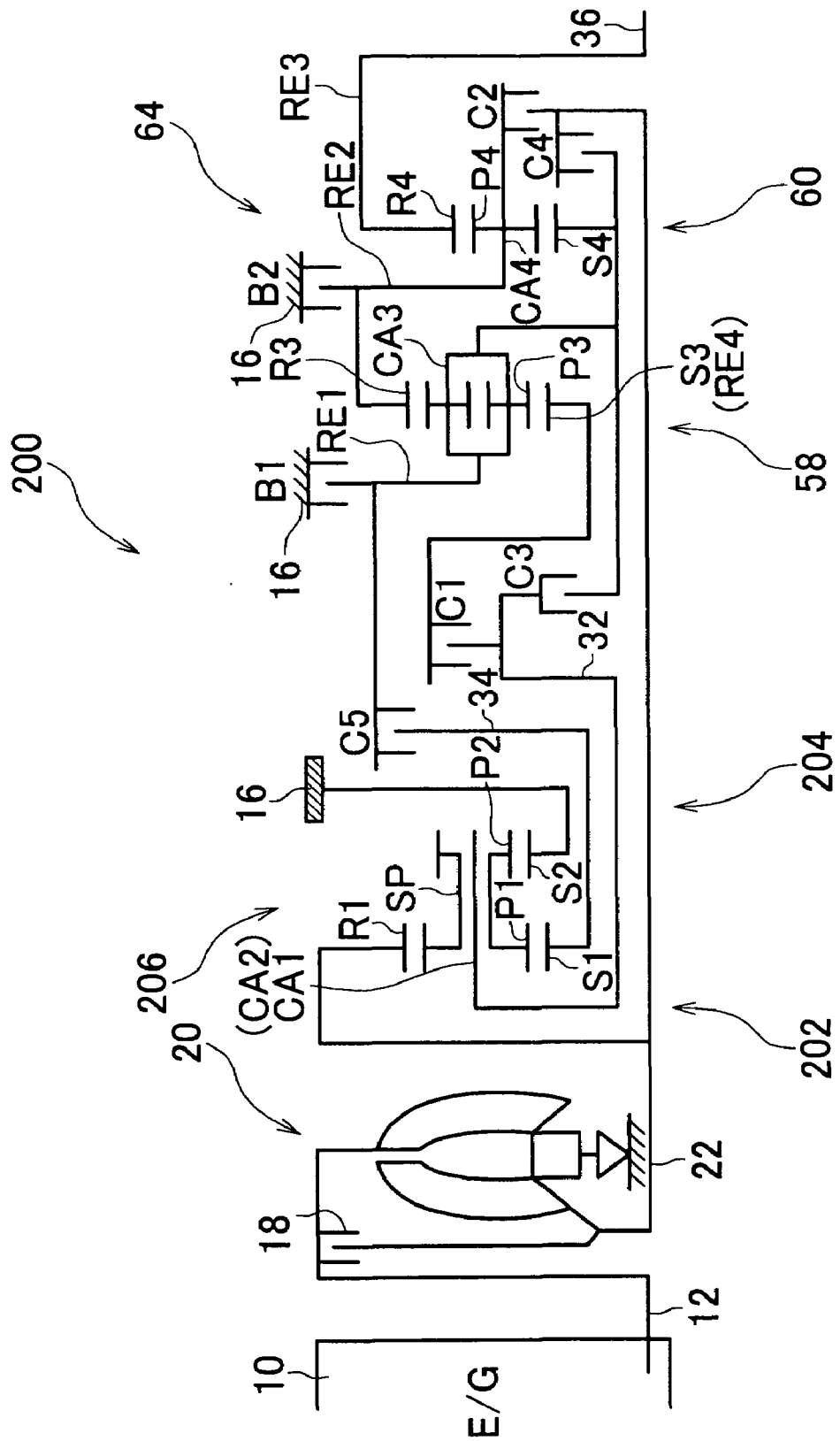
Figure 133:
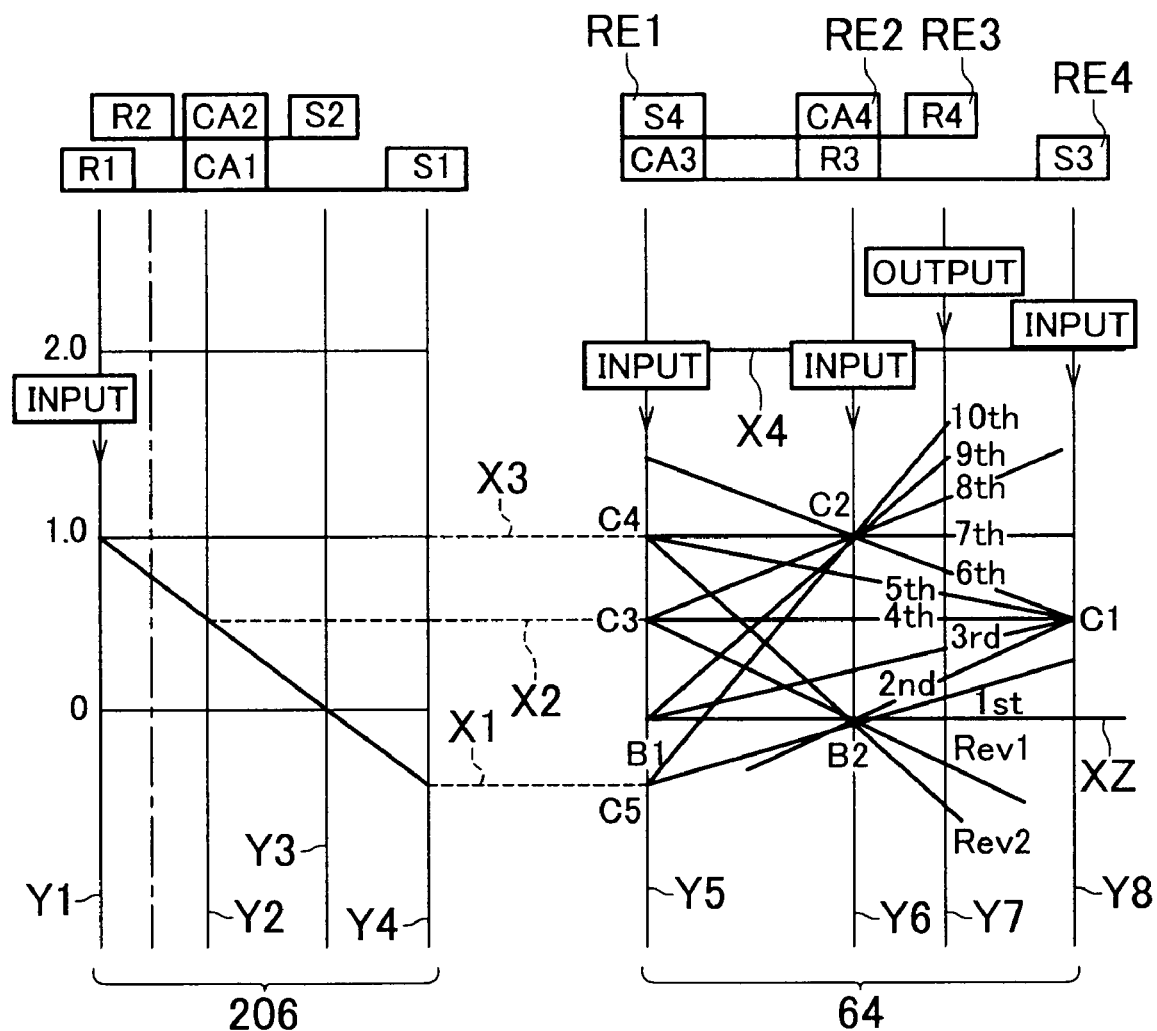
Figure 134:
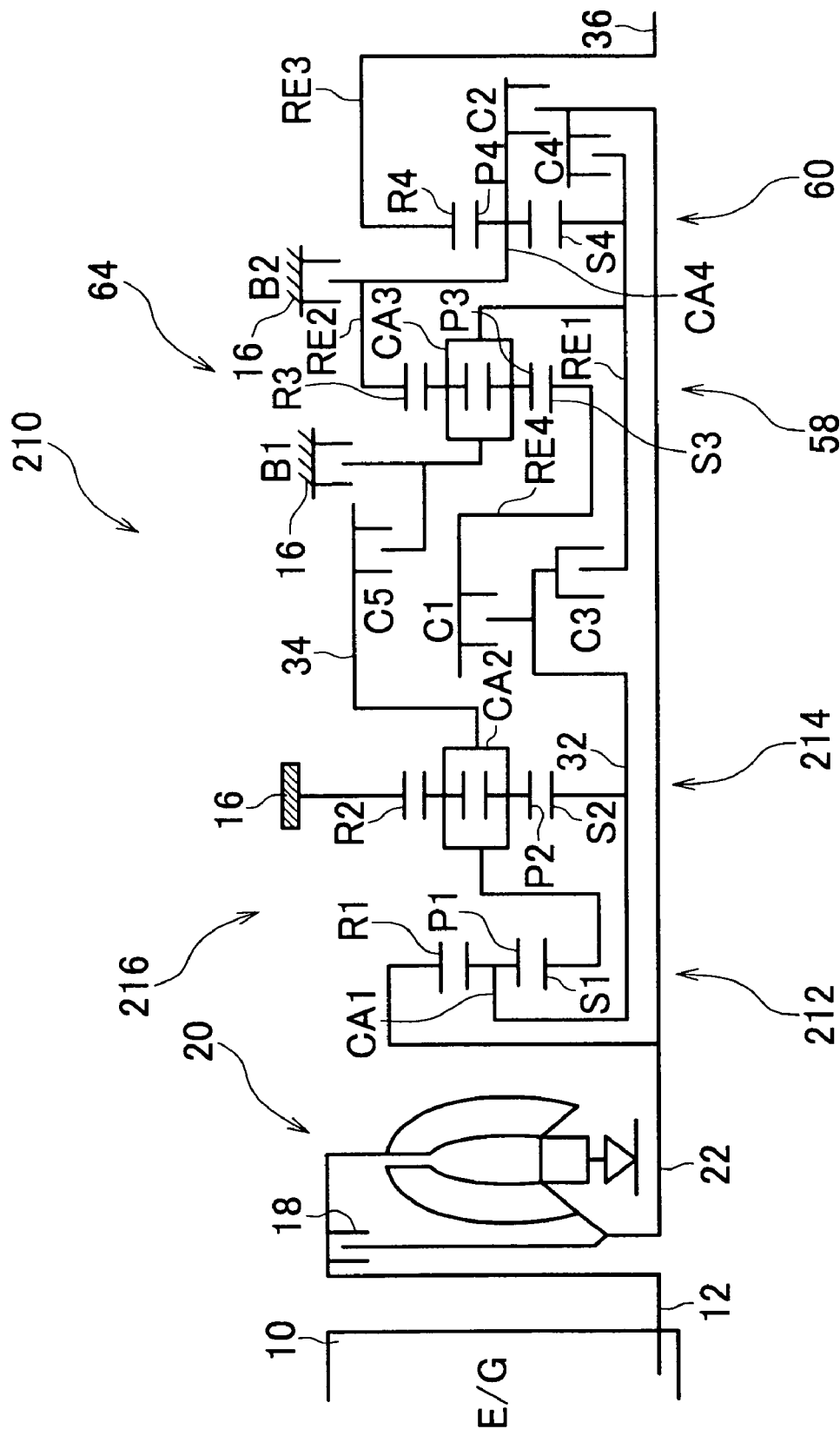
Figure 136:
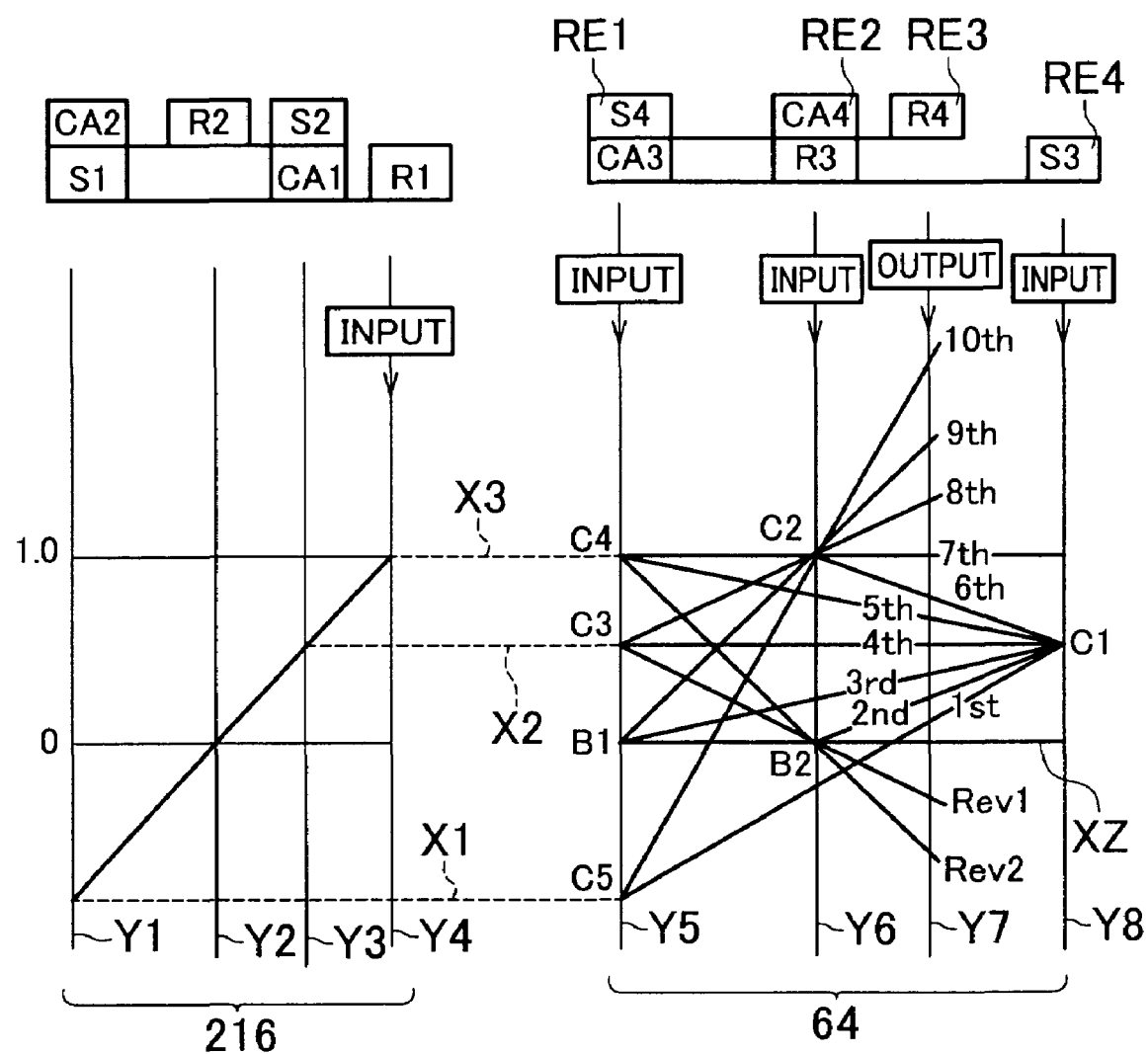
Figure 137:
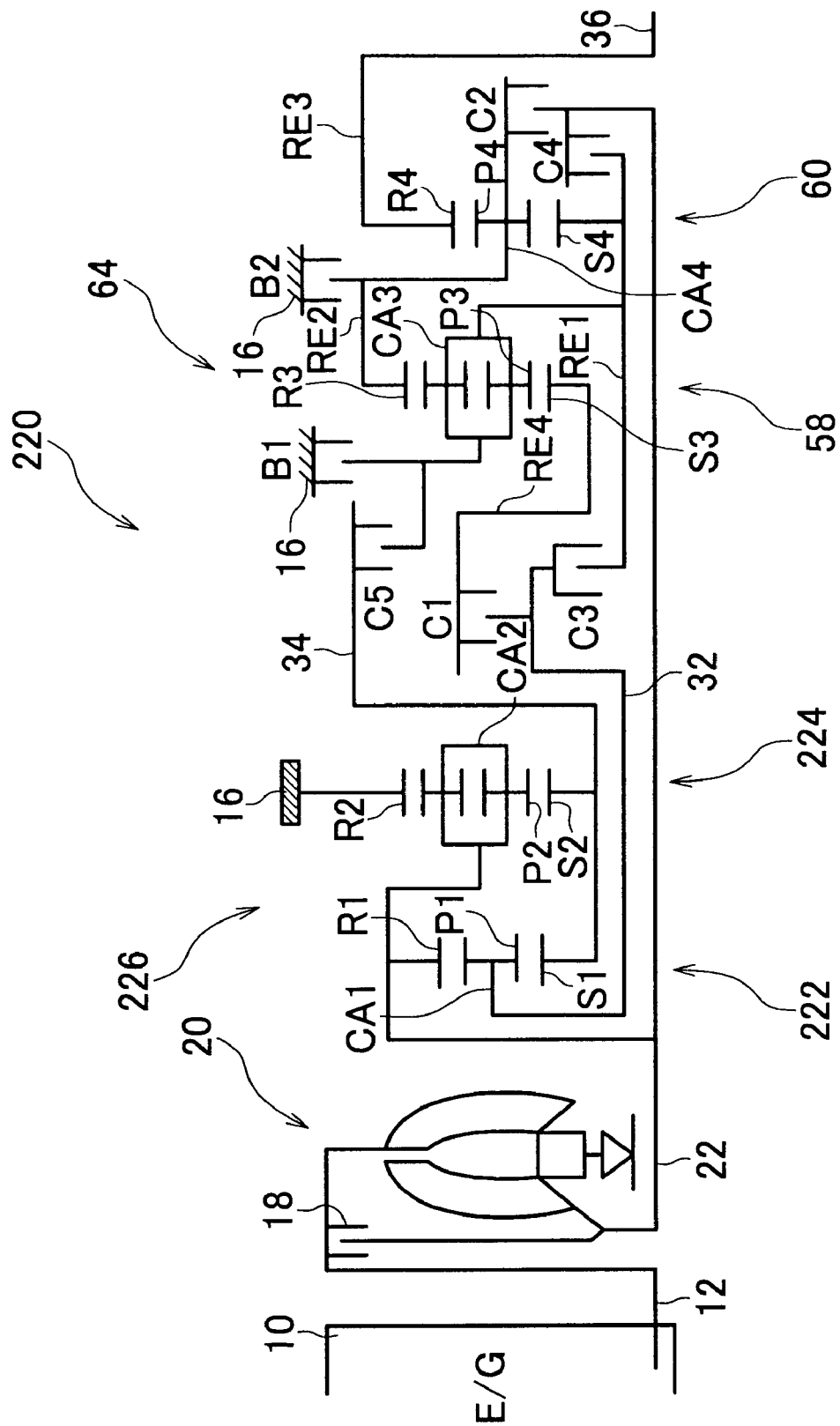
Figure 139:
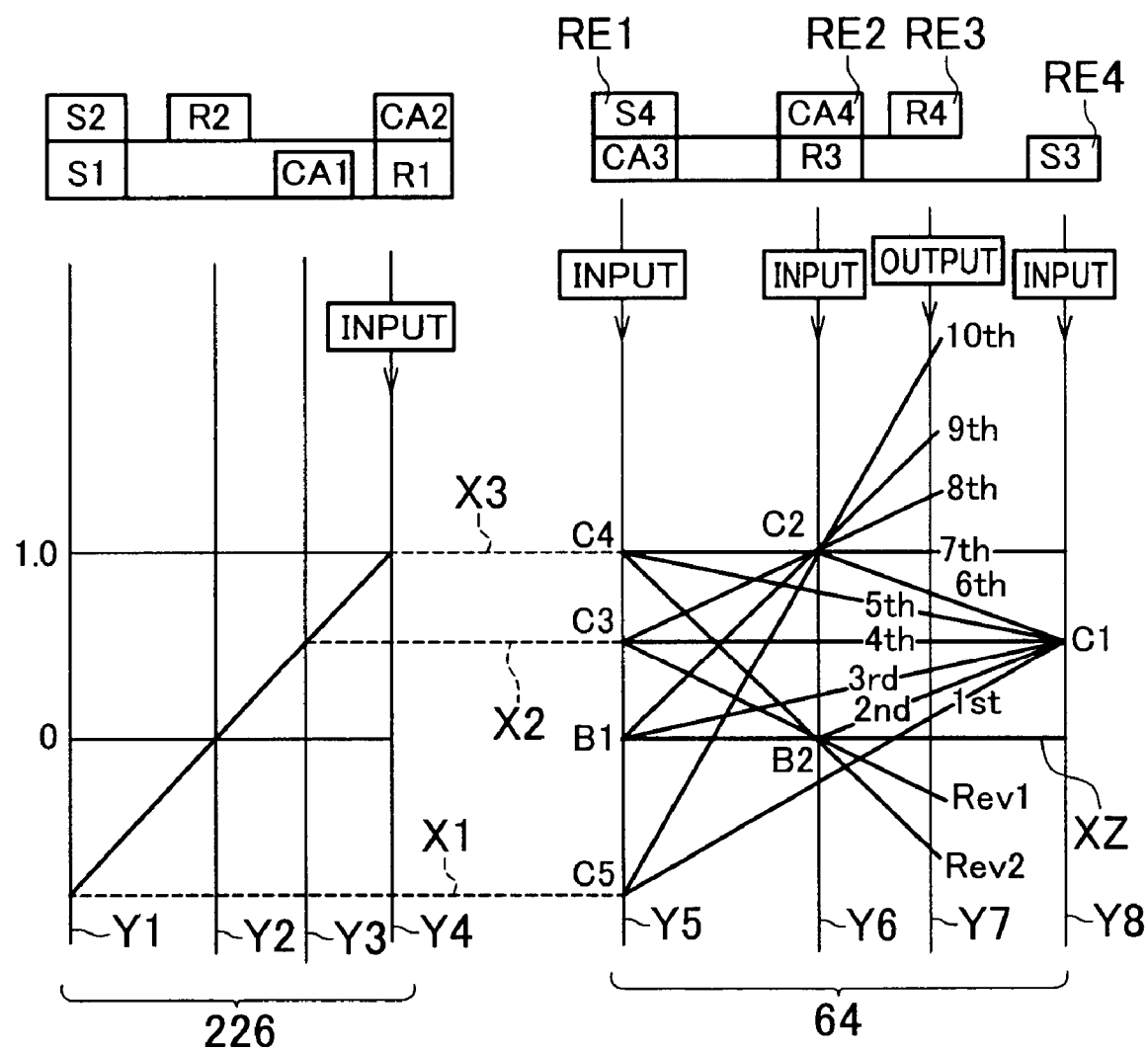
Figure 140:
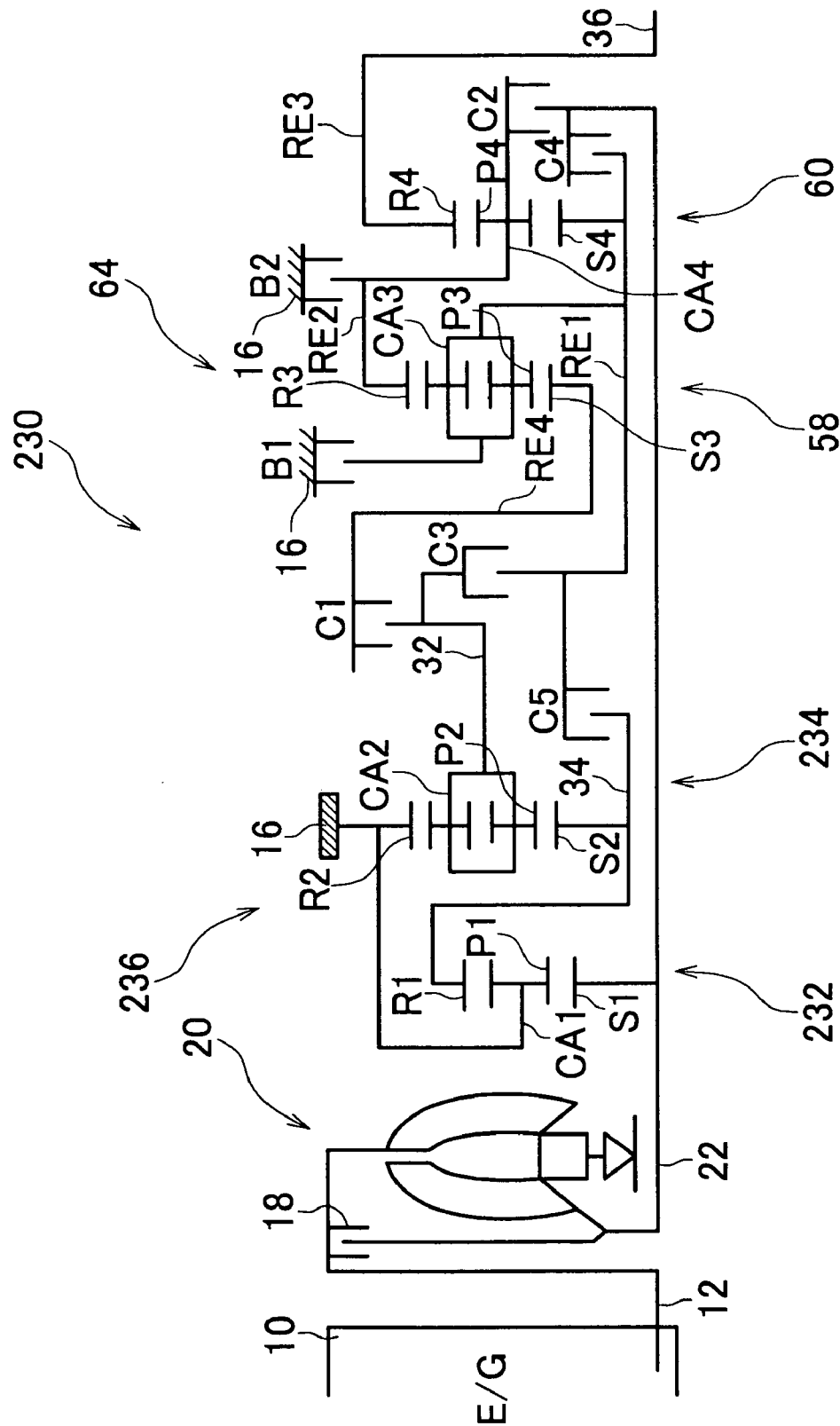
Figure 142:
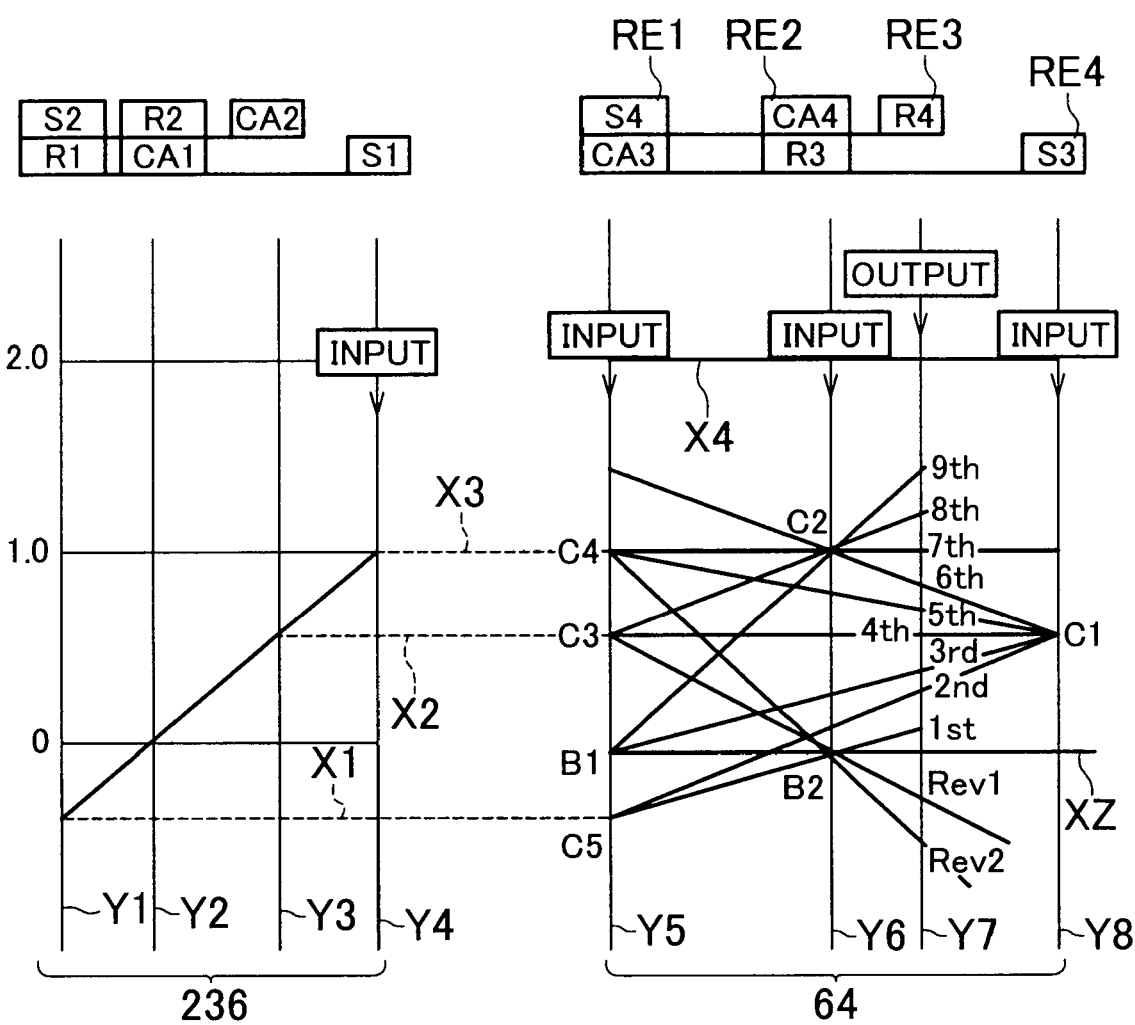
Figure 144:
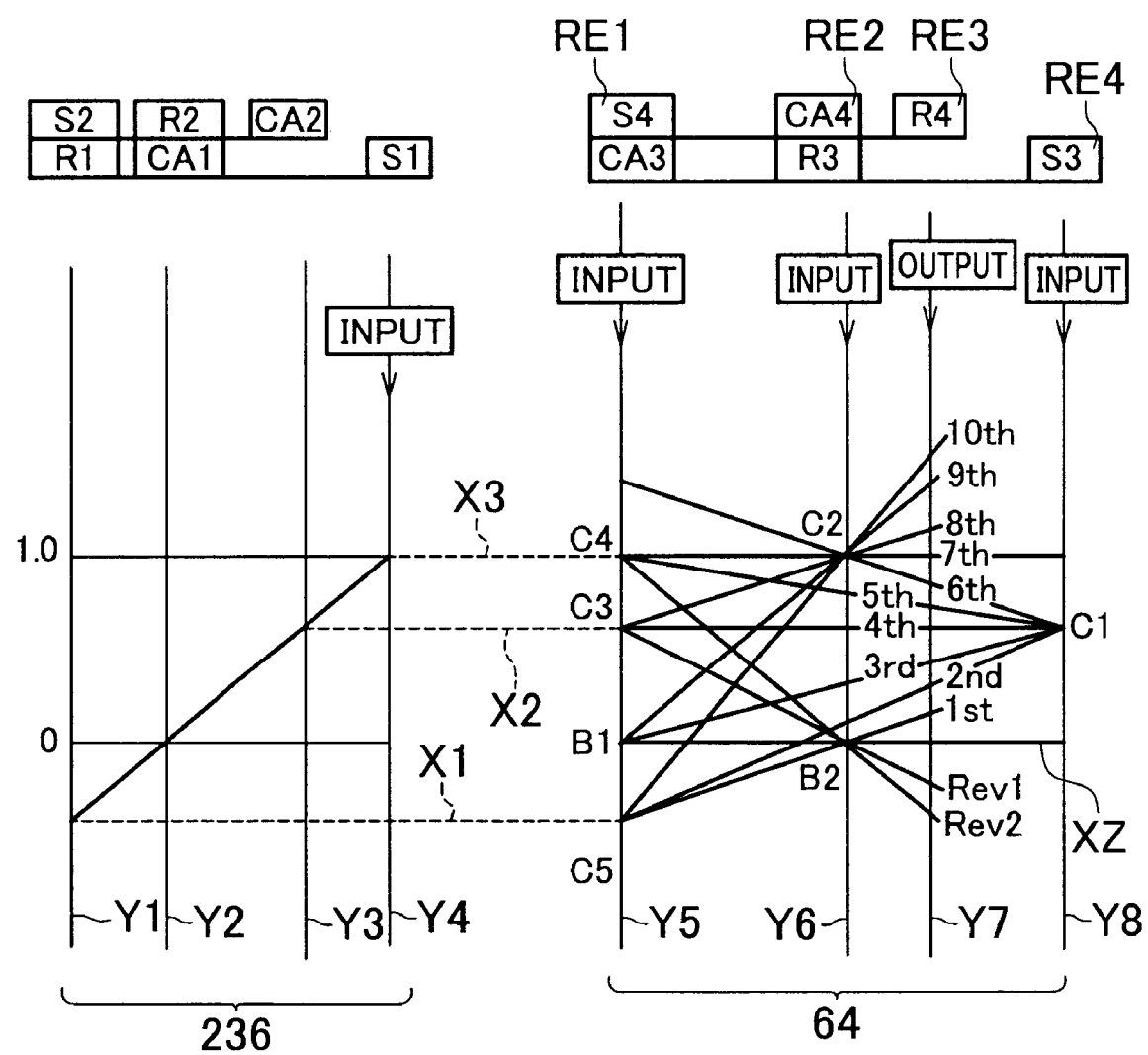
Figure 145:
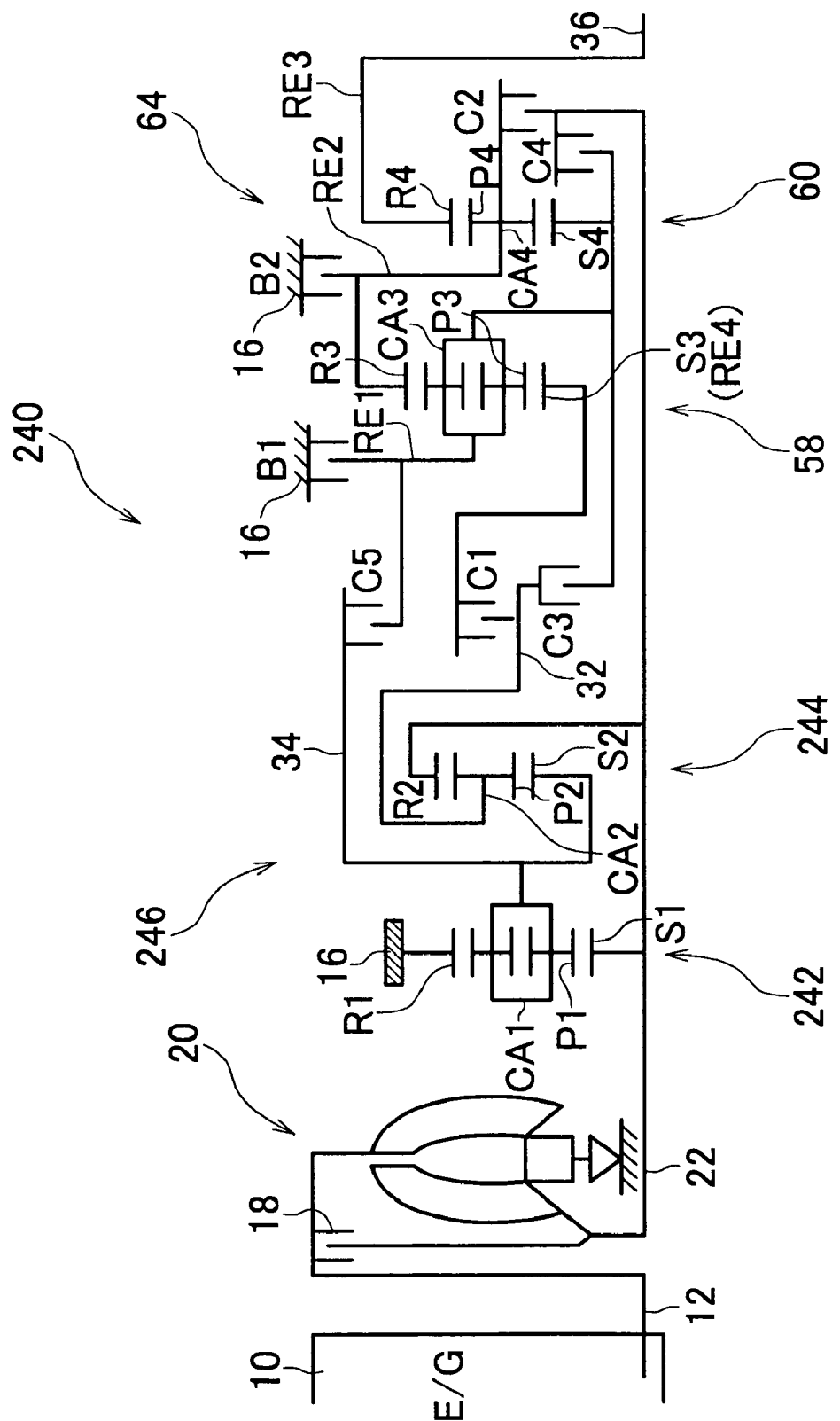
Figure 147:
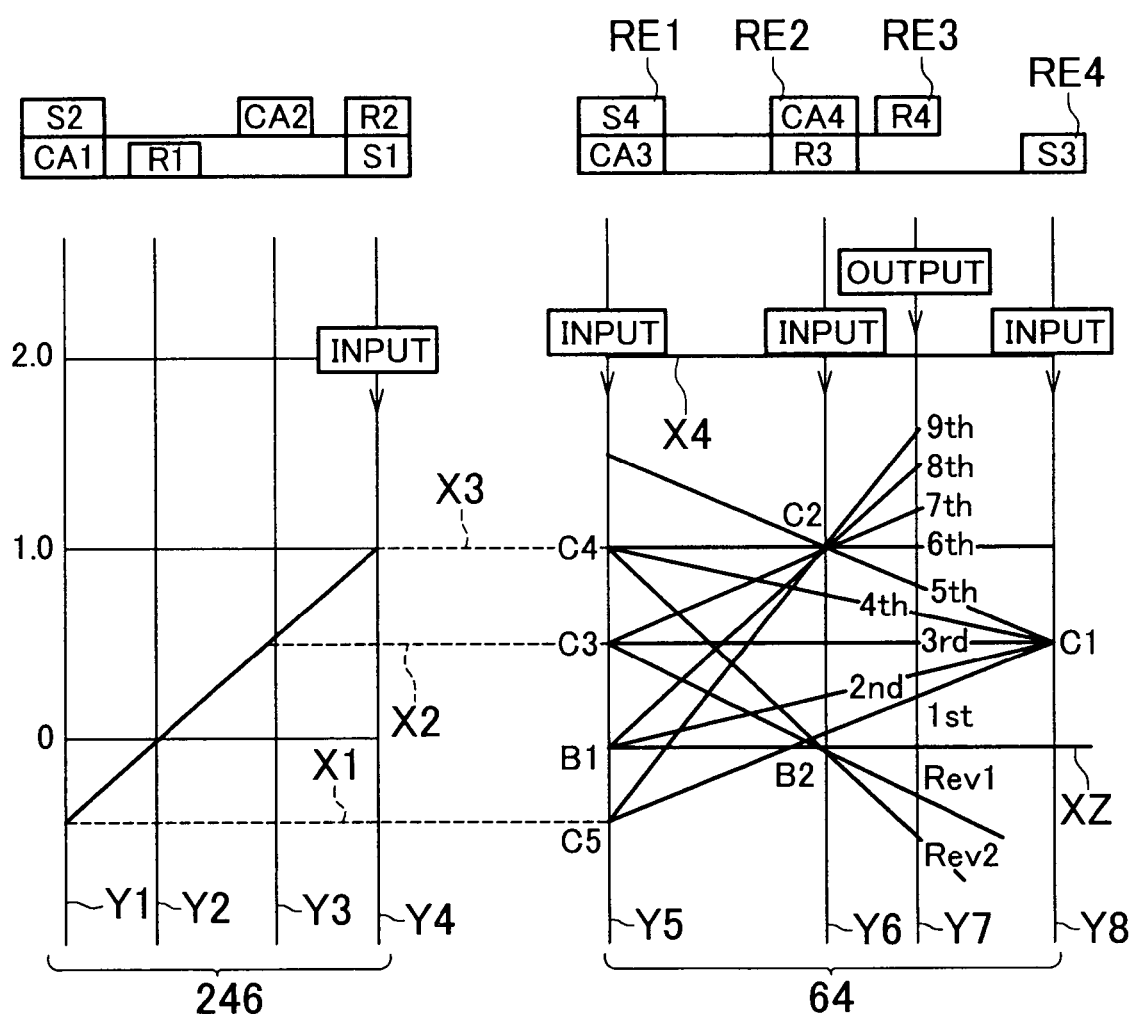
Figure 148:
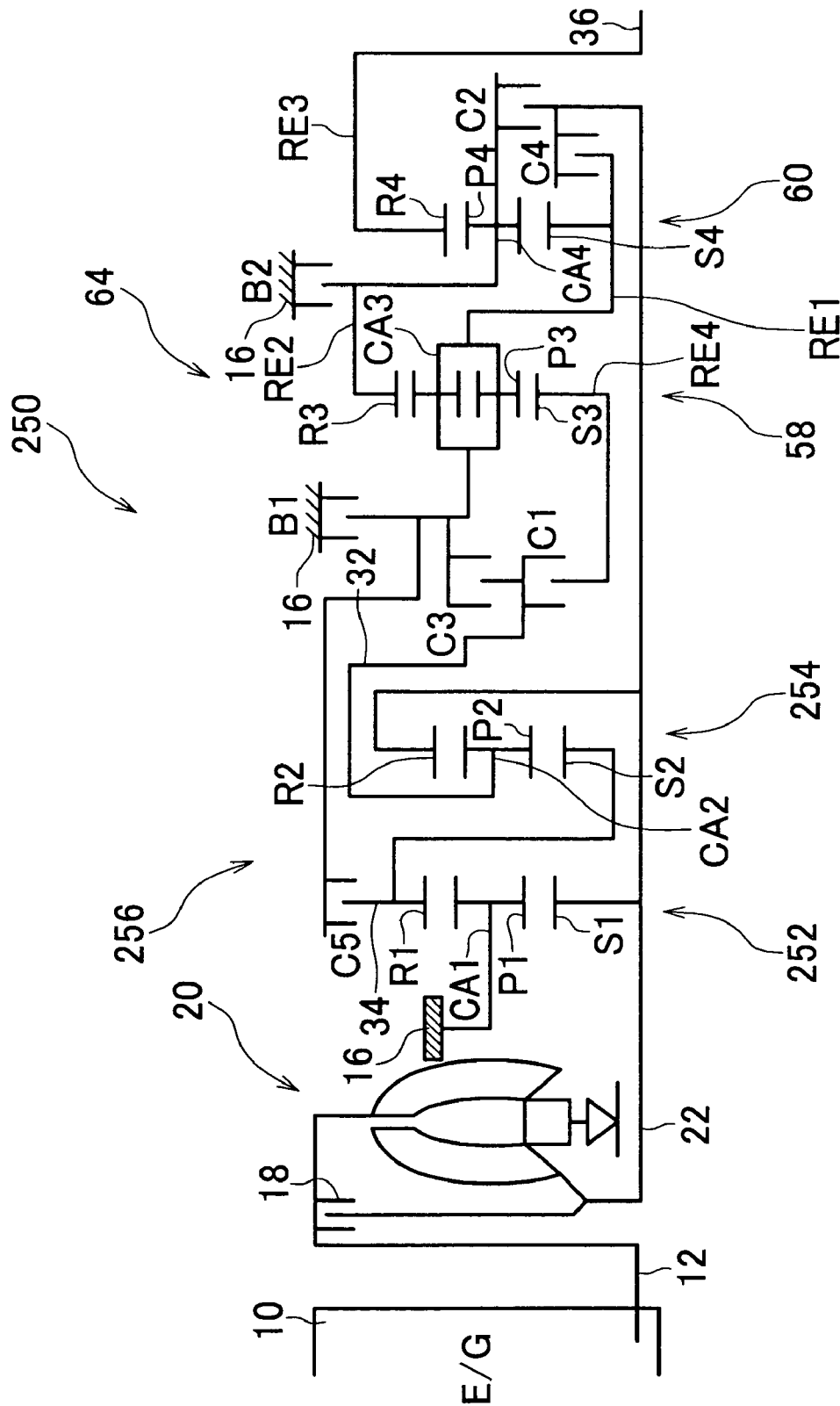
Figure 150:
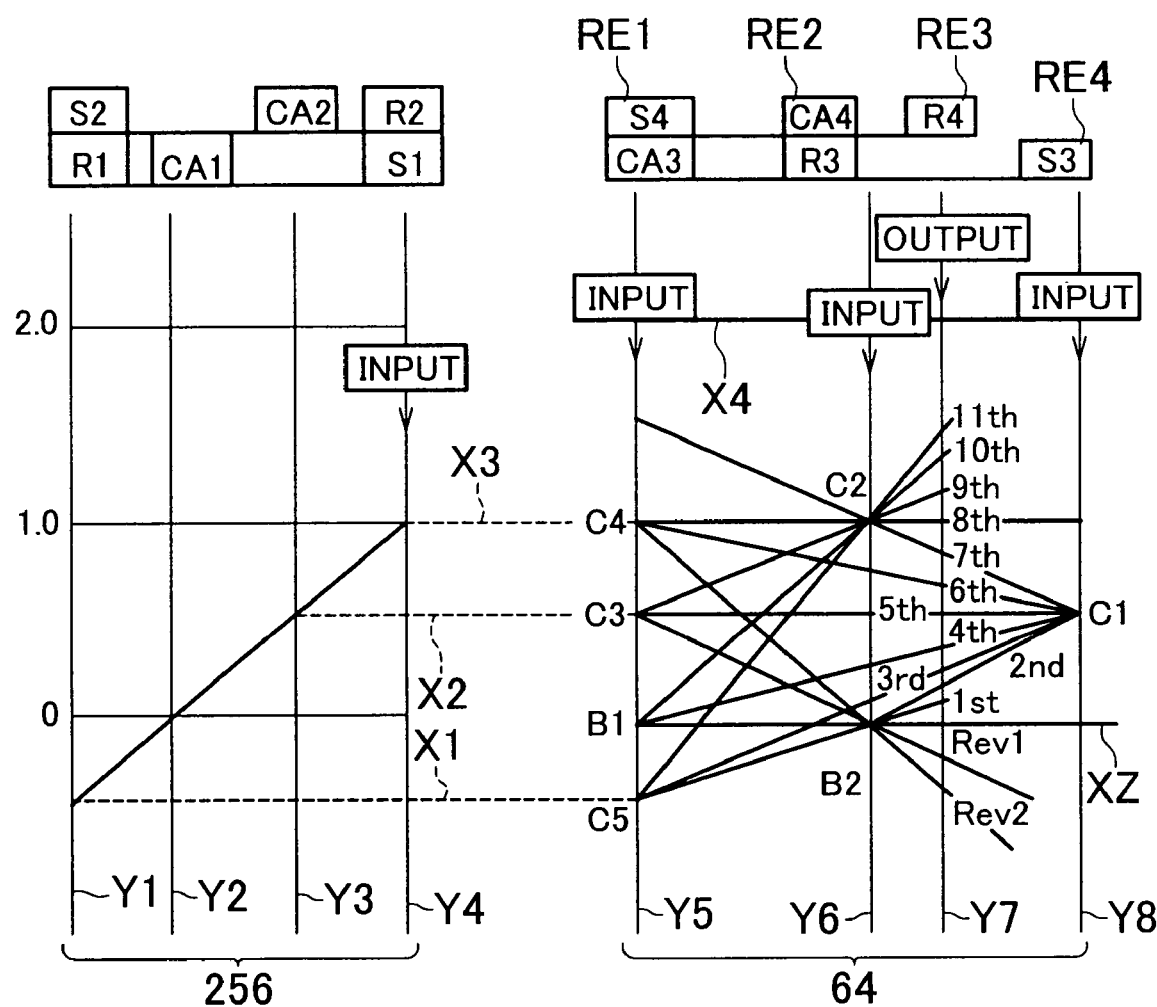
Figure 151:
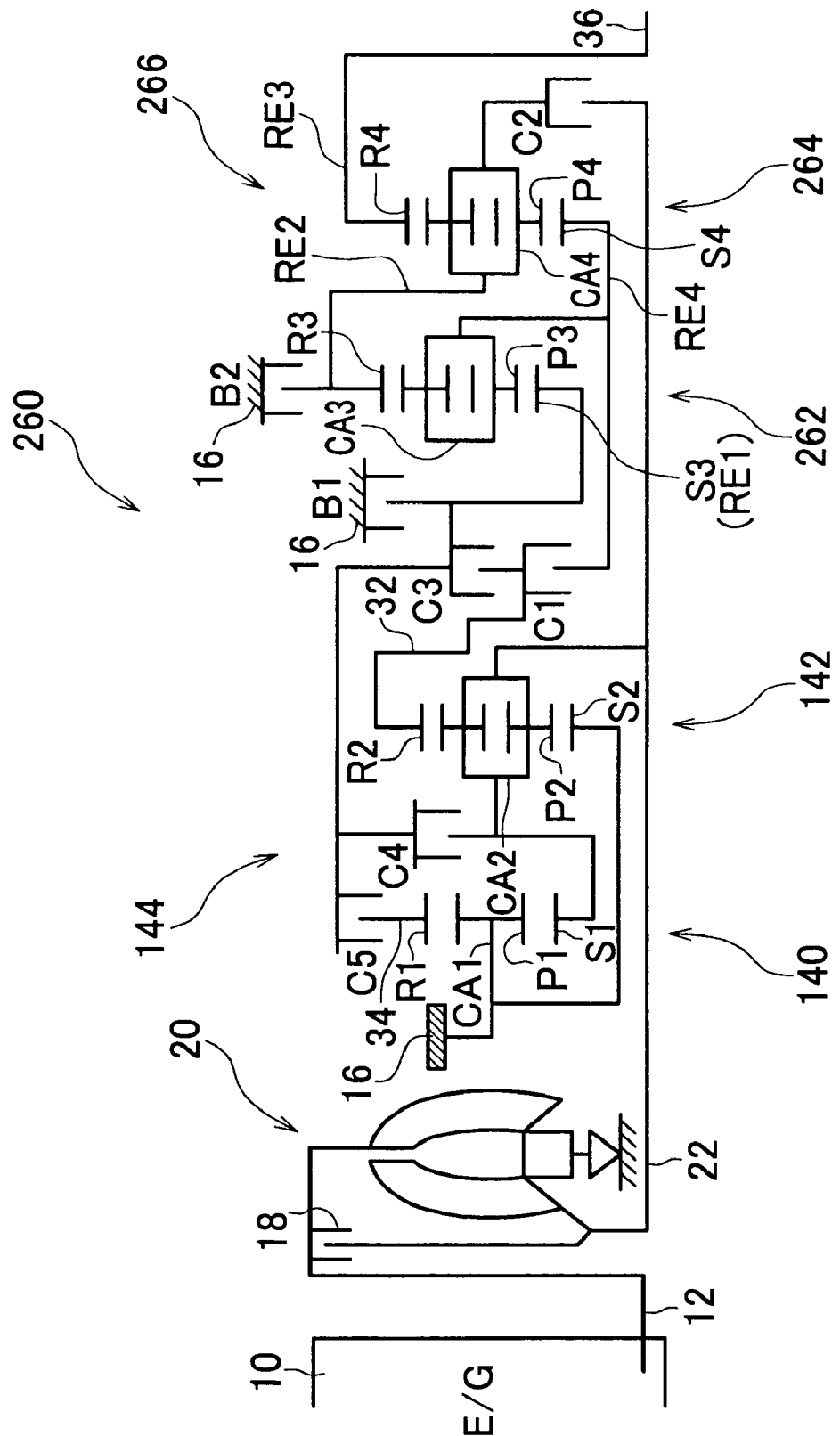
Figure 153:
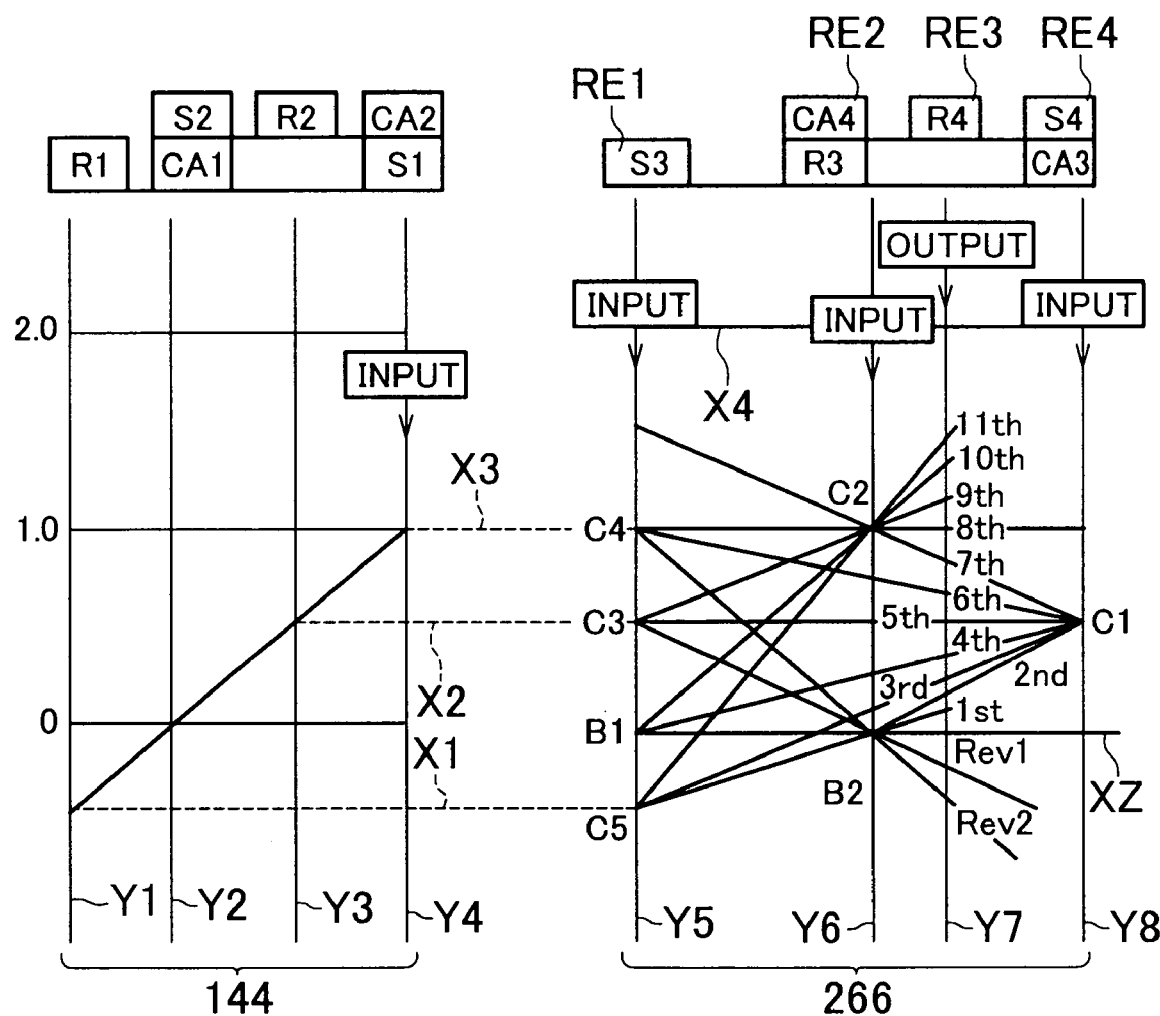
Figure 155:
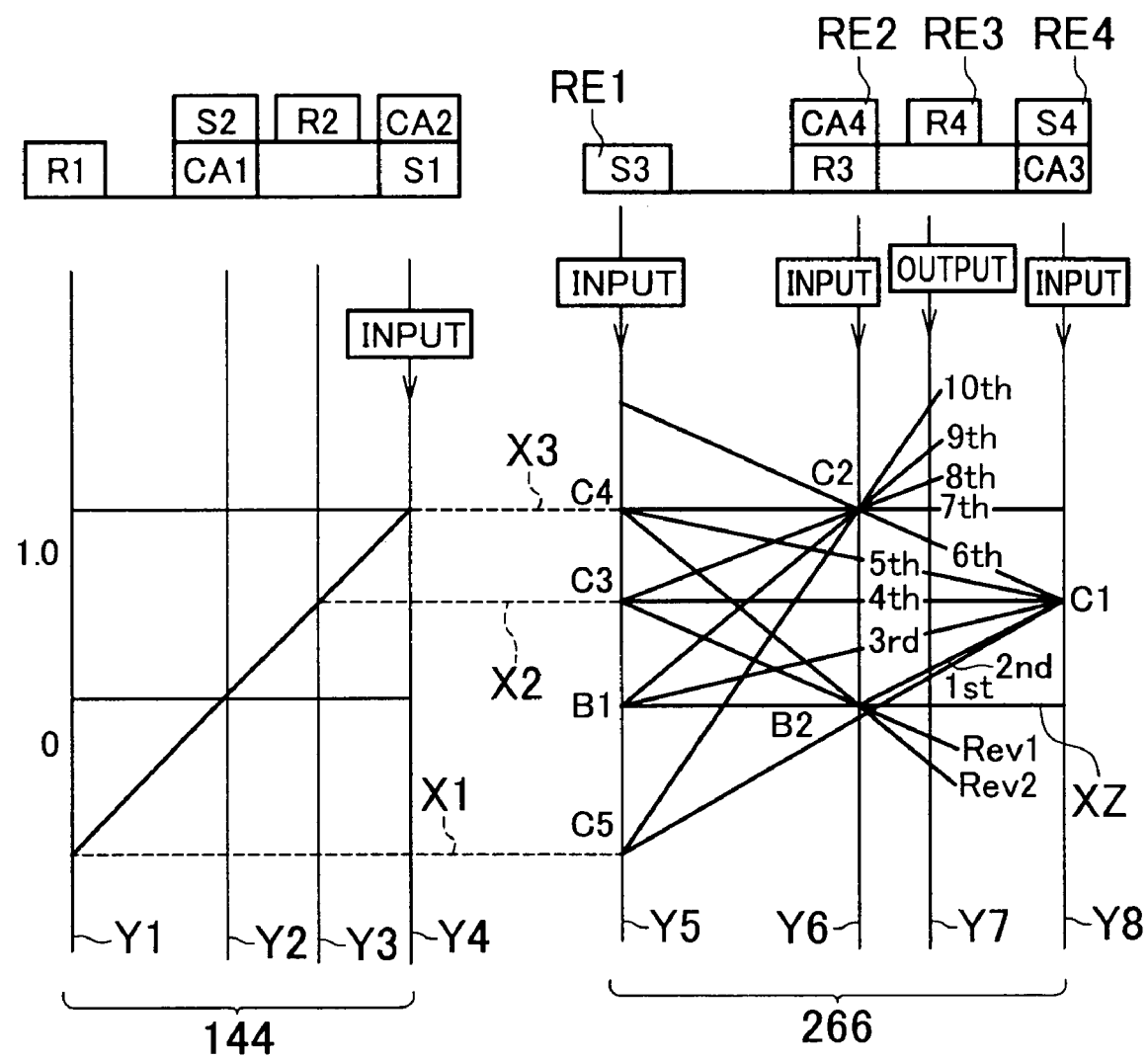
Figure 156:
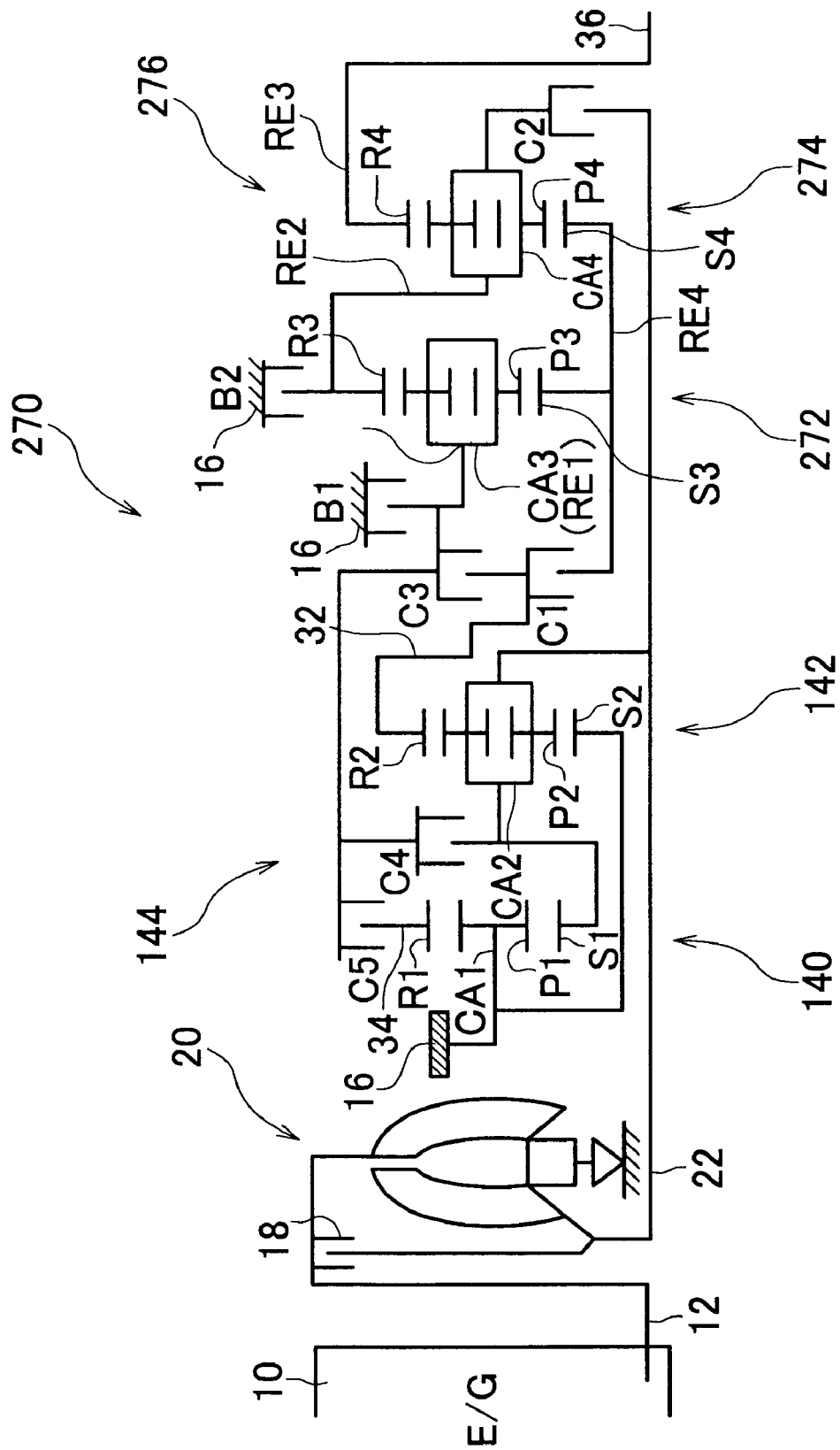
Figure 158:
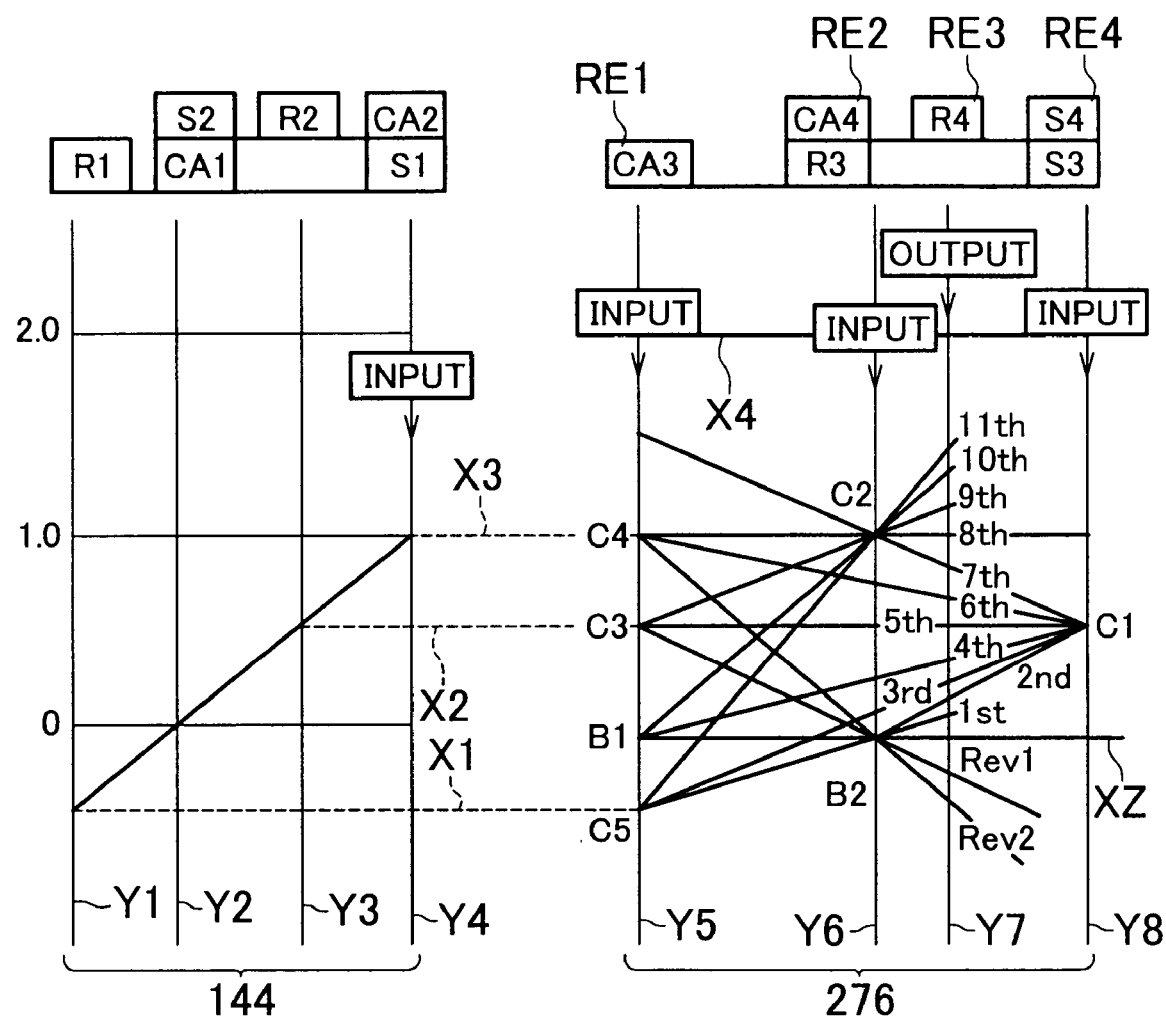
Figure 160:
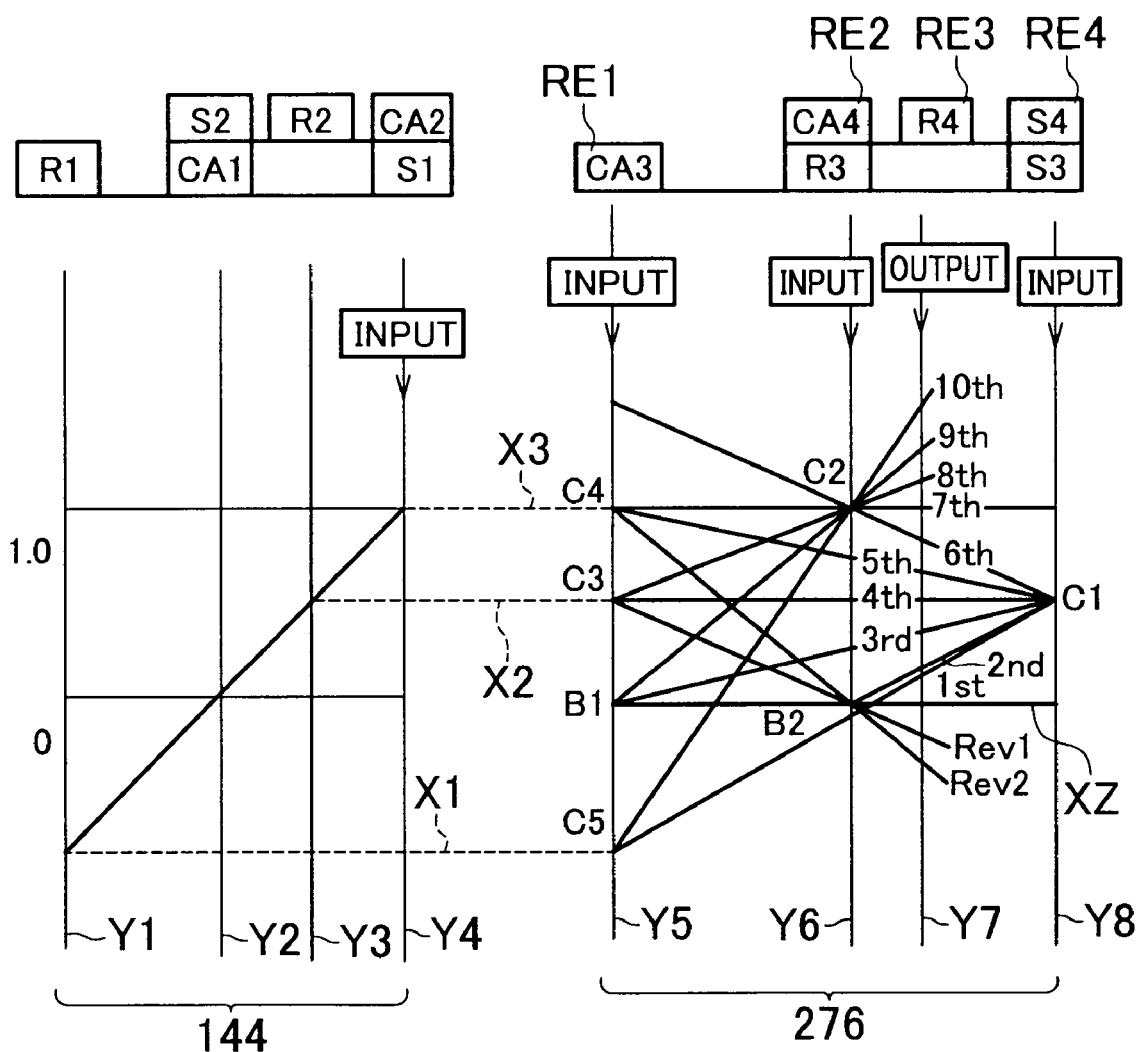
Figure 161:
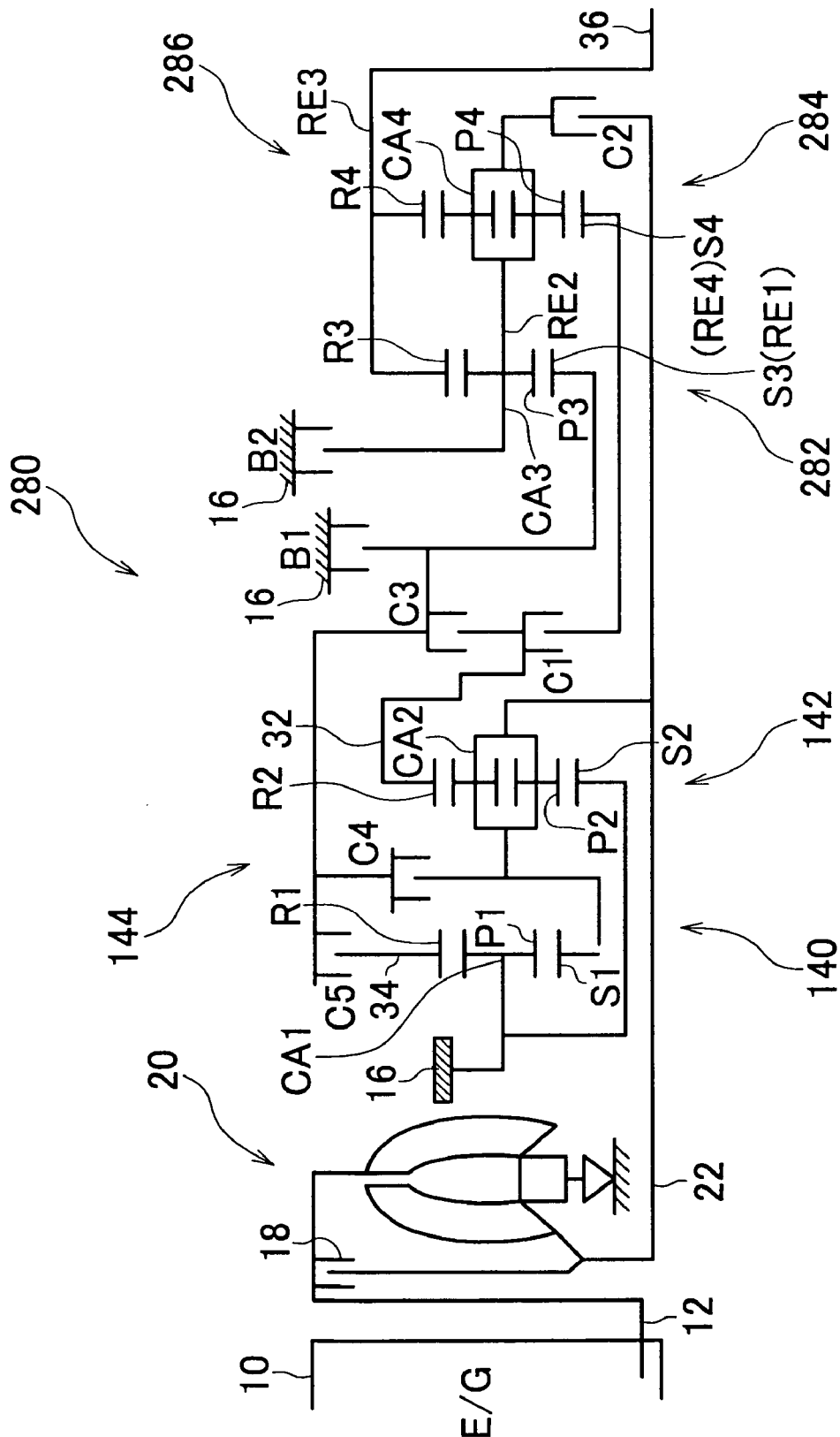
Figure 163:
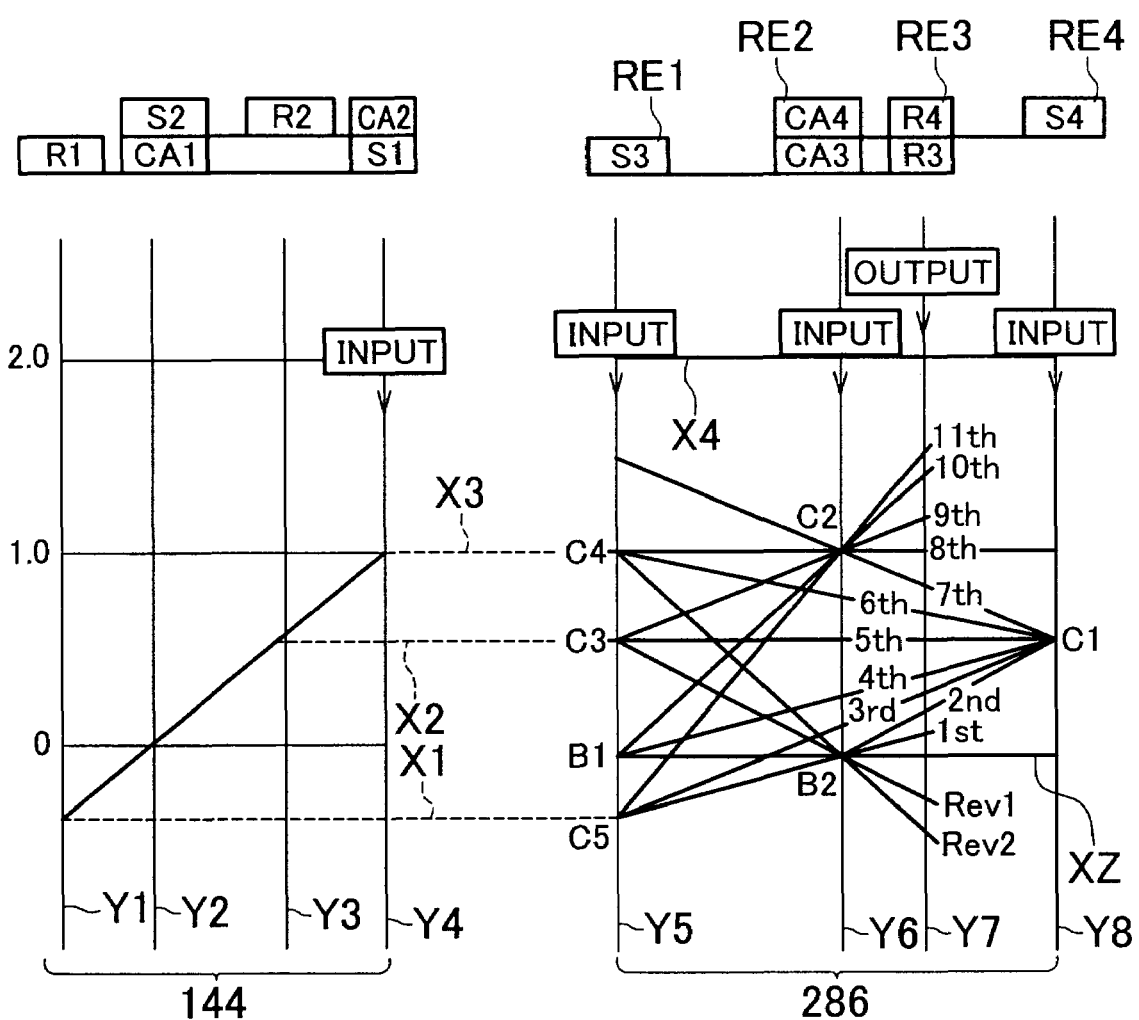

FIG. 131 is a skeleton view of the structure of a multi-speed transmission for a vehicle according to a fifteenth exemplary embodiment of the invention;

FIG. 132 is a clutch and brake engagement chart showing the relationship between preset gears and operations of hydraulic friction engagement devices to achieve those gears in the transmission according to the fifteenth exemplary embodiment of the invention;

FIG. 133 is an alignment graph which is able to express, with straight lines, the relative relationships between the rotation speeds of various rotating elements which are connected differently in each gear in the transmission according to the fifteenth exemplary embodiment of the invention;

FIG. 134 is a skeleton view of the structure of a multi-speed transmission for a vehicle according to a sixteenth exemplary embodiment of the invention;

FIG. 135 is a clutch and brake engagement chart showing the relationship between preset gears and operations of hydraulic friction engagement devices to achieve those gears in the transmission according to the sixteenth exemplary embodiment of the invention;

FIG. 136 is an alignment graph which is able to express, with straight lines, the relative relationships between the rotation speeds of various rotating elements which are connected differently in each gear in the transmission according to the sixteenth exemplary embodiment of the invention;

FIG. 137 is a skeleton view of the structure of a multi-speed transmission for a vehicle according to a seventeenth exemplary embodiment of the invention;

FIG. 138 is a clutch and brake engagement chart showing the relationship between preset gears and operations of hydraulic friction engagement devices to achieve those gears in the transmission according to the seventeenth exemplary embodiment of the invention;

FIG. 139 is an alignment graph which is able to express, with straight lines, the relative relationships between the rotation speeds of various rotating elements which are connected differently in each gear in the transmission according to the seventeenth exemplary embodiment of the invention;

FIG. 140 is a skeleton view of the structure of a multi-speed transmission for a vehicle according to an eighteenth exemplary embodiment of the invention;

FIG. 141 is a clutch and brake engagement chart showing the relationship between preset gears and operations of hydraulic friction engagement devices to achieve those gears in the transmission according to the eighteenth exemplary embodiment of the invention;

FIG. 142 is an alignment graph which is able to express, with straight lines, the relative relationships between the rotation speeds of various rotating elements which are connected differently in each gear in the transmission according to the eighteenth exemplary embodiment of the invention;

FIG. 143 is a clutch and brake engagement chart showing the relationship between preset gears and operations of hydraulic friction engagement devices to achieve those gears in a transmission according to a first modified example of the eighteenth exemplary embodiment of the invention;

FIG. 144 is an alignment graph which is able to express, with straight lines, the relative relationships between the rotation speeds of various rotating elements which are connected differently in each gear in the transmission according to the first modified example of the eighteenth exemplary embodiment of the invention;

FIG. 145 is a skeleton view of the structure of a multi-speed transmission for a vehicle according to a nineteenth exemplary embodiment of the invention;

FIG. 146 is a clutch and brake engagement chart showing the relationship between preset gears and operations of hydraulic friction engagement devices to achieve those gears in the transmission according to the nineteenth exemplary embodiment of the invention;

FIG. 147 is an alignment graph which is able to express, with straight lines, the relative relationships between the rotation speeds of various rotating elements which are connected differently in each gear in the transmission according to the nineteenth exemplary embodiment of the invention;

FIG. 148 is a skeleton view of the structure of a multi-speed transmission for a vehicle according to a twentieth exemplary embodiment of the invention;

FIG. 149 is a clutch and brake engagement chart showing the relationship between preset gears and operations of hydraulic friction engagement devices to achieve those gears in the transmission according to the twentieth exemplary embodiment of the invention;

FIG. 150 is an alignment graph able to express, with straight lines, the relative relationships between the rotation speeds of various rotating elements which are connected differently in each gear in the transmission according to the twentieth exemplary embodiment of the invention;

FIG. 151 is a skeleton view of the structure of a multi-speed transmission for a vehicle according to a twenty-first exemplary embodiment of the invention;

FIG. 152 is a clutch and brake engagement chart showing the relationship between preset gears and operations of hydraulic friction engagement devices to achieve those gears in the transmission according to the twenty-first exemplary embodiment of the invention;

FIG. 153 is an alignment graph able to express, with straight lines, the relative relationships between the rotation speeds of various rotating elements which are connected differently in each gear in the transmission according to the twenty-first exemplary embodiment of the invention;

FIG. 154 is a clutch and brake engagement chart showing the relationship between preset gears and operations of hydraulic friction engagement devices to achieve those gears in the transmission according to a first modified example of the twenty-first exemplary embodiment of the invention;

FIG. 155 is an alignment graph able to express, with straight lines, the relative relationships between the rotation speeds of various rotating elements which are connected differently in each gear in the transmission according to the first modified example of the twenty-first exemplary embodiment of the invention;

FIG. 156 is a skeleton view of the structure of a multi-speed transmission for a vehicle according to a twenty-second exemplary embodiment of the invention;

FIG. 157 is a clutch and brake engagement chart showing the relationship between preset gears and operations of hydraulic friction engagement devices to achieve those gears in the transmission according to the twenty-second exemplary embodiment of the invention;

FIG. 158 is an alignment graph able to express, with straight lines, the relative relationships between the rotation speeds of various rotating elements which are connected differently in each gear in the transmission according to the twenty-second exemplary embodiment of the invention;

FIG. 159 is a clutch and brake engagement chart showing the relationship between preset gears and operations of hydraulic friction engagement devices to achieve those gears in the transmission according to a first modified example of the twenty-second exemplary embodiment of the invention;

FIG. 160 is an alignment graph able to express, with straight lines, the relative relationships between the rotation speeds of various rotating elements which are connected differently in each gear in the transmission according to the first modified example of the twenty-second exemplary embodiment of the invention;

FIG. 161 is a skeleton view of the structure of a multi-speed transmission for a vehicle according to a twenty-third exemplary embodiment of the invention;

FIG. 162 is a clutch and brake engagement chart showing the relationship between preset gears and operations of hydraulic friction engagement devices to achieve those gears in the transmission according to the twenty-third exemplary embodiment of the invention; and FIG. 163 is an alignment graph able to express, with straight lines, the relative relationships between the rotation speeds of various rotating elements which are connected differently in each gear in the transmission according to the twenty-third exemplary embodiment of the invention.

DETAILED DESCRIPTION OF THE EXEMPLARY EMBODIMENTS

In the following description and the accompanying drawings, the invention will be described in more detail with reference to exemplary embodiments.

Figure 1:
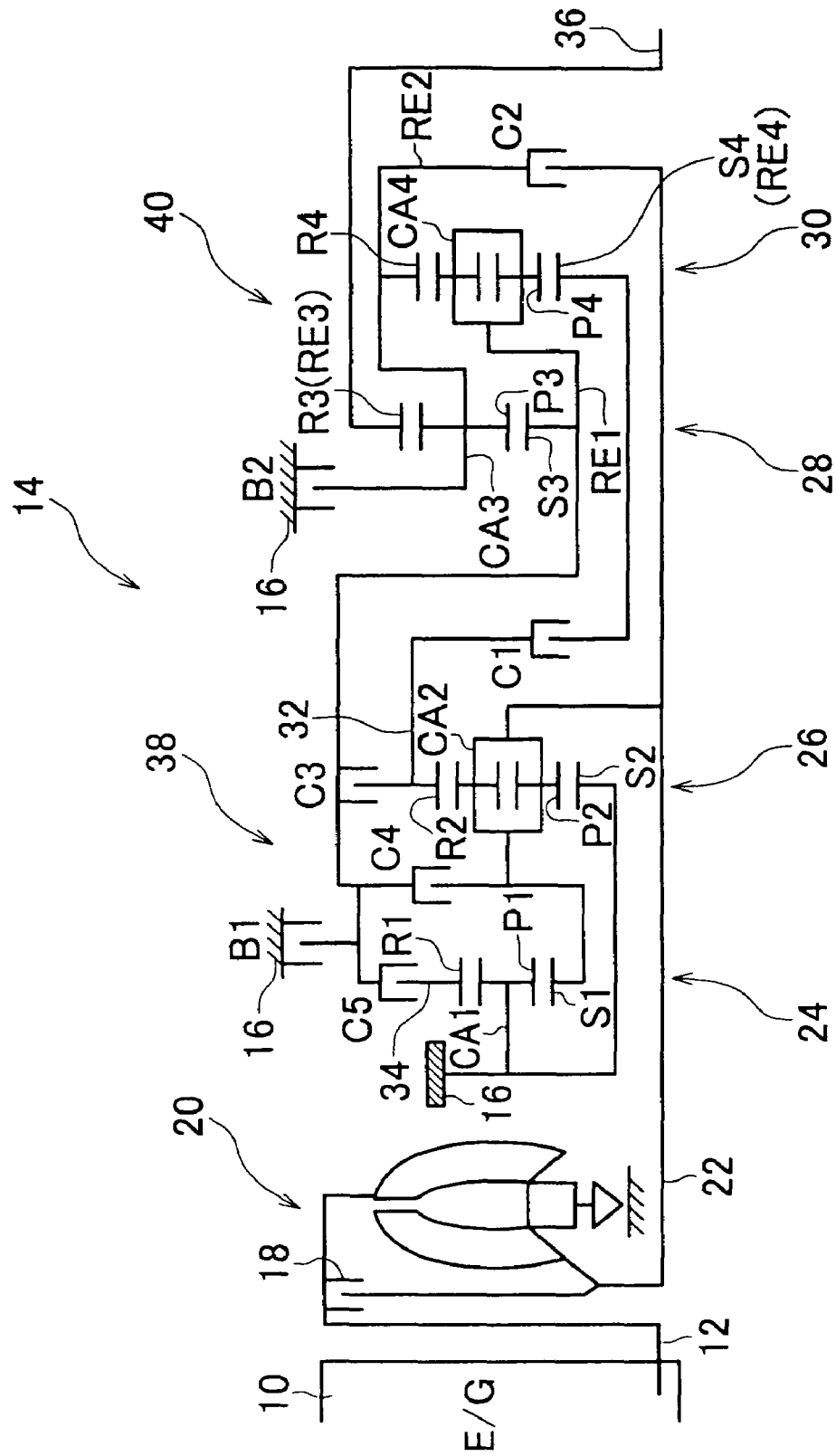
FIG. 1 is a skeleton view of the structure of a multi-speed transmission for a vehicle according to a first exemplary embodiment of the invention.

FIG. 1 is a skeleton view of the structure of a multi-speed transmission for a vehicle (hereinafter, simply referred to as "transmission") 14 according to a first exemplary embodiment as one example that can be used as an automatic transmission for a vehicle. As shown in FIG. 1, the transmission 14 according to this exemplary embodiment includes a torque converter 20 with a lock-up clutch 18, an input shaft 22 which serves as an input rotating member that is connected to the torque converter 20, a first transmitting portion 38 which includes as its main components a first front planetary gear set 24 and a second front planetary gear set 26, a second transmitting portion 40 which includes as its main components a first rear planetary gear set 28 and a second rear planetary gear set 30, a first intermediate output member 32 and a second intermediate output member 34 for transmitting power from the first transmitting portion 38 to the second transmitting portion 40, and a output shaft 36 which serves as an output rotating member. These components are all arranged on a common axis in order from the engine side in a transmission case 16 which is a non-rotating member mounted to a vehicle body.

The transmission 14 is preferably used as, for example, an automatic transmission for a FR (front-engine-rear-wheel-drive) vehicle which is longitudinal mounted in the vehicle or an automatic transmission for an FF (front-engine-front-wheel-drive) vehicle which is transverse mounted in the vehicle. The transmission 14 is arranged between an engine 10, which serves as the prime mover, and driven wheels, not shown. The transmission 14 changes the speed and/or direction of the rotation output from the engine 10, and then transmits that changed rotation to the driven wheels. The torque converter 20 is operationally connected to a crankshaft 12 of the engine 10 and outputs power which has been output from the engine 10 to the input shaft 22. That is, the input shaft 22, which is connected to a turbine shaft that serves as an output side rotating member of the torque converter 20, is rotatably driven by the engine 10. The turbine shaft of the torque converter 20 also corresponds to an input rotating member just like the input shaft 22. Further, the output shaft 36 rotatably drives a pair of left and right driven wheels via, for example, a differential gear unit and the like, not shown. The transmission 14 is symmetrical with respect to its axis so the lower part thereof will be omitted from the skeleton view shown in FIG. 1, as well as from the skeleton views referred to in the descriptions hereinafter.

The first front planetary gear set 24 which makes up part of the first transmitting portion 38 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. The second front planetary gear set 26 which also makes up part of the first transmitting portion 38 is a double pinion type planetary gear set which includes a sun gear S2, a plurality of sets of pinions P2 which are in mesh with each other, a carrier CA2 which rotatably and revolvably supports the pinions P2, and a ring gear R2 that is in mesh with the sun gear S2 via the pinions P2.

In the first transmitting portion 38, the carrier CA1 of the first front planetary gear set 24 and the sun gear S2 of the second front planetary gear set 26 are integrally connected to the transmission case 16, which is a non-rotating member, thus preventing the carrier CA1 and the sun gear S2 from rotating with respect to the transmission case 16. Also, the sun gear S1 of the first front planetary gear set 24 and the carrier CA2 of the second front planetary gear set 26 are integrally connected to the input shaft 22 which is the input rotating member. Further, the ring gear R2 of the second front planetary gear set 26 is integrally connected to the first intermediate output member 32, and the ring gear R1 of the first front planetary gear set 24 is integrally connected to the second intermediate output member 34. This kind of structure results in the first transmitting portion 38 slowing down the rotation from the input shaft 22 and transmitting that slowed rotation to the second transmitting portion 40 via the first intermediate output member 32, and reversing the rotation from the input shaft 22 and transmitting that reverse rotation to the second transmitting portion 40 via the second intermediate output member 34.

The first rear planetary gear set 28 which makes up part of the second transmitting portion 40 is a single pinion type planetary gear set which includes a sun gear S3, a pinion P3, a carrier CA3 which rotatably and revolvably supports the pinion P3, and a ring gear R3 that is in mesh with the sun gear S3 via the pinion P3. The second rear planetary gear set 30 which also makes up part of the second transmitting portion 40 is a double pinion type planetary gear set which includes a sun gear S4, a plurality of sets of pinions P4 which are in mesh with each other, a carrier CA4 which rotatably and revolvably supports the pinions P4, and a ring gear R4 that is in mesh with the sun gear S4 via the pinions P4.

In the second transmitting portion 40, the sun gear S3 of the first rear planetary gear set 28 and the carrier CA4 of the second rear planetary gear set 30 are connected together to form a first rotating element RE1. The carrier CA3 of the first rear planetary gear set 28 and the ring gear R4 of the second rear planetary gear set 30 are connected together to form a second rotating element RE2. The ring gear R3 of the first rear planetary gear set 28 forms a third rotating element RE3, and the sun gear S4 of the second rear planetary gear set 30 forms a fourth rotating element RE4. The transmission 14 also includes a first clutch C1, a second clutch C2, a third clutch C3, a fourth clutch C4, a fifth clutch C5, a first brake B1, and a second brake B2. The first clutch C1 is a first clutch element that selectively connects the first intermediate output member 32 with the fourth rotating element RE4. The second clutch C2 is a second clutch element that selectively connects the input shaft 22 with the second rotating element RE2. The third clutch C3 is a third clutch element that selectively connects the first intermediate output member 32 with the first rotating element RE1. The fourth clutch C4 is a fourth clutch element that selectively connects together the input shaft 22 and the first rotating element RE1. The fifth clutch C5 is a fifth clutch element that selectively connects together the second intermediate output member 34 and the first rotating element RE1. The first brake B1 is a first brake element that selectively holds the first rotating element RE1 to the transmission case 16 which is a non-rotating member, and the second brake B2 is a second brake element that selectively holds the second rotating element RE2 to the transmission case 16.

The first clutch C1, second clutch C2, third clutch C3, fourth clutch C4, fifth clutch C5, first brake B1, and second brake B2 are, for example, hydraulic friction engagement devices often used in a conventional automatic transmission for a vehicle. These clutches and brakes are devices that are used to selectively connect together separate members between which they are interposed, and may be, for example, wet multiple-disc devices in which a plurality of overlapping friction plates are pushed together by a hydraulic actuator, and band brakes in which one end of one or two bands wound around the outer peripheral surface of a rotating drum is tightened by a hydraulic actuator.

Figure 3:
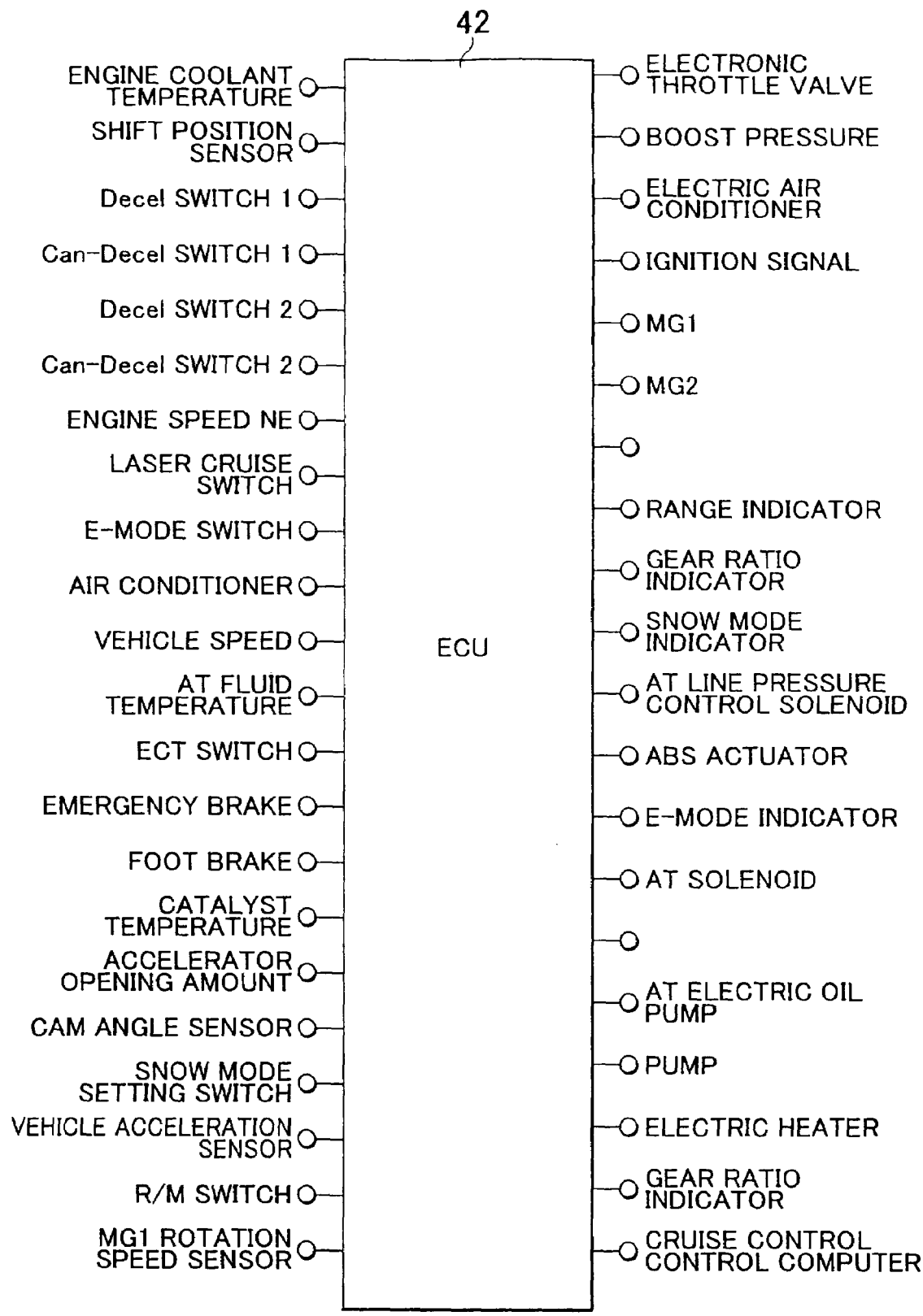
FIG. 3 is a view illustrating examples of signals input to an ECU for controlling the transmission shown in FIG. 1 and signals output from that ECU.

FIG. 3 illustrates signals input to an electronic control unit (ECU) 42 for controlling the transmission 14 and signals output from that ECU. This ECU 42 includes a so-called microcomputer that includes a CPU, ROM, RAM, and an input/output interface and the like. The ECU 42 executes drive control such as shift control in the transmission 14 by performing signal processing according to a program stored beforehand in the ROM while using the temporary storage function of the RAM.

Various signals output from various sensors and switches, not shown, are input to the ECU 42. Examples of these signals include a signal indicative of the engine coolant temperature, a signal indicative of the shift lever position, a signal indicative of the engine speed NE, i.e., the rotation speed of the engine 10, an air conditioner signal indicative of operation of an air conditioner, a vehicle speed signal which corresponds to the rotation speed of the output shaft 36, an AT fluid temperature signal indicative of the temperature of the hydraulic fluid in the transmission 14, a signal indicative of an emergency brake operation, a signal indicative of a foot brake operation, a catalyst temperature signal indicative of the catalyst temperature, an accelerator opening amount signal Acc indicative of the operating amount of an accelerator pedal, a cam angle signal, a snow mode setting signal indicative of a snow mode setting, a vehicle acceleration signal indicative of forward/reverse acceleration of the vehicle, and a signal indicative of the rotation speed of a first electric motor MG1, not shown. In addition, various signals are also output from the ECU 42. Examples of these signals include a drive signal to a throttle actuator which controls the opening amount of an electronic throttle valve, not shown, a boost pressure adjust signal for adjusting boost pressure, an electric air conditioner drive signal for operating an electric air conditioner, an ignition signal which directs the ignition timing of the engine 10, a command signal which directs operation of the first electric motor MG1 and a second electric motor MG2, not shown, a gear ratio indication signal for indicating the gear ratio, a snow mode indication signal for indicating when the snow mode has been set, an ABS activation signal for activating an ABS actuator which prevents the wheels of the vehicle from slipping during braking, an AT solenoid command signal which activates an electromagnetic valve for controlling a hydraulic pressure actuator of hydraulic friction engagement devices provided in the transmission 14, a drive command signal for activating an electric hydraulic pump, not shown, a signal for driving an electric heater, and a signal to a cruise control control computer.

FIG. 2 is a clutch and brake engagement chart showing the relationship between preset gears and operations of hydraulic friction engagement devices to achieve those gears in the transmission 14. In the transmission 14 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 2, for example, in response to a command from the ECU 42, and a gear ratio γ (=input shaft rotation speed NIN/output shaft rotation speed NOUT) that changes in substantially equal ratio is able to be achieved for each gear.

That is, as shown in FIG. 2, the first clutch C1 is engaged to connect the fourth rotating element RE4, i.e., the sun gear S4 of the second rear planetary gear set 30, with the first intermediate output member 32, while the fifth clutch C5 is engaged to connect the first rotating element RE1, i.e., the sun gear S3 of the first rear planetary gear set 28 and the carrier CA4 of the second rear planetary gear set 30 which are connected together, with the second intermediate output member 34, thereby establishing first gear which has the largest gear ratio γ1, e.g., approximately 4.648.

Also, the first clutch C1 is engaged to connect the fourth rotating element RE4, i.e., the sun gear S4 of the second rear planetary gear set 30, with the first intermediate output member 32, while the second brake B2 is engaged to hold the second rotating element RE2, i.e., the carrier CA3 of the first rear planetary gear set 28 and the ring gear R4 of the second rear planetary gear set 30 which are connected together, to the transmission case 16, thereby establishing second gear which has a gear ratio γ2 which is smaller than the gear ratio γ1 of first gear, e.g., approximately 4.100.

Further, the first clutch C1 is engaged to connect the fourth rotating element RE4, i.e., the sun gear S4 of the second rear planetary gear set 30, with the first intermediate output member 32, while the first brake B1 is engaged to hold the first rotating element RE1, i.e., the sun gear S3 of the first rear planetary gear set 28 and the carrier CA4 of the second rear planetary gear set 30 which are connected together, to the transmission case 16, thereby establishing third gear which has a gear ratio γ3 which is smaller than the gear ratio γ2 of second gear, e.g., approximately 2.578.

Also, the first clutch C1 is engaged to connect the fourth rotating element RE4, i.e., the sun gear S4 of the second rear planetary gear set 30, with the first intermediate output member 32, while the third clutch C3 is engaged to connect the first rotating element RE1, i.e., the sun gear S3 of the first rear planetary gear set 28 and the carrier CA4 of the second rear planetary gear set 30 which are connected together, with the first intermediate output member 32, thereby establishing fourth gear which has a gear ratio γ4 which is smaller than the gear ratio γ3 of third gear, e.g., approximately 1.786.

Further, the first clutch C1 is engaged to connect the fourth rotating element RE4, i.e., the sun gear S4 of the second rear planetary gear set 30, with the first intermediate output member 32, while the fourth clutch C4 is engaged to connect the first rotating element RE1, i.e., the sun gear S3 of the first rear planetary gear set 28 and the carrier CA4 of the second rear planetary gear set 30 which are connected together, with the input shaft 22, thereby establishing fifth gear which has a gear ratio γ5 which is smaller than the gear ratio γ4 of fourth gear, e.g., approximately 1.438.

Also, the first clutch C1 is engaged to connect the fourth rotating element RE4, i.e., the sun gear S4 of the second rear planetary gear set 30, with the first intermediate output member 32, while the second clutch C2 is engaged to connect the second rotating element RE2, i.e., the carrier CA3 of the first rear planetary gear set 28 and the ring gear R4 of the second rear planetary gear set 30 which are connected together, with the input shaft 22, thereby establishing sixth gear which has a gear ratio γ6 which is smaller than the gear ratio γ5 of fifth gear, e.g., approximately 1.237.

Further, the second clutch C2 is engaged to connect the second rotating element RE2, i.e., the carrier CA3 of the first rear planetary gear set 28 and the ring gear R4 of the second rear planetary gear set 30 which are connected together, with the input shaft 22, while the fourth clutch C4 is engaged to connect the first rotating element RE1, i.e., the sun gear S3 of the first rear planetary gear set 28 and the carrier CA4 of the second rear planetary gear set 30 which are connected together, with the input shaft 22, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the carrier CA3 of the first rear planetary gear set 28 and the ring gear R4 of the second rear planetary gear set 30 which are connected together, with the input shaft 22, while the third clutch C3 is engaged to connect the first rotating element RE1, i.e., the sun gear S3 of the first rear planetary gear set 28 and the carrier CA4 of the second rear planetary gear set 30 which are connected together, with the first intermediate output member 32, thereby establishing eighth gear which has a gear ratio γ8 which is smaller than the gear ratio γ7 of seventh gear, e.g., approximately 0.814.

Also, the second clutch C2 is engaged to connect the second rotating element RE2, i.e., the carrier CA3 of the first rear planetary gear set 28 and the ring gear R4 of the second rear planetary gear set 30 which are connected together, with the input shaft 22, while the first brake B1 is engaged to hold the first rotating element RE1, i.e., the sun gear S3 of the first rear planetary gear set 28 and the carrier CA4 of the second rear planetary gear set 30 which are connected together, to the transmission case 16, thereby establishing ninth gear which has a gear ratio γ9 which is smaller than the gear ratio γ8 of eighth gear, e.g., approximately 0.658.

Further, the second clutch C2 is engaged to connect the second rotating element RE2, i.e., the carrier CA3 of the first rear planetary gear set 28 and the ring gear R4 of the second rear planetary gear set 30 which are connected together, with the input shaft 22, while the fifth clutch C5 is engaged to connect the first rotating element RE1, i.e., the sun gear S3 of the first rear planetary gear set 28 and the carrier CA4 of the second rear planetary gear set 30 which are connected together, with the second intermediate output member 34, thereby establishing tenth gear which has the smallest gear ratio γ10, e.g., approximately 0.552.

Also, the third clutch C3 is engaged to connect the first rotating element RE1, i.e., the sun gear S3 of the first rear planetary gear set 28 and the carrier CA4 of the second rear planetary gear set 30 which are connected together, with the first intermediate output member 32, while the second brake B2 is engaged to hold the second rotating element RE2, i.e., the carrier CA3 of the first rear planetary gear set 28 and the ring gear R4 of the second rear planetary gear set 30 which are connected together, to the transmission case 16, thereby establishing first reverse gear "R1" which has a gear ratio γR1 of approximately 3.434.

Further, the fourth clutch C4 is engaged to connect the first rotating element RE1, i.e., the sun gear S3 of the first rear planetary gear set 28 and the carrier CA4 of the second rear planetary gear set 30 which are connected together, with the input shaft 22, while the second brake B2 is engaged to hold the second rotating element RE2, i.e., the carrier CA3 of the first rear planetary gear set 28 and the ring gear R4 of the second rear planetary gear set 30 which are connected together, to the transmission case 16, thereby establishing second reverse gear "R2" which has a gear ratio γR2 which is smaller than the gear ratio γR1 of the first reverse gear, e.g., 1.923. The gear ratio ρ1 of the first front planetary gear set 24, the gear ratio ρ2 of the second front planetary gear set 26, the gear ratio ρ3 of the first rear planetary gear set 28, and the gear ratio ρ4 of the second rear planetary gear set 30 are designed so that the foregoing gear ratios can be achieved.

In the transmission 14 that achieves the gears in accordance with the clutch and brake engagement chart shown in FIG. 2, the step which is the ratio of the gear ratio γ1 of the first gear to the gear ratio γ2 of the second gear (=γ1/γ2) is 1.133, the ratio of the gear ratio γ2 of the second gear to the gear ratio γ3 of the third gear (=γ2/γ3) is 1.591, the ratio of the gear ratio γ3 of the third gear to the gear ratio γ4 of the fourth gear (=γ3/γ4) is 1.443, the ratio of the gear ratio γ4 of the fourth gear to the gear ratio γ5 of the fifth gear (=γ4/γ5) is 1.241, the ratio of the gear ratio γ5 of the fifth gear to the gear ratio γ6 of the sixth gear (=γ5/γ6) is 1.163, the ratio of the gear ratio γ6 of the sixth gear to the gear ratio γ7 of the seventh gear (=γ6/γ7) is 1.237, the ratio of the gear ratio γ7 of the seventh gear to the gear ratio γ8 of the eighth gear (=γ7/γ8) is 1.229, the ratio of the gear ratio γ8 of the eighth gear to the gear ratio γ9 of the ninth gear (=γ8/γ9) is 1.237, and the ratio of the gear ratio γ9 of the ninth gear to the gear ratio γ10 of the tenth gear (=γ9/γ10) is 1.192. Thus, each gear ratio γ changes in substantially equal ratio. Also, the total gear ratio range, which is the ratio of the gear ratio γ1 of the first gear to the gear ratio γ10 of the tenth gear (=γ1/γ10), is 8.420, which is a relatively large value.

Figure 4:
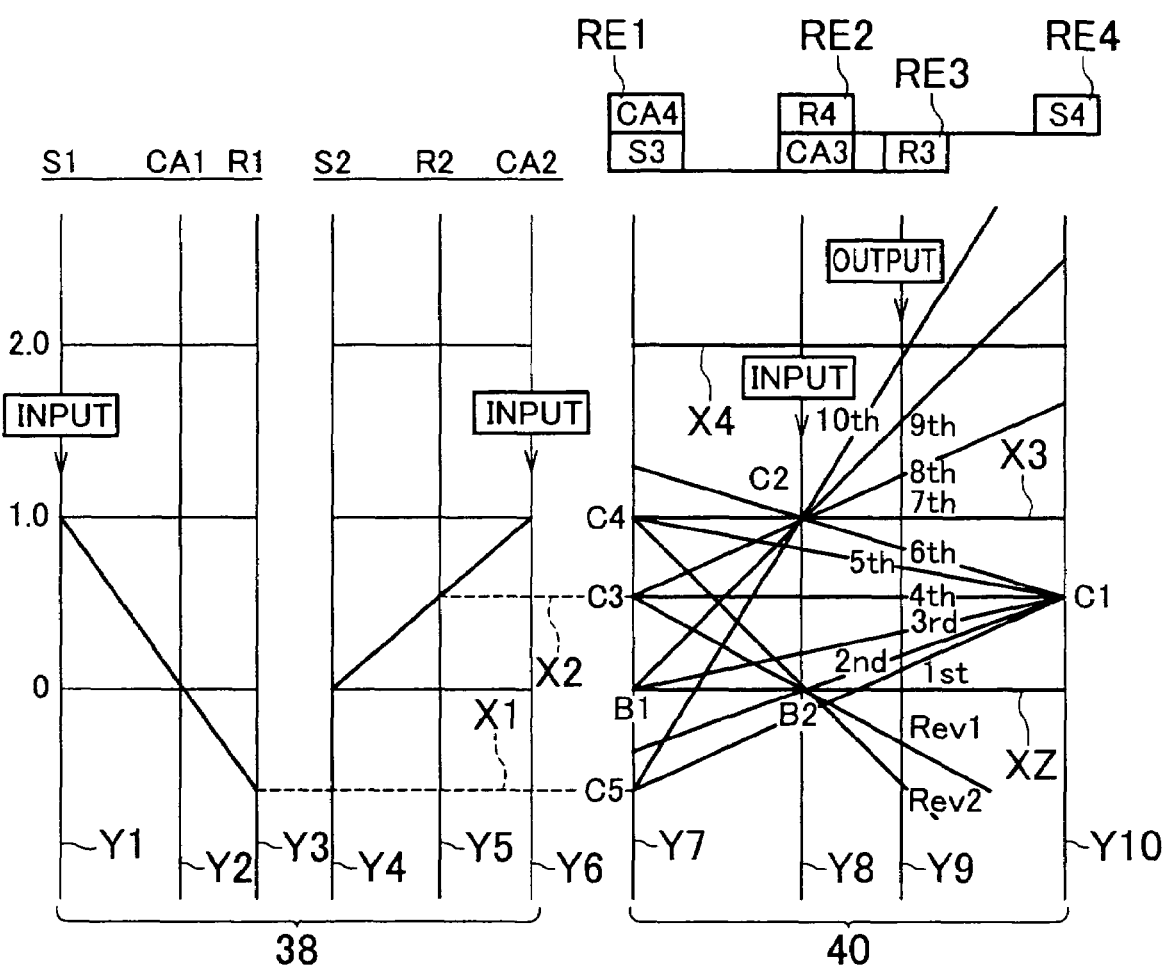
FIG. 4 is an alignment graph able to express, with straight lines, the relative relationships between the rotation speeds of various rotating elements which are connected differently in each gear in the transmission shown in FIG. 1.

FIG. 4 is an alignment graph able to express, with straight lines, the relative relationships between the rotation speeds of various rotating elements which are connected differently in each gear in the transmission 14. The alignment graph in FIG. 4 is a two-dimensional coordinate system which shows the relationships of the gear ratios p of each of the planetary gear sets 24, 26, 28, and 30 along the horizontal axis, and shows the relative rotation speed along the vertical axis. Of the five horizontal lines, the lowest horizontal line (i.e., a broken line) X1 indicates the rotation speed of the second intermediate output member 34, i.e., the output of the first transmitting portion 38. The horizontal line XZ right above the lowest horizontal line X1 indicates a rotation speed of zero. The horizontal line (i.e., a broken line) X2 right above the horizontal line XZ indicates the rotation speed of the first intermediate output member 32, i.e., the output of the first transmitting portion 38. The horizontal line X3 right above the horizontal line X2 indicates a rotation speed of "1.0", i.e., the rotation speed of the input shaft 22 which is the input rotating member. The uppermost horizontal line X4 indicates a rotation speed of "2.0", i.e., a rotation speed twice that of the input shaft 22. The six vertical lines Y1 through Y6 of the first transmitting portion 38 shown in the left portion of this alignment graph represent, in order from left to right, the sun gear S1 of the first front planetary gear set 24, the carrier CA1 of the first front planetary gear set 24, the ring gear R1 of the first front planetary gear set 24, the sun gear S2 of the second front planetary gear set 26, the ring gear R2 of the second front planetary gear set 26, and the carrier CA2 of the second front planetary gear set 26, respectively. The distances between these vertical lines are set according to the gear ratio ρ1 of the first front planetary gear set 24 and the gear ratio ρ2 of the second front planetary gear set 26. Similarly, the four vertical lines Y7 through Y10 shown in the right portion of this alignment graph represent components of the second transmitting portion 40. From left to right in the graph, line Y7 represents the sun gear S3 of the first rear planetary gear set 28 and the carrier CA4 of the second rear planetary gear set 30 which are connected together and correspond to the first rotating element RE1, line Y8 represents the carrier CA3 of the first rear planetary gear set 28 and the ring gear R4 of the second rear planetary gear set 30 which are connected together and correspond to the second rotating element RE2, line Y9 represents the ring gear R3 of the first transmitting portion 38 which corresponds to the third rotating element RE3, and line Y10 represents the sun gear S4 of the second rear planetary gear set 30 which corresponds to the fourth rotating element RE4. The distances between these vertical lines are set according to the gear ratio ρ3 of the first rear planetary gear set 28 and the gear ratio ρ4 of the second rear planetary gear set 30.

When expressed using the alignment graph, in the first transmitting portion 38 of the transmission 14 according to this exemplary embodiment, the sun gear S1, which is one of three rotating elements of the first front planetary gear set 24, is connected to the input shaft 22 which is an input rotating member. The carrier CA1 which is another of the three rotating elements is held to the transmission case 16, which is a non-rotating member, so as not to be able to rotate with respect thereto. The ring gear R1, which is the remaining third rotating element of the first front planetary gear set 24, is provided integrally with the second intermediate output member 34 and so functions similarly as a second intermediate output member, while being selectively connected to the first rotating element RE1 (S3, CA4) via the fifth clutch C5. Also, the sun gear S2, which is one of three rotating elements of the second front planetary gear set 26, is held to the transmission case 16, which is a non-rotating member, so as not to be able to rotate with respect thereto. The ring gear R2, which is another of the three rotating elements, is provided integrally with the first intermediate output member 32 and so functions similarly as a first intermediate output member, while being selectively connected to the first rotating element RE1 (S3, CA4) via the third clutch C3 as well as selectively connected to the fourth rotating element RE4 (S4) via the first clutch C1. The carrier CA2 which is the remaining third rotating element of the second front planetary gear set 26 is connected to the input shaft 22 which is the input rotating member. Further, in the second transmitting portion 40 of the transmission 14, the first rotating element RE1 (S3, CA4) is selectively connected to the first intermediate output member 32 via the third clutch C3, selectively connected to the input shaft 22 which is the input rotating member via the fourth clutch C4, and selectively connected to the second intermediate output member 34 via the fifth clutch C5, as well as selectively held to the transmission case 16, which is the non-rotating member, via the first brake B1. Also, the second rotating element RE2 (CA3, R4) is selectively connected to the input shaft 22, which is the input rotating member, via the second clutch C2, and is selectively held to the transmission case 16, which is the non-rotating member, via the second brake B2. Further, the third rotating element RE3 (R3) is provided integrally with the output shaft 36, which is the output rotating member, and so functions similarly as an output rotating member. Also, the fourth rotating element RE4 (S4) is selectively connected to the first intermediate output member 32 via the first clutch C1.

In the alignment graph in FIG. 4, in first gear, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, which results in the fourth rotating element RE4 rotating at the same speed as the first intermediate output member 32. Accordingly, the rotation speed of the output shaft 36 is indicated by the point (1st) where the straight line that connects the point of intersection of the vertical line Y7 and the horizontal line X1 with the point of intersection of the vertical line Y10 and the horizontal line X2, intersects with the vertical line Y9.

In second gear, the second brake B2 is engaged to hold the second rotating element RE2 to the transmission case 16, which results in the rotation speed of the second rotating element RE2 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y8 and the horizontal line XZ with the point of intersection of the vertical line Y10 and the horizontal line X2, intersects with the vertical line Y9.

In third gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the straight line that connects the point of intersection of the vertical line Y7 and the horizontal line XZ with the point of intersection of the vertical line Y10 and the horizontal line X2, intersects with the vertical line Y9.

In fourth gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the horizontal line X2 intersects with the vertical line Y9.

In fifth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the straight line that connects the point of intersection of the vertical line Y7 and the horizontal line X3 with the point of intersection of the vertical line Y10 and the horizontal line X2, intersects with the vertical line Y9.

In sixth gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (6th) where the straight line that connects the point of intersection of the vertical line Y8 and the horizontal line X3 with the point of intersection of the vertical line Y10 and the horizontal line X2, intersects with the vertical line Y9.

In seventh gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (7th) where the horizontal line X3 intersects with the vertical line Y9.

In eighth gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the straight line that connects the point of intersection of the vertical line Y7 and the horizontal line X2 with the point of intersection of the vertical line Y8 and the horizontal line X3, intersects with the vertical line Y9.

In ninth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y7 and the horizontal line XZ with the point of intersection of the vertical line Y8 and the horizontal line X3, intersects with the vertical line Y9.

In tenth gear, the fifth clutch C5 is engaged to connect the first rotating element RE1 to the second intermediate output member 34, resulting in the first rotating element RE1 rotating at the same speed as the second intermediate output member 34. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (10th) where the straight line that connects the point of intersection of the vertical line Y7 and the horizontal line X1 with the point of intersection of the vertical line Y8 and the horizontal line X3, intersects with the vertical line Y9.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y7 and the horizontal line X2 with the point of intersection of the vertical line Y8 and the horizontal line XZ, intersects with the vertical line Y9.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y7 and the horizontal line X3 with the point of intersection of the vertical line Y8 and the horizontal line XZ, intersects with the vertical line Y9.

In this way, according to this exemplary embodiment, the invention is able to provide a transmission 14 which achieves multiple speeds while maintaining good balance of the gear ratio steps between the gears. This transmission 14 is able to do this because it is provided with various components described above. More specifically, these components include the first transmitting portion 38, which includes both the first intermediate output member 32 that slows and then transmits the rotation from the input shaft 22 which is the input rotating member and the second intermediate output member 34 that reverses and then transmits the rotation from the input shaft 22, and the second transmitting portion 40 which includes four rotating elements that are formed by connecting together some of the sun gears, carriers, and ring gears of two planetary gear sets. The components of the transmission 14 also include the first clutch C1 which is the first clutch element that selectively connects the first intermediate output member 32 with the fourth rotating element RE4, the second clutch C2 which is the second clutch element that selectively connects the input shaft 22 with the second rotating element RE2, the third clutch C3 which is the third clutch element that selectively connects the first intermediate output member 32 with the first rotating element RE1, the fourth clutch C4 which is the fourth clutch element that selectively connects the input shaft 22 with the first rotating element RE1, the fifth clutch C5 which is the fifth clutch element that selectively connects the second intermediate output member 34 with the first rotating element RE1, the first brake B1 which is the first brake element that selectively holds the first rotating element RE1 to the transmission case 16 which is a non-rotating element, and the second brake B2 which is the second brake element that selectively holds the second rotating element RE2 to the transmission case 16, when the four rotating elements are denoted, in order from one end to the other, the first rotating element RE1, the second rotating element RE2, the third rotating element RE3, and the fourth rotating element RE4 in the alignment graph which is able to express with straight lines the rotation speed of the four rotating elements.

Further, first gear is established by engaging the first clutch C1 and the fifth clutch C5. Second gear is established by engaging the first clutch C1 and the second brake B2. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4. Eighth gear is established by engaging the second clutch C2 and the third clutch C3, and ninth gear is established by engaging the second clutch C2 and the first brake B1. Thus, the transmission 14 is able to achieve nine forward gears.

The transmission 14 is also able to achieve tenth gear by engaging the second clutch C2 and the fifth clutch C5. Therefore, in addition to being able to achieve ten forward gears, the step between ninth gear and tenth gear is able to be preferably set relatively small with a close ratio.

Further, the first transmitting portion 38 includes the single pinion type first front planetary gear set 24 and the double pinion type second front planetary gear set 26. The carrier CA1 of the first front planetary gear set 24 and the sun gear S2 of the second front planetary gear set 26 are always connected to the transmission case 16, which is a non-rotating member, and the sun gear S1 of the first front planetary gear set 24 and the carrier CA2 of the second front planetary gear set 26 are connected to the input shaft 22 which is the input rotating member. Accordingly, the ring gear R2 of the second front planetary gear set 26 functions as the first intermediate output member 32 while the ring gear R1 of the first front planetary gear set 24 functions as the second intermediate output member 34. Accordingly, a practical transmission 14 is able to be provided.

Also, the second transmitting portion 40 includes the single pinion type first rear planetary gear set 28 and the double pinion type second rear planetary gear set 30. The first rotating element RE1 is formed by the sun gear S3 of the first rear planetary gear set 28 and the carrier CA4 of the second rear planetary gear set 30 which are connected together. The second rotating element RE2 is formed by the carrier CA3 of the first rear planetary gear set 28 and the ring gear R4 of the second rear planetary gear set 30 which are connected together. The third rotating element RE3 is formed by the ring gear R3 of the first rear planetary gear set 28. The fourth rotating element RE4 is formed by the sun gear S4 of the second rear planetary gear set 30. Accordingly, a practical transmission 14 is able to be provided.

Also, with the transmission 14 of this exemplary embodiment, there is a good balance between the number of clutches and the number of brakes, and the positions of those clutches and brakes are relatively dispersed in the axial direction of the transmission 14, which facilitates the arrangement of oil passages to those clutches and brakes.

Further, the transmission 14 can also be used to achieve nine forward gears excluding the second gear in the clutch and brake engagement chart shown in FIG. 2 described above. That is, in the transmission 14, first gear can be established by engaging the first clutch C1 and the fifth clutch C5. Second gear can be established by engaging the first clutch C1 and the first brake B1. Third gear can be established by engaging the first clutch C1 and the third clutch C3. Fourth gear can be established by engaging the first clutch C1 and the fourth clutch C4. Fifth gear can be established by engaging the first clutch C1 and the second clutch C2. Sixth gear can be established by engaging the second clutch C2 and the fourth clutch C4. Seventh gear can be established by engaging the second clutch C2 and the third clutch C3. Eighth gear can be established by engaging the second clutch C2 and the first brake B1, and ninth gear can be established by engaging the second clutch C2 and the fifth clutch C5. Moreover, the transmission 14 can also be used to achieve nine forward gears excluding the first gear in the clutch and brake engagement chart shown in FIG. 2 described above.

Continuing on, a second exemplary embodiment of the invention will be described in detail with reference to the drawings. In the following description, parts in the second exemplary embodiment that are the same as parts in the first exemplary embodiment described above will be denoted by the same reference characters, and descriptions thereof will be omitted.

Figure 5:
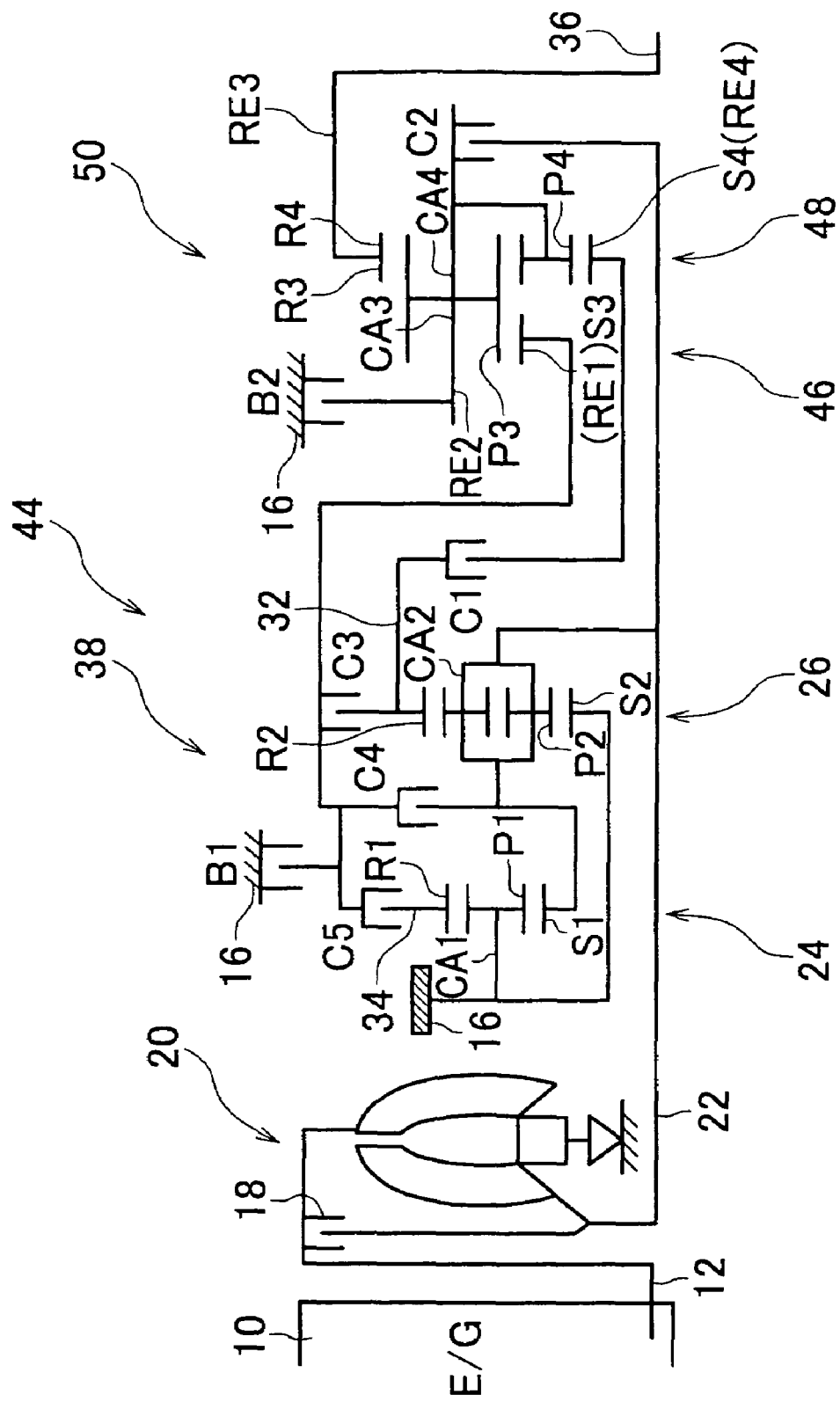
FIG. 5 is a skeleton view of the structure of a multi-speed transmission for a vehicle according to a second exemplary embodiment of the invention.
Figure 7:
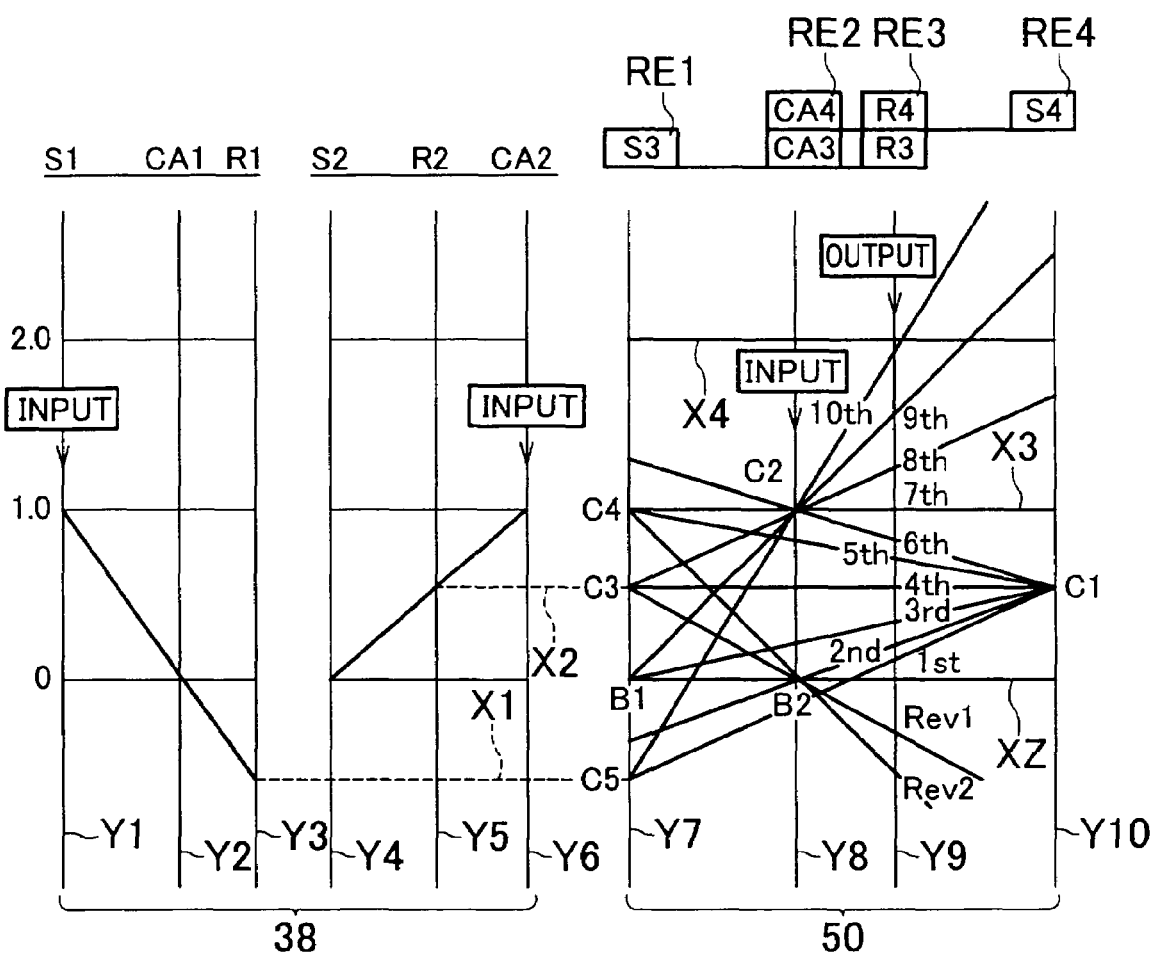
FIG. 7 is an alignment graph able to express, with straight lines, the relative relationships between the rotation speeds of various rotating elements which are connected differently in each gear in the transmission shown in FIG. 5.

FIG. 5 is a skeleton view of the structure of a transmission 44 according to the second exemplary embodiment of the invention. FIG. 6 is a clutch and brake engagement chart showing the relationship between preset gears and operations of hydraulic friction engagement devices to achieve those gears in the transmission 44. FIG. 7 is an alignment graph that shows the rotation speeds of rotating elements in each gear. With the exception of the structure of a second transmitting portion 50, the transmission 44 of this exemplary embodiment is similar in structure to the transmission 14 shown in FIG. 1, so effects equivalent to those obtained from the foregoing exemplary embodiment can be obtained with this exemplary embodiment. Hereinafter, parts of the transmission 44 of this exemplary embodiment which differ from parts of the transmission 14 will be described.

As shown in FIG. 5, a first rear planetary gear set 46 which makes up part of the second transmitting portion 50 is a single pinion type planetary gear set which includes a sun gear S3, a pinion P3, a carrier CA3 which rotatably and revolvably supports the pinion P3, and a ring gear R3 that is in mesh with the sun gear S3 via the pinion P3. The second rear planetary gear set 48 which also makes up part of the second transmitting portion 50 is a double pinion type planetary gear set which includes a sun gear S4, a plurality of sets of pinions P4 which are in mesh with each other, a carrier CA4 which rotatably and revolvably supports the pinions P4, and a ring gear R4 that is in mesh with the sun gear S4 via the pinions P4. The first rear planetary gear set 46 and the second rear planetary gear set 48 make up a Ravigneaux type planetary gear train in which the carrier CA3 and the carrier CA4 are common members, the ring gear R3 and the ring gear R4 are common members, and the pinion of the first rear planetary gear set 46 also serves as the second pinion of the second rear planetary gear set 48.

In the second transmitting portion 50 of the transmission 44, the first rotating element RE1 is formed by the sun gear S3 of the first rear planetary gear set 46. The second rotating element RE2 is formed by the carrier CA3 of the first rear planetary gear set 46 and the carrier CA4 of the second rear planetary gear set 48 which are connected together. The third rotating element RE3 is formed by the ring gear R3 of the first rear planetary gear set 46 and the ring gear R4 of the second rear planetary gear set 48 which are connected together, and the fourth rotating element RE4 is formed by the sun gear S4 of the second rear planetary gear set 48.

In the transmission 44 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 6, for example, in response to a command from the ECU 42, and a gear ratio γ (=input shaft rotation speed NIN/output shaft rotation speed NOUT) that changes in substantially equal ratio is able to be achieved for each gear.

In the alignment graph of FIG. 7, the four vertical lines Y7 through Y10 represent components of the second transmitting portion 50. From left to right in the graph, line Y7 represents the sun gear S3 of the first rear planetary gear set 46 which corresponds to the first rotating element RE1, line Y8 represents the carrier CA3 of the first rear planetary gear set 46 and the carrier CA4 of the second rear planetary gear set 48 which are connected together and correspond to the second rotating element RE2, line Y9 represents the ring gear R3 of the first rear planetary gear set 46 and the ring gear R4 of the second rear planetary gear set 48 which are connected together and correspond to the third rotating element RE3, and line Y10 represents the sun gear S4 of the second rear planetary gear set 48 which corresponds to the fourth rotating element RE4. Accordingly, based on these rotating elements, the alignment graph shown in FIG. 7 is similar to the alignment graph shown in FIG. 4 described above so a description thereof will be omitted.

In this way, according to this exemplary embodiment, the second transmitting portion 50 includes the single pinion type first rear planetary gear set 46 and the double pinion type second rear planetary gear set 48. The first rotating element RE1 is formed by the sun gear S3 of the first rear planetary gear set 46. The second rotating element RE2 is formed by the carrier CA3 of the first rear planetary gear set 46 and the carrier CA4 of the second rear planetary gear set 48 which are connected together. The third rotating element RE3 is formed by the ring gear R3 of the first rear planetary gear set 46 and the ring gear R4 of the second rear planetary gear set 48 which are connected together, and the fourth rotating element RE4 is formed by the sun gear S4 of the second rear planetary gear set 48. Accordingly, a practical transmission 44 is able to be provided.

Figure 9:
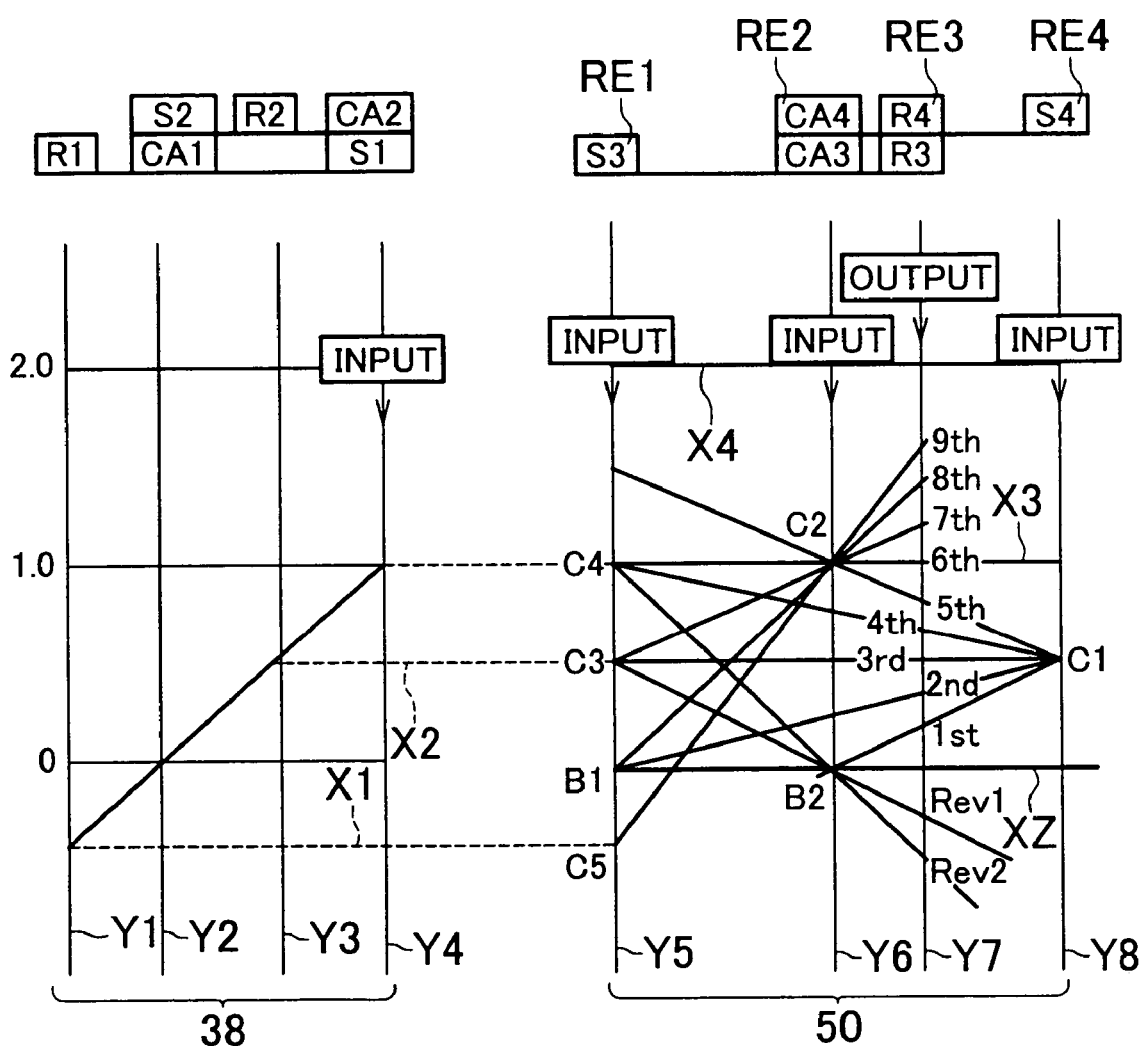
FIG. 9 is an alignment graph corresponding to FIG. 8, which is able to express, with straight lines, the relative relationships between the rotation speeds of various rotating elements which are connected differently in each gear in the transmission according to the first modified example of the second exemplary embodiment of the invention.

Here, as a first modified example of the second exemplary embodiment, the transmission 44 can achieve nine forward gears and two reverse gears by engaging the clutches and brakes in different combinations, as shown in FIG. 8, in response to a command from the ECU 42, and suitably setting the gear ratio of each planetary gear set. FIG. 9 is an alignment graph corresponding to FIG. 8, which shows the rotation speeds of the rotating elements in each gear. Hereinafter, the clutch and brake engagement chart and alignment graph of the first modified example of the second exemplary embodiment shown in FIGS. 8 and 9, which differ from those of the foregoing exemplary embodiment, will be described.

As shown in the clutch and brake engagement chart in FIG. 8, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 8, the first clutch C1 is engaged to connect the fourth rotating element RE4, i.e., the sun gear S4 of the second rear planetary gear set 48, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first gear which has the largest gear ratio γ1, e.g., approximately 4.776.

Also, the first clutch C1 is engaged to connect the fourth rotating element RE4, i.e., the sun gear S4 of the second rear planetary gear set 48, with the first intermediate output member 32, while the first brake B1 is engaged to hold the first rotating element RE1, i.e., the sun gear S3 of the first rear planetary gear set 46, to the transmission case 16, thereby establishing second gear which has a gear ratio γ2 which is smaller than the gear ratio γ1 of first gear, e.g., approximately 2.925.

Further, the first clutch C1 is engaged to connect the fourth rotating element RE4, i.e., the sun gear S4 of the second rear planetary gear set 48, with the first intermediate output member 32, while the third clutch C3 is engaged to connect the first rotating element RE1, i.e., the sun gear S3 of the first rear planetary gear set 46, with the first intermediate output member 32, thereby establishing third gear which has a gear ratio γ3 which is smaller than the gear ratio γ2 of second gear, e.g., approximately 2.000.

Also, the first clutch C1 is engaged to connect the fourth rotating element RE4, i.e., the sun gear S4 of the second rear planetary gear set 48, with the first intermediate output member 32, while the fourth clutch C4 is engaged to connect the first rotating element RE1, i.e., the sun gear S3 of the first rear planetary gear set 46, with the input shaft 22, thereby establishing fourth gear which has a gear ratio γ4 which is smaller than the gear ratio γ3 of third gear, e.g., approximately 1.519.

Further, the first clutch C1 is engaged to connect the fourth rotating element RE4, i.e., the sun gear S4 of the second rear planetary gear set 48, with the first intermediate output member 32, while the second clutch C2 is engaged to connect the second rotating element RE2, i.e., carrier CA3 of the first rear planetary gear set 46 and the carrier CA4 of the second rear planetary gear set 48 which are connected together, with the input shaft 22, thereby establishing fifth gear which has a gear ratio γ5 which is smaller than the gear ratio γ4 of fourth gear, e.g., approximately 1.265.

Also, the second clutch C2 is engaged to connect the second rotating element RE2, i.e., carrier CA3 of the first rear planetary gear set 46 and the carrier CA4 of the second rear planetary gear set 48 which are connected together, with the input shaft 22, while the fourth clutch C4 is engaged to connect the first rotating element RE1, i.e., the sun gear S3 of the first rear planetary gear set 46, with the input shaft 22, thereby establishing sixth gear which has a gear ratio γ6 which is smaller than the gear ratio γ5 of fifth gear, e.g., approximately 1.000.

Further, the second clutch C2 is engaged to connect the second rotating element RE2, i.e., carrier CA3 of the first rear planetary gear set 46 and the carrier CA4 of the second rear planetary gear set 48 which are connected together, with the input shaft 22, while the third clutch C3 is engaged to connect the first rotating element RE1, i.e., the sun gear S3 of the first rear planetary gear set 46, with the first intermediate output member 32, thereby establishing seventh gear which has a gear ratio γ7 which is smaller than the gear ratio γ6 of sixth gear, e.g., approximately 0.800.

Further, the second clutch C2 is engaged to connect the second rotating element RE2, i.e., carrier CA3 of the first rear planetary gear set 46 and the carrier CA4 of the second rear planetary gear set 48 which are connected together, with the input shaft 22, while the first brake B1 is engaged to hold the first rotating element RE1, i.e., the sun gear S3 of the first rear planetary gear set 46, to the transmission case 16, thereby establishing eighth gear which has a gear ratio γ8 which is smaller than the gear ratio γ7 of seventh gear, e.g., approximately 0.667.

Also, the second clutch C2 is engaged to connect the second rotating element RE2, i.e., carrier CA3 of the first rear planetary gear set 46 and the carrier CA4 of the second rear planetary gear set 48 which are connected together, with the input shaft 22, while the fifth clutch C5 is engaged to connect the first rotating element RE1, i.e., the sun gear S3 of the first rear planetary gear set 46, with the second intermediate output member 34, thereby establishing ninth gear which has the smallest gear ratio γ9, e.g., approximately 0.588.

Also, the third clutch C3 is engaged to connect the first rotating element RE1, i.e., the sun gear S3 of the first rear planetary gear set 46, with the first intermediate output member 32, while the second brake B2 is engaged to hold the second rotating element RE2, i.e., carrier CA3 of the first rear planetary gear set 46 and the carrier CA4 of the second rear planetary gear set 48 which are connected together, to the transmission case 16, thereby establishing first reverse gear "R1" which has a gear ratio γR1 of approximately 4.000.

Further, the fourth clutch C4 is engaged to connect the first rotating element RE1, i.e., the sun gear S3 of the first rear planetary gear set 46, with the input shaft 22, while the second brake B2 is engaged to hold the second rotating element RE2, i.e., carrier CA3 of the first rear planetary gear set 46 and the carrier CA4 of the second rear planetary gear set 48 which are connected together, to the transmission case 16, thereby establishing second reverse gear "R2" which has a gear ratio γR2 which is smaller than the gear ratio γR1 of the first reverse gear, e.g., 2.000. The gear ratio ρ1 of the first front planetary gear set 24, the gear ratio ρ2 of the second front planetary gear set 26, the gear ratio ρ3 of the first rear planetary gear set 46, and the gear ratio ρ4 of the second rear planetary gear set 48 are designed so that the foregoing gear ratios can be achieved.

In the transmission 44 that achieves the gears in accordance with the clutch and brake engagement chart shown in FIG. 8, the ratio of the gear ratio γ1 of the first gear to the gear ratio γ2 of the second gear (=γ1/γ2) is 1.633, the ratio of the gear ratio γ2 of the second gear to the gear ratio γ3 of the third gear (=γ2/γ3) is 1.463, the ratio of the gear ratio γ3 of the third gear to the gear ratio γ4 of the fourth gear (=γ3/γ4) is 1.316, the ratio of the gear ratio γ4 of the fourth gear to the gear ratio γ5 of the fifth gear (=γ4/γ5) is 1.201, the ratio of the gear ratio γ5 of the fifth gear to the gear ratio γ6 of the sixth gear (=γ5/γ6) is 1.265, the ratio of the gear ratio γ6 of the sixth gear to the gear ratio γ7 of the seventh gear (=γ6/γ7) is 1.250, the ratio of the gear ratio γ7 of the seventh gear to the gear ratio γ8 of the eighth gear (=γ7/γ8) is 1.200, and the ratio of the gear ratio γ8 of the eighth gear to the gear ratio γ9 of the ninth gear (=γ8/γ9) is 1.133. Thus, each gear ratio γ changes in substantially equal ratio. Also, the total gear ratio range, which is the ratio of the gear ratio γ1 of the first gear to the gear ratio γ9 of the ninth gear (=γ1/γ9), is 8.119, which is a relatively large value.

In the alignment graph shown in FIG. 9, the four vertical lines Y1 through Y4 represent components of the first transmitting portion 38. From left to right in the graph, line Y1 represents the ring gear R1 of the first front planetary gear set 24, line Y2 represents the carrier CA1 of the first front planetary gear set 24 and the sun gear S2 of the second front planetary gear set 26 which are connected together, line Y3 represents the ring gear R2 of the second front planetary gear set 26, and line Y4 represents the sun gear S1 of the first front planetary gear set 24 and the carrier CA2 of the second front planetary gear set 26 which are connected together. Further, the four vertical lines Y5 through Y8 represent components of the second transmitting portion 50. From left to right in the graph, line Y5 represents the sun gear S3 of the first rear planetary gear set 46 which corresponds to the first rotating element RE1, line Y6 represents the carrier CA3 of the first rear planetary gear set 46 and the carrier CA4 of the second rear planetary gear set 48 which are connected together and correspond to the second rotating element RE2, line Y7 represents the ring gear R3 of the first rear planetary gear set 46 and the ring gear R4 of the second rear planetary gear set 48 which are connected together and correspond to the third rotating element RE3, and line Y8 represents the sun gear S4 of the second rear planetary gear set 48 which corresponds to the fourth rotating element RE4.

In the alignment graph in FIG. 9, in first gear, the second brake B2 is engaged to hold the second rotating element RE2 to the transmission case 16, which results in the rotation speed of the second rotating element RE2 being "0". Meanwhile, the first clutch C1 is engaged to connect the fourth rotating element RE4 to the first intermediate output member 32, which results in the fourth rotating element RE4 rotating at the same speed as the first intermediate output member 32. Accordingly, the rotation speed of the output shaft 36 is indicated by the point (1st) where the straight line that connects the point of intersection of the vertical line Y6 and the horizontal line XZ with the point of intersection of the vertical line Y8 and the horizontal line X2, intersects with the vertical line Y7.

In second gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y5 and the horizontal line XZ with the point of intersection of the vertical line Y8 and the horizontal line X2, intersects with the vertical line Y7.

In third gear, the third clutch C3 is engaged to connect the first rotating element RE1 with the first intermediate output member 32, which results in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the horizontal line X2 intersects with the vertical line Y7.

In fourth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the straight line that connects the point of intersection of the vertical line Y5 and the horizontal line X3 with the point of intersection of the vertical line Y8 and the horizontal line X2, intersects with the vertical line Y7.

In fifth gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the straight line that connects the point of intersection of the vertical line Y6 and the horizontal line X3 with the point of intersection of the vertical line Y8 and the horizontal line X2, intersects with the vertical line Y7.

In sixth gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (6th) where the horizontal line X3 intersects with the vertical line X7.

In seventh gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (7th) where the straight line that connects the point of intersection of the vertical line Y5 and the horizontal line X2 with the point of intersection of the vertical line Y6 and the horizontal line X3, intersects with the vertical line Y7.

In eighth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the straight line that connects the point of intersection of the vertical line Y5 and the horizontal line XZ with the point of intersection of the vertical line Y6 and the horizontal line X3, intersects with the vertical line Y7.

In ninth gear, the fifth clutch C5 is engaged to connect the first rotating element RE1 to the second intermediate output member 34, resulting in the first rotating element RE1 rotating at the same speed as the second intermediate output member 34. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line X1 with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to this first modified example of the second exemplary embodiment, first gear is established by engaging the first clutch C1 and the second brake B2. Second gear is established by engaging the first clutch C1 and the first brake B1. Third gear is established by engaging the first clutch C1 and the third clutch C3. Fourth gear is established by engaging the first clutch C1 and the fourth clutch C4. Fifth gear is established by engaging the first clutch C1 and the second clutch C2. Sixth gear is established by engaging the second clutch C2 and the fourth clutch C4. Seventh gear is established by engaging the second clutch C2 and the third clutch C3, and eighth gear is established by engaging the second clutch C2 and the first brake B1. Thus, the transmission 44 of this first modified example of the second exemplary embodiment is able to achieve eight forward gears.

The transmission 44 of this first modified example of the second exemplary embodiment is also able to achieve ninth gear by engaging the second clutch C2 and the fifth clutch C5. Therefore, in addition to being able to achieve nine forward gears, the step between eighth gear and ninth gear is able to be preferably set relatively small with a close ratio.

Figure 11:
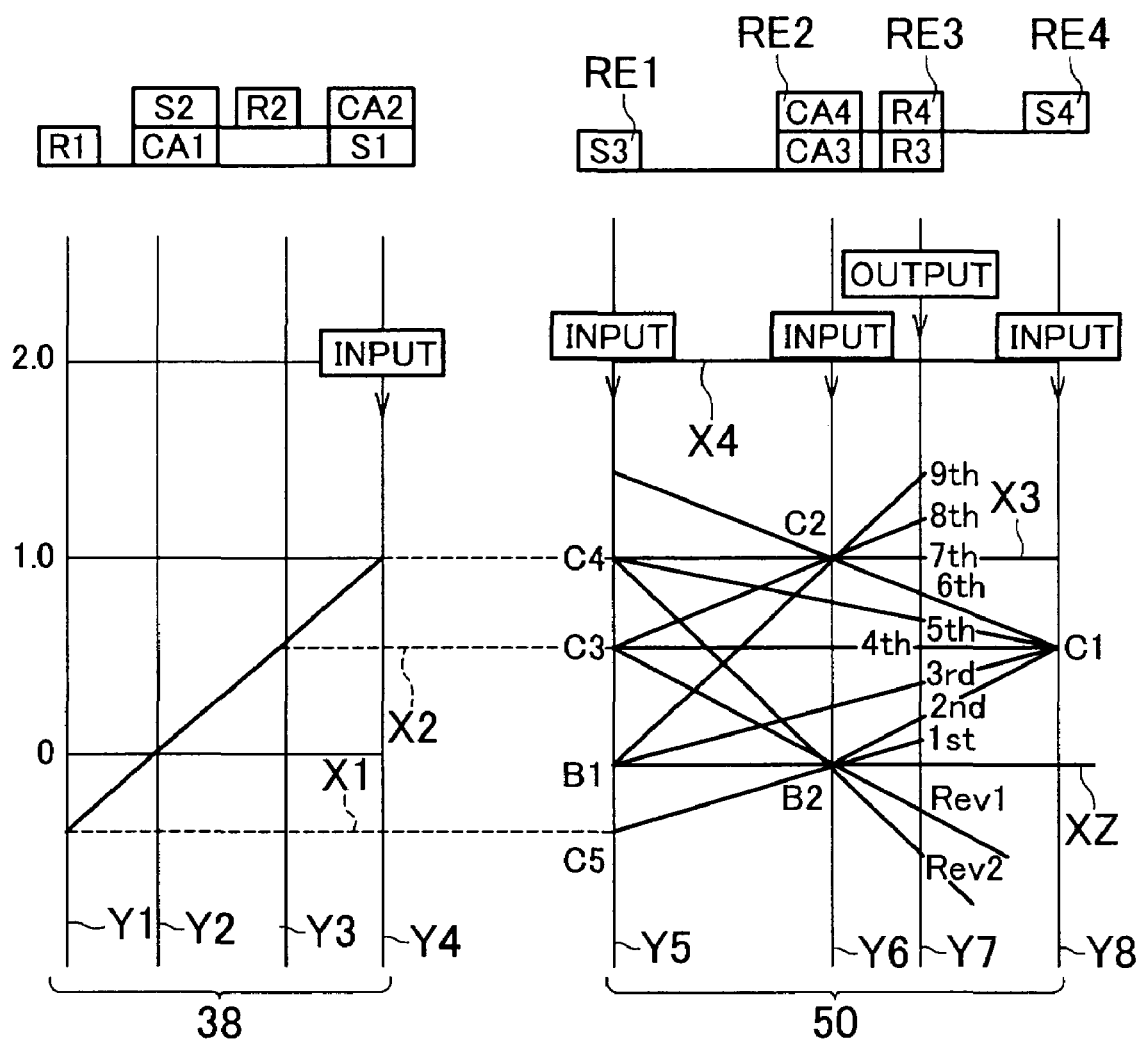
FIG. 11 is an alignment graph corresponding to FIG. 10, which is able to express, with straight lines, the relative relationships between the rotation speeds of various rotating elements which are connected differently in each gear in the transmission according to the second modified example of the second exemplary embodiment of the invention.

Here, as a second modified example of the second exemplary embodiment, the transmission 44 can achieve nine forward gears and two reverse gears by engaging the clutches and brakes in different combinations, as shown in FIG. 10, in response to a command from the ECU 42, and suitably setting the gear ratio of each planetary gear set. FIG. 11 is an alignment graph corresponding to FIG. 10, which shows the rotation speeds of the rotating elements in each gear. Hereinafter, the clutch and brake engagement chart and alignment graph of the second modified example of the second exemplary embodiment shown in FIGS. 10 and 11, which differ from those of the foregoing exemplary embodiment, will be described.

As shown in the clutch and brake engagement chart in FIG. 10, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 10, the fifth clutch C5 is engaged to connect the first rotating element RE1, i.e., the sun gear S3 of the first rear planetary gear set 46, with the second intermediate output member 34, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first gear which has the largest gear ratio γ1, e.g., approximately 4.971.

Also, the first clutch C1 is engaged to connect the fourth rotating element RE4, i.e., the sun gear S4 of the second rear planetary gear set 48, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing second gear which has a gear ratio γ2 which is smaller than the gear ratio γ1 of first gear, e.g., approximately 3.290.

Further, the first clutch C1 is engaged to connect the fourth rotating element RE4, i.e., the sun gear S4 of the second rear planetary gear set 48, with the first intermediate output member 32, while the first brake B1 is engaged to hold the first rotating element RE1, i.e., the sun gear S3 of the first rear planetary gear set 46, to the transmission case 16, thereby establishing third gear which has a gear ratio γ3 which is smaller than the gear ratio γ2 of second gear, e.g., approximately 2.222.

Also, the first clutch C1 is engaged to connect the fourth rotating element RE4, i.e., the sun gear S4 of the second rear planetary gear set 48, with the first intermediate output member 32, while the third clutch C3 is engaged to connect the first rotating element RE1, i.e., the sun gear S3 of the first rear planetary gear set 46, with the first intermediate output member 32, thereby establishing fourth gear which has a gear ratio γ4 which is smaller than the gear ratio γ3 of third gear, e.g., approximately 1.645.

Further, the first clutch C1 is engaged to connect the fourth rotating element RE4, i.e., the sun gear S4 of the second rear planetary gear set 48, with the first intermediate output member 32, while the fourth clutch C4 is engaged to connect the first rotating element RE1, i.e., the sun gear S3 of the first rear planetary gear set 46, with the input shaft 22, thereby establishing fifth gear which has a gear ratio γ5 which is smaller than the gear ratio γ4 of fourth gear, e.g., approximately 1.409.

Also, the first clutch C1 is engaged to connect the fourth rotating element RE4, i.e., the sun gear S4 of the second rear planetary gear set 48, with the first intermediate output member 32, while the second clutch C2 is engaged to connect the second rotating element RE2, i.e., the carrier CA3 of the first rear planetary gear set 46 and the carrier CA4 of the second rear planetary gear set 48 which are connected together, with the input shaft 22, thereby establishing sixth gear which has a gear ratio γ6 which is smaller than the gear ratio γ5 of fifth gear, e.g., approximately 1.244.

Further, the second clutch C2 is engaged to connect the second rotating element RE2, i.e., carrier CA3 of the first rear planetary gear set 46 and the carrier CA4 of the second rear planetary gear set 48 which are connected together, with the input shaft 22, while the fourth clutch C4 is engaged to connect the first rotating element RE1, i.e., the sun gear S3 of the first rear planetary gear set 46, with the input shaft 22, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., carrier CA3 of the first rear planetary gear set 46 and the carrier CA4 of the second rear planetary gear set 48 which are connected together, with the input shaft 22, while the third clutch C3 is engaged to connect the first rotating element RE1, i.e., the sun gear S3 of the first rear planetary gear set 46, with the first intermediate output member 32, thereby establishing eighth gear which has a gear ratio γ8 which is smaller than the gear ratio γ7 of seventh gear, e.g., approximately 0.825.

Also, the second clutch C2 is engaged to connect the second rotating element RE2, i.e., carrier CA3 of the first rear planetary gear set 46 and the carrier CA4 of the second rear planetary gear set 48 which are connected together, with the input shaft 22, while the first brake B1 is engaged to hold the first rotating element RE1, i.e., the sun gear S3 of the first rear planetary gear set 46, to the transmission case 16, thereby establishing ninth gear which has the smallest gear ratio γ9, e.g., approximately 0.649.

Also, the third clutch C3 is engaged to connect the first rotating element RE1, i.e., the sun gear S3 of the first rear planetary gear set 46, with the first intermediate output member 32, while the second brake B2 is engaged to hold the second rotating element RE2, i.e., carrier CA3 of the first rear planetary gear set 46 and the carrier CA4 of the second rear planetary gear set 48 which are connected together, to the transmission case 16, thereby establishing first reverse gear "R1" which has a gear ratio γR1 of approximately 3.047.

Further, the fourth clutch C4 is engaged to connect the first rotating element RE1, i.e., the sun gear S3 of the first rear planetary gear set 46, with the input shaft 22, while the second brake B2 is engaged to hold the second rotating element RE2, i.e., carrier CA3 of the first rear planetary gear set 46 and the carrier CA4 of the second rear planetary gear set 48 which are connected together, to the transmission case 16, thereby establishing second reverse gear "R2" which has a gear ratio γR2 which is smaller than the gear ratio γR1 of the first reverse gear, e.g., 1.852. The gear ratio ρ1 of the first front planetary gear set 24, the gear ratio ρ2 of the second front planetary gear set 26, the gear ratio ρ3 of the first rear planetary gear set 46, and the gear ratio ρ4 of the second rear planetary gear set 48 are designed so that the foregoing gear ratios can be achieved.

In the transmission 44 that achieves the gears in accordance with the clutch and brake engagement chart shown in FIG. 10, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, and the ratio of the gear ratio γ8 of the eighth gear to the gear ratio γ9 of the ninth gear (=γ8/γ9) is 1.271. Thus, each gear ratio γ changes in substantially equal ratio. Also, the total gear ratio range, which is the ratio of the gear ratio γ1 of the first gear to the gear ratio γ9 of the ninth gear (=γ1/γ9), is 7.655, which is a relatively large value.

In the alignment graph shown in FIG. 11, the four vertical lines Y1 through Y4 represent components of the first transmitting portion 38. From left to right in the graph, line Y1 represents the ring gear R1 of the first front planetary gear set 24, line Y2 represents the carrier CA1 of the first front planetary gear set 24 and the sun gear S2 of the second front planetary gear set 26 which are connected together, line Y3 represents the ring gear R2 of the second front planetary gear set 26, and line Y4 represents the sun gear S1 of the first front planetary gear set 24 and the carrier CA2 of the second front planetary gear set 26 which are connected together. Further, the four vertical lines Y5 through Y8 represent components of the second transmitting portion 50. From left to right in the graph, line Y5 represents the sun gear S3 of the first rear planetary gear set 46 which corresponds to the first rotating element RE1, line Y6 represents the carrier CA3 of the first rear planetary gear set 46 and the carrier CA4 of the second rear planetary gear set 48 which are connected together and correspond to the second rotating element RE2, line Y7 represents the ring gear R3 of the first rear planetary gear set 46 and the ring gear R4 of the second rear planetary gear set 48 which are connected together and correspond to the third rotating element RE3, and line Y8 represents the sun gear S4 of the second rear planetary gear set 48 which corresponds to the fourth rotating element RE4.

In the alignment graph in FIG. 11, in first gear, the fifth clutch C5 is engaged to connect the first rotating element RE1 to the second intermediate output member 34, which results in the first rotating element RE1 rotating at the same speed as the second intermediate output member 34. Meanwhile, the second brake B2 is engaged to hold the second rotating element RE2 to the transmission case 16 which is the non-rotating member, which results in the rotation speed of the second rotating element RE2 being "0". Accordingly, the rotation speed of the output shaft 36 is indicated by the point (1st) where the straight line that connects the point of intersection of the vertical line Y5 and the horizontal line X1 with the point of intersection of the vertical line Y6 and the horizontal line XZ, intersects with the vertical line Y7.

In second gear, the second brake B2 is engaged to hold the second rotating element RE2 to the transmission case 16, which results in the rotation speed of the second rotating element RE2 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y6 and the horizontal line XZ with the point of intersection of the vertical line Y8 and the horizontal line X2, intersects with the vertical line Y7.

In third gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the straight line that connects the point of intersection of the vertical line Y5 and the horizontal line XZ with the point of intersection of the vertical line Y8 and the horizontal line X2, intersects with the vertical line Y7.

In fourth gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the horizontal line X2 intersects with the vertical line Y7.

In fifth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the straight line that connects the point of intersection of the vertical line Y5 and the horizontal line X3 with the point of intersection of the vertical line Y8 and the horizontal line X2, intersects with the vertical line Y7.

In sixth gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (6th) where the straight line that connects the point of intersection of the vertical line Y6 and the horizontal line X3 with the point of intersection of the vertical line Y8 and the horizontal line X2, intersects with the vertical line Y7.

In seventh gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (7th) where the horizontal line X3 intersects with the vertical line Y7.

In eighth gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the straight line that connects the point of intersection of the vertical line Y5 and the horizontal line X2 with the point of intersection of the vertical line Y6 and the horizontal line X3, intersects with the vertical line Y7.

In ninth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line XZ with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to this second modified example of the second exemplary embodiment, first gear is established by engaging the fifth clutch C5 and the second brake B2. Second gear is established by engaging the first clutch C1 and the second brake B2. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4, and eighth gear is established by engaging the second clutch C2 and the third clutch C3. Thus, the transmission 44 of this second modified example of the second exemplary embodiment is able to achieve eight forward gears.

The transmission 44 of this second modified example of the second exemplary embodiment is also able to achieve ninth gear by engaging the second clutch C2 and the first brake B1. Therefore, in addition to being able to achieve nine forward gears, the step between eighth gear and ninth gear is able to be preferably set relatively small with a close ratio.

Figure 12:
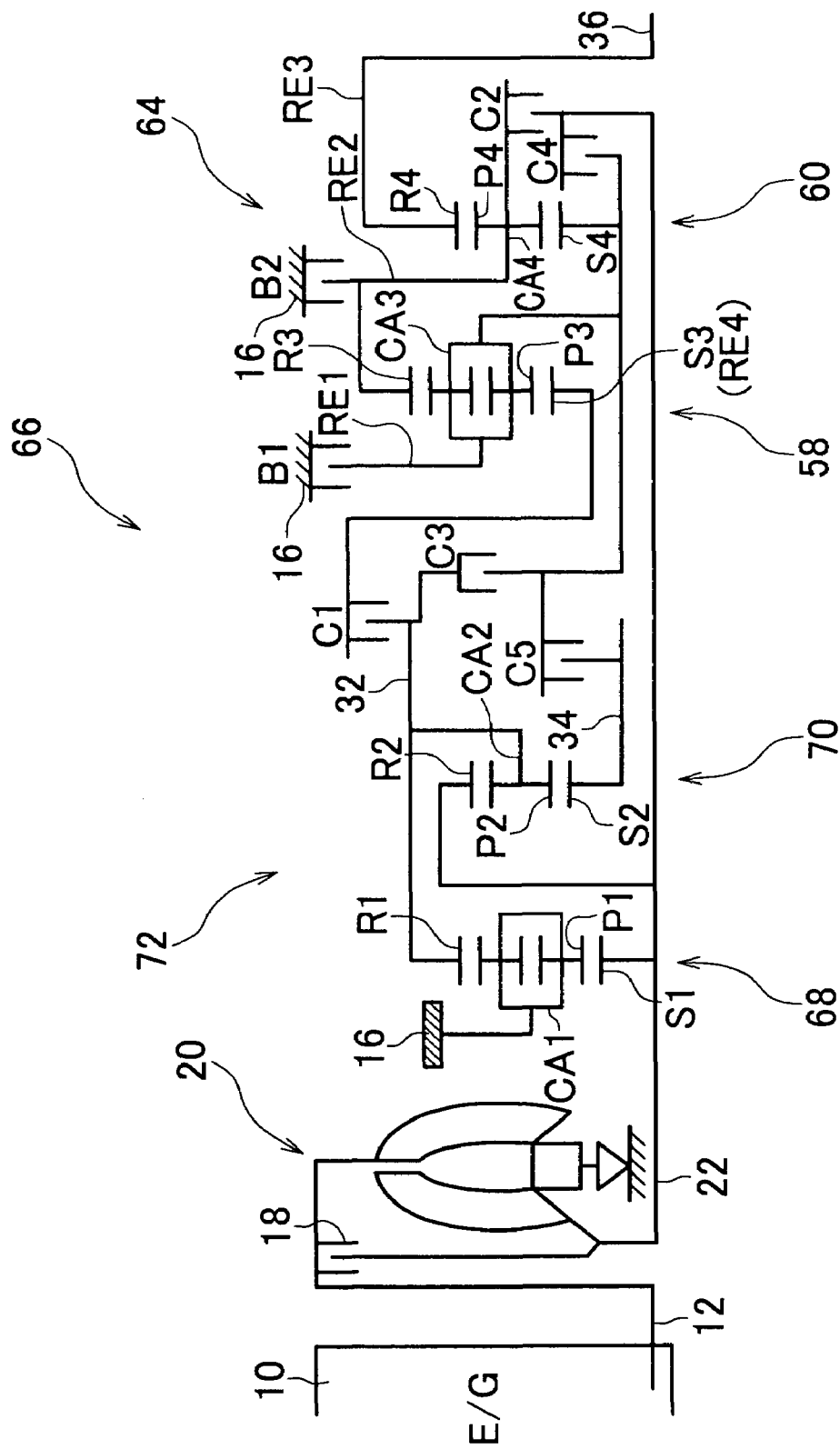
FIG. 12 is a skeleton view of the structure of a multi-speed transmission for a vehicle according to a third exemplary embodiment of the invention.
Figure 14:
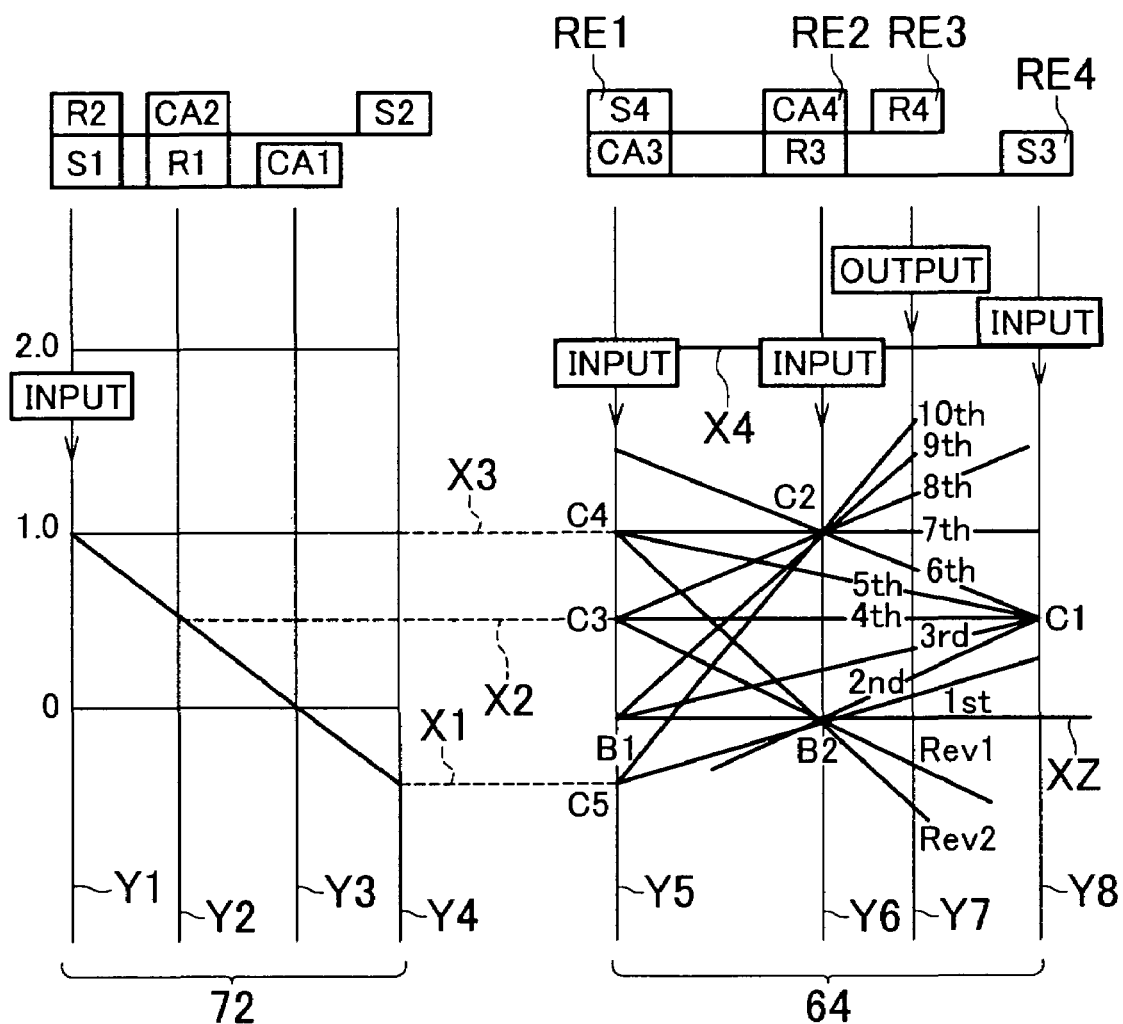
FIG. 14 is an alignment graph able to express, with straight lines, the relative relationships between the rotation speeds of various rotating elements which are connected differently in each gear in the transmission shown in FIG. 12.

FIG. 12 is a skeleton view of the structure of a transmission 66 according to a third exemplary embodiment of the invention. FIG. 13 is a chart showing the relationship between gears and operations of friction engagement devices necessary to establish those gears in the transmission 66. FIG. 14 is an alignment graph showing the rotation speeds of rotating elements in each gear. With the exception of the structures of a first transmitting portion 72 and a second transmitting portion 64, the transmission 66 of this exemplary embodiment is similar in structure to the transmission 14 shown in FIG. 1, so effects equivalent to those obtained from the foregoing exemplary embodiment can be obtained with this exemplary embodiment. Hereinafter, parts of the transmission 66 of this exemplary embodiment which differ from parts of the transmission 14 will be described.

As shown in FIG. 12, a first front planetary gear set 68 which makes up part of the first transmitting portion 72 is a double pinion type planetary gear set which includes a sun gear S1, a plurality of sets of pinions P1 that are in mesh with each other, a carrier CA1 which rotatably and revolvably supports the pinions P1, and a ring gear R1 that is in mesh with the sun gear S1 via the pinions P1. A second front planetary gear set 70 which also makes up part of the first transmitting portion 72 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2.

In the first transmitting portion 72, the carrier CA1 of the first front planetary gear set 68 is integrally connected to the transmission case 16 which is a non-rotating member, thus preventing the carrier CA1 from rotating relative to the transmission case 16. Also, the sun gear S1 of the first front planetary gear set 68 and the ring gear R2 of the second front planetary gear set 70 are integrally connected to the input shaft 22 which is the input rotating member. Further, the ring gear R1 of the first front planetary gear set 68 and the carrier CA2 of the second front planetary gear set 70 are connected together as well as integrally connected to the first intermediate output member 32. Also, the sun gear S2 of the second front planetary gear set 70 is integrally connected to the second intermediate output member 34. This kind of structure results in the first transmitting portion 72 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

The first rear planetary gear set 58 which makes up part of the second transmitting portion 64 is a double pinion type planetary gear set which includes a sun gear S3, a plurality of sets of pinions P3 which are in mesh with each other, a carrier CA3 which rotatably and revolvably supports the pinions P3, and a ring gear R3 that is in mesh with the sun gear S3 via the pinions P3. The second rear planetary gear set 60 which also makes up part of the second transmitting portion 64 is a single pinion type planetary gear set which includes a sun gear S4, a pinion P4, a carrier CA4 which rotatably and revolvably supports the pinion P4, and a ring gear R4 that is in mesh with the sun gear S4 via the pinion P4.

In the second transmitting portion 64, the carrier CA3 of the first rear planetary gear set 58 and the sun gear S4 of the second rear planetary gear set 60 are connected together to form a first rotating element RE1. The ring gear R3 of the first rear planetary gear set 58 and the carrier CA4 of the second rear planetary gear set 60 are connected together to form a second rotating element RE2. The ring gear R4 of the second rear planetary gear set 60 forms a third rotating element RE3, and the sun gear S3 of the first rear planetary gear set 58 forms a fourth rotating element RE4. The transmission 66 also includes a first clutch C1, a second clutch C2, a third clutch C3, a fourth clutch C4, a fifth clutch C5, a first brake B1, and a second brake B2. The first clutch C1 is a first clutch element that selectively connects the first intermediate output member 32 with the fourth rotating element RE4. The second clutch C2 is a second clutch element that selectively connects the input shaft 22 with the second rotating element RE2. The third clutch C3 is a third clutch element that selectively connects the first intermediate output member 32 with the first rotating element RE1. The fourth clutch C4 is a fourth clutch element that selectively connects together the input shaft 22 and the first rotating element RE1. The fifth clutch C5 is a fifth clutch element that selectively connects together the second intermediate output member 34 and the first rotating element RE1. The first brake B1 is a first brake element that selectively holds the first rotating element RE1 to the transmission case 16 which is a non-rotating member, and the second brake B2 is a second brake element that selectively holds the second rotating element RE2 to the transmission case 16.

In the transmission 66 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 13, for example, in response to a command from the ECU 42, and a gear ratio $\gamma$ (=input shaft rotation speed NIN/output shaft rotation speed NOUT) that changes in substantially equal ratio is able to be achieved for each gear.

That is, as shown in FIG. 13, the fifth clutch C5 is engaged to connect the first rotating element RE1, i.e., the carrier CA3 of the first rear planetary gear set 58 and the sun gear S4 of the second rear planetary gear set 60 which are connected together, with the second intermediate output member 34, while the second brake B2 is engaged to hold the second rotating element RE2, i.e., the ring gear R3 of the first rear planetary gear set 58 and the carrier CA4 of the second rear planetary gear set 60 which are connected together, to the transmission case 16 which is a non-rotating member, thereby establishing first gear which has the largest gear ratio $\gamma$1, e.g., approximately 4.762.

In the clutch and brake engagement chart shown in FIG. 13, operations of the friction engagement devices to establish second gear "2nd" through tenth gear "10th" are the same as those described using FIG. 2, so descriptions thereof will be omitted. Further, in the transmission 66 which establishes the gears according to the clutch and brake engagement chart shown in FIG. 13, the gear ratio $\gamma$2 of second gear is approximately 4.110, the gear ratio $\gamma$3 of third gear is approximately 2.603, the gear ratio $\gamma$4 of fourth gear is approximately 2.000, the gear ratio $\gamma$5 of fifth gear is approximately 1.624, the gear ratio $\gamma$6 of sixth gear is approximately 1.322, the gear ratio $\gamma$7 of seventh gear is approximately 1.000, the gear ratio $\gamma$8 of eighth gear is approximately 0.833, the gear ratio $\gamma$9 of ninth gear is approximately 0.714, the gear ratio $\gamma$10 of tenth gear is approximately 0.621, the gear ratio $\gamma$R1 of first reverse gear is approximately 5.000, and the gear ratio $\gamma$R2 of second reverse gear is approximately 2.500. Further, the ratio of the gear ratio $\gamma$1 of the first gear to the gear ratio $\gamma$2 of the second gear ($=\gamma$1/$\gamma$2) is 1.159, the ratio of the gear ratio $\gamma$2 of the second gear to the gear ratio $\gamma$3 of the third gear ($=\gamma$2/$\gamma$3) is 1.579, the ratio of the gear ratio $\gamma$3 of the third gear to the gear ratio $\gamma$4 of the fourth gear ($=\gamma$3/$\gamma$4) is 1.301, the ratio of the gear ratio $\gamma$4 of the fourth gear to the gear ratio $\gamma$5 of the fifth gear ($=\gamma$4/$\gamma$7) is 1.232, the ratio of the gear ratio $\gamma$5 of the fifth gear to the gear ratio $\gamma$6 of the sixth gear ($=\gamma$5/$\gamma$6) is 1.229, the ratio of the gear ratio $\gamma$6 of the sixth gear to the gear ratio $\gamma$7 of the seventh gear ($=\gamma$6/$\gamma$7) is 1.322, the ratio of the gear ratio $\gamma$7 of the seventh gear to the gear ratio $\gamma$8 of the eighth gear ($=\gamma$7/$\gamma$8) is 1.200, the ratio of the gear ratio $\gamma$8 of the eighth gear to the gear ratio $\gamma$9 of the ninth gear ($=\gamma$8/$\gamma$9) is 1.167, and the ratio of the gear ratio $\gamma$9 of the ninth gear to the gear ratio $\gamma$10 of the tenth gear ($=\gamma$9/$\gamma$10) is 1.150. Thus, each gear ratio $\gamma$ changes in substantially equal ratio. Also, the total gear ratio range, which is the ratio of the gear ratio $\gamma$1 of the first gear to the gear ratio $\gamma$10 of the tenth gear ($=\gamma$1/$\gamma$10), is 7.667, which is a relatively large value.

In the alignment graph shown in FIG. 14, the four vertical lines Y1 through Y4 represent components of the first transmitting portion 72. From left to right in the graph, line Y1 represents the sun gear S1 of the first front planetary gear set 68 and the ring gear R2 of the second front planetary gear set 70 which are connected together, line Y2 represents the ring gear R1 of the first front planetary gear set 68 and the carrier CA2 of the second front planetary gear set 70 which are connected together, line Y3 represents the carrier CA1 of the first front planetary gear set 68, and line Y4 represents the sun gear S2 of the second front planetary gear set 70. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. Accordingly, based on these rotating elements, the alignment graph shown in FIG. 14 is similar to the alignment graph shown in FIG. 4 described above, for example, so a description thereof will be omitted.

When expressed using the alignment graph, in the first transmitting portion 72 of the transmission 66 according to the third exemplary embodiment, the sun gear S1 of the first front planetary gear set 68 and the ring gear R2 of the second front planetary gear set 70, which are connected together and function as one of four rotating elements, are connected to the input shaft 22 which is the input rotating member. The ring gear R1 of the first front planetary gear set 68 and the carrier CA2 of the second front planetary gear set 70, which are connected together and function as another of the four rotating elements, are integrally provided with the first intermediate output member 32 and therefore function similarly as a first intermediate output member. The carrier CA1 of the first front planetary gear set 68, which is another of the four rotating elements, is held to the transmission case 16, which is a non-rotating member, so as not to be able to rotate with respect thereto. The sun gear S2 of the second front planetary gear set 70, which is another of the four rotating elements, is integrally provided with the second intermediate output member 34 and therefore functions similarly as a second intermediate output member. Further, in the second transmitting portion 64 of the transmission 66, the first rotating element RE1 (CA3, S4) is selectively connected to the first intermediate output member 32 via the third clutch C3, selectively connected to the input shaft 22 which is the input rotating member via the fourth clutch C4, and selectively connected to the second intermediate output member 34 via the fifth clutch C5, as well as selectively held to the transmission case 16, which is the non-rotating member, via the first brake B1. Also, the second rotating element RE2 (R3, CA4) is selectively connected to the input shaft 22, which is the input rotating member, via the second clutch C2, and is selectively held to the transmission case 16, which is the non-rotating member, via the second brake B2. Further, the third rotating element RE3 (R4) is provided integrally with the output shaft 36, which is the output rotating member, and therefore functions similarly as an output rotating member. Also, the fourth rotating element RE4 (S3) is selectively connected to the first intermediate output member 32 via the first clutch C1.

In the alignment graph in FIG. 14, in first gear, the fifth clutch C5 is engaged to connect the first rotating element RE1 to the second intermediate output member 34, which results in the first rotating element RE1 rotating at the same speed as the second intermediate output member 34. Meanwhile, the second brake B2 is engaged to hold the second rotating element RE2 to the transmission case 16 which is the non-rotating member, which results in the rotation speed of the second rotating element RE2 being "0". Accordingly, the rotation speed of the output shaft 36 is indicated by the point (1st) where the straight line that connects the point of intersection of the vertical line Y5 and the horizontal line X1 with the point of intersection of the vertical line Y6 and the horizontal line XZ, intersects with the vertical line Y7.

In second gear, the second brake B2 is engaged to hold the second rotating element RE2 to the transmission case 16, which results in the rotation speed of the second rotating element RE2 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y6 and the horizontal line XZ with the point of intersection of the vertical line Y8 and the horizontal line X2, intersects with the vertical line Y7.

In third gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the straight line that connects the point of intersection of the vertical line Y5 and the horizontal line XZ with the point of intersection of the vertical line Y8 and the horizontal line X2, intersects with the vertical line Y7.

In fourth gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the horizontal line X2 intersects with the vertical line Y7.

In fifth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the straight line that connects the point of intersection of the vertical line Y5 and the horizontal line X3 with the point of intersection of the vertical line Y8 and the horizontal line X2, intersects with the vertical line Y7.

In sixth gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (6th) where the straight line that connects the point of intersection of the vertical line Y6 and the horizontal line X3 with the point of intersection of the vertical line Y8 and the horizontal line X2, intersects with the vertical line Y7.

In seventh gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (7th) where the horizontal line X3 intersects with the vertical line Y7.

In eighth gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the straight line that connects the point of intersection of the vertical line Y5 and the horizontal line X2 with the point of intersection of the vertical line Y6 and the horizontal line X3, intersects with the vertical line Y7.

In ninth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line XZ with the point of intersection of the vertical line Y6 and the horizontal line X3, intersects with the vertical line Y7.

In tenth gear, the fifth clutch C5 is engaged to connect the first rotating element RE1 to the second intermediate output member 34, resulting in the first rotating element RE1 rotating at the same speed as the second intermediate output member 34. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (10th) where the straight line that connects the point of intersection of the vertical line Y5 and the horizontal line X1 with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to this third exemplary embodiment, first gear is established by engaging the fifth clutch C5 and the second brake B2. Second gear is established by engaging the first clutch C1 and the second brake B2. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4. Eighth gear is established by engaging the second clutch C2 and the third clutch C3, and ninth gear is established by engaging the second clutch C2 and the first brake B1. Thus, the transmission 66 of this third exemplary embodiment is able to achieve nine forward gears.

The transmission 66 of this third exemplary embodiment is also able to achieve tenth gear by engaging the second clutch C2 and the fifth clutch C5. Therefore, in addition to being able to achieve ten forward gears, the step between ninth gear and tenth gear is able to be preferably set relatively small with a close ratio.

Further, the first transmitting portion 72 includes the double pinion type first front planetary gear set 68 and the single pinion type second front planetary gear set 70. The carrier CA1 of the first front planetary gear set 68 is always connected to the transmission case 16, which is a non-rotating member, and the ring gear R1 of the first front planetary gear set 68 and the carrier CA2 of the second front planetary gear set 70 are connected together, while the sun gear S1 of the first front planetary gear set 68 and the ring gear R2 of the second front planetary gear set 70 are connected to the input shaft 22 which is the input rotating member. Accordingly, the ring gear R1 of the first front planetary gear set 68 or the carrier CA2 of the second front planetary gear set 70 functions as the first intermediate output member 32 while the sun gear S2 of the second front planetary gear set 70 functions as the second intermediate output member 34. Accordingly, a practical transmission 66 is able to be provided.

Also, the second transmitting portion 64 includes the double pinion type first rear planetary gear set 58 and the single pinion type second rear planetary gear set 60. The first rotating element RE1 is formed by the carrier CA3 of the first rear planetary gear set 58 and the sun gear S4 of the second rear planetary gear set 60 which are connected together. The second rotating element RE2 is formed by the ring gear R3 of the first rear planetary gear set 58 and the carrier CA4 of the second rear planetary gear set 60 which are connected together. The third rotating element RE3 is formed by the ring gear R4 of the second rear planetary gear set 60. The fourth rotating element RE4 is formed by the sun gear S3 of the first rear planetary gear set 58. Accordingly, a practical transmission 66 is able to be provided.

Further, the transmission 66 can also be used to achieve nine forward gears excluding the second gear in the clutch and brake engagement chart shown in FIG. 13 described above. That is, in the transmission 66, first gear can be established by engaging the fifth clutch C5 and the second brake B2. Second gear can be established by engaging the first clutch C1 and the first brake B1. Third gear can be established by engaging the first clutch C1 and the third clutch C3. Fourth gear can be established by engaging the first clutch C1 and the fourth clutch C4. Fifth gear can be established by engaging the first clutch C1 and the second clutch C2. Sixth gear can be established by engaging the second clutch C2 and the fourth clutch C4. Seventh gear can be established by engaging the second clutch C2 and the third clutch C3. Eighth gear can be established by engaging the second clutch C2 and the first brake B1, and ninth gear can be established by engaging the second clutch C2 and the fifth clutch C5.

Figure 16:
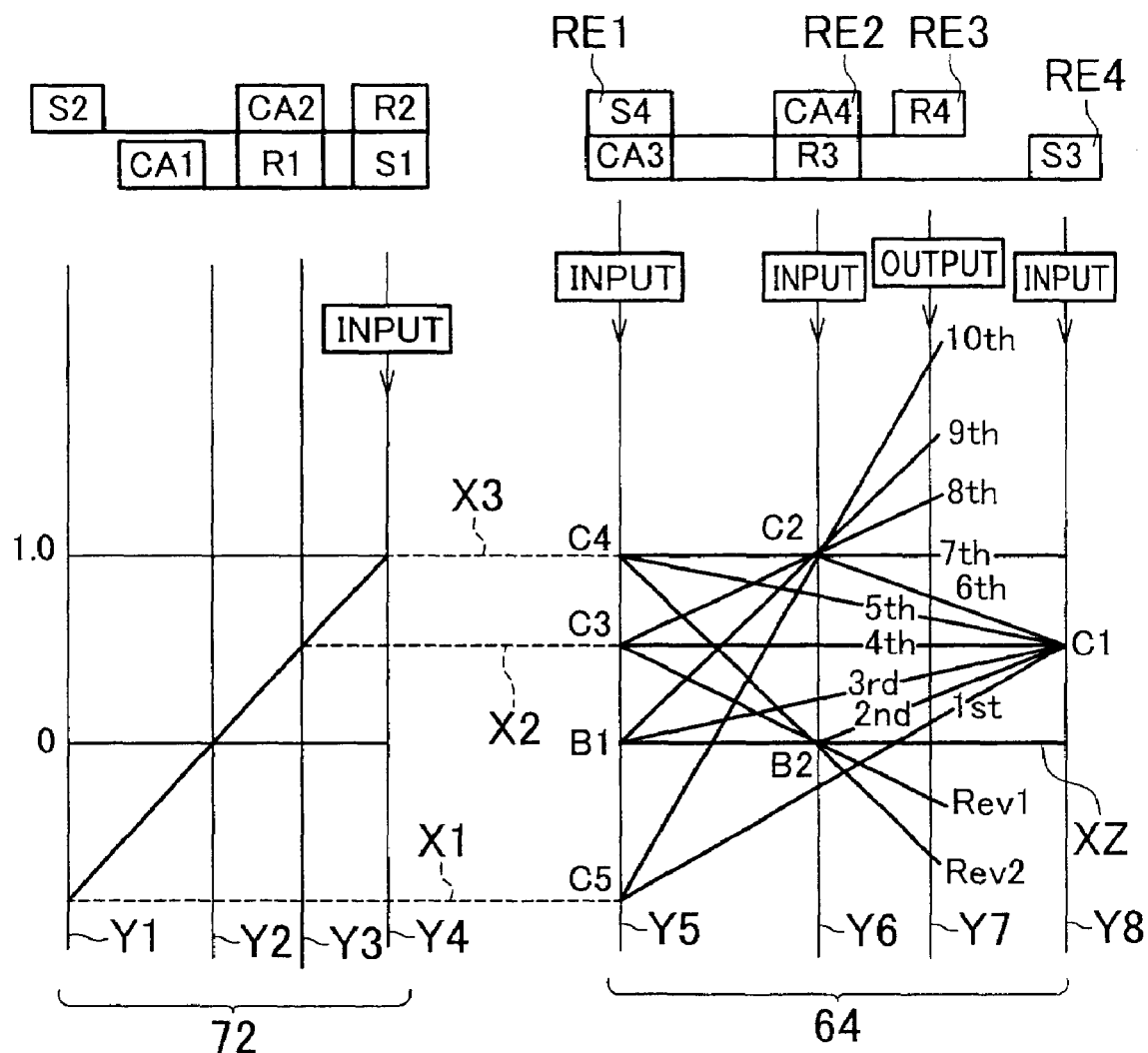
FIG. 16 is an alignment graph corresponding to FIG. 15, which is able to express, with straight lines, the relative relationships between the rotation speeds of various rotating elements which are connected differently in each gear in the transmission according to the first modified example of the third exemplary embodiment of the invention.

Here, as a first modified example of the third exemplary embodiment, the transmission 66 can achieve ten forward gears and two reverse gears by engaging the clutches and brakes in different combinations, as shown in FIG. 15, in response to a command from the ECU 42, and suitably setting the gear ratio of each planetary gear set. FIG. 16 is an alignment graph corresponding to FIG. 15, which shows the rotation speeds of the rotating elements in each gear. Hereinafter, the clutch and brake engagement chart and alignment graph according to the first modified example of the third exemplary embodiment shown in FIGS. 15 and 16, which are the parts that differ from the foregoing exemplary embodiment, will be described.

As shown in the clutch and brake engagement chart in FIG. 15, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 15, the first clutch C1 is engaged to connect the fourth rotating element RE4, i.e., the sun gear S3 of the first rear planetary gear set 58, with the first intermediate output member 32, while the fifth clutch C5 is engaged to connect the first rotating element RE1, i.e., the carrier CA3 of the first rear planetary gear set 58/and the sun gear S4 of the second rear planetary gear set 60 which are connected together, to the second intermediate output member 34, thereby establishing first gear which has the largest gear ratio γ1, e.g., approximately 5.971.

In the clutch and brake engagement chart shown in FIG. 15, operations of the friction engagement devices to establish second gear "2nd" through tenth gear "10th" are the same as those described using FIG. 13, so descriptions thereof will be omitted. Further, in the transmission 66 which establishes the gears according to the clutch and brake engagement chart shown in FIG. 15, the gear ratio γ2 of second gear is approximately 3.783, the gear ratio γ3 of third gear is approximately 2.509, the gear ratio γ4 of fourth gear is approximately 1.782, the gear ratio γ5 of fifth gear is approximately 1.452, the gear ratio γ6 of sixth gear is approximately 1.260, the gear ratio γ7 of seventh gear is approximately 1.000, the gear ratio γ8 of eighth gear is approximately 0.800, the gear ratio γ9 of ninth gear is approximately 0.636, the gear ratio γ10 of tenth gear is approximately 0.493, the gear ratio γR1 of first reverse gear is approximately 3.118, and the gear ratio γR2 of second reverse gear is approximately 1.750. Further, the ratio of the gear ratio γ1 of the first gear to the gear ratio γ2 of the second gear (=γ1/γ2) is 1.578, the ratio of the gear ratio γ2 of the second gear to the gear ratio γ3 of the third gear (=γ2/γ3) is 1.508, the ratio of the gear ratio γ3 of the third gear to the gear ratio γ4 of the fourth gear (=γ3/γ4) is 1.408, the ratio of the gear ratio γ4 of the fourth gear to the gear ratio γ5 of the fifth gear (=γ4/γ5) is 1.227, the ratio of the gear ratio γ5 of the fifth gear to the gear ratio γ6 of the sixth gear (=γ5/γ6) is 1.152, the ratio of the gear ratio γ6 of the sixth gear to the gear ratio γ7 of the seventh gear (=γ6/γ7) is 1.260, the ratio of the gear ratio γ7 of the seventh gear to the gear ratio γ8 of the eighth gear (=γ7/γ8) is 1.251, the ratio of the gear ratio γ8 of the eighth gear to the gear ratio γ9 of the ninth gear (=γ8/γ9) is 1.256, and the ratio of the gear ratio γ9 of the ninth gear to the gear ratio γ10 of the tenth gear (=γ9/γ10) is 1.290. Thus, each gear ratio γ changes in substantially equal ratio. Also, the total gear ratio range, which is the ratio of the gear ratio γ1 of the first gear to the gear ratio γ10 of the tenth gear (=γ1/γ10), is 12.101, which is a relatively large value.

In the alignment graph shown in FIG. 16, the four vertical lines Y1 through Y4 represent components of the first transmitting portion 72. From left to right in the graph, line Y1 represents the sun gear S2 of the second front planetary gear set 70, line Y2 represents the carrier CA1 of the first front planetary gear set 68, line Y3 represents the ring gear R1 of the first front planetary gear set 68 and the carrier CA2 of the second front planetary gear set 70 which are connected together, and line Y4 represents the sun gear S1 of the first front planetary gear set 68 and the ring gear R2 of the second front planetary gear set 70 which are connected together. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 16 is similar to the alignment graph shown in FIG. 4 so a description thereof will be omitted.

In this way, according to the first modified example of the third exemplary embodiment, it is possible to obtain a transmission 66 which can establish ten forward gears and two reverse gears, and in which the steps of the gears are relatively close ratios, by engagement combinations of the clutches and brakes of each gear and suitably setting the gear ratio of each planetary gear set.

Figure 18:
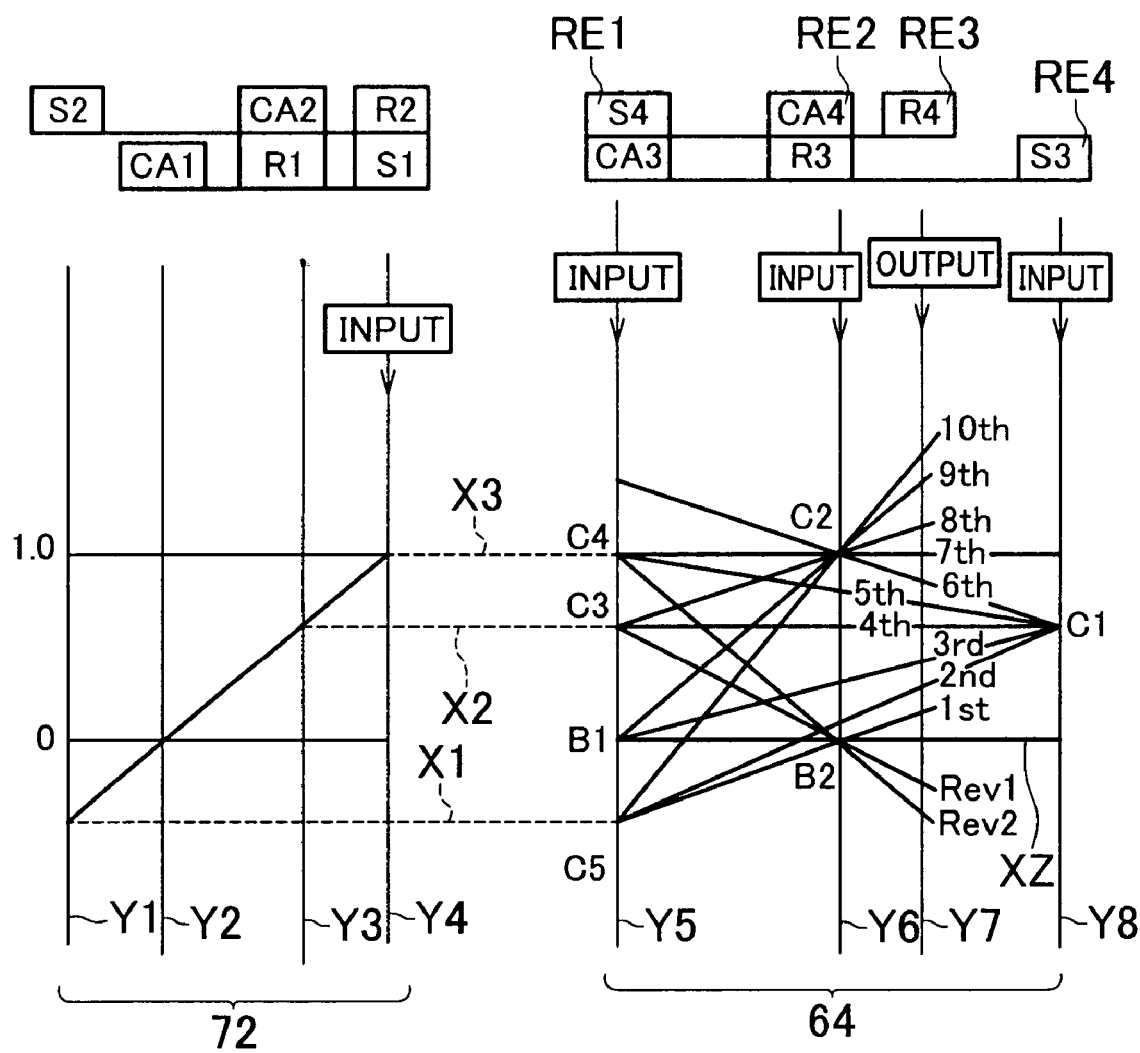
FIG. 18 is an alignment graph corresponding to FIG. 17, which is able to express, with straight lines, the relative relationships between the rotation speeds of various rotating elements which are connected differently in each gear in the transmission according to the second modified example of the third exemplary embodiment of the invention.

Here, as a second modified example of the third exemplary embodiment, the transmission 66 can achieve ten forward gears and two reverse gears by engaging the clutches and brakes in different combinations, as shown in FIG. 17, in response to a command from the ECU 42, and suitably setting the gear ratio of each planetary gear set. FIG. 18 is an alignment graph corresponding to FIG. 17, which shows the rotation speeds of the rotating elements in each gear. Hereinafter, the clutch and brake engagement chart and alignment graph according to the second modified example of the third exemplary embodiment shown in FIGS. 17 and 18, which differ from those of the foregoing exemplary embodiment, will be described.

As shown in the clutch and brake engagement chart in FIG. 17, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 17, the first clutch C1 is engaged to connect the fourth rotating element RE4, i.e., the sun gear S3 of the first rear planetary gear set 58, with the first intermediate output member 32, while the fifth clutch C5 is engaged to connect the first rotating element RE1, i.e., the carrier CA3 of the first rear planetary gear set 58 and the sun gear S4 of the second rear planetary gear set 60 which are connected together, to the second intermediate output member 34, thereby establishing second gear which has a gear ratio γ2 of approximately 2.924, for example.

Meanwhile, in the clutch and brake engagement chart shown in FIG. 17, operations of the friction engagement devices to establish first gear "1st" and third gear "3rd" through tenth gear "10th" are the same as those described using FIG. 13, so descriptions thereof will be omitted. Further, in the transmission 66 which establishes the gears according to the clutch and brake engagement chart shown in FIG. 17, the gear ratio γ1 of first gear is approximately 4.549, the gear ratio γ3 of third gear is approximately 2.233, the gear ratio γ4 of fourth gear is approximately 1.645, the gear ratio γ5 of fifth gear is approximately 1.414, the gear ratio γ6 of sixth gear is approximately 1.246, the gear ratio γ7 of seventh gear is approximately 1.000, the gear ratio γ8 of eighth gear is approximately 0.824, the gear ratio γ9 of ninth gear is approximately 0.649, the gear ratio γ10 of tenth gear is approximately 0.568, the gear ratio γR1 of first reverse gear is approximately 3.062, and the gear ratio γR2 of second reverse gear is approximately 1.852. Further, the ratio of the gear ratio γ1 of the first gear to the gear ratio γ2 of the second gear (=γ1/γ2) is 1.556, the ratio of the gear ratio γ2 of the second gear to the gear ratio γ3 of the third gear (=γ2/γ3) is 1.309, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.170, the ratio of the gear ratio γ5 of the fifth gear to the gear ratio γ6 of the sixth gear (=γ5/γ6) is 1.134, the ratio of the gear ratio γ6 of the sixth gear to the gear ratio γ7 of the seventh gear (=γ6/γ7) is 1.246, the ratio of the gear ratio γ7 of the seventh gear to the gear ratio γ8 of the eighth gear (=γ7/γ8) is 1.213, the ratio of the gear ratio γ8 of the eighth gear to the gear ratio γ9 of the ninth gear (=γ8/γ9) is 1.246, and the ratio of the gear ratio γ9 of the ninth gear to the gear ratio γ10 of the tenth gear (=γ9/γ10) is 1.143. Thus, each gear ratio γ changes in substantially equal ratio. Also, the total gear ratio range, which is the ratio of the gear ratio γ1 of the first gear to the gear ratio γ10 of the tenth gear (=γ1/γ10), is 8.005, which is a relatively large value.

In the alignment graph shown in FIG. 18, the four vertical lines Y1 through Y4 representing components of the first transmitting portion 72 and the four vertical lines Y5 through Y8 representing components of the second transmitting portion 64 represent the same rotating elements as shown in FIG. 16 because the skeleton view is the same as that in the foregoing exemplary embodiment. Also, in the clutch and brake engagement chart shown in FIG. 17, the operations of the friction engagement devices for establishing first gear "1st" and third gear "3rd" through tenth gear "10th" are the same as those described above using FIG. 13. Therefore, the alignment graph also corresponds to these. Thus, first gear "1st" and third gear "3rd" through tenth gear "10th" in FIG. 18 are the same as in FIG. 14, so descriptions thereof will be omitted.

Meanwhile, in second gear, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y5 and the horizontal line X1 with the point of intersection of the vertical line Y8 and the horizontal line X2, intersects with the vertical line Y7.

In this way, according to this second modified example of the third exemplary embodiment, first gear is established by engaging the fifth clutch C5 and the second brake B2. Second gear is established by engaging the first clutch C1 and the fifth clutch C5. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4. Eighth gear is established by engaging the second clutch C2 and the third clutch C3. Ninth gear is established by engaging the second clutch C2 and the first brake B1, and tenth gear is established by engaging the second clutch C2 and the fifth clutch C5. Therefore, in addition to being able to achieve ten forward gears, the step between ninth gear and tenth gear is able to be preferably set relatively small with a close ratio.

Here, as a third modified example of the third exemplary embodiment, the transmission 66 can achieve nine forward gears and two reverse gears by engaging the clutches and brakes in different combinations, as shown in FIG. 19, in response to a command from the ECU 42, and suitably setting the gear ratio of each planetary gear set. Also, FIG. 20 is an alignment graph corresponding to FIG. 19, which shows the rotation speeds of the rotating elements in each gear. Hereinafter, the clutch and brake engagement chart and alignment graph according to the third modified example of the third exemplary embodiment shown in FIGS. 19 and 20, which differ from those of the foregoing exemplary embodiment, will be described.

As shown in the clutch and brake engagement chart in FIG. 19, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 19, the first clutch C1 is engaged to connect the fourth rotating element RE4, i.e., the sun gear S3 of the first rear planetary gear set 58, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first gear which has the largest gear ratio γ1, e.g., approximately 4.776.

Also, the first clutch C1 is engaged to connect the fourth rotating element RE4, i.e., the sun gear S3 of the first rear planetary gear set 58, with the first intermediate output member 32, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing second gear which has a gear ratio γ2 which is smaller than the gear ratio γ1 of first gear, e.g., approximately 2.925.

Further, the first clutch C1 is engaged to connect the fourth rotating element RE4, i.e., the sun gear S3 of the first rear planetary gear set 58, with the first intermediate output member 32, while the third clutch C3 is engaged to connect the first rotating element RE1, i.e., the carrier CA3 of the first rear planetary gear set 58 and the sun gear S4 of the second rear planetary gear set 60 which are connected together, to the first intermediate output member 32, thereby establishing third gear which has a gear ratio γ3 which is smaller than the gear ratio γ2 of second gear, e.g., approximately 2.000.

Also, the first clutch C1 is engaged to connect the fourth rotating element RE4, i.e., the sun gear S3 of the first rear planetary gear set 58, with the first intermediate output member 32, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing fourth gear which has a gear ratio γ4 which is smaller than the gear ratio γ3 of third gear, e.g., approximately 1.519.

Further, the first clutch C1 is engaged to connect the fourth rotating element RE4, i.e., the sun gear S3 of the first rear planetary gear set 58, with the first intermediate output member 32, while the second clutch C2 is engaged to connect the second rotating element RE2, i.e., the ring gear R3 of the first rear planetary gear set 58 and the carrier CA4 of the second rear planetary gear set 60 which are connected together, with the input shaft 22, thereby establishing fifth gear which has a gear ratio γ5 which is smaller than the gear ratio γ4 of fourth gear, e.g., approximately 1.265.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing sixth gear which has a gear ratio γ6 which is smaller than the gear ratio γ5 of fifth gear, e.g., approximately 1.000.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing seventh gear which has a gear ratio γ7 which is smaller than the gear ratio γ6 of sixth gear, e.g., approximately 0.800.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing eighth gear which has a gear ratio γ8 which is smaller than the gear ratio γ7 of seventh gear, e.g., approximately 0.667.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fifth clutch C5 is engaged to connect the first rotating element RE1, i.e., the carrier CA3 of the first rear planetary gear set 58 and the sun gear S4 of the second rear planetary gear set 60 which are connected together, to the second intermediate output member 34, thereby establishing ninth gear which has the smallest gear ratio γ9, e.g., approximately 0.588.

Also, the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first reverse gear "R1" which has a gear ratio γR1 of approximately 4.000.

Further, the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second reverse gear "R2" which has a gear ratio γR2 which is smaller than the gear ratio γR1 of the first reverse gear, e.g., 2.000. The gear ratio ρ1 of the first front planetary gear set 68, the gear ratio ρ2 of the second front planetary gear set 70, the gear ratio ρ3 of the first rear planetary gear set 58, and the gear ratio ρ4 of the second rear planetary gear set 60 are designed so that the foregoing gear ratios can be achieved.

In the transmission 66 that achieves the gears in accordance with the clutch and brake engagement chart shown in FIG. 19, the ratio of the gear ratio γ1 of the first gear to the gear ratio γ2 of the second gear (=γ1/γ2) is 1.633, the ratio of the gear ratio γ2 of the second gear to the gear ratio γ3 of the third gear (=γ2/γ3) is 1.463, the ratio of the gear ratio γ3 of the third gear to the gear ratio γ4 of the fourth gear (=γ3/γ4) is 1.316, the ratio of the gear ratio γ4 of the fourth gear to the gear ratio γ5 of the fifth gear (=γ4/γ5) is 1.201, the ratio of the gear ratio γ5 of the fifth gear to the gear ratio γ6 of the sixth gear (=γ5/γ6) is 1.265, the ratio of the gear ratio γ6 of the sixth gear to the gear ratio γ7 of the seventh gear (=γ6/γ7) is 1.250, the ratio of the gear ratio γ7 of the seventh gear to the gear ratio γ8 of the eighth gear (=γ7/γ8) is 1.200, and the ratio of the gear ratio γ8 of the eighth gear to the gear ratio γ9 of the ninth gear (=γ8/γ9) is 1.133. Thus, each gear ratio γ changes in substantially equal ratio. Also, the total gear ratio range, which is the ratio of the gear ratio γ1 of the first gear to the gear ratio γ9 of the ninth gear (=γ1/γ9), is 8.119, which is a relatively large value.

In the alignment graph shown in FIG. 20, the four vertical lines Y1 through Y4 represent components of the first transmitting portion 72. From left to right in the graph, line Y1 represents the sun gear S2 of the second front planetary gear set 70, line Y2 represents the carrier CA1 of the first front planetary gear set 68, line Y3 represents the ring gear R1 of the first front planetary gear set 68 and the carrier CA2 of the second front planetary gear set 70 which are connected together, and line Y4 represents the sun gear S1 of the first front planetary gear set 68 and the ring gear R2 of the second front planetary gear set 70 which are connected together. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 20 is similar to that shown in FIG. 9 so a description thereof will be omitted.

In this way, according to this third modified example of the third exemplary embodiment, first gear is established by engaging the first clutch C1 and the second brake B2. Second gear is established by engaging the first clutch C1 and the first brake B1. Third gear is established by engaging the first clutch C1 and the third clutch C3. Fourth gear is established by engaging the first clutch C1 and the fourth clutch C4. Fifth gear is established by engaging the first clutch C1 and the second clutch C2. Sixth gear is established by engaging the second clutch C2 and the fourth clutch C4. Seventh gear is established by engaging the second clutch C2 and the third clutch C3, and eighth gear is established by engaging the second clutch C2 and the first brake B1. Thus, the transmission 66 of this third modified example of the third exemplary embodiment is able to achieve eight forward gears.

The transmission 66 of this third modified example of the third exemplary embodiment is also able to achieve ninth gear by engaging the second clutch C2 and the fifth clutch C5. Therefore, in addition to being able to achieve nine forward gears, the step between eighth gear and ninth gear is able to be preferably set relatively small with a close ratio.

Figure 22:
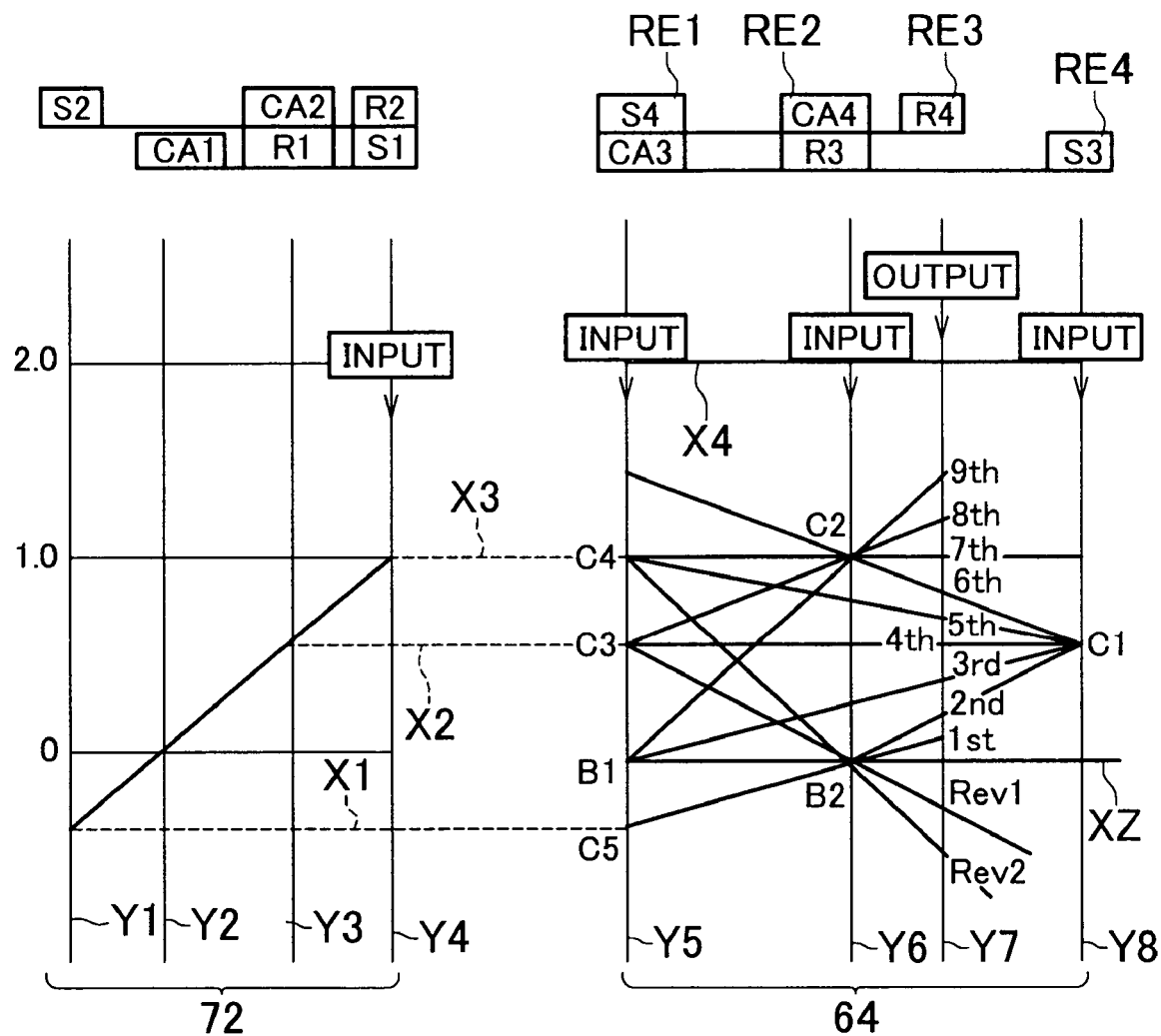
FIG. 22 is an alignment graph corresponding to FIG. 21, which is able to express, with straight lines, the relative relationships between the rotation speeds of various rotating elements which are connected differently in each gear in the transmission according to the fourth modified example of the third exemplary embodiment of the invention.

Here, as a fourth modified example of the third exemplary embodiment, the transmission 66 can achieve nine forward gears and two reverse gears by engaging the clutches and brakes in different combinations, as shown in FIG. 21, in response to a command from the ECU 42, and suitably setting the gear ratio of each planetary gear set. Also, FIG. 22 is an alignment graph corresponding to FIG. 21. Hereinafter, the clutch and brake engagement chart and alignment graph according to the fourth modified example of the third exemplary embodiment shown in FIGS. 21 and 22, which differ from those of the foregoing exemplary embodiment, will be described.

As shown in the clutch and brake engagement chart in FIG. 21, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 21, the fifth clutch C5 is engaged to connect the first rotating element RE1, i.e., the carrier CA3 of the first rear planetary gear set 58 and the sun gear S4 of the second rear planetary gear set 60 which are connected together, with the second intermediate output member 34, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first gear which has the largest gear ratio γ1, e.g., approximately 4.971.

Also, the first clutch C1 is engaged to connect the fourth rotating element RE4, i.e., the sun gear S3 of the first rear planetary gear set 58, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second gear which has a gear ratio γ2 which is smaller than the gear ratio γ1 of first gear, e.g., approximately 3.290.

Further, the first clutch C1 is engaged to connect the fourth rotating element RE4, i.e., the sun gear S3 of the first rear planetary gear set 58, with the first intermediate output member 32, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing third gear which has a gear ratio γ3 which is smaller than the gear ratio γ2 of second gear, e.g., approximately 2.222.

Also, the first clutch C1 is engaged to connect the fourth rotating element RE4, i.e., the sun gear S3 of the first rear planetary gear set 58, with the first intermediate output member 32, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing fourth gear which has a gear ratio γ4 which is smaller than the gear ratio γ3 of third gear, e.g., approximately 1.645.

Further, the first clutch C1 is engaged to connect the fourth rotating element RE4, i.e., the sun gear S3 of the first rear planetary gear set 58, with the first intermediate output member 32, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing fifth gear which has a gear ratio γ5 which is smaller than the gear ratio γ4 of fourth gear, e.g., approximately 1.409.

Also, the first clutch C1 is engaged to connect the fourth rotating element RE4, i.e., the sun gear S3 of the first rear planetary gear set 58, with the first intermediate output member 32, while the second clutch C2 is engaged to connect the second rotating element RE2, i.e., the ring gear R3 of the first rear planetary gear set 58 and the carrier CA4 of the second rear planetary gear set 60 which are connected together, with the input shaft 22, thereby establishing sixth gear which has a gear ratio γ6 which is smaller than the gear ratio γ5 of fifth gear, e.g., approximately 1.244.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the third clutch C3 is engaged to connect the first rotating element RE1, i.e., the carrier CA3 of the first rear planetary gear set 58 and the sun gear S4 of the second rear planetary gear set 60 which are connected together, to the first intermediate output member 32, thereby establishing eighth gear which has a gear ratio γ8 which is smaller than the gear ratio γ7 of seventh gear, e.g., approximately 0.825.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing ninth gear which has the smallest gear ratio γ9, e.g., approximately 0.649.

Also, the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first reverse gear "R1" which has a gear ratio γR1 of approximately 3.047.

Further, the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second reverse gear "R2" which has a gear ratio γR2 which is smaller than the gear ratio γR1 of the first reverse gear, e.g., 1.852. The gear ratio ρ1 of the first front planetary gear set 68, the gear ratio ρ2 of the second front planetary gear set 70, the gear ratio ρ3 of the first rear planetary gear set 58, and the gear ratio ρ4 of the second rear planetary gear set 60 are designed so that the foregoing gear ratios can be achieved.

In the transmission 66 that achieves the gears in accordance with the clutch and brake engagement chart shown in FIG. 21, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, and the ratio of the gear ratio γ8 of the eighth gear to the gear ratio γ9 of the ninth gear (=γ8/γ9) is 1.271. Thus, each gear ratio γ changes in substantially equal ratio. Also, the total gear ratio range, which is the ratio of the gear ratio γ1 of the first gear to the gear ratio γ9 of the ninth gear (=γγ1/γ9), is 7.655, which is a relatively large value.

In the alignment graph shown in FIG. 22, the four vertical lines Y1 through Y4 represent components of the first transmitting portion 72. From left to right in the graph, line Y1 represents the sun gear S2 of the second front planetary gear set 70, line Y2 represents the carrier CA1 of the first front planetary gear set 68, line Y3 represents the ring gear R1 of the first front planetary gear set 68 and the carrier CA2 of the second front planetary gear set 70 which are connected together, and line Y4 represents the sun gear S1 of the first front planetary gear set 68 and the ring gear R2 of the second front planetary gear set 70 which are connected together. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 22 is similar to that shown in FIG. 11 so a description thereof will be omitted.

In this way, according to this fourth modified example of the third exemplary embodiment, first gear is established by engaging the fifth clutch C5 and the second brake B2. Second gear is established by engaging the first clutch C1 and the second brake B2. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4, and eighth gear is established by engaging the second clutch C2 and the third clutch C3. Thus, the transmission 66 of this fourth modified example of the third exemplary embodiment is able to achieve eight forward gears.

The transmission 66 of this fourth modified example of the third exemplary embodiment is also able to achieve ninth gear by engaging the second clutch C2 and the first brake B1. Therefore, in addition to being able to achieve nine forward gears, the step between eighth gear and ninth gear is able to be preferably set relatively small with a close ratio.

Figure 24:
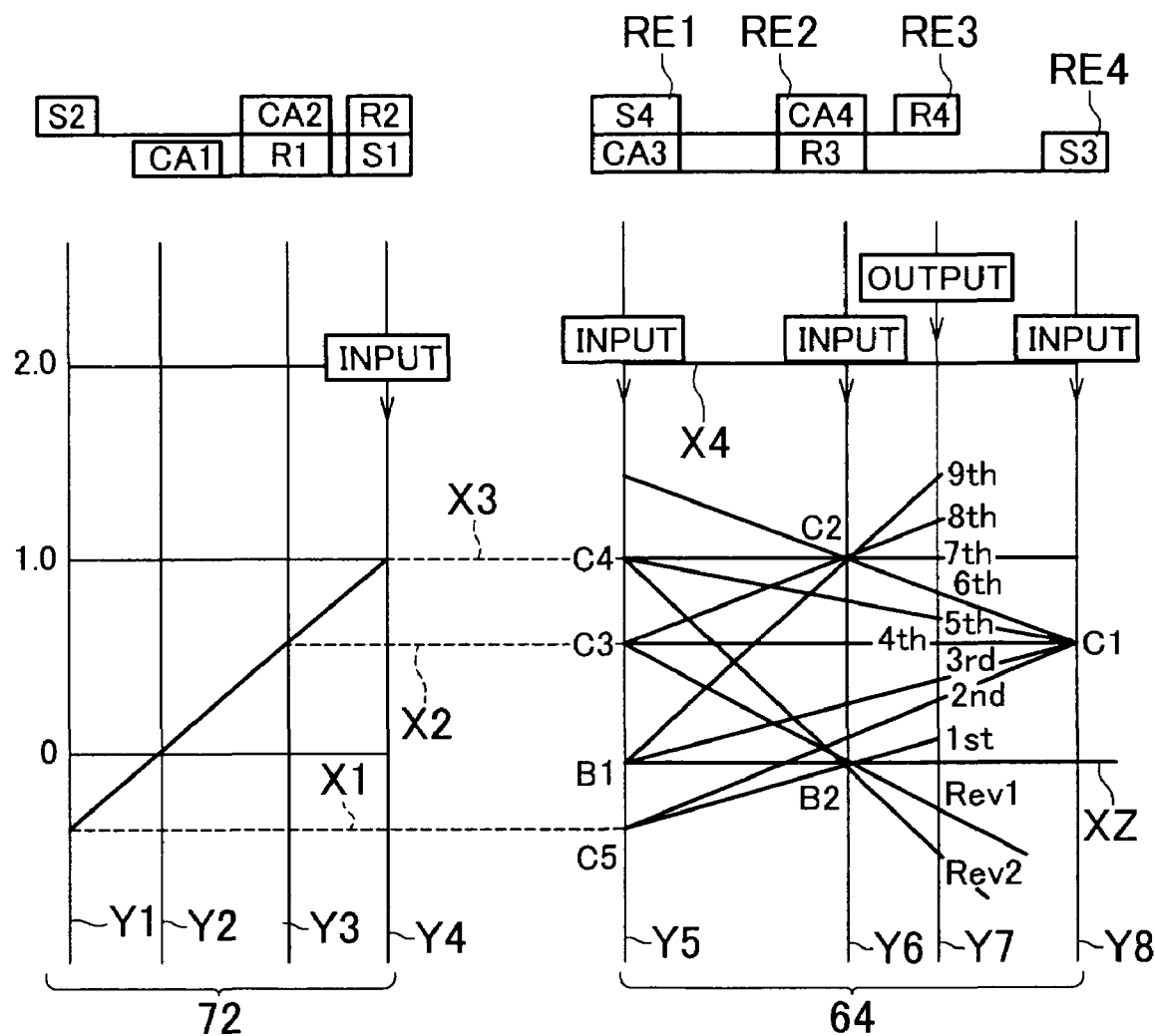
FIG. 24 is an alignment graph corresponding to FIG. 23, which is able to express, with straight lines, the relative relationships between the rotation speeds of various rotating elements which are connected differently in each gear in the transmission according to the fifth modified example of the third exemplary embodiment of the invention.

Here, as a fifth modified example of the third exemplary embodiment, the transmission 66 can achieve nine forward gears and two reverse gears, and effects equivalent to those obtained from the foregoing exemplary embodiment can be obtained, by engaging the clutches and brakes in different combinations, as shown in FIG. 23, in response to a command from the ECU 42, and suitably setting the gear ratio of each planetary gear set. Also, FIG. 24 is an alignment graph corresponding to FIG. 23. Hereinafter, the clutch and brake engagement chart and alignment graph according to the fifth modified example of the third exemplary embodiment shown in FIGS. 23 and 24, which differ from those of the foregoing exemplary embodiment, will be described.

As shown in the clutch and brake engagement chart in FIG. 23, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

In the clutch and brake engagement chart shown in FIG. 23, the operations of the friction engagement devices to establish first gear "1st" and third gear "3rd" through ninth gear "9th" are the same as those described above using FIG. 21, so descriptions thereof will be omitted here.

Second gear, on the other hand, is established by engaging the first clutch C1 to connect the fourth rotating element RE4, i.e., the sun gear S3 of the first rear planetary gear set 58, with the first intermediate output member 32, while engaging the fifth clutch C5 to connect the first rotating element RE1, i.e., the carrier CA3 of the first rear planetary gear set 58 and the sun gear S4 of the second rear planetary gear set 60 which are connected together, with the second intermediate output member 34.

In the transmission 66 that achieves the gears in accordance with the clutch and brake engagement chart shown in FIG. 23, the gear ratio γ1 of first gear is approximately 4.549, the gear ratio γ2 of second gear is approximately 2.924, the gear ratio γ3 of third gear is approximately 2.233, the gear ratio γ4 of fourth gear is approximately 1.645, the gear ratio γ5 of fifth gear is approximately 1.414, the gear ratio γ6 of sixth gear is approximately 1.246, the gear ratio γ7 of seventh gear is approximately 1.000, the gear ratio γ8 of eighth gear is approximately 0.824, the gear ratio γ9 of ninth gear is approximately 0.649, the gear ratio γR1 of first reverse gear is approximately 3.062, and the gear ratio γR2 of second reverse gear is approximately 1.852. Further, the ratio of the gear ratio γ1 of the first gear to the gear ratio γ2 of the second gear (=γ1/γ2) is 1.556, the ratio of the gear ratio γ2 of the second gear to the gear ratio γ3 of the third gear (=γ2/γ3) is 1.309, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.170, the ratio of the gear ratio γ5 of the fifth gear to the gear ratio γ6 of the sixth gear (=γ5/γ6) is 1.134, the ratio of the gear ratio γ6 of the sixth gear to the gear ratio γ7 of the seventh gear (=γ6/γ7) is 1.246, the ratio of the gear ratio γ7 of the seventh gear to the gear ratio γ8 of the eighth gear (=γ7/γ8) is 1.213, and the ratio of the gear ratio γ8 of the eighth gear to the gear ratio γ9 of the ninth gear (=γ8/γ9) is 1.246. Thus, each gear ratio γ changes in substantially equal ratio. Also, the total gear ratio range, which is the ratio of the gear ratio γ1 of the first gear to the gear ratio γ9 of the ninth gear (=γ1/γ9), is 7.005, which is a relatively large value.

In the alignment graph shown in FIG. 24, the four vertical lines Y1 through Y4 representing components of the first transmitting portion 72 and the four vertical lines Y5 through Y8 representing components of the second transmitting portion 64 represent the same rotating elements as in FIG. 16 because the structure shown in the skeleton view is the same. Also, in the clutch and brake engagement chart shown in FIG. 23, the operations of the friction engagement devices for establishing first gear "1st" and third gear "3rd" through ninth gear "9th" are the same as those described above using FIG. 21. Therefore, the alignment graph also corresponds to these. Thus, with the exception of second gear "2nd", the alignment graph shown in FIG. 24 is the same as the alignment graph shown in FIG. 22.

In second gear, on the other hand, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y5 and the horizontal line X1 with the point of intersection of the vertical line Y8 and the horizontal line X2, intersects with the vertical line Y7.

In this way, according to this fifth modified example of the third exemplary embodiment, first gear is established by engaging the fifth clutch C5 and the second brake B2. Second gear is established by engaging the first clutch C1 and the fifth clutch C5. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4. Eighth gear is established by engaging the second clutch C2 and the third clutch C3, and ninth gear is established by engaging the second clutch C2 and the first brake B1. Therefore, in addition to being able to achieve nine forward gears, the step between eighth gear and ninth gear is able to be preferably set relatively small with a close ratio.

Figure 26:
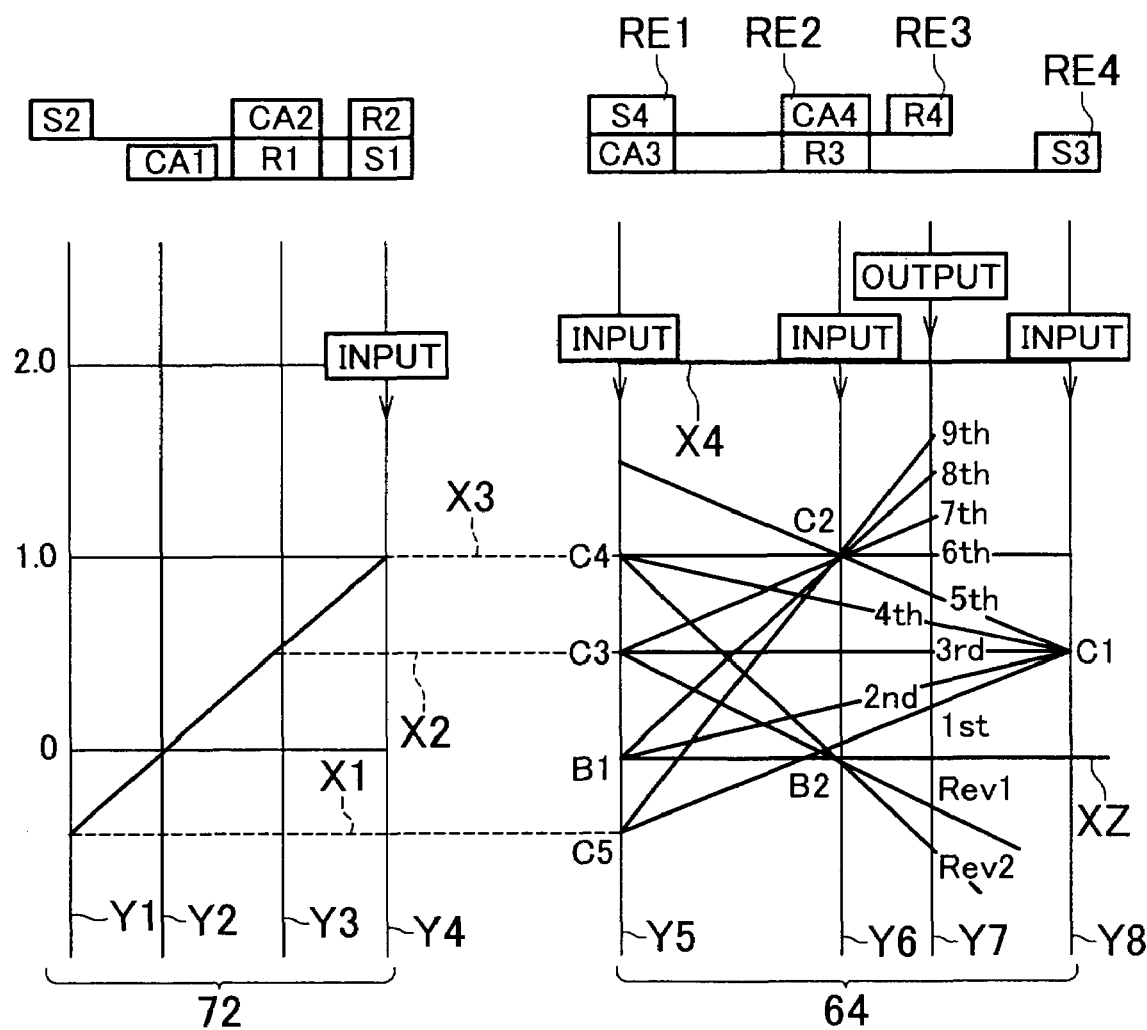
FIG. 26 is an alignment graph corresponding to FIG. 25, which is able to express, with straight lines, the relative relationships between the rotation speeds of various rotating elements which are connected differently in each gear in the transmission according to the sixth modified example of the third exemplary embodiment of the invention.

Here, as a sixth modified example of the third exemplary embodiment, the transmission 66 can achieve nine forward gears and two reverse gears by engaging the clutches and brakes in different combinations, as shown in FIG. 25, in response to a command from the ECU 42, and suitably setting the gear ratio of each planetary gear set. Also, FIG. 26 is an alignment graph corresponding to FIG. 25, which shows the rotation speeds of the rotating elements in each gear. Hereinafter, the clutch and brake engagement chart and alignment graph according to the sixth modified example of the third exemplary embodiment shown in FIGS. 25 and 26, which differ from those of the foregoing exemplary embodiment, will be described.

As shown in the clutch and brake engagement chart in FIG. 25, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 25, the first clutch C1 is engaged to connect the fourth rotating element RE4, i.e., the sun gear S3 of the first rear planetary gear set 58, with the first intermediate output member 32, while the fifth clutch C5 is engaged to connect the first rotating element RE1, i.e., the carrier CA3 of the first rear planetary gear set 58 and the sun gear S4 of the second rear planetary gear set 60 which are connected together, to the second intermediate output member 34, thereby establishing first gear which has a gear ratio γ1 of approximately 4.503, for example.

Meanwhile, in the clutch and brake engagement chart shown in FIG. 25, the operations of the friction engagement devices for establishing second gear "2nd" through ninth gear "9th" are the same as those described above using FIG. 19, so descriptions thereof will be omitted here. Also, in the transmission 66 that achieves the gears in accordance with the clutch and brake engagement chart shown in FIG. 25, the gear ratio γ2 of second gear is approximately 2.720, the gear ratio γ3 of third gear is approximately 2.000, the gear ratio γ4 of fourth gear is approximately 1.581, the gear ratio γ5 of fifth gear is approximately 1.316, the gear ratio γ6 of sixth gear is approximately 1.000, the gear ratio γ7 of seventh gear is approximately 0.800, the gear ratio γ8 of eighth gear is approximately 0.667, the gear ratio γ9 of ninth gear is approximately 0.563, the gear ratio γR1 of first reverse gear is approximately 4.000, and the gear ratio γR2 of second reverse gear is approximately 2.000. Further, the ratio of the gear ratio γ1 of the first gear to the gear ratio γ2 of the second gear (=γ1/γ2) is 1.656, the ratio of the gear ratio γ2 of the second gear to the gear ratio γ3 of the third gear (=γ2/γ3) is 1.360, the ratio of the gear ratio γ3 of the third gear to the gear ratio γ4 of the fourth gear (=γ3/γ4) is 1.265, the ratio of the gear ratio γ4 of the fourth gear to the gear ratio γ5 of the fifth gear (=γ4/γ5) is 1.201, the ratio of the gear ratio γ5 of the fifth gear to the gear ratio γ6 of the sixth gear (=γ5/γ6) is 1.316, the ratio of the gear ratio γ6 of the sixth gear to the gear ratio γ7 of the seventh gear (=γ6/γ7) is 1.250, the ratio of the gear ratio γ7 of the seventh gear to the gear ratio γ8 of the eighth gear (=γ7/γ8) is 1.200, and the ratio of the gear ratio γ8 of the eighth gear to the gear ratio γ9 of the ninth gear (=γ8/γ9) is 1.183. Thus, each gear ratio γ changes in substantially equal ratio. Also, the total gear ratio range, which is the ratio of the gear ratio γ1 of the first gear to the gear ratio γ9 of the ninth gear (=γ1/γ9), is 7.993, which is a relatively large value.

In the alignment graph shown in FIG. 26, the four vertical lines Y1 through Y4 representing components of the first transmitting portion 72 and the four vertical lines Y5 through Y8 representing components of the second transmitting portion 64 represent the same rotating elements as in FIG. 16 because the skeleton view is the same as that in the foregoing exemplary embodiment. Also, in the clutch and brake engagement chart shown in FIG. 25, the operations of the friction engagement devices for establishing second gear "2nd" through ninth gear "9th" are the same as those described above using FIG. 19. Therefore, the alignment graph also corresponds to these. Thus, second gear "2nd" through ninth gear "9th" shown in FIG. 26 are the same as those shown in FIG. 20, so descriptions thereof will be omitted here.

In first gear, on the other hand, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y5 and the horizontal line X1 with the point of intersection of the vertical line Y8 and the horizontal line X2, intersects with the vertical line Y7.

In this way, according to this sixth modified example of the third exemplary embodiment, first gear is established by engaging the first clutch C1 and the fifth clutch C5. Second gear is established by engaging the first clutch C1 and the first brake B1. Third gear is established by engaging the first clutch C1 and the third clutch C3. Fourth gear is established by engaging the first clutch C1 and the fourth clutch C4. Fifth gear is established by engaging the first clutch C1 and the second clutch C2. Sixth gear is established by engaging the second clutch C2 and the fourth clutch C4. Seventh gear is established by engaging the second clutch C2 and the third clutch C3. Eighth gear is established by engaging the second clutch C2 and the first brake B1, and ninth gear is established by engaging the second clutch C2 and the fifth clutch C5. Therefore, in addition to being able to achieve nine forward gears, the step between eighth gear and ninth gear is able to be preferably set relatively small with a close ratio.

Figure 27:
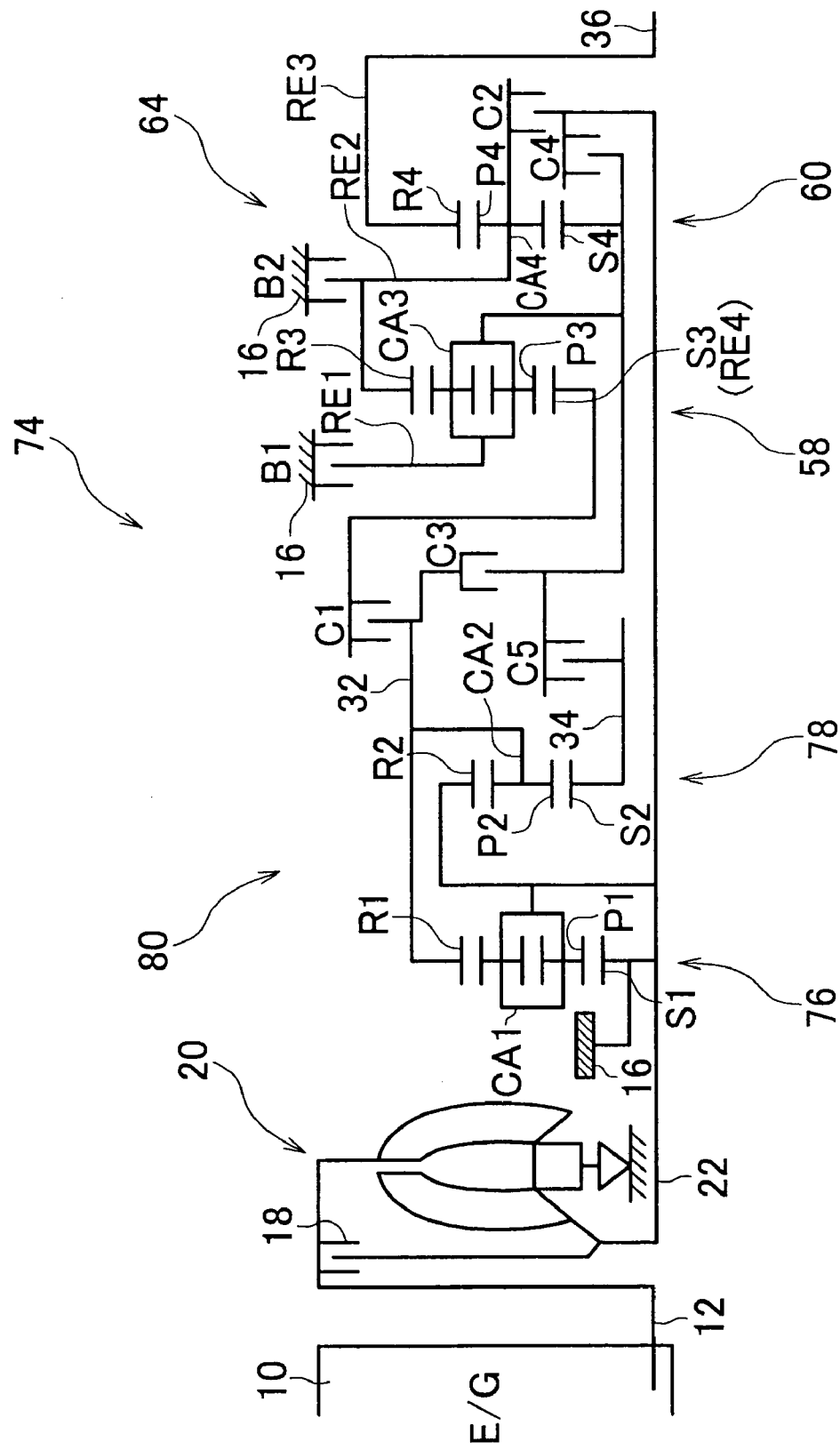
FIG. 27 is a skeleton view of the structure of a multi-speed transmission for a vehicle according to a fourth exemplary embodiment of the invention.
Figure 30:
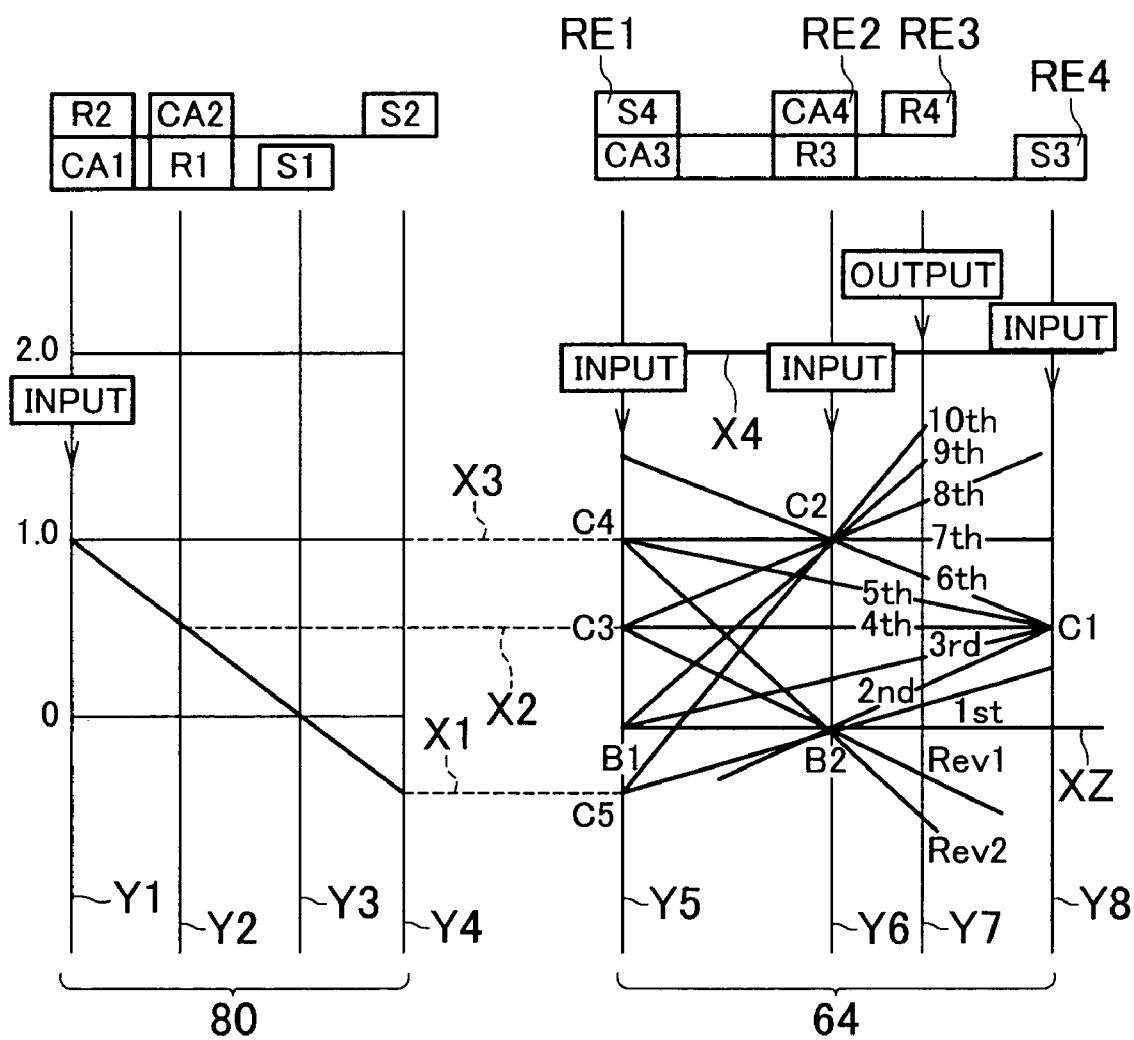
FIG. 30 is an alignment graph able to express, with straight lines, the relative relationships between the rotation speeds of various rotating elements which are connected differently in each gear in the transmission according to the fourth exemplary embodiment of the invention and the transmission according to the first modified example of the fourth exemplary embodiment of the invention.

FIG. 27 is a skeleton view of the structure of a transmission 74 according to a fourth exemplary embodiment of the invention. FIG. 28 is a chart showing the relationship between gears and operations of friction engagement devices necessary to establish those gears in the transmission 74. FIG. 30 is an alignment graph showing the rotation speeds of rotating elements in each gear. With the exception of the structure of a first transmitting portion 80, the transmission 74 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 74 of this exemplary embodiment which differ from parts of the transmission 66 will be described.

As shown in FIG. 27, a first front planetary gear set 76 which makes up part of the first transmitting portion 80 is a double pinion type planetary gear set which includes a sun gear S1, a plurality of sets of pinions P1 that are in mesh with each other, a carrier CA1 which rotatably and revolvably supports the pinions P1, and a ring gear R1 that is in mesh with the sun gear S1 via the pinions P1. A second front planetary gear set 78 which also makes up part of the first transmitting portion 80 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2.

In the first transmitting portion 80, the sun gear S1 of the first front planetary gear set 76 is integrally connected to the transmission case 16 which is a non-rotating member, thus preventing the sun gear S1 from rotating relative to the transmission case 16. Also, the carrier CA1 of the first front planetary gear set 76 and the ring gear R2 of the second front planetary gear set 78 are connected together as well as integrally connected to the input shaft 22 which is the input rotating member. Further, the ring gear R1 of the first front planetary gear set 76 and the carrier CA2 of the second front planetary gear set 78 are connected together as well as integrally connected to the first intermediate output member 32. Also, the sun gear S2 of the second front planetary gear set 78 is integrally connected to the second intermediate output member 34. This kind of structure results in the first transmitting portion 80 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 74 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 28, for example, in response to a command from the ECU 42, and a gear ratio γ (=input shaft rotation speed NIN/output shaft rotation speed NOUT) that changes in substantially equal ratio is able to be achieved for each gear.

In the transmission 74 that achieves the gears in accordance with the clutch and brake engagement chart shown in FIG. 28, the gear ratio γ1 of first gear is approximately 4.762, the gear ratio γ2 of second gear is approximately 4.110, the gear ratio γ3 of third gear is approximately 2.603, the gear ratio γ4 of fourth gear is approximately 2.000, the gear ratio γ5 of fifth gear is approximately 1.624, the gear ratio γ6 of sixth gear is approximately 1.322, the gear ratio γ7 of seventh gear is approximately 1.000, the gear ratio γ8 of eighth gear is approximately 0.833, the gear ratio γ9 of ninth gear is approximately 0.714, the gear ratio γ10 of tenth gear is approximately 0.621, the gear ratio γR1 of first reverse gear is approximately 5.000, and the gear ratio γR2 of second reverse gear is approximately 2.500. Further, the ratio of the gear ratio γ1 of the first gear to the gear ratio γ2 of the second gear (=γ1/γ2) is 1.159, the ratio of the gear ratio γ2 of the second gear to the gear ratio γ3 of the third gear (=γ2/γ3) is 1.579, the ratio of the gear ratio γ3 of the third gear to the gear ratio γ4 of the fourth gear (=γ3/γ4) is 1.301, the ratio of the gear ratio γ4 of the fourth gear to the gear ratio γ5 of the fifth gear (=γ4/γ5) is 1.232, the ratio of the gear ratio γ5 of the fifth gear to the gear ratio γ6 of the sixth gear (=γ5/γ6) is 1.229, the ratio of the gear ratio γ6 of the sixth gear to the gear ratio γ7 of the seventh gear (=γ6/γ7) is 1.322, the ratio of the gear ratio γ7 of the seventh gear to the gear ratio γ8 of the eighth gear (=γ7/γ8) is 1.200, the ratio of the gear ratio γ8 of the eighth gear to the gear ratio γ9 of the ninth gear (=γ8/γ9) is 1.167, and the ratio of the gear ratio γ9 of the ninth gear to the gear ratio γ10 of the tenth gear (=γ9/γ10) is 1.150. Thus, each gear ratio γ changes in substantially equal ratio. Also, the total gear ratio range, which is the ratio of the gear ratio γ1 of the first gear to the gear ratio γ10 of the tenth gear (=γ1/γ10), is 7.667, which is a relatively large value. The gear ratio ρ1 of the first front planetary gear set 76, the gear ratio ρ2 of the second front planetary gear set 78, the gear ratio ρ3 of the first rear planetary gear set 58, and the gear ratio ρ4 of the second rear planetary gear set 60 are designed so that the foregoing gear ratios can be achieved.

As a first modified example of the fourth exemplary embodiment, gears such as those shown in FIG. 29 can be obtained by suitably setting the gear ratios ρ1 through ρ4 of the planetary gear sets even though the engagement operations for each gear of the transmission 74 do not change. In the transmission 74 that achieves the gears in accordance with the clutch and brake engagement chart shown in FIG. 29, the gear ratio γ1 of first gear is approximately 4.971, the gear ratio γ2 of second gear is approximately 3.290, the gear ratio γ3 of third gear is approximately 2.222, the gear ratio γ4 of fourth gear is approximately 1.645, the gear ratio γ5 of fifth gear is approximately 1.409, the gear ratio γ6 of sixth gear is approximately 1.244, the gear ratio γ7 of seventh gear is approximately 1.000, the gear ratio γ8 of eighth gear is approximately 0.825, the gear ratio γ9 of ninth gear is approximately 0.649, the gear ratio γ10 of tenth gear is approximately 0.574, the gear ratio γR1 of first reverse gear is approximately 3.047, and the gear ratio γR2 of second reverse gear is approximately 1.852. Further, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, the ratio of the gear ratio γ8 of the eighth gear to the gear ratio γ9 of the ninth gear (=γ8/γ9) is 1.271, and the ratio of the gear ratio γ9 of the ninth gear to the gear ratio γ10 of the tenth gear (=γ9/γ10) is 1.131. Thus, each gear ratio γ changes in substantially equal ratio. Also, the total gear ratio range, which is the ratio of the gear ratio γ1 of the first gear to the gear ratio γ10 of the tenth gear (=γ1/γ10), is 8.655, which is a relatively large value. By suitably setting the gear ratio of each planetary gear set in this way, the total gear ratio range can be set wider than the total gear ratio range shown in FIG. 28.

In the alignment graph shown in FIG. 30, the four vertical lines Y1 through Y4 represent components of the first transmitting portion 80. From left to right in the graph, line Y1 represents the carrier CA1 of the first front planetary gear set 76 and the ring gear R2 of the second front planetary gear set 78 which are connected together to form one rotating element, line Y2 represents the ring gear R1 of the first front planetary gear set 76 and the carrier CA2 of the second front planetary gear set 78 which are connected together to form another rotating element, line Y3 represents the sun gear S1 of the first front planetary gear set 76 which is another rotating element, and line Y4 represents the sun gear S2 of the second front planetary gear set 78 which is another rotating element. Accordingly, based on these rotating elements, the alignment graph shown in FIG. 30 is similar to the alignment graph shown in FIG. 14 described above so a description thereof will be omitted.

In this way, according to the first modified example of the fourth exemplary embodiment, the first transmitting portion 80 includes the double pinion type first front planetary gear set 76 and the single pinion type second front planetary gear set 78. The sun gear S1 of the first front planetary gear set 76 is always connected to the transmission case 16, which is a non-rotating member, and the ring gear R1 of the first front planetary gear set 76 and the carrier CA2 of the second front planetary gear set 78 are connected together, while the carrier CA1 of the first front planetary gear set 76 and the ring gear R2 of the second front planetary gear set 78 are connected to the input shaft 22 which is the input rotating member. Accordingly, the ring gear R1 of the first front planetary gear set 76 or the carrier CA2 of the second front planetary gear set 78 functions as the first intermediate output member 32 while the sun gear S1 of the first front planetary gear set 76 functions as the second intermediate output member 34. Accordingly, a practical transmission 74 is able to be provided.

Figure 32:
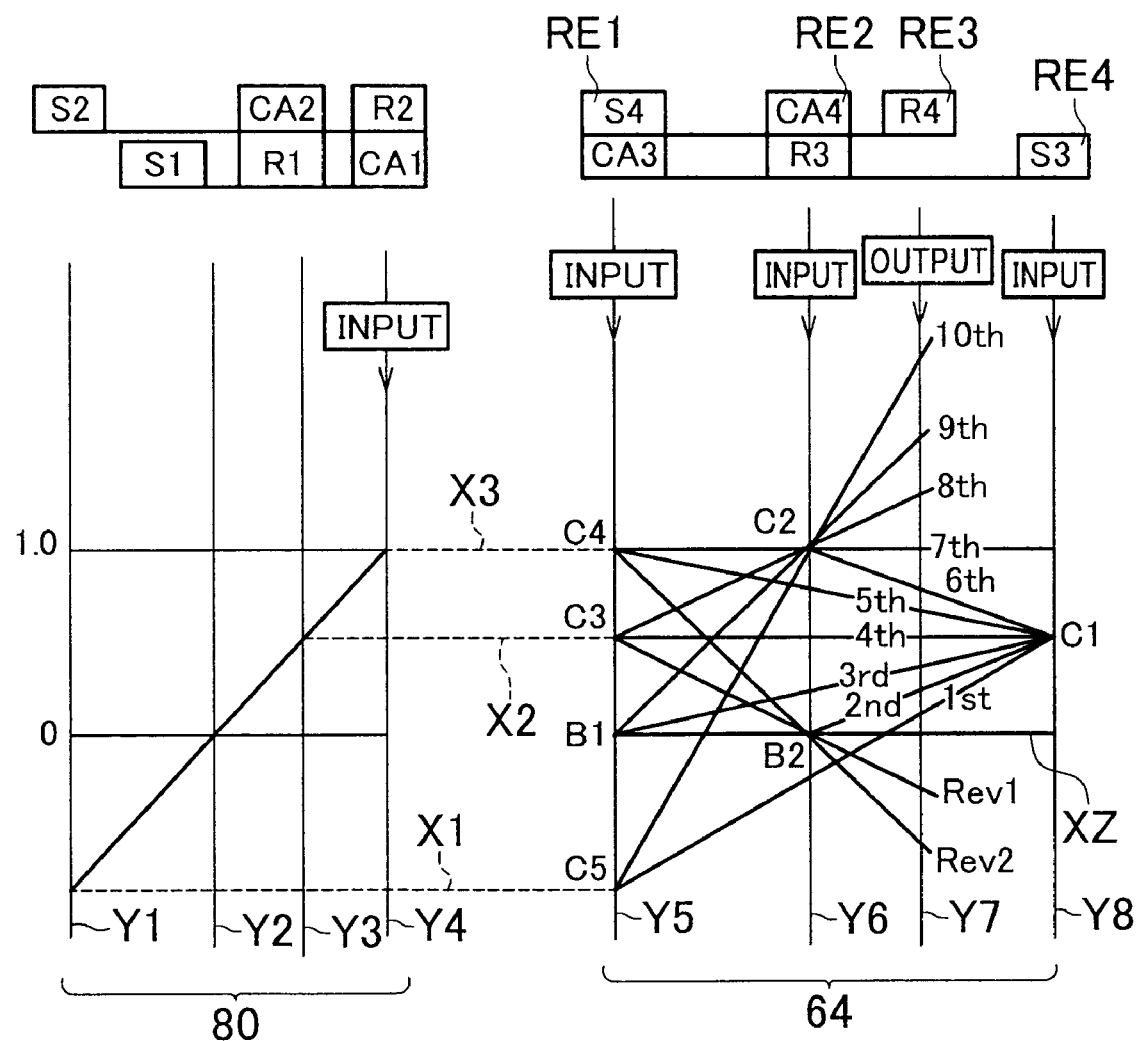
FIG. 32 is an alignment graph corresponding to FIG. 31, which is able to express, with straight lines, the relative relationships between the rotation speeds of various rotating elements which are connected differently in each gear in the transmission according to the second modified example of the fourth exemplary embodiment of the invention.

Here, as a second modified example of the fourth exemplary embodiment, the transmission 74 can achieve ten forward gears and two reverse gears by engaging the clutches and brakes in different combinations, as shown in FIG. 31, in response to a command from the ECU 42, and suitably setting the gear ratio of each planetary gear set. Also, FIG. 32 is an alignment graph corresponding to FIG. 31, which shows the rotation speeds of the rotating elements in each gear. Hereinafter, the clutch and brake engagement chart and alignment graph according to the second modified example of the fourth exemplary embodiment shown in FIGS. 31 and 32, which differ from those of the foregoing exemplary embodiment, will be described.

As shown in the clutch and brake engagement chart in FIG. 31, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

In the clutch and brake engagement chart shown in FIG. 31, the operations of the friction engagement devices to establish first gear "1st" through tenth gear "10th" are the same as those described above using FIG. 15, so descriptions thereof will be omitted here. Also, the gear ratios obtained by the engagement of those friction engagement devices in the various gears are also the same as those gear ratios shown in FIG. 15, so descriptions thereof will be omitted here.

In the alignment graph shown in FIG. 32, the four vertical lines Y1 through Y4 represent components of the first transmitting portion 80. From left to right in the graph, line Y1 represents the sun gear S2 of the second front planetary gear set 78, line Y2 represents the sun gear S1 of the first front planetary gear set 76, line Y3 represents the ring gear R1 of the first front planetary gear set 76 and the carrier CA2 of the second front planetary gear set 78 which are connected together, and line Y4 represents the carrier CA1 of the first front planetary gear set 76 and the ring gear R2 of the second front planetary gear set 78 which are connected together. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 32 is similar to the alignment graph shown in FIG. 16 so a description thereof will be omitted.

In this way, according to the second modified example of the fourth exemplary embodiment, it is possible to obtain a transmission 74 which can establish ten forward gears and two reverse gears, and in which the steps of the gears are relatively close ratios, by engagement combinations of the clutches and brakes of each gear and suitably setting the gear ratio of each planetary gear set.

Figure 34:
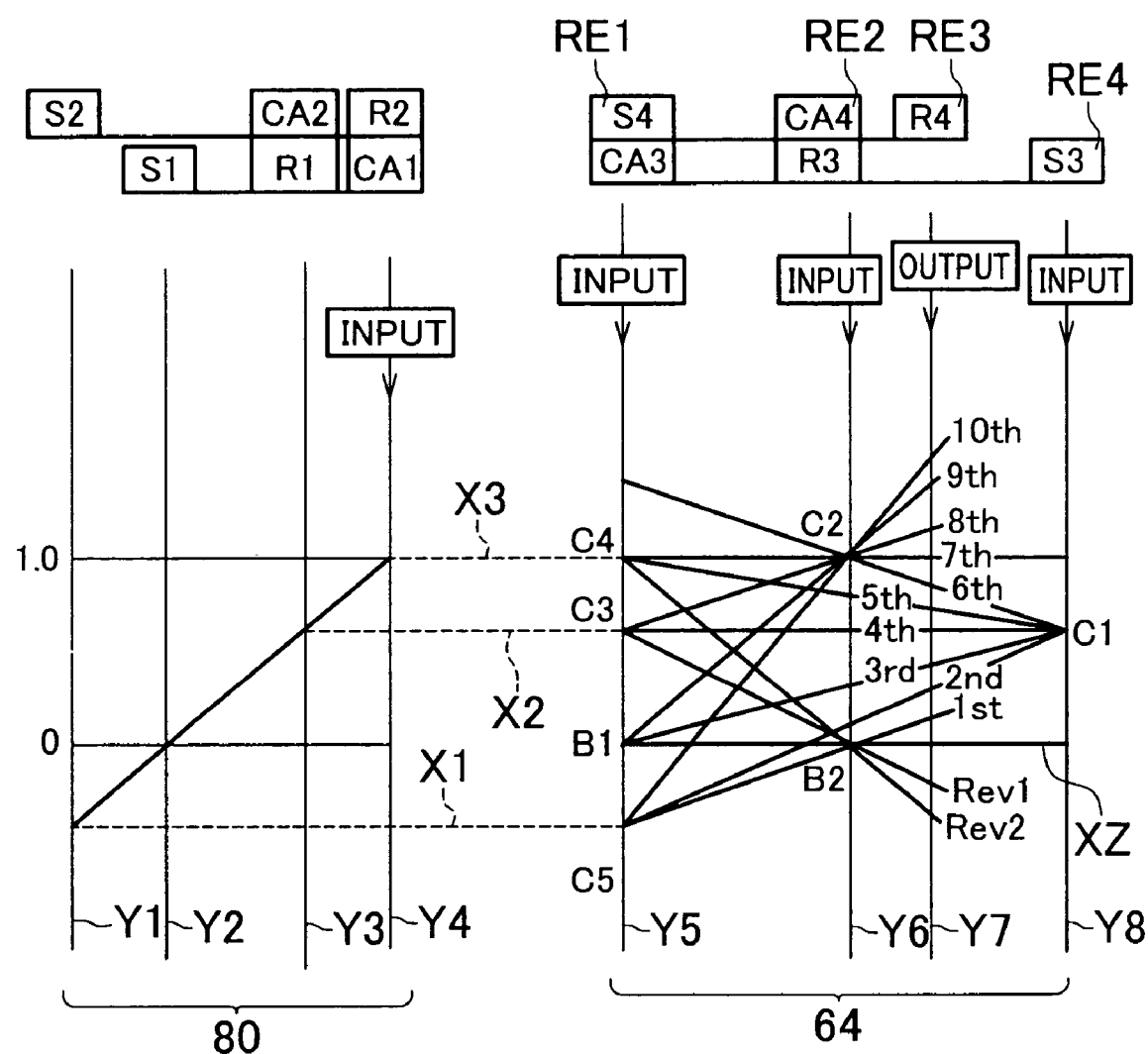
FIG. 34 is an alignment graph corresponding to FIG. 33, which is able to express, with straight lines, the relative relationships between the rotation speeds of various rotating elements which are connected differently in each gear in the transmission according to the third modified example of the fourth exemplary embodiment of the invention.

Here, as a third modified example of the fourth exemplary embodiment, the transmission 74 can achieve ten forward gears and two reverse gears by engaging the clutches and brakes in different combinations, as shown in FIG. 33, in response to a command from the ECU 42, and suitably setting the gear ratio of each planetary gear set. FIG. 34 is an alignment graph corresponding to FIG. 33, which shows the rotation speeds of the rotating elements in each gear. Hereinafter, the clutch and brake engagement chart and alignment graph according to the third modified example of the fourth exemplary embodiment shown in FIGS. 33 and 34, which differ from those of the foregoing exemplary embodiment, will be described.

As shown in the clutch and brake engagement chart in FIG. 33, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

In the clutch and brake engagement chart shown in FIG. 33, the operations of the friction engagement devices to establish first gear "1st" through tenth gear "10th" are the same as those described above using FIG. 17, so descriptions thereof will be omitted here. Also, the gear ratios obtained by the engagement of those friction engagement devices in the various gears are the same as those gear ratios shown in FIG. 17, so descriptions thereof will be omitted here.

In the alignment graph shown in FIG. 34, the four vertical lines Y1 through Y4 represent components of the first transmitting portion 80. From left to right in the graph, line Y1 represents the sun gear S2 of the second front planetary gear set 78, line Y2 represents the sun gear S1 of the first front planetary gear set 76, line Y3 represents the ring gear R1 of the first front planetary gear set 76 and the carrier CA2 of the second front planetary gear set 78 which are connected together, and line Y4 represents the carrier CA1 of the first front planetary gear set 76 and the ring gear R2 of the second front planetary gear set 78 which are connected together. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 34 is similar to the alignment graph shown in FIG. 18 so a description thereof will be omitted.

In this way, according to the third modified example of the fourth exemplary embodiment, it is possible to obtain a transmission 74 which can establish ten forward gears and two reverse gears, and in which the steps of the gears are relatively close ratios, by engagement combinations of the clutches and brakes of each gear, such as those described above, and suitably setting the gear ratio of each planetary gear set.

Figure 36:
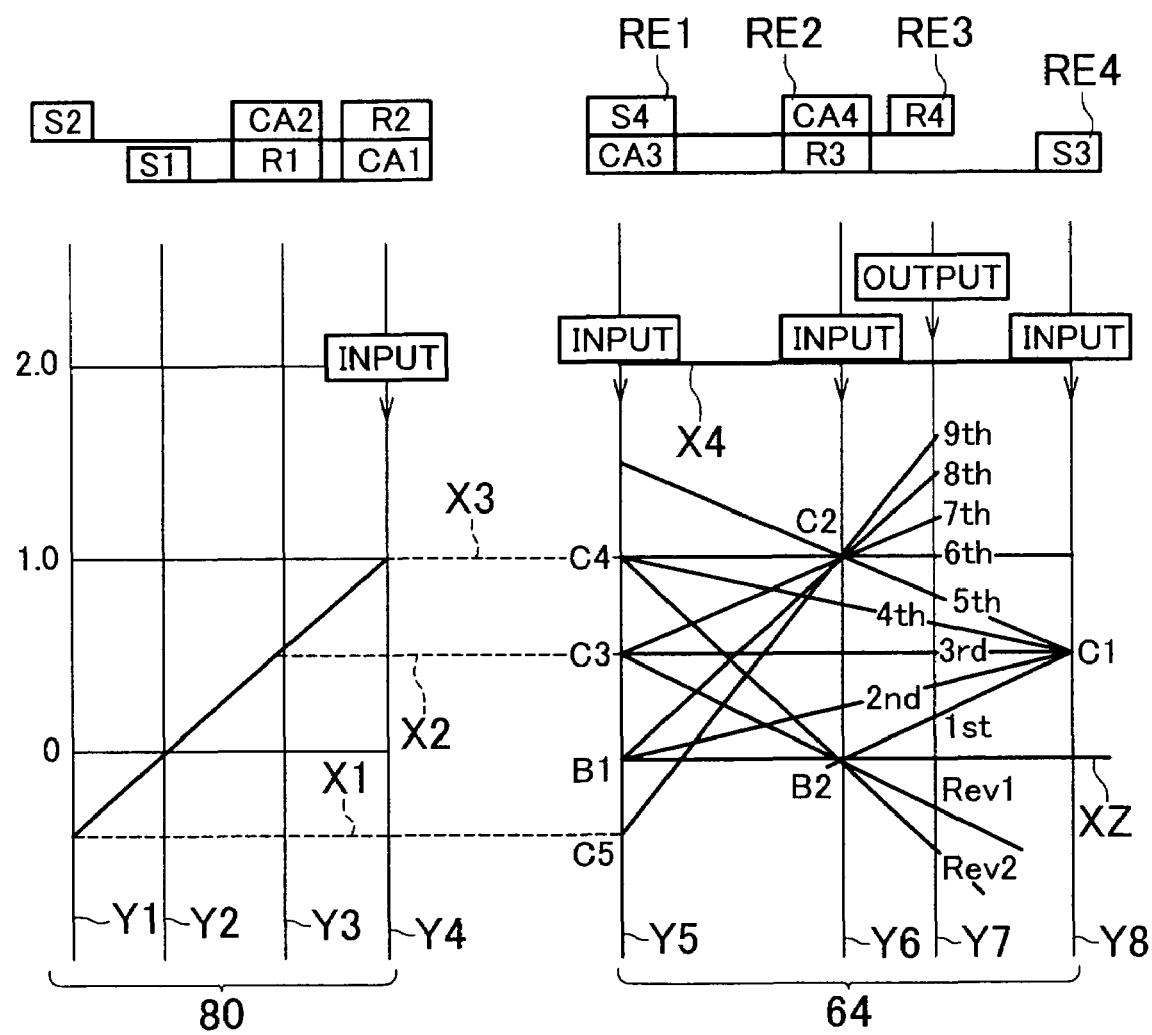
FIG. 36 is an alignment graph corresponding to FIG. 35, which is able to express, with straight lines, the relative relationships between the rotation speeds of various rotating elements which are connected differently in each gear in the transmission according to the fourth modified example of the fourth exemplary embodiment of the invention.

Here, as a fourth modified example of the fourth exemplary embodiment, the transmission 74 can achieve nine forward gears and two reverse gears by engaging the clutches and brakes in different combinations, as shown in FIG. 35, in response to a command from the ECU 42, and suitably setting the gear ratio of each planetary gear set. FIG. 36 is an alignment graph corresponding to FIG. 35, which shows the rotation speeds of the rotating elements in each gear. Hereinafter, the clutch and brake engagement chart and alignment graph according to the fourth modified example of the fourth exemplary embodiment shown in FIGS. 35 and 36, which differ from those of the foregoing exemplary embodiment, will be described.

As shown in the clutch and brake engagement chart in FIG. 35, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 35, the first clutch C1 is engaged to connect the fourth rotating element RE4, i.e., the sun gear S3 of the first rear planetary gear set 58, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first gear which has the largest gear ratio γ1, e.g., approximately 4.776.

Also, the first clutch C1 is engaged to connect the fourth rotating element RE4, i.e., the sun gear S3 of the first rear planetary gear set 58, with the first intermediate output member 32, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing second gear which has a gear ratio γ2 which is smaller than the gear ratio γ1 of first gear, e.g., approximately 2.925.

Further, the first clutch C1 is engaged to connect the fourth rotating element RE4, i.e., the sun gear S3 of the first rear planetary gear set 58, with the first intermediate output member 32, while the third clutch C3 is engaged to connect the first rotating element RE1, i.e., the carrier CA3 of the first rear planetary gear set 58 and the sun gear S4 of the second rear planetary gear set 60 which are connected together, to the first intermediate output member 32, thereby establishing third gear which has a gear ratio γ3 which is smaller than the gear ratio γ2 of second gear, e.g., approximately 2.000.

Also, the first clutch C1 is engaged to connect the fourth rotating element RE4, i.e., the sun gear S3 of the first rear planetary gear set 58, with the first intermediate output member 32, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing fourth gear which has a gear ratio γ4 which is smaller than the gear ratio γ3 of third gear, e.g., approximately 1.519.

Further, the first clutch C1 is engaged to connect the fourth rotating element RE4, i.e., the sun gear S3 of the first rear planetary gear set 58, with the first intermediate output member 32, while the second clutch C2 is engaged to connect the second rotating element RE2, i.e., the ring gear R3 of the first rear planetary gear set 58 and the carrier CA4 of the second rear planetary gear set 60 which are connected together, with the input shaft 22, thereby establishing fifth gear which has a gear ratio γ5 which is smaller than the gear ratio γ4 of fourth gear, e.g., approximately 1.265.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing sixth gear which has a gear ratio γ6 which is smaller than the gear ratio γ5 of fifth gear, e.g., approximately 1.000.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing seventh gear which has a gear ratio γ7 which is smaller than the gear ratio γ6 of sixth gear, e.g., approximately 0.800.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing eighth gear which has a gear ratio γ8 which is smaller than the gear ratio γ7 of seventh gear, e.g., approximately 0.667.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fifth clutch C5 is engaged to connect the first rotating element RE1, i.e., the carrier CA3 of the first rear planetary gear set 58 and the sun gear S4 of the second rear planetary gear set 60 which are connected together, with the second intermediate output member 34, thereby establishing ninth gear which has the smallest gear ratio γ9, e.g., approximately 0.588.

Also, the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first reverse gear "R1" which has a gear ratio γR1 of approximately 4.000.

Further, the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second reverse gear "R2" which has a gear ratio γR2 which is smaller than the gear ratio γR1 of the first reverse gear, e.g., 2.000. The gear ratio ρ1 of the first front planetary gear set 76, the gear ratio ρ2 of the second front planetary gear set 78, the gear ratio ρ3 of the first rear planetary gear set 58, and the gear ratio ρ4 of the second rear planetary gear set 60 are designed so that the foregoing gear ratios can be achieved.

In the transmission 74 that achieves the gears in accordance with the clutch and brake engagement chart shown in FIG. 35, the ratio of the gear ratio γ1 of the first gear to the gear ratio γ2 of the second gear (=γ1/γ2) is 1.633, the ratio of the gear ratio γ2 of the second gear to the gear ratio γ3 of the third gear (=γ2/γ3) is 1.463, the ratio of the gear ratio γ3 of the third gear to the gear ratio γ4 of the fourth gear (=γ3/γ4) is 1.316, the ratio of the gear ratio γ4 of the fourth gear to the gear ratio γ5 of the fifth gear (=γ4/γ5) is 1.201, the ratio of the gear ratio γ5 of the fifth gear to the gear ratio γ6 of the sixth gear (=γ5/γ6) is 1.265, the ratio of the gear ratio γ6 of the sixth gear to the gear ratio γ7 of the seventh gear (=γ6/γ7) is 1.250, the ratio of the gear ratio γ7 of the seventh gear to the gear ratio γ8 of the eighth gear (=γ7/γ8) is 1.200, and the ratio of the gear ratio γ8 of the eighth gear to the gear ratio γ9 of the ninth gear (=γ8/γ9) is 1.133. Thus, each gear ratio γ changes in substantially equal ratio. Also, the total gear ratio range, which is the ratio of the gear ratio γ1 of the first gear to the gear ratio γ9 of the ninth gear (=γ1/γ9), is 8.119, which is a relatively large value.

In the alignment graph shown in FIG. 36, the four vertical lines Y1 through Y4 represent components of the first transmitting portion 80. From left to right in the graph, line Y1 represents the sun gear S2 of the second front planetary gear set 78, line Y2 represents the sun gear S1 of the first front planetary gear set 76, line Y3 represents the ring gear R1 of the first front planetary gear set 76 and the carrier CA2 of the second front planetary gear set 78 which are connected together, and line Y4 represents the carrier CA1 of the first front planetary gear set 76 and the ring gear R2 of the second front planetary gear set 78 which are connected together. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. Accordingly, based on these rotating elements, the alignment graph shown in FIG. 36 is similar to that shown in FIG. 9 so a description thereof will be omitted.

In this way, according to this fourth modified example of the fourth exemplary embodiment, first gear is established by engaging the first clutch C1 and the second brake B2. Second gear is established by engaging the first clutch C1 and the first brake B1. Third gear is established by engaging the first clutch C1 and the third clutch C3. Fourth gear is established by engaging the first clutch C1 and the fourth clutch C4. Fifth gear is established by engaging the first clutch C1 and the second clutch C2. Sixth gear is established by engaging the second clutch C2 and the fourth clutch C4. Seventh gear is established by engaging the second clutch C2 and the third clutch C3, and eighth gear is established by engaging the second clutch C2 and the first brake B1. Thus, the transmission 74 of this fourth modified example of the fourth exemplary embodiment is able to achieve eight forward gears.

The transmission 74 of this fourth modified example of the fourth exemplary embodiment is also able to achieve ninth gear by engaging the second clutch C2 and the fifth clutch C5. Therefore, in addition to being able to achieve nine forward gears, the step between eighth gear and ninth gear is able to be preferably set relatively small with a close ratio.

Figure 38:
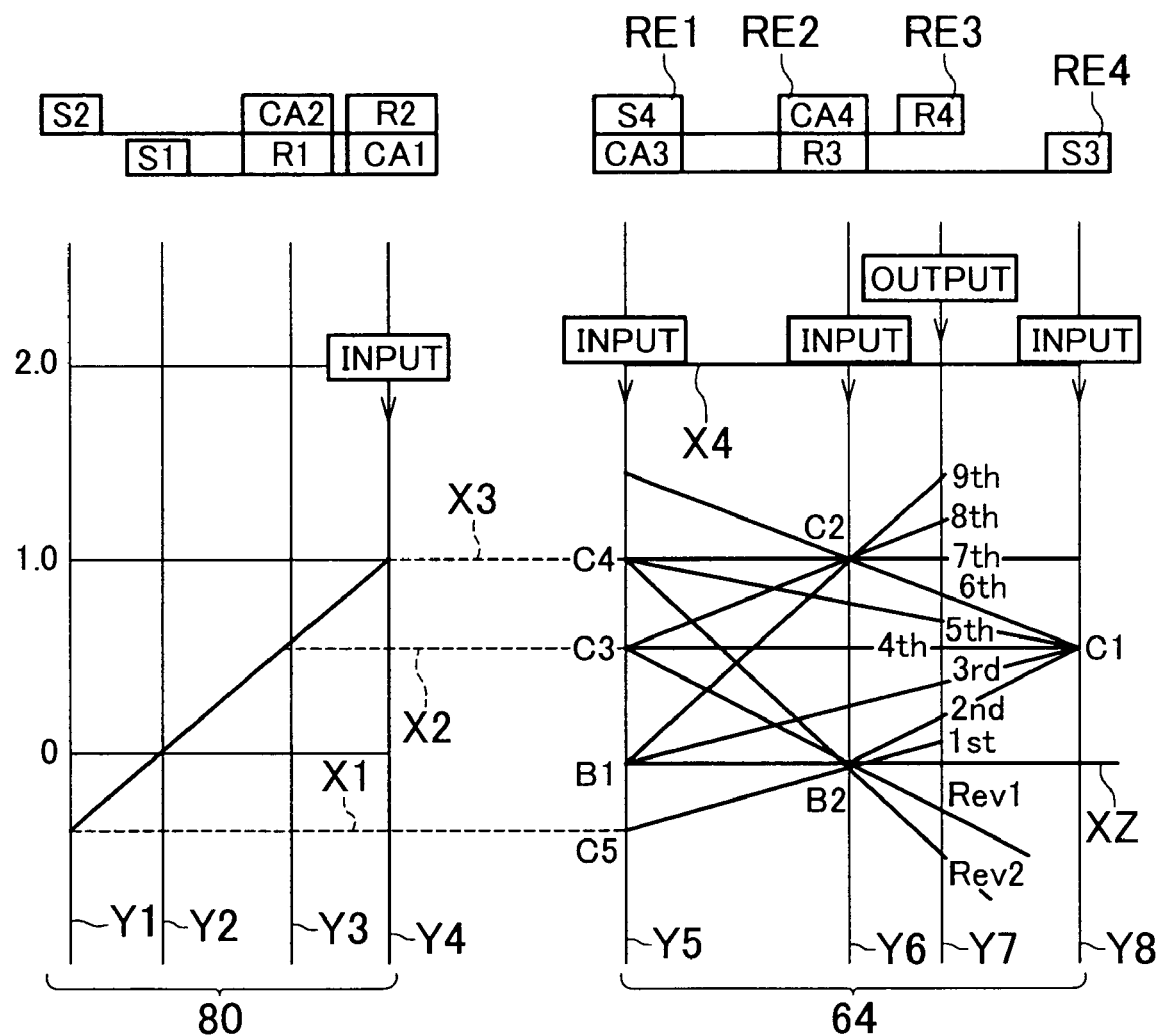
FIG. 38 is an alignment graph corresponding to FIG. 37, which is able to express, with straight lines, the relative relationships between the rotation speeds of various rotating elements which are connected differently in each gear in the transmission according to the fifth modified example of the fourth exemplary embodiment of the invention.

Here, as a fifth modified example of the fourth exemplary embodiment, the transmission 74 can achieve nine forward gears and two reverse gears by engaging the clutches and brakes in different combinations, as shown in FIG. 37, in response to a command from the ECU 42, and suitably setting the gear ratio of each planetary gear set. Also, FIG. 38 is an alignment graph corresponding to FIG. 37, which shows the rotation speeds of the rotating elements in each gear. Hereinafter, the clutch and brake engagement chart and alignment graph according to the fifth modified example of the fourth exemplary embodiment shown in FIGS. 37 and 38, which differ from those of the foregoing exemplary embodiment, will be described.

As shown in the clutch and brake engagement chart in FIG. 37, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 37, the fifth clutch C5 is engaged to connect the first rotating element RE1, i.e., the carrier CA3 of the first rear planetary gear set 58 and the sun gear S4 of the second rear planetary gear set 60 which are connected together, with the second intermediate output member 34, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first gear which has the largest gear ratio γ1, e.g., approximately 4.971.

Also, the first clutch C1 is engaged to connect the fourth rotating element RE4, i.e., the sun gear S3 of the first rear planetary gear set 58, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second gear which has a gear ratio γ2 which is smaller than the gear ratio γ1 of first gear, e.g., approximately 3.290.

Further, the first clutch C1 is engaged to connect the fourth rotating element RE4, i.e., the sun gear S3 of the first rear planetary gear set 58, with the first intermediate output member 32, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing third gear which has a gear ratio γ3 which is smaller than the gear ratio γ2 of second gear, e.g., approximately 2.222.

Also, the first clutch C1 is engaged to connect the fourth rotating element RE4, i.e., the sun gear S3 of the first rear planetary gear set 58, with the first intermediate output member 32, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing fourth gear which has a gear ratio γ4 which is smaller than the gear ratio γ3 of third gear, e.g., approximately 1.645.

Further, the first clutch C1 is engaged to connect the fourth rotating element RE4, i.e., the sun gear S3 of the first rear planetary gear set 58, with the first intermediate output member 32, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing fifth gear which has a gear ratio γ5 which is smaller than the gear ratio γ4 of fourth gear, e.g., approximately 1.409.

Also, the first clutch C1 is engaged to connect the fourth rotating element RE4, i.e., the sun gear S3 of the first rear planetary gear set 58, with the first intermediate output member 32, while the second clutch C2 is engaged to connect the second rotating element RE2, i.e., the ring gear R3 of the first rear planetary gear set 58 and the carrier CA4 of the second rear planetary gear set 60 which are connected together, with the input shaft 22, thereby establishing sixth gear which has a gear ratio γ6 which is smaller than the gear ratio γ5 of fifth gear, e.g., approximately 1.244.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the third clutch C3 is engaged to connect the first rotating element RE1, i.e., the carrier CA3 of the first rear planetary gear set 58 and the sun gear S4 of the second rear planetary gear set 60 which are connected together, to the first intermediate output member 32, thereby establishing eighth gear which has a gear ratio γ8 which is smaller than the gear ratio γ7 of seventh gear, e.g., approximately 0.825.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing ninth gear which has the smallest gear ratio γ9, e.g., approximately 0.649.

Also, the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first reverse gear "R1" which has a gear ratio γR1 of approximately 3.047.

Further, the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second reverse gear "R2" which has a gear ratio γR2 which is smaller than the gear ratio γR1 of the first reverse gear, e.g., 1.852. The gear ratio ρ1 of the first front planetary gear set 76, the gear ratio ρ2 of the second front planetary gear set 78, the gear ratio ρ3 of the first rear planetary gear set 58, and the gear ratio ρ4 of the second rear planetary gear set 60 are designed so that the foregoing gear ratios can be achieved.

In the transmission 74 that achieves the gears in accordance with the clutch and brake engagement chart shown in FIG. 37, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, and the ratio of the gear ratio γ8 of the eighth gear to the gear ratio γ9 of the ninth gear (=γ8/γ9) is 1.271. Thus, each gear ratio γ changes in substantially equal ratio. Also, the total gear ratio range, which is the ratio of the gear ratio γ1 of the first gear to the gear ratio γ9 of the ninth gear (=γ1/γ9), is 7.655, which is a relatively large value.

In the alignment graph shown in FIG. 38, the four vertical lines Y1 through Y4 represent components of the first transmitting portion 80. From left to right in the graph, line Y1 represents the sun gear S2 of the second front planetary gear set 78, line Y2 represents the sun gear S1 of the first front planetary gear set 76, line Y3 represents the ring gear R1 of the first front planetary gear set 76 and the carrier CA2 of the second front planetary gear set 78 which are connected together, and line Y4 represents the carrier CA1 of the first front planetary gear set 76 and the ring gear R2 of the second front planetary gear set 78 which are connected together. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. Accordingly, based on these rotating elements, the alignment graph shown in FIG. 38 is similar to that shown in FIG. 11 so a description thereof will be omitted.

In this way, according to this fifth modified example of the fourth exemplary embodiment, first gear is established by engaging the fifth clutch C5 and the second brake B2. Second gear is established by engaging the first clutch C1 and the second brake B2. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4, and eighth gear is established by engaging the second clutch C2 and the third clutch C3. Thus, the transmission 74 of this fifth modified example of the fourth exemplary embodiment is able to achieve eight forward gears.

The transmission 74 of this fifth modified example of the fourth exemplary embodiment is also able to achieve ninth gear by engaging the second clutch C2 and the first brake B1. Therefore, in addition to being able to achieve nine forward gears, the step between eighth gear and ninth gear is able to be preferably set relatively small with a close ratio.

Figure 40:
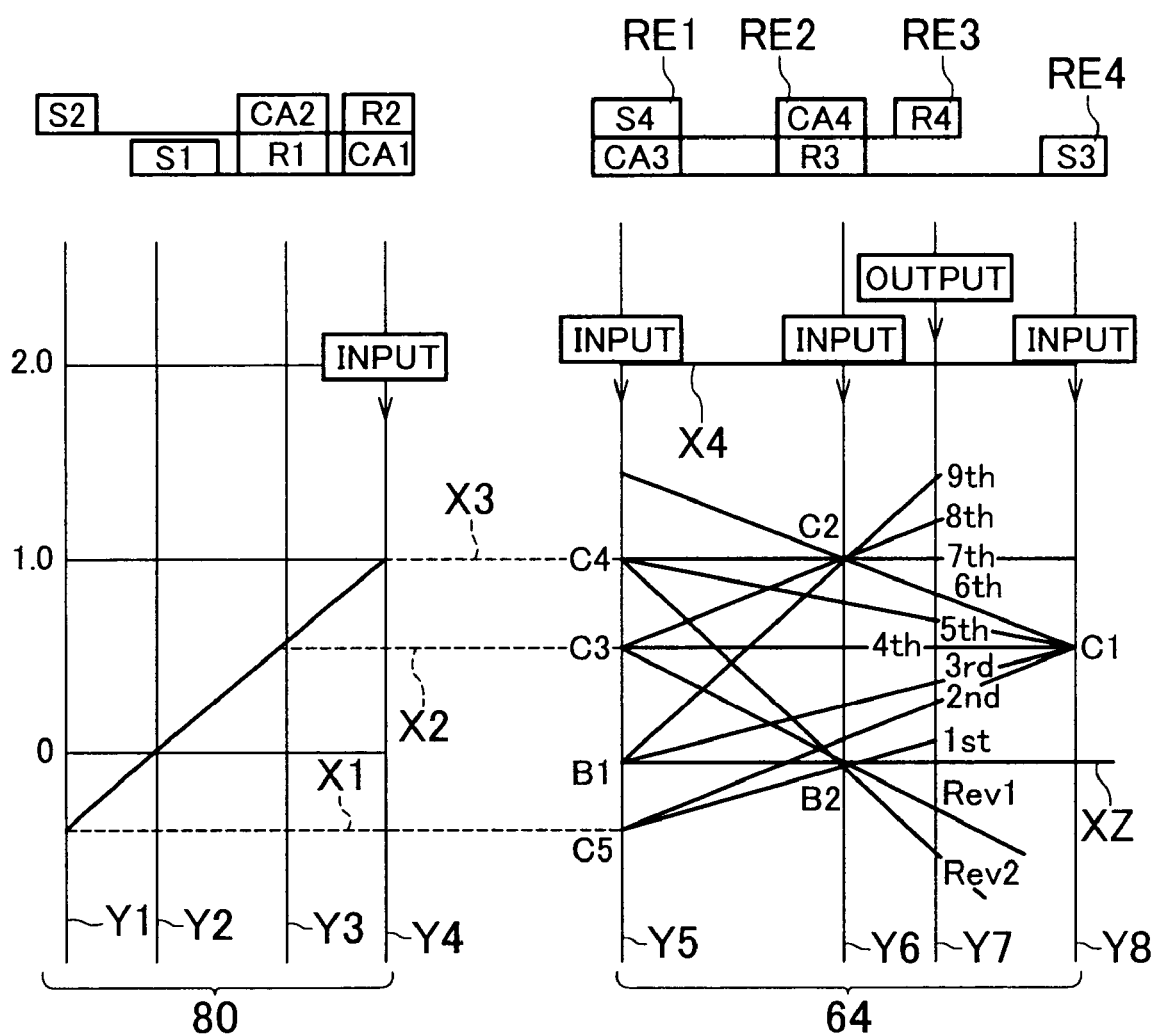
FIG. 40 is an alignment graph corresponding to FIG. 39, which is able to express, with straight lines, the relative relationships between the rotation speeds of various rotating elements which are connected differently in each gear in the transmission according to the sixth modified example of the fourth exemplary embodiment of the invention.

Here, as a sixth modified example of the fourth exemplary embodiment, the transmission 74 can achieve nine forward gears and two reverse gears, and effects equivalent to those obtained from the foregoing exemplary embodiment can be obtained, by engaging the clutches and brakes in different combinations, as shown in FIG. 39, in response to a command from the ECU 42, and suitably setting the gear ratio of each planetary gear set. Also, FIG. 40 is an alignment graph corresponding to FIG. 39, which shows the rotation speeds of the rotating elements in each gear. Hereinafter, the clutch and brake engagement chart and alignment graph according to the sixth modified example of the fourth exemplary embodiment shown in FIGS. 39 and 40, which differ from those of the foregoing exemplary embodiment, will be described.

As shown in the clutch and brake engagement chart in FIG. 39, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 23, so descriptions thereof will be omitted here.

In the alignment graph shown in FIG. 40, the four vertical lines Y1 through Y4 representing components of the first transmitting portion 80 and the four vertical lines Y5 through Y8 representing components of the second transmitting portion 64 represent the same rotating elements as those in FIG. 32 described above because the structure shown in the skeleton view is the same. Also, in the clutch and brake engagement chart shown in FIG. 39, the operations of the friction engagement devices for establishing first gear "1st" through ninth gear "9th" are the same as those described above using FIG. 23. Therefore, the alignment graph also corresponds to these. Thus, the alignment graph shown in FIG. 40 is the same as the alignment graph shown in FIG. 24.

Thus, according to this sixth modified example of the fourth exemplary embodiment as well, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

Figure 42:
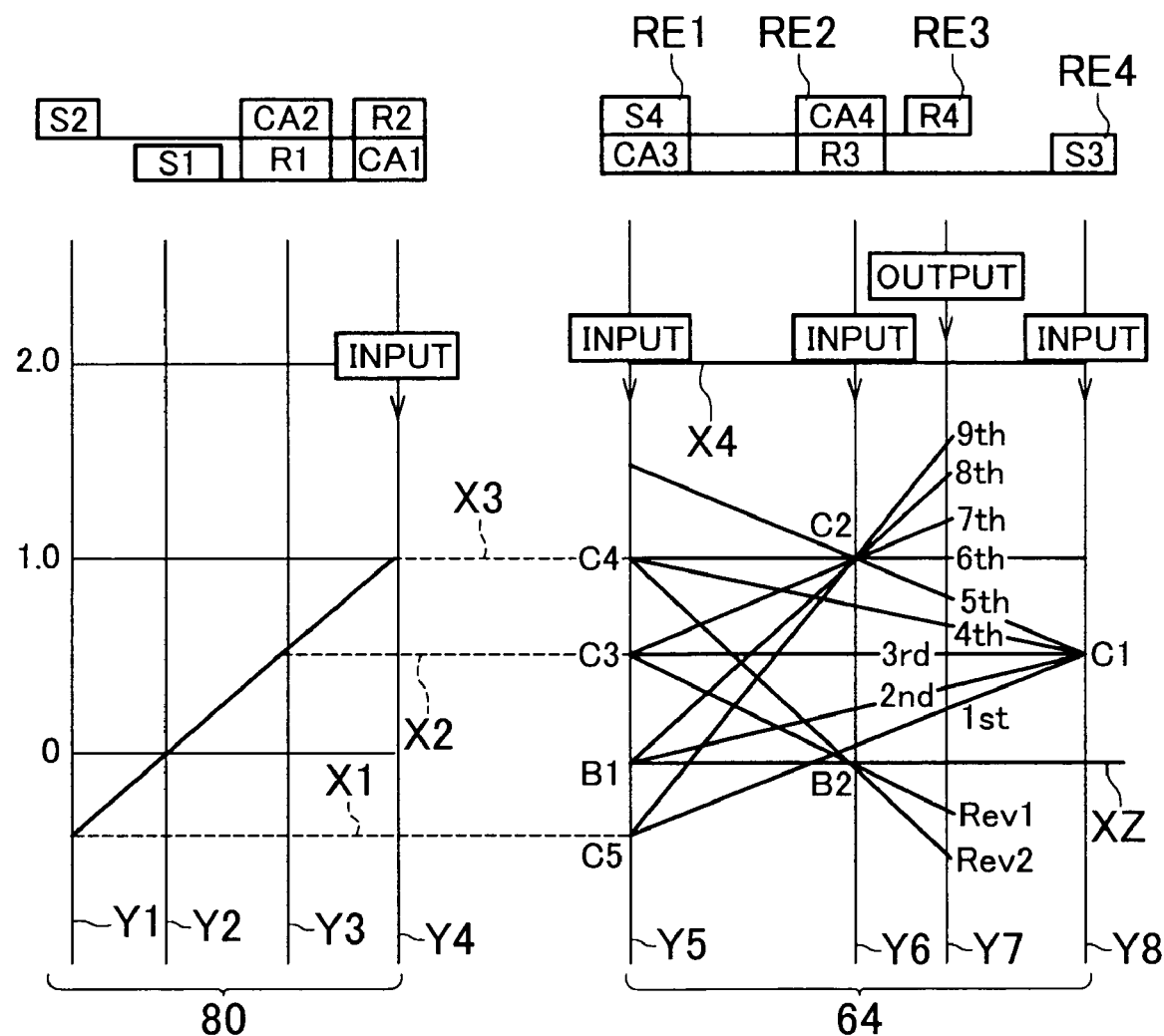
FIG. 42 is an alignment graph corresponding to FIG. 41, which is able to express, with straight lines, the relative relationships between the rotation speeds of various rotating elements which are connected differently in each gear in the transmission according to the seventh modified example of the fourth exemplary embodiment of the invention.

Here, as a seventh modified example of the fourth exemplary embodiment, the transmission 74 can achieve nine forward gears and two reverse gears by engaging the clutches and brakes in different combinations, as shown in FIG. 41, in response to a command from the ECU 42, and suitably setting the gear ratio of each planetary gear set. Also, FIG. 42 is an alignment graph corresponding to FIG. 41, which shows the rotation speeds of the rotating elements in each gear. Hereinafter, the clutch and brake engagement chart and alignment graph according to the seventh modified example of the fourth exemplary embodiment shown in FIGS. 41 and 42, which differ from those of the foregoing exemplary embodiment, will be described.

As shown in the clutch and brake engagement chart in FIG. 41, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

In the clutch and brake engagement chart shown in FIG. 41, the operations of the friction engagement devices to establish first gear "1st" through ninth gear "9th" are the same as those described above using FIG. 25, so descriptions thereof will be omitted here. Also, the gear ratios obtained by the engagement of those friction engagement devices in the various gears are also the same as those gear ratios shown in FIG. 25, so descriptions thereof will be omitted here.

In the alignment graph shown in FIG. 42, the four vertical lines Y1 through Y4 represent components of the first transmitting portion 80. From left to right in the graph, line Y1 represents the sun gear S2 of the second front planetary gear set 78, line Y2 represents the sun gear S1 of the first front planetary gear set 76, line Y3 represents the ring gear R1 of the first front planetary gear set 76 and the carrier CA2 of the second front planetary gear set 78 which are connected together, and line Y4 represents the carrier CA1 of the first front planetary gear set 76 and the ring gear R2 of the second front planetary gear set 78 which are connected together. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 42 is similar to that shown in FIG. 26 so a description thereof will be omitted.

In this way, according to the seventh modified example of the fourth exemplary embodiment, it is possible to obtain a transmission 74 which can establish nine forward gears and two reverse gears, and in which the steps of the gears are relatively close ratios, by engagement combinations of the clutches and brakes of each gear, such as those described above, and suitably setting the gear ratio of each planetary gear set.

Figure 43:
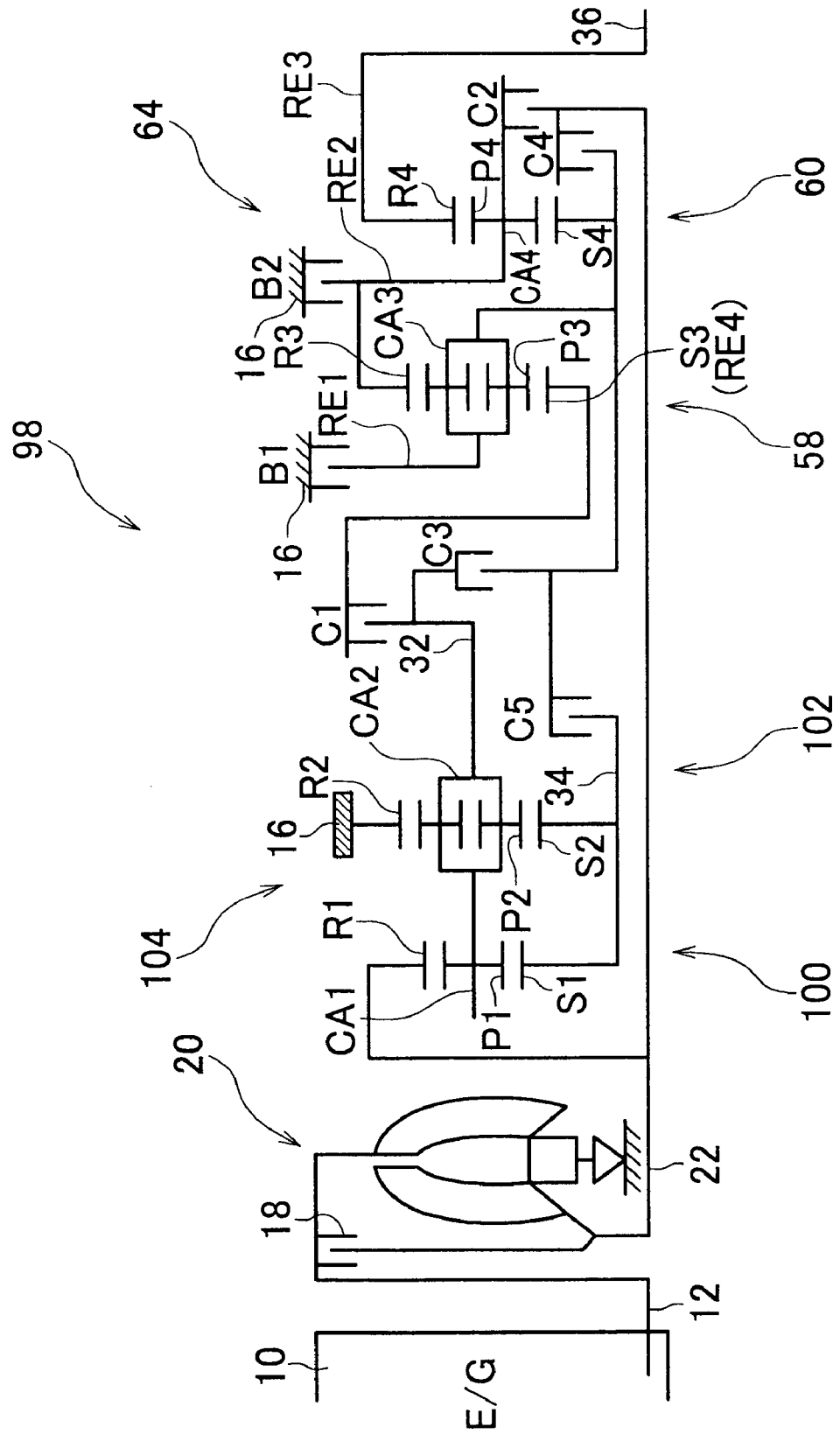
FIG. 43 is a skeleton view of the structure of a multi-speed transmission for a vehicle according to a fifth exemplary embodiment of the invention.
Figure 46:
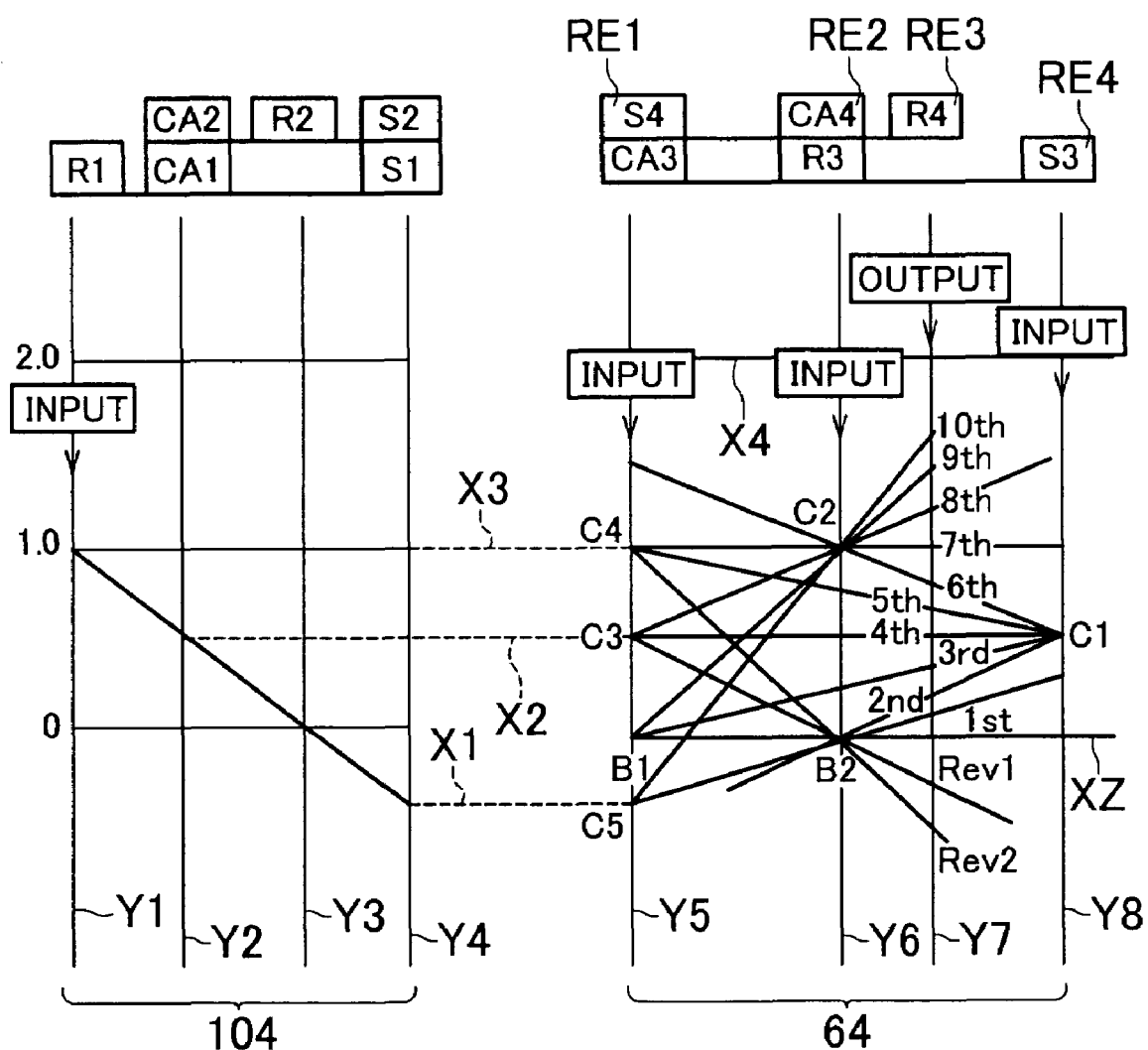
FIG. 46 is an alignment graph able to express, with straight lines, the relative relationships between the rotation speeds of various rotating elements which are connected differently in each gear in the transmission according to the fifth exemplary embodiment of the invention and the transmission according to the first modified example of the fifth exemplary embodiment of the invention.

FIG. 43 is a skeleton view of the structure of a transmission 98 according to a fifth exemplary embodiment of the invention. FIG. 44 is a chart showing the relationship between gears and operations of friction engagement devices necessary to establish those gears in the transmission 98. FIG. 46 is an alignment graph showing the rotation speeds of rotating elements in each gear. With the exception of the structure of a first transmitting portion 104, the transmission 98 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 98 of this exemplary embodiment which differ from parts of the transmission 66 will be described.

As shown in FIG. 43, a first front planetary gear set 100 which makes up part of the first transmitting portion 104 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 102 which also makes up part of the first transmitting portion 104 is a double pinion type planetary gear set which includes a sun gear S2, a plurality of sets of pinions P2 which are in mesh with each other, a carrier CA2 which rotatably and revolvably supports the pinions P2, and a ring gear R2 that is in mesh with the sun gear S2 via the pinions P2.

In the first transmitting portion 104, the ring gear R2 of the second front planetary gear set 102 is integrally connected to the transmission case 16 which is a non-rotating member, thus preventing the ring gear R2 from rotating relative to the transmission case 16. Also, the ring gear R1 of the first front planetary gear set 100 is integrally connected to the input shaft 22 which is the input rotating member. Further, the carrier CA1 of the first front planetary gear set 100 and the carrier CA2 of the second front planetary gear set 102 are connected together as well as integrally connected to the first intermediate output member 32. Also, the sun gear S1 of the first front planetary gear set 100 and the sun gear S2 of the second front planetary gear set 102 are connected together as well as integrally connected to the second intermediate output member 34. This kind of structure results in the first transmitting portion 104 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 98 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 44, for example, in response to a command from the ECU 42, and a gear ratio $\gamma$ (=input shaft rotation speed NIN/output shaft rotation speed NOUT) that changes in substantially equal ratio is able to be achieved for each gear.

In the transmission 98 that achieves the gears in accordance with the clutch and brake engagement chart shown in FIG. 44, the gear ratio $\gamma 1$ of first gear is approximately 4.762, the gear ratio $\gamma 2$ of second gear is approximately 4.110, the gear ratio $\gamma 3$ of third gear is approximately 2.603, the gear ratio $\gamma 4$ of fourth gear is approximately 2.000, the gear ratio $\gamma 5$ of fifth gear is approximately 1.624, the gear ratio $\gamma 6$ of sixth gear is approximately 1.322, the gear ratio $\gamma 7$ of seventh gear is approximately 1.000, the gear ratio $\gamma 8$ of eighth gear is approximately 0.833, the gear ratio $\gamma 9$ of ninth gear is approximately 0.714, the gear ratio $\gamma 10$ of tenth gear is approximately 0.621, the gear ratio $\gamma R1$ of first reverse gear is approximately 5.000, and the gear ratio $\gamma R2$ of second reverse gear is approximately 2.500. Further, the ratio of the gear ratio $\gamma 1$ of the first gear to the gear ratio $\gamma 2$ of the second gear ($=\gamma 1/\gamma 2$) is 1.159, the ratio of the gear ratio $\gamma 2$ of the second gear to the gear ratio $\gamma 3$ of the third gear ($=\gamma 2/\gamma 3$) is 1.579, the ratio of the gear ratio $\gamma 3$ of the third gear to the gear ratio $\gamma 4$ of the fourth gear ($=\gamma 3/\gamma 4$) is 1.301, the ratio of the gear ratio $\gamma 4$ of the fourth gear to the gear ratio $\gamma 5$ of the fifth gear ($=\gamma 4/\gamma 5$) is 1.232, the ratio of the gear ratio $\gamma 5$ of the fifth gear to the gear ratio $\gamma 6$ of the sixth gear ($=\gamma 5/\gamma 6$) is 1.229, the ratio of the gear ratio $\gamma 6$ of the sixth gear to the gear ratio $\gamma 7$ of the seventh gear ($=\gamma 6/\gamma 7$) is 1.322, the ratio of the gear ratio $\gamma 7$ of the seventh gear to the gear ratio $\gamma 8$ of the eighth gear ($=\gamma 7/\gamma 8$) is 1.200, the ratio of the gear ratio $\gamma 8$ of the eighth gear to the gear ratio $\gamma 9$ of the ninth gear ($=\gamma 8/\gamma 9$) is 1.167, and the ratio of the gear ratio $\gamma 9$ of the ninth gear to the gear ratio $\gamma 10$ of the tenth gear ($=\gamma 9/\gamma 10$) is 1.150. Thus, each gear ratio $\gamma$ changes in substantially equal ratio. Also, the total gear ratio range, which is the ratio of the gear ratio $\gamma 1$ of the first gear to the gear ratio $\gamma 10$ of the tenth gear ($=\gamma 1/\gamma 10$), is 7.667, which is a relatively large value. The gear ratio $\rho 1$ of the first front planetary gear set 100, the gear ratio $\rho 2$ of the second front planetary gear set 102, the gear ratio $\rho 3$ of the first rear planetary gear set 58, and the gear ratio $\rho 4$ of the second rear planetary gear set 60 are designed so that the foregoing gear ratios can be achieved.

As a first modified example of the fifth exemplary embodiment, gears such as those shown in FIG. 45 can be obtained by suitably setting the gear ratios $\rho 1$ through $\rho 4$ of the planetary gear sets even though the engagement operations for each gear do not change. In the transmission 98 that achieves the gears in accordance with the clutch and brake engagement chart shown in FIG. 45, the gear ratio $\gamma 1$ of first gear is approximately 4.971, the gear ratio $\gamma 2$ of second gear is approximately 3.290, the gear ratio $\gamma 3$ of third gear is approximately 2.222, the gear ratio $\gamma 4$ of fourth gear is approximately 1.645, the gear ratio $\gamma 5$ of fifth gear is approximately 1.409, the gear ratio $\gamma 6$ of sixth gear is approximately 1.244, the gear ratio $\gamma 7$ of seventh gear is approximately 1.000, the gear ratio $\gamma 8$ of eighth gear is approximately 0.825, the gear ratio $\gamma 9$ of ninth gear is approximately 0.649, the gear ratio $\gamma 10$ of tenth gear is approximately 0.574, the gear ratio $\gamma R1$ of first reverse gear is approximately 3.047, and the gear ratio $\gamma R2$ of second reverse gear is approximately 1.852. Further, the ratio of the gear ratio $\gamma 1$ of the first gear to the gear ratio $\gamma 2$ of the second gear ($=\gamma 1/\gamma 2$) is 1.511, the ratio of the gear ratio $\gamma 2$ of the second gear to the gear ratio $\gamma 3$ of the third gear ($=\gamma 2/\gamma 3$) is 1.481, the ratio of the gear ratio $\gamma 3$ of the third gear to the gear ratio $\gamma 4$ of the fourth gear ($=\gamma 3/\gamma 4$) is 1.351, the ratio of the gear ratio $\gamma 4$ of the fourth gear to the gear ratio $\gamma 5$ of the fifth gear ($=\gamma 4/\gamma 5$) is 1.167, the ratio of the gear ratio $\gamma 5$ of the fifth gear to the gear ratio $\gamma 6$ of the sixth gear ($=\gamma 5/\gamma 6$) is 1.133, the ratio of the gear ratio $\gamma 6$ of the sixth gear to the gear ratio $\gamma 7$ of the seventh gear ($=\gamma 6/\gamma 7$) is 1.244, the ratio of the gear ratio $\gamma 7$ of the seventh gear to the gear ratio $\gamma 8$ of the eighth gear ($=\gamma 7/\gamma 8$) is 1.212, the ratio of the gear ratio $\gamma 8$ of the eighth gear to the gear ratio $\gamma 9$ of the ninth gear ($=\gamma 8/\gamma 9$) is 1.271, and the ratio of the gear ratio $\gamma 9$ of the ninth gear to the gear ratio $\gamma 10$ of the tenth gear ($=\gamma 9/\gamma 10$) is 1.131. Thus, each gear ratio $\gamma$ changes in substantially equal ratio. Also, the total gear ratio range, which is the ratio of the gear ratio $\gamma 1$ of the first gear to the gear ratio $\gamma 10$ of the tenth gear ($=\gamma 1/\gamma 10$), is 8.655, which is a relatively large value. By suitably setting the gear ratio of each planetary gear set in this way, the total gear ratio range can be set wider than the total gear ratio range shown in FIG. 44.

In the alignment graph shown in FIG. 46, the four vertical lines Y1 through Y4 represent components of the first transmitting portion 104. From left to right in the graph, line Y1 represents the ring gear R1 of the first front planetary gear set 100 which is one rotating element, line Y2 represents the carrier CA1 of the first front planetary gear set 100 and the carrier CA2 of the second front planetary gear set 102 which are connected together to form another rotating element, line Y3 represents the ring gear R2 of the second front planetary gear set 102 which is another rotating element, and line Y4 represents the sun gear S1 of the first front planetary gear set 100 and the sun gear S2 of the second front planetary gear set 102 which are connected together to form another rotating element. Accordingly, based on these rotating elements, the alignment graph shown in FIG. 46 is similar to the alignment graph shown in FIG. 14 described above so a description thereof will be omitted.

In this way, according to the first modified example of the fifth exemplary embodiment, the first transmitting portion 104 includes the single pinion type first front planetary gear set 100 and the double pinion type second front planetary gear set 102. The ring gear R2 of the second front planetary gear set 102 is always connected to the transmission case 16, which is a non-rotating member, and the sun gear S1 of the first front planetary gear set 100 and the sun gear S2 of the second front planetary gear set 102 are connected together. Further, the carrier CA1 of the first front planetary gear set 100 and the carrier CA2 of the second front planetary gear set 102 are connected together, and the ring gear R1 of the first front planetary gear set 100 is connected to the input shaft 22 which is the input rotating member. Accordingly, the carrier CA1 of the first front planetary gear set 100 or the carrier CA2 of the second front planetary gear set 102 functions as the first intermediate output member 32 while the sun gear S1 of the first front planetary gear set 100 or the sun gear S2 of the second front planetary gear set 102 functions as the second intermediate output member 34. Accordingly, a practical transmission 98 is able to be provided.

Figure 48:
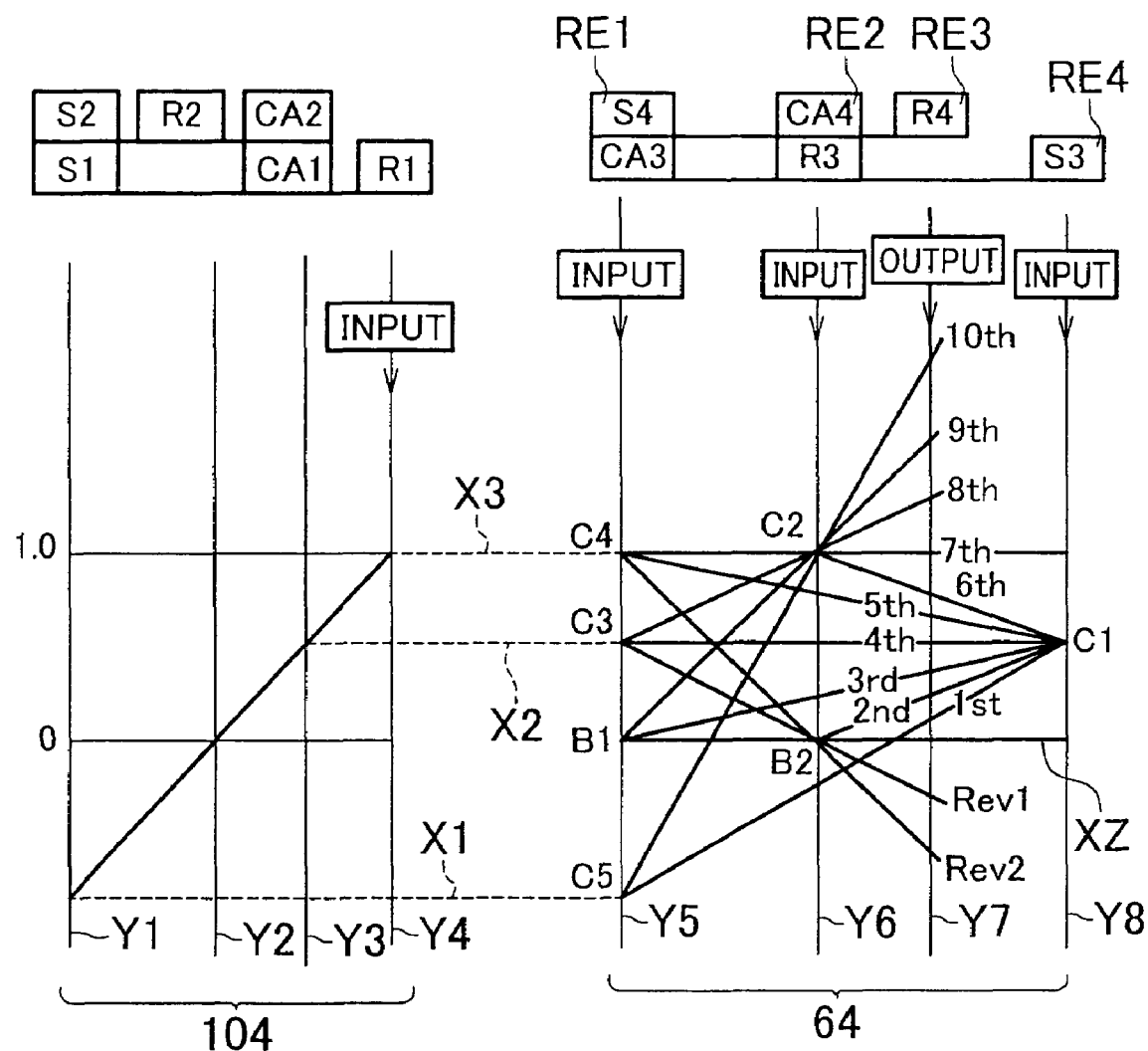
FIG. 48 is an alignment graph corresponding to FIG. 47, which is able to express, with straight lines, the relative relationships between the rotation speeds of various rotating elements which are connected differently in each gear in the transmission according to the second modified example of the fifth exemplary embodiment of the invention.

Here, as a second modified example of the fifth exemplary embodiment, the transmission 98 can achieve ten forward gears and two reverse gears by engaging the clutches and brakes in different combinations, as shown in FIG. 47, in response to a command from the ECU 42, and suitably setting the gear ratio of each planetary gear set. Also, FIG. 48 is an alignment graph corresponding to FIG. 47, which shows the rotation speeds of the rotating elements in each gear. Hereinafter, the clutch and brake engagement chart and alignment graph according to the second modified example of the fifth exemplary embodiment shown in FIGS. 47 and 48, which differ from those of the foregoing exemplary embodiment, will be described.

As shown in the clutch and brake engagement chart in FIG. 47, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

In the clutch and brake engagement chart shown in FIG. 47, the operations of the friction engagement devices to establish first gear "1st" through tenth gear "10th" are the same as those described above using FIG. 15, so descriptions thereof will be omitted here. Also, the gear ratios obtained by the engagement of those friction engagement devices in the various gears are the same as those gear ratios shown in FIG. 15, so descriptions thereof will be omitted here.

In the alignment graph shown in FIG. 48, the four vertical lines Y1 through Y4 represent components of the first transmitting portion 104. From left to right in the graph, line Y1 represents the sun gear S1 of the first front planetary gear set 100 and the sun gear S2 of the second front planetary gear set 102 which are connected together, line Y2 represents the ring gear R2 of the second front planetary gear set 102, line Y3 represents the carrier CA1 of the first front planetary gear set 100 and the carrier CA2 of the second front planetary gear set 102 which are connected together, and line Y4 represents the ring gear R1 of the first front planetary gear set 100. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 48 is similar to the alignment graph shown in FIG. 16 so a description thereof will be omitted.

In this way, according to the second modified example of the fifth exemplary embodiment, it is possible to obtain a transmission 98 which can establish ten forward gears and two reverse gears, and in which the steps of the gears are relatively close ratios, by engagement combinations of the clutches and brakes of each gear and suitably setting the gear ratio of each planetary gear set.

Figure 50:
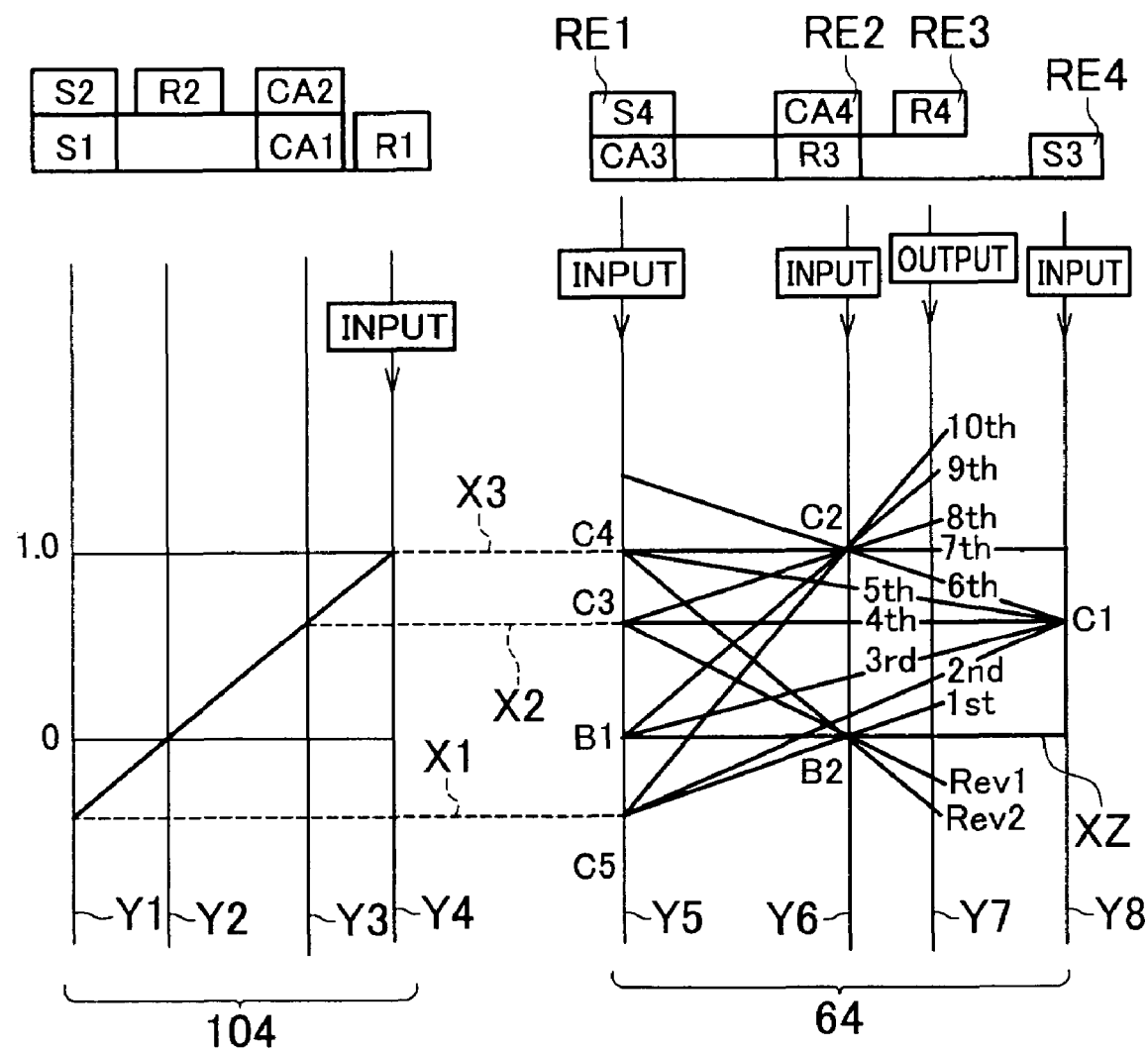
FIG. 50 is an alignment graph corresponding to FIG. 49, which is able to express, with straight lines, the relative relationships between the rotation speeds of various rotating elements which are connected differently in each gear in the transmission according to the third modified example of the fifth exemplary embodiment of the invention.

Here, as a third modified example of the fifth exemplary embodiment, the transmission 98 can achieve ten forward gears and two reverse gears by engaging the clutches and brakes in different combinations, as shown in FIG. 49, in response to a command from the ECU 42, and suitably setting the gear ratio of each planetary gear set. FIG. 50 is an alignment graph corresponding to FIG. 49, which shows the rotation speeds of the rotating elements in each gear. Hereinafter, the clutch and brake engagement chart and alignment graph according to the third modified example of the fifth exemplary embodiment shown in FIGS. 49 and 50, which differ from those of the foregoing exemplary embodiment, will be described.

As shown in the clutch and brake engagement chart in FIG. 49, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

In the clutch and brake engagement chart shown in FIG. 49, the operations of the friction engagement devices to establish first gear "1st" through tenth gear "10th" are the same as those described above using FIG. 17, so descriptions thereof will be omitted here. Also, the gear ratios obtained by the engagement of those friction engagement devices in the various gears are the same as those gear ratios shown in FIG. 17, so descriptions thereof will be omitted here.

In the alignment graph shown in FIG. 50, the four vertical lines Y1 through Y4 represent components of the first transmitting portion 104. From left to right in the graph, line Y1 represents the sun gear S1 of the first front planetary gear set 100 and the sun gear S2 of the second front planetary gear set 102 which are connected together, line Y2 represents the ring gear R2 of the second front planetary gear set 102, line Y3 represents the carrier CA1 of the first front planetary gear set 100 and the carrier CA2 of the second front planetary gear set 102 which are connected together, and line Y4 represents the ring gear R1 of the first front planetary gear set 100. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 50 is similar to the alignment graph shown in FIG. 18 so a description thereof will be omitted.

In this way, according to the third modified example of the fifth exemplary embodiment, it is possible to obtain a transmission 98 which can establish ten forward gears and two reverse gears, and in which the steps of the gears are relatively close ratios, by engagement combinations of the clutches and brakes of each gear, such as those described above, and suitably setting the gear ratio of each planetary gear set.

Figure 52:
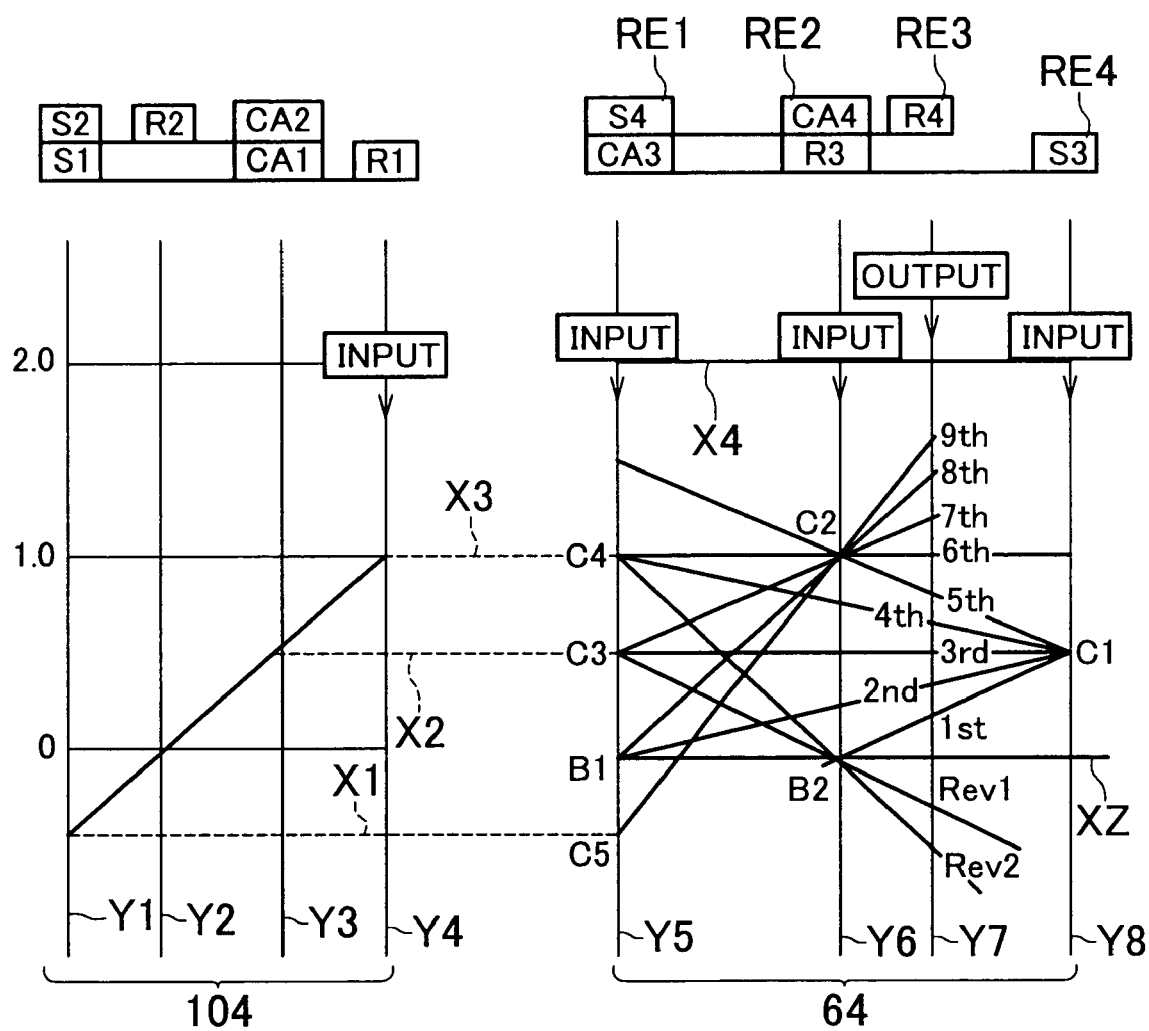
FIG. 52 is an alignment graph corresponding to FIG. 51, which is able to express, with straight lines, the relative relationships between the rotation speeds of various rotating elements which are connected differently in each gear in the transmission according to the fourth modified example of the fifth exemplary embodiment of the invention.

Here, as a fourth modified example of the fifth exemplary embodiment, the transmission 98 can achieve nine forward gears and two reverse gears by engaging the clutches and brakes in different combinations, as shown in FIG. 51, in response to a command from the ECU 42, and suitably setting the gear ratio of each planetary gear set. FIG. 52 is an alignment graph corresponding to FIG. 51, which shows the rotation speeds of the rotating elements in each gear. Hereinafter, the clutch and brake engagement chart and alignment graph according to the fourth modified example of the fifth exemplary embodiment shown in FIGS. 51 and 52, which differ from those of the foregoing exemplary embodiment, will be described.

As shown in the clutch and brake engagement chart in FIG. 51, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 51, the first clutch C1 is engaged to connect the fourth rotating element RE4, i.e., the sun gear S3 of the first rear planetary gear set 58, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first gear which has the largest gear ratio γ1, e.g., approximately 4.776.

Also, the first clutch C1 is engaged to connect the fourth rotating element RE4, i.e., the sun gear S3 of the first rear planetary gear set 58, with the first intermediate output member 32, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing second gear which has a gear ratio γ2 which is smaller than the gear ratio γ1 of first gear, e.g., approximately 2.925.

Further, the first clutch C1 is engaged to connect the fourth rotating element RE4, i.e., the sun gear S3 of the first rear planetary gear set 58, with the first intermediate output member 32, while the third clutch C3 is engaged to connect the first rotating element RE1, i.e., the carrier CA3 of the first rear planetary gear set 58 and the sun gear S4 of the second rear planetary gear set 60 which are connected together, to the first intermediate output member 32, thereby establishing third gear which has a gear ratio γ3 which is smaller than the gear ratio γ2 of second gear, e.g., approximately 2.000.

Also, the first clutch C1 is engaged to connect the fourth rotating element RE4, i.e., the sun gear S3 of the first rear planetary gear set 58, with the first intermediate output member 32, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing fourth gear which has a gear ratio γ4 which is smaller than the gear ratio γ3 of third gear, e.g., approximately 1.519.

Further, the first clutch C1 is engaged to connect the fourth rotating element RE4, i.e., the sun gear S3 of the first rear planetary gear set 58, with the first intermediate output member 32, while the second clutch C2 is engaged to connect the second rotating element RE2, i.e., the ring gear R3 of the first rear planetary gear set 58 and the carrier CA4 of the second rear planetary gear set 60 which are connected together, with the input shaft 22, thereby establishing fifth gear which has a gear ratio γ5 which is smaller than the gear ratio γ4 of fourth gear, e.g., approximately 1.265.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing sixth gear which has a gear ratio γ6 which is smaller than the gear ratio γ5 of fifth gear, e.g., approximately 1.000.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing seventh gear which has a gear ratio γ7 which is smaller than the gear ratio γ6 of sixth gear, e.g., approximately 0.800.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing eighth gear which has a gear ratio γ8 which is smaller than the gear ratio γ7 of seventh gear, e.g., approximately 0.667.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fifth clutch C5 is engaged to connect the first rotating element RE1, i.e., the carrier CA3 of the first rear planetary gear set 58 and the sun gear S4 of the second rear planetary gear set 60 which are connected together, with the second intermediate output member 34, thereby establishing ninth gear which has the smallest gear ratio γ9, e.g., approximately 0.588.

Also, the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first reverse gear "R1" which has a gear ratio γR1 of approximately 4.000.

Further, the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second reverse gear "R2" which has a gear ratio γR2 which is smaller than the gear ratio γR1 of the first reverse gear, e.g., 2.000. The gear ratio ρ1 of the first front planetary gear set 100, the gear ratio ρ2 of the second front planetary gear set 102, the gear ratio ρ3 of the first rear planetary gear set 58, and the gear ratio ρ4 of the second rear planetary gear set 60 are designed so that the foregoing gear ratios can be achieved.

In the transmission 98 that achieves the gears in accordance with the clutch and brake engagement chart shown in FIG. 51, the ratio of the gear ratio γ1 of the first gear to the gear ratio γ2 of the second gear (=γ1/γ2) is 1.633, the ratio of the gear ratio γ2 of the second gear to the gear ratio γ3 of the third gear (=γ2/γ3) is 1.463, the ratio of the gear ratio γ3 of the third gear to the gear ratio γ4 of the fourth gear (=γ3/γ4) is 1.316, the ratio of the gear ratio γ4 of the fourth gear to the gear ratio γ5 of the fifth gear (=γ4/γ5) is 1.201, the ratio of the gear ratio γ5 of the fifth gear to the gear ratio γ6 of the sixth gear (=γ5/γ6) is 1.265, the ratio of the gear ratio γ6 of the sixth gear to the gear ratio γ7 of the seventh gear (=γ6/γ7) is 1.250, the ratio of the gear ratio γ7 of the seventh gear to the gear ratio γ8 of the eighth gear (=γ7/γ8) is 1.200, and the ratio of the gear ratio γ8 of the eighth gear to the gear ratio γ9 of the ninth gear (=γ8/γ9) is 1.133. Thus, each gear ratio γ changes in substantially equal ratio. Also, the total gear ratio range, which is the ratio of the gear ratio γ1 of the first gear to the gear ratio γ9 of the ninth gear (=γ1/γ9), is 8.119, which is a relatively large value.

In the alignment graph shown in FIG. 52, the four vertical lines Y1 through Y4 represent components of the first transmitting portion 104. From left to right in the graph, line Y1 represents the sun gear S1 of the first front planetary gear set 100 and the sun gear S2 of the second front planetary gear set 102 which are connected together, line Y2 represents the ring gear R2 of the second front planetary gear set 102, line Y3 represents the carrier CA1 of the first front planetary gear set 100 and the carrier CA2 of the second front planetary gear set 102 which are connected together, and line Y4 represents the ring gear R1 of the first front planetary gear set 100. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. Accordingly, based on these rotating elements, the alignment graph shown in FIG. 52 is similar to that shown in FIG. 9 so a description thereof will be omitted.

In this way, according to this fourth modified example of the fifth exemplary embodiment, first gear is established by engaging the first clutch C1 and the second brake B2. Second gear is established by engaging the first clutch C1 and the first brake B1. Third gear is established by engaging the first clutch C1 and the third clutch C3. Fourth gear is established by engaging the first clutch C1 and the fourth clutch C4. Fifth gear is established by engaging the first clutch C1 and the second clutch C2. Sixth gear is established by engaging the second clutch C2 and the fourth clutch C4. Seventh gear is established by engaging the second clutch C2 and the third clutch C3, and eighth gear is established by engaging the second clutch C2 and the first brake B1. Thus, the transmission 98 of this fourth modified example of the fifth exemplary embodiment is able to achieve eight forward gears.

The transmission 98 of this fourth modified example of the fifth exemplary embodiment is also able to achieve ninth gear by engaging the second clutch C2 and the fifth clutch C5. Therefore, in addition to being able to achieve nine forward gears, the step between eighth gear and ninth gear is able to be preferably set relatively small with a close ratio.

Figure 54:
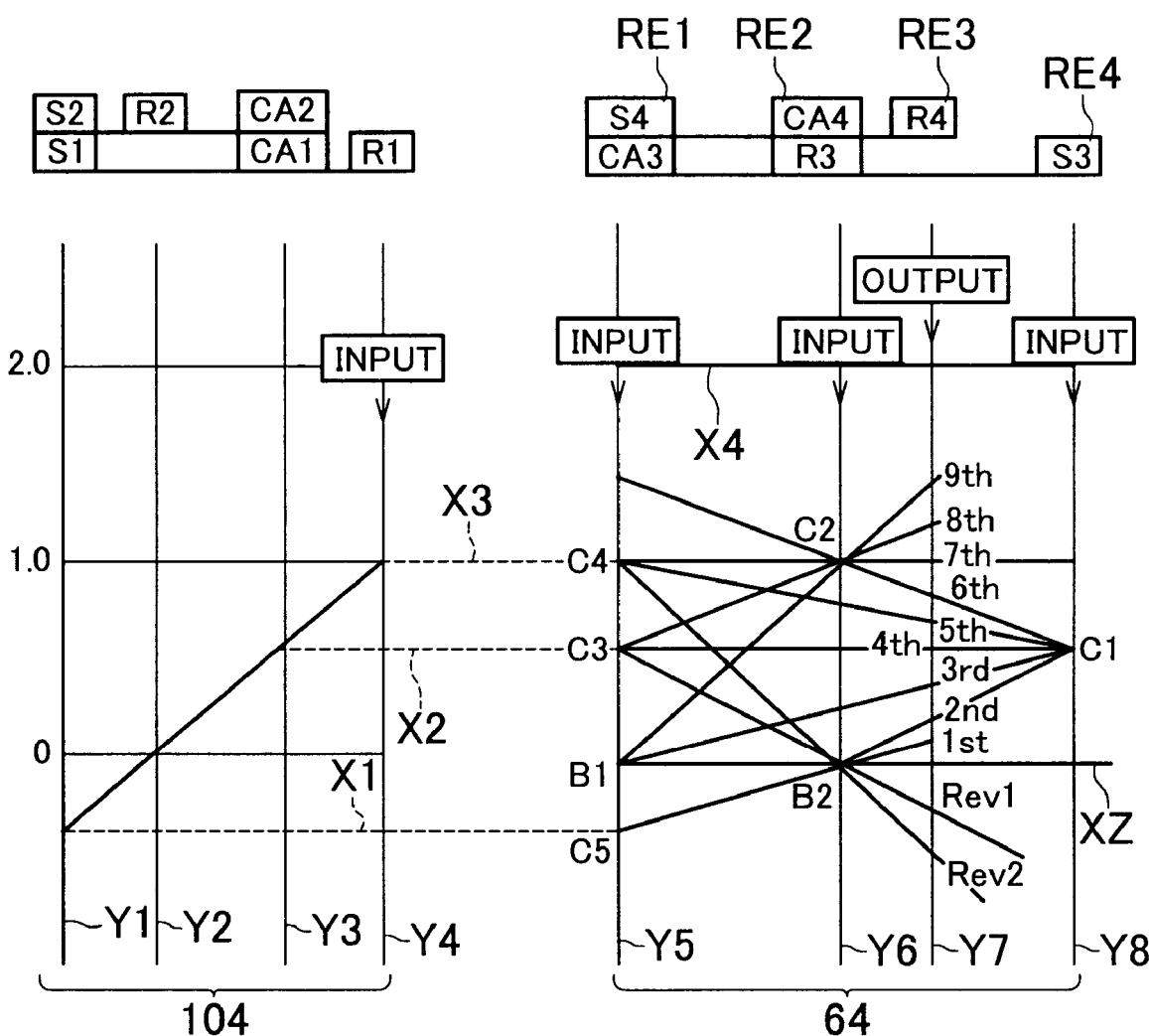
FIG. 54 is an alignment graph corresponding to FIG. 53, which is able to express, with straight lines, the relative relationships between the rotation speeds of various rotating elements which are connected differently in each gear in the transmission according to the fifth modified example of the fifth exemplary embodiment of the invention.

Here, as a fifth modified example of the fifth exemplary embodiment, the transmission 98 can achieve nine forward gears and two reverse gears by engaging the clutches and brakes in different combinations, as shown in FIG. 53, in response to a command from the ECU 42, and suitably setting the gear ratio of each planetary gear set. Also, FIG. 54 is an alignment graph corresponding to FIG. 53, which shows the rotation speeds of the rotating elements in each gear. Hereinafter, the clutch and brake engagement chart and alignment graph according to the fifth modified example of the fifth exemplary embodiment shown in FIGS. 53 and 54, which differ from those of the foregoing exemplary embodiment, will be described.

As shown in the clutch and brake engagement chart in FIG. 53, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 53, the fifth clutch C5 is engaged to connect the first rotating element RE1, i.e., the carrier CA3 of the first rear planetary gear set 58 and the sun gear S4 of the second rear planetary gear set 60 which are connected together, with the second intermediate output member 34, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first gear which has the largest gear ratio γ1, e.g., approximately 4.971.

Also, the first clutch C1 is engaged to connect the fourth rotating element RE4, i.e., the sun gear S3 of the first rear planetary gear set 58, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second gear which has a gear ratio γ2 which is smaller than the gear ratio γ1 of first gear, e.g., approximately 3.290.

Further, the first clutch C1 is engaged to connect the fourth rotating element RE4, i.e., the sun gear S3 of the first rear planetary gear set 58, with the first intermediate output member 32, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing third gear which has a gear ratio γ3 which is smaller than the gear ratio γ2 of second gear, e.g., approximately 2.222.

Also, the first clutch C1 is engaged to connect the fourth rotating element RE4, i.e., the sun gear S3 of the first rear planetary gear set 58, with the first intermediate output member 32, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing fourth gear which has a gear ratio γ4 which is smaller than the gear ratio γ3 of third gear, e.g., approximately 1.645.

Further, the first clutch C1 is engaged to connect the fourth rotating element RE4, i.e., the sun gear S3 of the first rear planetary gear set 58, with the first intermediate output member 32, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing fifth gear which has a gear ratio γ5 which is smaller than the gear ratio γ4 of fourth gear, e.g., approximately 1.409.

Also, the first clutch C1 is engaged to connect the fourth rotating element RE4, i.e., the sun gear S3 of the first rear planetary gear set 58, with the first intermediate output member 32, while the second clutch C2 is engaged to connect the second rotating element RE2, i.e., the ring gear R3 of the first rear planetary gear set 58 and the carrier CA4 of the second rear planetary gear set 60 which are connected together, with the input shaft 22, thereby establishing sixth gear which has a gear ratio γ6 which is smaller than the gear ratio γ5 of fifth gear, e.g., approximately 1.244.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the third clutch C3 is engaged to connect the first rotating element RE1, i.e., the carrier CA3 of the first rear planetary gear set 58 and the sun gear S4 of the second rear planetary gear set 60 which are connected together, to the first intermediate output member 32, thereby establishing eighth gear which has a gear ratio γ8 which is smaller than the gear ratio γ7 of seventh gear, e.g., approximately 0.825.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing ninth gear which has the smallest gear ratio γ9, e.g., approximately 0.649.

Also, the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first reverse gear "R1" which has a gear ratio γR1 of approximately 3.047.

Further, the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second reverse gear "R2" which has a gear ratio γR2 which is smaller than the gear ratio γR1 of the first reverse gear, e.g., 1.852. The gear ratio ρ1 of the first front planetary gear set 100, the gear ratio ρ2 of the second front planetary gear set 102, the gear ratio ρ3 of the first rear planetary gear set 58, and the gear ratio ρ4 of the second rear planetary gear set 60 are designed so that the foregoing gear ratios can be achieved.

In the transmission 98 that achieves the gears in accordance with the clutch and brake engagement chart shown in FIG. 53, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, and the ratio of the gear ratio γ8 of the eighth gear to the gear ratio γ9 of the ninth gear (=γ8/γ9) is 1.271. Thus, each gear ratio γ changes in substantially equal ratio. Also, the total gear ratio range, which is the ratio of the gear ratio γ1 of the first gear to the gear ratio γ9 of the ninth gear (=γ1/γ9), is 7.655, which is a relatively large value.

In the alignment graph shown in FIG. 54, the four vertical lines Y1 through Y4 represent components of the first transmitting portion 104. From left to right in the graph, line Y1 represents the sun gear S1 of the first front planetary gear set 100 and the sun gear S2 of the second front planetary gear set 102 which are connected together, line Y2 represents the ring gear R2 of the second front planetary gear set 102, line Y3 represents the carrier CA1 of the first front planetary gear set 100 and the carrier CA2 of the second front planetary gear set 102 which are connected together, and line Y4 represents the ring gear R1 of the first front planetary gear set 100. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. Accordingly, based on these rotating elements, the alignment graph shown in FIG. 54 is similar to that shown in FIG. 11 so a description thereof will be omitted.

In this way, according to this fifth modified example of the fifth exemplary embodiment, first gear is established by engaging the fifth clutch C5 and the second brake B2. Second gear is established by engaging the first clutch C1 and the second brake B2. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4, and eighth gear is established by engaging the second clutch C2 and the third clutch C3. Thus, the transmission 98 of this fifth modified example of the fifth exemplary embodiment is able to achieve eight forward gears.

The transmission 98 of this fifth modified example of the fifth exemplary embodiment is also able to achieve ninth gear by engaging the second clutch C2 and the first brake B1. Therefore, in addition to being able to achieve nine forward gears, the step between eighth gear and ninth gear is able to be preferably set relatively small with a close ratio.

Figure 56:
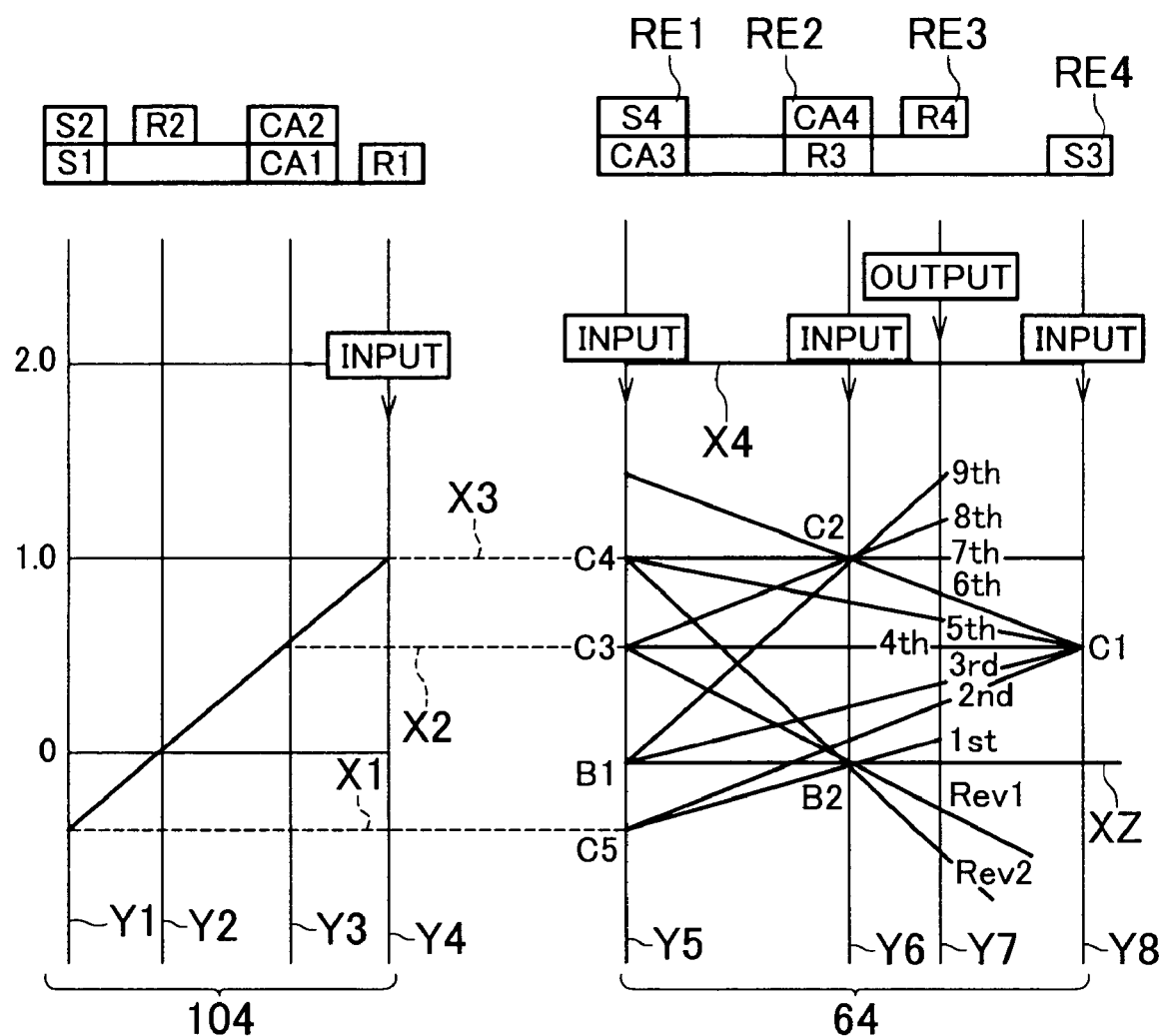
FIG. 56 is an alignment graph corresponding to FIG. 55, which is able to express, with straight lines, the relative relationships between the rotation speeds of various rotating elements which are connected differently in each gear in the transmission according to the sixth modified example of the fifth exemplary embodiment of the invention.

Here, as a sixth modified example of the fifth exemplary embodiment, the transmission 98 can achieve nine forward gears and two reverse gears, and effects equivalent to those obtained from the foregoing exemplary embodiment can be obtained, by engaging the clutches and brakes in different combinations, as shown in FIG. 55, in response to a command from the ECU 42, and suitably setting the gear ratio of each planetary gear set. Also, FIG. 56 is an alignment graph corresponding to FIG. 55, which shows the rotation speeds of the rotating elements in each gear. Hereinafter, the clutch and brake engagement chart and alignment graph according to the sixth modified example of the fifth exemplary embodiment shown in FIGS. 55 and 56, which differ from those of the foregoing exemplary embodiment, will be described.

As shown in the clutch and brake engagement chart in FIG. 55, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 23, so descriptions thereof will be omitted here.

In the alignment graph shown in FIG. 56, the four vertical lines Y1 through Y4 representing components of the first transmitting portion 104 and the four vertical lines Y5 through Y8 representing components of the second transmitting portion 64 represent the same rotating elements as those in FIG. 48 described above because the structure shown in the skeleton view is the same. Also, in the clutch and brake engagement chart shown in FIG. 56, the operations of the friction engagement devices for establishing first gear "1st" through ninth gear "9th" are the same as those described above using FIG. 23. Therefore, the alignment graph also corresponds to these. Thus, the alignment graph shown in FIG. 56 is the same as the alignment graph shown in FIG. 24.

Thus, according to this sixth modified example of the fifth exemplary embodiment as well, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

Figure 58:
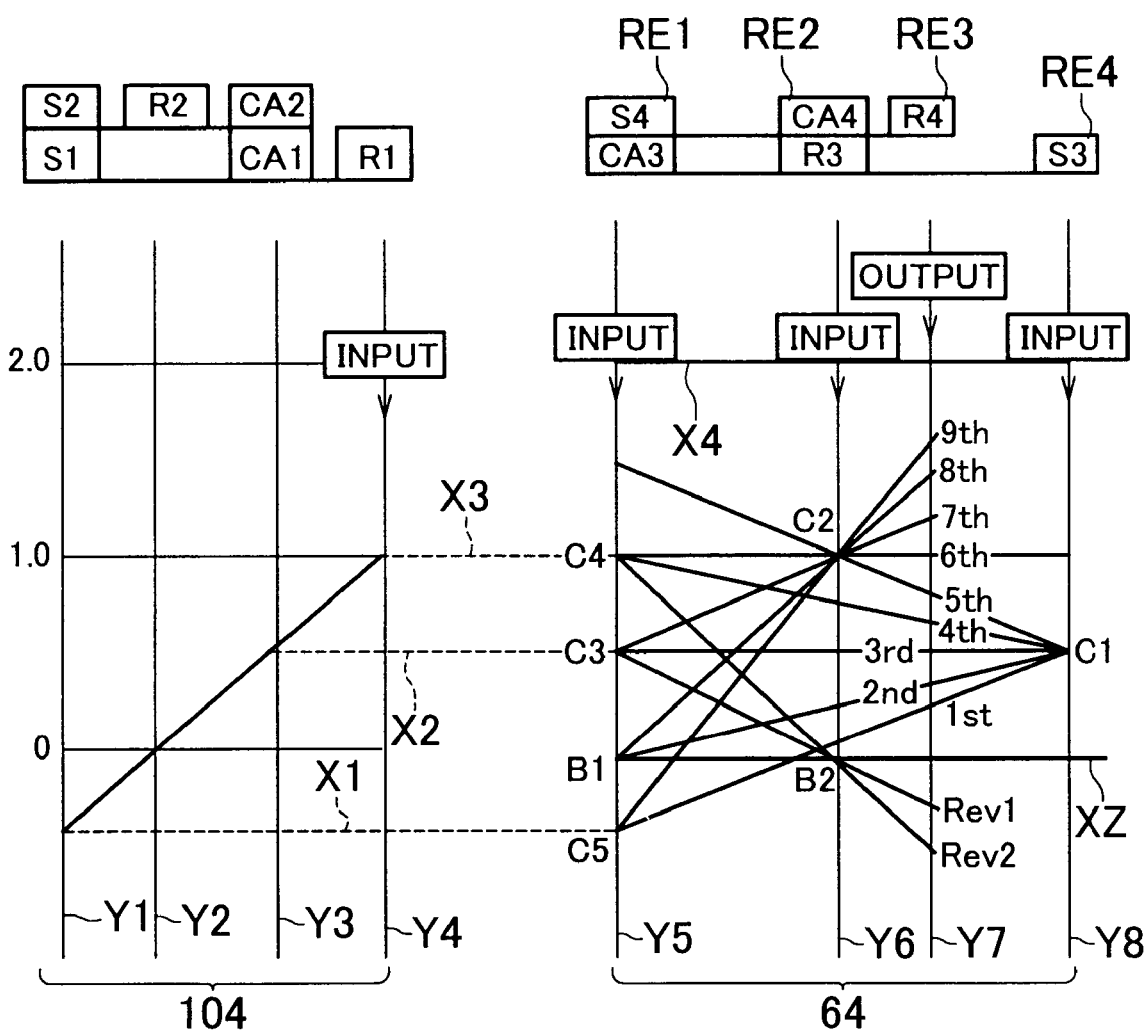
FIG. 58 is an alignment graph corresponding to FIG. 57, which is able to express, with straight lines, the relative relationships between the rotation speeds of various rotating elements which are connected differently in each gear in the transmission according to the seventh modified example of the fifth exemplary embodiment of the invention.

Here, as a seventh modified example of the fifth exemplary embodiment, the transmission 98 can achieve nine forward gears and two reverse gears by engaging the clutches and brakes in different combinations, as shown in FIG. 57, in response to a command from the ECU 42, and suitably setting the gear ratio of each planetary gear set. Also, FIG. 58 is an alignment graph corresponding to FIG. 57, which shows the rotation speeds of the rotating elements in each gear. Hereinafter, the clutch and brake engagement chart and alignment graph according to the seventh modified example of the fifth exemplary embodiment shown in FIGS. 57 and 58, which differ from those of the foregoing exemplary embodiment, will be described.

As shown in the clutch and brake engagement chart in FIG. 57, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

In the clutch and brake engagement chart shown in FIG. 57, the operations of the friction engagement devices to establish first gear "1st" through ninth gear "9th" are the same as those described above using FIG. 25, so descriptions thereof will be omitted here. Similarly, the gear ratios obtained by the engagement of those friction engagement devices in the various gears are also the same as those gear ratios shown in FIG. 25, so descriptions thereof will be omitted here.

In the alignment graph shown in FIG. 58, the four vertical lines Y1 through Y4 represent components of the first transmitting portion 104. From left to right in the graph, line Y1 represents the sun gear S1 of the first front planetary gear set 100 and the sun gear S2 of the second front planetary gear set 102 which are connected together, line Y2 represents the ring gear R2 of the second front planetary gear set 102, line Y3 represents the carrier CA1 of the first front planetary gear set 100 and the carrier CA2 of the second front planetary gear set 102 which are connected together, and line Y4 represents the ring gear R1 of the first front planetary gear set 100. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 58 is similar to that shown in FIG. 26 so a description thereof will be omitted.

In this way, according to the seventh modified example of the fifth exemplary embodiment, it is possible to obtain a transmission 98 which can establish nine forward gears and two reverse gears, and in which the steps of the gears are relatively close ratios, by engagement combinations of the clutches and brakes of each gear, such as those described above, and suitably setting the gear ratio of each planetary gear set.

Figure 59:
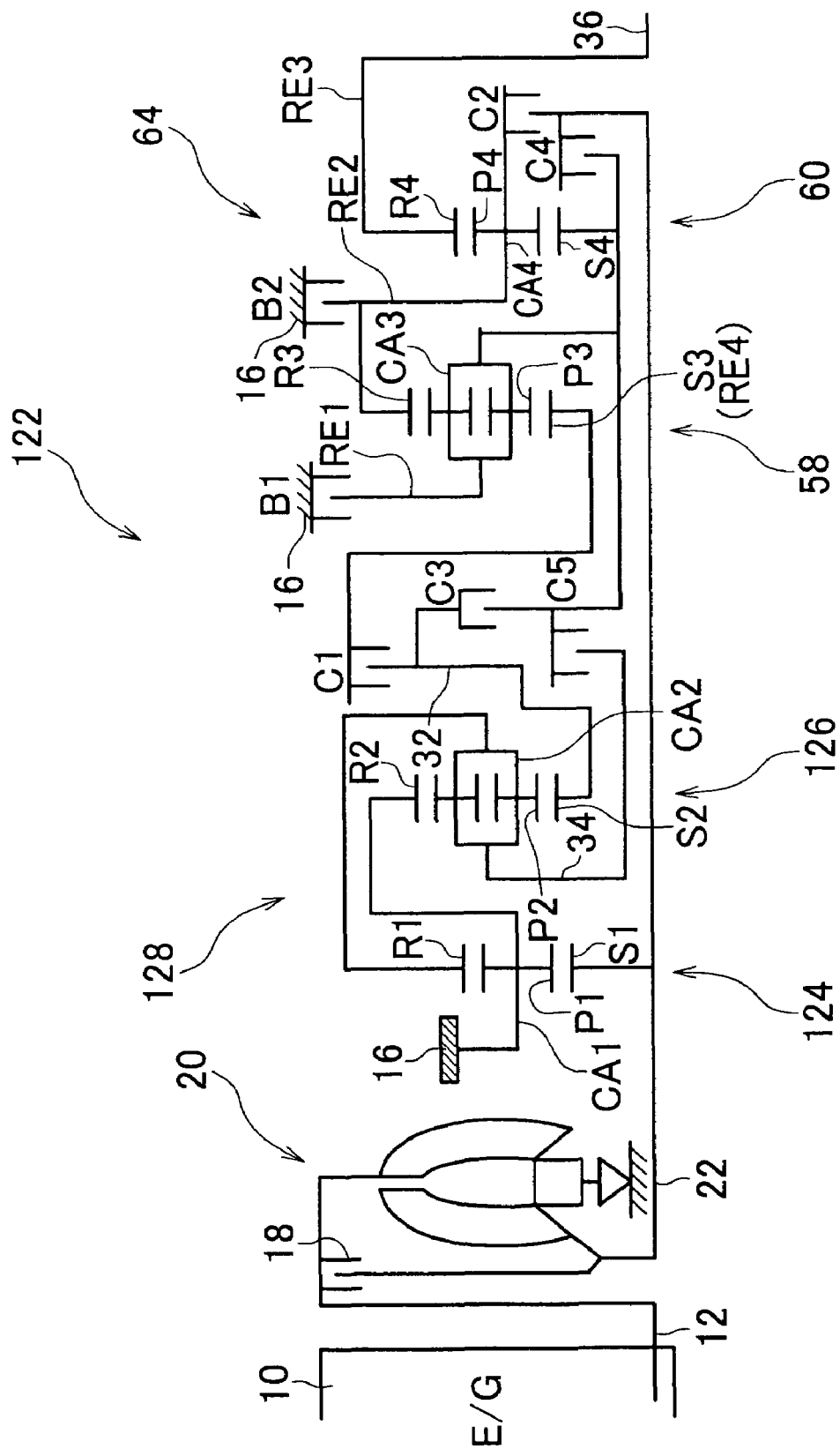
FIG. 59 is a skeleton view of the structure of a multi-speed transmission for a vehicle according to a sixth exemplary embodiment of the invention.
Figure 61:
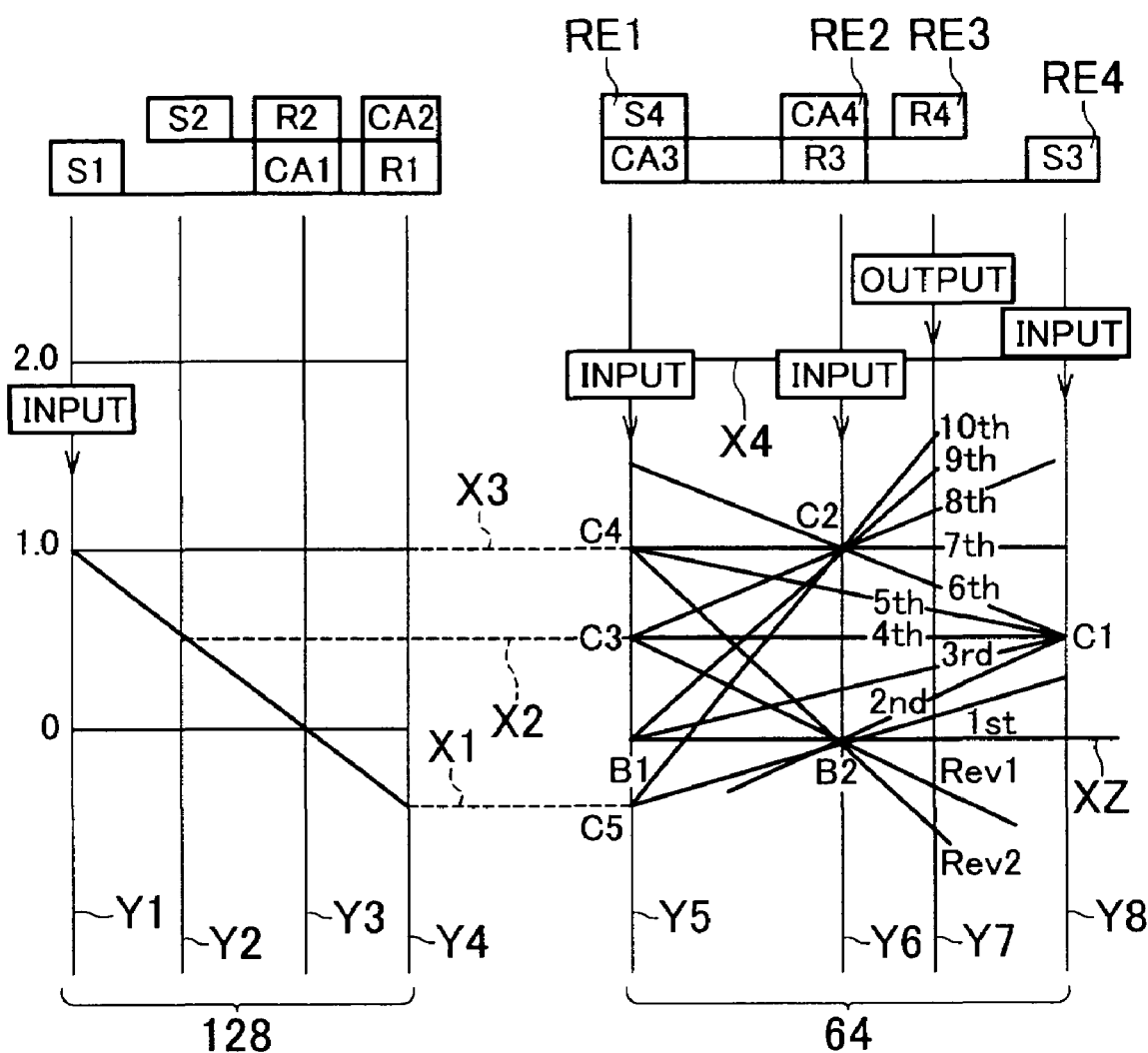
FIG. 61 is an alignment graph able to express, with straight lines, the relative relationships between the rotation speeds of various rotating elements which are connected differently in each gear in the transmission shown in FIG. 59.

FIG. 59 is a skeleton view of the structure of a transmission 122 according to a sixth exemplary embodiment of the invention. FIG. 60 is a chart showing the relationship between gears and operations of friction engagement devices necessary to establish those gears in the transmission 122. FIG. 61 is an alignment graph showing the rotation speeds of rotating elements in each gear. With the exception of the structure of a first transmitting portion 128, the transmission 122 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 122 of this exemplary embodiment which differ from parts of the transmission 66 will be described.

As shown in FIG. 59, a first front planetary gear set 124 which makes up part of the first transmitting portion 128 is a single pinion type planetary gear set which includes a sun gear S1, a carrier CA1 which rotatably and revolvably supports the pinion P1, and a ring gear R1 that is in mesh with the sun gear S1 via the pinion P1. A second front planetary gear set 126 which also makes up part of the first transmitting portion 128 is a double pinion type planetary gear set which includes a sun gear S2, a plurality of sets of pinions P2 which are in mesh with each other, a carrier CA2 which rotatably and revolvably supports the pinions P2, and a ring gear R2 that is in mesh with the sun gear S2 via the pinions P2.

In the first transmitting portion 128, the carrier CA1 of the first front planetary gear set 124 and the ring gear R2 of the second front planetary gear set 126 are connected together as well as integrally connected to the transmission case 16 which is a non-rotating member, thus preventing relative rotation with respect to the transmission case 16. Also, the sun gear S1 of the first front planetary gear set 124 is integrally connected to the input shaft 22 which is the input rotating member. Further, the sun gear S2 of the second front planetary gear set 126 is integrally connected to the first intermediate output member 32. Also, the ring gear R1 of the first front planetary gear set 124 and the carrier CA2 of the second front planetary gear set 126 are connected together as well as integrally connected to the second intermediate output member 34. This kind of structure results in the first transmitting portion 128 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 122 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 60, for example, in response to a command from the ECU 42, and a gear ratio γ (=input shaft rotation speed NIN/output shaft rotation speed NOUT) that changes in substantially equal ratio is able to be achieved for each gear.

In the alignment graph shown in FIG. 61, the four vertical lines Y1 through Y4 represent components of the first transmitting portion 128. From left to right in the graph, line Y1 represents the sun gear S1 of the first front planetary gear set 124 which is one rotating element, line Y2 represents the sun gear S2 of the second front planetary gear set 126 which is another rotating element, line Y3 represents the carrier CA1 of the first front planetary gear set 124 and the ring gear R2 of the second front planetary gear set 126 which are connected together to form another rotating element, and line Y4 represents the ring gear R1 of the first front planetary gear set 124 and the carrier CA2 of the second front planetary gear set 126 which are connected together to form another rotating element. Accordingly, based on these rotating elements, the alignment graph shown in FIG. 61 is similar to the alignment graph shown in FIG. 14 described above so a description thereof will be omitted.

In this way, according to the sixth exemplary embodiment, the first transmitting portion 128 includes the single pinion type first front planetary gear set 124 and the double pinion type second front planetary gear set 126. The carrier CA1 of the first front planetary gear set 124 and the ring gear R2 of the second front planetary gear set 126 are always connected to the transmission case 16, which is a non-rotating member, and the ring gear R1 of the first front planetary gear set 124 and the carrier CA2 of the second front planetary gear set 126 are connected together. Further, the sun gear S1 of the first front planetary gear set 124 is connected to the input shaft 22 which is the input rotating member. Accordingly, the sun gear S2 of the second front planetary gear set 126 functions as the first intermediate output member 32 while the ring gear R1 of the first front planetary gear set 124 or the carrier CA2 of the second front planetary gear set 126 functions as the second intermediate output member 34. Accordingly, a practical transmission 122 is able to be provided.

Figure 63:
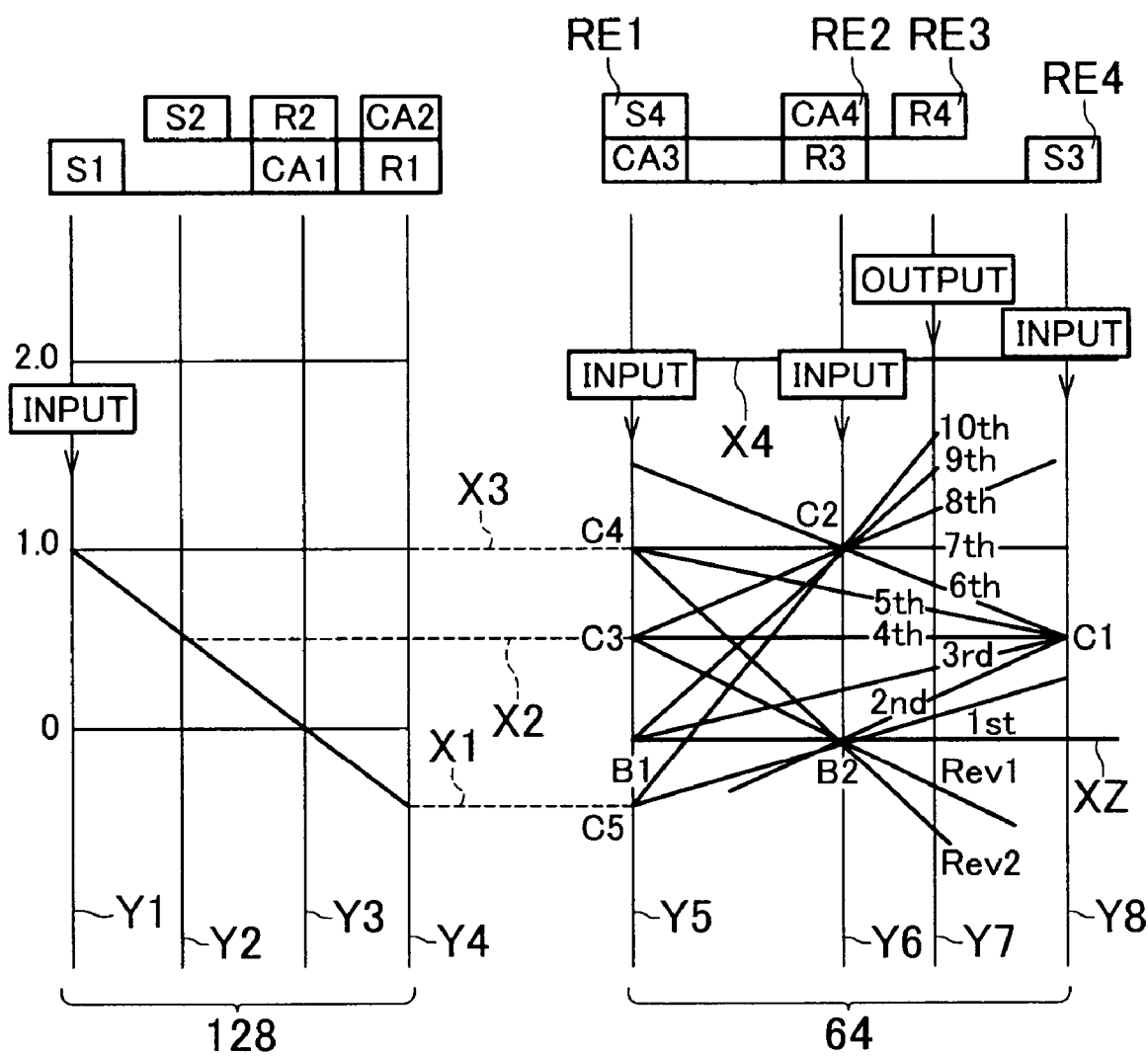
FIG. 63 is an alignment graph corresponding to FIG. 62, which is able to express, with straight lines, the relative relationships between the rotation speeds of various rotating elements which are connected differently in each gear in the transmission according to the first modified example of the sixth exemplary embodiment of the invention.

Here, as a first modified example of the sixth exemplary embodiment, the transmission 122 can achieve ten forward gears and two reverse gears by engaging the clutches and brakes in different combinations, as shown in FIG. 62, in response to a command from the ECU 42, and suitably setting the gear ratio of each planetary gear set. Also, FIG. 63 is an alignment graph corresponding to FIG. 62, which shows the rotation speeds of the rotating elements in each gear. Hereinafter, the clutch and brake engagement chart and alignment graph according to the first modified example of the sixth exemplary embodiment shown in FIGS. 62 and 63, which differ from those of the foregoing exemplary embodiment, will be described.

As shown in the clutch and brake engagement chart in FIG. 62, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

In the clutch and brake engagement chart shown in FIG. 62, the operations of the friction engagement devices to establish first gear "1st" through tenth gear "10th" are the same as those described above using FIG. 13, so descriptions thereof will be omitted here.

In the transmission 122 that achieves the gears in accordance with the clutch and brake engagement chart shown in FIG. 62, the gear ratio γ1 of first gear is approximately 6.667, the gear ratio γ2 of second gear is approximately 4.400, the gear ratio γ3 of third gear is approximately 2.800, the gear ratio γ4 of fourth gear is approximately 2.000, the gear ratio γ5 of fifth gear is approximately 1.556, the gear ratio γ6 of sixth gear is approximately 1.294, the gear ratio γ7 of seventh gear is approximately 1.000, the gear ratio γ8 of eighth gear is approximately 0.800, the gear ratio γ9 of ninth gear is approximately 0.667, the gear ratio γ10 of tenth gear is approximately 0.606, the gear ratio γR1 of first reverse gear is approximately 4.000, and the gear ratio γR2 of second reverse gear is approximately 2.000. Further, the ratio of the gear ratio γ1 of the first gear to the gear ratio γ2 of the second gear (=γ1/γ2) is 1.515, the ratio of the gear ratio γ2 of the second gear to the gear ratio γ3 of the third gear (=γ2/γ3) is 1.571, the ratio of the gear ratio γ3 of the third gear to the gear ratio γ4 of the fourth gear (=γ3/γ4) is 1.400, the ratio of the gear ratio γ4 of the fourth gear to the gear ratio γ5 of the fifth gear (=γ4/γ5) is 1.286, the ratio of the gear ratio γ5 of the fifth gear to the gear ratio γ6 of the sixth gear (=γ5/γ6) is 1.202, the ratio of the gear ratio γ6 of the sixth gear to the gear ratio γ7 of the seventh gear (=γ6/γ7) is 1.294, the ratio of the gear ratio γ7 of the seventh gear to the gear ratio γ8 of the eighth gear (=γ7/γ8) is 1.250, the ratio of the gear ratio γ8 of the eighth gear to the gear ratio γ9 of the ninth gear (=γ8/γ9) is 1.200, and the ratio of the gear ratio γ9 of the ninth gear to the gear ratio γ10 of the tenth gear (=γ9/γ10) is 1.100. Thus, each gear ratio γ changes in substantially equal ratio. Also, the total gear ratio range, which is the ratio of the gear ratio γ1 of the first gear to the gear ratio γ10 of the tenth gear (=γ1/γ10), is 11.000, which is a relatively large value. The gear ratio ρ1 of the first front planetary gear set 124, the gear ratio ρ2 of the second front planetary gear set 126, the gear ratio ρ3 of the first rear planetary gear set 58, and the gear ratio ρ4 of the second rear planetary gear set 60 are designed so that the foregoing gear ratios can be achieved.

In the alignment graph shown in FIG. 63, the four vertical lines Y1 through Y4 represent components of the first transmitting portion 128. From left to right in the graph, line Y1 represents the sun gear S1 of the first front planetary gear set 124, line Y2 represents the sun gear S2 of the second front planetary gear set 126, line Y3 represents the carrier CA1 of the first front planetary gear set 124 and the ring gear R2 of the second front planetary gear set 126 which are connected together, and line Y4 represents the ring gear R1 of the first front planetary gear set 124 and the carrier CA2 of the second front planetary gear set 126 which are connected together. Further, the four vertical lines Y5 through Y8 represent components of the second transmitting portion 64. From left to right in the graph, line Y5 represents the carrier CA3 of the first rear planetary gear set 58 and the sun gear 54 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 63 is similar to the alignment graph shown in FIG. 14 so a description thereof will be omitted.

In this way, according to the first modified example of the sixth exemplary embodiment, it is possible to obtain a transmission 122 which can establish ten forward gears and two reverse gears, in which the steps of the gears are relatively close ratios, by engagement combinations of the clutches and brakes of each gear and suitably setting the gear ratio of each planetary gear set.

Figure 65:
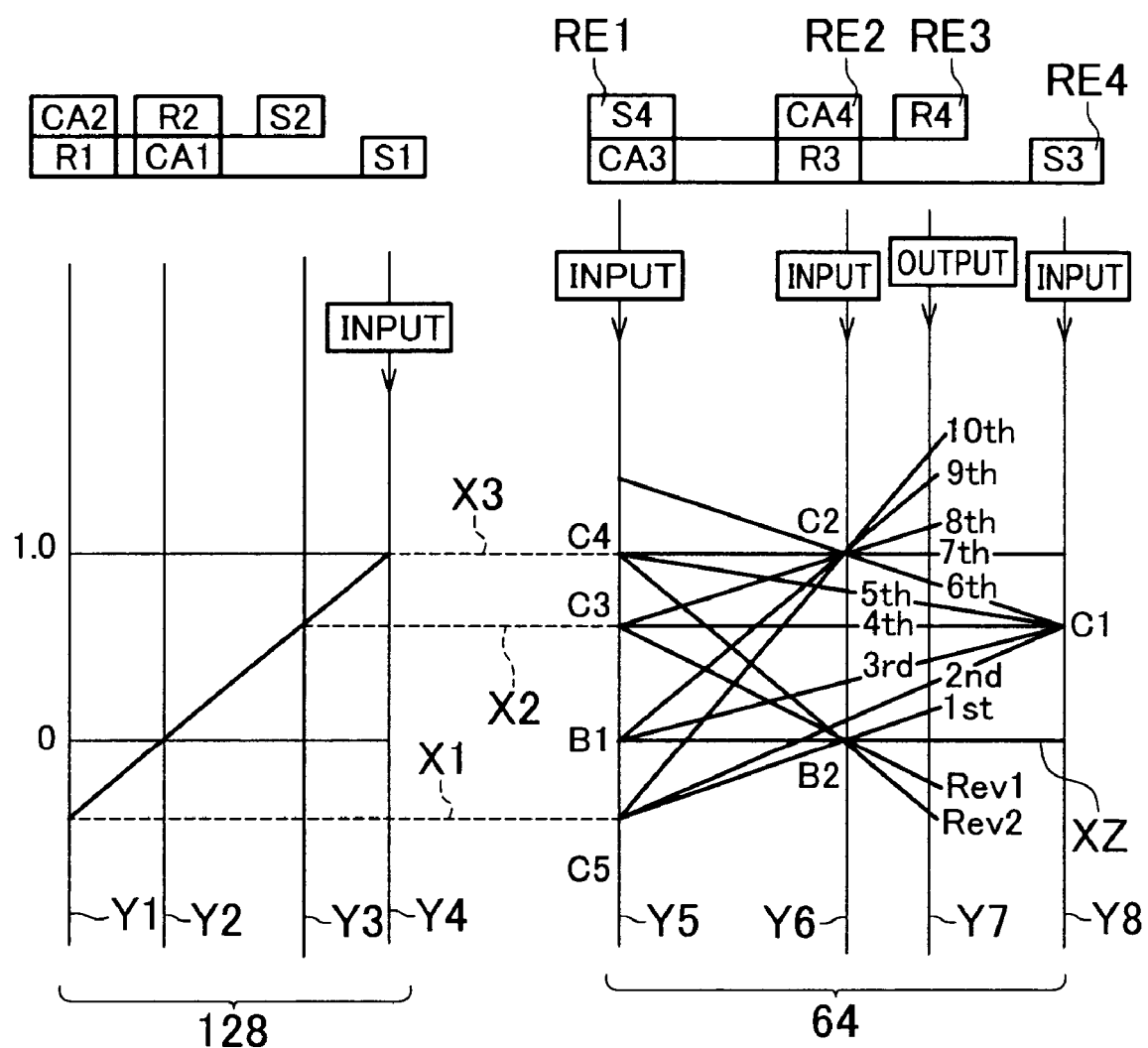
FIG. 65 is an alignment graph corresponding to FIG. 64, which is able to express, with straight lines, the relative relationships between the rotation speeds of various rotating elements which are connected differently in each gear in the transmission according to the second modified example of the sixth exemplary embodiment of the invention.

Here, as a second modified example of the sixth exemplary embodiment, the transmission 122 can achieve ten forward gears and two reverse gears by engaging the clutches and brakes in different combinations, as shown in FIG. 64, in response to a command from the ECU 42, and suitably setting the gear ratio of each planetary gear set. Also, FIG. 65 is an alignment graph corresponding to FIG. 64, which shows the rotation speeds of the rotating elements in each gear. Hereinafter, the clutch and brake engagement chart and alignment graph according to the second modified example of the sixth exemplary embodiment shown in FIGS. 64 and 65, which differ from those of the foregoing exemplary embodiment, will be described.

As shown in the clutch and brake engagement chart in FIG. 64, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be. achieved for each gear.

In the clutch and brake engagement chart shown in FIG. 64, the operations of the friction engagement devices to establish first gear "1st" through tenth gear "10th" are the same as those described above using FIG. 17, so descriptions thereof will be omitted here. Similarly, the gear ratios obtained by the engagement of those friction engagement devices in the various gears are also the same as those gear ratios shown in FIG. 17, so descriptions thereof will be omitted here.

In the alignment graph shown in FIG. 65, the four vertical lines Y1 through Y4 represent components of the first transmitting portion 128. From left to right in the graph, line Y1 represents the ring gear R1 of the first front planetary gear set 124 and the carrier CA2 of the second front planetary gear set 126 which are connected together, line Y2 represents the carrier CA1 of the first front planetary gear set 124 and ring gear R2 of second front planetary gear set 126 which are connected together, line Y3 represents the sun gear S2 of the second front planetary gear set 126, and line Y4 represents the sun gear S1 of the first front planetary gear set 124. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. The alignment graph shown in FIG. 65 is similar to that shown in FIG. 18 so a description thereof will be omitted.

In this way, according to the second modified example of the sixth exemplary embodiment, it is possible to obtain a transmission 122 which can establish ten forward gears and two reverse gears, and in which the steps of the gears are relatively close ratios, by engagement combinations of the clutches and brakes of each gear, such as those described above, and suitably setting the gear ratio of each planetary gear set.

Figure 67:
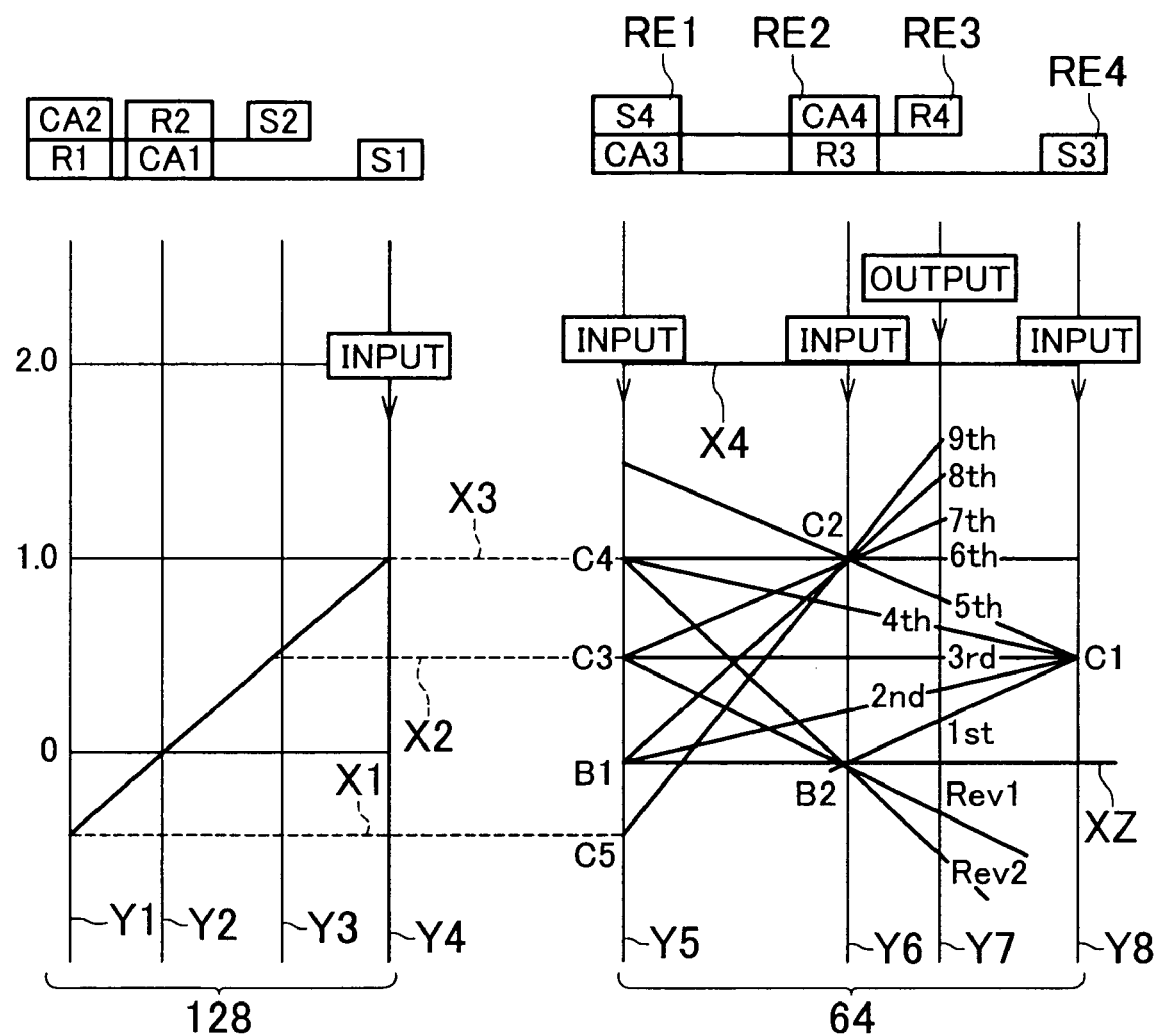
FIG. 67 is an alignment graph corresponding to FIG. 66, which is able to express, with straight lines, the relative relationships between the rotation speeds of various rotating elements which are connected differently in each gear in the transmission according to the third modified example of the sixth exemplary embodiment of the invention.

Here, as a third modified example of the sixth exemplary embodiment, the transmission 122 can achieve nine forward gears and two reverse gears by engaging the clutches and brakes in different combinations, as shown in FIG. 66, in response to a command from the ECU 42, and suitably setting the gear ratio of each planetary gear set. Also, FIG. 67 is an alignment graph corresponding to FIG. 66, which shows the rotation speeds of the rotating elements in each gear. Hereinafter, the clutch and brake engagement chart and alignment graph according to the third modified example of the sixth exemplary embodiment shown in FIGS. 66 and 67, which differ from those of the foregoing exemplary embodiment, will be described.

As shown in the clutch and brake engagement chart in FIG. 66, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 66, the first clutch C1 is engaged to connect the fourth rotating element RE4, i.e., the sun gear S3 of the first rear planetary gear set 58, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first gear which has the largest gear ratio γ1, e.g., approximately 4.776.

Also, the first clutch C1 is engaged to connect the fourth rotating element RE4, i.e., the sun gear S3 of the first rear planetary gear set 58, with the first intermediate output member 32, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing second gear which has a gear ratio γ2 which is smaller than the gear ratio γ1 of first gear, e.g., approximately 2.925.

Further, the first clutch C1 is engaged to connect the fourth rotating element RE4, i.e., the sun gear S3 of the first rear planetary gear set 58, with the first intermediate output member 32, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing third gear which has a gear ratio γ3 which is smaller than the gear ratio γ2 of second gear, e.g., approximately 2.000.

Also, the first clutch C1 is engaged to connect the fourth rotating element RE4, i.e., the sun gear S3 of the first rear planetary gear set 58, with the first intermediate output member 32, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing fourth gear which has a gear ratio γ4 which is smaller than the gear ratio γ3 of third gear, e.g., approximately 1.519.

Further, the first clutch C1 is engaged to connect the fourth rotating element RE4, i.e., the sun gear S3 of the first rear planetary gear set 58, with the first intermediate output member 32, while the second clutch C2 is engaged to connect the second rotating element RE2, i.e., the ring gear R3 of the first rear planetary gear set 58 and the carrier CA4 of the second rear planetary gear set 60 which are connected together, with the input shaft 22, thereby establishing fifth gear which has a gear ratio γ5 which is smaller than the gear ratio γ4 of fourth gear, e.g., approximately 1.265.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing sixth gear which has a gear ratio γ6 which is smaller than the gear ratio γ5 of fifth gear, e.g., approximately 1.000.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing seventh gear which has a gear ratio γ7 which is smaller than the gear ratio γ6 of sixth gear, e.g., approximately 0.800.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing eighth gear which has a gear ratio γ8 which is smaller than the gear ratio γ7 of seventh gear, e.g., approximately 0.667.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fifth clutch C5 is engaged to connect the first rotating element RE1, i.e., the carrier CA3 of the first rear planetary gear set 58 and the sun gear S4 of the second rear planetary gear set 60 which are connected together, with the second intermediate output member 34, thereby establishing ninth gear which has the smallest gear ratio γ9, e.g., approximately 0.588.

Also, the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first reverse gear "R1" which has a gear ratio γR1 of approximately 4.000.

Further, the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second reverse gear "R2" which has a gear ratio γR2 which is smaller than the gear ratio γR1 of the first reverse gear, e.g., 2.000. The gear ratio ρ1 of the first front planetary gear set 124, the gear ratio ρ2 of the second front planetary gear set 126, the gear ratio ρ3 of the first rear planetary gear set 58, and the gear ratio ρ4 of the second rear planetary gear set 60 are designed so that the foregoing gear ratios can be achieved.

In the transmission 122 that achieves the gears in accordance with the clutch and brake engagement chart shown in FIG. 66, the ratio of the gear ratio γ1 of the first gear to the gear ratio γ2 of the second gear (=γ1/γ2) is 1.633, the ratio of the gear ratio γ2 of the second gear to the gear ratio γ3 of the third gear (=γ2/γ3) is 1.463, the ratio of the gear ratio γ3 of the third gear to the gear ratio γ4 of the fourth gear (=γ3/γ4) is 1.316, the ratio of the gear ratio γ4 of the fourth gear to the gear ratio γ5 of the fifth gear (=γ4/γ5) is 1.201, the ratio of the gear ratio γ5 of the fifth gear to the gear ratio γ6 of the sixth gear (=γ5/γ6) is 1.265, the ratio of the gear ratio γ6 of the sixth gear to the gear ratio γ7 of the seventh gear (=γ6/γ7) is 1.250, the ratio of the gear ratio γ7 of the seventh gear to the gear ratio γ8 of the eighth gear (=γ7/γ8) is 1.200, and the ratio of the gear ratio γ8 of the eighth gear to the gear ratio γ9 of the ninth gear (=γ8/γ9) is 1.133. Thus, each gear ratio γ changes in substantially equal ratio. Also, the total gear ratio range, which is the ratio of the gear ratio γ1 of the first gear to the gear ratio γ9 of the ninth gear (=γ1/γ9), is 8.119, which is a relatively large value.

In the alignment graph shown in FIG. 67, the four vertical lines Y1 through Y4 represent components of the first transmitting portion 128. From left to right in the graph, line Y1 represents the ring gear R1 of the first front planetary gear set 124 and the carrier CA2 of the second front planetary gear set 126 which are connected together, line Y2 represents the carrier CA1 of the first front planetary gear set 124 and the ring gear R2 of the second front planetary gear set 126 which are connected together, line Y3 represents the sun gear S2 of the second front planetary gear set 126, and line Y4 represents the sun gear S1 of the first front planetary gear set 124. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. Accordingly, based on these rotating elements, the alignment graph shown in FIG. 67 is similar to that shown in FIG. 9 so a description thereof will be omitted.

In this way, according to this third modified example of the sixth exemplary embodiment, first gear is established by engaging the first clutch C1 and the second brake B2. Second gear is established by engaging the first clutch C1 and the first brake B1. Third gear is established by engaging the first clutch C1 and the third clutch C3. Fourth gear is established by engaging the first clutch C1 and the fourth clutch C4. Fifth gear is established by engaging the first clutch C1 and the second clutch C2. Sixth gear is established by engaging the second clutch C2 and the fourth clutch C4. Seventh gear is established by engaging the second clutch C2 and the third clutch C3, and eighth gear is established by engaging the second clutch C2 and the first brake B1. Thus, the transmission 122 of this third modified example of the sixth exemplary embodiment is able to achieve eight forward gears.

The transmission 122 of this third modified example of the sixth exemplary embodiment is also able to achieve ninth gear by engaging the second clutch C2 and the fifth clutch C5. Therefore, in addition to being able to achieve nine forward gears, the step between eighth gear and ninth gear is able to be preferably set relatively small with a close ratio.

Figure 69:
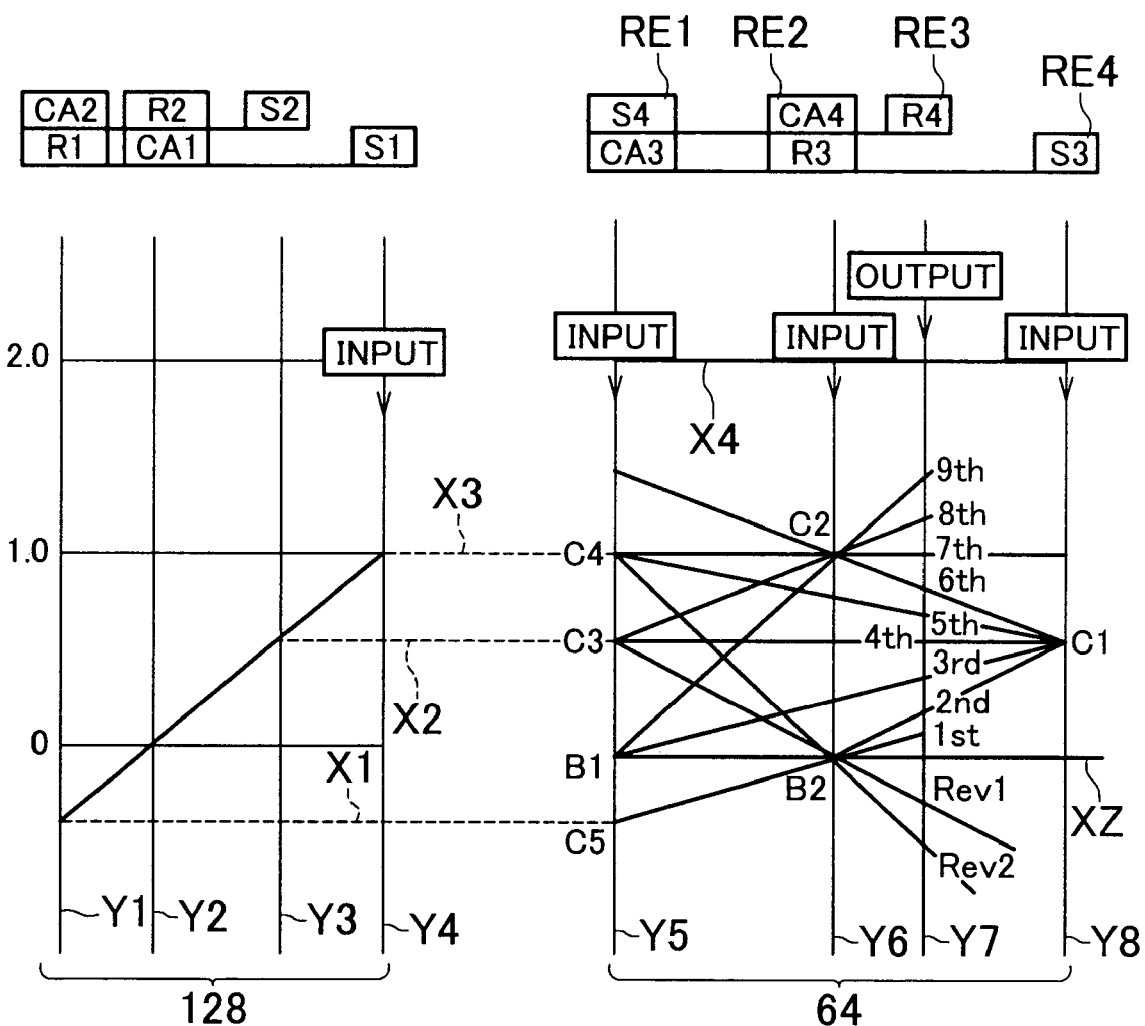
FIG. 69 is an alignment graph corresponding to FIG. 68, which is able to express, with straight lines, the relative relationships between the rotation speeds of various rotating elements which are connected differently in each gear in the transmission according to the fourth modified example of the sixth exemplary embodiment of the invention.

Here, as a fourth modified example of the sixth exemplary embodiment, the transmission 122 can achieve nine forward gears and two reverse gears by engaging the clutches and brakes in different combinations, as shown in FIG. 68, in response to a command from the ECU 42, and suitably setting the gear ratio of each planetary gear set. Also, FIG. 69 is an alignment graph corresponding to FIG. 68, which shows the rotation speeds of the rotating elements in each gear. Hereinafter, the clutch and brake engagement chart and alignment graph according to the fourth modified example of the sixth exemplary embodiment shown in FIGS. 68 and 69, which differ from those of the foregoing exemplary embodiment, will be described.

As shown in the clutch and brake engagement chart in FIG. 68, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 68, the fifth clutch C5 is engaged to connect the first rotating element RE1, i.e., the carrier CA3 of the first rear planetary gear set 58 and the sun gear S4 of the second rear planetary gear set 60, with the second intermediate output member 34, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first gear which has the largest gear ratio γ1, e.g., approximately 4.971.

Also, the first clutch C1 is engaged to connect the fourth rotating element RE4, i.e., the sun gear S3 of the first rear planetary gear set 58, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second gear which has a gear ratio γ2 which is smaller than the gear ratio γ1 of first gear, e.g., approximately 3.290.

Further, the first clutch C1 is engaged to connect the fourth rotating element RE4, i.e., the sun gear S3 of the first rear planetary gear set 58, with the first intermediate output member 32, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing third gear which has a gear ratio γ3 which is smaller than the gear ratio γ2 of second gear, e.g., approximately 2.222.

Also, the first clutch C1 is engaged to connect the fourth rotating element RE4, i.e., the sun gear S3 of the first rear planetary gear set 58, with the first intermediate output member 32, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing fourth gear which has a gear ratio γ4 which is smaller than the gear ratio γ3 of third gear, e.g., approximately 1.645.

Further, the first clutch C1 is engaged to connect the fourth rotating element RE4, i.e., the sun gear S3 of the first rear planetary gear set 58, with the first intermediate output member 32, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing fifth gear which has a gear ratio γ5 which is smaller than the gear ratio γ4 of fourth gear, e.g., approximately 1.409.

Also, the first clutch C1 is engaged to connect the fourth rotating element RE4, i.e., the sun gear S3 of the first rear planetary gear set 58, with the first intermediate output member 32, while the second clutch C2 is engaged to connect the second rotating element RE2, i.e., the ring gear R3 of the first rear planetary gear set 58 and the carrier CA4 of the second rear planetary gear set 60 which are connected together, with the input shaft 22, thereby establishing sixth gear which has a gear ratio γ6 which is smaller than the gear ratio γ5 of fifth gear, e.g., approximately 1.244.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, thereby establishing eighth gear which has a gear ratio γ8 which is smaller than the gear ratio γ7 of seventh gear, e.g., approximately 0.825.

Also, the second clutch C2 is engaged to connect the second rotating element RE2, i.e., the ring gear R3 of the first rear planetary gear set 58 and the carrier CA4 of the second rear planetary gear set 60 which are connected together, with the input shaft 22, while the first brake B1 is engaged to hold the first rotating element RE1, i.e., the carrier CA3 of the first rear planetary gear set 58 and the sun gear S4 of the second rear planetary gear set 60 which are connected together, to the transmission case 16, thereby establishing ninth gear which has the smallest gear ratio γ9, e.g., approximately 0.649.

Also, the third clutch C3 is engaged to connect the first rotating element RE1, i.e., the carrier CA3 of the first rear planetary gear set 58 and the sun gear S4 of the second rear planetary gear set 60 which are connected together, with the first intermediate output member 32, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing first reverse gear "R1" which has a gear ratio γR1 of approximately 3.047.

Further, the fourth clutch C4 is engaged to connect the first rotating element RE1, i.e., the carrier CA3 of the first rear planetary gear set 58 and the sun gear S4 of the second rear planetary gear set 60 which are connected together, with the input shaft 22, while the second brake B2 is engaged to hold the second rotating element RE2, i.e., the ring gear R3 of the first rear planetary gear set 58 and the carrier CA4 of the second rear planetary gear set 60 which are connected together, to the transmission case 16, thereby establishing second reverse gear "R2" which has a gear ratio γR2 which is smaller than the gear ratio γR1 of the first reverse gear, e.g., 1.852. The gear ratio ρ1 of the first front planetary gear set 124, the gear ratio ρ2 of the second front planetary gear set 126, the gear ratio ρ3 of the first rear planetary gear set 58, and the gear ratio ρ4 of the second rear planetary gear set 60 are designed so that the foregoing gear ratios can be achieved.

In the transmission 122 that achieves the gears in accordance with the clutch and brake engagement chart shown in FIG. 68, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, and the ratio of the gear ratio γ8 of the eighth gear to the gear ratio γ9 of the ninth gear (=γ8/γ9) is 1.271. Thus, each gear ratio γ changes in substantially equal ratio. Also, the total gear ratio range, which is the ratio of the gear ratio γ1 of the first gear to the gear ratio γ9 of the ninth gear (=γ1/γ9), is 7.655, which is a relatively large value.

In the alignment graph shown in FIG. 69, the four vertical lines Y1 through Y4 represent components of the first transmitting portion 128. From left to right in the graph, line Y1 represents the ring gear R1 of the first front planetary gear set 124 and the carrier CA2 of the second front planetary gear set 126 which are connected together, line Y2 represents the carrier CA1 of the first front planetary gear set 124 and the ring gear R2 of the second front planetary gear set 126 which are connected together, line Y3 represents the sun gear S2 of the second front planetary gear set 126, and line Y4 represents the sun gear S1 of the first front planetary gear set 124. Further, the four vertical lines Y5 through Y8 represent components of the second transmitting portion 64. From left to right in the graph, line Y5 represents the carrier CA3 of the first rear planetary gear set 58 and the sun gear S4 of the second rear planetary gear set 60 which are connected together and correspond to the first rotating element RE1, line Y6 represents the ring gear R3 of the first rear planetary gear set 58 and the carrier CA4 of the second rear planetary gear set 60 which are connected together and correspond to the second rotating element RE2, line Y7 represents the ring gear R4 of the second rear planetary gear set 60 which corresponds to the third rotating element RE3, and line Y8 represents the sun gear S3 of the first rear planetary gear set 58 which corresponds to the fourth rotating element RE4. Accordingly, based on these rotating elements, the alignment graph shown in FIG. 69 is similar to that shown in FIG. 11 so a description thereof will be omitted.

In this way, according to this fourth modified example of the sixth exemplary embodiment, first gear is established by engaging the fifth clutch C5 and the second brake B2. Second gear is established by engaging the first clutch C1 and the second brake B2. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4, and eighth gear is established by engaging the second clutch C2 and the third clutch C3. Thus, the transmission 122 of this fourth modified example of the sixth exemplary embodiment is able to achieve eight forward gears.

The transmission 122 of this fourth modified example of the sixth exemplary embodiment is also able to achieve ninth gear by engaging the second clutch C2 and the first brake B1. Therefore, in addition to being able to achieve nine forward gears, the step between eighth gear and ninth gear is able to be preferably set relatively small with a close ratio.

Figure 71:
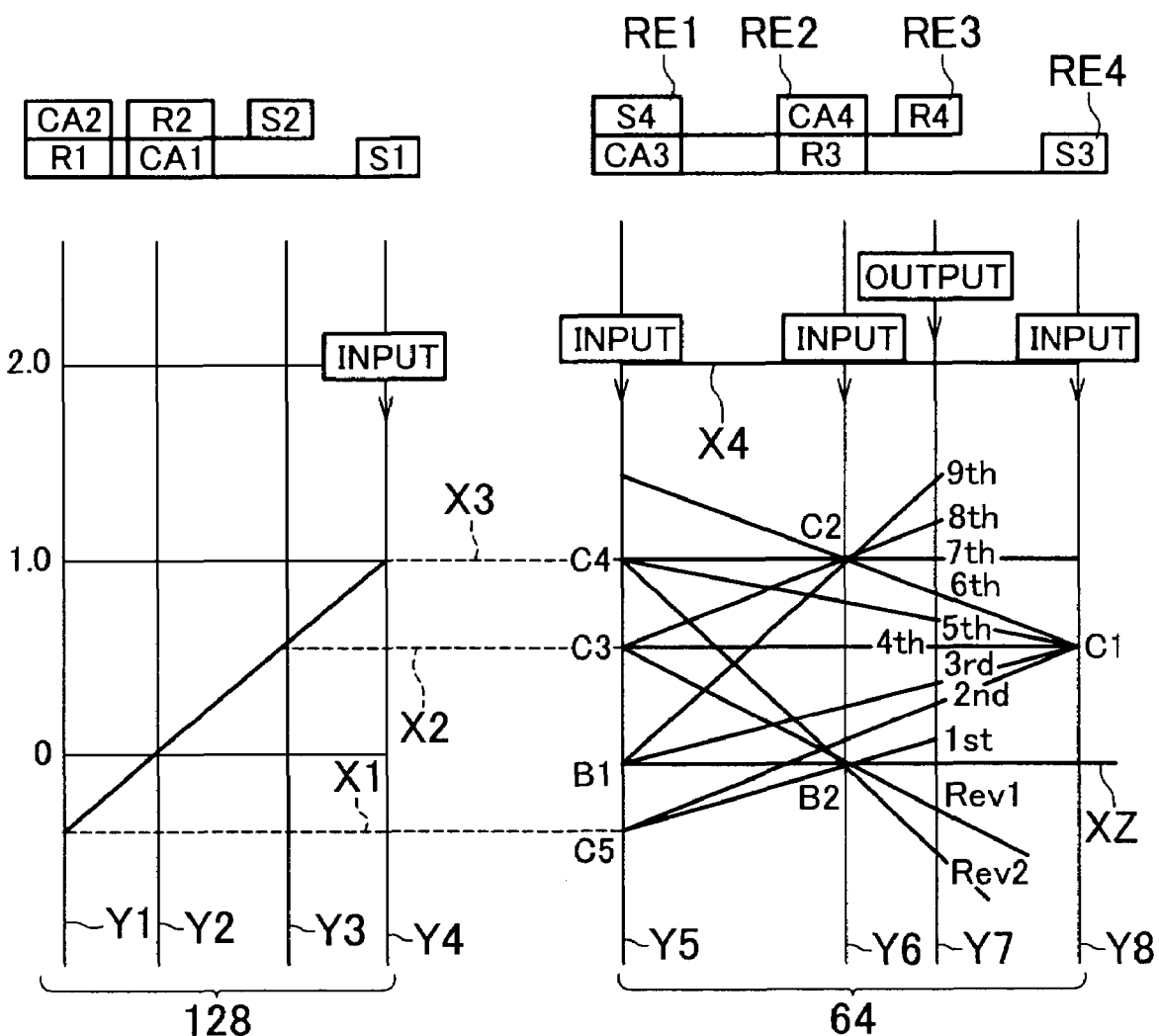
FIG. 71 is an alignment graph corresponding to FIG. 70, which is able to express, with straight lines, the relative relationships between the rotation speeds of various rotating elements which are connected differently in each gear in the transmission according to the fifth modified example of the sixth exemplary embodiment of the invention.

Here, as a fifth modified example of the sixth exemplary embodiment, the transmission 122 can achieve nine forward gears and two reverse gears, and effects equivalent to those obtained from the foregoing exemplary embodiment can be obtained, by engaging the clutches and brakes in different combinations, as shown in FIG. 70, in response to a command from the ECU 42, and suitably setting the gear ratio of each planetary gear set. Also, FIG. 71 is an alignment graph corresponding to FIG. 70, which shows the rotation speeds of the rotating elements in each gear. Hereinafter, the clutch and brake engagement chart and alignment graph according to the fifth modified example of the sixth exemplary embodiment shown in FIGS. 70 and 71, which differ from those of the foregoing exemplary embodiment, will be described.

As shown in the clutch and brake engagement chart in FIG. 70, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 23, so descriptions thereof will be omitted here.

In the alignment graph shown in FIG. 71, the four vertical lines Y1 through Y4 representing components of the first transmitting portion 128 and the four vertical lines Y5 through Y8 representing components of the second transmitting portion 64 represent the same rotating elements as those in FIG. 65 described above because the structure shown in the skeleton view is the same. Also, in the clutch and brake engagement chart shown in FIG. 70, the operations of the friction engagement devices for establishing first gear "1st" through ninth gear "9th" are the same as those described above using FIG. 23. Therefore, the alignment graph also corresponds to these. Thus, the alignment graph shown in FIG. 71 is the same as the alignment graph shown in FIG. 24.

Thus, according to this fifth modified example of the sixth exemplary embodiment as well, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

Figure 73:
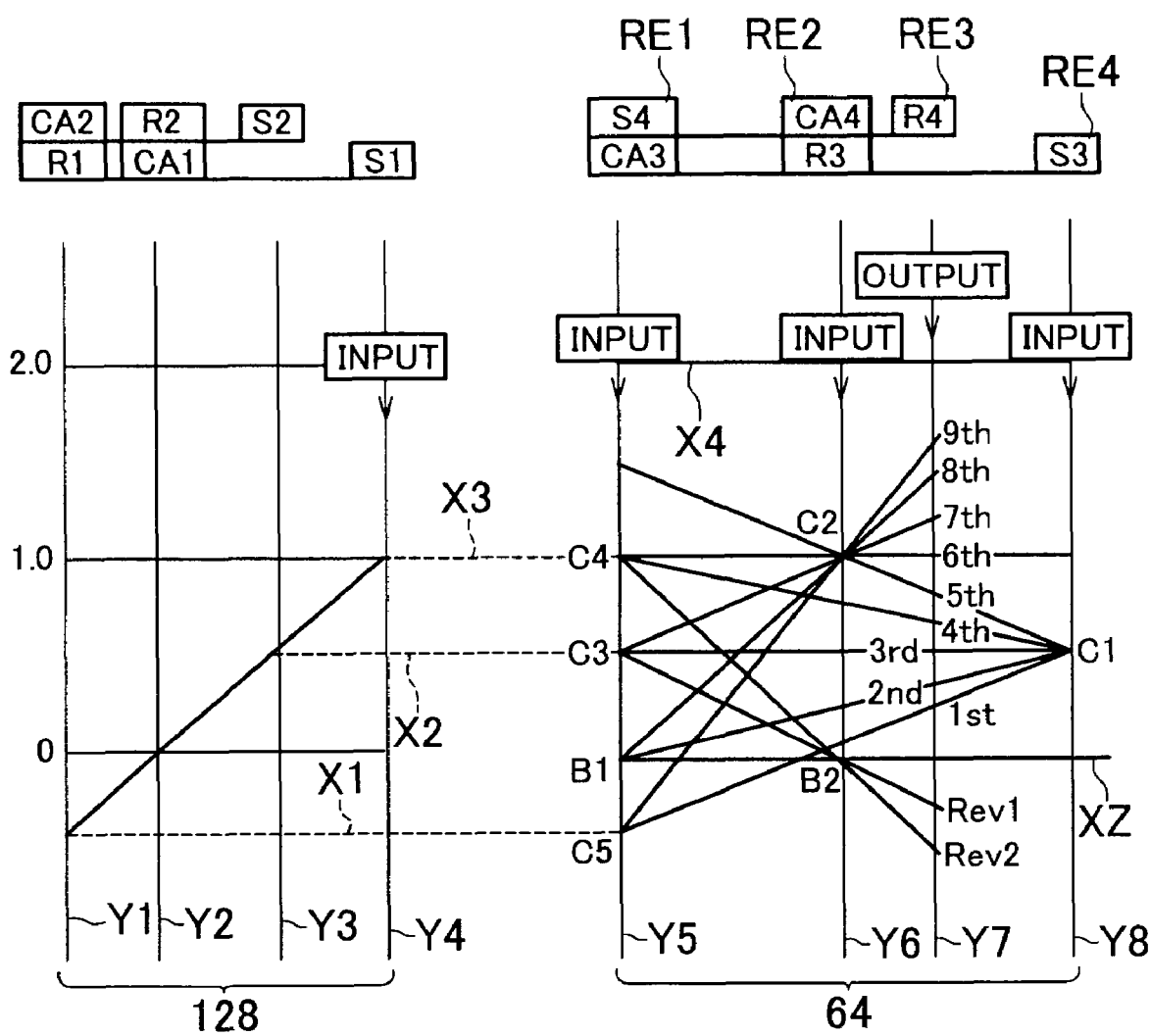
FIG. 73 is an alignment graph corresponding to FIG. 72, which is able to express, with straight lines, the relative relationships between the rotation speeds of various rotating elements which are connected differently in each gear in the transmission according to the sixth modified example of the sixth exemplary embodiment of the invention.

Here, as a sixth modified example of the sixth exemplary embodiment, the transmission 122 can achieve nine forward gears and two reverse gears, and effects equivalent to those obtained from the foregoing exemplary embodiment can be obtained, by engaging the clutches and brakes in different combinations, as shown in FIG. 72, in response to a command from the ECU 42, and suitably setting the gear ratio of each planetary gear set. Also, FIG. 73 is an alignment graph corresponding to FIG. 72, which shows the rotation speeds of the rotating elements in each gear. Hereinafter, the clutch and brake engagement chart and alignment graph according to the sixth modified example of the sixth exemplary embodiment shown in FIGS. 72 and 73, which differ from those of the foregoing exemplary embodiment, will be described.

As shown in the clutch and brake engagement chart in FIG. 72, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 25, so descriptions thereof will be omitted here.

In the alignment graph shown in FIG. 73, the four vertical lines Y1 through Y4 representing components of the first transmitting portion 128 and the four vertical lines Y5 through Y8 representing components of the second transmitting portion 64 represent the same rotating elements as those in FIG. 65 described above because the structure shown in the skeleton view is the same. Also, in the clutch and brake engagement chart shown in FIG. 72, the operations of the friction engagement devices for establishing first gear "1st" through ninth gear "9th" are the same as those described above using FIG. 25. Therefore, the alignment graph also corresponds to these. Thus, the alignment graph shown in FIG. 73 is the same as the alignment graph shown in FIG. 26.

Thus, according to this sixth modified example of the sixth exemplary embodiment as well, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

Figure 74:
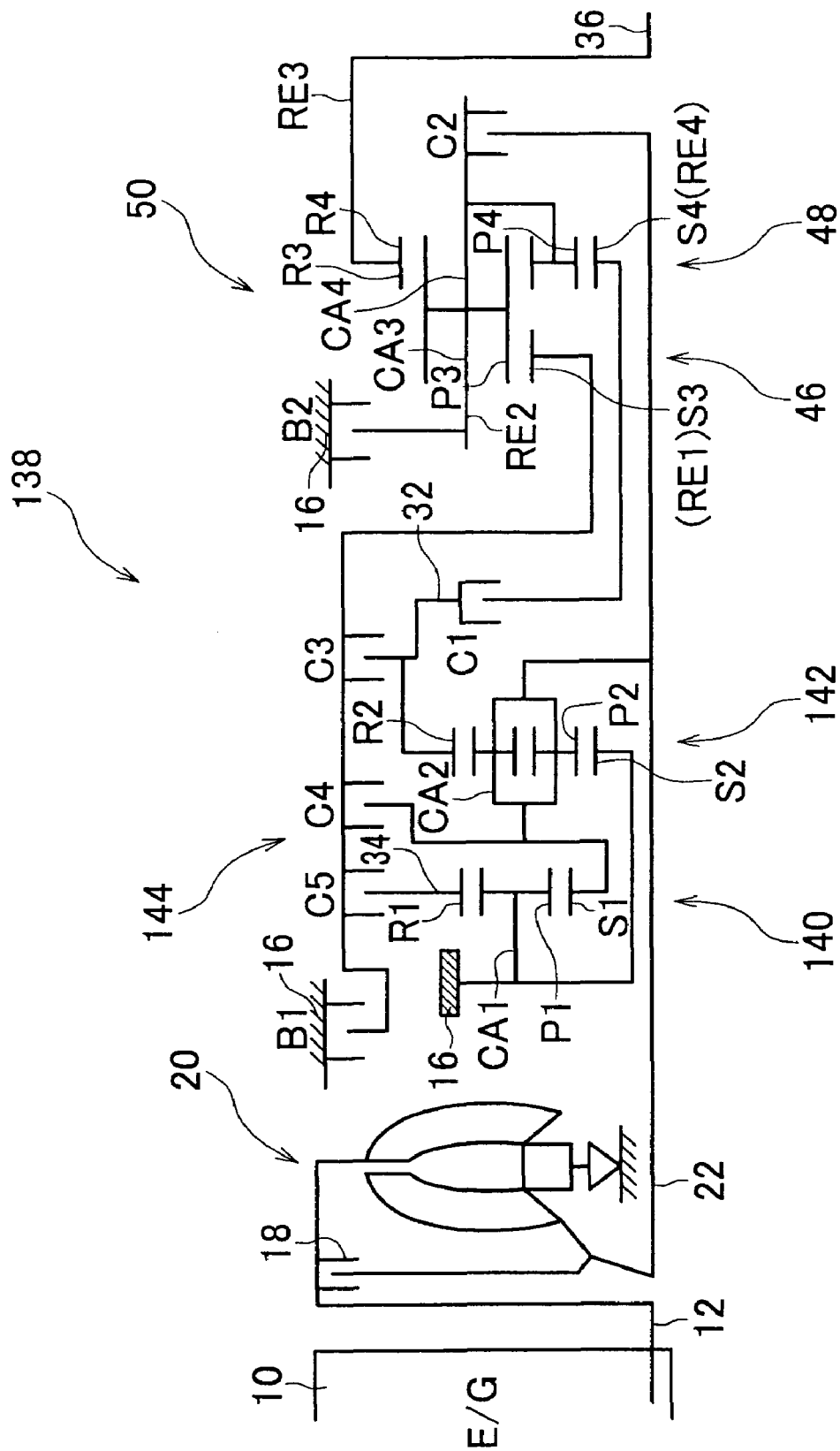
FIG. 74 is a skeleton view of the structure of a multi-speed transmission for a vehicle according to a seventh exemplary embodiment of the invention.
Figure 78:
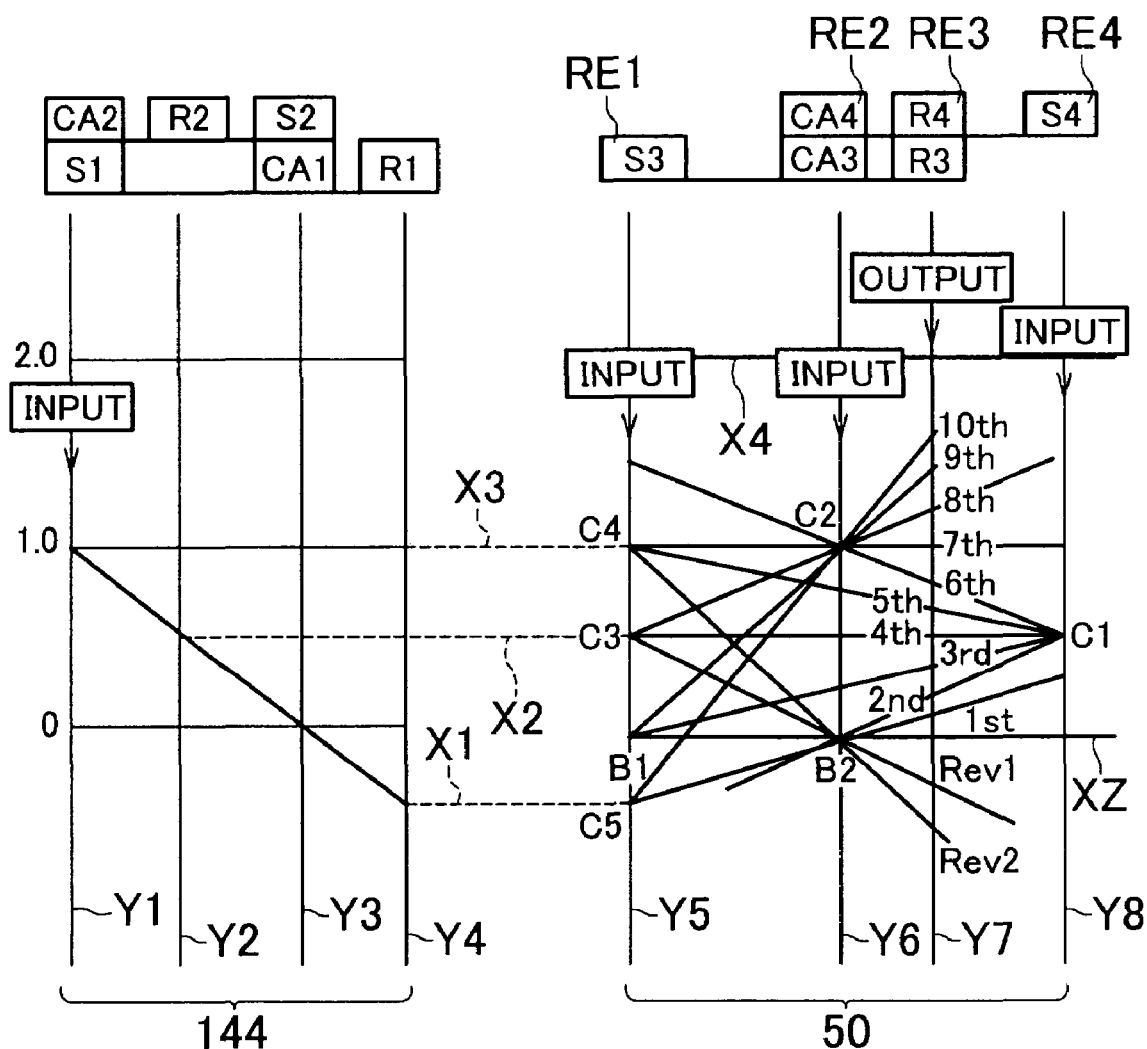
FIG. 78 is an alignment graph which is able to express, with straight lines, the relative relationships between the rotation speeds of various rotating elements which are connected differently in each gear in the transmission according to the seventh exemplary embodiment, and the transmissions according to the first and second modified examples of the seventh exemplary embodiment of the invention.

FIG. 74 is a skeleton view of the structure of a transmission 138 according to a seventh exemplary embodiment of the invention. FIG. 75 is a chart showing the relationship between gears and operations of friction engagement devices necessary to establish those gears in the transmission 138. FIG. 78 is an alignment graph showing the rotation speeds of rotating elements in each gear. With the exception of the structure of a first transmitting portion 144, the transmission 138 of this exemplary embodiment is similar in structure to the transmission 44 shown in FIG. 5, so effects equivalent to those obtained from the foregoing exemplary embodiment can be obtained with this exemplary embodiment. Hereinafter, parts of the transmission 138 of this exemplary embodiment which differ from parts of the transmission 44 will be described.

As shown in FIG. 74, a first front planetary gear set 140 which makes up part of the first transmitting portion 144 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 142 which also makes up part of the first transmitting portion 144 is a double pinion type planetary gear set which includes a sun gear S2, a plurality of sets of pinions P2 which are in mesh with each other, a carrier CA2 which rotatably and revolvably supports the pinions P2, and a ring gear R2 that is in mesh with the sun gear S2 via the pinions P2.

In the first transmitting portion 144, the carrier CA1 of the first front planetary gear set 140 and the sun gear S2 of the second front planetary gear set 142 are connected together as well as integrally connected to the transmission case 16 which is a non-rotating member, thus preventing relative rotation with respect to the transmission case 16. Also, the sun gear S1 of the first front planetary gear set 140 and the second clutch C2 of the second front planetary gear set 142 are connected together as well as integrally connected to the input shaft 22 which is the input rotating member. Further, the ring gear R2 of the second front planetary gear set 142 is integrally connected to the first intermediate output member 32. Also, the ring gear R1 of the first front planetary gear set 140 is integrally connected to the second intermediate output member 34. This kind of structure results in the first transmitting portion 144 slowing down the rotation from the input shaft 22 and transmitting that slowed rotation to the second transmitting portion 50 via the first intermediate output member 32, and reversing the rotation from the input shaft 22 and transmitting that reverse rotation to the second transmitting portion 50 via the second intermediate output member 34.

In the transmission 138 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 75, for example, in response to a command from the ECU 42, and a gear ratio $\gamma$ (=input shaft rotation speed NIN/output shaft rotation speed NOUT) that changes in substantially equal ratio is able to be achieved for each gear.

In the transmission 138 that achieves the gears in accordance with the clutch and brake engagement chart shown in FIG. 75, the gear ratio $\gamma 1$ of first gear is approximately 4.762, the gear ratio $\gamma 2$ of second gear is approximately 4.110, the gear ratio $\gamma 3$ of third gear is approximately 2.603, the gear ratio $\gamma 4$ of fourth gear is approximately 2.000, the gear ratio $\gamma 5$ of fifth gear is approximately 1.624, the gear ratio $\gamma 6$ of sixth gear is approximately 1.322, the gear ratio $\gamma 7$ of seventh gear is approximately 1.000, the gear ratio $\gamma 8$ of eighth gear is approximately 0.833, the gear ratio $\gamma 9$ of ninth gear is approximately 0.714, the gear ratio $\gamma 10$ of tenth gear is approximately 0.621, the gear ratio $\gamma R1$ of first reverse gear is approximately 5.000, and the gear ratio $\gamma R2$ of second reverse gear is approximately 2.500. Further, the ratio of the gear ratio $\gamma 1$ of the first gear to the gear ratio $\gamma 2$ of the second gear (=$\gamma 1/\gamma 2$) is 1.159, the ratio of the gear ratio $\gamma 2$ of the second gear to the gear ratio $\gamma 3$ of the third gear (=$\gamma 2/\gamma 3$) is 1.579, the ratio of the gear ratio $\gamma 3$ of the third gear to the gear ratio $\gamma 4$ of the fourth gear (=$\gamma 3/\gamma 4$) is 1.301, the ratio of the gear ratio $\gamma 4$ of the fourth gear to the gear ratio $\gamma 5$ of the fifth gear (=$\gamma 4/\gamma 5$) is 1.232, the ratio of the gear ratio $\gamma 5$ of the fifth gear to the gear ratio $\gamma 6$ of the sixth gear (=$\gamma 5/\gamma 6$) is 1.229, the ratio of the gear ratio $\gamma 6$ of the sixth gear to the gear ratio $\gamma 7$ of the seventh gear (=$\gamma 6/\gamma 7$) is 1.322, the ratio of the gear ratio $\gamma 7$ of the seventh gear to the gear ratio $\gamma 8$ of the eighth gear (=$\gamma 7/\gamma 8$) is 1.200, the ratio of the gear ratio $\gamma 8$ of the eighth gear to the gear ratio $\gamma 9$ of the ninth gear (=$\gamma 8/\gamma 9$) is 1.167, and the ratio of the gear ratio $\gamma 9$ of the ninth gear to the gear ratio $\gamma 10$ of the tenth gear (=$\gamma 9/\gamma 10$) is 1.150. Thus, each gear ratio $\gamma$ changes in substantially equal ratio. Also, the total gear ratio range, which is the ratio of the gear ratio $\gamma 1$ of the first gear to the gear ratio $\gamma 10$ of the tenth gear (=$\gamma 1/\gamma 10$), is 7.667, which is a relatively large value. The gear ratio $\rho 1$ of the first front planetary gear set 140, the gear ratio $\rho 2$ of the second front planetary gear set 142, the gear ratio $\rho 3$ of the first rear planetary gear set 46, and the gear ratio $\rho 4$ of the second rear planetary gear set 48 are designed so that the foregoing gear ratios can be achieved.

As a first modified example of the seventh exemplary embodiment, gears such as those shown in FIG. 76 can be obtained by suitably setting the gear ratios $\rho 1$ through $\rho 4$ of the planetary gear sets even though the engagement operations for each gear do not change. In the transmission 138 that achieves the gears in accordance with the clutch and brake engagement chart shown in FIG. 76, the gear ratio $\gamma 1$ of first gear is approximately 4.971, the gear ratio $\gamma 2$ of second gear is approximately 3.290, the gear ratio $\gamma 3$ of third gear is approximately 2.222, the gear ratio $\gamma 4$ of fourth gear is approximately 1.645, the gear ratio $\gamma 5$ of fifth gear is approximately 1.409, the gear ratio $\gamma 6$ of sixth gear is approximately 1.244, the gear ratio $\gamma 7$ of seventh gear is approximately 1.000, the gear ratio $\gamma 8$ of eighth gear is approximately 0.825, the gear ratio $\gamma 9$ of ninth gear is approximately 0.649, the gear ratio $\gamma 10$ of tenth gear is approximately 0.574, the gear ratio $\gamma R1$ of first reverse gear is approximately 3.047, and the gear ratio $\gamma R2$ of second reverse gear is approximately 1.852.

Further, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, the ratio of the gear ratio γ8 of the eighth gear to the gear ratio γ9 of the ninth gear (=γ8/γ9) is 1.271, and the ratio of the gear ratio γ9 of the ninth gear to the gear ratio γ10 of the tenth gear (=γ9/γ10) is 1.131. Thus, each gear ratio γ changes in substantially equal ratio. Also, the total gear ratio range, which is the ratio of the gear ratio γ1 of the first gear to the gear ratio γ10 of the tenth gear (=γ1/γ10), is 8.655, which is a relatively large value. By suitably setting the gear ratio of each planetary gear set in this way, the total gear ratio range can be set wider than the total gear ratio range shown in FIG. 75.

Moreover, the transmission 138 can also achieve gears with gear ratios as a second modified example of the seventh exemplary embodiment, such as those shown in FIG. 77. In the transmission 138 that achieves the gears in accordance with the clutch and brake engagement chart shown in FIG. 77, the gear ratio γ1 of first gear is approximately 6.667, the gear ratio γ2 of second gear is approximately 4.400, the gear ratio γ3 of third gear is approximately 2.800, the gear ratio γ4 of fourth gear is approximately 2.000, the gear ratio γ5 of fifth gear is approximately 1.556, the gear ratio γ6 of sixth gear is approximately 1.294, the gear ratio γ7 of seventh gear is approximately 1.000, the gear ratio γ8 of eighth gear is approximately 0.800, the gear ratio γ9 of ninth gear is approximately 0.667, the gear ratio γ10 of tenth gear is approximately 0.606, the gear ratio γR1 of first reverse gear is approximately 4.000, and the gear ratio γR2 of second reverse gear is approximately 2.000. Further, the ratio of the gear ratio γ1 of the first gear to the gear ratio γ2 of the second gear (=γ1/γ2) is 1.515, the ratio of the gear ratio γ2 of the second gear to the gear ratio γ3 of the third gear (=γ2/γ3) is 1.571, the ratio of the gear ratio γ3 of the third gear to the gear ratio γ4 of the fourth gear (=γ3/γ4) is 1.400, the ratio of the gear ratio γ4 of the fourth gear to the gear ratio γ5 of the fifth gear (=γ4/γ5) is 1.286, the ratio of the gear ratio γ5 of the fifth gear to the gear ratio γ6 of the sixth gear (=γ5/γ6) is 1.202, the ratio of the gear ratio γ6 of the sixth gear to the gear ratio γ7 of the seventh gear (=γ6/γ7) is 1.294, the ratio of the gear ratio γ7 of the seventh gear to the gear ratio γ8 of the eighth gear (=γ7/γ8) is 1.250, the ratio of the gear ratio γ8 of the eighth gear to the gear ratio γ9 of the ninth gear (=γ8/γ9) is 1.200, and the ratio of the gear ratio γ9 of the ninth gear to the gear ratio γ10 of the tenth gear (=γ9/γ10) is 1.100. Thus, each gear ratio γ changes in substantially equal ratio. Also, the total gear ratio range, which is the ratio of the gear ratio γ1 of the first gear to the gear ratio γ10 of the tenth gear (=γ1/γ10), is 11.000, which is a relatively large value.

In the alignment graph shown in FIG. 78, the four vertical lines Y1 through Y4 represent components of the first transmitting portion 144. From left to right in the graph, line Y1 represents the sun gear S1 of the first front planetary gear set 140 and the carrier CA2 of the second front planetary gear set 142 which are connected together to form one rotating element, line Y2 represents the ring gear R2 of the second front planetary gear set 142 which is another rotating element, line Y3 represents the carrier CA1 of the first front planetary gear set 140 and the sun gear S2 of the second front planetary gear set 142 which are connected together to form another rotating element, and line Y4 represents the ring gear R1 of the first front planetary gear set 140 which is another rotating element. Further, the four vertical lines Y5 through Y8 represent components of the second transmitting portion 50. From left to right in the graph, line Y5 represents the sun gear S3 of the first rear planetary gear set 46 which corresponds to the first rotating element RE1, line Y6 represents the carrier CA3 of the first rear planetary gear set 46 and the carrier CA4 of the second rear planetary gear set 48 which are connected together and correspond to the second rotating element RE2, line Y7 represents the ring gear R3 of the first rear planetary gear set 46 and the ring gear R4 of the second rear planetary gear set 48 which are connected together and correspond to the third rotating element RE3, and line Y8 represents the sun gear S4 of the second rear planetary gear set 48 which corresponds to the fourth rotating element RE4. Accordingly, based on these rotating elements, the alignment graph shown in FIG. 78 is similar to that shown in FIG. 14 so a description thereof will be omitted.

In this way, according to the first and second modified examples of the seventh exemplary embodiment, the first transmitting portion 144 includes the single pinion type first front planetary gear set 140 and the double pinion type second front planetary gear set 142. The carrier CA1 of the first front planetary gear set 140 and the sun gear S2 of the second front planetary gear set 142 are always connected to the transmission case 16, which is a non-rotating member, and the sun gear S1 of the first front planetary gear set 140 and the carrier CA2 of the second front planetary gear set 142 are connected to the input shaft 22 which is the input rotating member. Accordingly, the ring gear R2 of the second front planetary gear set 142 functions as the first intermediate output member 32 while the ring gear R1 of the first front planetary gear set 140 functions as the second intermediate output member 34. Accordingly, a practical transmission 138 is able to be provided.

Figure 80:
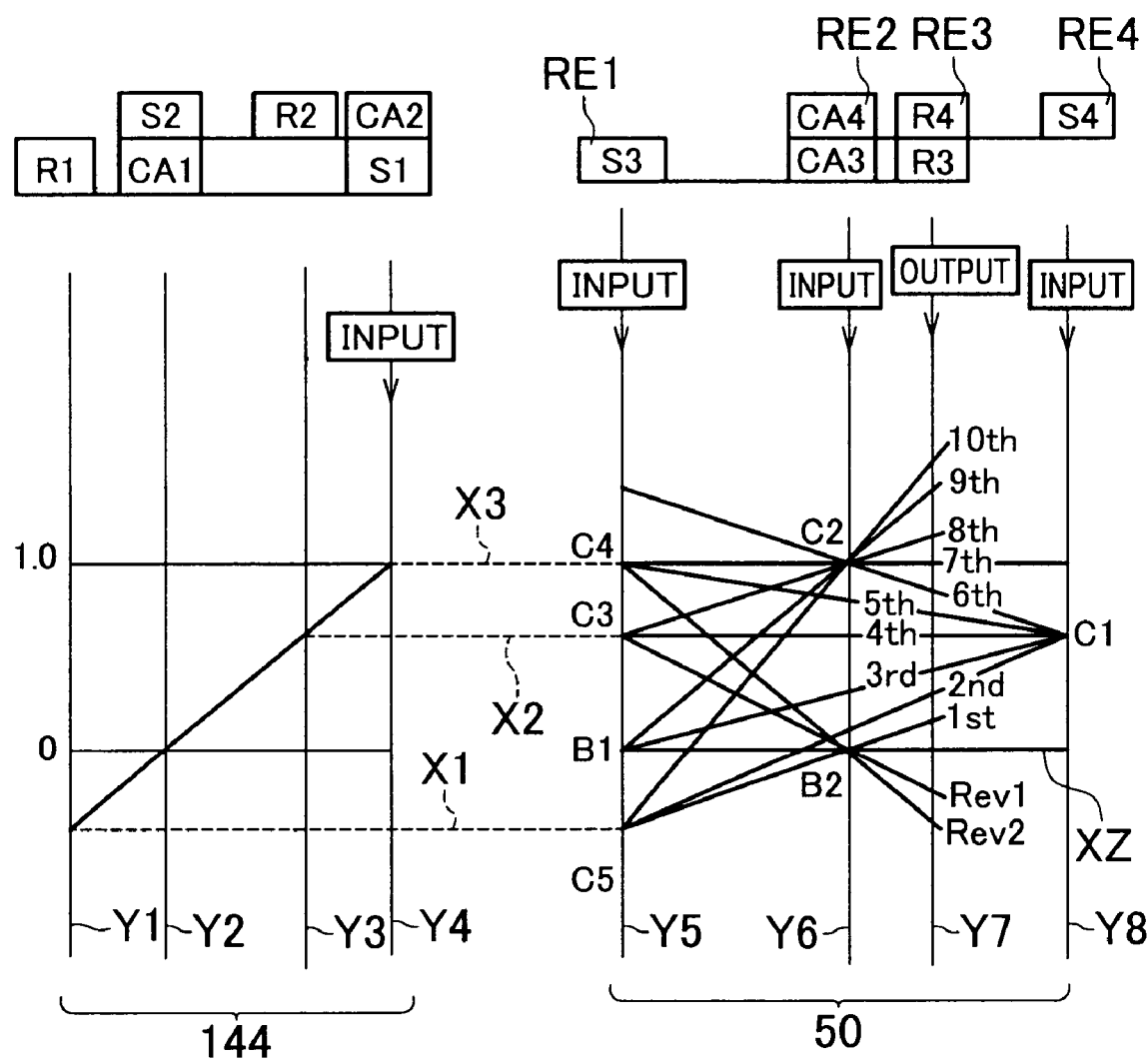
FIG. 80 is an alignment graph which is able to express, with straight lines, the relative relationships between the rotation speeds of various rotating elements which are connected differently in each gear in the transmission according to the third modified example of the seventh exemplary embodiment of the invention.

Here, as a third modified example of the seventh exemplary embodiment, the transmission 138 can achieve ten forward gears and two reverse gears, and effects equivalent to those obtained from the foregoing exemplary embodiment can be obtained, by engaging the clutches and brakes in different combinations, as shown in FIG. 79, in response to a command from the ECU 42, and suitably setting the gear ratio of each planetary gear set. Also, FIG. 80 is an alignment graph corresponding to FIG. 79, which shows the rotation speeds of the rotating elements in each gear. Hereinafter, the clutch and brake engagement chart and alignment graph according to the third modified example of the seventh exemplary embodiment shown in FIGS. 79 and 80, which differ from those of the foregoing exemplary embodiment, will be described.

As shown in the clutch and brake engagement chart in FIG. 79, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 17, so descriptions thereof will be omitted here.

In the alignment graph shown in FIG. 80, the four vertical lines Y1 through Y4 represent components of the first transmitting portion 144. From left to right in the graph, line Y1 represents the ring gear R1 of the first front planetary gear set 140, line Y2 represents the carrier CA1 of the first front planetary gear set 140 and the sun gear S2 of the second front planetary gear set 142 which are connected together, line Y3 represents the ring gear R2 of the second front planetary gear set 142, and line Y4 represents the sun gear S1 of the first front planetary gear set 140 and the carrier CA2 of the second front planetary gear set 142 which are connected together. Further, the four vertical lines Y5 through Y8 represent components of the second transmitting portion 50. From left to right in the graph, line Y5 represents the sun gear S3 of the first rear planetary gear set 46 which corresponds to the first rotating element RE1, line Y6 represents the carrier CA3 of the first rear planetary gear set 46 and the carrier CA4 of the second rear planetary gear set 48 which are connected together and correspond to the second rotating element RE2, line Y7 represents the ring gear R3 of the first rear planetary gear set 46 and the ring gear R4 of the second rear planetary gear set 48 which are connected together and correspond to the third rotating element RE3, and line Y8 represents the sun gear S4 of the second rear planetary gear set 48 which corresponds to the fourth rotating element RE4. Accordingly, based on these rotating elements, the alignment graph shown in FIG. 80 is similar to that shown in FIG. 18 so a description thereof will be omitted.

In this way, according to the third modified example of the seventh exemplary embodiment, it is possible to achieve ten forward gears and two reverse gears, and in particular, to set the step between ninth gear and tenth gear small with a close ratio, by engagement combinations of the clutches and brakes of each gear and suitably setting the gear ratio of each planetary gear set.

Figure 82:
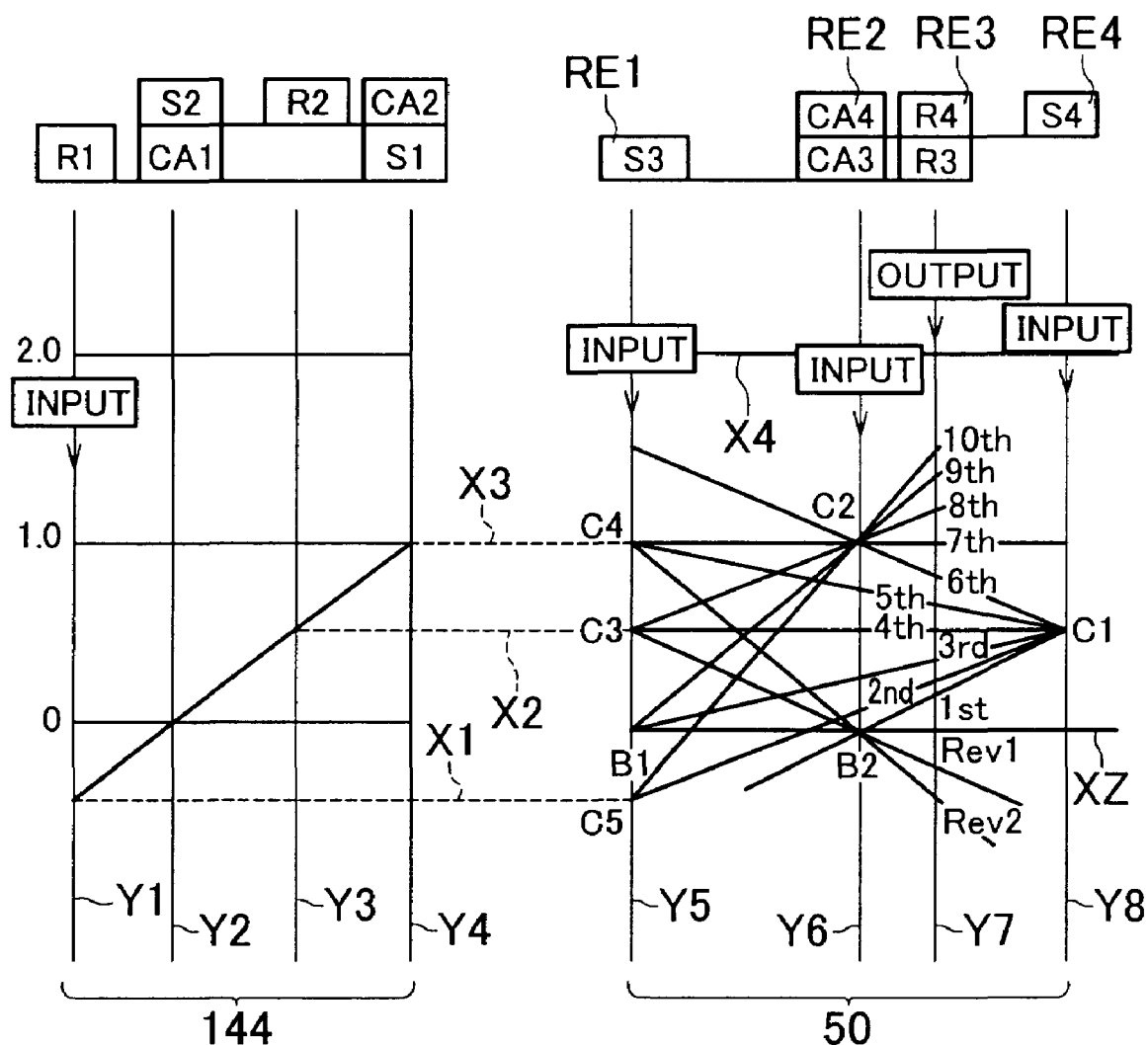
FIG. 82 is an alignment graph which is able to express, with straight lines, the relative relationships between the rotation speeds of various rotating elements which are connected differently in each gear in the transmission according to the fourth modified example of the seventh exemplary embodiment of the invention.

Here, as a fourth modified example of the seventh exemplary embodiment, the transmission 138 can achieve ten forward gears and two reverse gears, and effects equivalent to those obtained from the foregoing exemplary embodiment can be obtained, by engaging the clutches and brakes in different combinations, as shown in FIG. 81, in response to a command from the ECU 42, and suitably setting the gear ratio of each planetary gear set. Also, FIG. 82 is an alignment graph corresponding to FIG. 81, which shows the rotation speeds of the rotating elements in each gear. Hereinafter, the clutch and brake engagement chart and alignment graph according to the fourth modified example of the seventh exemplary embodiment shown in FIGS. 81 and 82, which differ from those of the foregoing exemplary embodiment, will be described.

As shown in the clutch and brake engagement chart in FIG. 81, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

Also, as shown in FIG. 81, the first clutch C1 is engaged to connect the fourth rotating element RE4, i.e., the sun gear S4 of the second rear planetary gear set 48, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first gear which has the largest gear ratio γ1, e.g., approximately 4.596.

Further, the first clutch C1 is engaged to connect the fourth rotating element RE4, i.e., the sun gear S4 of the second rear planetary gear set 48, with the first intermediate output member 32, while the fifth clutch C5 is engaged to connect the first rotating element RE1, i.e., the sun gear S3 of the first rear planetary gear set 46, with the second intermediate output member 34, thereby establishing second gear which has a gear ratio γ2 of approximately 4.088, for example.

Also, the first clutch C1 is engaged to connect the fourth rotating element RE4, i.e., the sun gear S4 of the second rear planetary gear set 48, with the first intermediate output member 32, while the first brake B1 is engaged to hold the first rotating element RE1, i.e., the sun gear S3 of the first rear planetary gear set 46, to the transmission case 16, thereby establishing third gear which has a gear ratio γ3 of approximately 2.724, for example.

Further, the first clutch C1 is engaged to connect the fourth rotating element RE4, i.e., the sun gear S4 of the second rear planetary gear set 48, with the first intermediate output member 32, while the third clutch C3 is engaged to connect the first rotating element RE1, i.e., the sun gear S3 of the first rear planetary gear set 46, with the first intermediate output member 32, thereby establishing fourth gear which has a gear ratio γ4 of approximately 1.863, for example.

Also, the first clutch C1 is engaged to connect the fourth rotating element RE4, i.e., the sun gear S4 of the second rear planetary gear set 48, with the first intermediate output member 32, while the fourth clutch C4 is engaged to connect the first rotating element RE1, i.e., the sun gear S3 of the first rear planetary gear set 46, with the input shaft 22, thereby establishing fifth gear which has a gear ratio γ5 of approximately 1.464, for example.

Further, the first clutch C1 is engaged to connect the fourth rotating element RE4, i.e., the sun gear S4 of the second rear planetary gear set 48, with the first intermediate output member 32, while the second clutch C2 is engaged to connect the second rotating element RE2, i.e., the carrier CA3 of the first rear planetary gear set 46 and the carrier CA4 of the second rear planetary gear set 48 which are connected together, with the input shaft 22, thereby establishing sixth gear which has a gear ratio γ6 of approximately 1.231, for example.

Further, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fourth clutch C4 is engaged to connect the first rotating element RE1, i.e., the sun gear S3 of the first rear planetary gear set 46, with the input shaft 22, thereby establishing seventh gear which has a gear ratio γ7 of approximately 1.000, for example.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the third clutch C3 is engaged to connect the first rotating element RE1, i.e., the sun gear S3 of the first rear planetary gear set 46, with the first intermediate output member 32, thereby establishing eighth gear which has a gear ratio γ8 of approximately 0.824, for example.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the first brake B1 is engaged to hold the first rotating element RE1, i.e., the sun gear S3 of the first rear planetary gear set 46, to the transmission case 16, thereby establishing ninth gear which has a gear ratio γ9 of approximately 0.685, for example.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fifth clutch C5 is engaged to connect the first rotating element RE1, i.e., the sun gear S3 of the first rear planetary gear set 46, with the second intermediate output member 34, thereby establishing tenth gear which has a gear ratio γ10 of approximately 0.611, for example.

Also, the third clutch C3 is engaged to connect the first rotating element RE1, i.e., the sun gear S3 of the first rear planetary gear set 46, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first reverse gear "R1" which has a gear ratio γR1 of approximately 4.056.

Further, the fourth clutch C4 is engaged to connect the first rotating element RE1, i.e., the sun gear S3 of the first rear planetary gear set 46, with the input shaft 22, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing second reverse gear "R2" which has a gear ratio γR2 which is smaller than the gear ratio γR1 of the first reverse gear, e.g., approximately 2.176. The gear ratio ρ1 of the first front planetary gear set 140, the gear ratio ρ2 of the second front planetary gear set 142, the gear ratio ρ3 of the first rear planetary gear set 46, and the gear ratio ρ4 of the second rear planetary gear set 48 are designed so that the foregoing gear ratios can be achieved.

In the transmission 138 that achieves the gears in accordance with the clutch and brake engagement chart shown in FIG. 81, the ratio of the gear ratio γ1 of the first gear to the gear ratio γ3 of the third gear (=γ1/γ3) is 1.688, the ratio of the gear ratio γ2 of the second gear to the gear ratio γ3 of the third gear (=γ2/γ3) is 1.501, the ratio of the gear ratio γ3 of the third gear to the gear ratio γ4 of the fourth gear (=γ3/γ4) is 1.462, the ratio of the gear ratio γ4 of the fourth gear to the gear ratio γ5 of the fifth gear (=γ4/γ5) is 1.273, the ratio of the gear ratio γ5 of the fifth gear to the gear ratio γ6 of the sixth gear (=γ5/γ6) is 1.189, the ratio of the gear ratio γ6 of the sixth gear to the gear ratio γ7 of the seventh gear (=γ6/γ7) is 1.231, the ratio of the gear ratio γ7 of the seventh gear to the gear ratio γ8 of the eighth gear (=γ7/γ8) is 1.213, the ratio of the gear ratio γ8 of the eighth gear to the gear ratio γ9 of the ninth gear (=γ8/γ9) is 1.203, and the ratio of the gear ratio γ9 of the ninth gear to the gear ratio γ10 of the tenth gear (=γ9/γ10) is 1.122. Thus, each gear ratio γ changes in substantially equal ratio. Also, the total gear ratio range, which is the ratio of the gear ratio γ1 of the first gear to the gear ratio γ10 of the tenth gear (=γ1/γ10), is 7.522, which is a relatively large value.

In the alignment graph shown in FIG. 82, the four vertical lines Y1 through Y4 representing components of the first transmitting portion 144 and the four vertical lines Y5 through Y8 representing components of the second transmitting portion 50 represent the same rotating elements as those in FIG. 80 described above because the structure shown in the skeleton view is the same.

In the alignment graph in FIG. 82, in first gear, the second brake B2 is engaged to hold the second rotating element RE2 to the transmission case 16, which results in the rotation speed of the second rotating element RE2 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (1st) where the straight line that connects the point of intersection of the vertical line Y6 and the horizontal line XZ with the point of intersection of the vertical line Y8 and the horizontal line X2, intersects with the vertical line Y7.

In second gear, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y5 and the horizontal line X1 with the point of intersection of the vertical line Y8 and the horizontal line X2, intersects with the vertical line Y7.

In third gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the straight line that connects the point of intersection of the vertical line Y5 and the horizontal line XZ with the point of intersection of the vertical line Y8 and the horizontal line X2, intersects with the vertical line Y7.

In fourth gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the horizontal line X2 intersects with the vertical line Y7.

In fifth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the straight line that connects the point of intersection of the vertical line Y5 and the horizontal line X3 with the point of intersection of the vertical line Y8 and the horizontal line X2, intersects with the vertical line Y7.

In sixth gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (6th) where the straight line that connects the point of intersection of the vertical line Y6 and the horizontal line X3 with the point of intersection of the vertical line Y8 and the horizontal line X2, intersects with the vertical line Y7.

In seventh gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (7th) where the horizontal line X3 intersects with the vertical line Y7.

In eighth gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the straight line that connects the point of intersection of the vertical line Y5 and the horizontal line X2 with the point of intersection of the vertical line Y6 and the horizontal line X3, intersects with the vertical line Y7.

In ninth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line XZ with the point of intersection of the vertical line Y6 and the horizontal line X3, intersects with the vertical line Y7.

In tenth gear, the fifth clutch C5 is engaged to connect the first rotating element RE1 to the second intermediate output member 34, resulting in the first rotating element RE1 rotating at the same speed as the second intermediate output member 34. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (10th) where the straight line that connects the point of intersection of the vertical line Y5 and the horizontal line X1 with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to the fourth modified example of the seventh exemplary embodiment, it is possible to obtain a transmission 138 which can establish ten forward gears and two reverse gears, and in which the steps of the gears are relatively close ratios, by engagement combinations of the clutches and brakes of each gear, such as those described above, and suitably setting the gear ratio of each planetary gear set.

Further, when the idle speed of the engine is increased, such as when the engine is cold or when running on a low friction road where it is desirable to reduce the driving force at take-off, for example, adverse effects such as an increase in creeping force or a lurching feeling at take-off occur in first gear which is a low gear. Thus, by setting second gear to a gear ratio which enables creeping force to be optimized, as in this exemplary embodiment, and selectively having the vehicle take off from second gear, it is possible to suppress vehicle lurch and slip during take-off.

Figure 84:
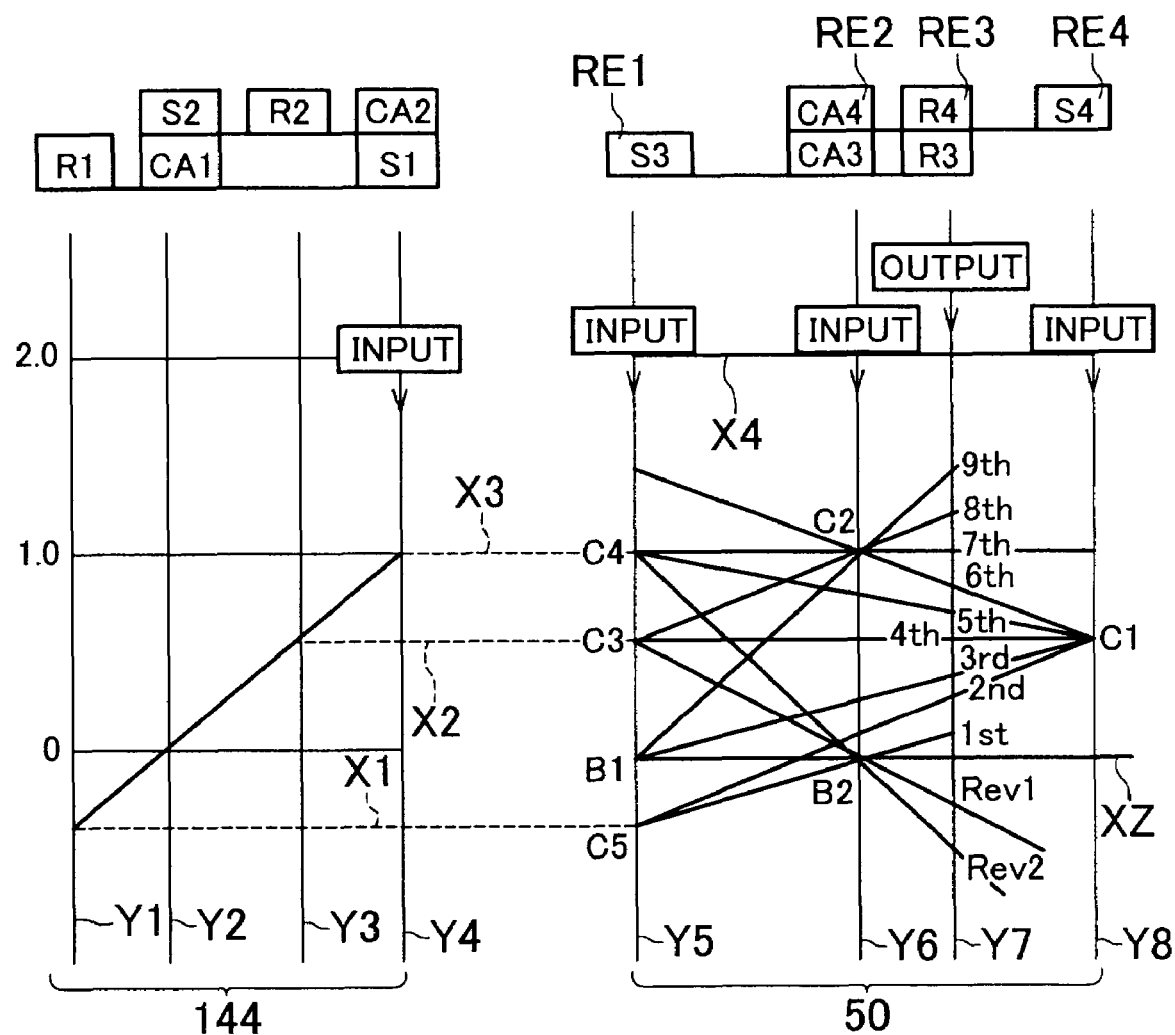
FIG. 84 is an alignment graph which is able to express, with straight lines, the relative relationships between the rotation speeds of various rotating elements which are connected differently in each gear in the transmission according to the fifth modified example of the seventh exemplary embodiment of the invention.

Here, as a fifth modified example of the seventh exemplary embodiment, the transmission 138 can achieve nine forward gears and two reverse gears, and effects equivalent to those obtained from the foregoing exemplary embodiment can be obtained, by engaging the clutches and brakes in different combinations, as shown in FIG. 83, in response to a command from the ECU 42, and suitably setting the gear ratio of each planetary gear set. Also, FIG. 84 is an alignment graph corresponding to FIG. 83, which shows the rotation speeds of the rotating elements in each gear. Hereinafter, the clutch and brake engagement chart and alignment graph according to the fifth modified example of the seventh exemplary embodiment shown in FIGS. 83 and 84, which differ from those of the foregoing exemplary embodiment, will be described.

As shown in the clutch and brake engagement chart in FIG. 83, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 23, so descriptions thereof will be omitted here.

In the alignment graph shown in FIG. 84, the four vertical lines Y1 through Y4 representing components of the first transmitting portion 144 and the four vertical lines Y5 through Y8 representing components of the second transmitting portion 50 represent the same rotating elements as those in FIG. 80 described above because the structure shown in the skeleton view is the same. Also, in the clutch and brake engagement chart shown in FIG. 83, the operations of the friction engagement devices for establishing first gear "1st" through ninth gear "9th" are the same as those described above using FIG. 23. Therefore, based on the rotating elements, the alignment graph also corresponds to these. Thus, the alignment graph shown in FIG. 84 is the same as the alignment graph shown in FIG. 24.

Thus, according to this fifth modified example of the seventh exemplary embodiment as well, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

Figure 86:
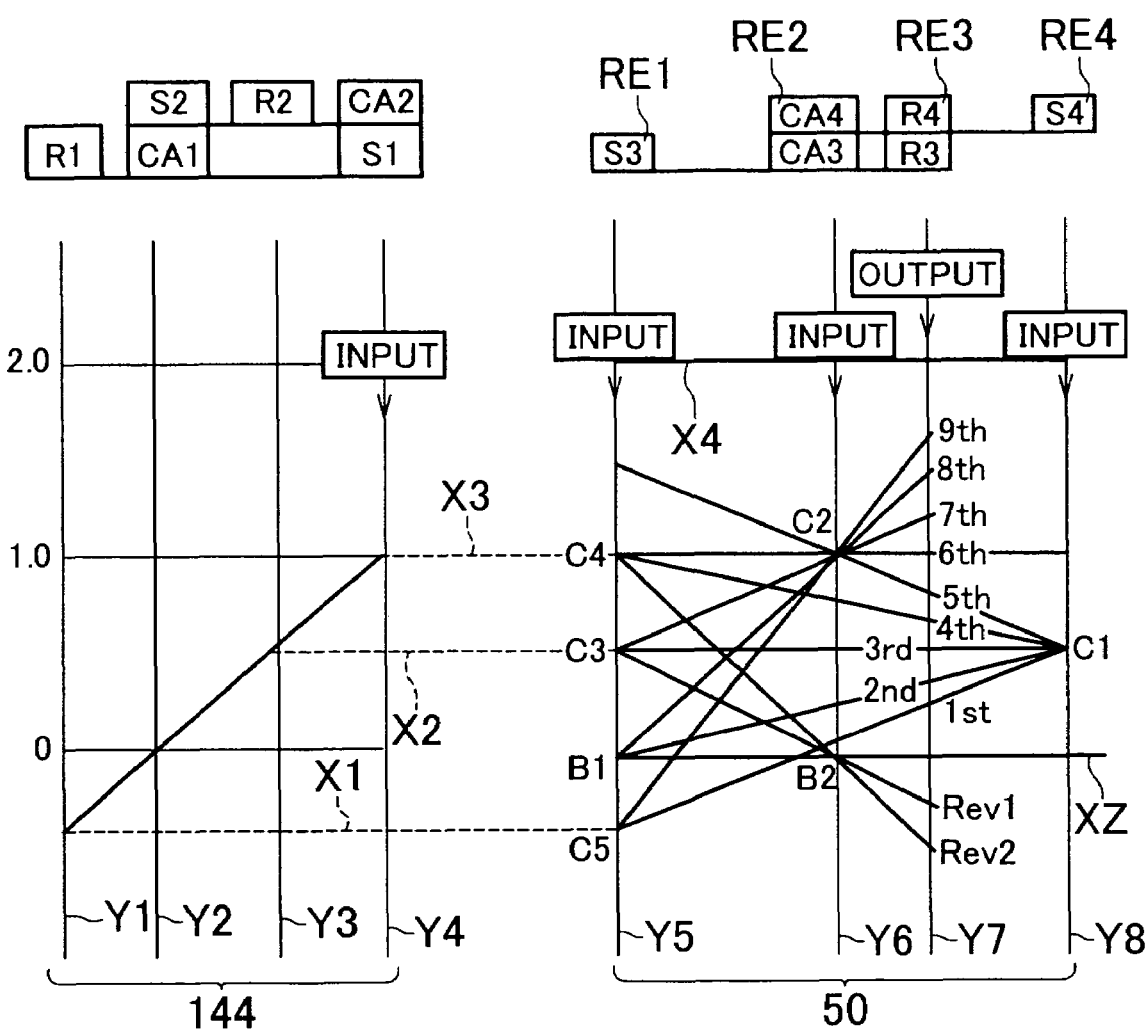
FIG. 86 is an alignment graph which is able to express, with straight lines, the relative relationships between the rotation speeds of various rotating elements which are connected differently in each gear in the transmission according to the sixth modified example of the seventh exemplary embodiment of the invention.

Here, as a sixth modified example of the seventh exemplary embodiment, the transmission 138 can achieve nine forward gears and two reverse gears by engaging the clutches and brakes in different combinations, as shown in FIG. 85, in response to a command from the ECU 42, and suitably setting the gear ratio of each planetary gear set. Also, FIG. 86 is an alignment graph corresponding to FIG. 85, which shows the rotation speeds of the rotating elements in each gear. Hereinafter, the clutch and brake engagement chart and alignment graph according to the sixth modified example of the seventh exemplary embodiment shown in FIGS. 85 and 86, which differ from those of the foregoing exemplary embodiment, will be described.

As shown in the clutch and brake engagement chart in FIG. 85, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 25, so descriptions thereof will be omitted here.

In the alignment graph shown in FIG. 86, the four vertical lines Y1 through Y4 representing components of the first transmitting portion 144 and the four vertical lines Y5 through Y8 representing components of the second transmitting portion 50 represent the same rotating elements as those in FIG. 80 described above because the structure shown in the skeleton view is the same. Also, in the clutch and brake engagement chart shown in FIG. 85, the operations of the friction engagement devices for establishing first gear "1st" through ninth gear "9th" are the same as those described above using FIG. 25. Therefore, based on the rotating elements, the alignment graph also corresponds to these. Thus, the alignment graph shown in FIG. 86 is the same as the alignment graph shown in FIG. 26.

Thus, according to this sixth modified example of the seventh exemplary embodiment as well, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

Figure 88:
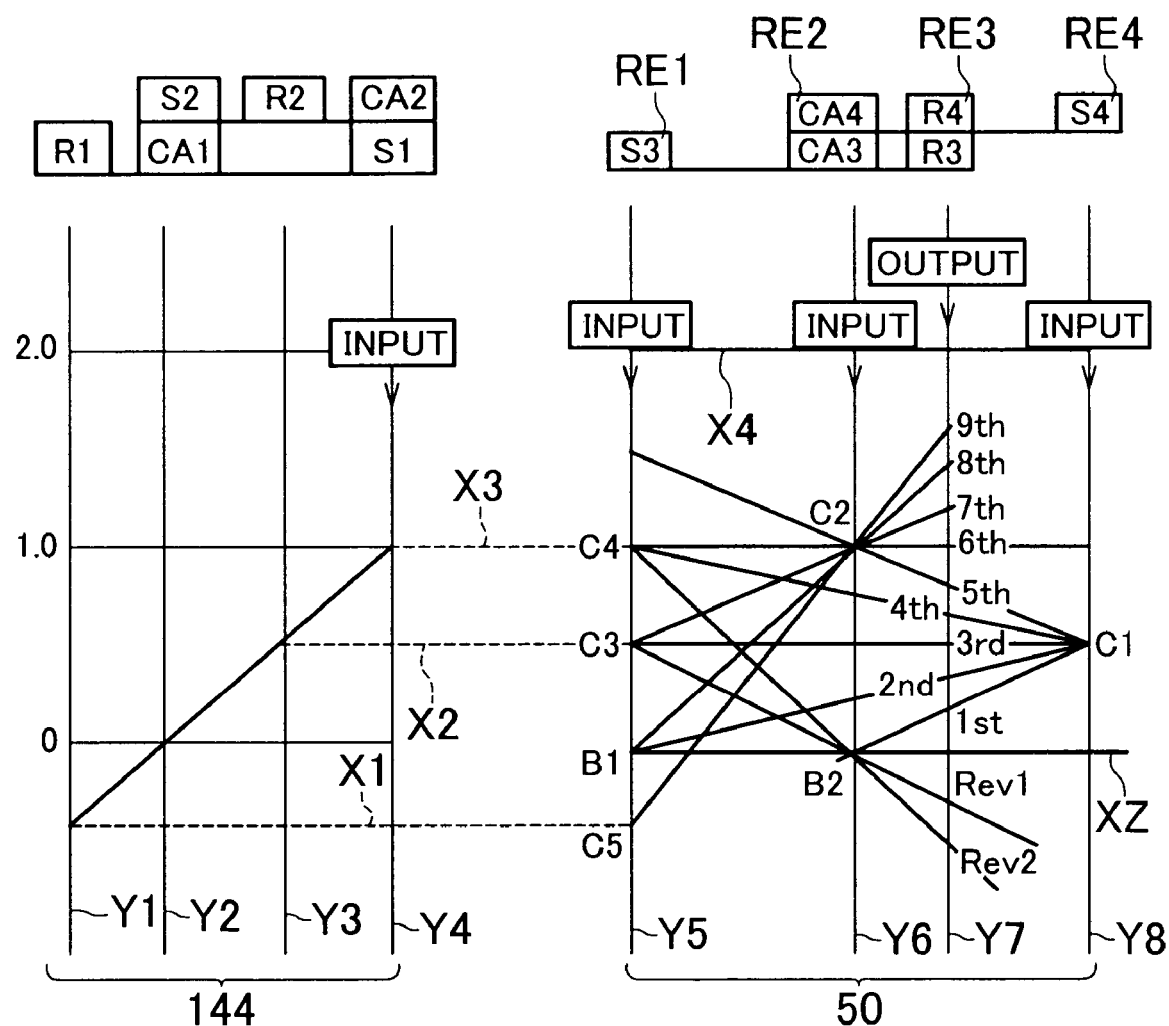
FIG. 88 is an alignment graph which is able to express, with straight lines, the relative relationships between the rotation speeds of various rotating elements which are connected differently in each gear in the transmission according to the seventh modified example of the seventh exemplary embodiment of the invention.

Here, as a seventh modified example of the seventh exemplary embodiment, the transmission 138 can achieve nine forward gears and two reverse gears by engaging the clutches and brakes in different combinations, as shown in FIG. 87, in response to a command from the ECU 42, and suitably setting the gear ratio of each planetary gear set. Also, FIG. 88 is an alignment graph corresponding to FIG. 87, which shows the rotation speeds of the rotating elements in each gear. Hereinafter, the clutch and brake engagement chart and alignment graph according to the seventh modified example of the seventh exemplary embodiment shown in FIGS. 87 and 88, which differ from those of the foregoing exemplary embodiment, will be described.

As shown in the clutch and brake engagement chart in FIG. 87, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 87, the first clutch C1 is engaged to connect the fourth rotating element RE4, i.e., the sun gear S4 of the second rear planetary gear set 48, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first gear which has the largest gear ratio γ1, e.g., approximately 4.596.

Also, the first clutch C1 is engaged to connect the fourth rotating element RE4, i.e., the sun gear S4 of the second rear planetary gear set 48, with the first intermediate output member 32, while the first brake B1 is engaged to hold the first rotating element RE1, i.e., the sun gear S3 of the first rear planetary gear set 46, to the transmission case 16, thereby establishing second gear which has a gear ratio γ2 of approximately 2.724, for example.

Further, the first clutch C1 is engaged to connect the fourth rotating element RE4, i.e., the sun gear S4 of the second rear planetary gear set 48, with the first intermediate output member 32, while the third clutch C3 is engaged to connect the first rotating element RE1, i.e., the sun gear S3 of the first rear planetary gear set 46, with the first intermediate output member 32, thereby establishing third gear which has a gear ratio γ3 of approximately 1.863, for example.

Also, the first clutch C1 is engaged to connect the fourth rotating element RE4, i.e., the sun gear S4 of the second rear planetary gear set 48, with the first intermediate output member 32, while the fourth clutch C4 is engaged to connect the first rotating element RE1, i.e., the sun gear S3 of the first rear planetary gear set 46, with the input shaft 22, thereby establishing fourth gear which has a gear ratio γ4 of approximately 1.464, for example.

Further, the first clutch C1 is engaged to connect the fourth rotating element RE4, i.e., the sun gear S4 of the second rear planetary gear set 48, with the first intermediate output member 32, while the second clutch C2 is engaged to connect the second rotating element RE2, i.e., the carrier CA3 of the first rear planetary gear set 46 and the carrier CA4 of the second rear planetary gear set 48 which are connected together, with the input shaft 22, thereby establishing fifth gear which has a gear ratio γ5 of approximately 1.231, for example.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fourth clutch C4 is engaged to connect the first rotating element RE1, i.e., the sun gear S3 of the first rear planetary gear set 46, with the input shaft 22, thereby establishing sixth gear which has a gear ratio γ6 of approximately 1.000, for example.

Further, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the third clutch C3 is engaged to connect the first rotating element RE1, i.e., the sun gear S3 of the first rear planetary gear set 46, with the first intermediate output member 32, thereby establishing seventh gear which has a gear ratio γ7 of approximately 0.824, for example.

Further, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the first brake B1 is engaged to hold the first rotating element RE1, i.e., the sun gear S3 of the first rear planetary gear set 46, to the transmission case 16, thereby establishing eighth gear which has a gear ratio γ8 of approximately 0.685, for example.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fifth clutch C5 is engaged to connect the first rotating element RE1, i.e., the sun gear S3 of the first rear planetary gear set 46, with the second intermediate output member 34, thereby establishing ninth gear which a gear ratio γ9 of approximately 0.598, for example.

Also, the third clutch C3 is engaged to connect the first rotating element RE1, i.e., the sun gear S3 of the first rear planetary gear set 46, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first reverse gear "R1" which has a gear ratio γR1 of approximately 4.056.

Further, the fourth clutch C4 is engaged to connect the first rotating element RE1, i.e., the sun gear S3 of the first rear planetary gear set 46, with the input shaft 22, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing second reverse gear "R2" which has a gear ratio γR2 which is smaller than the gear ratio γR1 of the first reverse gear, e.g., 2.176. The gear ratio ρ1 of the first front planetary gear set 140, the gear ratio ρ2 of the second front planetary gear set 142, the gear ratio ρ3 of the first rear planetary gear set 46, and the gear ratio ρ4 of the second rear planetary gear set 48 are designed so that the foregoing gear ratios can be achieved.

In the transmission 138 that achieves the gears in accordance with the clutch and brake engagement chart shown in FIG. 87, the ratio of the gear ratio γ1 of the first gear to the gear ratio γ2 of the second gear (=γ1/γ2) is 1.688, the ratio of the gear ratio γ2 of the second gear to the gear ratio γ3 of the third gear (=γ2/γ3) is 1.462, the ratio of the gear ratio γ3 of the third gear to the gear ratio γ4 of the fourth gear (=γ3/γ4) is 1.273, the ratio of the gear ratio γ4 of the fourth gear to the gear ratio γ5 of the fifth gear (=γ4/γ5) is 1.189, the ratio of the gear ratio γ5 of the fifth gear to the gear ratio γ6 of the sixth gear (=γ5/γ6) is 1.231, the ratio of the gear ratio γ6 of the sixth gear to the gear ratio γ7 of the seventh gear (=γ6/γ7) is 1.213, the ratio of the gear ratio γ7 of the seventh gear to the gear ratio γ8 of the eighth gear (=γ7/γ8) is 1.203, and the ratio of the gear ratio γ8 of the eighth gear to the gear ratio γ9 of the ninth gear (=γ8/γ9) is 1.146. Thus, each gear ratio γ changes in substantially equal ratio. Also, the total gear ratio range, which is the ratio of the gear ratio γ1 of the first gear to the gear ratio γ9 of the ninth gear (=γ1/γ9), is 7.686, which is a relatively large value.

In the alignment graph shown in FIG. 88, the four vertical lines Y1 through Y4 representing components of the first transmitting portion 144 and the four vertical lines Y5 through Y8 representing components of the second transmitting portion 50 represent the same rotating elements as those in FIG. 80 described above because the structure shown in the skeleton view is the same.

In the alignment graph in FIG. 88, in first gear, the second brake B2 is engaged to hold the second rotating element RE2 to the transmission case 16, which results in the rotation speed of the second rotating element RE2 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (1st) where the straight line that connects the point of intersection of the vertical line Y6 and the horizontal line XZ with the point of intersection of the vertical line Y8 and the horizontal line X2, intersects with the vertical line Y7.

In second gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y5 and the horizontal line XZ with the point of intersection of the vertical line Y8 and the horizontal line X2, intersects with the vertical line Y7.

In third gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the horizontal line X2 intersects with the vertical line Y7.

In fourth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the straight line that connects the point of intersection of the vertical line Y5 and the horizontal line X3 with the point of intersection of the vertical line Y8 and the horizontal line X2, intersects with the vertical line Y7.

In fifth gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the straight line that connects the point of intersection of the vertical line Y6 and the horizontal line X3 with the point of intersection of the vertical line Y8 and the horizontal line X2, intersects with the vertical line Y7.

In sixth gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (6th) where the horizontal line X3 intersects with the vertical line Y7.

In seventh gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (7th) where the straight line that connects the point of intersection of the vertical line Y5 and the horizontal line X2 with the point of intersection of the vertical line Y6 and the horizontal line X3, intersects with the vertical line Y7.

In eighth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the straight line that connects the point of intersection of the vertical line Y5 and the horizontal line XZ with the point of intersection of the vertical line Y6 and the horizontal line X3, intersects with the vertical line Y7.

In ninth gear, the fifth clutch C5 is engaged to connect the first rotating element RE1 to the second intermediate output member 34, resulting in the first rotating element RE1 rotating at the same speed as the second intermediate output member 34. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line X1 with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to the seventh modified example of the seventh exemplary embodiment, it is possible to obtain a transmission 138 which can establish nine forward gears and two reverse gears, and in which the steps of the gears are relatively close ratios, by engagement combinations of the clutches and brakes of each gear, such as those described above, and suitably setting the gear ratio of each planetary gear set.

Figure 90:
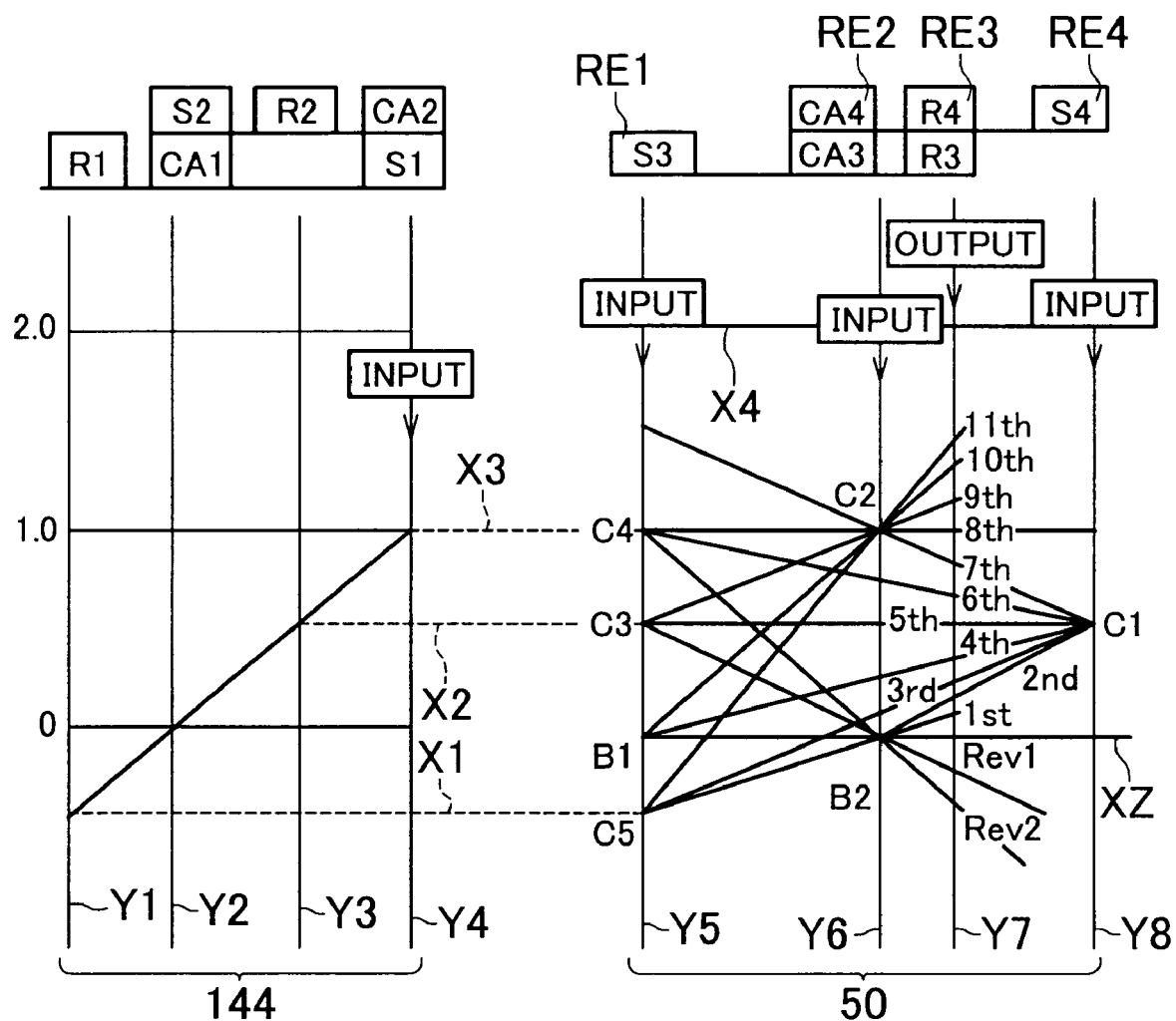
FIG. 90 is an alignment graph which is able to express, with straight lines, the relative relationships between the rotation speeds of various rotating elements which are connected differently in each gear in the transmission according to the eighth modified example of the seventh exemplary embodiment of the invention.

Here, as an eighth modified example of the seventh exemplary embodiment, the transmission 138 can achieve eleven forward gears and two reverse gears by engaging the clutches and brakes in different combinations, as shown in FIG. 89, in response to a command from the ECU 42, and suitably setting the gear ratio of each planetary gear set. Also, FIG. 90 is an alignment graph corresponding to FIG. 89, which shows the rotation speeds of the rotating elements in each gear. Hereinafter, the clutch and brake engagement chart and alignment graph according to the eighth modified example of the seventh exemplary embodiment shown in FIGS. 89 and 90, which differ from those of the foregoing exemplary embodiment, will be described.

As shown in the clutch and brake engagement chart in FIG. 89, any one of eleven forward gears, i.e., a first gear "1st" through an eleventh gear "11th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 89, the fifth clutch C5 is engaged to connect the first rotating element RE1, i.e., the sun gear S3 of the first rear planetary gear set 46, with the second intermediate output member 34, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first gear which has the largest gear ratio γ1, e.g., approximately 5.298.

Also, the first clutch C1 is engaged to connect the fourth rotating element RE4, i.e., the sun gear S4 of the second rear planetary gear set 48, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing second gear which has a gear ratio γ2 of approximately 3.841, for example.

Further, the first clutch C1 is engaged to connect the fourth rotating element RE4, i.e., the sun gear S4 of the second rear planetary gear set 48, with the first intermediate output member 32, while the fifth clutch C5 is engaged to connect the first rotating element RE1, i.e., the sun gear S3 of the first rear planetary gear set 46, with the second intermediate output member 34, thereby establishing third gear which has a gear ratio γ3 of approximately 3.233, for example.

Also, the first clutch C1 is engaged to connect the fourth rotating element RE4, i.e., the sun gear S4 of the second rear planetary gear set 48, with the first intermediate output member 32, while the first brake B1 is engaged to hold the first rotating element RE1, i.e., the sun gear S3 of the first rear planetary gear set 46, to the transmission case 16, thereby establishing fourth gear which has a gear ratio γ4 of approximately 2.280, for example.

Further, the first clutch C1 is engaged to connect the fourth rotating element RE4, i.e., the sun gear S4 of the second rear planetary gear set 48, with the first intermediate output member 32, while the third clutch C3 is engaged to connect the first rotating element RE1, i.e., the sun gear S3 of the first rear planetary gear set 46, with the first intermediate output member 32, thereby establishing fifth gear which has a gear ratio γ5 of approximately 1.714, for example.

Also, the first clutch C1 is engaged to connect the fourth rotating element RE4, i.e., the sun gear S4 of the second rear planetary gear set 48, with the first intermediate output member 32, while the fourth clutch C4 is engaged to connect the first rotating element RE1, i.e., the sun gear S3 of the first rear planetary gear set 46, with the input shaft 22, thereby establishing sixth gear which has a gear ratio γ6 of approximately 1.456, for example.

Further, the first clutch C1 is engaged to connect the fourth rotating element RE4, i.e., the sun gear S4 of the second rear planetary gear set 48, with the first intermediate output member 32, while the second clutch C2 is engaged to connect the second rotating element RE2, i.e., the carrier CA3 of the first rear planetary gear set 46 and the carrier CA4 of the second rear planetary gear set 48 which are connected together, with the input shaft 22, thereby establishing seventh gear which has a gear ratio γ7 of approximately 1.228, for example.

Further, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fourth clutch C4 is engaged to connect the first rotating element RE1, i.e., the sun gear S3 of the first rear planetary gear set 46, with the input shaft 22, thereby establishing eighth gear which has a gear ratio γ8 of approximately 1.000, for example.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the third clutch C3 is engaged to connect the first rotating element RE1, i.e., the sun gear S3 of the first rear planetary gear set 46, with the first intermediate output member 32, thereby establishing ninth gear which has a gear ratio γ9 of approximately 0.869, for example.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the first brake B1 is engaged to hold the first rotating element RE1, i.e., the sun gear S3 of the first rear planetary gear set 46, to the transmission case 16, thereby establishing tenth gear which has a gear ratio γ10 of approximately 0.734, for example.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fifth clutch C5 is engaged to connect the first rotating element RE1, i.e., the sun gear S3 of the first rear planetary gear set 46, with the second intermediate output member 34, thereby establishing eleventh gear which has a gear ratio γ11 of approximately 0.645, for example.

Also, the third clutch C3 is engaged to connect the first rotating element RE1, i.e., the sun gear S3 of the first rear planetary gear set 46, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first reverse gear "R1" which has a gear ratio γR1 of approximately 10.194.

Further, the fourth clutch C4 is engaged to connect the first rotating element RE1, i.e., the sun gear S3 of the first rear planetary gear set 46, with the input shaft 22, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing second reverse gear "R2" which has a gear ratio γR2 which is smaller than the gear ratio γR1 of the first reverse gear, e.g., 5.375. The gear ratio ρ1 of the first front planetary gear set 140, the gear ratio ρ2 of the second front planetary gear set 142, the gear ratio ρ3 of the first rear planetary gear set 46, and the gear ratio ρ4 of the second rear planetary gear set 48 are designed so that the foregoing gear ratios can be achieved.

In the transmission 138 that achieves the gears in accordance with the clutch and brake engagement chart shown in FIG. 89, the ratio of the gear ratio γ1 of the first gear to the gear ratio γ3 of the third gear (=γ1/γ3) is 1.639, the ratio of the gear ratio γ2 of the second gear to the gear ratio γ4 of the fourth gear (=γ2/γ4) is 1.685, the ratio of the gear ratio γ3 of the third gear to the gear ratio γ4 of the fourth gear (=γ3/γ4) is 1.418, the ratio of the gear ratio γ4 of the fourth gear to the gear ratio γ5 of the fifth gear (=γ4/γ5) is 1.330, the ratio of the gear ratio γ5 of the fifth gear to the gear ratio γ6 of the sixth gear (=γ5/γ6) is 1.177, the ratio of the gear ratio γ6 of the sixth gear to the gear ratio γ7 of the seventh gear (=γ6/γ7) is 1.185, the ratio of the gear ratio γ7 of the seventh gear to the gear ratio γ8 of the eighth gear (=γ7/γ8) is 1.228, the ratio of the gear ratio γ8 of the eighth gear to the gear ratio γ9 of the ninth gear (=γ8/γ9) is 1.151, the ratio of the gear ratio γ9 of the ninth gear to the gear ratio γ10 of the tenth gear (=γ9/γ10) is 1.184, and the ratio of the gear ratio γ10 of the tenth gear to the gear ratio γ11 of the eleventh gear (=γ10/γ11) is 1.139. Thus, each gear ratio γ changes in substantially equal ratio. Also, the total gear ratio range, which is the ratio of the gear ratio γ1 of the first gear to the gear ratio γ11 of the eleventh gear (=γ1/γ11), is 8.214.

In the alignment graph shown in FIG. 90, the four vertical lines Y1 through Y4 representing components of the first transmitting portion 144 and the four vertical lines Y5 through Y8 representing components of the second transmitting portion 50 represent the same rotating elements as those in FIG. 80 described above because the structure shown in the skeleton view is the same.

In the alignment graph in FIG. 90, in first gear, the fifth clutch C5 is engaged to connect the first rotating element RE1 to the second intermediate output member 34, which results in the first rotating element RE1 rotating at the same speed as the second intermediate output member 34. Meanwhile, the second brake B2 is engaged to hold the second rotating element RE2 to the transmission case 16, which is a non-rotating member, which results in the rotation speed of the second rotating element RE2 being "0". Accordingly, the rotation speed of the output shaft 36 is indicated by the point (1st) where the straight line that connects the point of intersection of the vertical line Y5 and the horizontal line X1 with the point of intersection of the vertical line Y6 and the horizontal line XZ, intersects with the vertical line Y7.

In second gear, the second brake B2 is engaged to hold the second rotating element RE2 to the transmission case 16, which results in the rotation speed of the second rotating element RE2 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y6 and the horizontal line XZ with the point of intersection of the vertical line Y8 and the horizontal line X2, intersects with the vertical line Y7.

In third gear, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the straight line that connects the point of intersection of the vertical line Y5 and the horizontal line X1 with the point of intersection of the vertical line Y8 and the horizontal line X2, intersects with the vertical line Y7.

In fourth gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the straight line that connects the point of intersection of the vertical line Y5 and the horizontal line XZ with the point of intersection of the vertical line Y8 and the horizontal line X2, intersects with the vertical line Y7.

In fifth gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the horizontal line X2 intersects with the vertical line Y7.

In sixth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (6th) where the straight line that connects the point of intersection of the vertical line Y5 and the horizontal line X3 with the point of intersection of the vertical line Y8 and the horizontal line X2, intersects with the vertical line Y7.

In seventh gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (7th) where the straight line that connects the point of intersection of the vertical line Y6 and the horizontal line X3 with the point of intersection of the vertical line Y8 and the horizontal line X2, intersects with the vertical line Y7.

In eighth gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the horizontal line X3 intersects with the vertical line Y7.

In ninth gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line X2 with the point of intersection of the vertical line Y6 and the horizontal line X3, intersects with the vertical line Y7.

In tenth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (10th) where the straight line that connects the point of intersection of the vertical line Y5 and the horizontal line XZ with the point of intersection of the vertical line Y6 and the horizontal line X3, intersects with the vertical line Y7.

In eleventh gear, the fifth clutch C5 is engaged to connect the first rotating element RE1 to the second intermediate output member 34, resulting in the first rotating element RE1 rotating at the same speed as the second intermediate output member 34. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (11th) where the straight line that connects the point of intersection of the vertical line Y5 and the horizontal line X1 with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to the eighth modified example of the seventh exemplary embodiment, it is possible to obtain a transmission 138 which can establish eleven forward gears and two reverse gears, and in which the steps of the gears are relatively close ratios, by engagement combinations of the clutches and brakes of each gear, such as those described above, and suitably setting the gear ratio of each planetary gear set.

Moreover, according to the eighth modified example of the seventh exemplary embodiment, the step between first gear and third gear and the step between second gear and fourth gear are able to be set with good balance, which enables these skip shifts to be used appropriately according to the situation. For example, in a sport mode where power performance is required, the skip shift from first gear to third gear can be used. When it is desirable to suppress the creep characteristic, on the other hand, the skip shift from second gear to fourth gear can be used.

Figure 91:
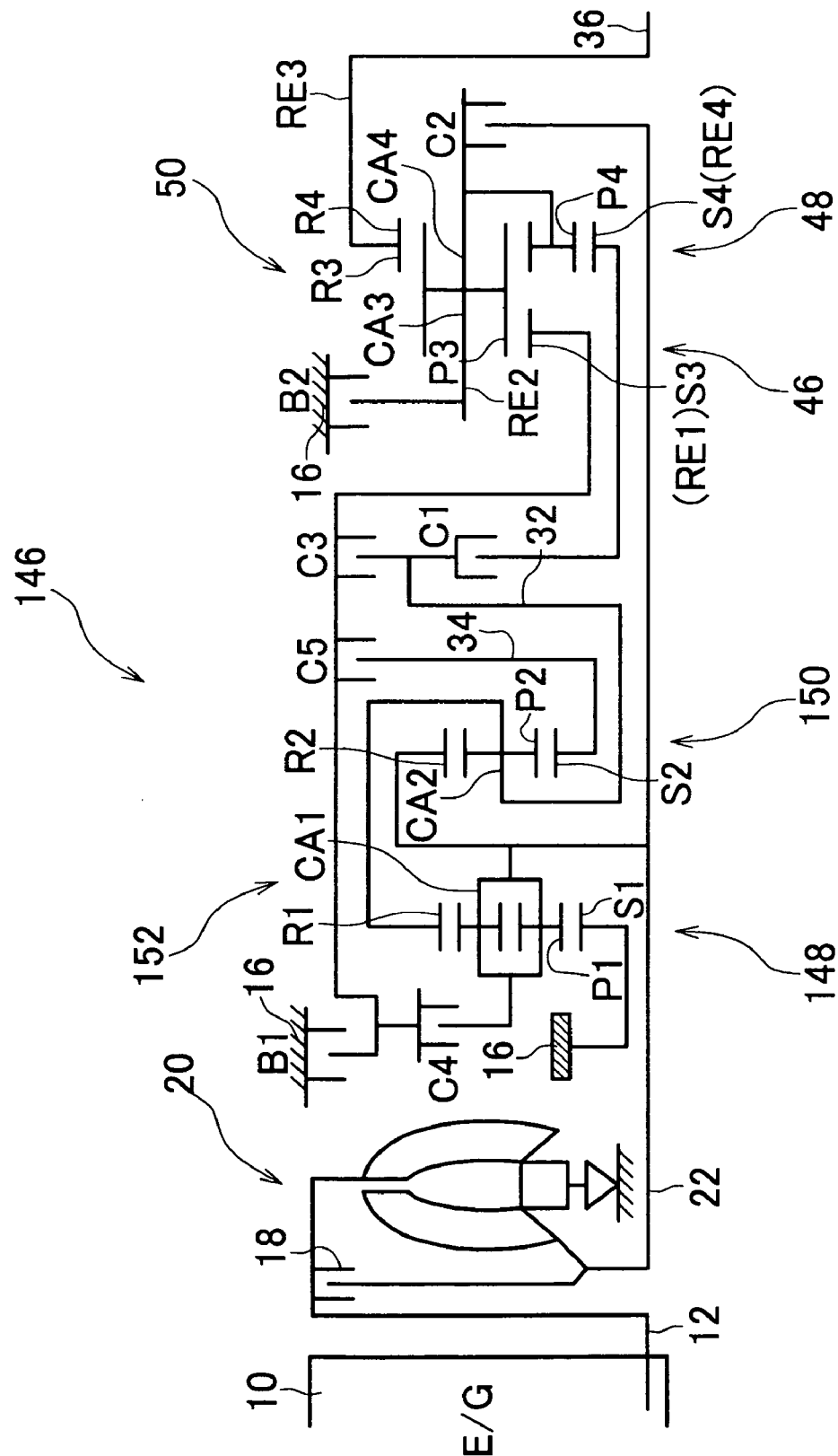
FIG. 91 is a skeleton view of the structure of a multi-speed transmission for a vehicle according to an eighth exemplary embodiment of the invention.
Figure 94:
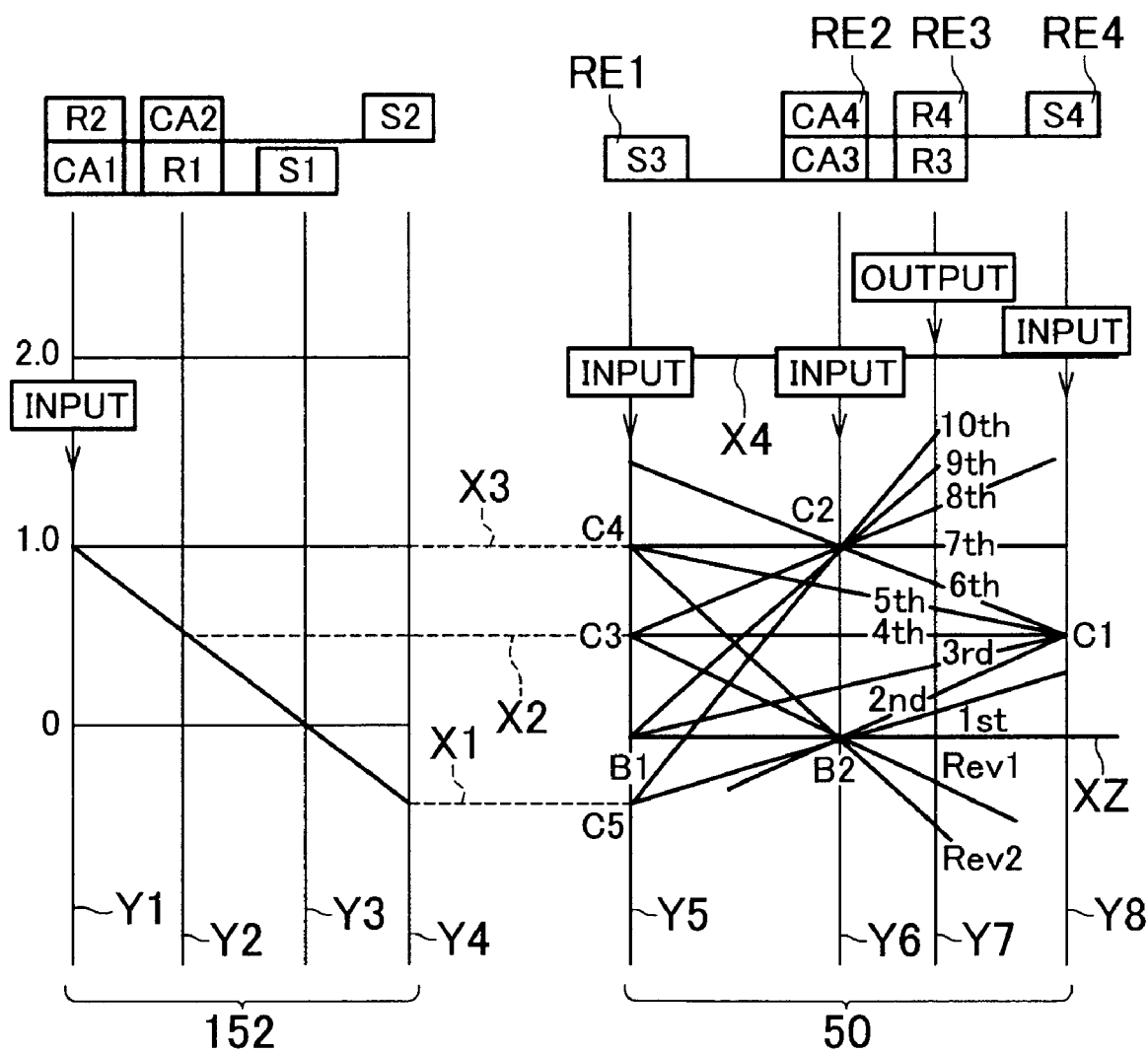
FIG. 94 is an alignment graph which is able to express, with straight lines, the relative relationships between the rotation speeds of various rotating elements which are connected differently in each gear in the transmission according to the eighth exemplary embodiment and the transmission according to the first modified example of the eighth exemplary embodiment of the invention.

FIG. 91 is a skeleton view of the structure of a transmission 146 according to an eighth exemplary embodiment of the invention. FIG. 92 is a chart showing the relationship between gears and operations of friction engagement devices necessary to establish those gears in the transmission 146. FIG. 94 is an alignment graph showing the rotation speeds of rotating elements in each gear. With the exception of the structure of a first transmitting portion 152, the transmission 146 of this exemplary embodiment is similar in structure to the transmission 44 shown in FIG. 5, so effects equivalent to those obtained from the foregoing exemplary embodiment can be obtained with this exemplary embodiment. Hereinafter, parts of the transmission 146 of this exemplary embodiment which differ from parts of the transmission 44 will be described.

As shown in FIG. 91, a first front planetary gear set 148 which makes up part of the first transmitting portion 152 is a double pinion type planetary gear set which includes a sun gear S1, a plurality of sets of pinions P1 which are in mesh with each other, a carrier CA1 which rotatably and revolvably supports the pinions P1, and a ring gear R1 that is in mesh with the sun gear S1 via the pinions P1. A second front planetary gear set 150 which also makes up part of the first transmitting portion 152 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2.

In the first transmitting portion 152, the sun gear S1 of the first front planetary gear set 148 is integrally connected to the transmission case 16 which is a non-rotating member, thus preventing relative rotation with respect to the transmission case 16. Also, the carrier CA1 of the first front planetary gear set 148 and the ring gear R2 of the second front planetary gear set 150 are connected together as well as integrally connected to the input shaft 22 which is the input rotating member. Also, the ring gear R1 of the first front planetary gear set 148 and the carrier CA2 of the second front planetary gear set 150 are connected together as well as integrally connected to the first intermediate output member 32. Further, the sun gear S2 of the second front planetary gear set 150 is integrally connected to the second intermediate output member 34. This kind of structure results in the first transmitting portion 152 slowing down the rotation from the input shaft 22 and transmitting that slowed rotation to the second transmitting portion 50 via the first intermediate output member 32, and reversing the rotation from the input shaft 22 and transmitting that reverse rotation to the second transmitting portion 50 via the second intermediate output member 34.

In the transmission 146 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 92, for example, in response to a command from the ECU 42, and a gear ratio γ (=input shaft rotation speed NIN/output shaft rotation speed NOUT) that changes in substantially equal ratio is able to be achieved for each gear.

In the transmission 146 that achieves the gears in accordance with the clutch and brake engagement chart shown in FIG. 92, the gear ratio γ1 of first gear is approximately 4.762, the gear ratio γ2 of second gear is approximately 4.110, the gear ratio γ3 of third gear is approximately 2.603, the gear ratio γ4 of fourth gear is approximately 2.000, the gear ratio γ5 of fifth gear is approximately 1.624, the gear ratio γ6 of sixth gear is approximately 1.322, the gear ratio γ7 of seventh gear is approximately 1.000, the gear ratio γ8 of eighth gear is approximately 0.833, the gear ratio γ9 of ninth gear is approximately 0.714, the gear ratio γ10 of tenth gear is approximately 0.621, the gear ratio γR1 of first reverse gear is approximately 5.000, and the gear ratio γR2 of second reverse gear is approximately 2.500. Further, the ratio of the gear ratio γ1 of the first gear to the gear ratio γ2 of the second gear (=γ1/γ2) is 1.159, the ratio of the gear ratio γ2 of the second gear to the gear ratio γ3 of the third gear (=γ2/γ3) is 1.579, the ratio of the gear ratio γ3 of the third gear to the gear ratio γ4 of the fourth gear (=γ3/γ4) is 1.301, the ratio of the gear ratio γ4 of the fourth gear to the gear ratio γ5 of the fifth gear (=γ4/γ5)

is 1.232, the ratio of the gear ratio γ5 of the fifth gear to the gear ratio γ6 of the sixth gear (=γ5/γ6) is 1.229, the ratio of the gear ratio γ6 of the sixth gear to the gear ratio γ7 of the seventh gear (=γ6/γ7) is 1.322, the ratio of the gear ratio γ7 of the seventh gear to the gear ratio γ8 of the eighth gear (=γ7/γ8) is 1.200, the ratio of the gear ratio γ8 of the eighth gear to the gear ratio γ9 of the ninth gear (=γ8/γ9) is 1.167, and the ratio of the gear ratio γ9 of the ninth gear to the gear ratio γ10 of the tenth gear (=γ9/γ10) is 1.150. Thus, each gear ratio γ changes in substantially equal ratio. Also, the total gear ratio range, which is the ratio of the gear ratio γ1 of the first gear to the gear ratio γ10 of the tenth gear (=γ1/γ10), is 7.667, which is a relatively large value. The gear ratio ρ1 of the first front planetary gear set 148, the gear ratio ρ2 of the second front planetary gear set 150, the gear ratio ρ3 of the first rear planetary gear set 46, and the gear ratio ρ4 of the second rear planetary gear set 48 are designed so that the foregoing gear ratios can be achieved.

As a first modified example of the eighth exemplary embodiment, gears such as those shown in FIG. 93 can be obtained by suitably setting the gear ratios ρ1 through ρ4 of the planetary gear sets even though the engagement operations for each gear do not change. In the transmission 146 that achieves the gears in accordance with the clutch and brake engagement chart shown in FIG. 93, the gear ratio γ1 of first gear is approximately 4.971, the gear ratio γ2 of second gear is approximately 3.290, the gear ratio γ3 of third gear is approximately 2.222, the gear ratio γ4 of fourth gear is approximately 1.645, the gear ratio γ5 of fifth gear is approximately 1.409, the gear ratio γ6 of sixth gear is approximately 1.244, the gear ratio γ7 of seventh gear is approximately 1.000, the gear ratio γ8 of eighth gear is approximately 0.825, the gear ratio γ9 of ninth gear is approximately 0.649, the gear ratio γ10 of tenth gear is approximately 0.574, the gear ratio γR1 of first reverse gear is approximately 3.047, and the gear ratio γR2 of second reverse gear is approximately 1.852. Further, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, the ratio of the gear ratio γ8 of the eighth gear to the gear ratio γ9 of the ninth gear (=γ8/γ9) is 1.271, and the ratio of the gear ratio γ9 of the ninth gear to the gear ratio γ10 of the tenth gear (=γ9/γ10) is 1.131. Thus, each gear ratio γ changes in substantially equal ratio. Also, the total gear ratio range, which is the ratio of the gear ratio γ1 of the first gear to the gear ratio γ10 of the tenth gear (=γ1/γ10), is 8.655, which is a relatively large value. By suitably setting the gear ratio of each planetary gear set in this way, the total gear ratio range can be set wider than the total gear ratio range shown in FIG. 92.

In the alignment graph shown in FIG. 94, the four vertical lines Y1 through Y4 represent components of the first transmitting portion 152. From left to right in the graph, line Y1 represents the carrier CA1 of the first front planetary gear set 148 and the ring gear R2 of the second front planetary gear set 150 which are connected together to form one rotating element, line Y2 represents the ring gear R1 of the first front planetary gear set 148 and the carrier CA2 of the second front planetary gear set 150 which are connected together to form another rotating element, line Y3 represents the sun gear S1 of the first front planetary gear set 148 which is another rotating element, and line Y4 represents the sun gear S2 of the second front planetary gear set 150 which is another rotating element. Further, the four vertical lines Y5 through Y8 represent components of the second transmitting portion 50. From left to right in the graph, line Y5 represents the sun gear S3 of the first rear planetary gear set 46 which corresponds to the first rotating element RE1, line Y6 represents the carrier CA3 of the first rear planetary gear set 46 and the carrier CA4 of the second rear planetary gear set 48 which are connected together and correspond to the second rotating element RE2, line Y7 represents the ring gear R3 of the first rear planetary gear set 46 and the ring gear R4 of the second rear planetary gear set 48 which are connected together and correspond to the third rotating element RE3, and line Y8 represents the sun gear S4 of the second rear planetary gear set 48 which corresponds to the fourth rotating element RE4. Accordingly, based on these rotating elements, the alignment graph shown in FIG. 94 is similar to that shown in FIG. 14 so a description thereof will be omitted.

In this way, according to the first modified example of the eighth exemplary embodiment, the first transmitting portion 152 includes the double pinion type first front planetary gear set 148 and the single pinion type second front planetary gear set 150. The sun gear S1 of the first front planetary gear set 148 is always connected to the transmission case 16, which is a non-rotating member, and the ring gear R1 of the first front planetary gear set 148 and the carrier CA2 of the second front planetary gear set 150 are connected together. Meanwhile, the carrier CA1 of the first front planetary gear set 148 and the ring gear R2 of the second front planetary gear set 150 are connected to the input shaft 22 which is the input rotating member. Accordingly, the ring gear R1 of the first front planetary gear set 148 or the carrier CA2 of the second front planetary gear set 150 functions as the first intermediate output member 32 while the sun gear S2 of the second front planetary gear set 150 functions as the second intermediate output member 34. Accordingly, a practical transmission 146 is able to be provided.

Figure 96:
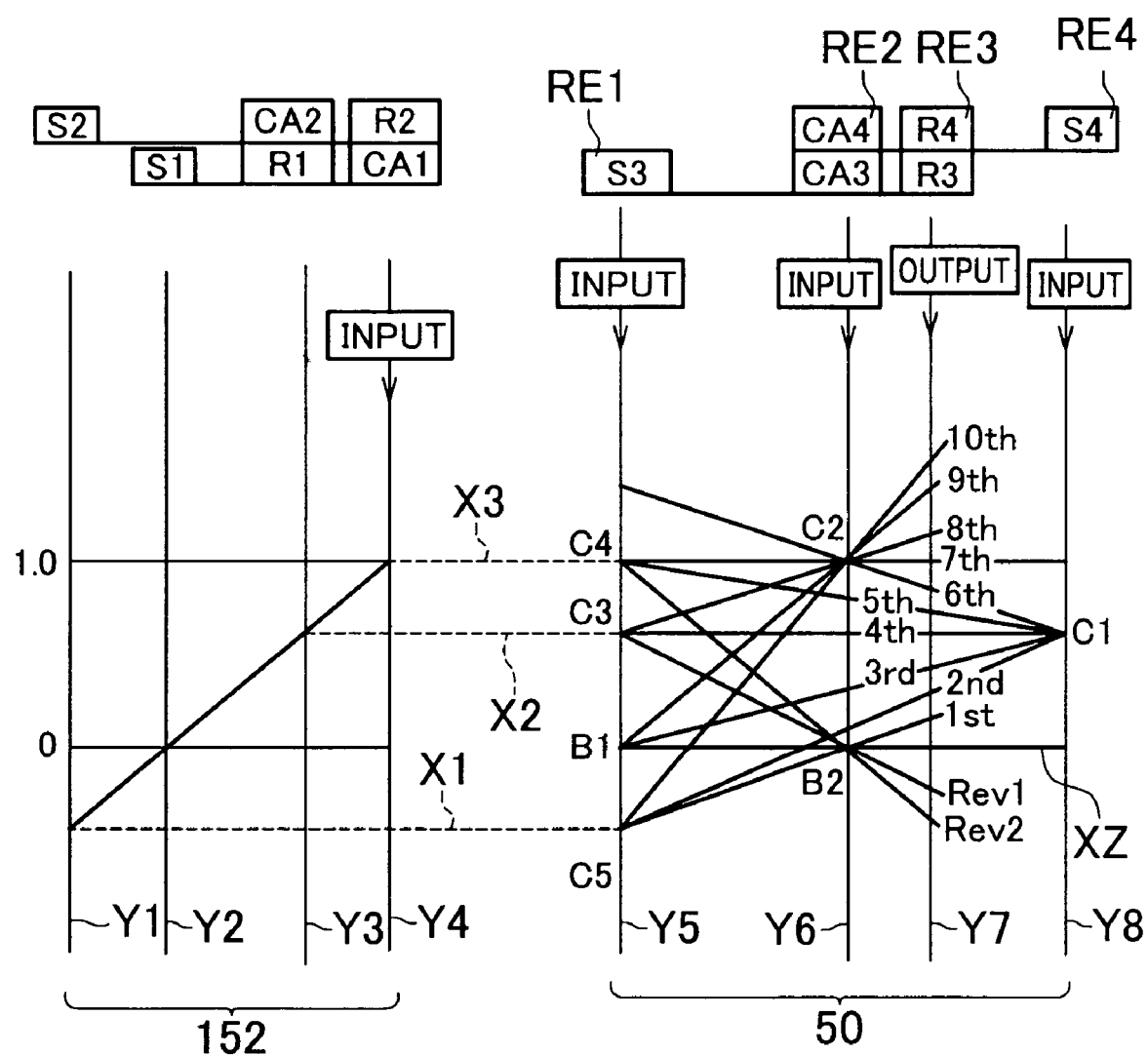
FIG. 96 is an alignment graph corresponding to FIG. 91, which is able to express, with straight lines, the relative relationships between the rotation speeds of various rotating elements which are connected differently in each gear in the transmission according to the second modified example of the eighth exemplary embodiment of the invention.

Here, as a second modified example of the eighth exemplary embodiment, the transmission 146 can achieve ten forward gears and two reverse gears, and effects equivalent to those obtained from the foregoing exemplary embodiment can be obtained, by engaging the clutches and brakes in different combinations, as shown in FIG. 95, in response to a command from the ECU 42, and suitably setting the gear ratio of each planetary gear set. Also, FIG. 96 is an alignment graph corresponding to FIG. 95, which shows the rotation speeds of the rotating elements in each gear. Hereinafter, the clutch and brake engagement chart and alignment graph according to the second modified example of the eighth exemplary embodiment shown in FIGS. 95 and 96, which differ from those of the foregoing exemplary embodiment, will be described.

As shown in the clutch and brake engagement chart in FIG. 95, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 17, so descriptions thereof will be omitted here.

In the alignment graph shown in FIG. 96, the four vertical lines Y1 through Y4 represent components of the first transmitting portion 152. From left to right in the graph, line Y1 represents the sun gear S2 of the second front planetary gear set 150, line Y2 represents the sun gear S1 of the first front planetary gear set 148, line Y3 represents the ring gear R1 of the first front planetary gear set 148 and the carrier CA2 of the second front planetary gear set 150 which are connected together, and line Y4 represents the carrier CA1 of the first front planetary gear set 148 and the ring gear R2 of the second front planetary gear set 150 which are connected together. Further, the four vertical lines Y5 through Y8 represent components of the second transmitting portion 50. From left to right in the graph, line Y5 represents the sun gear S3 of the first rear planetary gear set 46 which corresponds to the first rotating element RE1, line Y6 represents the carrier CA3 of the first rear planetary gear set 46 and the carrier CA4 of the second rear planetary gear set 48 which are connected together and correspond to the second rotating element RE2, line Y7 represents the ring gear R3 of the first rear planetary gear set 46 and the ring gear R4 of the second rear planetary gear set 48 which are connected together and correspond to the third rotating element RE3, and line Y8 represents the sun gear S4 of the second rear planetary gear set 48 which corresponds to the fourth rotating element RE4. Accordingly, based on these rotating elements, the alignment graph shown in FIG. 96 is similar to that shown in FIG. 18 so a description thereof will be omitted.

In this way, according to the second modified example of the eighth exemplary embodiment, it is possible to achieve ten forward gears and two reverse gears, and in particular, to set the step between ninth gear and tenth gear small with a close ratio, by engagement combinations of the clutches and brakes of each gear, such as those described above, and suitably setting the gear ratio of each planetary gear set.

Figure 98:
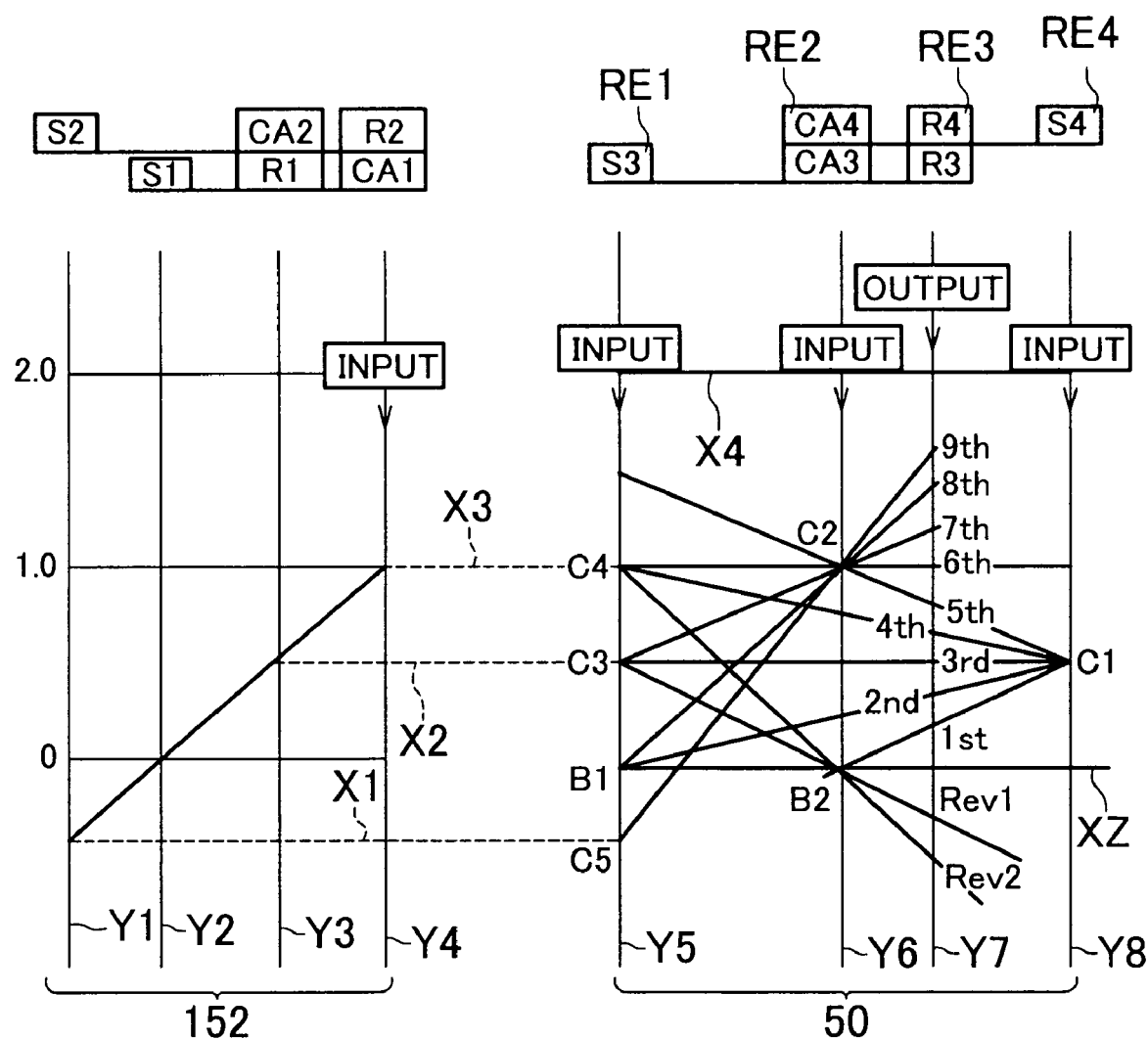
FIG. 98 is an alignment graph corresponding to FIG. 97, which is able to express, with straight lines, the relative relationships between the rotation speeds of various rotating elements which are connected differently in each gear in the transmission according to the third modified example of the eighth exemplary embodiment of the invention.

Here, as a third modified example of the eighth exemplary embodiment, the transmission 146 can achieve nine forward gears and two reverse gears by engaging the clutches and brakes in different combinations, as shown in FIG. 97, in response to a command from the ECU 42, and suitably setting the gear ratio of each planetary gear set. Also, FIG. 98 is an alignment graph corresponding to FIG. 97, which shows the rotation speeds of the rotating elements in each gear. Hereinafter, the clutch and brake engagement chart and alignment graph according to the third modified example of the eighth exemplary embodiment shown in FIGS. 97 and 98, which differ from those of the foregoing exemplary embodiment, will be described.

As shown in the clutch and brake engagement chart in FIG. 97, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 97, the first clutch C1 is engaged to connect the fourth rotating element RE4, i.e., the sun gear S4 of the second rear planetary gear set 48, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first gear which has the largest gear ratio γ1, e.g., approximately 4.776.

Also, the first clutch C1 is engaged to connect the fourth rotating element RE4, i.e., the sun gear S4 of the second rear planetary gear set 48, with the first intermediate output member 32, while the first brake B1 is engaged to hold the first rotating element RE1, i.e., the sun gear S3 of the first rear planetary gear set 46, to the transmission case 16, thereby establishing second gear which has a gear ratio γ2 which is smaller than the gear ratio γ1 of first gear, e.g., approximately 2.925.

Further, the first clutch C1 is engaged to connect the fourth rotating element RE4, i.e., the sun gear S4 of the second rear planetary gear set 48, with the first intermediate output member 32, while the third clutch C3 is engaged to connect the first rotating element RE1, i.e., the sun gear S3 of the first rear planetary gear set 46, with the first intermediate output member 32, thereby establishing third gear which has a gear ratio γ3 which is smaller than the gear ratio γ2 of second gear, e.g., approximately 2.000.

Also, the first clutch C1 is engaged to connect the fourth rotating element RE4, i.e., the sun gear S4 of the second rear planetary gear set 48, with the first intermediate output member 32, while the fourth clutch C4 is engaged to connect the first rotating element RE1, i.e., the sun gear S3 of the first rear planetary gear set 46, with the input shaft 22, thereby establishing fourth gear which has a gear ratio γ4 which is smaller than the gear ratio γ3 of third gear, e.g., approximately 1.519.

Further, the first clutch C1 is engaged to connect the fourth rotating element RE4, i.e., the sun gear S4 of the second rear planetary gear set 48, with the first intermediate output member 32, while the second clutch C2 is engaged to connect the second rotating element RE2, i.e., the carrier CA3 of the first rear planetary gear set 46 and the carrier CA4 of the second rear planetary gear set 48 which are connected together, with the input shaft 22, thereby establishing fifth gear which has a gear ratio γ5 which is smaller than the gear ratio γ4 of fourth gear, e.g., approximately 1.265.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fourth clutch C4 is engaged to connect the first rotating element RE1, i.e., the sun gear S3 of the first rear planetary gear set 46, with the input shaft 22, thereby establishing sixth gear which has a gear ratio γ6 which is smaller than the gear ratio γ5 of fifth gear, e.g., approximately 1.000.

Further, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the third clutch C3 is engaged to connect the first rotating element RE1, i.e., the sun gear S3 of the first rear planetary gear set 46, with the first intermediate output member 32, thereby establishing seventh gear which has a gear ratio γ7 which is smaller than the gear ratio γ6 of sixth gear, e.g., approximately 0.800.

Further, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the first brake B1 is engaged to hold the first rotating element RE1, i.e., the sun gear S3 of the first rear planetary gear set 46, to the transmission case 16, thereby establishing eighth gear which has a gear ratio γ8 which is smaller than the gear ratio γ7 of seventh gear, e.g., approximately 0.667.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fifth clutch C5 is engaged to connect the first rotating element RE1, i.e., the sun gear S3 of the first rear planetary gear set 46, with the second intermediate output member 34, thereby establishing ninth gear which has the smallest gear ratio γ9, e.g., approximately 0.588.

Also, the third clutch C3 is engaged to connect the first rotating element RE1, i.e., the sun gear S3 of the first rear planetary gear set 46, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first reverse gear "R1" which has a gear ratio γR1 of approximately 4.000.

Further, the fourth clutch C4 is engaged to connect the first rotating element RE1, i.e., the sun gear S3 of the first rear planetary gear set 46, with the input shaft 22, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing second reverse gear "R2" which has a gear ratio γR2 which is smaller than the gear ratio γR1 of the first reverse gear, e.g., 2.000. The gear ratio ρ1 of the first front planetary gear set 148, the gear ratio ρ2 of the second front planetary gear set 150, the gear ratio ρ3 of the first rear planetary gear set 46, and the gear ratio ρ4 of the second rear planetary gear set 48 are designed so that the foregoing gear ratios can be achieved.

In the transmission 146 that achieves the gears in accordance with the clutch and brake engagement chart shown in FIG. 97, the ratio of the gear ratio γ1 of the first gear to the gear ratio γ2 of the second gear (=γ1/γ2) is 1.633, the ratio of the gear ratio γ2 of the second gear to the gear ratio γ3 of the third gear (=γ2/γ3) is 1.463, the ratio of the gear ratio γ3 of the third gear to the gear ratio γ4 of the fourth gear (=γ3/γ4) is 1.316, the ratio of the gear ratio γ4 of the fourth gear to the gear ratio γ5 of the fifth gear (=γ4/γ5) is 1.201, the ratio of the gear ratio γ5 of the fifth gear to the gear ratio γ6 of the sixth gear (=γ5/γ6) is 1.265, the ratio of the gear ratio γ6 of the sixth gear to the gear ratio γ7 of the seventh gear (=γ6/γ7) is 1.250, the ratio of the gear ratio γ7 of the seventh gear to the gear ratio γ8 of the eighth gear (=γ7/γ8) is 1.200, and the ratio of the gear ratio γ8 of the eighth gear to the gear ratio γ9 of the ninth gear (=γ8/γ9) is 1.133. Thus, each gear ratio γ changes in substantially equal ratio. Also, the total gear ratio range, which is the ratio of the gear ratio γ1 of the first gear to the gear ratio γ9 of the ninth gear (=γ1/γ9), is 8.119, which is a relatively large value.

In the alignment graph shown in FIG. 98, the four vertical lines Y1 through Y4 represent components of the first transmitting portion 152. From left to right in the graph, line Y1 represents the sun gear S2 of the second front planetary gear set 150, line Y2 represents the sun gear S1 of the first front planetary gear set 148, line Y3 represents the ring gear R1 of the first front planetary gear set 148 and the carrier CA2 of the second front planetary gear set 150 which are connected together, and line Y4 represents the carrier CA1 of the first front planetary gear set 148 and the ring gear R2 of the second front planetary gear set 150 which are connected together.

Further, the four vertical lines Y5 through Y8 represent components of the second transmitting portion 50. From left to right in the graph, line Y5 represents the sun gear S3 of the first rear planetary gear set 46 which corresponds to the first rotating element RE1, line Y6 represents the carrier CA3 of the first rear planetary gear set 46 and the carrier CA4 of the second rear planetary gear set 48 which are connected together and correspond to the second rotating element RE2, line Y7 represents the ring gear R3 of the first rear planetary gear set 46 and the ring gear R4 of the second rear planetary gear set 48 which are connected together and correspond to the third rotating element RE3, and line Y8 represents the sun gear S4 of the second rear planetary gear set 48 which corresponds to the fourth rotating element RE4. Accordingly, based on these rotating elements, the alignment graph shown in FIG. 98 is similar to that shown in FIG. 9 so a description thereof will be omitted.

In this way, according to this third modified example of the eighth exemplary embodiment, first gear is established by engaging the first clutch C1 and the second brake B2. Second gear is established by engaging the first clutch C1 and the first brake B1. Third gear is established by engaging the first clutch C1 and the third clutch C3. Fourth gear is established by engaging the first clutch C1 and the fourth clutch C4. Fifth gear is established by engaging the first clutch C1 and the second clutch C2. Sixth gear is established by engaging the second clutch C2 and the fourth clutch C4. Seventh gear is established by engaging the second clutch C2 and the third clutch C3, and eighth gear is established by engaging the second clutch C2 and the first brake B1. Thus, the transmission 146 of this third modified example of the eighth exemplary embodiment is able to achieve eight forward gears.

The transmission 146 of this third modified example of the eighth exemplary embodiment is also able to achieve ninth gear by engaging the second clutch C2 and the fifth clutch C5. Therefore, in addition to being able to achieve nine forward gears, the step between eighth gear and ninth gear is able to be preferably set relatively small with a close ratio.

Figure 100:
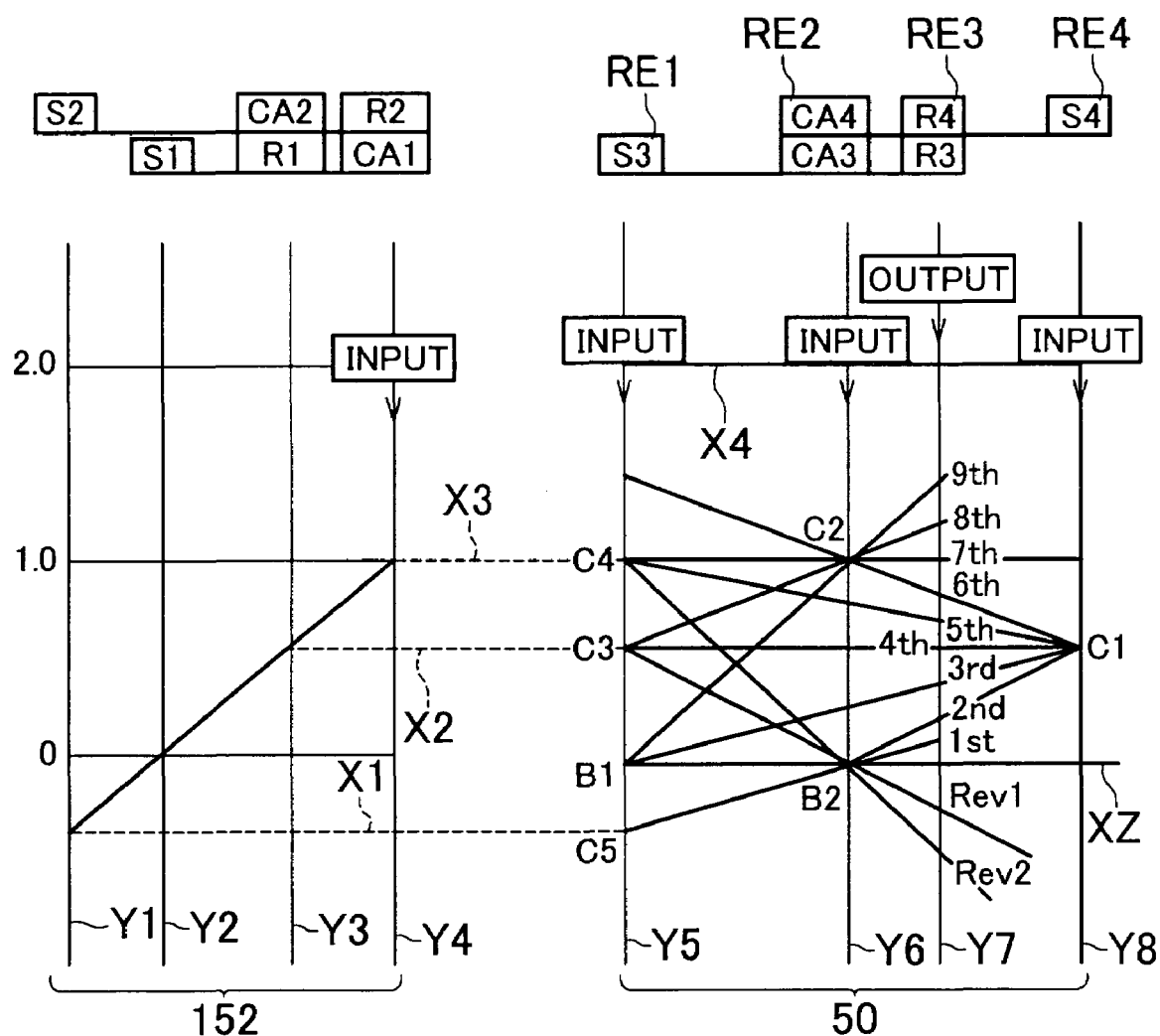
FIG. 100 is an alignment graph corresponding to FIG. 99, which is able to express, with straight lines, the relative relationships between the rotation speeds of various rotating elements which are connected differently in each gear in the transmission according to the fourth modified example of the eighth exemplary embodiment of the invention.

Here, as a fourth modified example of the eighth exemplary embodiment, the transmission 146 can achieve nine forward gears and two reverse gears by engaging the clutches and brakes in different combinations, as shown in FIG. 99, in response to a command from the ECU 42, and suitably setting the gear ratio of each planetary gear set. Also, FIG. 100 is an alignment graph corresponding to FIG. 99, which shows the rotation speeds of the rotating elements in each gear. Hereinafter, the clutch and brake engagement chart and alignment graph according to the fourth modified example of the eighth exemplary embodiment shown in FIGS. 99 and 100, which differ from those of the foregoing exemplary embodiment, will be described.

As shown in the clutch and brake engagement chart in FIG. 99, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 99, the fifth clutch C5 is engaged to connect the first rotating element RE1, i.e., the sun gear S3 of the first rear planetary gear set 46, with the second intermediate output member 34, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first gear which has the largest gear ratio γ1, e.g., approximately 4.971.

Also, the first clutch C1 is engaged to connect the fourth rotating element RE4, i.e., the sun gear S4 of the second rear planetary gear set 48, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing second gear which has a gear ratio γ2 which is smaller than the gear ratio γ1 of first gear, e.g., approximately 3.290.

Further, the first clutch C1 is engaged to connect the fourth rotating element RE4, i.e., the sun gear S4 of the second rear planetary gear set 48, with the first intermediate output member 32, while the first brake B1 is engaged to hold the first rotating element RE1, i.e., the sun gear S3 of the first rear planetary gear set 46, to the transmission case 16, thereby establishing third gear which has a gear ratio γ3 which is smaller than the gear ratio γ2 of second gear, e.g., approximately 2.222.

Also, the first clutch C1 is engaged to connect the fourth rotating element RE4, i.e., the sun gear S4 of the second rear planetary gear set 48, with the first intermediate output member 32, while the third clutch C3 is engaged to connect the first rotating element RE1, i.e., the sun gear S3 of the first rear planetary gear set 46, with the first intermediate output member 32, thereby establishing fourth gear which has a gear ratio γ4 which is smaller than the gear ratio γ3 of third gear, e.g., approximately 1.645.

Further, the first clutch C1 is engaged to connect the fourth rotating element RE4, i.e., the sun gear S4 of the second rear planetary gear set 48, with the first intermediate output member 32, while the fourth clutch C4 is engaged to connect the first rotating element RE1, i.e., the sun gear S3 of the first rear planetary gear set 46, with the input shaft 22, thereby establishing fifth gear which has a gear ratio γ5 which is smaller than the gear ratio γ4 of fourth gear, e.g., approximately 1.409.

Also, the first clutch C1 is engaged to connect the fourth rotating element RE4, i.e., the sun gear S4 of the second rear planetary gear set 48, with the first intermediate output member 32, while the second clutch C2 is engaged to connect the second rotating element RE2, i.e., the carrier CA3 of the first rear planetary gear set 46 and the carrier CA4 of the second rear planetary gear set 48 which are connected together, with the input shaft 22, thereby establishing sixth gear which has a gear ratio γ6 which is smaller than the gear ratio γ5 of fifth gear, e.g., approximately 1.244.

Further, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the fourth clutch C4 is engaged to connect the first rotating element RE1, i.e., the sun gear S3 of the first rear planetary gear set 46, with the input shaft 22, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the third clutch C3 is engaged to connect the first rotating element RE1, i.e., the sun gear S3 of the first rear planetary gear set 46, with the first intermediate output member 32, thereby establishing eighth gear which has a gear ratio γ8 which is smaller than the gear ratio γ7 of seventh gear, e.g., approximately 0.825.

Also, the second clutch C2 is engaged to connect the second rotating element RE2, i.e., the carrier CA3 of the first rear planetary gear set 46 and the carrier CA4 of the second rear planetary gear set 48 which are connected together, with the input shaft 22, while the first brake B1 is engaged to hold the first rotating element RE1, i.e., the sun gear S3 of the first rear planetary gear set 46, to the transmission case 16, thereby establishing ninth gear which has the smallest gear ratio γ9, e.g., approximately 0.649.

Also, the third clutch C3 is engaged to connect the first rotating element RE1, i.e., the sun gear S3 of the first rear planetary gear set 46, with the first intermediate output member 32, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing first reverse gear "R1" which has a gear ratio γR1 of approximately 3.047.

Further, the fourth clutch C4 is engaged to connect the first rotating element RE1, i.e., the sun gear S3 of the first rear planetary gear set 46, with the input shaft 22, while the second brake B2 is engaged to hold the second rotating element RE2, i.e., the carrier CA3 of the first rear planetary gear set 46 and the carrier CA4 of the second rear planetary gear set 48 which are connected together, to the transmission case 16, thereby establishing second reverse gear "R2" which has a gear ratio γR2 which is smaller than the gear ratio γR1 of the first reverse gear, e.g., 1.852. The gear ratio ρ1 of the first front planetary gear set 148, the gear ratio ρ2 of the second front planetary gear set 150, the gear ratio ρ3 of the first rear planetary gear set 46, and the gear ratio ρ4 of the second rear planetary gear set 48 are designed so that the foregoing gear ratios can be achieved.

In the transmission 146 that achieves the gears in accordance with the clutch and brake engagement chart shown in FIG. 99, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, and the ratio of the gear ratio γ8 of the eighth gear to the gear ratio γ9 of the ninth gear (=γ8/γ9) is 1.271. Thus, each gear ratio γ changes in substantially equal ratio. Also, the total gear ratio range, which is the ratio of the gear ratio γ1 of the first gear to the gear ratio γ9 of the ninth gear (=γ1/γ9), is 7.655, which is a relatively large value.

In the alignment graph shown in FIG. 100, the four vertical lines Y1 through Y4 represent components of the first transmitting portion 152. From left to right in the graph, line Y1 represents the sun gear S2 of the second front planetary gear set 150, line Y2 represents the sun gear S1 of the first front planetary gear set 148, line Y3 represents the ring gear R1 of the first front planetary gear set 148 and the carrier CA2 of the second front planetary gear set 150 which are connected together, and line Y4 represents the carrier CA1 of the first front planetary gear set 148 and the ring gear R2 of the second front planetary gear set 150 which are connected together. Further, the four vertical lines Y5 through Y8 represent components of the second transmitting portion 50. From left to right in the graph, line Y5 represents the sun gear S3 of the first rear planetary gear set 46 which corresponds to the first rotating element RE1, line Y6 represents the carrier CA3 of the first rear planetary gear set 46 and the carrier CA4 of the second rear planetary gear set 48 which are connected together and correspond to the second rotating element RE2, line Y7 represents the ring gear R3 of the first rear planetary gear set 46 and the ring gear R4 of the second rear planetary gear set 48 which are connected together and correspond to the third rotating element RE3, and line Y8 represents the sun gear S4 of the second rear planetary gear set 48 which corresponds to the fourth rotating element RE4. Accordingly, based on these rotating elements, the alignment graph shown in FIG. 100 is similar to that shown in FIG. 11 so a description thereof will be omitted.

In this way, according to this fourth modified example of the eighth exemplary embodiment, first gear is established by engaging the fifth clutch C5 and the second brake B2. Second gear is established by engaging the first clutch C1 and the second brake B2. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4, and eighth gear is established by engaging the second clutch C2 and the third clutch C3. Thus, the transmission 146 of this fourth modified example of the eighth exemplary embodiment is able to achieve eight forward gears.

The transmission 146 of this fourth modified example of the eighth exemplary embodiment is also able to achieve ninth gear by engaging the second clutch C2 and the first brake B1. Therefore, in addition to being able to achieve nine forward gears, the step between eighth gear and ninth gear is able to be preferably set relatively small with a close ratio.

Here, as a fifth modified example of the eighth exemplary embodiment, the transmission 146 can achieve nine forward gears and two reverse gears by engaging the clutches and brakes in different combinations, as shown in FIG. 101, in response to a command from the ECU 42, and suitably setting the gear ratio of each planetary gear set. Also, FIG. 102 is an alignment graph corresponding to FIG. 101, which shows the rotation speeds of the rotating elements in each gear. Hereinafter, the clutch and brake engagement chart and alignment graph according to the fifth modified example of the eighth exemplary embodiment shown in FIGS. 101 and 102, which differ from those of the foregoing exemplary embodiment, will be described.

As shown in the clutch and brake engagement chart in FIG. 101, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 23, so descriptions thereof will be omitted here.

In the alignment graph shown in FIG. 102, the four vertical lines Y1 through Y4 representing components of the first transmitting portion 152 and the four vertical lines Y5 through Y8 representing components of the second transmitting portion 50 represent the same rotating elements as those in FIG. 96 described above because the structure shown in the skeleton view is the same. Also, in the clutch and brake engagement chart shown in FIG. 101, the operations of the friction engagement devices for establishing first gear "1st" through ninth gear "9th" are the same as those described above using FIG. 23. Therefore, based on the rotating elements, the alignment graph also corresponds to these. Thus, the alignment graph shown in FIG. 102 is the same as the alignment graph shown in FIG. 24.

According to this fifth modified example of the eighth exemplary embodiment as well, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

Figure 104:
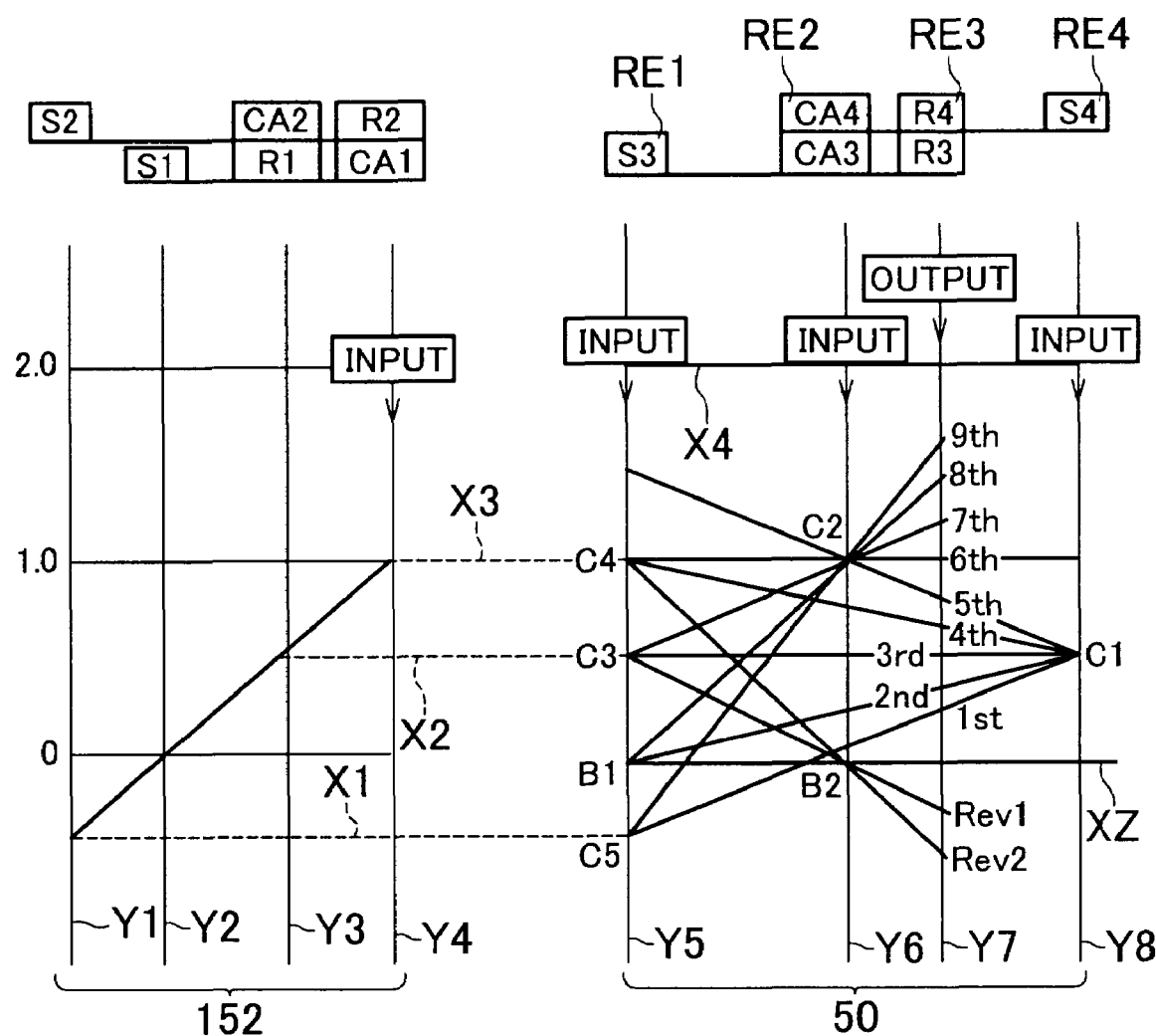
FIG. 104 is an alignment graph corresponding to FIG. 103, which is able to express, with straight lines, the relative relationships between the rotation speeds of various rotating elements which are connected differently in each gear in the transmission according to the sixth modified example of the eighth exemplary embodiment of the invention.

Here, as a sixth modified example of the eighth exemplary embodiment, the transmission 146 can achieve nine forward gears and two reverse gears, and effects equivalent to those obtained from the foregoing exemplary embodiment can be obtained, by engaging the clutches and brakes in different combinations, as shown in FIG. 103, in response to a command from the ECU 42, and suitably setting the gear ratio of each planetary gear set. Also, FIG. 104 is an alignment graph corresponding to FIG. 103, which shows the rotation speeds of the rotating elements in each gear. Hereinafter, the clutch and brake engagement chart and alignment graph according to the sixth modified example of the eighth exemplary embodiment shown in FIGS. 103 and 104, which differ from those of the foregoing exemplary embodiment, will be described.

As shown in the clutch and brake engagement chart in FIG. 103, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 25, so descriptions thereof will be omitted here.

In the alignment graph shown in FIG. 104, the four vertical lines Y1 through Y4 representing components of the first transmitting portion 152 and the four vertical lines Y5 through Y8 representing components of the second transmitting portion 50 represent the same rotating elements as those in FIG. 96 described above because the structure shown in the skeleton view is the same. Also, in the clutch and brake engagement chart shown in FIG. 103, the operations of the friction engagement devices for establishing first gear "1st" through ninth gear "9th" are the same as those described above using FIG. 25. Therefore, based on the rotating elements, the alignment graph also corresponds to these. Thus, the alignment graph shown in FIG. 104 is the same as the alignment graph shown in FIG. 26.

Thus, according to this sixth modified example of the eighth exemplary embodiment as well, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

Figure 105:
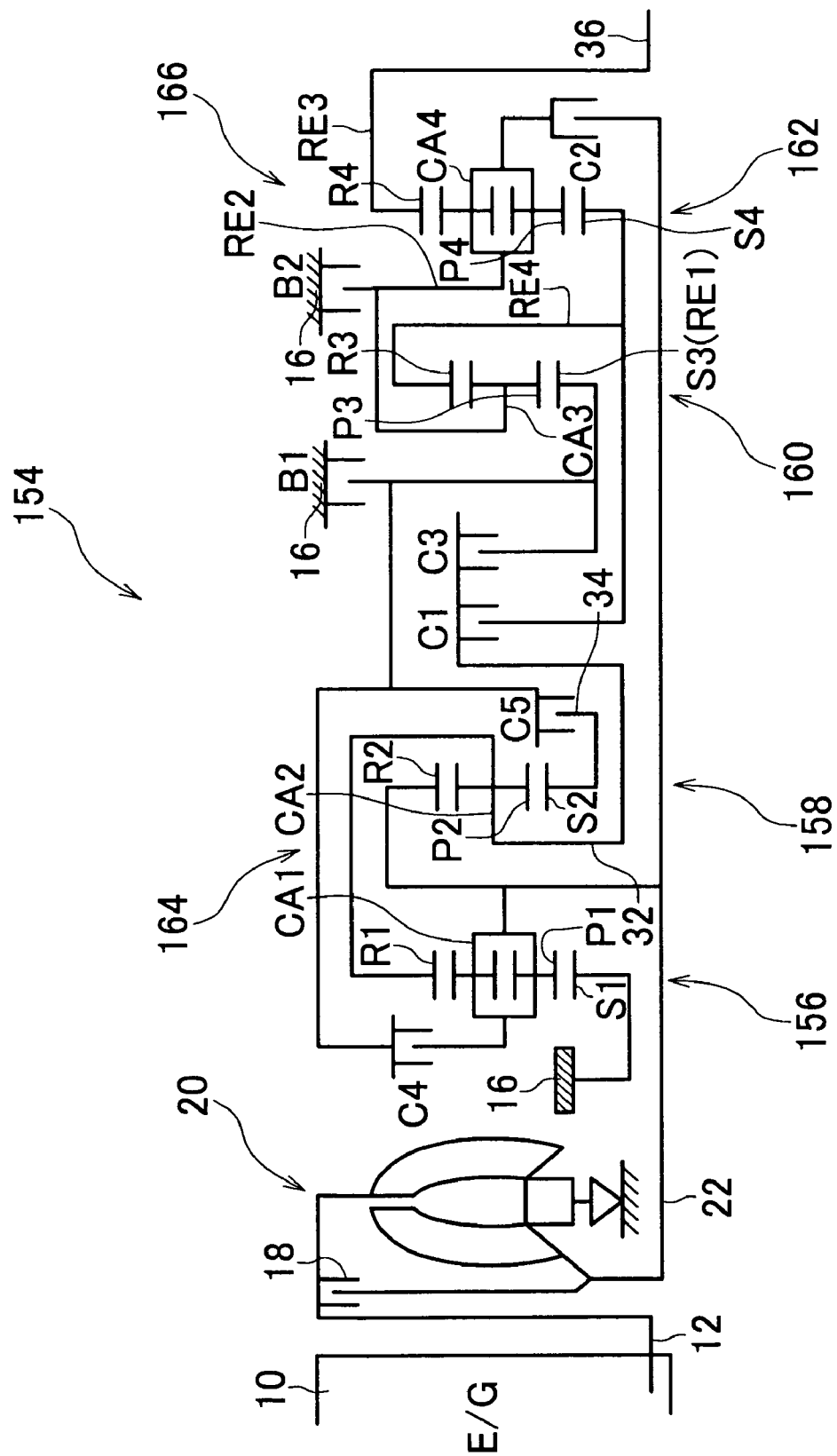
FIG. 105 is a skeleton view of the structure of a multi-speed transmission for a vehicle according to a ninth exemplary embodiment of the invention.
Figure 108:
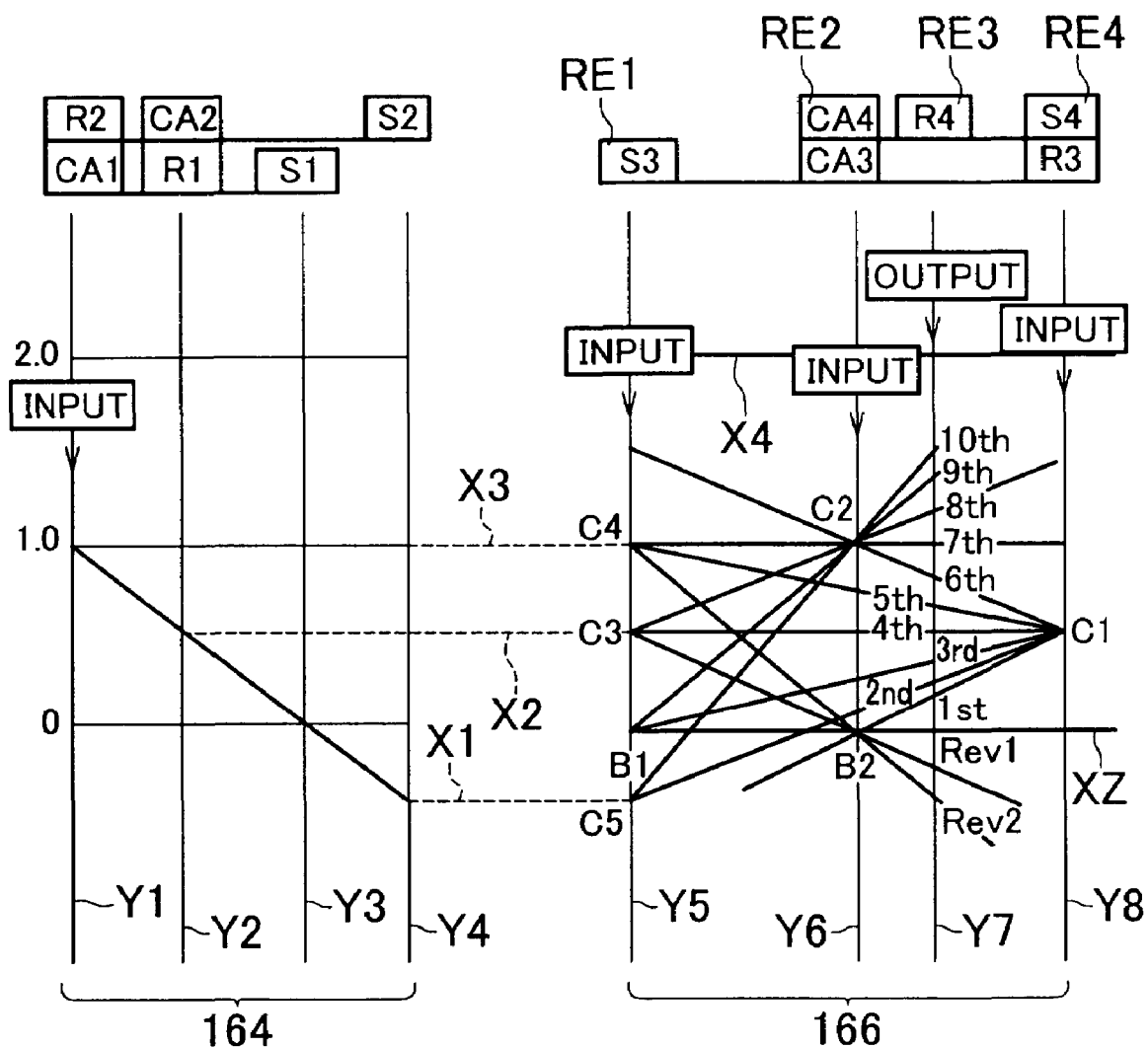
FIG. 108 is an alignment graph which is able to express, with straight lines, the relative relationships between the rotation speeds of various rotating elements which are connected differently in each gear in the transmission according to the ninth exemplary embodiment of the invention and the transmission according to the first modified example of the ninth exemplary embodiment of the invention.

FIG. 105 is a skeleton view of the structure of a transmission 154 according to a ninth exemplary embodiment of the invention. FIG. 106 is a chart showing the relationship between gears and operations of friction engagement devices necessary to establish those gears in the transmission 154. FIG. 108 is an alignment graph showing the rotation speeds of rotating elements in each gear. Hereinafter, the transmission 154 of this ninth exemplary embodiment will be described.

As shown in FIG. 105, a first front planetary gear set 156 which makes up part of a first transmitting portion 164 is a double pinion type planetary gear set which includes a sun gear S1, a plurality of sets of pinions P1 which are in mesh with each other, a carrier CA1 which rotatably and revolvably supports the pinions P1, and a ring gear R1 that is in mesh with the sun gear S1 via the pinions P1. A second front planetary gear set 158 which also makes up part of the first transmitting portion 164 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2.

In the first transmitting portion 164, the sun gear S1 of the first front planetary gear set 156 is integrally connected to the transmission case 16 which is a non-rotating member, thus preventing relative rotation with respect to the transmission case 16. Also, the carrier CA1 of the first front planetary gear set 156 and the ring gear R2 of the second front planetary gear set 158 are connected together as well as integrally connected to the input shaft 22 which is the input rotating member. Further, the ring gear R1 of the first front planetary gear set 156 and the carrier CA2 of the second front planetary gear set 158 are connected together as well as integrally connected to the first intermediate output member 32. Also, the sun gear S2 of the second front planetary gear set 158 is integrally connected to the second intermediate output member 34. This kind of structure results in the first transmitting portion 164 slowing down the rotation from the input shaft 22 and transmitting that slowed rotation to a second transmitting portion 166 via the first intermediate output member 32, and reversing the rotation from the input shaft 22 and transmitting that reverse rotation to the second transmitting portion 166 via the second intermediate output member 34.

A first rear planetary gear set 160 which makes up part of the second transmitting portion 166 is a single pinion type planetary gear set which includes a sun gear S3, a pinion P3, a carrier CA3 which rotatably and revolvably supports the pinion P3, and a ring gear R3 that is in mesh with the sun gear S3 via the pinion P3. A second rear planetary gear set 162 which also makes up part of the second transmitting portion 166 is a double pinion type planetary gear set which includes a sun gear S4, a plurality of sets of pinions P4 which are in mesh with each other, a carrier CA4 which rotatably and revolvably supports the pinions P4, and a ring gear R4 that is in mesh with the sun gear S4 via the pinions P4.

In the second transmitting portion 166, the sun gear S3 of the first rear planetary gear set 160 forms a first rotating element RE1. The carrier CA3 of the first rear planetary gear set 160 and the carrier CA4 of the second rear planetary gear set 162 are connected together to form a second rotating element RE2. The ring gear R4 of the second rear planetary gear set 162 forms a third rotating element RE3, and the ring gear R3 of the first rear planetary gear set 160 and the sun gear S4 of the second rear planetary gear set 162 are connected together to form a fourth rotating element RE4. The transmission 154 also includes a first clutch C1, a second clutch C2, a third clutch C3, a fourth clutch C4, a fifth clutch C5, a first brake B1, and a second brake B2. The first clutch C1 is a first clutch element that selectively connects the first intermediate output member 32 with the fourth rotating element RE4. The second clutch C2 is a second clutch element that selectively connects the input shaft 22 with the second rotating element RE2. The third clutch C3 is a third clutch element that selectively connects the first intermediate output member 32 with the first rotating element RE1. The fourth clutch C4 is a fourth clutch element that selectively connects together the input shaft 22 and the first rotating element RE1. The fifth clutch C5 is a fifth clutch element that selectively connects together the second intermediate output member 34 and the first rotating element RE1. The first brake B1 is a first brake element that selectively holds the first rotating element RE1 to the transmission case 16 which is a non-rotating member, and the second brake B2 is a second brake element that selectively holds the second rotating element RE2 to the transmission case 16.

In the transmission 154 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 106, for example, in response to a command from the ECU 42, and a gear ratio γ (=input shaft rotation speed NIN/output shaft rotation speed NOUT) that changes in substantially equal ratio is able to be achieved for each gear.

That is, as shown in FIG. 106, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the second brake B2 is engaged to hold the second rotating element RE2, i.e., the carrier CA3 of the first rear planetary gear set 160 and the carrier CA4 of the second rear planetary gear set 162 which are connected together, to the transmission case 16 which is a non-rotating member, thereby establishing first gear which has the largest gear ratio γ1, e.g., approximately 5.283.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the fifth clutch C5 is engaged to connect the first rotating element RE1, i.e., the sun gear S3 of the first rear planetary gear set 160, with the second intermediate output member 34, thereby establishing second gear which has a gear ratio γ2 which is smaller than the gear ratio γ1 of first gear, e.g., approximately 3.605.

Further, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the first brake B1 is engaged to hold the first rotating element RE1, i.e., the sun gear S3 of the first rear planetary gear set 160, to the transmission case 16, thereby establishing third gear which has a gear ratio γ3 which is smaller than the gear ratio γ2 of second gear, e.g., approximately 2.472.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the third clutch C3 is engaged to connect the first rotating element RE1, i.e., the sun gear S3 of the first rear planetary gear set 160, with the first intermediate output member 32, thereby establishing fourth gear which has a gear ratio γ4 which is smaller than the gear ratio γ3 of third gear, e.g., approximately 1.897.

Further, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the fourth clutch C4 is engaged to connect the first rotating element RE1, i.e., the sun gear S3 of the first rear planetary gear set 160, with the input shaft 22 which is the input rotating member, thereby establishing fifth gear which has a gear ratio γ5 which is smaller than the gear ratio γ4 of fourth gear, e.g., approximately 1.569.

Further, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the second clutch C2 is engaged to connect the second rotating element RE2, i.e., the carrier CA3 of the first rear planetary gear set 160 and the carrier CA4 of the second rear planetary gear set 162 which are connected together, with the input shaft 22, thereby establishing sixth gear which has a gear ratio γ6 which is smaller than the gear ratio γ5 of fifth gear, e.g., approximately 1.204.

Also, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the fourth clutch C4 is engaged to connect the first rotating element RE1, i.e., the sun gear S3 of the first rear planetary gear set 160, with the input shaft 22 which is the input rotating member, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the third clutch C3 is engaged to connect the first rotating element RE1, i.e., the sun gear S3 of the first rear planetary gear set 160, with the first intermediate output member 32, thereby establishing eighth gear which has a gear ratio γ8 which is smaller than the gear ratio γ7 of seventh gear, e.g., approximately 0.912.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the first brake B1 is engaged to hold the first rotating element RE1, i.e., the sun gear S3 of the first rear planetary gear set 160, to the transmission case 16, thereby establishing ninth gear which has a gear ratio γ9 which is smaller than the gear ratio γ8 of eighth gear, e.g., approximately 0.830.

Also, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the fifth clutch C5 is engaged to connect the first rotating element RE1, i.e., the sun gear S3 of the first rear planetary gear set 160, with the second intermediate output member 34, thereby establishing tenth gear which has the smallest gear ratio γ10, e.g., approximately 0.760.

Further, the third clutch C3 is engaged to connect the first rotating element RE1, i.e., the sun gear S3 of the first rear planetary gear set 160, with the first intermediate output member 32, while the second brake B2 is engaged to hold the second rotating element RE2, i.e., the carrier CA3 of the first rear planetary gear set 160 and the carrier CA4 of the second rear planetary gear set 162 which are connected together, to the transmission case 16, thereby establishing first reverse gear "R1" which has a gear ratio γR1 of approximately 9.257.

Further, the fourth clutch C4 is engaged to connect the first rotating element RE1, i.e., the sun gear S3 of the first rear planetary gear set 160, with the input shaft 22 which is the input rotating member, while the second brake B2 is engaged to hold the second rotating element RE2, i.e., the carrier CA3 of the first rear planetary gear set 160 and the carrier CA4 of the second rear planetary gear set 162 which are connected together, to the transmission case 16, thereby establishing second reverse gear "R2" which has a gear ratio γR2 which is smaller than the gear ratio γR1 of the first reverse gear, e.g., 4.881. The gear ratio ρ1 of the first front planetary gear set 156, the gear ratio ρ2 of the second front planetary gear set 158, the gear ratio ρ3 of the first rear planetary gear set 160, and the gear ratio ρ4 of the second rear planetary gear set 162 are designed so that the foregoing gear ratios can be achieved.

In the transmission 154 that achieves the gears in accordance with the clutch and brake engagement chart shown in FIG. 106, the ratio of the gear ratio γ1 of the first gear to the gear ratio γ2 of the second gear (=γ1/γ2) is 1.466, the ratio of the gear ratio γ2 of the second gear to the gear ratio γ3 of the third gear (=γ2/γ3) is 1.458, the ratio of the gear ratio γ3 of the third gear to the gear ratio γ4 of the fourth gear (=γ3/γ4) is 1.304, the ratio of the gear ratio γ4 of the fourth gear to the gear ratio γ5 of the fifth gear (=γ4/γ5) is 1.209, the ratio of the gear ratio γ5 of the fifth gear to the gear ratio γ6 of the sixth gear (=γ5/γ6) is 1.303, the ratio of the gear ratio γ6 of the sixth gear to the gear ratio γ7 of the seventh gear (=γ6/γ7) is 1.204, the ratio of the gear ratio γ7 of the seventh gear to the gear ratio γ8 of the eighth gear (=γ7/γ8) is 1.097, the ratio of the gear ratio γ8 of the eighth gear to the gear ratio γ9 of the ninth gear (=γ8/γ9) is 1.098, and the ratio of the gear ratio γ9 of the ninth gear to the gear ratio γ10 of the tenth gear (=γ9/γ10) is 1.093. Thus, each gear ratio γ changes in substantially equal ratio. Also, the total gear ratio range, which is the ratio of the gear ratio γ1 of the first gear to the gear ratio γ10 of the tenth gear (=γ1/γ10), is 6.956, which is a relatively large value.

Also, as a first modified example of the ninth exemplary embodiment, the transmission 154 can achieve gears such as those shown in FIG. 107 by suitably setting the gear ratios ρ1 through ρ4 of the planetary gear sets even though the engagement operations for each gear do not change. In the transmission 154 which establishes the gears according to the clutch and brake engagement chart shown in FIG. 107, the gear ratio γ1 of first gear is approximately 5.690, the gear ratio γ2 of second gear is approximately 3.689, the gear ratio γ3 of third gear is approximately 2.492, the gear ratio γ4 of fourth gear is approximately 1.897, the gear ratio γ5 of fifth gear is approximately 1.562, the gear ratio γ6 of sixth gear is approximately 1.187, the gear ratio γ7 of seventh gear is approximately 1.000, the gear ratio γ8 of eighth gear is approximately 0.919, the gear ratio γ9 of ninth gear is approximately 0.843, the gear ratio γ10 of tenth gear is approximately 0.777, the gear ratio γR1 of first reverse gear is approximately 10.194, and the gear ratio γR2 of second reverse gear is approximately 5.375. Further, the ratio of the gear ratio γ1 of the first gear to the gear ratio γ2 of the second gear (=γ1/γ2) is 1.542, the ratio of the gear ratio γ2 of the second gear to the gear ratio γ3 of the third gear (=γ2/γ3) is 1.480, the ratio of the gear ratio γ3 of the third gear to the gear ratio γ4 of the fourth gear (=γ3/γ4) is 1.314, the ratio of the gear ratio γ4 of the fourth gear to the gear ratio γ5 of the fifth gear (=γ4/γ5) is 1.214, the ratio of the gear ratio γ5 of the fifth gear to the gear ratio γ6 of the sixth gear (=γ5/γ6) is 1.316, the ratio of the gear ratio γ6 of the sixth gear to the gear ratio γ7 of the seventh gear (=γ6/γ7) is 1.187, the ratio of the gear ratio γ7 of the seventh gear to the gear ratio γ8 of the eighth gear (=γ7/γ8) is 1.088, the ratio of the gear ratio γ8 of the eighth gear to the gear ratio γ9 of the ninth gear (=γ8/γ9) is 1.090, and the ratio of the gear ratio γ9 of the ninth gear to the gear ratio γ10 of the tenth gear (=γ9/γ10) is 1.086. Thus, each gear ratio γ changes in substantially equal ratio. Also, the total gear ratio range, which is the ratio of the gear ratio γ1 of the first gear to the gear ratio γ10 of the tenth gear (=γ1/γ10), is 7.326, which is a relatively large value. By suitably setting the gear ratio of each planetary gear set in this way, the total gear ratio range can be set wider than the total gear ratio range shown in FIG. 106.

In the alignment graph shown in FIG. 108, the four vertical lines Y1 through Y4 represent components of the first transmitting portion 164. From left to right in the graph, line Y1 represents the carrier CA1 of the first front planetary gear set 156 and the ring gear R2 of the second front planetary gear set 158 which are connected together, line Y2 represents the ring gear R1 of the first front planetary gear set 156 and the carrier CA2 of the second front planetary gear set 158 which are connected together, line Y3 represents the sun gear S1 of the first front planetary gear set 156, and line Y4 represents the sun gear S2 of the second front planetary gear set 158. Further, the four vertical lines Y5 through Y8 represent components of the second transmitting portion 166. From left to right in the graph, line Y5 represents the sun gear S3 of the first rear planetary gear set 160 which corresponds to the first rotating element RE1, line Y6 represents the carrier CA3 of the first rear planetary gear set 160 and the carrier CA4 of the second rear planetary gear set 162 which are connected together and correspond to the second rotating element RE2, line Y7 represents the ring gear R4 of the second rear planetary gear set 162 which corresponds to the third rotating element RE3, and line Y8 represents the ring gear R3 of the first rear planetary gear set 160 and the sun gear S4 of the second rear planetary gear set 162 which are connected together and correspond to the fourth rotating element RE4.

When expressed using the alignment graph, in the first transmitting portion 164 of the transmission 154 of this exemplary embodiment, the carrier CA1 of the first front planetary gear set 156 and the ring gear R2 of the second front planetary gear set 158, which are connected together and function as one of four rotating elements, are connected to the input shaft 22 which is the input rotating member. The ring gear R1 of the first front planetary gear set 156 and the carrier CA2 of the second front planetary gear set 158, which are connected together and function as another of the four rotating elements, are integrally provided with the first intermediate output member 32 and therefore function similarly as a first intermediate output member. The sun gear S1 of the first front planetary gear set 156, which is another of the four rotating elements, is held to the transmission case 16, which is a non-rotating member, so as not to be able to rotate with respect thereto. The sun gear S2 of the second front planetary gear set 158, which is another of the four rotating elements, is integrally provided with the second intermediate output member 34 and therefore functions similarly as a second intermediate output member. Further, in the second transmitting portion 166 of the transmission 154, the first rotating element RE1 (S3) is selectively connected to the first intermediate output member 32 via the third clutch C3, selectively connected to the input shaft 22 which is the input rotating member via the fourth clutch C4, and selectively connected to the second intermediate output member 34 via the fifth clutch C5, as well as selectively held to the transmission case 16, which is the non-rotating member, via the first brake B1. Also, the second rotating element RE2 (CA3, CA4) is selectively connected to the input shaft 22, which is the input rotating member, via the second clutch C2, and is selectively held to the transmission case 16, which is the non-rotating member, via the second brake B2. Further, the third rotating element RE3 (R4) is provided integrally with the output shaft 36, which is the output rotating member, and therefore functions similarly as an output rotating member. Also, the fourth rotating element RE4 (R3, S4) is selectively connected to the first intermediate output member 32 via the first clutch C1.

In the alignment graph in FIG. 108, in first gear, the first clutch C1 is engaged to connect the fourth rotating element RE4 to the first intermediate output member 32, which results in the fourth rotating element RE4 rotating at the same speed as the first intermediate output member 32. Meanwhile, the second brake B2 is engaged to hold the second rotating element RE2 to the transmission case 16 which is a non-rotating member, which results in the rotation speed of the second rotating element RE2 being "0". Accordingly, the rotation speed of the output shaft 36 is indicated by the point (1st) where the straight line that connects the point of intersection of the vertical line Y6 and the horizontal line XZ with the point of intersection of the vertical line Y8 and the horizontal line X2, intersects with the vertical line Y7.

In second gear, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y5 and the horizontal line X1 with the point of intersection of the vertical line Y8 and the horizontal line X2, intersects with the vertical line Y7.

In third gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the straight line that connects the point of intersection of the vertical line Y5 and the horizontal line XZ with the point of intersection of the vertical line Y8 and the horizontal line X2, intersects with the vertical line Y7.

In fourth gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the horizontal line X2 intersects with the vertical line Y7.

In fifth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the straight line that connects the point of intersection of the vertical line Y5 and the horizontal line X3 with the point of intersection of the vertical line Y8 and the horizontal line X2, intersects with the vertical line Y7.

In sixth gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (6th) where the straight line that connects the point of intersection of the vertical line Y6 and the horizontal line X3 with the point of intersection of the vertical line Y8 and the horizontal line X2, intersects with the vertical line Y7.

In seventh gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (7th) where the horizontal line X3 intersects with the vertical line Y7.

In eighth gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the straight line that connects the point of intersection of the vertical line Y5 and the horizontal line X2 with the point of intersection of the vertical line Y6 and the horizontal line X3, intersects with the vertical line Y7.

In ninth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line XZ with the point of intersection of the vertical line Y6 and the horizontal line X3, intersects with the vertical line Y7.

In tenth gear, the fifth clutch C5 is engaged to connect the first rotating element RE1 to the second intermediate output member 34, resulting in the first rotating-element RE1 rotating at the same speed as the second intermediate output member 34. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (10th) where the straight line that connects the point of intersection of the vertical line Y5 and the horizontal line X1 with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to this first modified example of the ninth exemplary embodiment, first gear is established by engaging the first clutch C1 and the second brake B2. Second gear is established by engaging the first clutch C1 and the fifth clutch C5. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4. Eighth gear is established by engaging the second clutch C2 and the third clutch C3, and ninth gear is established by engaging the second clutch C2 and the first brake B1. Thus, the transmission 154 of this first modified example of the ninth exemplary embodiment is able to achieve nine forward gears.

The transmission 154 of this first modified example of the ninth exemplary embodiment is also able to achieve tenth gear by engaging the second clutch C2 and the fifth clutch C5. Therefore, in addition to being able to achieve ten forward gears, the step between ninth gear and tenth gear is able to be preferably set relatively small with a close ratio.

Further, the second transmitting portion 166 includes the single pinion type first rear planetary gear set 160 and the double pinion type second rear planetary gear set 162. The sun gear S3 of the first rear planetary gear set 160 forms the first rotating element RE1, the carrier CA3 of the first rear planetary gear set 160 and the carrier CA4 of the second rear planetary gear set 162, which are connected together, form the second rotating element RE2, the ring gear R4 of the second rear planetary gear set 162 forms the third rotating element RE3, and the ring gear R3 of the first rear planetary gear set 160 and the sun gear S4 of the second rear planetary gear set 162, which are connected together, form the fourth rotating element RE4. Accordingly, a practical transmission 154 is able to be provided.

Figure 110:
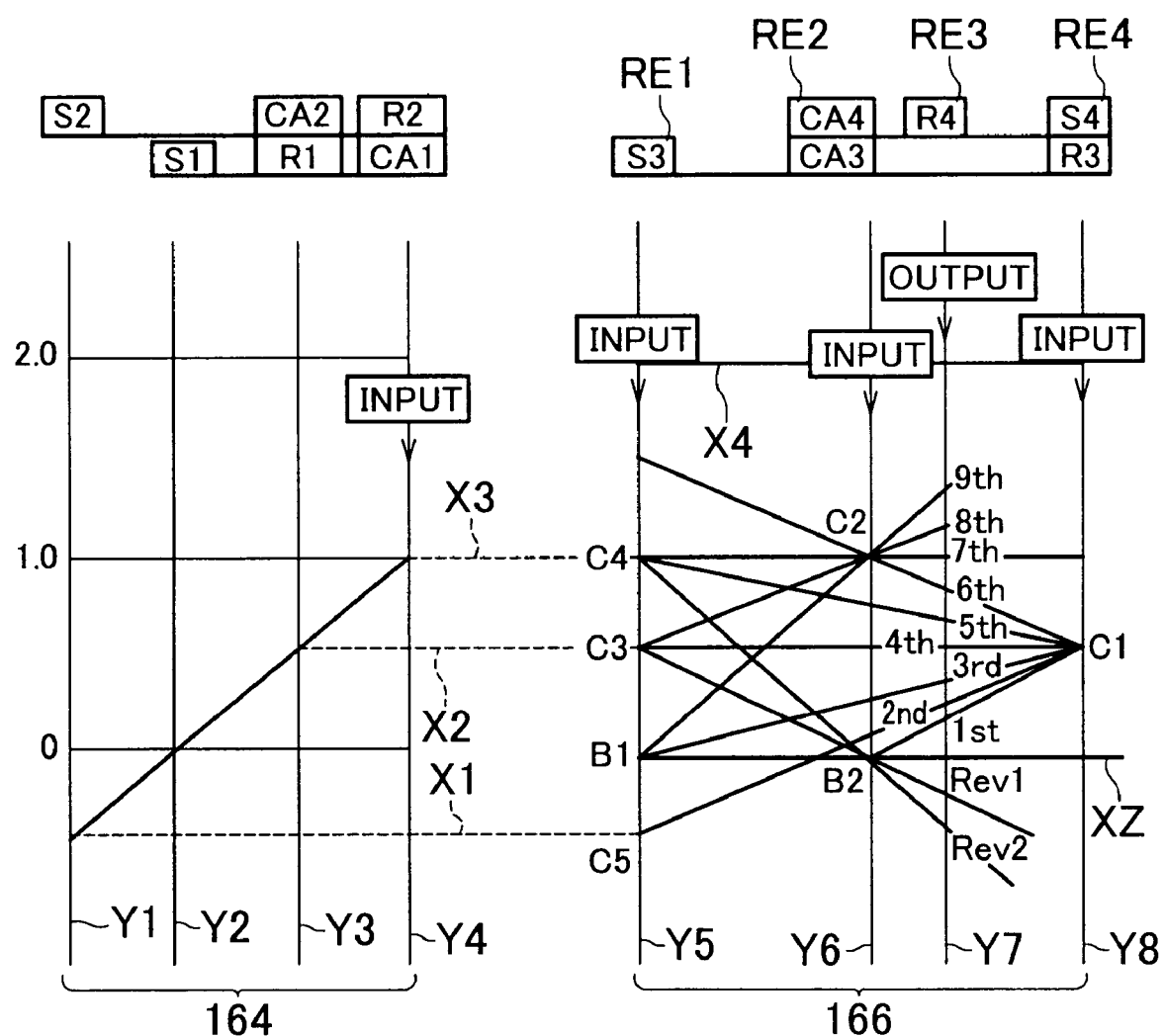
FIG. 110 is an alignment graph corresponding to FIG. 109, which is able to express, with straight lines, the relative relationships between the rotation speeds of various rotating elements which are connected differently in each gear in the transmission according to the second modified example of the ninth exemplary embodiment of the invention.

Here, as a second modified example of the ninth exemplary embodiment, the transmission 154 can achieve nine forward gears and two reverse gears by engaging the clutches and brakes in different combinations, as shown in FIG. 109, in response to a command from the ECU 42, and suitably setting the gear ratio of each planetary gear set. Also, FIG. 110 is an alignment graph corresponding to FIG. 109, which shows the rotation speeds of the rotating elements in each gear. Hereinafter, the clutch and brake engagement chart and alignment graph according to the second modified example of the ninth exemplary embodiment shown in FIGS. 109 and 110, which differ from those of the foregoing exemplary embodiment, will be described.

As shown in the clutch and brake engagement chart in FIG. 109, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 109, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the second brake B2 is engaged to hold the second rotating element RE2, i.e., the carrier CA3 of the first rear planetary gear set 160 and the carrier CA4 of the second rear planetary gear set 162 which are connected together, to the transmission case 16 which is a non-rotating member, thereby establishing first gear which has the largest gear ratio γ1, e.g., approximately 5.690.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the fifth clutch C5 is engaged to connect the first rotating element RE1, i.e., the sun gear S3 of the first rear planetary gear set 160, with the second intermediate output member 34, thereby establishing second gear which has a gear ratio γ2 which is smaller than the gear ratio γ1 of first gear, e.g., approximately 3.689.

Further, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the first brake B1 is engaged to hold the first rotating element RE1, i.e., the sun gear S3 of the first rear planetary gear set 160, to the transmission case 16, thereby establishing third gear which has a gear ratio γ3 which is smaller than the gear ratio γ2 of second gear, e.g., approximately 2.492.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the third clutch C3 is engaged to connect the first rotating element RE1, i.e., the sun gear S3 of the first rear planetary gear set 160, with the first intermediate output member 32, thereby establishing fourth gear which has a gear ratio γ4 which is smaller than the gear ratio γ3 of third gear, e.g., approximately 1.897.

Further, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the fourth clutch C4 is engaged to connect the first rotating element RE1, i.e., the sun gear S3 of the first rear planetary gear set 160, with the input shaft 22 which is the input rotating member, thereby establishing fifth gear which has a gear ratio γ5 which is smaller than the gear ratio γ4 of fourth gear, e.g., approximately 1.562.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the second clutch C2 is engaged to connect the second rotating element RE2, i.e., the carrier CA3 of the first rear planetary gear set 160 and the carrier CA4 of the second rear planetary gear set 162 which are connected together, with the input shaft 22, thereby establishing sixth gear which has a gear ratio γ6 which is smaller than the gear ratio γ5 of fifth gear, e.g., approximately 1.187.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the fourth clutch C4 is engaged to connect the first rotating element RE1, i.e., the sun gear S3 of the first rear planetary gear set 160, with the input shaft 22 which is the input rotating member, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the third clutch C3 is engaged to connect the first rotating element RE1, i.e., the sun gear S3 of the first rear planetary gear set 160, to the first intermediate output member 32, thereby establishing eighth gear which has a gear ratio γ8 which is smaller than the gear ratio γ7 of seventh gear, e.g., approximately 0.919.

Also, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the first brake B1 is engaged to hold the first rotating element RE1, i.e., the sun gear S3 of the first rear planetary gear set 160, to the transmission case 16, thereby establishing ninth gear which has a gear ratio γ9 which is smaller than the gear ratio γ8 of eighth gear, e.g., approximately 0.843.

Also, the third clutch C3 is engaged to connect the first rotating element RE1, i.e., the sun gear S3 of the first rear planetary gear set 160, with the first intermediate output member 32, while the second brake B2 is engaged to hold the second rotating element RE2, i.e., the carrier CA3 of the first rear planetary gear set 160 and the carrier CA4 of the second rear planetary gear set 162 which are connected together, to the transmission case 16, thereby establishing first reverse gear "R1" which has a gear ratio γR1 of approximately 10.194.

Further, the fourth clutch C4 is engaged to connect the first rotating element RE1, i.e., the sun gear S3 of the first rear planetary gear set 160, with the input shaft 22 which is the input rotating member, while the second brake B2 is engaged to hold the second rotating element RE2, i.e., the carrier CA3 of the first rear planetary gear set 160 and the carrier CA4 of the second rear planetary gear set 162 which are connected together, to the transmission case 16, thereby establishing second reverse gear "R2" which has a gear ratio γR2 which is smaller than the gear ratio γR1 of the first reverse gear, e.g., 5.375. The gear ratio ρ1 of the first front planetary gear set 156, the gear ratio ρ2 of the second front planetary gear set 158, the gear ratio ρ3 of the first rear planetary gear set 160, and the gear ratio ρ4 of the second rear planetary gear set 162 are designed so that the foregoing gear ratios can be achieved.

Also, in the transmission 154 that achieves the gears in accordance with the clutch and brake engagement chart shown in FIG. 109, the ratio of the gear ratio γ1 of the first gear to the gear ratio γ2 of the second gear (=γ1/γ2) is 1.542, the ratio of the gear ratio γ2 of the second gear to the gear ratio γ3 of the third gear (=γ2/γ3) is 1.480, the ratio of the gear ratio γ3 of the third gear to the gear ratio γ4 of the fourth gear (=γ3/γ4) is 1.314, the ratio of the gear ratio γ4 of the fourth gear to the gear ratio γ5 of the fifth gear (=γ4/γ5) is 1.214, the ratio of the gear ratio γ5 of the fifth gear to the gear ratio γ6 of the sixth gear (=γ5/γ6) is 1.316, the ratio of the gear ratio γ6 of the sixth gear to the gear ratio γ7 of the seventh gear (=γ6/γ7) is 1.187, the ratio of the gear ratio γ7 of the seventh gear to the gear ratio γ8 of the eighth gear (=γ7/γ8) is 1.088, and the ratio of the gear ratio γ8 of the eighth gear to the gear ratio γ9 of the ninth gear (=γ8/γ9) is 1.090. Thus, each gear ratio γ changes in substantially equal ratio. Also, the total gear ratio range, which is the ratio of the gear ratio γ1 of the first gear to the gear ratio γ9 of the ninth gear (=γ1/γ9), is 6.748, which is a relatively large value.

In the alignment graph shown in FIG. 110, the four vertical lines Y1 through Y4 represent components of the first transmitting portion 164. From left to right in the graph, line Y1 represents the sun gear S2 of the second front planetary gear set 158, line Y2 represents the sun gear S1 of the first front planetary gear set 156, line Y3 represents the ring gear R1 of the first front planetary gear set 156 and the carrier CA2 of the second front planetary gear set 158 which are connected together, and line Y4 represents the carrier CA1 of the first front planetary gear set 156 and the ring gear R2 of the second front planetary gear set 158 which are connected together. Further, the four vertical lines Y5 through Y8 represent components of the second transmitting portion 166. From left to right in the graph, line Y5 represents the sun gear S3 of the first rear planetary gear set 160 which corresponds to the first rotating element RE1, line Y6 represents the carrier CA3 of the first rear planetary gear set 160 and the carrier CA4 of the second rear planetary gear set 162 which are connected together and correspond to the second rotating element RE2, line Y7 represents the ring gear R4 of the second rear planetary gear set 162 which corresponds to the third rotating element RE3, and line Y8 represents the ring gear R3 of the first rear planetary gear set 160 and the sun gear S4 of the second rear planetary gear set 162 which are connected together and correspond to the fourth rotating element RE4.

In the alignment graph in FIG. 110, in first gear, the first clutch C1 is engaged to connect the fourth rotating element RE4 to the first intermediate output member 32, which results in the fourth rotating element RE4 rotating at the same speed as the first intermediate output member 32. Meanwhile, the second brake B2 is engaged to hold the second rotating element RE2 to the transmission case 16 which is a non-rotating member, which results in the rotation speed of the second rotating element RE2 being "0". Accordingly, the rotation speed of the output shaft 36 is indicated by the point (1st) where the straight line that connects the point of intersection of the vertical line Y6 and the horizontal line XZ with the point of intersection of the vertical line Y8 and the horizontal line X2, intersects with the vertical line Y7.

In second gear, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (2nd) where the straight line that connects the point of intersection of the vertical line Y5 and the horizontal line X1 with the point of intersection of the vertical line Y8 and the horizontal line X2, intersects with the vertical line Y7.

In third gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the straight line that connects the point of intersection of the vertical line Y5 and the horizontal line XZ with the point of intersection of the vertical line Y8 and the horizontal line X2, intersects with the vertical line Y7.

In fourth gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the horizontal line X2 intersects with the vertical line Y7.

In fifth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the straight line that connects the point of intersection of the vertical line Y5 and the horizontal line X3 with the point of intersection of the vertical line Y8 and the horizontal line X2, intersects with the vertical line Y7.

In sixth gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (6th) where the straight line that connects the point of intersection of the vertical line Y6 and the horizontal line X3 with the point of intersection of the vertical line Y8 and the horizontal line X2, intersects with the vertical line Y7.

In seventh gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (7th) where the horizontal line X3 intersects with the vertical line Y7.

In eighth gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the straight line that connects the point of intersection of the vertical line Y5 and the horizontal line X2 with the point of intersection of the vertical line Y6 and the horizontal line X3, intersects with the vertical line Y7.

In ninth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line XZ with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to this second modified example of the ninth exemplary embodiment, first gear is established by engaging the first clutch C1 and the second brake B2. Second gear is established by engaging the first clutch C1 and the fifth clutch C5. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4, and eighth gear is established by engaging the second clutch C2 and the third clutch C3. Thus, this transmission 154 of the second modified example of the ninth exemplary embodiment is able to achieve eight forward gears.

The transmission 154 of this second modified example of the ninth exemplary embodiment is also able to achieve ninth gear by engaging the second clutch C2 and the first brake B1. Therefore, in addition to being able to achieve nine forward gears, the step between eighth gear and ninth gear is able to be preferably set relatively small with a close ratio.

Figure 112:
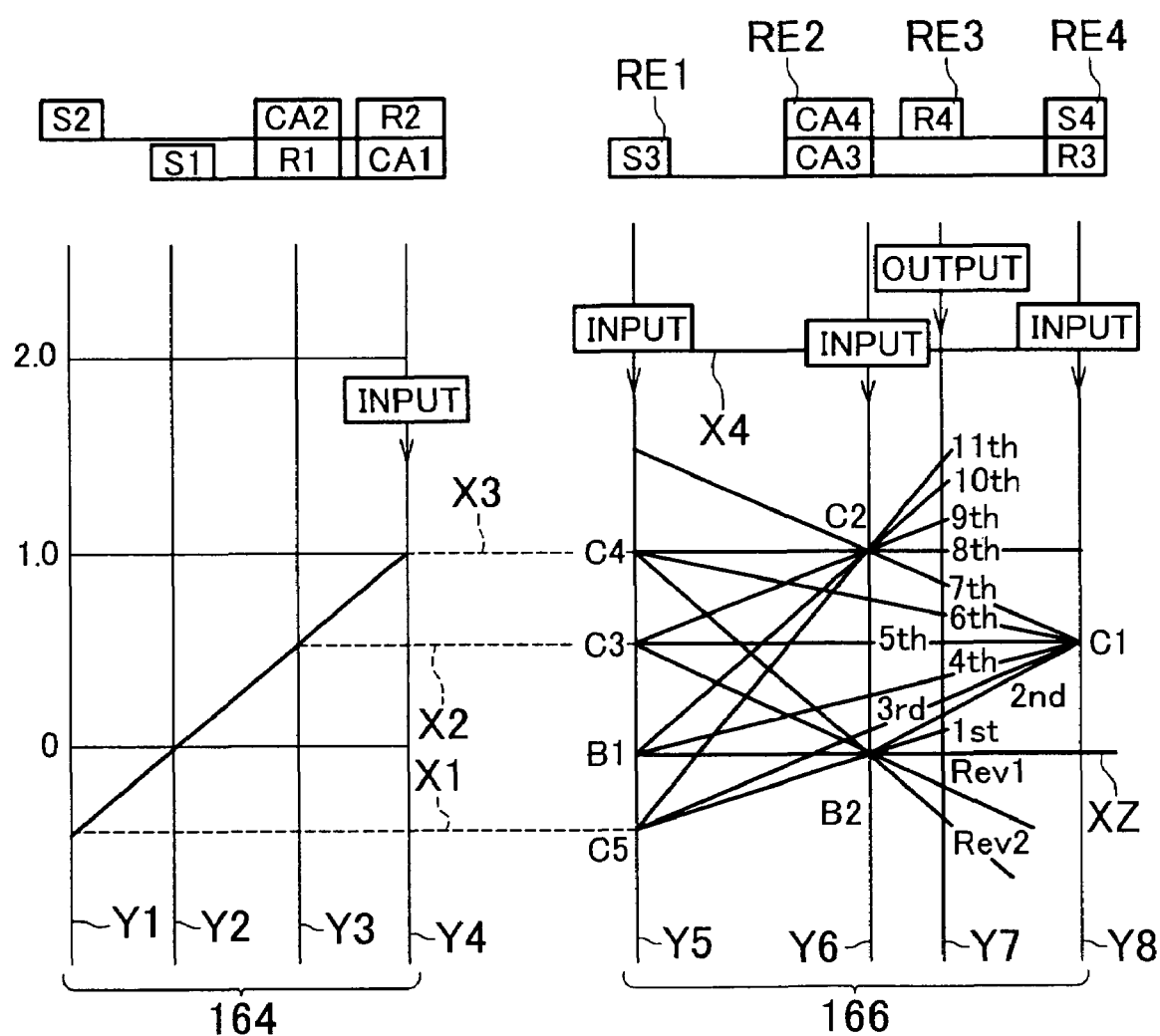
FIG. 112 is an alignment graph corresponding to FIG. 111, which is able to express, with straight lines, the relative relationships between the rotation speeds of various rotating elements which are connected differently in each gear in the transmission according to the third modified example of the ninth exemplary embodiment of the invention.

Also, as a third modified example of the ninth exemplary embodiment, the transmission 154 can achieve eleven forward gears and two reverse gears by engaging the clutches and brakes in different combinations, as shown in FIG. 111, in response to a command from the ECU 42, and suitably setting the gear ratio of each planetary gear set. Also, FIG. 112 is an alignment graph corresponding to FIG. 111, which shows the rotation speeds of the rotating elements in each gear. Hereinafter, the clutch and brake engagement chart and alignment graph according to the third modified example of the ninth exemplary embodiment shown in FIGS. 111 and 112, which differ from those of the foregoing exemplary embodiment, will be described.

As shown in the clutch and brake engagement chart in FIG. 111, any one of eleven forward gears, i.e., a first gear "1st" through an eleventh gear "11th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 111, the fifth clutch C5 is engaged to connect the first rotating element RE1, i.e., the sun gear S3 of the first rear planetary gear set 160, with the second intermediate output member 34, while the second brake B2 is engaged to hold the second rotating element RE2, i.e., the carrier CA3 of the first rear planetary gear set 160 and the carrier CA4 of the second rear planetary gear set 162 which are connected together, to the transmission case 16 which is a non-rotating member, thereby establishing first gear which has the largest gear ratio γ1, e.g., approximately 9.854.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the second brake B2 is engaged to hold the second rotating element RE2, i.e., the carrier CA3 of the first rear planetary gear set 160 and the carrier CA4 of the second rear planetary gear set 162 which are connected together, to the transmission case 16 which is a non-rotating member, thereby establishing second gear which has a gear ratio γ2 which is smaller than the gear ratio γ1 of first gear, e.g., approximately 5.690.

Further, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the fifth clutch C5 is engaged to connect the first rotating element RE1, i.e., the sun gear S3 of the first rear planetary gear set 160, with the second intermediate output member 34, thereby establishing third gear which has a gear ratio γ3 which is smaller than the gear ratio γ2 of second gear, e.g., approximately 3.689.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the first brake B1 is engaged to hold the first rotating element RE1, i.e., the sun gear S3 of the first rear planetary gear set 160, to the transmission case 16, thereby establishing fourth gear which has a gear ratio γ4 which is smaller than the gear ratio γ3 of third gear, e.g., approximately 2.492.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the third clutch C3 is engaged to connect the first rotating element RE1, i.e., the sun gear S3 of the first rear planetary gear set 160, with the first intermediate output member 32, thereby establishing fifth gear which has a gear ratio γ5 which is smaller than the gear ratio γ4 of fourth gear, e.g., approximately 1.897.

Further, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the fourth clutch C4 is engaged to connect the first rotating element RE1, i.e., the sun gear S3 of the first rear planetary gear set 160, with the input shaft 22 which is the input rotating member, thereby establishing sixth gear which has a gear ratio γ6 which is smaller than the gear ratio γ5 of fifth gear, e.g., approximately 1.562.

Also, the first clutch C1 is engaged to connect the fourth rotating element RE4, i.e., the ring gear R3 of the first rear planetary gear set 160 and the sun gear S4 of the second rear planetary gear set 162 which are connected together, with the first intermediate output member 32, while the second clutch C2 is engaged to connect the second rotating element RE2, i.e., the carrier CA3 of the first rear planetary gear set 160 and the carrier CA4 of the second rear planetary gear set 162 which are connected together, with the input shaft 22, thereby establishing seventh gear which has a gear ratio γ7 which is smaller than the gear ratio γ6 of sixth gear, e.g., approximately 1.187.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the fourth clutch C4 is engaged to connect the first rotating element RE1, i.e., the sun gear S3 of the first rear planetary gear set 160, with the input shaft 22 which is the input rotating member, thereby establishing eighth gear which has a gear ratio γ8 which is smaller than the gear ratio γ7 of seventh gear, e.g., approximately 1.000.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the third clutch C3 is engaged to connect the first rotating element RE1, i.e., the sun gear S3 of the first rear planetary gear set 160, to the first intermediate output member 32, thereby establishing ninth gear which has a gear ratio γ9 which is smaller than the gear ratio γ8 of eighth gear, e.g., approximately 0.919.

Also, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the first brake B1 is engaged to hold the first rotating element RE1, i.e., the sun gear S3 of the first rear planetary gear set 160, to the transmission case 16, thereby establishing tenth gear which has a gear ratio γ10 which is smaller than the gear ratio γ9 of ninth gear, e.g., approximately 0.843.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the fifth clutch C5 is engaged to connect the first rotating element RE1, i.e., the sun gear S3 of the first rear planetary gear set 160, with the second intermediate output member 34, thereby establishing eleventh gear which has the smallest gear ratio γ11, e.g., approximately 0.777.

Also, the third clutch C3 is engaged to connect the first rotating element RE1, i.e., the sun gear S3 of the first rear planetary gear set 160, with the first intermediate output member 32, while the second brake B2 is engaged to hold the second rotating element RE2, i.e., the carrier CA3 of the first rear planetary gear set 160 and the carrier CA4 of the second rear planetary gear set 162 which are connected together, to the transmission case 16, thereby establishing first reverse gear "R1" which has a gear ratio γR1 of approximately 10.194.

Further, the fourth clutch C4 is engaged to connect the first rotating element RE1, i.e., the sun gear S3 of the first rear planetary gear set 160, with the input shaft 22 which is the input rotating member, while the second brake B2 is engaged to hold the second rotating element RE2, i.e., the carrier CA3 of the first rear planetary gear set 160 and the carrier CA4 of the second rear planetary gear set 162 which are connected together, to the transmission case 16, thereby establishing second reverse gear "R2" which has a gear ratio γR2 which is smaller than the gear ratio γR1 of the first reverse gear, e.g., 5.375. The gear ratio ρ1 of the first front planetary gear set 156, the gear ratio ρ2 of the second front planetary gear set 158, the gear ratio ρ3 of the first rear planetary gear set 160, and the gear ratio ρ4 of the second rear planetary gear set 162 are designed so that the foregoing gear ratios can be achieved.

Also, in the transmission 154 that achieves the gears in accordance with the clutch and brake engagement chart shown in FIG. 111, the ratio of the gear ratio γ1 of the first gear to the gear ratio γ2 of the second gear (=γ1/γ2) is 1.732, the ratio of the gear ratio γ2 of the second gear to the gear ratio γ3 of the third gear (=γ2/γ3) is 1.542, the ratio of the gear ratio γ3 of the third gear to the gear ratio γ4 of the fourth gear (=γ3/γ4) is 1.480, the ratio of the gear ratio γ4 of the fourth gear to the gear ratio γ5 of the fifth gear (=γ4/γ5) is 1.314, the ratio of the gear ratio γ5 of the fifth gear to the gear ratio γ6 of the sixth gear (=γ5/γ6) is 1.214, the ratio of the gear ratio γ6 of the sixth gear to the gear ratio γ7 of the seventh gear (=γ6/γ7) is 1.316, the ratio of the gear ratio γ7 of the seventh gear to the gear ratio γ8 of the eighth gear (=γ7/γ8) is 1.187, the ratio of the gear ratio γ8 of the eighth gear to the gear ratio γ9 of the ninth gear (=γ8/γ9) is 1.088, the ratio of the gear ratio γ9 of the ninth gear to the gear ratio γ10 of the tenth gear (=γ9/γ10) is 1.090, and the ratio of the gear ratio γ10 of the tenth gear to the gear ratio γ11 of the eleventh gear (=γ10/γ11) is 1.086. Thus, each gear ratio γ changes in substantially equal ratio. Also, the total gear ratio range, which is the ratio of the gear ratio γ1 of the first gear to the gear ratio γ11 of the eleventh gear (=$\sqrt[3]{1/\gamma 11}$), is 12.688, which is a relatively large value.

In the alignment graph shown in FIG. 112, the four vertical lines Y1 through Y4 representing components of the first transmitting portion 164 and the four vertical lines Y5 through Y8 representing components of the second transmitting portion 166 represent the same rotating elements as in FIG. 106 because the structure shown in the skeleton view is the same.

In the alignment graph in FIG. 112, in first gear, the fifth clutch C5 is engaged to connect the first rotating element RE1 to the second intermediate output member 34, which results in the first rotating element RE1 rotating at the same speed as the second intermediate output member 34. Meanwhile, the second brake B2 is engaged to hold the second rotating element RE2 to the transmission case 16 which is a non-rotating member, which results in the rotation speed of the second rotating element RE2 being "0". Accordingly, the rotation speed of the output shaft 36 is indicated by the point (1st) where the straight line that connects the point of intersection of the vertical line Y5 and the horizontal line X1 with the point of intersection of the vertical line Y6 and the horizontal line XZ, intersects with the vertical line Y7.

In second gear, the first clutch C1 is engaged to connect the fourth rotating element RE4 to the first intermediate output member 32, which results in the fourth rotating element RE4 rotating at the same speed as the first intermediate output member 32. Meanwhile, the second brake B2 is engaged to hold the second rotating element RE2 to the transmission case 16 which is a non-rotating member, resulting in the rotation speed of the second rotating element RE2 being "0". Accordingly, the rotation speed of the output shaft 36 is indicated by the point (2nd) where the straight line that connects the point of intersection of the vertical line Y6 and the horizontal line XZ with the point of intersection of the vertical line Y8 and the horizontal line X2, intersects with the vertical line Y7.

In third gear, the fifth clutch C5 is engaged to connect the first rotating element RE1 to the second intermediate output member 34, which results in the first rotating element RE1 rotating at the same speed as the second intermediate output member 34. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (3rd) where the straight line that connects the point of intersection of the vertical line Y5 and the horizontal line X1 with the point of intersection of the vertical line Y8 and the horizontal line X2, intersects with the vertical line Y7.

In fourth gear, the first brake B1 is engaged to hold the first rotating element RE1 to the transmission case 16, which results in the rotation speed of the first rotating element RE1 being "0". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (4th) where the straight line that connects the point of intersection of the vertical line Y5 and the horizontal line XZ with the point of intersection of the vertical line Y8 and the horizontal line X2, intersects with the vertical line Y7.

In fifth gear, the third clutch C3 is engaged to connect the first rotating element RE1 to the first intermediate output member 32, resulting in the first rotating element RE1 rotating at the same speed as the first intermediate output member 32. Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (5th) where the horizontal line X2 intersects with the vertical line Y7.

In sixth gear, the fourth clutch C4 is engaged to connect the first rotating element RE1 to the input shaft 22 which is the input rotating member, resulting in the rotation speed of the first rotating element RE1 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (6th) where the straight line that connects the point of intersection of the vertical line Y5 and the horizontal line X3 with the point of intersection of the vertical line Y8 and the horizontal line X2, intersects with the vertical line Y7.

In seventh gear, the second clutch C2 is engaged to connect the second rotating element RE2 to the input shaft 22 which is the input rotating member, resulting in the rotation speed of the second rotating element RE2 being "1". Meanwhile, the first clutch C1 is engaged to connect the fourth rotating element RE4 to the first intermediate output member 32, resulting in the fourth rotating element RE4 rotating at the same speed as the first intermediate output member 32. Accordingly, the rotation speed of the output shaft 36 is indicated by the point (7th) where the straight line that connects the point of intersection of the vertical line Y6 and the horizontal line X3 with the point of intersection of the vertical line Y8 and the horizontal line X2, intersects with the vertical line Y7.

In eighth gear, the fourth clutch C4 is engaged to connect the first rotating element RE1 to the input shaft 22 which is the input rotating member, resulting in the rotation speed of the first rotating element RE1 being "1". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (8th) where the horizontal line X3 intersects with the vertical line Y7.

In ninth gear, the third clutch C3 is engaged to connect the first rotating element RE1 to the first intermediate output member 32, resulting in the first rotating element RE1 rotating at the same speed as the first intermediate output member 32. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (9th) where the straight line that connects the point of intersection of the vertical line Y5 and the horizontal line X2 with the point of intersection of the vertical line Y6 and the horizontal line X3, intersects with the vertical line Y7.

In tenth gear, the first brake B1 is engaged to hold the first rotating element RE1 to the transmission case 16, resulting in the rotation speed of the first rotating element RE1 being "0". Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (10th) where the straight line that connects the point of intersection of the vertical line Y5 and the horizontal line XZ with the point of intersection of the vertical line Y6 and the horizontal line X3, intersects with the vertical line Y7.

In eleventh gear, the fifth clutch C5 is engaged to connect the first rotating element RE1 to the second intermediate output member 34, resulting in the first rotating element RE1 rotating at the same speed as the second intermediate output member 34. Meanwhile, the second clutch C2 is engaged to connect the second rotating element RE2 to the input shaft 22 which is the input rotating member, resulting in the rotation speed of the second rotating element RE2 being "1". Accordingly, the rotation speed of the output shaft 36 is indicated by the point (11th) where the straight line that connects the point of intersection of the vertical line Y5 and the horizontal line X1 with the point of intersection of the vertical line Y6 and the horizontal line X3, intersects with the vertical line Y7.

In the first reverse gear, the third clutch C3 is engaged to connect the first rotating element RE1 to the first intermediate output member 32, resulting in the first rotating element RE1 rotating at the same speed as the first intermediate output member 32. Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev1) where the straight line that connects the point of intersection of the vertical line Y5 and the horizontal line X2 with the point of intersection of the vertical line Y6 and the horizontal line XZ, intersects with the vertical line Y7.

In the second reverse gear, the fourth clutch C4 is engaged to connect the first rotating element RE1 to the input shaft 22 which is the input rotating member, resulting in the rotation speed of the first rotating element RE1 being "1". Meanwhile, the second brake B2 is engaged to hold the second rotating element RE2 to the transmission case 16, resulting in the rotation speed of the second rotating element RE2 being "0". Accordingly, the rotation speed of the output shaft 36 is indicated by the point (Rev2) where the straight line that connects the point of intersection of the vertical line Y5 and the horizontal line X3 with the point of intersection of the vertical line Y6 and the horizontal line XZ, intersects with the vertical line Y7.

In this way, according to this third modified example of the ninth exemplary embodiment, first gear is established by engaging the fifth clutch C5 and the second brake B2. Second gear is established by engaging the first clutch C1 and the second brake B2. Third gear is established by engaging the first clutch C1 and the fifth clutch C5. Fourth gear is established by engaging the first clutch C1 and the first brake B1. Fifth gear is established by engaging the first clutch C1 and the third clutch C3. Sixth gear is established by engaging the first clutch C1 and the fourth clutch C4. Seventh gear is established by engaging the first clutch C1 and the second clutch C2. Eighth gear is established by engaging the second clutch C2 and the fourth clutch C4. Ninth gear is established by engaging the second clutch C2 and the third clutch C3. Tenth gear is established by engaging the second clutch C2 and the first brake B1, and eleventh gear is established by engaging the second clutch C2 and the fifth clutch C5. Therefore, in addition to being able to achieve eleven forward gears, the steps between eighth gear and eleventh gear are able to be preferably set relatively small with a close ratio.

Further, in a conventional 4WD vehicle or the like, the transfer houses a low gear or high gear switching mechanism such that a low gear which is lower than "1st" is used when traveling on poor roads or when getting the vehicle out of mud. This switching mechanism increases the size of the transfer, which both increases the weight of the vehicle and hinders mountability. In the transmission according to this exemplary embodiment, however, first gear can be set extremely low which obviates the need for this transfer switching mechanism, thereby enabling the transfer to be simpler and lighter in weight.

Figure 113:
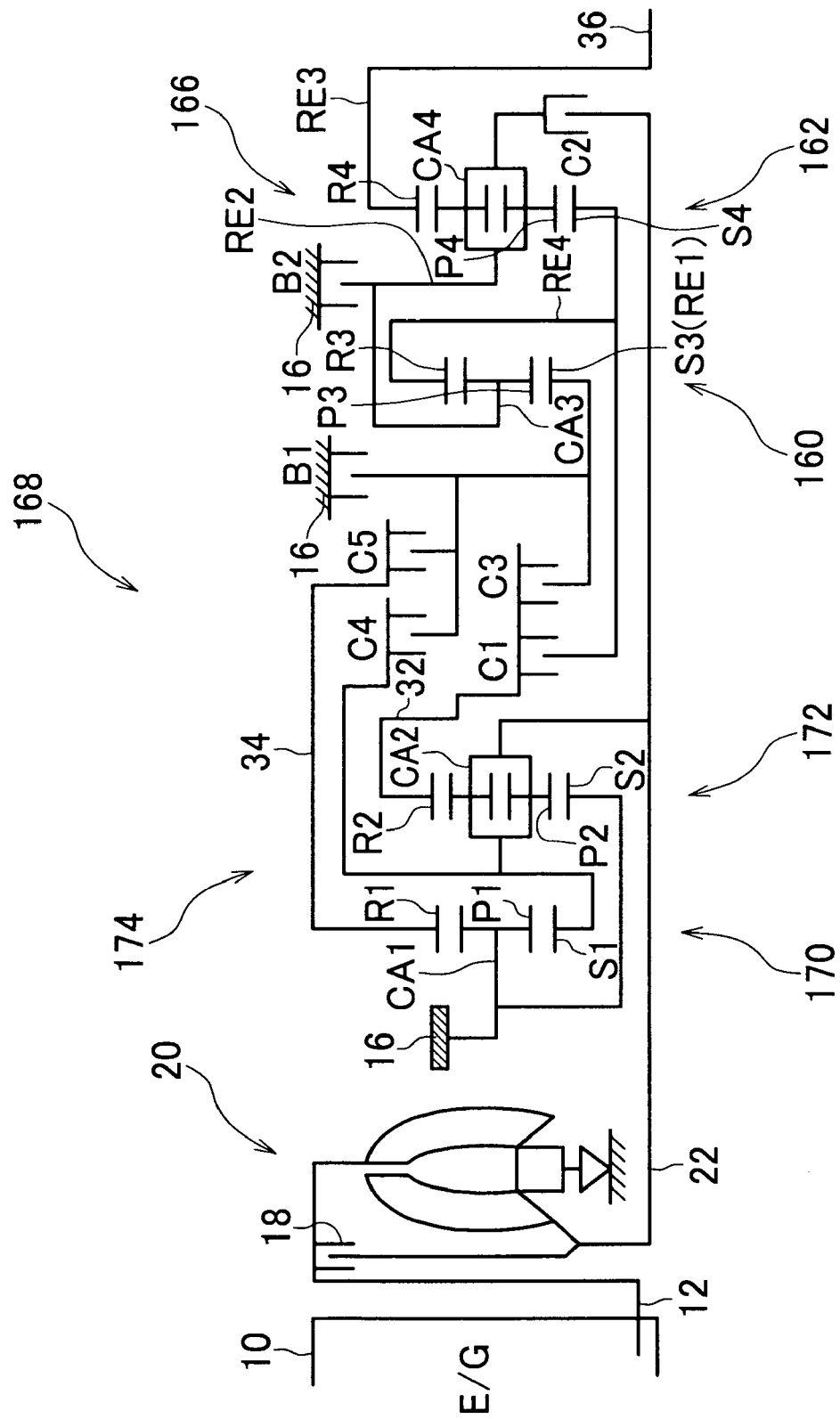
FIG. 113 is a skeleton view of the structure of a multi-speed transmission for a vehicle according to a tenth exemplary embodiment of the invention.
Figure 116:
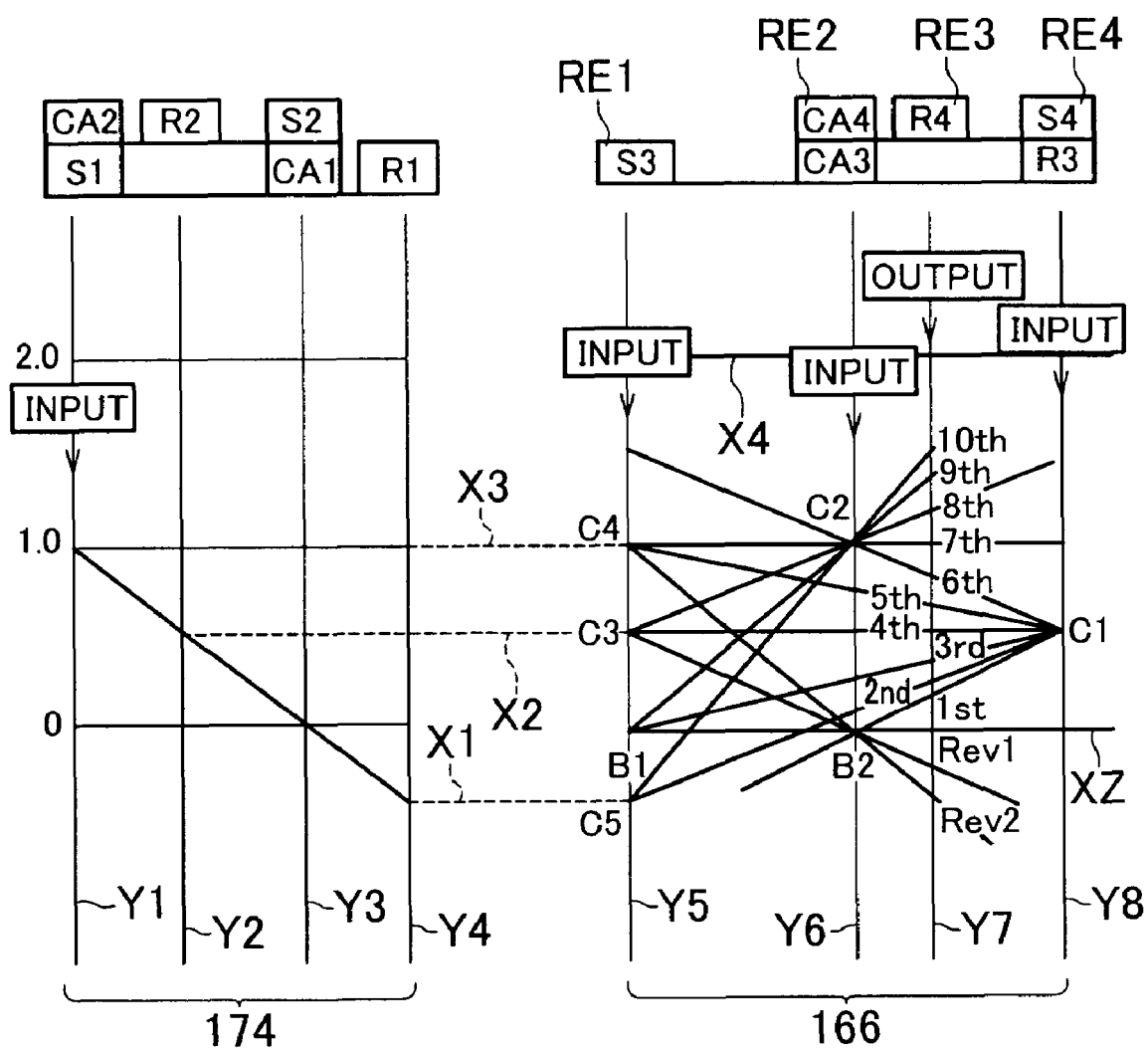
FIG. 116 is an alignment graph which is able to express, with straight lines, the relative relationships between the rotation speeds of various rotating elements which are connected differently in each gear in the transmission according to the tenth exemplary embodiment of the invention and the transmission according to the first modified example of the tenth exemplary embodiment of the invention.

FIG. 113 is a skeleton view of the structure of a transmission 168 according to a tenth exemplary embodiment of the invention. FIGS. 114 and 115 are charts showing the relationship between gears and operations of friction engagement devices necessary to establish those gears in the transmission 168. FIG. 116 is an alignment graph showing the rotation speeds of rotating elements in each gear. With the exception of the structure of a first transmitting portion 174, the transmission 168 of this exemplary embodiment is similar in structure to the transmission 154 shown in FIG. 105, so effects equivalent to those obtained from the foregoing exemplary embodiment can be obtained with this exemplary embodiment. Hereinafter, parts of the transmission 168 of this exemplary embodiment which differ from parts of the transmission 154 will be described.

As shown in FIG. 113, a first front planetary gear set 170 which makes up part of the first transmitting portion 174 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 172 which also makes up part of the first transmitting portion 174 is a double pinion type planetary gear set which includes a sun gear S2, a plurality of sets of pinions P2 which are in mesh with each other, a carrier CA2 which rotatably and revolvably supports the pinions P2, and a ring gear R2 that is in mesh with the sun gear S2 via the pinions P2.

In the first transmitting portion 174, the carrier CA1 of the first front planetary gear set 170 and the sun gear S2 of the second front planetary gear set 172 are connected together as well as integrally connected to the transmission case 16 which is a non-rotating member, which prevents relative rotation with respect to the transmission case 16. The sun gear S1 of the first front planetary gear set 170 and the carrier CA2 of the second front planetary gear set 172 are connected together as well as integrally connected to the input shaft 22 which is the input rotating member. Further, the ring gear R2 of the second front planetary gear set 172 is integrally connected to the first intermediate output member 32, and the ring gear R1 of the first front planetary gear set 170 is integrally connected to the second intermediate output member 34. This kind of structure results in the first transmitting portion 174 slowing down the rotation from the input shaft 22 and transmitting that slowed rotation to the second transmitting portion 166 via the first intermediate output member 32, and reversing the rotation from the input shaft 22 and transmitting that reverse rotation to the second transmitting portion 166 via the second intermediate output member 34.

In the transmission 168 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 114, for example, in response to a command from the ECU 42, and a gear ratio γ (=input shaft rotation speed NIN/output shaft rotation speed NOUT) that changes in substantially equal ratio is able to be achieved for each gear.

In the transmission 168 which establishes the gears according to the clutch and brake engagement chart shown in FIG. 114, the gear ratio γ1 of first gear is approximately 5.283, the gear ratio γ2 of second gear is approximately 3.605, the gear ratio γ3 of third gear is approximately 2.472, the gear ratio γ4 of fourth gear is approximately 1.897, the gear ratio γ5 of fifth gear is approximately 1.569, the gear ratio γ6 of sixth gear is approximately 1.024, the gear ratio γ7 of seventh gear is approximately 1.000, the gear ratio γ8 of eighth gear is approximately 0.912, the gear ratio γ9 of ninth gear is approximately 0.830, the gear ratio γ10 of tenth gear is approximately 0.760, the gear ratio γR1 of first reverse gear is approximately 9.257, and the gear ratio γR2 of second reverse gear is approximately 4.881. Further, the ratio of the gear ratio γ1 of the first gear to the gear ratio γ2 of the second gear (=γ1/γ2) is 1.466, the ratio of the gear ratio γ2 of the second gear to the gear ratio γ3 of the third gear (=γ2/γ3) is 1.458, the ratio of the gear ratio γ3 of the third gear to the gear ratio γ4 of the fourth gear (=γ3/γ4) is 1.304, the ratio of the gear ratio γ4 of the fourth gear to the gear ratio γ5 of the fifth gear (=γ4/γ5) is 1.209, the ratio of the gear ratio γ5 of the fifth gear to the gear ratio γ6 of the sixth gear (=γ5/γ6) is 1.303, the ratio of the gear ratio γ6 of the sixth gear to the gear ratio γ7 of the seventh gear (=γ6/γ7) is 1.204, the ratio of the gear ratio γ7 of the seventh gear to the gear ratio γ8 of the eighth gear (=γ7/γ8) is 1.097, the ratio of the gear ratio γ8 of the eighth gear to the gear ratio γ9 of the ninth gear (=γ8/γ9) is 1.098, and the ratio of the gear ratio γ9 of the ninth gear to the gear ratio γ10 of the tenth gear (=γ9/γ10) is 1.093. Thus, each gear ratio γ changes in substantially equal ratio. Also, the total gear ratio range, which is the ratio of the gear ratio γ1 of the first gear to the gear ratio γ10 of the tenth gear (=γ1/γ10), is 6.956, which is a relatively large value. The gear ratio ρ1 of the first front planetary gear set 170, the gear ratio ρ2 of the second front planetary gear set 172, the gear ratio ρ3 of the first rear planetary gear set 160, and the gear ratio ρ4 of the second rear planetary gear set 162 are designed so that the foregoing gear ratios can be achieved.

Also, as a first modified example of the tenth exemplary embodiment, the transmission 168 can achieve gears such as those shown in FIG. 115 by suitably setting the gear ratios ρ1 through ρ4 of the planetary gear sets even though the engagement operations for each gear do not change. In the transmission 168 which establishes the gears according to the clutch and brake engagement chart shown in FIG. 115, the gear ratio γ1 of first gear is approximately 5.690, the gear ratio γ2 of second gear is approximately 3.689, the gear ratio γ3 of third gear is approximately 2.492, the gear ratio γ4 of fourth gear is approximately 1.897, the gear ratio γ5 of fifth gear is approximately 1.562, the gear ratio γ6 of sixth gear is approximately 1.187, the gear ratio γ7 of seventh gear is approximately 1.000, the gear ratio γ8 of eighth gear is approximately 0.919, the gear ratio γ9 of ninth gear is approximately 0.843, the gear ratio γ10 of tenth gear is approximately 0.777, the gear ratio γR1 of first reverse gear is approximately 10.194, and the gear ratio γR2 of second reverse gear is approximately 5.375. Further, the ratio of the gear ratio γ1 of the first gear to the gear ratio γ2 of the second gear (=γ1/γ2) is 1.542, the ratio of the gear ratio γ2 of the second gear to the gear ratio γ3 of the third gear (=γ2/γ3) is 1.480, the ratio of the gear ratio γ3 of the third gear to the gear ratio γ4 of the fourth gear (=γ3/γ4) is 1.314, the ratio of the gear ratio γ4 of the fourth gear to the gear ratio γ5 of the fifth gear (=γ4/γ5) is 1.214, the ratio of the gear ratio γ5 of the fifth gear to the gear ratio γ6 of the sixth gear (=γ5/γ6) is 1.316, the ratio of the gear ratio γ6 of the sixth gear to the gear ratio γ7 of the seventh gear (=γ6/γ7) is 1.187, the ratio of the gear ratio γ7 of the seventh gear to the gear ratio γ8 of the eighth gear (=γ7/γ8) is 1.088, the ratio of the gear ratio γ8 of the eighth gear to the gear ratio γ9 of the ninth gear (=γ8/γ9) is 1.090, and the ratio of the gear ratio γ9 of the ninth gear to the gear ratio γ10 of the tenth gear (=γ9/γ10) is 1.086. Thus, each gear ratio γ changes in substantially equal ratio. Also, the total gear ratio range, which is the ratio of the gear ratio γ1 of the first gear to the gear ratio γ10 of the tenth gear (=γ1/γ10), is 7.326, which is a relatively large value. By suitably setting the gear ratio of each planetary gear set in this way, the total gear ratio range can be set wider than the total gear ratio range shown in FIG. 114.

In the alignment graph shown in FIG. 116, the four vertical lines Y1 through Y4 represent components of the first transmitting portion 174. From left to right in the graph, line Y1 represents the sun gear S1 of the first front planetary gear set 170 and the carrier CA2 of the second front planetary gear set 172 which are connected together to form one rotating element, line Y2 represents the ring gear R2 of the second front planetary gear set 172 which is another rotating element, line Y3 represents the carrier CA1 of the first front planetary gear set 170 and the sun gear S2 of the second front planetary gear set 172 which are connected together to form another rotating element, and line Y4 represents the ring gear R1 of the first front planetary gear set 170 which is another rotating element. Accordingly, based on these rotating elements, the alignment graph shown in FIG. 116 is similar to that shown in FIG. 108 described above so a description thereof will be omitted.

Figure 118:
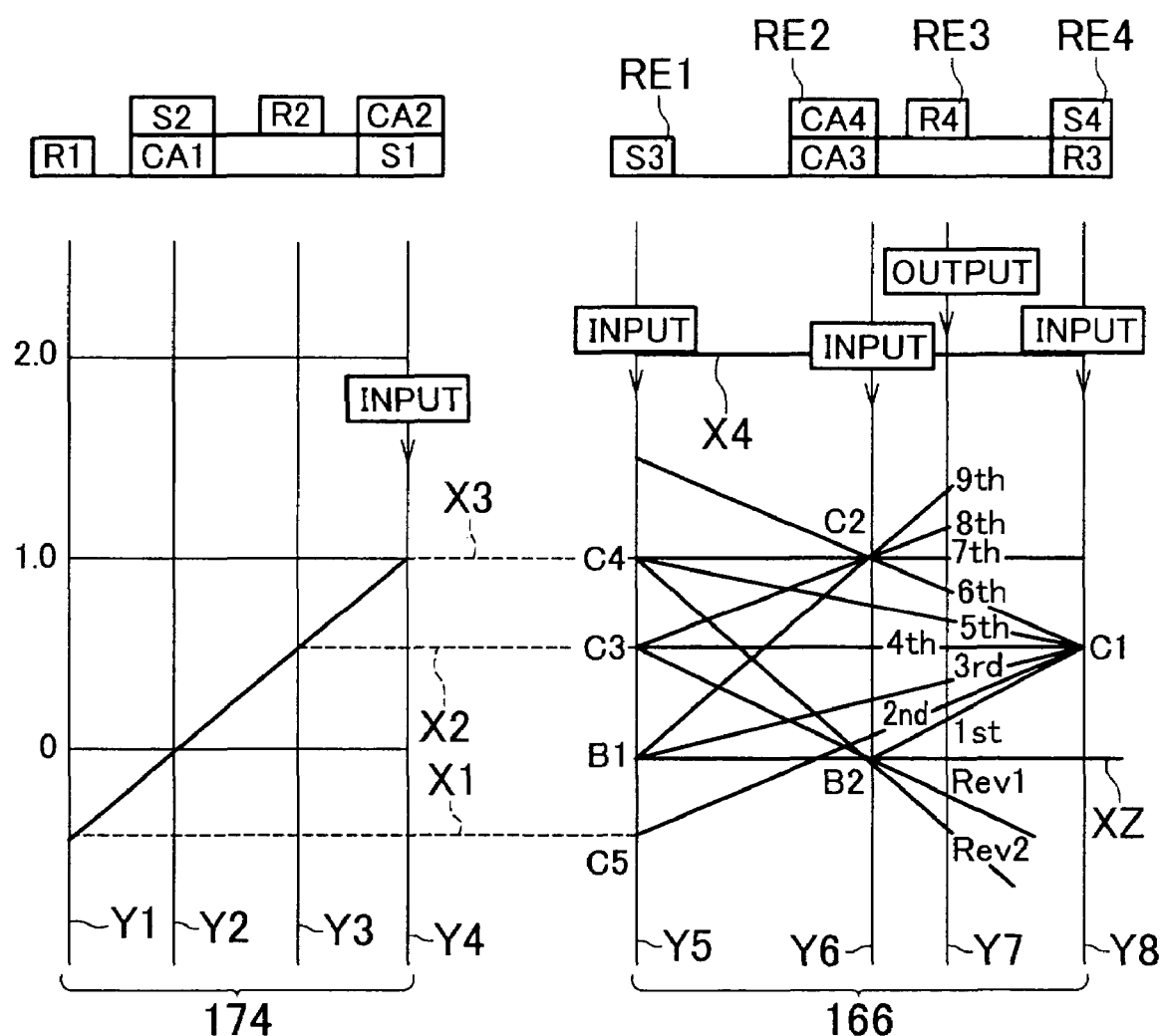
FIG. 118 is an alignment graph corresponding to FIG. 117, which is able to express, with straight lines, the relative relationships between the rotation speeds of various rotating elements which are connected differently in each gear in the transmission according to the second modified example of the tenth exemplary embodiment of the invention.

Here, as a second modified example of the tenth exemplary embodiment, the transmission 168 can achieve nine forward gears and two reverse gears by engaging the clutches and brakes in different combinations, as shown in FIG. 117, in response to a command from the ECU 42, and suitably setting the gear ratio of each planetary gear set. Also, FIG. 118 is an alignment graph corresponding to FIG. 117, which shows the rotation speeds of the rotating elements in each gear. Hereinafter, the clutch and brake engagement chart and alignment graph according to the second modified example of the tenth exemplary embodiment shown in FIGS. 117 and 118, which differ from those of the foregoing exemplary embodiment, will be described.

As shown in the clutch and brake engagement chart in FIG. 117, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear.

As shown in FIG. 117, the first clutch C1 is engaged to connect the fourth rotating element RE4, i.e., ring gear R3 of the first rear planetary gear set 160 and the sun gear S4 of the second rear planetary gear set 162 which are connected together, with the first intermediate output member 32, while the second brake B2 is engaged to hold the second rotating element RE2, i.e., the carrier CA3 of the first rear planetary gear set 160 and the carrier CA4 of the second rear planetary gear set 162 which are connected together, to the transmission case 16 which is a non-rotating member, thereby establishing first gear which has the largest gear ratio γ1, e.g., approximately 5.690.

Also, the first clutch C1 is engaged to connect the fourth rotating element RE4, i.e., ring gear R3 of the first rear planetary gear set 160 and the sun gear S4 of the second rear planetary gear set 162 which are connected together, with the first intermediate output member 32, while the fifth clutch C5 is engaged to connect the first rotating element RE1, i.e., the sun gear S3 of the first rear planetary gear set 160, with the second intermediate output member 34, thereby establishing second gear which has a gear ratio γ2 which is smaller than the gear ratio γ1 of first gear, e.g., approximately 3.689.

Further, the first clutch C1 is engaged to connect the fourth rotating element RE4, i.e., ring gear R3 of the first rear planetary gear set 160 and the sun gear S4 of the second rear planetary gear set 162 which are connected together, with the first intermediate output member 32, while the first brake B1 is engaged to hold the first rotating element RE1, i.e., the sun gear S3 of the first rear planetary gear set 160, to the transmission case 16, thereby establishing third gear which has a gear ratio γ3 which is smaller than the gear ratio γ2 of second gear, e.g., approximately 2.492.

Also, the first clutch C1 is engaged to connect the fourth rotating element RE4, i.e., ring gear R3 of the first rear planetary gear set 160 and the sun gear S4 of the second rear planetary gear set 162 which are connected together, with the first intermediate output member 32, while the third clutch C3 is engaged to connect the first rotating element RE1, i.e., the sun gear S3 of the first rear planetary gear set 160, with the first intermediate output member 32, thereby establishing fourth gear which has a gear ratio γ4 which is smaller than the gear ratio γ3 of third gear, e.g., approximately 1.897.

Further, the first clutch C1 is engaged to connect the fourth rotating element RE4, i.e., ring gear R3 of the first rear planetary gear set 160 and the sun gear S4 of the second rear planetary gear set 162 which are connected together, with the first intermediate output member 32, while the fourth clutch C4 is engaged to connect the first rotating element RE1, i.e., the sun gear S3 of the first rear planetary gear set 160, with the input shaft 22 which is the input rotating member, thereby establishing fifth gear which has a gear ratio γ5 which is smaller than the gear ratio γ4 of fourth gear, e.g., approximately 1.562.

Also, the first clutch C1 is engaged to connect the fourth rotating element RE4, i.e., ring gear R3 of the first rear planetary gear set 160 and the sun gear S4 of the second rear planetary gear set 162 which are connected together, with the first intermediate output member 32, while the second clutch C2 is engaged to connect the second rotating element RE2, i.e., the carrier CA3 of the first rear planetary gear set 160 and the carrier CA4 of the second rear planetary gear set 162 which are connected together, with the input shaft 22, thereby establishing sixth gear which has a gear ratio γ6 which is smaller than the gear ratio γ5 of fifth gear, e.g., approximately 1.187.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the fourth clutch C4 is engaged to connect the first rotating element RE1, i.e., the sun gear S3 of the first rear planetary gear set 160, with the input shaft 22 which is the input rotating member, thereby establishing seventh gear which has a gear ratio γ7 which is smaller than the gear ratio γ6 of sixth gear, e.g., approximately 1.000.

Further, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the third clutch C3 is engaged to connect the first rotating element RE1, i.e., the sun gear S3 of the first rear planetary gear set 160, with the first intermediate output member 32, thereby establishing eighth gear which has a gear ratio γ8 which is smaller than the gear ratio γ7 of seventh gear, e.g., approximately 0.919.

Also, the second clutch C2 is engaged to connect the second rotating element RE2, i.e., the carrier CA3 of the first rear planetary gear set 160 and the carrier CA4 of the second rear planetary gear set 162 which are connected together, with the input shaft 22, while the first brake B1 is engaged to hold the first rotating element RE1, i.e., the sun gear S3 of the first rear planetary gear set 160, to the transmission case 16, thereby establishing ninth gear which has a gear ratio γ9 which is smaller than the gear ratio γ8 of eighth gear, e.g., approximately 0.843.

Also, the third clutch C3 is engaged to connect the first rotating element RE1, i.e., the sun gear S3 of the first rear planetary gear set 160, with the first intermediate output member 32, while the second brake B2 is engaged to hold the second rotating element RE2, i.e., the carrier CA3 of the first rear planetary gear set 160 and the carrier CA4 of the second rear planetary gear set 162 which are connected together, to the transmission case 16, thereby establishing first reverse gear "R1" which has a gear ratio γR1 of approximately 10.194.

Further, the fourth clutch C4 is engaged to connect the first rotating element RE1, i.e., the sun gear S3 of the first rear planetary gear set 160, with the input shaft 22 which is the input rotating member, while the second brake B2 is engaged to hold the second rotating element RE2, i.e., the carrier CA3 of the first rear planetary gear set 160 and the carrier CA4 of the second rear planetary gear set 162 which are connected together, to the transmission case 16, thereby establishing second reverse gear "R2" which has a gear ratio γR2 which is smaller than the gear ratio γR1 of the first reverse gear, e.g., 5.375. The gear ratio ρ1 of the first front planetary gear set 170, the gear ratio ρ2 of the second front planetary gear set 172, the gear ratio ρ3 of the first rear planetary gear set 160, and the gear ratio ρ4 of the second rear planetary gear set 162 are designed so that the foregoing gear ratios can be achieved.

In the transmission 168 that achieves the gears in accordance with the clutch and brake engagement chart shown in FIG. 117, the ratio of the gear ratio γ1 of the first gear to the gear ratio γ2 of the second gear (=γ1/γ2) is 1.542, the ratio of the gear ratio γ2 of the second gear to the gear ratio γ3 of the third gear (=γ2/γ3) is 1.480, the ratio of the gear ratio γ3 of the third gear to the gear ratio γ4 of the fourth gear (=γ3/γ4) is 1.314, the ratio of the gear ratio γ4 of the fourth gear to the gear ratio γ5 of the fifth gear (=γ4/γ5) is 1.214, the ratio of the gear ratio γ5 of the fifth gear to the gear ratio γ6 of the sixth gear (=γ5/γ6) is 1.316, the ratio of the gear ratio γ6 of the sixth gear to the gear ratio γ7 of the seventh gear (=γ6/γ7) is 1.187, the ratio of the gear ratio γ7 of the seventh gear to the gear ratio γ8 of the eighth gear (=γ7/γ8) is 1.088, and the ratio of the gear ratio γ8 of the eighth gear to the gear ratio γ9 of the ninth gear (=γ8/γ9) is 1.090. Thus, each gear ratio γ changes in substantially equal ratio. Also, the total gear ratio range, which is the ratio of the gear ratio γ1 of the first gear to the gear ratio γ9 of the ninth gear (=γ1/γ9), is 6.748, which is a relatively large value.

In the alignment graph shown in FIG. 118, the four vertical lines Y1 through Y4 represent components of the first transmitting portion 174. From left to right in the graph, line Y1 represents the ring gear R1 of the first front planetary gear set 170, line Y2 represents the carrier CA1 of the first front planetary gear set 170 and the sun gear S2 of the second front planetary gear set 172 which are connected together, line Y3 represents the ring gear R2 of the second front planetary gear set 172, and line Y4 represents the sun gear S1 of the first front planetary gear set 170 and the carrier CA2 of the second front planetary gear set 172 which are connected together. Further, the four vertical lines Y5 through Y8 represent components of the second transmitting portion 166. From left to right in the graph, line Y5 represents the sun gear S3 of the first rear-planetary gear set 160 which corresponds to the first rotating element RE1, line Y6 represents the carrier CA3 of the first rear planetary gear set 160 and the carrier CA4 of the second rear planetary gear set 162 which are connected together and correspond to the second rotating element RE2, line Y7 represents the ring gear R4 of the second rear planetary gear set 162 which corresponds to the third rotating element RE3, and line Y8 represents the ring gear R3 of the first rear planetary gear set 160 and the sun gear S4 of the second rear planetary gear set 162 which are connected together and correspond to the fourth rotating element RE4. Based on these rotating elements, the alignment graph shown in FIG. 118 is similar to that shown in FIG. 110 so a description thereof will be omitted.

In this way, according to this second modified example of the tenth exemplary embodiment, first gear is established by engaging the first clutch C1 and the second brake B2. Second gear is established by engaging the first clutch C1 and the fifth clutch C5. Third gear is established by engaging the first clutch C1 and the first brake B1. Fourth gear is established by engaging the first clutch C1 and the third clutch C3. Fifth gear is established by engaging the first clutch C1 and the fourth clutch C4. Sixth gear is established by engaging the first clutch C1 and the second clutch C2. Seventh gear is established by engaging the second clutch C2 and the fourth clutch C4, and eighth gear is established by engaging the second clutch C2 and the third clutch C3. Thus, the transmission 168 of this second modified example of the tenth exemplary embodiment is able to achieve eight forward gears.

The transmission 168 of this second modified example of the tenth exemplary embodiment is also able to achieve ninth gear by engaging the second clutch C2 and the first brake B1. Therefore, in addition to being able to achieve nine forward gears, the step between eighth gear and ninth gear is able to be preferably set relatively small with a close ratio.

Figure 119:
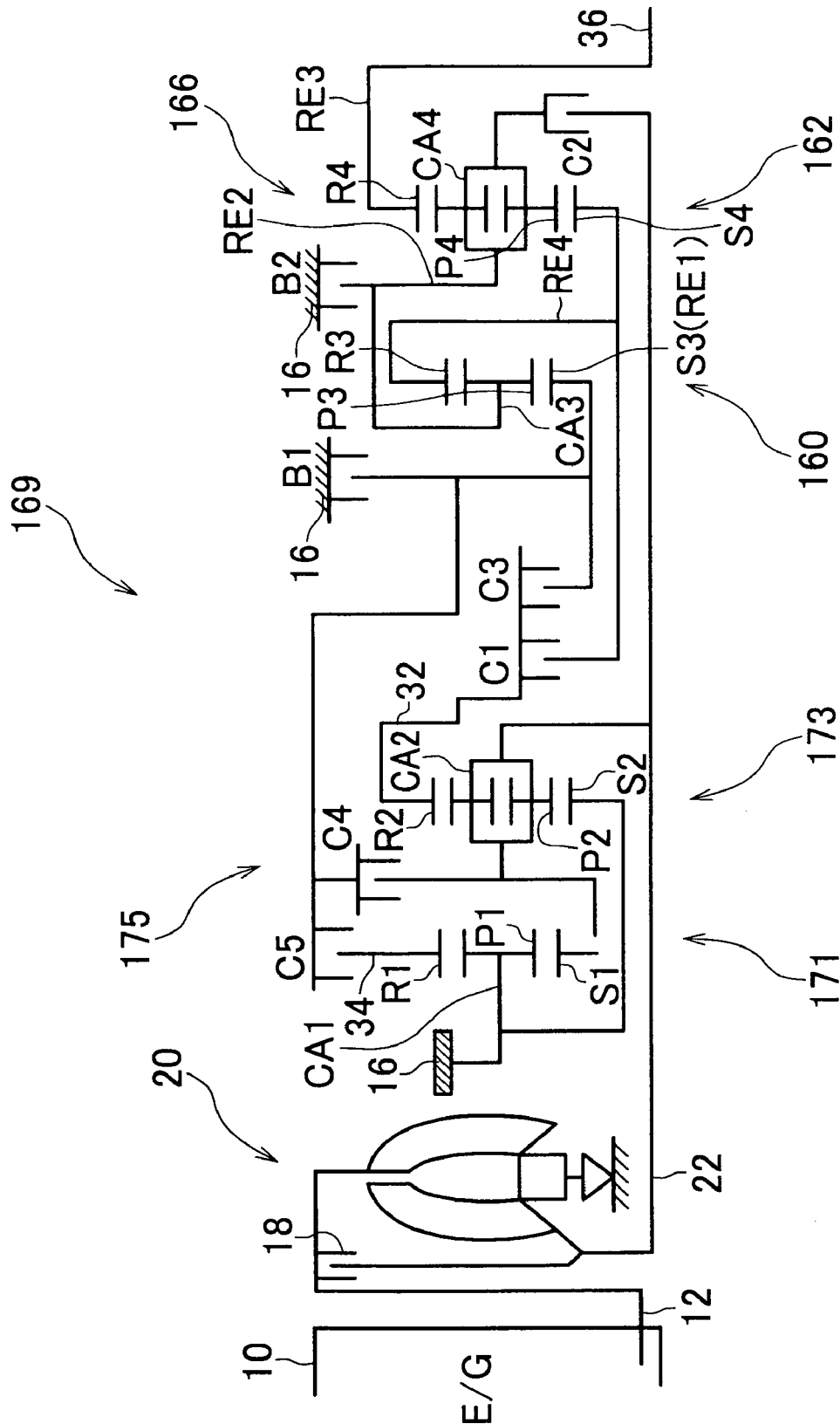
Figure 121:
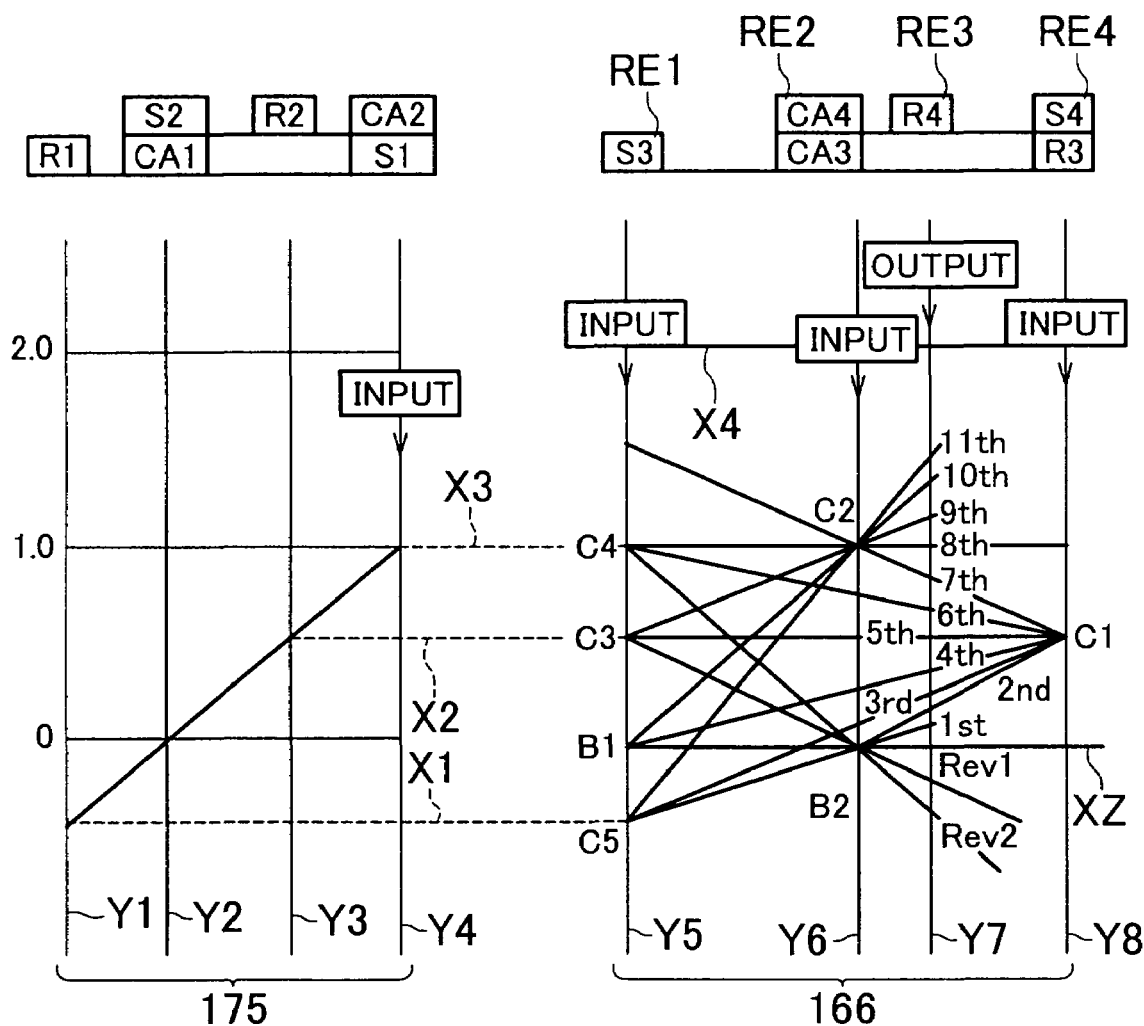

FIG. 119 is a skeleton view of the structure of a transmission 169 according to an eleventh exemplary embodiment of the invention. FIG. 120 is a chart showing the relationship between gears and operations of friction engagement devices necessary to establish those gears in the transmission 169. FIG. 121 is an alignment graph showing the rotation speeds of rotating elements in each gear. With the exception of the structure of a first transmitting portion 175, the transmission 169 of this exemplary embodiment is similar in structure to the transmission 168 shown in FIG. 113, so effects equivalent to those obtained from the foregoing exemplary embodiment can be obtained with this exemplary embodiment. Hereinafter, parts of the transmission 169 of this exemplary embodiment which differ from parts of the transmission 168 will be described.

In the first transmitting portion 175, the connective relationship between the first front planetary gear set 171 and the second front planetary gear set 173 is equivalent to that in the first transmitting portion 174 of the transmission 168 described above, so the first transmitting portion 175 is essentially an equivalent first transmitting portion. However, in the transmission 168 described above, the fourth clutch C4 and the fifth clutch C5 are provided between the first transmitting portion 174 and the second transmitting portion 166. In contrast, in the transmission 169 according to this exemplary embodiment, the fourth clutch C4 and the fifth clutch C5 are provided near the first transmitting portion 175. That is, the transmission 169 is structured with the clutches distributed appropriately.

In the transmission 169 structured as described above, any one of eleven forward gears, i.e., a first gear "1st" through an eleventh gear "11th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 120, for example, in response to a command from the ECU 42, and a gear ratio γ (=input shaft rotation speed NIN/output shaft rotation speed NOUT) that changes in substantially equal ratio is able to be achieved for each gear. The engagement operations and gear ratio of each gear of the transmission 169 according to this exemplary embodiment are the same as those shown in FIG. 111 described above, so descriptions thereof will be omitted here.

In the alignment graph in FIG. 121, the four vertical lines Y1 to Y4 of the first transmitting portion 175 are the same as those in FIG. 118 because the connective relationships are substantially the same as those in the transmission 168 described above. Also, the vertical lines Y5 to Y9 of the second transmitting portion 166 are also the same as those in FIG. 118 because the structure of the second transmitting portion 166 is the same. Accordingly, based on these rotating elements, the alignment graph shown in FIG. 121 is similar to the alignment graph shown in FIG. 112 described above so a description thereof will be omitted.

Thus, in the transmission 169 according to this eleventh exemplary embodiment, eleven forward gears and two reverse gears can be achieved, and more particularly, the steps between eighth gear and eleventh gear are able to be set relatively small with a close ratio, by engaging the clutches and brakes in different combinations and suitably setting the gear ratio of each planetary gear set. Furthermore, the structure in the transmission 169 can be simplified by arranging the clutches evenly within the transmission 169.

Further, in a conventional 4WD vehicle or the like, the transfer houses a low gear or high gear switching mechanism such that a low gear which is lower than "1st" is used when traveling on poor roads or when getting the vehicle out of mud. This switching mechanism increases the size of the transfer, which both increases the weight of the vehicle and hinders mountability. In the transmission according to this exemplary embodiment, however, first gear can be set extremely low which obviates the need for this transfer switching mechanism, thereby enabling the transfer to be simpler and lighter in weight.

Figure 122:
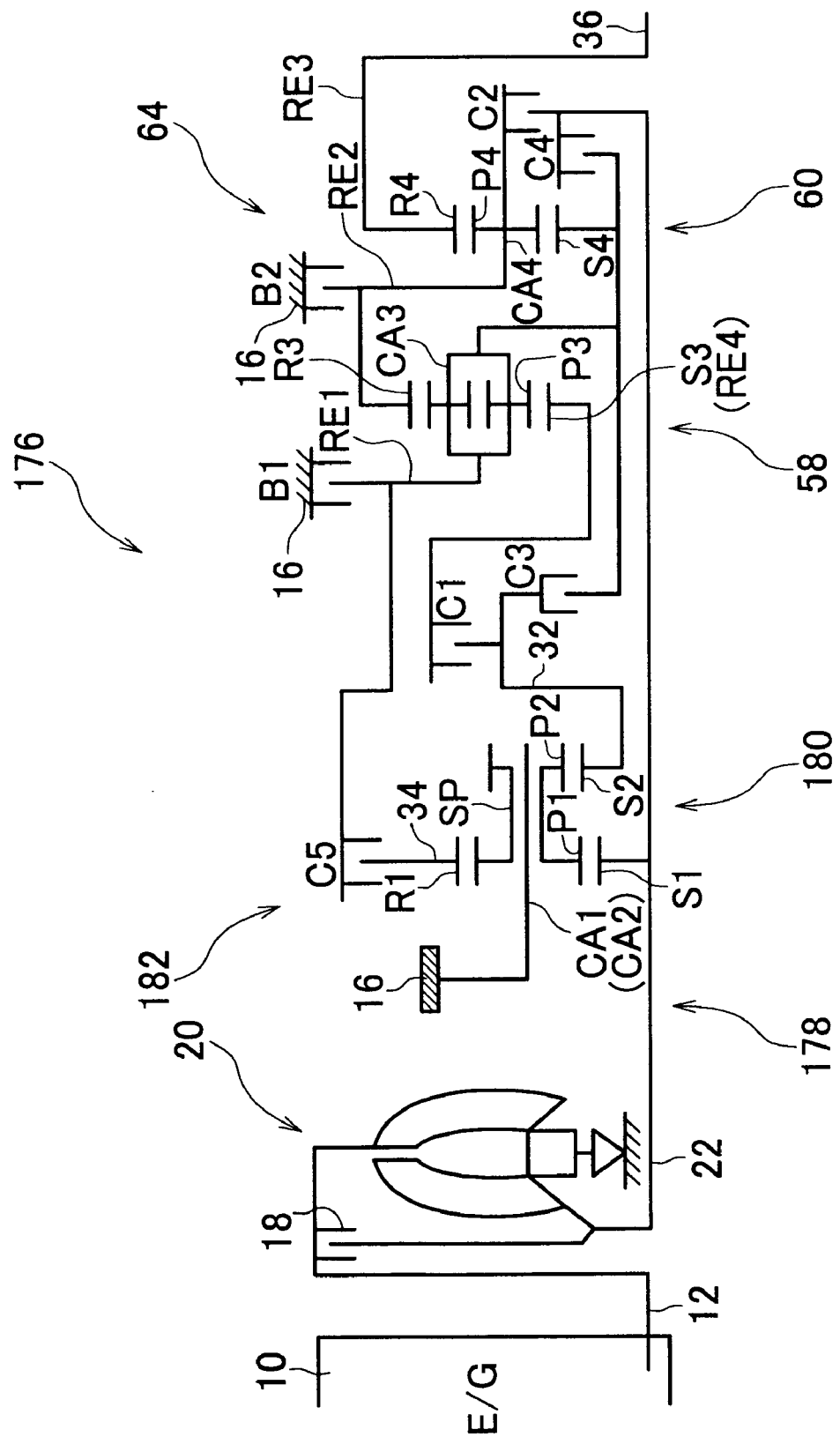
Figure 124:
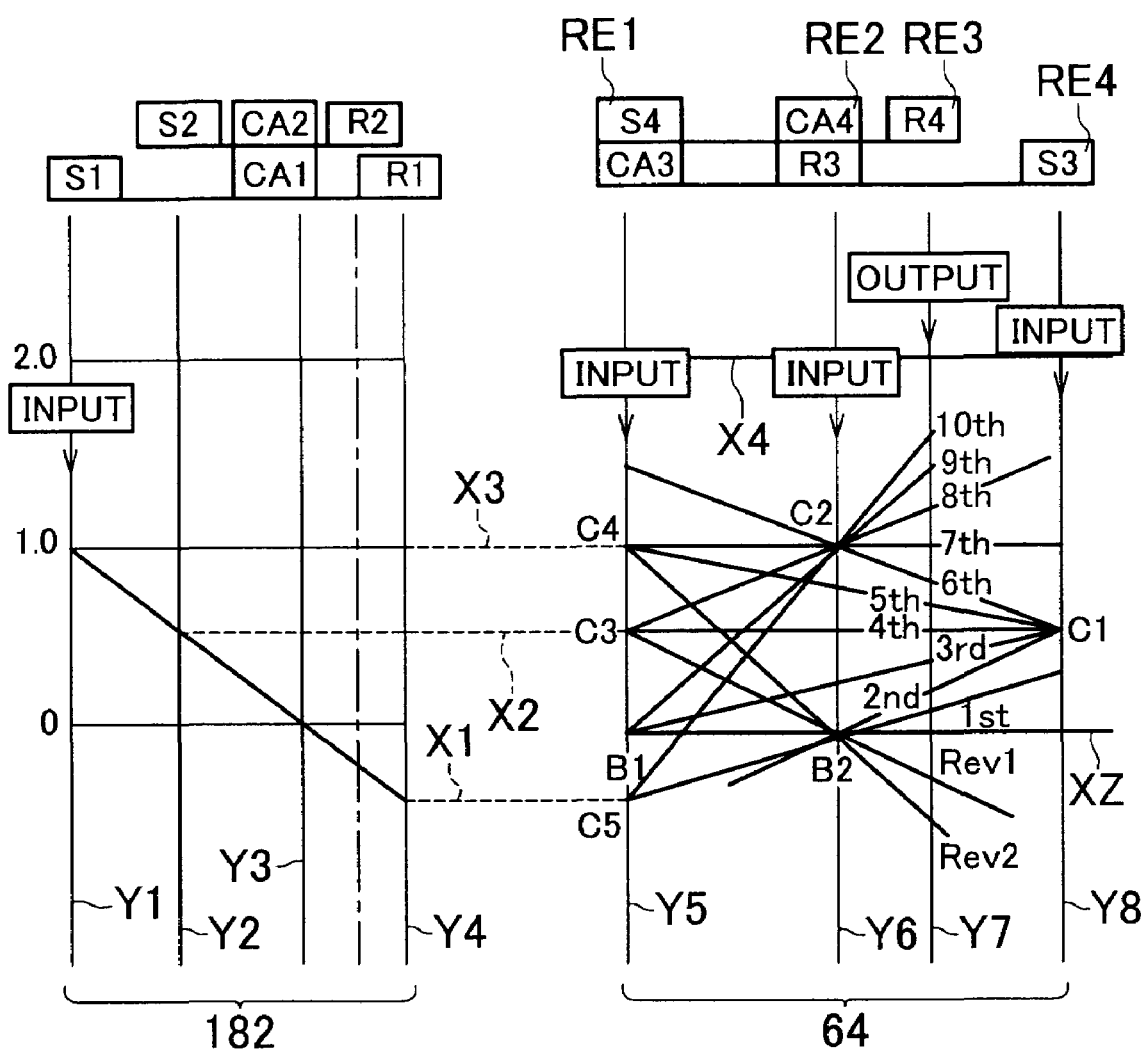

FIG. 122 is a skeleton view of the structure of a transmission 176 according to a twelfth exemplary embodiment of the invention. FIG. 123 is a chart showing the relationship between gears and operations of friction engagement devices necessary to establish those gears in the transmission 176. FIG. 124 is an alignment graph showing the rotation speeds of rotating elements in each gear. With the exception of the structure of a first transmitting portion 182, the transmission 176 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 176 of this exemplary embodiment which differ from parts of the transmission 66 will be described.

As shown in FIG. 122, a first front planetary gear set 178 which makes up part of the first transmitting portion 182 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 180 which also makes up part of the first transmitting portion 182 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2. In this first transmitting portion 182, the pinion P1 of the first front planetary gear set 178 has a larger diameter than the pinion P2 of the second front planetary gear set 180. Furthermore, those pinions P1 and P2 are integrated together, forming a stepped pinion SP. Also, the carrier CA1 of the first front planetary gear set 178 and the carrier CA2 of the second front planetary gear set 180 are a single unit and the ring gear R2 of the second front planetary gear set 180 is omitted.

In the first transmitting portion 182, the carrier CA1 (CA2) which is common to the first front planetary gear set 178 and the second front planetary gear set 180, as described above, is integrally connected to the transmission case 16 which is a non-rotating member, which prevents the carrier CA1 (CA2) from rotating relative to the transmission case 16. Also, the sun gear S1 of the first front planetary gear set 178 is integrally connected to the input shaft 22 which is the input rotating member. Further, the sun gear S2 of the second front planetary gear set 180 is integrally connected to the first intermediate output member 32 and thus functions as a first intermediate output member, similar to the first intermediate output member 32. Also, the ring gear R1 of the first front planetary gear set 178 is integrally connected to the second intermediate output member 34 and thus functions as a second intermediate output member, similar to the second intermediate output member 34. This kind of structure results in the first transmitting portion 182 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 176 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 123, for example, in response to a command from the ECU 42, and a gear ratio γ (=input shaft rotation speed NIN/output shaft rotation speed NOUT) that changes in substantially equal ratio is able to be achieved for each gear.

In the transmission 176 which establishes the gears according to the clutch and brake engagement chart shown in FIG. 123, the gear ratio γ1 of first gear is approximately 4.917, the gear ratio γ2 of second gear is approximately 3.290, the gear ratio γ3 of third gear is approximately 2.222, the gear ratio γ4 of fourth gear is approximately 1.645, the gear ratio γ5 of fifth gear is approximately 1.409, the gear ratio γ6 of sixth gear is approximately 1.244, the gear ratio γ7 of seventh gear is approximately 1.000, the gear ratio γ8 of eighth gear is approximately 0.825, the gear ratio γ9 of ninth gear is approximately 0.649, the gear ratio γ10 of tenth gear is approximately 0.574, the gear ratio γR1 of first reverse gear is approximately 3.047, and the gear ratio γR2 of second reverse gear is approximately 1.852. Further, the ratio of the gear ratio γ1 of the first gear to the gear ratio γ2 of the second gear (=γ1/γ2) is 1.511, the ratio of the gear ratio γ2 of the second gear to the gear ratio γ3 of the third gear (=γ2/γ3) is 1.481, the ratio of the gear ratio γ3 of the third gear to the gear ratio γ4 of the fourth gear (=γ3/γ4) is 1.351, the ratio of the gear ratio γ4 of the fourth gear to the gear ratio γ5 of the fifth gear (=γ4/γ5) is 1.167, the ratio of the gear ratio γ5 of the fifth gear to the gear ratio γ6 of the sixth gear (=γ5/γ6) is 1.133, the ratio of the gear ratio γ6 of the sixth gear to the gear ratio γ7 of the seventh gear (=γ6/γ7) is 1.244, the ratio of the gear ratio γ7 of the seventh gear to the gear ratio γ8 of the eighth gear (=γ7/γ8) is 1.212, the ratio of the gear ratio γ8 of the eighth gear to the gear ratio γ9 of the ninth gear (=γ8/γ9) is 1.271, and the ratio of the gear ratio γ9 of the ninth gear to the gear ratio γ10 of the tenth gear (=γ9/γ10) is 1.131. Thus, each gear ratio γ changes in substantially equal ratio. Also, the total gear ratio range, which is the ratio of the gear ratio γ1 of the first gear to the gear ratio γ10 of the tenth gear (=γ1/γ10), is 8.655, which is a relatively large value.

In the alignment graph shown in FIG. 124, the four vertical lines Y1 through Y4 represent components of the first transmitting portion 182. From left to right in the graph, line Y1 represents the sun gear S1 of the first front planetary gear set 178 which is one rotating element, line Y2 represents the sun gear S2 of the second front planetary gear set 180 which is another rotating element, line Y3 represents the carrier CA1 of the first front planetary gear set 178 and the carrier CA2 of the second front planetary gear set 180 which are connected together to form another rotating element, and line Y4 represents the ring gear R1 of the first front planetary gear set 178 which is another rotating element. Further, the rotation speed of the ring gear R2 of the second front planetary gear set 180 is indicated by the alternate long and short dashed line. Accordingly, based on these rotating elements, the alignment graph shown in FIG. 124 is similar to that shown in FIG. 14 described above so a description thereof will be omitted.

In this way, according to the twelfth exemplary embodiment, the first transmitting portion 182 includes the single pinion type first front planetary gear set 178 and the single pinion type second front planetary gear set 180. The carrier CA1 of the first front planetary gear set 178 and the carrier CA2 of the second front planetary gear set 180 are always connected to the transmission case 16, which is a non-rotating member, and the sun gear S1 of the first front planetary gear set 178 is connected to the input shaft 22 which is the input rotating member. Accordingly, the sun gear S2 of the second front planetary gear set 180 functions as the first intermediate output member 32 while the ring gear R1 of the first front planetary gear set 178 functions as the second intermediate output member 34. Accordingly, a practical transmission 176 is able to be provided.

Figure 125:
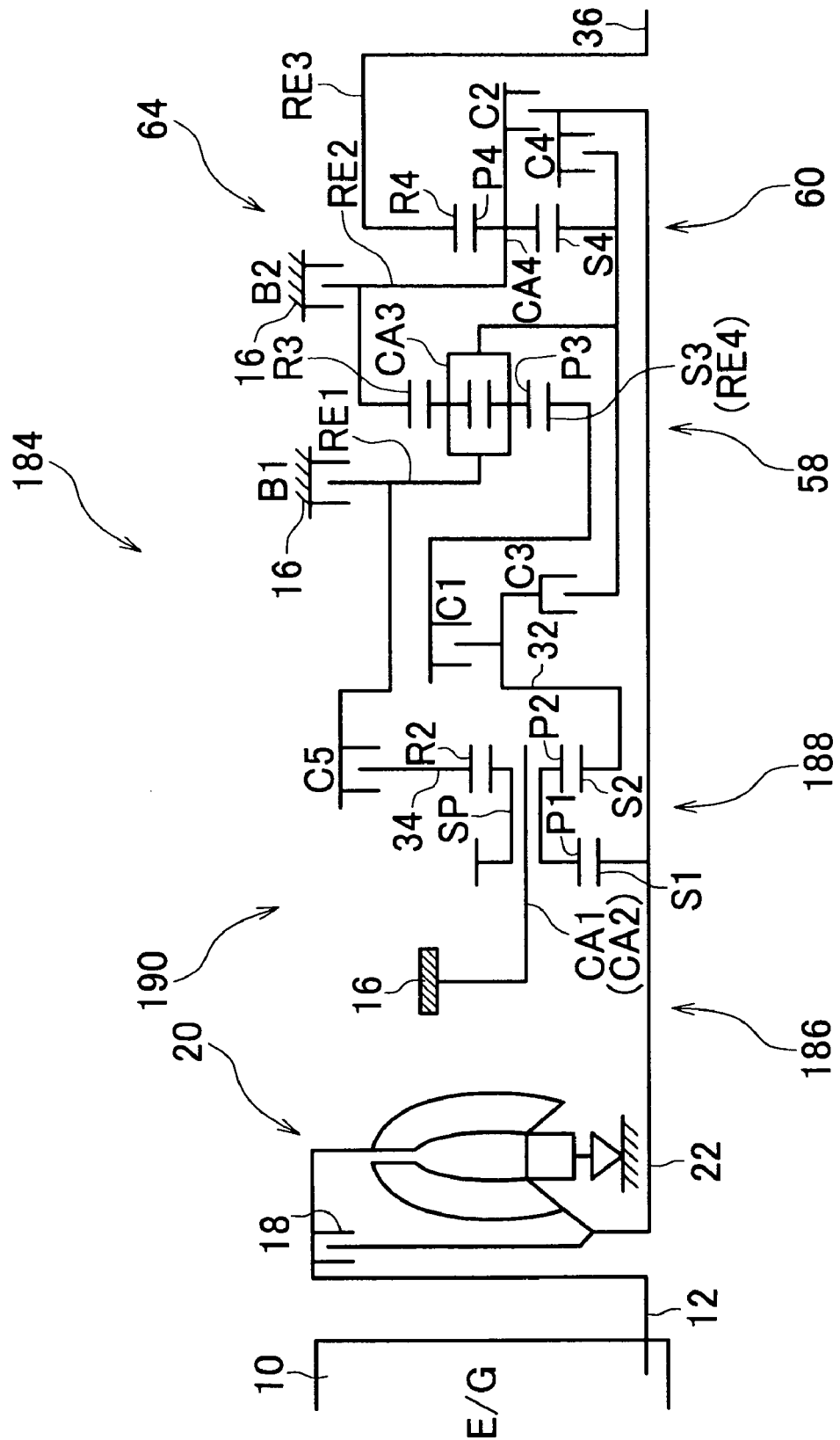
Figure 127:
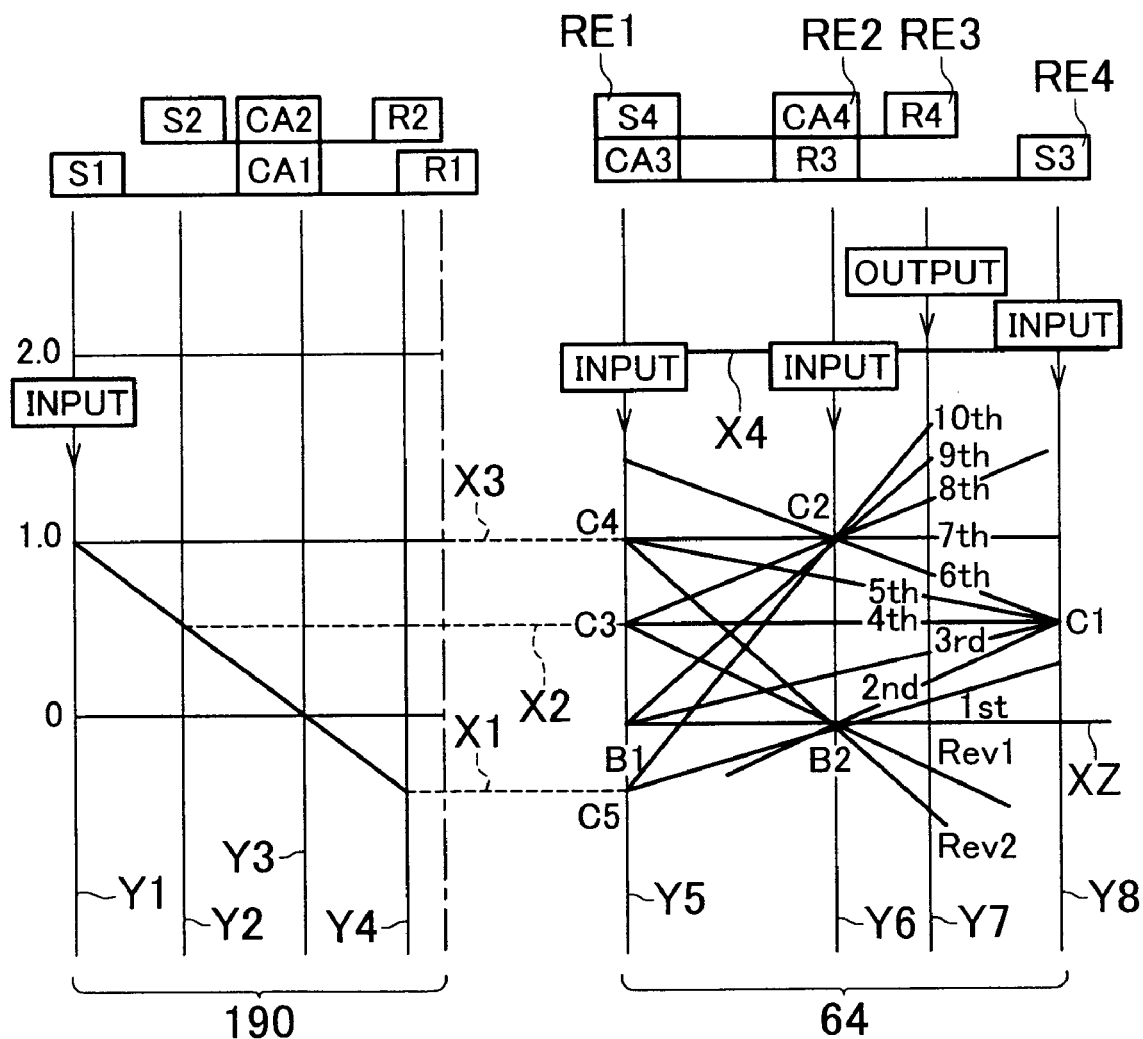

FIG. 125 is a skeleton view of the structure of a transmission 184 according to a thirteenth exemplary embodiment of the invention. FIG. 126 is a chart showing the relationship between gears and operations of friction engagement devices necessary to establish those gears in the transmission 184. FIG. 127 is an alignment graph showing the rotation speeds of rotating elements in each gear. With the exception of the structure of a first transmitting portion 190, the transmission 184 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 184 of this exemplary embodiment which differ from parts of the transmission 66 will be described.

As shown in FIG. 125, a first front planetary gear set 186 which makes up part of the first transmitting portion 190 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 188 which also makes up part of the first transmitting portion 190 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2. In this first transmitting portion 190, the pinion P1 of the first front planetary gear set 186 has a larger diameter than the pinion P2 of the second front planetary gear set 188. Furthermore, those pinions P1 and P2 are integrated together, forming a stepped pinion SP. Also, the carrier CA1 of the first front planetary gear set 186 and the carrier CA2 of the second front planetary gear set 188 are a single unit and the ring gear R1 of the first front planetary gear set 186 is omitted.

In the first transmitting portion 190, the carrier CA1 (CA2) which is common to the first front planetary gear set 186 and the second front planetary gear set 188, as described above, is integrally connected to the transmission case 16 which is a non-rotating member, which prevents the carrier CA1 (CA2) from rotating relative to the transmission case 16. Also, the sun gear S1 of the first front planetary gear set 186 is integrally connected to the input shaft 22 which is the input rotating member. Further, the sun gear S2 of the second front planetary gear set 188 is integrally connected to the first intermediate output member 32 and thus functions as a first intermediate output member, similar to the first intermediate output member 32. Also, the ring gear R2 of the second front planetary gear set 188 is integrally connected to the second intermediate output member 34 and thus functions as a second intermediate output member, similar to the second intermediate output member 34. This kind of structure results in the first transmitting portion 190 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 184 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 126, for example, in response to a command from the ECU 42, and a gear ratio γ (=input shaft rotation speed NIN/output shaft rotation speed NOUT) that changes in substantially equal ratio is able to be achieved for each gear.

In the alignment graph shown in FIG. 127, the four vertical lines Y1 through Y4 represent components of the first transmitting portion 190. From left to right in the graph, line Y1 represents the sun gear S1 of the first front planetary gear set 186 which is one rotating element, line Y2 represents the sun gear S2 of the second front planetary gear set 188 which is another rotating element, line Y3 represents the carrier CA1 of the first front planetary gear set 186 and the carrier CA2 of the second front planetary gear set 188 which are connected together to form another rotating element, and line Y4 represents the ring gear R2 of the second front planetary gear set 188 which is another rotating element. Further, the rotation speed of the ring gear R1 of the first front planetary gear set 186 is indicated by the alternate long and short dashed line. Accordingly, based on these rotating elements, the alignment graph shown in FIG. 127 is similar to the alignment graph shown in FIG. 14 described above so a description thereof will be omitted.

In this way, according to the thirteenth exemplary embodiment, the first transmitting portion 190 includes the single pinion type first front planetary gear set 186 and the single pinion type second front planetary gear set 188. The carrier CA1 of the first front planetary gear set 186 and the carrier CA2 of the second front planetary gear set 188 are always connected to the transmission case 16, which is a non-rotating member, and the sun gear S1 of the first front planetary gear set 186 is connected to the input shaft 22 which is the input rotating member. Accordingly, the sun gear S2 of the second front planetary gear set 188 functions as the first intermediate output member 32 while the ring gear R2 of the second front planetary gear set 188 functions as the second intermediate output member 34. Accordingly, a practical transmission 184 is able to be provided.

Figure 128:
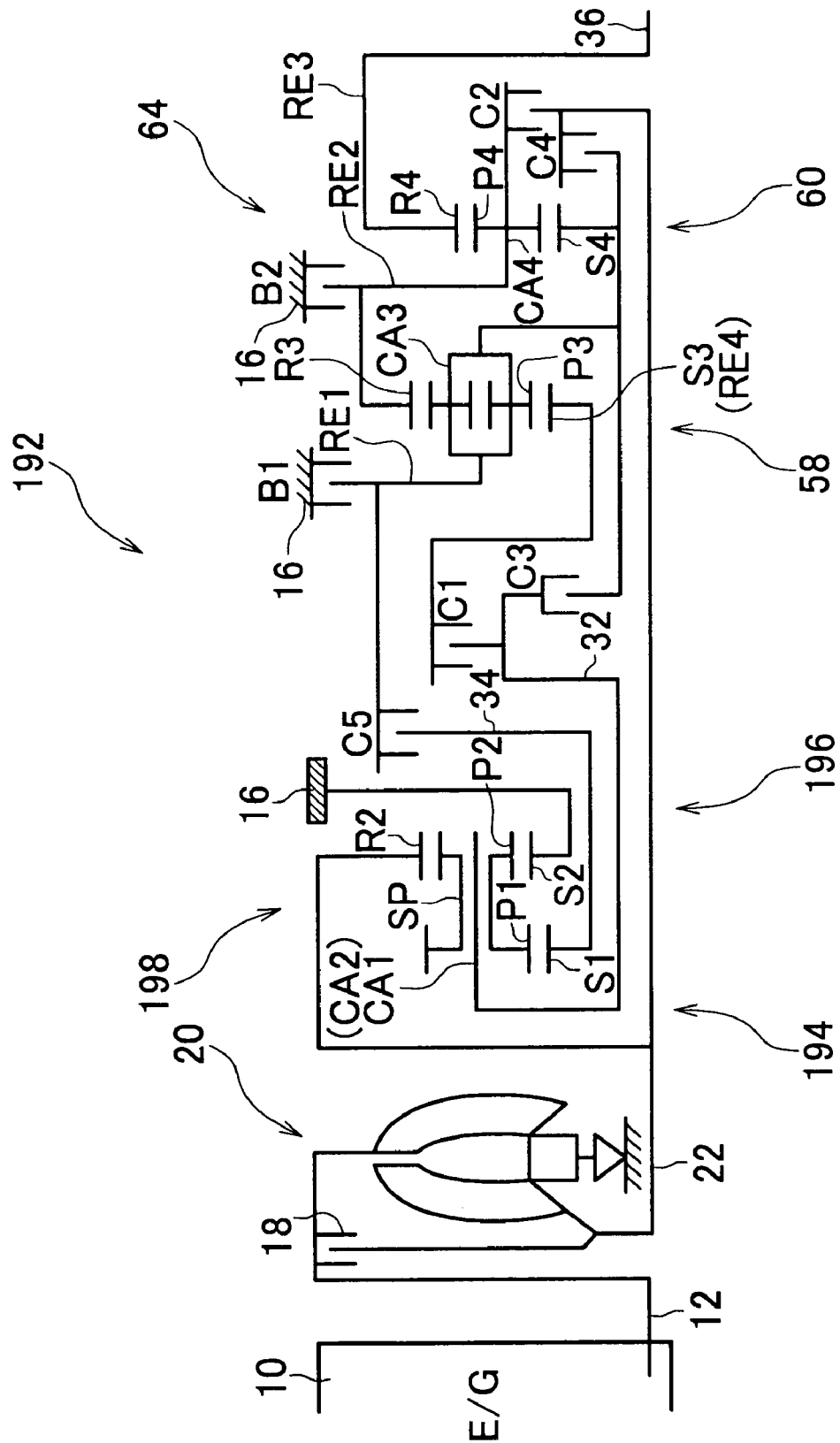
Figure 130:
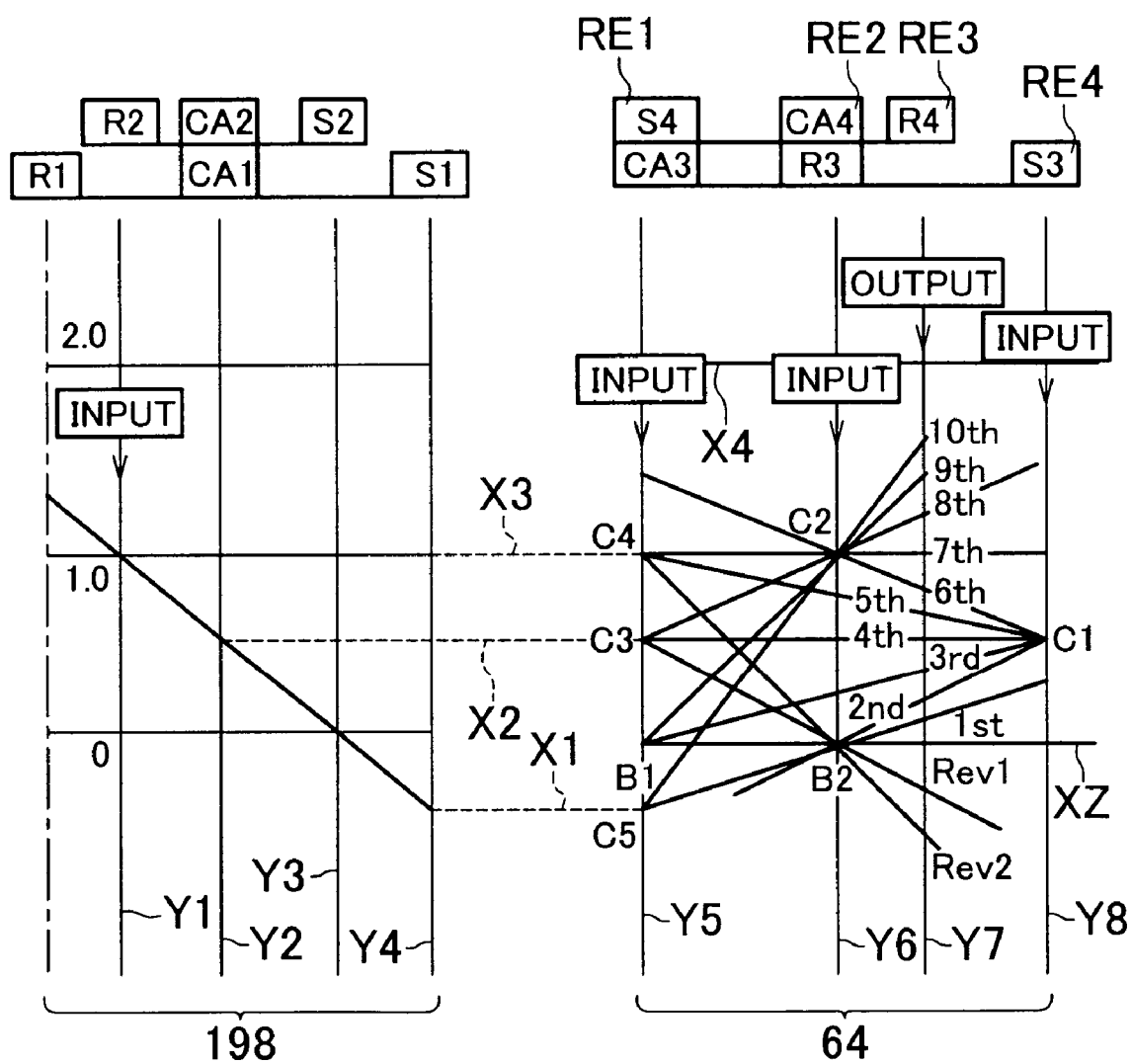

FIG. 128 is a skeleton view of the structure of a transmission 192 according to a fourteenth exemplary embodiment of the invention. FIG. 129 is a chart showing the relationship between gears and operations of friction engagement devices necessary to establish those gears in the transmission 192. FIG. 130 is an alignment graph showing the rotation speeds of rotating elements in each gear. With the exception of the structure of a first transmitting portion 198, the transmission 192 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 192 of this exemplary embodiment which differ from parts of the transmission 66 will be described.

As shown in FIG. 128, a first front planetary gear set 194 which makes up part of the first transmitting portion 198 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 196 which also makes up part of the first transmitting portion 198 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2. In this first transmitting portion 198, the pinion P1 of the first front planetary gear set 194 has a larger diameter than the pinion P2 of the second front planetary gear set 196. Furthermore, those pinions P1 and P2 are integrated together, forming a stepped pinion SP. Also, the carrier CA1 of the first front planetary gear set 194 and the carrier CA2 of the second front planetary gear set 196 are a single unit and the ring gear R1 of the first front planetary gear set 194 is omitted.

In the first transmitting portion 198, the sun gear S2 of the second front planetary gear set 196 is integrally connected to the transmission case 16 which is a non-rotating member, which prevents the sun gear S2 from rotating relative to the transmission case 16. Also, the ring gear R2 of the second front planetary gear set 196 is integrally connected to the input shaft 22 which is the input rotating member. Further, the carrier CA1 (CA2) which is common to the first front planetary gear set 194 and the second front planetary gear set 196, as described above, is integrally connected to the first intermediate output member 32 and thus functions as a first intermediate output member, similar to the first intermediate output member 32. Also, the sun gear S1 of the first front planetary gear set 194 is integrally connected to the second intermediate output member 34 and thus functions as a second intermediate output member, similar to the second intermediate output member 34. This kind of structure results in the first transmitting portion 198 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 192 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 129, for example, in response to a command from the ECU 42, and a gear ratio γ (=input shaft rotation speed NIN/output shaft rotation speed NOUT) that changes in substantially equal ratio is able to be achieved for each gear.

In the alignment graph shown in FIG. 130, the four vertical lines Y1 through Y4 represent components of the first transmitting portion 198. From left to right in the graph, line Y1 represents the ring gear R2 of the second front planetary gear set 196 which is one rotating element, line Y2 represents the carrier CA1 of the first front planetary gear set 194 and the carrier CA2 of the second front planetary gear set 196 which are connected together to form another rotating element, line Y3 represents the sun gear S2 of the second front planetary gear set 196 which is another rotating element, and line Y4 represents the sun gear S1 of the first front planetary gear set 194 which is another rotating element. Further, the rotation speed of the ring gear R1 of the first front planetary gear set 194 is indicated by the alternate long and short dashed line. Accordingly, based on these rotating elements, the alignment graph shown in FIG. 130 is similar to that shown in FIG. 14 described above so a description thereof will be omitted.

In this way, according to the fourteenth exemplary embodiment, the first transmitting portion 198 includes the single pinion type first front planetary gear set 194 and the single pinion type second front planetary gear set 196. The sun gear S2 of the second front planetary gear set 196 is always connected to the transmission case 16, which is a non-rotating member. The carrier CA1 of the first front planetary gear set 194 and the carrier CA2 of the second front planetary gear set 196 are connected together to form one rotating element, and the ring gear R2 of the second front planetary gear set 196 is connected to the input shaft 22 which is the input rotating member. Accordingly, the one rotating element, i.e., the carrier CA1 of the first front planetary gear set 194 and the carrier CA2 of the second front planetary gear set 196 which are connected together, function as the first intermediate output member 32, while the sun gear S1 of the first front planetary gear set 194 functions as the second intermediate output member 34. Accordingly, a practical transmission 192 is able to be provided.

FIG. 131 is a skeleton view of the structure of a transmission 200 according to a fifteenth exemplary embodiment of the invention. FIG. 132 is a chart showing the relationship between gears and operations of friction engagement devices necessary to establish those gears in the transmission 200. FIG. 133 is an alignment graph showing the rotation speeds of rotating elements in each gear. With the exception of the structure of a first transmitting portion 206, the transmission 200 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 200 of this exemplary embodiment which differ from parts of the transmission 66 will be described.

As shown in FIG. 131, a first front planetary gear set 202 which makes up part of the first transmitting portion 206 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 204 which also makes up part of the first transmitting portion 206 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2. In this first transmitting portion 206, the pinion P1 of the first front planetary gear set 202 has a larger diameter than the pinion P2 of the second front planetary gear set 204. Furthermore, those pinions P1 and P2 are integrated together, forming a stepped pinion SP. Also, the carrier CA1 of the first front planetary gear set 202 and the carrier CA2 of the second front planetary gear set 204 are a single unit and the ring gear R2 of the second front planetary gear set 204 is omitted.

In the first transmitting portion 206, the sun gear S2 of the second front planetary gear set 204 is integrally connected to the transmission case 16 which is a non-rotating member, which prevents the sun gear S2 from rotating relative to the transmission case 16. Also, the ring gear R1 of the first front planetary gear set 202 is integrally connected to the input shaft 22 which is the input rotating member. Further, the carrier CA1 (CA2) which is common to the first front planetary gear set 202 and the second front planetary gear set 204, as described above, is integrally connected to the first intermediate output member 32 and thus functions as a first intermediate output member, similar to the first intermediate output member 32. Also, the sun gear S1 of the first front planetary gear set 202 is integrally connected to the second intermediate output member 34 and thus functions as a second intermediate output member, similar to the second intermediate output member 34. This kind of structure results in the first transmitting portion 206 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 200 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 132, for example, in response to a command from the ECU 42, and a gear ratio γ (=input shaft rotation speed NIN/output shaft rotation speed NOUT) that changes in substantially equal ratio is able to be achieved for each gear.

In the alignment graph shown in FIG. 133, the four vertical lines Y1 through Y4 represent components of the first transmitting portion 206. From left to right in the graph, line Y1 represents the ring gear R1 of the first front planetary gear set 202 which is one rotating element, line Y2 represents the carrier CA1 of the first front planetary gear set 202 and the carrier CA2 of the second front planetary gear set 204 which are connected together to form another rotating element, line Y3 represents the sun gear S2 of the second front planetary gear set 204 which is another rotating element, and line Y4 represents the sun gear S1 of the first front planetary gear set 202 which is another rotating element. Further, the rotation speed of the ring gear R2 of the second front planetary gear set 204 is indicated by the alternate long and short dashed line. Accordingly, based on these rotating elements, the alignment graph shown in FIG. 133 is similar to that shown in FIG. 14 described above so a description thereof will be omitted.

In this way, according to the fifteenth exemplary embodiment, the first transmitting portion 206 includes the single pinion type first front planetary gear set 202 and the single pinion type second front planetary gear set 204. The sun gear S2 of the second front planetary gear set 204 is always connected to the transmission case 16, which is a non-rotating member. The carrier CA1 of the first front planetary gear set 202 and the carrier CA2 of the second front planetary gear set 204 are connected together to form one rotating element, and the ring gear R1 of the first front planetary gear set 202 is connected to the input shaft 22 which is the input rotating member. Accordingly, the one rotating element, i.e., the carrier CA1 of the first front planetary gear set 202 and the carrier CA2 of the second front planetary gear set 204 which are connected together, function as the first intermediate output member 32, while the sun gear S1 of the first front planetary gear set 202 functions as the second intermediate output member 34. Accordingly, a practical transmission 200 is able to be provided.

FIG. 134 is a skeleton view of the structure of a transmission 210 according to a sixteenth exemplary embodiment of the invention. FIG. 135 is a chart showing the relationship between gears and operations of friction engagement devices necessary to establish those gears in the transmission 210. FIG. 136 is an alignment graph showing the rotation speeds of rotating elements in each gear. With the exception of the structure of a first transmitting portion 216, the transmission 210 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 210 of this exemplary embodiment which differ from parts of the transmission 66 will be described.

As shown in FIG. 134, a first front planetary gear set 212 which makes up part of the first transmitting portion 216 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 214 which also makes up part of the first transmitting portion 216 is a double pinion type planetary gear set which includes a sun gear S2, a plurality of sets of pinions P2 which are in mesh with each other, a carrier CA2 which rotatably and revolvably supports the pinions P2, and a ring gear R2 that is in mesh with the sun gear S2 via the pinions P2.

In the first transmitting portion 216, the ring gear R2 of the second front planetary gear set 214 is integrally connected to the transmission case 16 which is a non-rotating member, which prevents the ring gear R2 from rotating relative to the transmission case 16. Also, the ring gear R1 of the first front planetary gear set 212 is integrally connected to the input shaft 22 which is the input rotating member. Further, the carrier CA1 of the first front planetary gear set 212 and the sun gear S2 of the second front planetary gear set 214, which are connected together, are integrally connected to the first intermediate output member 32 and thus function as a first intermediate output member, similar to the first intermediate output member 32. Also, the sun gear S1 of the first front planetary gear set 212 and the carrier CA2 of the second front planetary gear set 214, which are connected together, are integrally connected to the second intermediate output member 34 and thus function as a second intermediate output member, similar to the second intermediate output member 34. This kind of structure results in the first transmitting portion 216 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 210 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 135, for example, in response to a command from the ECU 42, and a gear ratio γ (=input shaft rotation speed NIN/output shaft rotation speed NOUT) that changes in substantially equal ratio is able to be achieved for each gear.

In the alignment graph shown in FIG. 136, the four vertical lines Y1 through Y4 represent components of the first transmitting portion 216. From left to right in the graph, line Y1 represents the sun gear S1 of the first front planetary gear set 212 and the carrier CA2 of the second front planetary gear set 214 which are connected together to form one rotating element, line Y2 represents the ring gear R2 of the second front planetary gear set 214 which is another rotating element, line Y3 represents the carrier CA1 of the first front planetary gear set 212 and the sun gear S2 of the second front planetary gear set 214 which are connected together to form another rotating element, and line Y4 represents the ring gear R1 of the first front planetary gear set 212 which is another rotating element. Accordingly, based on these rotating elements, the alignment graph shown in FIG. 136 is similar to that shown in FIG. 16 described above so a description thereof will be omitted.

In this way, according to the sixteenth exemplary embodiment, the first transmitting portion 216 includes the single pinion type first front planetary gear set 212 and the double pinion type second front planetary gear set 214. The ring gear R2 of the second front planetary gear set 214 is always connected to the transmission case 16, which is a non-rotating member. The carrier CA1 of the first front planetary gear set 212 and the sun gear S2 of the second front planetary gear set 214 are connected together, the sun gear Si of the first front planetary gear set 212 and the carrier CA2 of the second front planetary gear set 214 are connected together, and the ring gear R1 of the first front planetary gear set 212 is connected to the input shaft 22. Accordingly, the carrier CA1 of the first front planetary gear set 212 and the sun gear S2 of the second front planetary gear set 214, which are connected together, function as the first intermediate output member 32, while the sun gear S1 of the first front planetary gear set 212 and the carrier CA2 of the second front planetary gear set 214, which are connected together, function as the second intermediate output member 34. Accordingly, a practical transmission 210 is able to be provided.

FIG. 137 is a skeleton view of the structure of a transmission 220 according to a seventeenth exemplary embodiment of the invention. FIG. 138 is a chart showing the relationship between gears and operations of friction engagement devices necessary to establish those gears in the transmission 220. FIG. 139 is an alignment graph showing the rotation speeds of rotating elements in each gear. With the exception of the structure of a first transmitting portion 226, the transmission 220 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 220 of this exemplary embodiment which differ from parts of the transmission 66 will be described.

As shown in FIG. 137, a first front planetary gear set 222 which makes up part of the first transmitting portion 226 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 224 which also makes up part of the first transmitting portion 226 is a double pinion type planetary gear set which includes a sun gear S2, a plurality of sets of pinions P2 which are in mesh with each other, a carrier CA2 which rotatably and revolvably supports the pinions P2, and a ring gear R2 that is in mesh with the sun gear S2 via the pinions P2.

In the first transmitting portion 226, the ring gear R2 of the second front planetary gear set 224 is integrally connected to the transmission case 16 which is a non-rotating member, which prevents the ring gear R2 from rotating relative to the transmission case 16. Also, the ring gear R1 of the first front planetary gear set 222 and the carrier CA2 of the second front planetary gear set 224 which are connected together are integrally connected to the input shaft 22 which is the input rotating member. Further, the carrier CA1 of the first front planetary gear set 222 is integrally connected to the first intermediate output member 32 and thus functions as a first intermediate output member, similar to the first intermediate output member 32. Also, the sun gear Si of the first front planetary gear set 222 and the sun gear S2 of the second front planetary gear set 224, which are connected together, are integrally connected to the second intermediate output member 34 and thus function as a second intermediate output member, similar to the second intermediate output member 34. This kind of structure results in the first transmitting portion 226 slowing down the rotation from the input shaft 22 and transmitting that slowed rotation to the second transmitting portion 64 via the first intermediate output member 32, and reversing the rotation from the input shaft 22 and transmitting that reverse rotation to the second transmitting portion 64 via the second intermediate output member 34.

In the transmission 220 structured as described above, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 138, for example, in response to a command from the ECU 42, and a gear ratio γ (=input shaft rotation speed NIN/output shaft rotation speed NOUT) that changes in substantially equal ratio is able to be achieved for each gear.

In the alignment graph shown in FIG. 139, the four vertical lines Y1 through Y4 represent components of the first transmitting portion 226. From left to right in the graph, line Y1 represents the sun gear S1 of the first front planetary gear set 222 and the carrier CA2 of the second front planetary gear set 224 which are connected together to form one rotating element, line Y2 represents the ring gear R2 of the second front planetary gear set 224 which is another rotating element, line Y3 represents the carrier CA1 of the first front planetary gear set 222 and the sun gear S2 of the second front planetary gear set 224 which are connected together to form another rotating element, and line Y4 represents the ring gear R1 of the first front planetary gear set 222 which is another rotating element. Accordingly, based on these rotating elements, the alignment graph shown in FIG. 139 is similar to that shown in FIG. 16 described above so a description thereof will be omitted.

In this way, according to the seventeenth exemplary embodiment, the first transmitting portion 226 includes the single pinion type first front planetary gear set 222 and the double pinion type second front planetary gear set 224. The ring gear R2 of the second front planetary gear set 224 is always connected to the transmission case 16, which is a non-rotating member. The sun gear S1 of the first front planetary gear set 222 and the sun gear S2 of the second front planetary gear set 224 are connected together, and the ring gear R1 of the first front planetary gear set 222 and the carrier CA2 of the second front planetary gear set 224 are connected together as well as connected to the input shaft 22. Accordingly, the carrier CA1 of the first front planetary gear set 222 functions as the first intermediate output member 32, while the sun gear S1 of the first front planetary gear set 222 and the sun gear S2 of the second front planetary gear set 224, which are connected together, function as the second intermediate output member 34. Accordingly, a practical transmission 220 is able to be provided.

FIG. 140 is a skeleton view of the structure of a transmission 230 according to an eighteenth exemplary embodiment of the invention. FIG. 141 is a chart showing the relationship between gears and operations of friction engagement devices necessary to establish those gears in the transmission 230. FIG. 142 is an alignment graph showing the rotation speeds of rotating elements in each gear. With the exception of the structure of a first transmitting portion 236, the transmission 230 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 230 of this exemplary embodiment which differ from parts of the transmission 66 will be described.

As shown in FIG. 140, a first front planetary gear set 232 which makes up part of the first transmitting portion 236 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 234 which also makes up part of the first transmitting portion 236 is a double pinion type planetary gear set which includes a sun gear S2, a plurality of sets of pinions P2 which are in mesh with each other, a carrier CA2 which rotatably and revolvably supports the pinions P2, and a ring gear R2 that is in mesh with the sun gear S2 via the pinions P2.

In the first transmitting portion 236, the carrier CA1 of the first front planetary gear set 232 and the ring gear R2 of the second front planetary gear set 234 are integrally connected to the transmission case 16 which is a non-rotating member, which prevents them from rotating relative to the transmission case 16. Also, the ring gear R1 of the first front planetary gear set 232 and the sun gear S2 of the second front planetary gear set 234 are connected together, and the sun gear S1 of the first front planetary gear set 232 is integrally connected to the input shaft 22 which is the input rotating member. According to this kind of structure, the carrier CA2 of the second front planetary gear set 234 is integrally connected to the first intermediate output member 32 and thus functions as a first intermediate output member, similar to the first intermediate output member 32, while the ring gear R1 of the first front planetary gear set 232 and the sun gear S2 of the second front planetary gear set 234, which are connected together, are integrally connected to the second intermediate output member 34 and thus function as a second intermediate output member, similar to the second intermediate output member 34.

In the transmission 230 structured as described above, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 141, for example, in response to a command from the ECU 42, and a gear ratio γ (=input shaft rotation speed NIN/output shaft rotation speed NOUT) that changes in substantially equal ratio is able to be achieved for each gear. The engagement operations and gear ratios of the gears of the transmission 230 according to this exemplary embodiment are the same as those described above using FIG. 23, so descriptions thereof will be omitted here.

In the alignment graph shown in FIG. 142, the four vertical lines Y1 through Y4 represent components of the first transmitting portion 236. From left to right in the graph, line Y1 represents the ring gear R1 of the first front planetary gear set 232 and the sun gear S2 of the second front planetary gear set 234 which are connected together to form one rotating element, line Y2 represents the carrier CA1 of the first front planetary gear set 232 and the ring gear R2 of the second front planetary gear set 234 which are connected together to form another rotating element, line Y3 represents the carrier CA2 of the second front planetary gear set 234 which is another rotating element, and line Y4 represents the sun gear S1 of the first front planetary gear set 232 which is another rotating element. Accordingly, based on these rotating elements, the alignment graph shown in FIG. 142 is similar to that shown in FIG. 24 described above so a description thereof will be omitted.

Thus, according to this eighteenth exemplary embodiment, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

In this way, according to the eighteenth exemplary embodiment, the first transmitting portion 236 includes the single pinion type first front planetary gear set 232 and the double pinion type second front planetary gear set 234. The carrier CA1 of the first front planetary gear set 232 and the ring gear R2 of the second front planetary gear set 234 are always connected to the transmission case 16, which is a non-rotating member. The ring gear R1 of the first front planetary gear set 232 and the sun gear S2 of the second front planetary gear set 234 are connected together, and the sun gear S1 of the first front planetary gear set 232 is connected to the input shaft 22. Accordingly, the carrier CA2 of the second front planetary gear set 234 functions as the first intermediate output member 32, while the ring gear R1 of the first front planetary gear set 232 and the sun gear S2 of the second front planetary gear set 234, which are connected together, function as the second intermediate output member 34. Accordingly, a practical transmission 230 is able to be provided.

Here, as a first modified example of the eighteenth exemplary embodiment, the transmission 230 can achieve ten forward gears and two reverse gears, and effects equivalent to those obtained from the foregoing exemplary embodiment can be obtained, by engaging the clutches and brakes in different combinations, as shown in FIG. 143, in response to a command from the ECU 42, and suitably setting the gear ratio of each planetary gear set. Also, FIG. 144 is an alignment graph corresponding to FIG. 143, which shows the rotation speeds of the rotating elements in each gear. Hereinafter, the clutch and brake engagement chart and alignment graph according to the first modified example of the eighteenth exemplary embodiment shown in FIGS. 143 and 144, which differ from those of the foregoing exemplary embodiment, will be described.

As shown in the clutch and brake engagement chart in FIG. 143, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. The operations of the friction engagement devices for establishing the gears, as well as the gear ratios of the gears, are the same as those described above using FIG. 17, so descriptions thereof will be omitted here.

In the alignment graph shown in FIG. 144, the four vertical lines Y1 through Y4 representing components of the first transmitting portion 236 and the four vertical lines Y5 through Y8 representing components of the second transmitting portion 64 represent the same rotating elements as those in FIG. 142 described above because the structure shown in the skeleton view is the same. Also, in the clutch and brake engagement chart shown in FIG. 143, the operations of the friction engagement devices for establishing first gear "1st" through tenth gear "10th" are the same as those described above using FIG. 17. Therefore, based on the rotating elements, the alignment graph also corresponds to these. Thus, the alignment graph shown in FIG. 144 is the same as the alignment graph shown in FIG. 18.

Thus, according to this first modified example of the eighteenth exemplary embodiment as well, ten forward gears and two reverse gears can be achieved, and more particularly, the step between ninth gear and tenth gear is able to be set relatively small with a close ratio, by engaging the clutches and brakes in different combinations and suitably setting the gear ratio of each planetary gear set.

FIG. 145 is a skeleton view of the structure of a transmission 240 according to a nineteenth exemplary embodiment of the invention. FIG. 146 is a chart showing the relationship between gears and operations of friction engagement devices necessary to establish those gears in the transmission 240. FIG. 147 is an alignment graph showing the rotation speeds of rotating elements in each gear. With the exception of the structure of a first transmitting portion 246, the transmission 240 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 240 of this exemplary embodiment which differ from parts of the transmission 66 will be described.

As shown in FIG. 145, a first front planetary gear set 242 which makes up part of the first transmitting portion 246 is a double pinion type planetary gear set which includes a sun gear S1, a plurality of sets of pinions P1 which are in mesh with each other, a carrier CA1 which rotatably and revolvably supports the pinions P1, and a ring gear R1 that is in mesh with the sun gear S1 via the pinions P1. A second front planetary gear set 244 which also makes up part of the first transmitting portion 246 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2.

In the first transmitting portion 246, the ring gear R1 of the first front planetary gear set 242 is integrally connected to the transmission case 16 which is a non-rotating member, which prevents the ring gear R1 from rotating relative to the transmission case 16. Also, the carrier CA1 of the first front planetary gear set 242 and the sun gear S2 of the second front planetary gear set 244 are connected together, and the sun gear S1 of the first front planetary gear set 242 and the ring gear R2 of the second front planetary gear set 244 are integrally connected to the input shaft 22 which is the input rotating member. According to this kind of structure, the carrier CA2 of the second front planetary gear set 244 is integrally connected to the first intermediate output member 32 and thus functions as a first intermediate output member, similar to the first intermediate output member 32, while the carrier CA1 of the first front planetary gear set 242 and the sun gear S2 of the second front planetary gear set 244, which are connected together, are integrally connected to the second intermediate output member 34 and thus function as a second intermediate output member, similar to the second intermediate output member 34.

In the transmission 240 structured as described above, any one of nine forward gears, i.e., a first gear "1st" through a ninth gear "9th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 146, for example, in response to a command from the ECU 42, and a gear ratio γ (=input shaft rotation speed NIN/output shaft rotation speed NOUT) that changes in substantially equal ratio is able to be achieved for each gear. The engagement operations and gear ratios of the gears of the transmission 240 according to this exemplary embodiment are the same as those described above using FIG. 25, so descriptions thereof will be omitted here.

In the alignment graph shown in FIG. 147, the four vertical lines Y1 through Y4 represent components of the first transmitting portion 246. From left to right in the graph, line Y1 represents the carrier CA1 of the first front planetary gear set 242 and the sun gear S2 of the second front planetary gear set 244 which are connected together to form one rotating element, line Y2 represents the ring gear R1 of the first front planetary gear set 242 which is another rotating element, line Y3 represents the carrier CA2 of the second front planetary gear set 244 which is another rotating element, and line Y4 represents the sun gear S1 of the first front planetary gear set 242 and the ring gear R2 of the second front planetary gear set 244 which are connected together to form another rotating element. Accordingly, based on these rotating elements, the alignment graph shown in FIG. 147 is similar to that shown in FIG. 26 described above so a description thereof will be omitted.

Thus, according to this nineteenth exemplary embodiment, nine forward gears and two reverse gears can be achieved, and more particularly, the step between eighth gear and ninth gear is able to be set relatively small with a close ratio, by engaging the clutches and brakes in different combinations and suitably setting the gear ratio of each planetary gear set.

In this way, according to the nineteenth exemplary embodiment, the first transmitting portion 246 includes the double pinion type first front planetary gear set 242 and the single pinion type second front planetary gear set 244. The ring gear R1 of the first front planetary gear set 242 is always connected to the transmission case 16, which is a non-rotating member. The carrier CA1 of the first front planetary gear set 242 and the sun gear S2 of the second front planetary gear set 244 are connected together, and the sun gear S1 of the first front planetary gear set 242 and the ring gear R1 of the second front planetary gear set 244 are connected to the input shaft 22. Accordingly, the carrier CA2 of the second front planetary gear set 244 functions as the first intermediate output member 32, while the carrier CA1 of the first front planetary gear set 242 and the sun gear S2 of the second front planetary gear set 244, which are connected together, function as the second intermediate output member 34. Accordingly, a practical transmission 240 is able to be provided.

FIG. 148 is a skeleton view of the structure of a transmission 250 according to a twentieth exemplary embodiment of the invention. FIG. 149 is a chart showing the relationship between gears and operations of friction engagement devices necessary to establish those gears in the transmission 250. FIG. 150 is an alignment graph showing the rotation speeds of rotating elements in each gear. With the exception of the structure of a first transmitting portion 256, the transmission 250 of this exemplary embodiment is similar in structure to the transmission 66 shown in FIG. 12, so effects equivalent to those obtained from the foregoing exemplary embodiment can be obtained with this exemplary embodiment. Hereinafter, parts of the transmission 250 of this exemplary embodiment which differ from parts of the transmission 66 will be described.

As shown in FIG. 148, a first front planetary gear set 252 which makes up part of the first transmitting portion 256 is a single pinion type planetary gear set which includes a sun gear S1, a pinion P1, a carrier CA1 which rotatably and revolvably supports the pinion P1, and a ring gear R1 that is in mesh with the sun gear S1 via the pinion P1. A second front planetary gear set 254 which also makes up part of the first transmitting portion 256 is a single pinion type planetary gear set which includes a sun gear S2, a pinion P2, a carrier CA2 which rotatably and revolvably supports the pinion P2, and a ring gear R2 that is in mesh with the sun gear S2 via the pinion P2.

In the first transmitting portion 256, the carrier CA1 of the first front planetary gear set 252 is integrally connected to the transmission case 16 which is a non-rotating member, which prevents the carrier CA1 from rotating relative to the transmission case 16. Also, the ring gear R1 of the first front planetary gear set 252 and the sun gear S2 of the second front planetary gear set 254 are connected together, and the sun gear S1 of the first front planetary gear set 252 and the ring gear R2 of the second front planetary gear set 254 are integrally connected to the input shaft 22 which is the input rotating member. According to this kind of structure, the carrier CA2 of the second front planetary gear set 254 is integrally connected to the first intermediate output member 32 and thus functions as a first intermediate output member, similar to the first intermediate output member 32. Also, the ring gear R1 of the first front planetary gear set 252 and the sun gear S2 of the second front planetary gear set 254, which are connected together, are integrally connected to the second intermediate output member 34 and thus function as a second intermediate output member, similar to the second intermediate output member 34.

In the transmission 250 structured as described above, any one of eleven forward gears, i.e., a first gear "1st" through an eleventh gear "11th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 149, for example, in response to a command from the ECU 42, and a gear ratio γ (=input shaft rotation speed NIN/output shaft rotation speed NOUT) that changes in substantially equal ratio is able to be achieved for each gear.

In the transmission 250 which establishes the gears according to the clutch and brake engagement chart shown in FIG. 149, the gear ratio γ1 of first gear is approximately 5.128, the gear ratio γ2 of second gear is approximately 3.601, the gear ratio γ3 of third gear is approximately 3.060, the gear ratio γ4 of fourth gear is approximately 2.259, the gear ratio γ5 of fifth gear is approximately 1.694, the gear ratio γ6 of sixth gear is approximately 1.444, the gear ratio γ7 of seventh gear is approximately 1.239, the gear ratio γ8 of eighth gear is approximately 1.000, the gear ratio γ9 of ninth gear is approximately 0.853, the gear ratio γ10 of tenth gear is approximately 0.704, the gear ratio γ11 of eleventh gear is approximately 0.619, the gear ratio γR1 of first reverse gear is approximately 4.024, and the gear ratio γR2 of second reverse gear is approximately 2.375. Further, the ratio of the gear ratio γ1 of the first gear to the gear ratio γ3 of the third gear (=γ1/γ3) is 1.676, the ratio of the gear ratio γ2 of the second gear to the gear ratio γ4 of the fourth gear (=γ2/γ4) is 1.594, the ratio of the gear ratio γ3 of the third gear to the gear ratio γ4 of the fourth gear (=γ3/γ4) is 1.354, the ratio of the gear ratio γ4 of the fourth gear to the gear ratio γ5 of the fifth gear (=γ4/γ5) is 1.333, the ratio of the gear ratio γ5 of the fifth gear to the gear ratio γ6 of the sixth gear (=γ5/γ6) is 1.174, the ratio of the gear ratio γ6 of the sixth gear to the gear ratio γ7 of the seventh gear (=γ6/γ7) is 1.165, the ratio of the gear ratio γ7 of the seventh gear to the gear ratio γ8 of the eighth gear (=γ7/γ8) is 1.239, the ratio of the gear ratio γ8 of the eighth gear to the gear ratio γ9 of the ninth gear (=γ8/γ9) is 1.173, the ratio of the gear ratio γ9 of the ninth gear to the gear ratio γ10 of the tenth gear (=γ9/γ10) is 1.212, and the ratio of the gear ratio γ10 of the tenth gear to the gear ratio γ11 of the eleventh gear (=γ10/γ11) is 1.137. Thus, the gear ratios y change in a well balanced manner. Also, the total gear ratio range, which is the ratio of the gear ratio γ1 of the first gear to the gear ratio γ11 of the eleventh gear (=γ1/γ11), is 8.288, which is a relatively large value. Here, in order for the planetary gear sets to achieve the foregoing gear ratios, the gear ratio ρ1 of the first front planetary gear set 252 is set at approximately 0.463, for example, the gear ratio ρ2 of the second front planetary gear set 254 is set at approximately 0.389, for example, the gear ratio ρ3 of the first rear planetary gear set 58 is set at approximately 0.528, for example, and the gear ratio ρ4 of the second rear planetary gear set 60 is set at approximately 0.421, for example.

In the alignment graph shown in FIG. 150, the four vertical lines Y1 through Y4 represent components of the first transmitting portion 256. From left to right in the graph, line Y1 represents the ring gear R1 of the first front planetary gear set 252 and the sun gear S2 of the second front planetary gear set 254 which are connected together to form one rotating element, line Y2 represents the carrier CA1 of the first front planetary gear set 252 which is another rotating element, line Y3 represents the carrier CA2 of the second front planetary gear set 254 which is another rotating element, and line Y4 represents the sun gear S1 of the first front planetary gear set 252 and the ring gear R2 of the second front planetary gear set 254 which are connected together to form another rotating element. Further, the four vertical lines Y5 through Y8 which represent components of the second transmitting portion 64 are the same as those shown in FIG. 14. Accordingly, based on these rotating elements, the alignment graph shown in FIG. 150 is similar to that shown in FIG. 90 described above so a description thereof will be omitted.

Thus, according to this exemplary embodiment, eleven forward gears and two reverse gears can be achieved, and the gear ratio steps between the gears are able to be set in a well balanced manner, by engaging the clutches and brakes in different combinations and suitably setting the gear ratio of each planetary gear set. Thus, a practical automatic transmission for a vehicle is able to be provided.

Also, according to this exemplary embodiment, the first transmitting portion 256 includes the single pinion type first front planetary gear set 252 and the single pinion type second front planetary gear set 254. The carrier CA1 of the first front planetary gear set 252 is always connected to the transmission case 16, which is a non-rotating member, the ring gear R1 of the first front planetary gear set 252 and the sun gear S2 of the second front planetary gear set 254 are connected together, and the sun gear S1 of the first front planetary gear set 252 and the ring gear R2 of the second front planetary gear set 254 are connected to the input shaft 22. Accordingly, the carrier CA2 of the second front planetary gear set 254 functions as the first intermediate output member 32 while the ring gear R1 of the first front planetary gear set 252 and the sun gear S2 of the second front planetary gear set 254, which are connected together, function as the second intermediate output member 34. Accordingly, a practical multi-speed transmission for a vehicle is able to be provided.

FIG. 151 is a skeleton view of the structure of a transmission 260 according to a twenty-first exemplary embodiment of the invention. FIG. 152 is a chart showing the relationship between gears and operations of friction engagement devices necessary to establish those gears in the transmission 260. FIG. 153 is an alignment graph showing the rotation speeds of rotating elements in each gear. With the exception of the structure of a second transmitting portion 266, the transmission 260 of this exemplary embodiment is similar in structure to the transmission 138 shown in FIG. 74, so effects equivalent to those obtained from the foregoing exemplary embodiment can be obtained with this exemplary embodiment. Hereinafter, parts of the transmission 260 of this exemplary embodiment which differ from parts of the transmission 138 will be described.

As shown in FIG. 151, a first rear planetary gear set 262 which makes up part of the second transmitting portion 266 is a double pinion type planetary gear set which includes a sun gear S3, a plurality of sets of pinions P3 that are in mesh with each other, a carrier CA3 which rotatably and revolvably supports the pinions P3, and a ring gear R3 that is in mesh with the sun gear S3 via the pinions P3. A second rear planetary gear set 264 which also makes up part of the second transmitting portion 266 is a double pinion type planetary gear set which includes a sun gear S4, a plurality of sets of pinions P4 that are in mesh with each other, a carrier CA4 which rotatably and revolvably supports the pinions P4, and a ring gear R4 that is in mesh with the sun gear S4 via the pinions P4.

In the second transmitting portion 266, the sun gear S3 of the first rear planetary gear set 262 forms a first rotating element RE1. The ring gear R3 of the first rear planetary gear set 262 and the carrier CA4 of the second rear planetary gear set 264 are connected together to form a second rotating element RE2. The ring gear R4 of the second rear planetary gear set 264 forms a third rotating element RE3, and the carrier CA3 of the first rear planetary gear set 262 and the sun gear S4 of the second rear planetary gear set 264 are connected together to form a fourth rotating element RE4. The transmission 260 also includes a first clutch C1, a second clutch C2, a third clutch C3, a fourth clutch C4, a fifth clutch C5, a first brake B1, and a second brake B2. The first clutch C1 is a first clutch element that selectively connects the first intermediate output member 32 with the fourth rotating element RE4. The second clutch C2 is a second clutch element that selectively connects the input shaft 22 with the second rotating element RE2. The third clutch C3 is a third clutch element that selectively connects the first intermediate output member 32 with the first rotating element RE1. The fourth clutch C4 is a fourth clutch element that selectively connects together the input shaft 22 and the first rotating element RE1. The fifth clutch C5 is a fifth clutch element that selectively connects together the second intermediate output member 34 and the first rotating element RE1. The first brake B1 is a first brake element that selectively holds the first rotating element RE1 to the transmission case 16 which is a non-rotating member, and the second brake B2 is a second brake element that selectively holds the second rotating element RE2 to the transmission case 16.

In the transmission 260 structured as described above, any one of eleven forward gears, i.e., a first gear "1st" through an eleventh gear "11th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 152, for example, in response to a command from the ECU 42, and a gear ratio γ (=input shaft rotation speed NIN/output shaft rotation speed NOUT) that changes in substantially equal ratio is able to be achieved for each gear. The engagement operations and gear ratios of the gears of the transmission 260 according to this exemplary embodiment are the same as those described above using FIG. 149, so descriptions thereof will be omitted here. Also, in order for the planetary gear sets to achieve the foregoing gear ratios, the gear ratio ρ1 of the first front planetary gear set 140 is set at approximately 0.463, for example, the gear ratio ρ2 of the second front planetary gear set 142 is set at approximately 0.410, for example, the gear ratio ρ3 of the first rear planetary gear set 262 is set at approximately 0.472, for example, and the gear ratio ρ4 of the second rear planetary gear set 264 is set at approximately 0.471, for example.

In the alignment graph shown in FIG. 153, the four vertical lines Y5 through Y8 represent components of the first transmitting portion 266. From left to right in the graph, line Y5 represents the sun gear S3 of the first rear planetary gear set 262 which is one rotating element, line Y6 represents the ring gear R3 of the first rear planetary gear set 262 and the carrier CA4 of the second rear planetary gear set 264 which are connected together to form another rotating element, line Y7 represents the ring gear R4 of the second rear planetary gear set 264 which is another rotating element, and line Y8 represents the carrier CA3 of the first rear planetary gear set 262 and the sun gear S4 of the second rear planetary gear set 264 which are connected together to form another rotating element. Further, the four vertical lines Y1 through Y4 which represent components of the first transmitting portion 144 are the same as those shown in FIG. 80. Accordingly, based on these rotating elements, the alignment graph shown in FIG. 153 is similar to that shown in FIG. 150 described above so a description thereof will be omitted.

Thus, according to this exemplary embodiment, eleven forward gears and two reverse gears can be achieved, and the gear ratio steps between the gears are able to be set in a well balanced manner, by engaging the clutches and brakes in different combinations and suitably setting the gear ratio of each planetary gear set. Thus, a practical automatic transmission for a vehicle is able to be provided. Also, in this exemplary embodiment, the second brake B2 is arranged to the outside, in the radial direction, of the ring gear R3 of the double pinion type first rear planetary gear set 262, and is thus comparatively away from the axial center. Therefore, when the transmission is in first gear "1st" and the second brake B2 is engaged, for example, the second brake B2 is able to be engaged even when the brake reaction force at the time of that engagement is relatively small.

Also, according to this exemplary embodiment, the second transmitting portion 266 includes the double pinion type first rear planetary gear set 262 and the double pinion type second rear planetary gear set 264. The first rotating element RE1 is formed by the sun gear S3 of the first rear planetary gear set 262, the second rotating element RE2 is formed by the ring gear R3 of the first rear planetary gear set 262 and the carrier CA4 of the second rear planetary gear set 264, which are connected together, the third rotating element RE3 is formed by the ring gear R4 of the second rear planetary gear set 264, and the fourth rotating element RE4 is formed by the carrier CA3 of the first rear planetary gear set 262 and the sun gear S4 of the second rear planetary gear set 264, which are connected together. Accordingly, a practical multi-speed transmission for a vehicle is able to be provided.

Further, as a first modified example of the twenty-first exemplary embodiment, the transmission 260 can achieve ten forward gears and two reverse gears, by engaging the clutches and brakes in different combinations, as shown in FIG. 154, in response to a command from the ECU 42, and suitably setting the gear ratio of each planetary gear set. Also, FIG. 155 is an alignment graph corresponding to FIG. 154, which shows the rotation speeds of the rotating elements in each gear. Hereinafter, the clutch and brake engagement chart and alignment graph according to the first modified example of the twenty-first exemplary embodiment shown in FIGS. 154 and 155, which differ from those of the foregoing exemplary embodiment, will be described.

As shown in the clutch and brake engagement chart in FIG. 154, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. Also, in order for the planetary gear sets to achieve the gear ratios shown in FIG. 154, the gear ratio ρ1 of the first front planetary gear set 140 is set at approximately 0.580, for example, the gear ratio ρ2 of the second front planetary gear set 142 is set at approximately 0.463, for example, the gear ratio ρ3 of the first rear planetary gear set 262 is set at approximately 0.515, for example, and the gear ratio ρ4 of the second rear planetary gear set 264 is set at approximately 0.471, for example.

In the alignment graph shown in FIG. 155, the four vertical lines Y1 through Y4 representing components of the first transmitting portion 144 and the four vertical lines Y5 through Y8 representing components of the second transmitting portion 266 represent the same rotating elements as shown in FIG. 153 because the skeleton view is the same. Accordingly, based on these rotating elements, the alignment graph shown in FIG. 155 is similar to the alignment graph shown in FIG. 4 described above so a description thereof will be omitted.

Thus, according to this exemplary embodiment, ten forward gears and two reverse gears can be achieved, and the gear ratio steps between the gears are able to be set in a well balanced manner, by engaging the clutches and brakes in different combinations and suitably setting the gear ratio of each planetary gear set. Thus, a practical automatic transmission for a vehicle is able to be provided.

FIG. 156 is a skeleton view of the structure of a transmission 270 according to a twenty-second exemplary embodiment of the invention. FIG. 157 is a chart showing the relationship between gears and operations of friction engagement devices necessary to establish those gears in the transmission 270. FIG. 158 is an alignment graph showing the rotation speeds of rotating elements in each gear. With the exception of the structure of a second transmitting portion 276, the transmission 270 of this exemplary embodiment is similar in structure to the transmission 138 shown in FIG. 74, so effects equivalent to those obtained from the foregoing exemplary embodiment can be obtained with this exemplary embodiment. Hereinafter, parts of the transmission 270 of this exemplary embodiment which differ from parts of the transmission 138 will be described.

As shown in FIG. 156, a first rear planetary gear set 272 which makes up part of the second transmitting portion 276 is a double pinion type planetary gear set which includes a sun gear S3, a plurality of sets of pinions P3 that are in mesh with each other, a carrier CA3 which rotatably and revolvably supports the pinions P3, and a ring gear R3 that is in mesh with the sun gear S3 via the pinions P3. A second rear planetary gear set 274 which also makes up part of the second transmitting portion 276 is a double pinion type planetary gear set which includes a sun gear S4, a plurality of sets of pinions P4 that are in mesh with each other, a carrier CA4 which rotatably and revolvably supports the pinions P4, and a ring gear R4 that is in mesh with the sun gear S4 via the pinions P4.

In the second transmitting portion 276, the carrier CA3 of the first rear planetary gear set 272 forms a first rotating element RE1. The ring gear R3 of the first rear planetary gear set 272 and the carrier CA4 of the second rear planetary gear set 274 are connected together to form a second rotating element RE2. The ring gear R4 of the second rear planetary gear set 274 forms a third rotating element RE3, and the sun gear S3 of the first rear planetary gear set 272 and the sun gear S4 of the second rear planetary gear set 274 are connected together to form a fourth rotating element RE4. The transmission 270 also includes a first clutch C1, a second clutch C2, a third clutch C3, a fourth clutch C4, a fifth clutch C5, a first brake B1, and a second brake B2. The first clutch C1 is a first clutch element that selectively connects the first intermediate output member 32 with the fourth rotating element RE4. The second clutch C2 is a second clutch element that selectively connects the input shaft 22 with the second rotating element RE2. The third clutch C3 is a third clutch element that selectively connects the first intermediate output member 32 with the first rotating element RE1. The fourth clutch C4 is a fourth clutch element that selectively connects together the input shaft 22 and the first rotating element RE1. The fifth clutch C5 is a fifth clutch element that selectively connects together the second intermediate output member 34 and the first rotating element RE1. The first brake B1 is a first brake element that selectively holds the first rotating element RE1 to the transmission case 16 which is a non-rotating member, and the second brake B2 is a second brake element that selectively holds the second rotating element RE2 to the transmission case 16.

In the transmission 270 structured as described above, any one of eleven forward gears, i.e., a first gear "1st" through an eleventh gear "11th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 157, for example, in response to a command from the ECU 42, and a gear ratio γ (=input shaft rotation speed NIN/output shaft rotation speed NOUT) that changes in substantially equal ratio is able to be achieved for each gear. The engagement operations and gear ratios of the gears of the transmission 270 according to this exemplary embodiment are the same as those described above using FIG. 149, so descriptions thereof will be omitted here. Also, in order for the planetary gear sets to achieve the foregoing gear ratios, the gear ratio ρ1 of the first front planetary gear set 140 is set at approximately 0.463, for example, the gear ratio ρ2 of the second front planetary gear set 142 is set at approximately 0.410, for example, the gear ratio ρ3 of the first rear planetary gear set 272 is set at approximately 0.528, for example, and the gear ratio ρ4 of the second rear planetary gear set 274 is set at approximately 0.471, for example.

In the alignment graph shown in FIG. 158, the four vertical lines Y5 through Y8 represent components of the first transmitting portion 276. From left to right in the graph, line Y5 represents the carrier CA3 of the first rear planetary gear set 272 which is one rotating element, line Y6 represents the ring gear R3 of the first rear planetary gear set 272 and the carrier CA4 of the second rear planetary gear set 274 which are connected together to form another rotating element, line Y7 represents the ring gear R4 of the second rear planetary gear set 274 which is another rotating element, and line Y8 represents the sun gear S3 of the first rear planetary gear set 272 and the sun gear S4 of the second rear planetary gear set 274 which are connected together to form another rotating element. Further, the four vertical lines Y1 through Y4 which represent components of the first transmitting portion 144 are the same as those shown in FIG. 80. Accordingly, based on these rotating elements, the alignment graph shown in FIG. 158 is similar to that shown in FIG. 150 described above so a description thereof will be omitted.

Thus, according to this exemplary embodiment, eleven forward gears and two reverse gears can be achieved, and the gear ratio steps between the gears are able to be set in a well balanced manner, by engaging the clutches and brakes in different combinations and suitably setting the gear ratio of each planetary gear set. Thus, a practical automatic transmission for a vehicle is able to be provided.

Further, in this exemplary embodiment, the second transmitting portion 276 includes the double pinion type first rear planetary gear set 272 and the double pinion type second rear planetary gear set 274. The first rotating element RE1 is formed by the carrier CA3 of the first rear planetary gear set 272, the second rotating element RE2 is formed by the ring gear R3 of the first rear planetary gear set 272 and the carrier CA4 of the second rear planetary gear set 274, which are connected together, the third rotating element RE3 is formed by the ring gear R4 of the second rear planetary gear set 274, and the fourth rotating element RE4 is formed by the sun gear S3 of the first rear planetary gear set 272 and the sun gear S4 of the second rear planetary gear set 274, which are connected together. Accordingly, a practical multi-speed transmission for a vehicle is able to be provided.

Here, as a first modified example of the twenty-second exemplary embodiment, the transmission 270 can achieve ten forward gears and two reverse gears by engaging the clutches and brakes in different combinations, as shown in FIG. 159, in response to a command from the ECU 42, and suitably setting the gear ratio of each planetary gear set. Also, FIG. 160 is an alignment graph corresponding to FIG. 159, which shows the rotation speeds of the rotating elements in each gear. Hereinafter, the clutch and brake engagement chart and alignment graph according to the first modified example of the twenty-second exemplary embodiment shown in FIGS. 159 and 160, which differ from those of the foregoing exemplary embodiment, will be described.

As shown in the clutch and brake engagement chart in FIG. 159, any one of ten forward gears, i.e., a first gear "1st" through a tenth gear "10th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, and a gear ratio γ (=input shaft rotation speed NIN/output shaft rotation speed NOUT) that changes in substantially equal ratio is able to be achieved for each gear. Also, in order for the planetary gear sets to achieve the foregoing gear ratios, the gear ratio ρ1 of the first front planetary gear set 140 is set at approximately 0.580, for example, the gear ratio ρ2 of the second front planetary gear set 142 is set at approximately 0.463, for example, the gear ratio ρ3 of the first rear planetary gear set 272 is set at approximately 0.485, for example, and the gear ratio ρ4 of the second rear planetary gear set 274 is set at approximately 0.471, for example.

In the alignment graph shown in FIG. 160, the four vertical lines Y1 through Y4 representing components of the first transmitting portion 144 and the four vertical lines Y5 through Y8 representing components of the second transmitting portion 276 represent the same rotating elements as shown in FIG. 158 because the skeleton view is the same. Accordingly, based on these rotating elements, the alignment graph shown in FIG. 160 is similar to the alignment graph shown in FIG. 4 described above so a description thereof will be omitted.

Thus, according to this exemplary embodiment, ten forward gears and two reverse gears can be achieved, and the gear ratio steps between the gears are able to be set in a well balanced manner, by engaging the clutches and brakes in different combinations and suitably setting the gear ratio of each planetary gear set. Thus, a practical automatic transmission for a vehicle is able to be provided.

FIG. 161 is a skeleton view of the structure of a transmission 280 according to a twenty-third exemplary embodiment of the invention. FIG. 162 is a chart showing the relationship between gears and operations of friction engagement devices necessary to establish those gears in the transmission 280. FIG. 163 is an alignment graph showing the rotation speeds of rotating elements in each gear. With the exception of the structure of a second transmitting portion 286, the transmission 280 of this exemplary embodiment is similar in structure to the transmission 138 shown in FIG. 74, so effects equivalent to those obtained from the foregoing exemplary embodiment can be obtained with this exemplary embodiment. Hereinafter, parts of the transmission 280 of this exemplary embodiment which differ from parts of the transmission 138 will be described.

As shown in FIG. 161, a first rear planetary gear set 282 which makes up part of the second transmitting portion 286 is a single pinion type planetary gear set which includes a sun gear S3, a pinion P3, a carrier CA3 which rotatably and revolvably supports the pinion P3, and a ring gear R3 that is in mesh with the sun gear S3 via the pinion P3. A second rear planetary gear set 284 which also makes up part of the second transmitting portion 286 is a double pinion type planetary gear set which includes a sun gear S4, a plurality of sets of pinions P4 that are in mesh with each other, a carrier CA4 which rotatably and revolvably supports the pinions P4, and a ring gear R4 that is in mesh with the sun gear S4 via the pinions P4.

In the second transmitting portion 286, the sun gear S3 of the first rear planetary gear set 282 forms a first rotating element RE1. The carrier CA3 of the first rear planetary gear set 282 and the carrier CA4 of the second rear planetary gear set 284 are connected together to form a second rotating element RE2. The ring gear R3 of the first rear planetary gear set 282 and the ring gear R4 of the second rear planetary gear set 284 are connected together to form a third rotating element RE3, and the sun gear S4 of the second rear planetary gear set 284 forms a fourth rotating element RE4. The transmission 280 also includes a first clutch C1, a second clutch C2, a third clutch C3, a fourth clutch C4, a fifth clutch C5, a first brake B1, and a second brake B2. The first clutch C1 is a first clutch element that selectively connects the first intermediate output member 32 with the fourth rotating element RE4. The second clutch C2 is a second clutch element that selectively connects the input shaft 22 with the second rotating element RE2. The third clutch C3 is a third clutch element that selectively connects the first intermediate output member 32 with the first rotating element RE1. The fourth clutch C4 is a fourth clutch element that selectively connects together the input shaft 22 and the first rotating element RE1. The fifth clutch C5 is a fifth clutch element that selectively connects together the second intermediate output member 34 and the first rotating element RE1. The first brake B1 is a first brake element that selectively holds the first rotating element RE1 to the transmission case 16 which is a non-rotating member, and the second brake. B2 is a second brake element that selectively holds the second rotating element RE2 to the transmission case 16.

In the transmission 280 structured as described above, any one of eleven forward gears, i.e., a first gear "1st" through an eleventh gear "11th", or two reverse gears, i.e., a first reverse gear "R1" or a second reverse gear "R2", can be selectively established by simultaneously engaging two hydraulic friction engagement devices selected from among the first clutch C1, the second clutch C2, the third clutch C3, the fourth clutch C4, the fifth clutch C5, the first brake B1, and the second brake B2, as shown in FIG. 162, for example, in response to a command from the ECU 42, and a gear ratio γ (=input shaft rotation speed NIN/output shaft rotation speed NOUT) that changes in substantially equal ratio is able to be achieved for each gear. The engagement operations and gear ratios of the gears of the transmission 280 according to this exemplary embodiment are the same as those described above using FIG. 149, so descriptions thereof will be omitted here. Also, in order for the planetary gear sets to achieve the foregoing gear ratios, the gear ratio ρ1 of the first front planetary gear set 140 is set at approximately 0.463, for example, the gear ratio ρ2 of the second front planetary gear set 142 is set at approximately 0.410, for example, the gear ratio ρ3 of the first rear planetary gear set 282 is set at approximately 0.421, for example, and the gear ratio ρ4 of the second rear planetary gear set 284 is set at approximately 0.529, for example.

In the alignment graph shown in FIG. 163, the four vertical lines Y5 through Y8 represent components of the first transmitting portion 286. From left to right in the graph, line Y5 represents the sun gear S3 of the first rear planetary gear set 282 which is one rotating element, line Y6 represents the carrier CA3 of the first rear planetary gear set 282 and the carrier CA4 of the second rear planetary gear set 284 which are connected together to form another rotating element, line Y7 represents the ring gear R3 of the first rear planetary gear set 282 and the ring gear R4 of the second rear planetary gear set 284 which are connected together to form another rotating element, and line Y8 represents the sun gear S4 of the second rear planetary gear set 284 which is another rotating element. Further, the four vertical lines Y1 through Y4 which represent components of the first transmitting portion 144 are the same as those shown in FIG. 80. Accordingly, based on these rotating elements, the alignment graph shown in FIG. 163 is similar to that shown in FIG. 150 described above so a description thereof will be omitted.

Thus, according to this exemplary embodiment, eleven forward gears and two reverse gears can be achieved, and the gear ratio steps between the gears are able to be set in a well balanced manner, by engaging the clutches and brakes in different combinations and suitably setting the gear ratio of each planetary gear set. Thus, a practical automatic transmission for a vehicle is able to be provided.

Further, in this exemplary embodiment, the second transmitting portion 286 includes the single pinion type first rear planetary gear set 282 and the double pinion type second rear planetary gear set 284. The first rotating element RE1 is formed by the sun gear S3 of the first rear planetary gear set 282, the second rotating element RE2 is formed by the carrier CA3 of the first rear planetary gear set 282 and the carrier CA4 of the second rear planetary gear set 284, which are connected together, the third rotating element RE3 is formed by the ring gear R3 of the first rear planetary gear set 282 and the ring gear R4 of the second rear planetary gear set 284, which are connected together, and the fourth rotating element RE4 is formed by the sun gear S4 of the second rear planetary gear set 284. Accordingly, a practical multi-speed transmission for a vehicle is able to be provided.

Although various exemplary embodiments have been described in detail herein with reference to the drawings, the invention is not limited to these and may be implemented with further variations and modifications.

For example, in the transmission 14 and the like in the foregoing exemplary embodiments, a plurality of gears, e.g., first gear through tenth gear, first reverse gear, and second reverse gear, are achieved. Alternatively, however, shifting may be performed using appropriate gears from among those gears.

Also, in the transmission 14 and the like in the foregoing exemplary embodiments, a shift may be performed using any eight gears of first gear to tenth gear which are preset, such that eight forward gears are achieved. It is also of course possible to use one of the first reverse gear and the second reverse gear as the reverse gear.

Further, in the transmission 14 and the like in the foregoing exemplary embodiments, the engine 10 and the torque converter 20 are directly connected via the crankshaft 12. Alternatively, however, they may be operatively connected via a predetermined gear or belt or the like, for example. Furthermore, they do not necessarily have to be arranged on a common axis. Also, an electric motor or the like may be provided as the prime mover.

Moreover, in the transmission 14 and the like in the foregoing exemplary embodiments, a one-way clutch may also be provided either in series or in parallel with any of the first clutch C1 through the fifth clutch C5, the first brake B1, and the second brake B2, and shift control becomes easier, which is beneficial. Also, a one-way clutch may be used in place of any of the first clutch C1 through the fifth clutch C5, the first brake B1, and the second brake B2. Even if this is done, shifting can still be realized.

Also, in the foregoing exemplary embodiments, the torque converter 20 with the lock-up clutch 18 is provided as a fluid power transmitting device between the engine 10 and the input shaft 22. However, this lock-up clutch 18 does not necessarily need to be provided. Also, a fluid coupling, a magnetic-particle type electromagnetic clutch, or a single or multiple disc hydraulic clutch may be provided in place of the torque converter 20.

Further, in the alignment graphs in the foregoing exemplary embodiments, the vertical lines Y1 to Y8 or Y1 to Y10 are arranged in order from left to right. Alternatively, however, they may be arranged from right to left. Also, the horizontal line X2 which corresponds to the rotation speed of "1" is arranged above the horizontal line XZ which corresponds to the rotation speed of "0". Alternatively, however, the horizontal line X2 may be arranged below the horizontal line XZ.

Further, in the foregoing exemplary embodiments, hydraulic friction engagement devices such as the first clutch C1 through the fifth clutch C5, the first brake B1, and the second brake B2 are provided as engagement elements. Alternatively, however, electromagnetic type engagement devices such as electromagnetic clutches or magnetic-particle type clutches may be used.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A multi-speed transmission for a vehicle, the multi-speed transmission comprising:

an input rotating member;

an output rotating member;

a first transmitting portion which has a first intermediate output member which slows and transmits rotation from the input rotating member, and a second intermediate output member which reverses and transmits rotation from the input rotating member;

a second transmitting portion which includes four rotating elements formed by some sun gears, carriers, and ring gears of two planetary gear sets being connected together, and which transmits rotation to the output rotating member;

a first clutch element which selectively connects the first intermediate output member and the fourth rotating element together;

a second clutch element which selectively connects the input rotating member and the second rotating element together;

a third clutch element which selectively connects the first intermediate output member and the first rotating element together;

a fourth clutch element which selectively connects the input rotating member and the first rotating element together;

a fifth clutch element which selectively connects the second intermediate output member and the first rotating element together;

a first brake element which selectively holds the first rotating element to a non-rotating member;

a second brake element which selectively holds the second rotating element to the non-rotating member, wherein the rotation speeds of the first, second, third and fourth rotating elements have a relationship expressed with straight lines in each speed ratio.

2. The multi-speed transmission for a vehicle according to claim 1, wherein a first gear is established by engaging the first clutch element and the second brake element; a second gear is established by engaging the first clutch element and the first brake element; a third gear is established by engaging the first clutch element and the third clutch element; a fourth gear is established by engaging the first clutch element and the fourth clutch element; a fifth gear is established by engaging the first clutch element and the second clutch element; a sixth gear is established by engaging the second clutch element and the fourth clutch element; a seventh gear is established by engaging the second clutch element and the third clutch element; an eighth gear is established by engaging the second clutch element and the first brake element; and a ninth gear is established by engaging the second clutch element and the fifth clutch element.

3. The multi-speed transmission for a vehicle according to claim 1, wherein a first gear is established by engaging the first clutch element and the fifth clutch element; a second gear is established by engaging the first clutch element and the first brake element; a third gear is established by engaging the first clutch element and the third clutch element; a fourth gear is established by engaging the first clutch element and the fourth clutch element; a fifth gear is established by engaging the first clutch element and the second clutch element; a sixth gear is established by engaging the second clutch element and the fourth clutch element; a seventh gear is established by engaging the second clutch element and the third clutch element; an eighth gear is established by engaging the second clutch element and the first brake element; and a ninth gear is established by engaging the second clutch element and the fifth clutch element.

4. The multi-speed transmission for a vehicle according to claim 1, wherein a first gear is established by engaging the fifth clutch element and the second brake element; a second gear is established by engaging the first clutch element and the first brake element; a third gear is established by engaging the first clutch element and the third clutch element; a fourth gear is established by engaging the first clutch element and the fourth clutch element; a fifth gear is established by engaging the first clutch element and the second clutch element; a sixth gear is established by engaging the second clutch element and the fourth clutch element; a seventh gear is established by engaging the second clutch element and the third clutch element; an eighth gear is established by engaging the second clutch element and the first brake element; and a ninth gear is established by engaging the second clutch element and the fifth clutch element.

5. The multi-speed transmission for a vehicle according to claim 1, wherein a first gear is established by engaging the fifth clutch element and the second brake element; a second gear is established by engaging the first clutch element and the second brake element; a third gear is established by engaging the first clutch element and the first brake element; a fourth gear is established by engaging the first clutch element and the third clutch element; a fifth gear is established by engaging the first clutch element and the fourth clutch element; a sixth gear is established by engaging the first clutch element and the second clutch element; a seventh gear is established by engaging the second clutch element and the fourth clutch element; an eighth gear is established by engaging the second clutch element and the third clutch element; and a ninth gear is established by engaging the second clutch element and the first brake element.

6. The multi-speed transmission for a vehicle according to claim 1, wherein a first gear is established by engaging the first clutch element and the second brake element; a second gear is established by engaging the first clutch element and the fifth clutch element; a third gear is established by engaging the first clutch element and the first brake element; a fourth gear is established by engaging the first clutch element and the third clutch element; a fifth gear is established by engaging the first clutch element and the fourth clutch element; a sixth gear is established by engaging the first clutch element and the second clutch element; a seventh gear is established by engaging the second clutch element and the fourth clutch element; an eighth gear is established by engaging the second clutch element and the third clutch element; and a ninth gear is established by engaging the second clutch element and the first brake element.

7. The multi-speed transmission for a vehicle according to claim 1, wherein a first gear is established by engaging the fifth clutch element and the second brake element; a second gear is established by engaging the first clutch element and the fifth clutch element; a third gear is established by engaging the first clutch element and the first brake element; a fourth gear is established by engaging the first clutch element and the third clutch element; a fifth gear is established by engaging the first clutch element and the fourth clutch element; a sixth gear is established by engaging the first clutch element and the second clutch element; a seventh gear is established by engaging the second clutch element and the fourth clutch element; an eighth gear is established by engaging the second clutch element and the third clutch element;

and a ninth gear is established by engaging the second clutch element and the first brake element.

8. The multi-speed transmission for a vehicle according to claim 1, wherein a first gear is established by engaging the first clutch element and the fifth clutch element; a second gear is established by engaging the first clutch element and the second brake element; a third gear is established by engaging the first clutch element and the first brake element; a fourth gear is established by engaging the first clutch element and the third clutch element; a fifth gear is established by engaging the first clutch element and the fourth clutch element; a sixth gear is established by engaging the first clutch element and the second clutch element; a seventh gear is established by engaging the second clutch element and the fourth clutch element; an eighth gear is established by engaging the second clutch element and the third clutch element; a ninth gear is established by engaging the second clutch element and the first brake element; and a tenth gear is established by engaging the second clutch element and the fifth clutch element.

9. The multi-speed transmission for a vehicle according to claim 1, wherein a first gear is established by engaging the fifth clutch element and the second brake element; a second gear is established by engaging the first clutch element and the second brake element; a third gear is established by engaging the first clutch element and the first brake element; a fourth gear is established by engaging the first clutch element and the third clutch element; a fifth gear is established by engaging the first clutch element and the fourth clutch element; a sixth gear is established by engaging the first clutch element and the second clutch element; a seventh gear is established by engaging the second clutch element and the fourth clutch element; an eighth gear is established by engaging the second clutch element and the third clutch element; a ninth gear is established by engaging the second clutch element and the first brake element; and a tenth gear is established by engaging the second clutch element and the fifth clutch element.

10. The multi-speed transmission for a vehicle according to claim 1, wherein a first gear is established by engaging the first clutch element and the second brake element; a second gear is established by engaging the first clutch element and the fifth clutch element; a third gear is established by engaging the first clutch element and the first brake element; a fourth gear is established by engaging the first clutch element and the third clutch element; a fifth gear is established by engaging the first clutch element and the fourth clutch element; a sixth gear is established by engaging the first clutch element and the second clutch element; a seventh gear is established by engaging the second clutch element and the fourth clutch element; an eighth gear is established by engaging the second clutch element and the third clutch element; a ninth gear is established by engaging the second clutch element and the first brake element; and a tenth gear is established by engaging the second clutch element and the fifth clutch element.

11. The multi-speed transmission for a vehicle according to claim 1, wherein a first gear is established by engaging the fifth clutch element and the second brake element; a second gear is established by engaging the first clutch element and the fifth clutch element; a third gear is established by engaging the first clutch element and the first brake element; a fourth gear is established by engaging the first clutch element and the third clutch element; a fifth gear is established by engaging the first clutch element and the fourth clutch element; a sixth gear is established by engaging the first clutch element and the second clutch element; a seventh gear is established by engaging the second clutch element and the fourth clutch element; an eighth gear is established by engaging the second clutch element and the third clutch element; a ninth gear is established by engaging the second clutch element and the first brake element; and a tenth gear is established by engaging the second clutch element and the fifth clutch element.

12. The multi-speed transmission for a vehicle according to claim 1, wherein a first gear is established by engaging the fifth clutch element and the second brake element; a second gear is established by engaging the first clutch element and the second brake element; a third gear is established by engaging the first clutch element and the fifth clutch element; a fourth gear is established by engaging the first clutch element and the first brake element; a fifth gear is established by engaging the first clutch element and the third clutch element; a sixth gear is established by engaging the first clutch element and the fourth clutch element; a seventh gear is established by engaging the first clutch element and the second clutch element; an eighth gear is established by engaging the second clutch element and the fourth clutch element; a ninth gear is established by engaging the second clutch element and the third clutch element; a tenth gear is established by engaging the second clutch element and the first brake element; and an eleventh gear is established by engaging the second clutch element and the fifth clutch element.

13. The multi-speed transmission for a vehicle according to claim 1, wherein the first transmitting portion includes a single pinion type first front planetary gear set and a double pinion type second front planetary gear set, in which a carrier of the first front planetary gear set and a sun gear of the second front planetary gear set are always connected to the non-rotating member, and a sun gear of the first front planetary gear set and a carrier of the second front planetary gear set are connected to the input rotating member, such that a ring gear of the second front planetary gear set functions as the first intermediate output member while a ring gear of the first front planetary gear set functions as the second intermediate output member.

14. The multi-speed transmission for a vehicle according to claim 1, wherein the first transmitting portion includes a double pinion first front planetary gear set and a single pinion second front planetary gear set, in which a carrier of the first front planetary gear set is always connected to the non-rotating member, a ring gear of the first front planetary gear set and a carrier of the second front planetary gear set are connected together, and a sun gear of the first front planetary gear set and a ring gear of the second front planetary gear set are connected to the input rotating member, such that the ring gear of the first front planetary gear set or the carrier of the second front planetary gear set functions as the first intermediate output member while a sun gear of the second front planetary gear set functions as the second intermediate output member.

15. The multi-speed transmission for a vehicle according to claim 1, wherein the first transmitting portion includes a double pinion first front planetary gear set and a single pinion second front planetary gear set, in which a sun gear of the first front planetary gear set is always connected to the non-rotating member, a ring gear of the first front planetary gear set and a carrier of the second front planetary gear set are connected together, and a carrier of the first front planetary gear set and a ring gear of the second front planetary gear set are connected to the input rotating member, such that the ring gear of the first front planetary gear set or the carrier of the second front planetary gear set functions as the first intermediate output member while a sun gear of the second front planetary gear set functions as the second intermediate output member.

16. The multi-speed transmission for a vehicle according to claim 1, wherein the first transmitting portion includes a single pinion first front planetary gear set and a double pinion second front planetary gear set, in which a ring gear of the second front planetary gear set is always connected to the non-rotating member, a sun gear of the first front planetary gear set and a sun gear of the second front planetary gear set are connected together, a carrier of the first front planetary gear set and a carrier of the second front planetary gear set are connected together, and a ring gear of the first front planetary gear set is connected to the input rotating member, such that the carrier of the first front planetary gear set or the carrier of the second front planetary gear set functions as the first intermediate output member while the sun gear of the first front planetary gear set or the sun gear of the second front planetary gear set functions as the second intermediate output member.

17. The multi-speed transmission for a vehicle according to claim 1, wherein the first transmitting portion includes a single pinion first front planetary gear set and a double pinion second front planetary gear set, in which a carrier of the first front planetary gear set and a ring gear of the second front planetary gear set are always connected to the non-rotating member, a ring gear of the first front planetary gear set and a carrier of the second front planetary gear set are connected together, and a sun gear of the first front planetary gear set is connected to the input rotating member, such that a sun gear of the second front planetary gear set functions as the first intermediate output member while the ring gear of the first front planetary gear set or the carrier of the second front planetary gear set functions as the second intermediate output member.

18. The multi-speed transmission for a vehicle according to claim 1, wherein the first transmitting portion includes a single pinion first front planetary gear set and a single pinion second front planetary gear set, in which a carrier of the first front planetary gear set and a carrier of the second front planetary gear set are always connected to the non-rotating member, and a sun gear of the first front planetary gear set is connected to the input rotating member, such that a sun gear of the second front planetary gear set functions as the first intermediate output member while a ring gear of the first front planetary gear set functions as the second intermediate output member.

19. The multi-speed transmission for a vehicle according to claim 1, wherein the first transmitting portion includes a single pinion first front planetary gear set and a single pinion second front planetary gear set, in which a carrier of the first front planetary gear set and a carrier of the second front planetary gear set are always connected to the non-rotating member, and a sun gear of the first front planetary gear set is connected to the input rotating member, such that a sun gear of the second front planetary gear set functions as the first intermediate output member while a ring gear of the second front planetary gear set functions as the second intermediate output member.

20. The multi-speed transmission for a vehicle according to claim 1, wherein the first transmitting portion includes a single pinion first front planetary gear set and a single pinion second front planetary gear set, in which a sun gear of the second front planetary gear set is always connected to the non-rotating member, a carrier of the first front planetary gear set and a carrier of the second front planetary gear set are connected together to form a single rotating element, and a ring gear of the second front planetary gear set is connected to the input rotating member, such that the single rotating element functions as the first intermediate output member while a sun gear of the first front planetary gear set functions as the second intermediate output member.

21. The multi-speed transmission for a vehicle according to claim 1, wherein the first transmitting portion includes a single pinion first front planetary gear set and a single pinion second front planetary gear set, in which a sun gear of the second front planetary gear set is always connected to the non-rotating member, a carrier of the first front planetary gear set and a carrier of the second front planetary gear set are connected together to form a single rotating element, and a ring gear of the first front planetary gear set is connected to the input rotating member, such that the single rotating element functions as the first intermediate output member while a sun gear of the first front planetary gear set functions as the second intermediate output member.

22. The multi-speed transmission for a vehicle according to claim 1, wherein the first transmitting portion includes a single pinion first front planetary gear set and a double pinion second front planetary gear set, in which a ring gear of the second front planetary gear set is always connected to the non-rotating member, a carrier of the first front planetary gear set and a sun gear of the second front planetary gear set are connected together, a sun gear of the first front planetary gear set and a carrier of the second front planetary gear set are connected together, and a ring gear of the first front planetary gear set is connected to the input rotating member, such that the carrier of the first front planetary gear set and the sun gear of the second front planetary gear set, which are connected together, function as the first intermediate output member while the sun gear of the first front planetary gear set and the carrier of the second front planetary gear set, which are connected together, function as the second intermediate output member.

23. The multi-speed transmission for a vehicle according to claim 1, wherein the first transmitting portion includes a single pinion first front planetary gear set and a double pinion second front planetary gear set, in which a ring gear of the second front planetary gear set is always connected to the non-rotating member, a sun gear of the first front planetary gear set and a sun gear of the second front planetary gear set are connected together, and a ring gear of the first front planetary gear set and a carrier of the second front planetary gear set are connected together as well as connected to the input rotating member, such that a carrier of the first front planetary gear set functions as the first intermediate output member while the sun gear of the first front planetary gear set and the sun gear of the second front planetary gear set, which are connected together, function as the second intermediate output member.

24. The multi-speed transmission for a vehicle according to claim 1, wherein the first transmitting portion includes a single pinion first front planetary gear set and a double pinion second front planetary gear set, in which a carrier of the first front planetary gear set and a ring gear of the second front planetary gear set are always connected to the non-rotating member, a ring gear of the first front planetary gear set and a sun gear of the second front planetary gear set are connected together, and a sun gear of the first front planetary gear set is connected to the input rotating member, such that a carrier of the second front planetary gear set functions as the first intermediate output member while the ring gear of the first front planetary gear set and the sun gear of the second front planetary gear set, which are connected together, function as the second intermediate output member.

25. The multi-speed transmission for a vehicle according to claim 1, wherein the first transmitting portion includes a double pinion first front planetary gear set and a single pinion second front planetary gear set, in which a ring gear of the first front planetary gear set is always connected to the non-rotating member, a carrier of the first front planetary gear set and a sun gear of the second front planetary gear set are connected together, and a sun gear of the first front planetary gear set and a ring gear of the second front planetary gear set are connected to the input rotating member, such that a carrier of the second front planetary gear set functions as the first intermediate output member while the carrier of the first front planetary gear set and the sun gear of the second front planetary gear set, which are connected together, function as the second intermediate output member.

26. The multi-speed transmission for a vehicle according to claim 1, wherein the first transmitting portion includes a single pinion first front planetary gear set and a single pinion second front planetary gear set, in which a carrier of the first front planetary gear set is always connected to the non-rotating member, a ring gear of the first front planetary gear set and a sun gear of the second front planetary gear set are connected together, and a sun gear of the first front planetary gear set and a ring gear of the second front planetary gear set are connected to the input rotating member, such that a carrier of the second front planetary gear set functions as the first intermediate output member while the ring gear of the first front planetary gear set and the sun gear of the second front planetary gear set, which are connected together, function as the second intermediate output member.

27. The multi-speed transmission for a vehicle according to claim 1, wherein the second transmitting portion includes a single pinion first rear planetary gear set and a double pinion second rear planetary gear set, in which the first rotating element is formed by a sun gear of the first rear planetary gear set, the second rotating element is formed by a carrier of the first rear planetary gear set and a carrier of the second rear planetary gear set which are connected together, the third rotating element is formed by a ring gear of the first rear planetary gear set and a ring gear of the second rear planetary gear set which are connected together, and the fourth rotating element is formed by a sun gear of the second rear planetary gear set.

28. The multi-speed transmission for a vehicle according to claim 1, wherein the second transmitting portion includes a single pinion first rear planetary gear set and a double pinion second rear planetary gear set, in which the first rotating element is formed by a sun gear of the first rear planetary gear set and a carrier of the second rear planetary gear set which are connected together, the second rotating element is formed by a carrier of the first rear planetary gear set and a ring gear of the second rear planetary gear set which are connected together, the third rotating element is formed by a ring gear of the first rear planetary gear set, and the fourth rotating element is formed by a sun gear of the second rear planetary gear set.

29. The multi-speed transmission for a vehicle according to claim 1, wherein the second transmitting portion includes a single pinion first rear planetary gear set and a double pinion second rear planetary gear set, in which the first rotating element is formed by a sun gear of the first rear planetary gear set, the second rotating element is formed by a carrier of the first rear planetary gear set and a carrier of the second rear planetary gear set which are connected together, the third rotating element is formed by a ring gear of the second rear planetary gear set, and the fourth rotating element is formed by a ring gear of the first rear planetary gear set and a sun gear of the second rear planetary gear set which are connected together.

30. The multi-speed transmission for a vehicle according to claim 1, wherein the second transmitting portion includes a double pinion first rear planetary gear set and a double pinion second rear planetary gear set, in which the first rotating element is formed by a sun gear of the first rear planetary gear set, the second rotating element is formed by a ring gear of the first rear planetary gear set and a carrier of the second rear planetary gear set which are connected together, the third rotating element is formed by a ring gear of the second rear planetary gear set, and the fourth rotating element is formed by a carrier of the first rear planetary gear set and a sun gear of the second rear planetary gear set which are connected together.

31. The multi-speed transmission for a vehicle according to claim 1, wherein the second transmitting portion includes a double pinion first rear planetary gear set and a double pinion second rear planetary gear set, in which the first rotating element is formed by a carrier of the first rear planetary gear set, the second rotating element is formed by a ring gear of the first rear planetary gear set and a carrier of the second rear planetary gear set which are connected together, the third rotating element is formed by a ring gear of the second rear planetary gear set, and the fourth rotating element is formed by a sun gear of the first rear planetary gear set and a sun gear of the second rear planetary gear set which are connected together.

32. The multi-speed transmission for a vehicle according to claim 1, wherein the rotation speeds of the first, second, third and fourth rotating elements have a relationship expressed with straight lines in each speed ratio in order from the first rotating element, next the second rotating element, next the third rotating element, and next the fourth rotating element.

* * * * *